(12) United States Patent  (10) Patent No.: US 7,819,185 B2
Shuster  (45) Date of Patent: Oct. 26, 2010

(54) EXPANDABLE TUBULAR

(75) Inventor: Mark Shuster, VP Voorburg (NL)

(73) Assignee: Enventure Global Technology, LLC, Houston, TX (US)

( * ) Notice: Subject to any disclaimer, the term of this patent is extended or adjusted under 35 U.S.C. 154(b) by 440 days.

(21) Appl. No.: 11/573,589

(22) PCT Filed: Aug. 12, 2005

(86) PCT No.: PCT/US2005/028936

§ 371 (c)(1),
(2), (4) Date: Feb. 5, 2008

(87) PCT Pub. No.: WO2006/020960

PCT Pub. Date: Feb. 23, 2006

(65) Prior Publication Data

US 2008/0115931 A1    May 22, 2008

Related U.S. Application Data

(60) Provisional application No. 60/601,502, filed on Aug. 13, 2004.

(51) Int. Cl.
*E21B 47/08* (2006.01)
(52) U.S. Cl. ..................................................... 166/207
(58) Field of Classification Search ................. 166/380, 166/384, 207
See application file for complete search history.

(56) References Cited

U.S. PATENT DOCUMENTS

| 46,818 A | 3/1865 | Patterson |
|---|---|---|
| 331,940 A | 12/1885 | Bole |
| 332,184 A | 12/1885 | Bole |
| 341,237 A | 5/1886 | Healey |
| 519,805 A | 5/1894 | Bavier |
| 802,880 A | 10/1905 | Phillips, Jr. |
| 806,156 A | 12/1905 | Marshall |
| 958,517 A | 5/1910 | Mettler |
| 984,449 A | 2/1911 | Stewart |
| 1,166,040 A | 12/1915 | Burlingham |
| 1,233,888 A | 7/1917 | Leonard |
| 1,358,818 A | 11/1920 | Bering |
| 1,494,128 A | 5/1924 | Primrose |
| 1,589,781 A | 6/1926 | Anderson |
| 1,590,357 A | 6/1926 | Feisthamel |
| 1,597,212 A | 8/1926 | Spengler |
| 1,613,461 A | 1/1927 | Johnson |
| 1,739,932 A | 12/1929 | Ventresca |
| 1,756,531 A | 4/1930 | Aldeen et al. |
| 1,880,218 A | 10/1932 | Simmons |
| 1,952,652 A | 3/1934 | Brannon |

(Continued)

FOREIGN PATENT DOCUMENTS

AU    01/269810 B2    6/2000

(Continued)

OTHER PUBLICATIONS

Search Report and Written Opinion dated Jul. 14, 2008 for International Application No. PCT/US2005/028936.

(Continued)

*Primary Examiner*—William P Neuder
(74) *Attorney, Agent, or Firm*—Conley Rose, P.C.

(57) ABSTRACT

An expandable tubular member.

7 Claims, 138 Drawing Sheets

U.S. PATENT DOCUMENTS

| | | |
|---|---|---|
| 1,981,525 A | 11/1934 | Price |
| 2,046,870 A | 7/1936 | Clasen et al. |
| 2,087,185 A | 7/1937 | Dillon |
| 2,110,913 A | 3/1938 | Lowrey |
| 2,122,757 A | 7/1938 | Scott |
| 2,145,168 A | 1/1939 | Flagg |
| 2,160,263 A | 5/1939 | Fletcher |
| 2,187,275 A | 1/1940 | McLennan |
| 2,204,586 A | 6/1940 | Grau |
| 2,211,173 A | 8/1940 | Shaffer |
| 2,214,226 A | 9/1940 | English |
| 2,226,804 A | 12/1940 | Carroll |
| 2,273,017 A | 2/1942 | Boynton |
| 2,301,495 A | 11/1942 | Abegg |
| 2,305,282 A | 12/1942 | Taylor, Jr. et al. |
| 2,371,840 A | 3/1945 | Otis |
| 2,383,214 A | 8/1945 | Prout |
| 2,407,552 A | 9/1946 | Hoesel |
| 2,447,629 A | 8/1948 | Beissinger et al. |
| 2,481,637 A | 9/1949 | Yancey |
| 2,500,276 A | 3/1950 | Church |
| 2,546,295 A | 3/1951 | Boice |
| 2,583,316 A | 1/1952 | Bannister |
| 2,609,258 A | 9/1952 | Taylor, Jr. et al. |
| 2,627,891 A | 2/1953 | Clark |
| 2,647,847 A | 8/1953 | Black et al. |
| 2,664,952 A | 1/1954 | Losey |
| 2,691,418 A | 10/1954 | Connolly |
| 2,695,449 A | 11/1954 | Chauvin |
| 2,723,721 A | 11/1955 | Corsette |
| 2,734,580 A | 2/1956 | Layne |
| 2,735,485 A | 2/1956 | Metcalf, Jr. |
| 2,796,134 A | 6/1957 | Binkley |
| 2,812,025 A | 11/1957 | Teague et al. |
| 2,877,822 A | 3/1959 | Buck |
| 2,907,589 A | 10/1959 | Knox |
| 2,919,741 A | 1/1960 | Strock et al. |
| 2,929,741 A | 3/1960 | Steinberg |
| 3,015,362 A | 1/1962 | Moosman |
| 3,015,500 A | 1/1962 | Barnett |
| 3,018,547 A | 1/1962 | Marskell |
| 3,039,530 A | 6/1962 | Condra |
| 3,067,801 A | 12/1962 | Sortor |
| 3,067,819 A | 12/1962 | Gore |
| 3,068,563 A | 12/1962 | Reverman |
| 3,104,703 A | 9/1963 | Rike et al. |
| 3,111,991 A | 11/1963 | O'Neal |
| 3,162,245 A | 12/1964 | Howard et al. |
| 3,167,122 A | 1/1965 | Lang |
| 3,175,618 A | 3/1965 | Lang et al. |
| 3,179,168 A | 4/1965 | Vincent |
| 3,188,816 A | 6/1965 | Koch |
| 3,191,677 A | 6/1965 | Kinley |
| 3,191,680 A | 6/1965 | Vincent |
| 3,203,451 A | 8/1965 | Vincent |
| 3,203,483 A | 8/1965 | Vincent |
| 3,209,546 A | 10/1965 | Lawton |
| 3,210,102 A | 10/1965 | Joslin |
| 3,233,315 A | 2/1966 | Levake |
| 3,245,471 A | 4/1966 | Howard |
| 3,270,817 A | 9/1966 | Papaila |
| 3,297,092 A | 1/1967 | Jennings |
| 3,326,293 A | 6/1967 | Skipper |
| 3,343,252 A | 9/1967 | Reesor |
| 3,353,599 A | 11/1967 | Swift |
| 3,354,955 A | 11/1967 | Berry |
| 3,358,760 A | 12/1967 | Blagg |
| 3,358,769 A | 12/1967 | Berry |
| 3,364,993 A | 1/1968 | Skipper |
| 3,371,717 A | 3/1968 | Chenoweth |
| 3,397,745 A | 8/1968 | Owens et al. |
| 3,412,565 A | 11/1968 | Lindsey et al. |
| 3,419,080 A | 12/1968 | Lebourg |
| 3,422,902 A | 1/1969 | Bouchillon |
| 3,424,244 A | 1/1969 | Kinley |
| 3,427,707 A | 2/1969 | Nowosadko |
| 3,463,228 A | 8/1969 | Hearn |
| 3,477,506 A | 11/1969 | Malone |
| 3,489,220 A | 1/1970 | Kinley |
| 3,489,437 A | 1/1970 | Duret |
| 3,498,376 A | 3/1970 | Sizer et al. |
| 3,504,515 A | 4/1970 | Reardon |
| 3,508,771 A | 4/1970 | Duret |
| 3,520,049 A | 7/1970 | Lysenko et al. |
| 3,528,498 A | 9/1970 | Carothers |
| 3,532,174 A | 10/1970 | Diamantides |
| 3,568,773 A | 3/1971 | Chancellor |
| 3,572,777 A | 3/1971 | Blose et al. |
| 3,574,357 A | 4/1971 | Tirgoviste |
| 3,578,081 A | 5/1971 | Bodine |
| 3,579,805 A | 5/1971 | Kast |
| 3,581,817 A | 6/1971 | Kammerer |
| 3,605,887 A | 9/1971 | Lambie |
| 3,631,926 A | 1/1972 | Young |
| 3,665,591 A | 5/1972 | Kowal |
| 3,667,547 A | 6/1972 | Ahlstone |
| 3,669,190 A | 6/1972 | Sizer et al. |
| 3,678,727 A | 7/1972 | Jackson |
| 3,682,256 A | 8/1972 | Stuart |
| 3,687,196 A | 8/1972 | Mullins |
| 3,691,624 A | 9/1972 | Kinley |
| 3,693,717 A | 9/1972 | Wuenschel |
| 3,704,730 A | 12/1972 | Witzig |
| 3,709,306 A | 1/1973 | Curlington |
| 3,711,123 A | 1/1973 | Arnold |
| 3,712,376 A | 1/1973 | Owen et al. |
| 3,746,068 A | 7/1973 | Deckert et al. |
| 3,746,091 A | 7/1973 | Owen et al. |
| 3,746,092 A | 7/1973 | Land |
| 3,764,168 A | 10/1973 | Kisling, III et al. |
| 3,776,307 A | 12/1973 | Young |
| 3,779,025 A | 12/1973 | Godley |
| 3,780,562 A | 12/1973 | Kinley |
| 3,781,966 A | 1/1974 | Lieberman |
| 3,785,193 A | 1/1974 | Kinley |
| 3,797,259 A | 3/1974 | Kammerer, Jr. |
| 3,805,567 A | 4/1974 | Agius Sinerco |
| 3,812,912 A | 5/1974 | Wuenschel |
| 3,818,734 A | 6/1974 | Bateman |
| 3,826,124 A | 7/1974 | Baksay |
| 3,830,294 A | 8/1974 | Swanson, Jr. |
| 3,830,295 A | 8/1974 | Crowe |
| 3,834,742 A | 9/1974 | McPhillips |
| 3,848,668 A | 11/1974 | Sizer |
| 3,866,954 A | 2/1975 | Slator et al. |
| 3,874,446 A | 4/1975 | Crowe |
| 3,885,298 A | 5/1975 | Pogonowski |
| 3,887,006 A | 6/1975 | Pitts |
| 3,893,718 A | 7/1975 | Powell |
| 3,898,163 A | 8/1975 | Mott |
| 3,915,478 A | 10/1975 | Al et al. |
| 3,915,763 A | 10/1975 | Jennings |
| 3,935,910 A | 2/1976 | Gaudy et al. |
| 3,942,824 A | 3/1976 | Sable |
| 3,945,444 A | 3/1976 | Knudson |
| 3,948,321 A | 4/1976 | Owen et al. |
| 3,963,076 A | 6/1976 | Winslow |
| 3,970,336 A | 7/1976 | O'Sickey |
| 3,977,076 A | 8/1976 | Vieira et al. |
| 3,977,473 A | 8/1976 | Page, Jr. |
| 3,989,280 A | 11/1976 | Schwarz |
| 3,997,193 A | 12/1976 | Tsuda et al. |
| 3,999,605 A | 12/1976 | Braddick |
| 4,011,652 A | 3/1977 | Black |

| | | | | | | |
|---|---|---|---|---|---|---|
| 4,018,634 A | 4/1977 | Fencl | | 4,511,289 A | 4/1985 | Herron |
| 4,019,579 A | 4/1977 | Thuse | | 4,513,506 A * | 4/1985 | Vogeleer .................... 33/502 |
| 4,026,583 A | 5/1977 | Gottlieb | | 4,513,995 A | 4/1985 | Niehause et al. |
| 4,047,568 A | 9/1977 | Aulenbacher | | 4,519,456 A | 5/1985 | Cochran |
| 4,053,247 A | 10/1977 | Marsh, Jr. | | 4,521,258 A | 6/1985 | Tamehiro et al. |
| 4,069,573 A | 1/1978 | Rogers, Jr. et al. | | 4,526,232 A | 7/1985 | Hughson et al. |
| 4,076,287 A | 2/1978 | Bill et al. | | 4,526,839 A | 7/1985 | Herman et al. |
| 4,096,913 A | 6/1978 | Kenneday et al. | | 4,527,815 A | 7/1985 | Frick |
| 4,098,334 A | 7/1978 | Crowe | | 4,530,231 A | 7/1985 | Main |
| 4,099,563 A | 7/1978 | Hutchison | | 4,531,552 A | 7/1985 | Kim |
| 4,118,954 A | 10/1978 | Jenkins | | 4,537,429 A | 8/1985 | Landriault |
| 4,125,937 A | 11/1978 | Brown et al. | | 4,538,442 A | 9/1985 | Reed |
| 4,152,821 A | 5/1979 | Scott | | 4,538,840 A | 9/1985 | DeLange |
| 4,168,747 A | 9/1979 | Youmans | | 4,541,655 A | 9/1985 | Hunter |
| 4,190,108 A | 2/1980 | Webber | | 4,550,782 A | 11/1985 | Lawson |
| 4,204,312 A | 5/1980 | Tooker | | 4,550,937 A | 11/1985 | Duret |
| 4,205,422 A | 6/1980 | Hardwick | | 4,553,776 A | 11/1985 | Dodd |
| 4,226,449 A | 10/1980 | Cole | | 4,573,248 A | 3/1986 | Hackett |
| 4,253,687 A | 3/1981 | Maples | | 4,573,540 A | 3/1986 | Dellinger et al. |
| 4,257,155 A | 3/1981 | Hunter | | 4,576,386 A | 3/1986 | Benson et al. |
| 4,274,665 A | 6/1981 | Marsh, Jr. | | 4,581,817 A | 4/1986 | Kelly |
| RE30,802 E | 11/1981 | Rogers, Jr. et al. | | 4,582,348 A | 4/1986 | Deaden et al. |
| 4,304,428 A | 12/1981 | Grigorian et al. | | 4,590,227 A | 5/1986 | Nakamura et al. |
| 4,328,983 A | 5/1982 | Gibson | | 4,590,995 A | 5/1986 | Evans |
| 4,355,664 A | 10/1982 | Cook | | 4,592,577 A | 6/1986 | Ayres |
| 4,358,511 A | 11/1982 | Smith, Jr. et al. | | 4,595,063 A | 6/1986 | Jennings et al. |
| 4,359,889 A | 11/1982 | Kelly | | 4,596,913 A | 6/1986 | Takechi et al. |
| 4,363,358 A | 12/1982 | Ellis | | 4,598,938 A | 7/1986 | Boss et al. |
| 4,366,971 A | 1/1983 | Lula | | 4,601,343 A | 7/1986 | Lindsey, Jr. et al. |
| 4,368,571 A | 1/1983 | Cooper, Jr. | | 4,603,889 A | 8/1986 | Welsh |
| 4,379,471 A | 4/1983 | Kuenzel | | 4,605,063 A | 8/1986 | Ross |
| 4,380,347 A | 4/1983 | Sable | | 4,611,662 A | 9/1986 | Harrington |
| 4,384,625 A | 5/1983 | Roper | | 4,614,233 A | 9/1986 | Menard |
| 4,388,752 A | 6/1983 | Vinciguerra et al. | | 4,627,488 A | 12/1986 | Skarka |
| 4,391,325 A | 7/1983 | Baker et al. | | 4,629,218 A | 12/1986 | Dubois |
| 4,393,931 A | 7/1983 | Muse et al. | | 4,629,224 A | 12/1986 | Landriault |
| 4,396,061 A | 8/1983 | Tamplen et al. | | 4,630,849 A | 12/1986 | Fukui |
| 4,397,484 A | 8/1983 | Miller | | 4,632,944 A | 12/1986 | Thompson |
| 4,401,325 A | 8/1983 | Tsuchiya et al. | | 4,634,317 A | 1/1987 | Skogberg et al. |
| 4,402,372 A | 9/1983 | Cherrington | | 4,635,333 A | 1/1987 | Finch |
| 4,407,681 A | 10/1983 | Ina et al. | | 4,637,436 A | 1/1987 | Stewart, Jr. et al. |
| 4,411,435 A | 10/1983 | McStravick | | 4,646,787 A | 3/1987 | Rush et al. |
| 4,413,395 A | 11/1983 | Garnier | | 4,649,492 A | 3/1987 | Sinha et al. |
| 4,413,682 A | 11/1983 | Callihan et al. | | 4,651,831 A | 3/1987 | Baugh |
| 4,420,866 A | 12/1983 | Mueller | | 4,651,836 A | 3/1987 | Richards |
| 4,421,169 A | 12/1983 | Dearth et al. | | 4,656,779 A | 4/1987 | Fedeli et al. |
| 4,422,317 A | 12/1983 | Mueller | | 4,660,863 A | 4/1987 | Bailey et al. |
| 4,422,507 A | 12/1983 | Reimert | | 4,662,446 A | 5/1987 | Brisco et al. |
| 4,423,889 A | 1/1984 | Weise | | 4,669,541 A | 6/1987 | Bissonnette |
| 4,423,986 A | 1/1984 | Skogberg | | 4,674,572 A | 6/1987 | Gallus |
| 4,424,865 A | 1/1984 | Payton, Jr. | | 4,676,563 A | 6/1987 | Curlett |
| 4,429,741 A | 2/1984 | Hyland | | 4,682,797 A | 7/1987 | Hildner |
| 4,440,233 A | 4/1984 | Baugh et al. | | 4,685,191 A | 8/1987 | Mueller et al. |
| 4,442,586 A | 4/1984 | Ridenour | | 4,685,834 A | 8/1987 | Jordan |
| 4,444,250 A | 4/1984 | Keithahm et al. | | 4,693,498 A | 9/1987 | Baugh et al. |
| 4,449,713 A | 5/1984 | Ishido et al. | | 4,711,474 A | 12/1987 | Patrick |
| 4,458,925 A | 7/1984 | Raulins et al. | | 4,714,117 A | 12/1987 | Dech |
| 4,462,471 A | 7/1984 | Hipp | | 4,730,851 A | 3/1988 | Watts |
| 4,467,630 A | 8/1984 | Kelly | | 4,732,416 A | 3/1988 | Dearden et al. |
| 4,468,309 A | 8/1984 | White | | 4,735,444 A | 4/1988 | Skipper |
| 4,469,356 A | 9/1984 | Duret et al. | | 4,739,654 A | 4/1988 | Pilkington et al. |
| 4,473,245 A | 9/1984 | Raulins et al. | | 4,739,916 A | 4/1988 | Ayres |
| 4,483,399 A | 11/1984 | Colgate | | 4,754,781 A | 7/1988 | Jan de Putter |
| 4,485,847 A | 12/1984 | Wentzell | | 4,758,025 A | 7/1988 | Frick |
| 4,491,001 A | 1/1985 | Yoshida et al. | | 4,762,344 A | 8/1988 | Perkins et al. |
| 4,495,073 A | 1/1985 | Beimgraben | | 4,776,394 A | 10/1988 | Lynde et al. |
| 4,501,327 A | 2/1985 | Retz | | 4,778,088 A | 10/1988 | Miller |
| 4,505,017 A | 3/1985 | Schukei | | 4,779,445 A | 10/1988 | Rabe |
| 4,505,987 A | 3/1985 | Yamada | | 4,793,382 A | 12/1988 | Szalvay |
| 4,506,432 A | 3/1985 | Smith | | 4,796,668 A | 1/1989 | Depret |
| 4,507,019 A | 3/1985 | Thompson | | 4,799,544 A | 1/1989 | Curlett |
| 4,508,129 A | 4/1985 | Brown | | 4,817,710 A | 4/1989 | Edwards et al. |
| 4,508,167 A | 4/1985 | Weinberg et al. | | 4,817,712 A | 4/1989 | Bodine |

| Patent | Date | Inventor |
|---|---|---|
| 4,817,716 A | 4/1989 | Taylor et al. |
| 4,822,081 A | 4/1989 | Blose |
| 4,825,674 A | 5/1989 | Tanaka et al. |
| 4,826,347 A | 5/1989 | Baril et al. |
| 4,827,594 A | 5/1989 | Cartry et al. |
| 4,828,033 A | 5/1989 | Frison |
| 4,830,109 A | 5/1989 | Wedel |
| 4,832,382 A | 5/1989 | Kapgan |
| 4,836,278 A | 6/1989 | Stone et al. |
| 4,836,579 A | 6/1989 | Wester et al. |
| 4,838,349 A | 6/1989 | Berzin |
| 4,842,082 A | 6/1989 | Springer |
| 4,848,459 A | 7/1989 | Blackwell et al. |
| 4,854,338 A | 8/1989 | Grantham |
| 4,856,592 A | 8/1989 | Van Bilderbeek et al. |
| 4,865,127 A | 9/1989 | Koster |
| 4,871,199 A | 10/1989 | Ridenour et al. |
| 4,872,253 A | 10/1989 | Carstensen |
| 4,887,646 A | 12/1989 | Groves |
| 4,888,975 A | 12/1989 | Soward |
| 4,892,337 A | 1/1990 | Gunderson et al. |
| 4,893,658 A | 1/1990 | Kimura et al. |
| 4,904,136 A | 2/1990 | Matsumoto |
| 4,907,828 A | 3/1990 | Chang |
| 4,911,237 A | 3/1990 | Melenyzer |
| 4,913,758 A | 4/1990 | Koster |
| 4,915,177 A | 4/1990 | Claycomb |
| 4,915,426 A | 4/1990 | Skipper |
| 4,917,409 A | 4/1990 | Reeves |
| 4,919,989 A | 4/1990 | Colangelo |
| 4,921,045 A | 5/1990 | Richardson |
| 4,924,949 A | 5/1990 | Curlett |
| 4,930,573 A | 6/1990 | Lane et al. |
| 4,934,038 A | 6/1990 | Caudill |
| 4,934,312 A | 6/1990 | Koster et al. |
| 4,938,291 A | 7/1990 | Lynde et al. |
| 4,941,512 A | 7/1990 | McParland |
| 4,941,532 A | 7/1990 | Hurt et al. |
| 4,942,925 A | 7/1990 | Themig |
| 4,942,926 A | 7/1990 | Lessi |
| 4,949,745 A | 8/1990 | McKeon |
| 4,958,691 A | 9/1990 | Hipp |
| 4,968,184 A | 11/1990 | Reid |
| 4,971,152 A | 11/1990 | Koster et al. |
| 4,976,322 A | 12/1990 | Abdrakhmanov et al. |
| 4,981,250 A | 1/1991 | Persson |
| 4,995,464 A | 2/1991 | Watkins et al. |
| 5,014,779 A | 5/1991 | Meling et al. |
| 5,015,017 A | 5/1991 | Geary |
| 5,026,074 A | 6/1991 | Hoes et al. |
| 5,031,370 A | 7/1991 | Jewett |
| 5,031,699 A | 7/1991 | Artynov et al. |
| 5,040,283 A | 8/1991 | Pelgrom |
| 5,044,676 A | 9/1991 | Burton et al. |
| 5,048,871 A | 9/1991 | Pfeiffer et al. |
| 5,052,483 A | 10/1991 | Hudson |
| 5,059,043 A | 10/1991 | Kuhne |
| 5,064,004 A | 11/1991 | Lundell |
| 5,074,355 A | 12/1991 | Lennon |
| 5,079,837 A | 1/1992 | Vanselow |
| 5,083,608 A | 1/1992 | Abdrakhmanov et al. |
| 5,093,015 A | 3/1992 | Oldiges |
| 5,095,991 A | 3/1992 | Milberger |
| 5,097,710 A | 3/1992 | Palynchuk |
| 5,101,653 A | 4/1992 | Hermes et al. |
| 5,105,888 A | 4/1992 | Pollock et al. |
| 5,107,221 A | 4/1992 | N'Guyen et al. |
| 5,119,661 A | 6/1992 | Abdrakhmanov et al. |
| 5,134,891 A | 8/1992 | Canevet et al. |
| 5,150,755 A | 9/1992 | Cassel et al. |
| 5,156,043 A | 10/1992 | Ose |
| 5,156,213 A | 10/1992 | George et al. |
| 5,156,223 A | 10/1992 | Hipp |
| 5,174,340 A | 12/1992 | Peterson et al. |
| 5,174,376 A | 12/1992 | Singeetham |
| 5,181,571 A | 1/1993 | Mueller et al. |
| 5,195,583 A | 3/1993 | Toon et al. |
| 5,197,553 A | 3/1993 | Leturno |
| 5,209,600 A | 5/1993 | Koster |
| 5,226,492 A | 7/1993 | Solaeche et al. |
| 5,242,017 A | 9/1993 | Hailey |
| 5,249,628 A | 10/1993 | Surjaatmadia |
| 5,253,713 A | 10/1993 | Gregg et al. |
| RE34,467 E | 12/1993 | Reeves |
| 5,273,075 A | 12/1993 | Skaer |
| 5,275,242 A | 1/1994 | Payne |
| 5,282,508 A | 2/1994 | Ellingsen et al. |
| 5,286,393 A | 2/1994 | Oldiges et al. |
| 5,297,629 A | 3/1994 | Barrington et al. |
| 5,306,101 A | 4/1994 | Rockower et al. |
| 5,309,621 A | 5/1994 | O'Donnell et al. |
| 5,314,014 A | 5/1994 | Tucker |
| 5,314,209 A | 5/1994 | Kuhne |
| 5,318,122 A | 6/1994 | Murray et al. |
| 5,318,131 A | 6/1994 | Baker |
| 5,325,923 A | 7/1994 | Surjaatmadja et al. |
| 5,326,137 A | 7/1994 | Lorenz et al. |
| 5,327,964 A | 7/1994 | O'Donnell et al. |
| 5,330,850 A | 7/1994 | Suzuki et al. |
| 5,332,038 A | 7/1994 | Tapp et al. |
| 5,332,049 A | 7/1994 | Tew |
| 5,333,692 A | 8/1994 | Baugh et al. |
| 5,335,736 A | 8/1994 | Windsor |
| 5,337,808 A | 8/1994 | Graham |
| 5,337,823 A | 8/1994 | Nobileau |
| 5,337,827 A | 8/1994 | Hromas et al. |
| 5,339,894 A | 8/1994 | Stotler |
| 5,343,949 A | 9/1994 | Ross et al. |
| 5,346,007 A | 9/1994 | Dillon |
| 5,348,087 A | 9/1994 | Williamson, Jr. |
| 5,348,093 A | 9/1994 | Wood et al. |
| 5,348,095 A | 9/1994 | Worrall et al. |
| 5,348,668 A | 9/1994 | Oldiges et al. |
| 5,351,752 A | 10/1994 | Wood et al. |
| 5,360,239 A | 11/1994 | Klementich |
| 5,360,292 A | 11/1994 | Allen et al. |
| 5,361,836 A | 11/1994 | Sorem et al. |
| 5,361,843 A | 11/1994 | Shy et al. |
| 5,366,010 A | 11/1994 | Zwart |
| 5,366,012 A | 11/1994 | Lohbeck |
| 5,368,075 A | 11/1994 | Baro et al. |
| 5,370,425 A | 12/1994 | Dougherty et al. |
| 5,375,661 A | 12/1994 | Daneshy et al. |
| 5,388,648 A | 2/1995 | Jordan, Jr. |
| 5,390,735 A | 2/1995 | Williamson, Jr. |
| 5,390,742 A | 2/1995 | Dines et al. |
| 5,396,957 A | 3/1995 | Surjaatmadja et al. |
| 5,400,827 A | 3/1995 | Baro et al. |
| 5,405,171 A | 4/1995 | Allen et al. |
| 5,411,301 A | 5/1995 | Moyer et al. |
| 5,413,180 A | 5/1995 | Ross et al. |
| 5,419,595 A | 5/1995 | Yamamoto et al. |
| 5,425,559 A | 6/1995 | Nobileau |
| 5,426,130 A | 6/1995 | Thurber et al. |
| 5,431,831 A | 7/1995 | Vincent |
| 5,435,395 A | 7/1995 | Connell |
| 5,439,320 A | 8/1995 | Abrams |
| 5,443,129 A | 8/1995 | Bailey et al. |
| 5,447,201 A | 9/1995 | Mohn |
| 5,454,419 A | 10/1995 | Vloedman |
| 5,456,319 A | 10/1995 | Schmidt et al. |
| 5,458,194 A | 10/1995 | Brooks |
| 5,462,120 A | 10/1995 | Gondouin |
| 5,467,822 A | 11/1995 | Zwart |
| 5,472,055 A | 12/1995 | Simson et al. |
| 5,474,334 A | 12/1995 | Eppink |

| | | | | | |
|---|---|---|---|---|---|
| 5,492,173 A | 2/1996 | Kilgore et al. | 5,985,053 A | 11/1999 | Hara |
| 5,494,106 A | 2/1996 | Gueguen et al. | 6,009,611 A | 1/2000 | Adams et al. |
| 5,498,809 A | 3/1996 | Emert et al. | 6,012,521 A | 1/2000 | Zunkel et al. |
| 5,507,343 A | 4/1996 | Carlton et al. | 6,012,522 A | 1/2000 | Donnelly et al. |
| 5,511,620 A | 4/1996 | Baugh et al. | 6,012,523 A | 1/2000 | Campbell et al. |
| 5,513,703 A | 5/1996 | Mills et al. | 6,012,874 A | 1/2000 | Groneck et al. |
| 5,524,937 A | 6/1996 | Sides, III et al. | 6,013,724 A | 1/2000 | Mizutani |
| 5,535,824 A | 7/1996 | Hudson | 6,015,012 A | 1/2000 | Reddick |
| 5,536,422 A | 7/1996 | Oldiges et al. | 6,017,168 A | 1/2000 | Fraser, Jr. et al. |
| 5,540,281 A | 7/1996 | Round | 6,021,850 A | 2/2000 | Wood et al. |
| 5,554,244 A | 9/1996 | Ruggles et al. | 6,024,181 A | 2/2000 | Richardson et al. |
| 5,566,772 A | 10/1996 | Coone et al. | 6,027,145 A | 2/2000 | Tsuru et al. |
| 5,567,335 A | 10/1996 | Baessler et al. | 6,029,748 A | 2/2000 | Forsyth et al. |
| 5,576,485 A | 11/1996 | Serata | 6,035,954 A | 3/2000 | Hipp |
| 5,584,512 A | 12/1996 | Carstensen | 6,044,906 A | 4/2000 | Saltel |
| 5,606,792 A | 3/1997 | Schafer | 6,047,505 A | 4/2000 | Willow |
| 5,611,399 A | 3/1997 | Richard et al. | 6,047,774 A | 4/2000 | Allen |
| 5,613,557 A | 3/1997 | Blount et al. | 6,050,341 A | 4/2000 | Metcalf |
| 5,617,918 A | 4/1997 | Cooksey et al. | 6,050,346 A | 4/2000 | Hipp |
| 5,642,560 A | 7/1997 | Tabuchi et al. | 6,056,059 A | 5/2000 | Ohmer |
| 5,642,781 A | 7/1997 | Richard | 6,056,324 A | 5/2000 | Reimert et al. |
| 5,662,180 A | 9/1997 | Coffman et al. | 6,062,324 A | 5/2000 | Hipp |
| 5,664,327 A | 9/1997 | Swars | 6,065,500 A | 5/2000 | Metcalfe |
| 5,667,011 A | 9/1997 | Gill et al. | 6,070,671 A | 6/2000 | Cumming et al. |
| 5,667,252 A | 9/1997 | Schafer et al. | 6,073,332 A | 6/2000 | Turner |
| 5,678,609 A | 10/1997 | Washburn | 6,073,692 A | 6/2000 | Wood et al. |
| 5,685,369 A | 11/1997 | Ellis et al. | 6,073,698 A | 6/2000 | Schultz et al. |
| 5,689,871 A | 11/1997 | Carstensen | 6,074,133 A | 6/2000 | Kelsey |
| 5,695,008 A | 12/1997 | Bertet et al. | 6,078,031 A | 6/2000 | Bliault et al. |
| 5,695,009 A | 12/1997 | Hipp | 6,079,495 A | 6/2000 | Ohmer |
| 5,697,442 A | 12/1997 | Baldridge | 6,085,838 A | 7/2000 | Vercaemer et al. |
| 5,697,449 A | 12/1997 | Henning et al. | 6,089,320 A | 7/2000 | LaGrange |
| 5,718,288 A | 2/1998 | Bertet et al. | 6,098,717 A | 8/2000 | Bailey et al. |
| 5,738,146 A | 4/1998 | Abe | 6,102,119 A | 8/2000 | Raines |
| 5,743,335 A | 4/1998 | Bussear | 6,109,355 A | 8/2000 | Reid |
| 5,749,419 A | 5/1998 | Coronado et al. | 6,112,818 A | 9/2000 | Campbell |
| 5,749,585 A | 5/1998 | Lembcke | 6,131,265 A | 10/2000 | Bird |
| 5,755,895 A | 5/1998 | Tamehiro et al. | 6,135,208 A | 10/2000 | Gano et al. |
| 5,775,422 A | 7/1998 | Wong et al. | 6,138,761 A | 10/2000 | Freeman et al. |
| 5,785,120 A | 7/1998 | Smalley et al. | 6,142,230 A | 11/2000 | Smalley et al. |
| 5,787,933 A | 8/1998 | Russ et al. | 6,148,915 A | 11/2000 | Mullen |
| 5,791,409 A | 8/1998 | Flanders | 6,155,613 A | 12/2000 | Quadflieg et al. |
| 5,791,419 A | 8/1998 | Valisalo | 6,158,785 A | 12/2000 | Beaulier et al. |
| 5,794,702 A | 8/1998 | Nobileau | 6,158,963 A | 12/2000 | Hollis et al. |
| 5,797,454 A | 8/1998 | Hipp | 6,167,970 B1 | 1/2001 | Stout |
| 5,829,520 A | 11/1998 | Johnson | 6,182,775 B1 | 2/2001 | Hipp |
| 5,829,524 A | 11/1998 | Flanders et al. | 6,183,013 B1 | 2/2001 | MacKenzie et al. |
| 5,829,797 A | 11/1998 | Yamamoto et al. | 6,183,573 B1 | 2/2001 | Fujiwara et al. |
| 5,833,001 A | 11/1998 | Song et al. | 6,189,616 B1 | 2/2001 | Gano et al. |
| 5,845,945 A | 12/1998 | Carstensen | 6,196,336 B1 | 3/2001 | Fincher et al. |
| 5,849,188 A | 12/1998 | Voll et al. | 6,216,509 B1 | 4/2001 | Lotspaih et al. |
| 5,857,524 A | 1/1999 | Harris et al. | 6,220,306 B1 | 4/2001 | Omura et al. |
| 5,862,866 A | 1/1999 | Springer | 6,226,855 B1 | 5/2001 | Maine |
| 5,875,851 A | 3/1999 | Vick, Jr. et al. | 6,231,086 B1 | 5/2001 | Tierling |
| 5,885,941 A | 3/1999 | Sateva et al. | 6,237,967 B1 | 5/2001 | Yamamoto et al. |
| 5,895,079 A | 4/1999 | Carstensen et al. | 6,250,385 B1 | 6/2001 | Montaron |
| 5,901,594 A | 5/1999 | Wasson | 6,253,846 B1 | 7/2001 | Nazzai et al. |
| 5,901,789 A | 5/1999 | Donnelly et al. | 6,253,850 B1 | 7/2001 | Nazzai et al. |
| 5,918,677 A | 7/1999 | Head | 6,263,966 B1 | 7/2001 | Haut et al. |
| 5,924,745 A | 7/1999 | Campbell | 6,263,968 B1 | 7/2001 | Freeman et al. |
| 5,931,511 A | 8/1999 | DeLange et al. | 6,263,972 B1 | 7/2001 | Richardson et al. |
| 5,933,945 A | 8/1999 | Thomeer et al. | 6,267,181 B1 | 7/2001 | Rhein-Knudsen et al. |
| 5,944,100 A | 8/1999 | Hipp | 6,273,634 B1 | 8/2001 | Lohbeck |
| 5,944,107 A | 8/1999 | Ohmer | 6,275,556 B1 | 8/2001 | Kinney et al. |
| 5,944,108 A | 8/1999 | Baugh et al. | 6,283,211 B1 | 9/2001 | Vloedman |
| 5,951,207 A | 9/1999 | Chen | 6,286,558 B1 | 9/2001 | Quigley et al. |
| 5,957,195 A | 9/1999 | Bailey et al. | 6,286,614 B1 | 9/2001 | Gano et al. |
| 5,964,288 A | 10/1999 | Leighton et al. | 6,302,211 B1 | 10/2001 | Nelson et al. |
| 5,971,443 A | 10/1999 | Noel et al. | 6,311,792 B1 | 11/2001 | Scott et al. |
| 5,975,587 A | 11/1999 | Wood et al. | 6,315,040 B1 | 11/2001 | Donnelly |
| 5,979,560 A | 11/1999 | Nobileau | 6,315,043 B1 | 11/2001 | Farrant et al. |
| 5,984,369 A | 11/1999 | Crook et al. | 6,318,457 B1 | 11/2001 | Den Boer et al. |
| 5,984,568 A | 11/1999 | Lohbeck et al. | 6,318,465 B1 | 11/2001 | Coon et al. |

| Patent | Date | Inventor |
|---|---|---|
| 6,322,109 B1 | 11/2001 | Campbell et al. |
| 6,325,148 B1 | 12/2001 | Trahan et al. |
| 6,328,113 B1 | 12/2001 | Cook |
| 6,334,351 B1 | 1/2002 | Tsuchiya |
| 6,343,495 B1 | 2/2002 | Cheppe et al. |
| 6,343,657 B1 | 2/2002 | Baugh et al. |
| 6,345,373 B1 | 2/2002 | Chakradhar et al. |
| 6,345,431 B1 | 2/2002 | Greig |
| 6,349,521 B1 | 2/2002 | McKeon et al. |
| 6,352,112 B1 | 3/2002 | Mills |
| 6,354,373 B1 | 3/2002 | Vercaemer et al. |
| 6,357,485 B2 | 3/2002 | Quigley |
| 6,390,720 B1 | 5/2002 | LeBegue et al. |
| 6,405,761 B1 | 6/2002 | Shimizu et al. |
| 6,406,063 B1 | 6/2002 | Pfeiffer |
| 6,409,175 B1 | 6/2002 | Evans et al. |
| 6,419,025 B1 | 7/2002 | Lohbeck |
| 6,419,026 B1 | 7/2002 | MacKenzie et al. |
| 6,419,033 B1 | 7/2002 | Hahn et al. |
| 6,419,147 B1 | 7/2002 | Daniel |
| 6,425,444 B1 | 7/2002 | Metcalfe et al. |
| 6,431,277 B1 | 8/2002 | Cox |
| 6,443,247 B1 | 9/2002 | Wardley |
| 6,446,323 B1 | 9/2002 | Metcalfe et al. |
| 6,446,724 B2 | 9/2002 | Baugh et al. |
| 6,447,025 B1 | 9/2002 | Smith |
| 6,450,261 B1 | 9/2002 | Baugh |
| 6,454,013 B1 | 9/2002 | Metcalfe |
| 6,454,024 B1 | 9/2002 | Nackerud |
| 6,457,532 B1 | 10/2002 | Simpson |
| 6,457,533 B1 | 10/2002 | Metcalfe |
| 6,457,749 B1 | 10/2002 | Heijnen |
| 6,460,615 B1 | 10/2002 | Heijnen |
| 6,461,999 B1 | 10/2002 | Fanta |
| 6,464,008 B1 | 10/2002 | Roddy et al. |
| 6,464,014 B1 | 10/2002 | Bernat |
| 6,470,966 B2 | 10/2002 | Cook et al. |
| 6,470,996 B1 | 10/2002 | Kyle et al. |
| 6,478,091 B1 | 11/2002 | Gano |
| 6,478,092 B2 | 11/2002 | Voil et al. |
| 6,491,108 B1 | 12/2002 | Slup |
| 6,497,289 B1 | 12/2002 | Cook et al. |
| 6,513,243 B1 | 2/2003 | Bignucolo et al. |
| 6,516,887 B2 | 2/2003 | Nguyen et al. |
| 6,517,126 B1 | 2/2003 | Peterson et al. |
| 6,527,049 B2 | 3/2003 | Metcalfe et al. |
| 6,543,545 B1 | 4/2003 | Chatterji et al. |
| 6,543,552 B1 | 4/2003 | Metcalfe et al. |
| 6,550,539 B2 | 4/2003 | Maguire et al. |
| 6,550,821 B2 | 4/2003 | DeLange et al. |
| 6,557,460 B2 | 5/2003 | Hester |
| 6,557,640 B1 | 5/2003 | Cook et al. |
| 6,557,906 B1 | 5/2003 | Carcagno |
| 6,561,227 B2 | 5/2003 | Cook et al. |
| 6,561,279 B2 | 5/2003 | MacKenzie et al. |
| 6,564,875 B1 | 5/2003 | Bullock |
| 6,568,471 B1 | 5/2003 | Cook et al. |
| 6,568,488 B2 | 5/2003 | Wentworth et al. |
| 6,575,240 B1 | 6/2003 | Haut et al. |
| 6,578,630 B2 | 6/2003 | Simpson et al. |
| 6,585,053 B2 | 7/2003 | Coon |
| 6,585,299 B1 | 7/2003 | Quadflieg et al. |
| 6,591,905 B2 | 7/2003 | Coon |
| 6,598,677 B1 | 7/2003 | Baugh et al. |
| 6,598,678 B1 | 7/2003 | Simpson et al. |
| 6,604,763 B1 | 8/2003 | Cook et al. |
| 6,607,220 B2 | 8/2003 | Silvey, IV |
| 6,609,735 B1 | 8/2003 | DeLange |
| 6,619,696 B2 | 9/2003 | Baugh et al. |
| 6,622,797 B2 | 9/2003 | Sivley, IV |
| 6,629,567 B2 | 10/2003 | Lauritzen et al. |
| 6,631,759 B2 | 10/2003 | Cook et al. |
| 6,631,760 B2 | 10/2003 | Cook et al. |
| 6,631,765 B2 | 10/2003 | Baugh et al. |
| 6,631,769 B2 | 10/2003 | Cook et al. |
| 6,634,431 B2 | 10/2003 | Cook et al. |
| 6,640,895 B2 | 11/2003 | Murray |
| 6,640,903 B1 | 11/2003 | Cook et al. |
| 6,648,075 B2 | 11/2003 | Badrak et al. |
| 6,659,509 B2 | 12/2003 | Goto et al. |
| 6,662,876 B2 | 12/2003 | Lauritzen |
| 6,668,930 B2 | 12/2003 | Hoffman |
| 6,668,937 B1 | 12/2003 | Murray |
| 6,672,759 B2 | 1/2004 | Feger |
| 6,679,328 B2 | 1/2004 | Davis et al. |
| 6,681,862 B2 | 1/2004 | Freeman |
| 6,684,947 B2 | 2/2004 | Cook et al. |
| 6,688,397 B2 | 2/2004 | McClurkin et al. |
| 6,695,012 B1 | 2/2004 | Ring et al. |
| 6,695,065 B2 | 2/2004 | Simpson |
| 6,698,517 B2 | 3/2004 | Simpson |
| 6,701,598 B2 | 3/2004 | Chen et al. |
| 6,702,030 B2 | 3/2004 | Simpson |
| 6,705,395 B2 | 3/2004 | Cook et al. |
| 6,708,767 B2 | 3/2004 | Harrall et al. |
| 6,712,154 B2 | 3/2004 | Cook et al. |
| 6,712,401 B2 | 3/2004 | Coulon et al. |
| 6,719,064 B2 | 4/2004 | Price-Smith et al. |
| 6,722,427 B2 | 4/2004 | Gano et al. |
| 6,722,437 B2 | 4/2004 | Vercaemer et al. |
| 6,722,443 B1 | 4/2004 | Metcalfe |
| 6,723,683 B2 | 4/2004 | Crossman |
| 6,725,917 B2 | 4/2004 | Metcalfe |
| 6,725,919 B2 | 4/2004 | Cook et al. |
| 6,725,934 B2 | 4/2004 | Coronado et al. |
| 6,725,939 B2 | 4/2004 | Richard |
| 6,732,806 B2 | 5/2004 | Mauldin et al. |
| 6,739,392 B2 | 5/2004 | Cook et al. |
| 6,745,845 B2 | 6/2004 | Cook et al. |
| 6,749,954 B2 | 6/2004 | Toyooka |
| 6,755,447 B2 | 6/2004 | Galle, Jr. et al. |
| 6,758,278 B2 | 7/2004 | Cook et al. |
| 6,772,841 B2 | 8/2004 | Gano |
| 6,796,380 B2 | 9/2004 | Xu |
| 6,814,147 B2 | 11/2004 | Baugh |
| 6,817,633 B2 | 11/2004 | Brill et al. |
| 6,820,690 B2 | 11/2004 | Vercaemer et al. |
| 6,823,937 B1 | 11/2004 | Cook et al. |
| 6,826,937 B2 | 12/2004 | Su |
| 6,832,649 B2 | 12/2004 | Bode et al. |
| 6,834,725 B2 | 12/2004 | Whanger et al. |
| 6,843,322 B2 | 1/2005 | Burtner |
| 6,857,473 B2 | 2/2005 | Cook et al. |
| 6,880,632 B2 | 4/2005 | Tom et al. |
| 6,892,819 B2 | 5/2005 | Cook et al. |
| 6,902,000 B2 | 6/2005 | Simpson |
| 6,907,652 B1 | 6/2005 | Heijnen |
| 6,923,261 B2 | 8/2005 | Metcalfe et al. |
| 6,935,429 B2 | 8/2005 | Badrak |
| 6,935,430 B2 | 8/2005 | Harrall et al. |
| 6,966,370 B2 | 11/2005 | Cook et al. |
| 6,968,618 B2 | 11/2005 | Cook et al. |
| 6,976,539 B2 | 12/2005 | Metcalfe et al. |
| 6,976,541 B2 | 12/2005 | Brisco et al. |
| 7,000,953 B2 | 2/2006 | Berghaus |
| 7,007,760 B2 | 3/2006 | Lohbeck |
| 7,011,161 B2 | 3/2006 | Ring et al. |
| 7,021,390 B2 | 4/2006 | Cook et al. |
| 7,036,582 B2 | 5/2006 | Cook et al. |
| 7,040,396 B2 | 5/2006 | Cook et al. |
| 7,044,218 B2 | 5/2006 | Cook et al. |
| 7,044,221 B2 | 5/2006 | Cook et al. |
| 7,048,062 B2 | 5/2006 | Ring et al. |
| 7,048,067 B1 | 5/2006 | Cook et al. |
| 7,055,608 B2 | 6/2006 | Cook et al. |
| 7,063,142 B2 | 6/2006 | Cook et al. |

| Patent Number | Date | Name | | Patent Number | Date | Name |
|---|---|---|---|---|---|---|
| 7,066,284 B2 | 6/2006 | Wylie et al. | | 2003/0094277 A1 | 5/2003 | Cook et al. |
| 7,077,211 B2 | 7/2006 | Cook et al. | | 2003/0094278 A1 | 5/2003 | Cook et al. |
| 7,077,213 B2 | 7/2006 | Cook et al. | | 2003/0094279 A1 | 5/2003 | Ring et al. |
| 7,086,475 B2 | 8/2006 | Cook | | 2003/0098154 A1 | 5/2003 | Cook et al. |
| 7,100,684 B2 | 9/2006 | Cook et al. | | 2003/0098162 A1 | 5/2003 | Cook |
| 7,100,685 B2 | 9/2006 | Cook et al. | | 2003/0107217 A1 | 6/2003 | Daigle et al. |
| 7,108,061 B2 | 9/2006 | Cook et al. | | 2003/0111234 A1 | 6/2003 | McClurkin et al. |
| 7,108,072 B2 | 9/2006 | Cook et al. | | 2003/0116318 A1 | 6/2003 | Metcalfe |
| 7,114,559 B2 | 10/2006 | Sonnier et al. | | 2003/0116325 A1 | 6/2003 | Cook et al. |
| 7,121,337 B2 | 10/2006 | Cook et al. | | 2003/0121558 A1 | 7/2003 | Cook et al. |
| 7,121,352 B2 | 10/2006 | Cook et al. | | 2003/0121655 A1 | 7/2003 | Lauritzen et al. |
| 7,124,821 B2 | 10/2006 | Metcalfe et al. | | 2003/0121669 A1 | 7/2003 | Cook et al. |
| 7,124,823 B2 | 10/2006 | Oosterling | | 2003/0140673 A1 | 7/2003 | Marr et al. |
| 7,124,826 B2 | 10/2006 | Simpson | | 2003/0150608 A1 | 8/2003 | Smith et al. |
| 7,146,702 B2 | 12/2006 | Cook et al. | | 2003/0159764 A1 | 8/2003 | Goto |
| 7,147,053 B2 | 12/2006 | Cook et al. | | 2003/0168222 A1 | 9/2003 | Maguire et al. |
| 7,159,665 B2 | 1/2007 | Cook et al. | | 2003/0173090 A1 | 9/2003 | Cook et al. |
| 7,159,667 B2 | 1/2007 | Cook et al. | | 2003/0192705 A1 | 10/2003 | Cook et al. |
| 7,164,964 B2 | 1/2007 | Stacklies | | 2003/0221841 A1 | 12/2003 | Burtner et al. |
| 7,168,496 B2 | 1/2007 | Cook et al. | | 2003/0222455 A1 | 12/2003 | Cook et al. |
| 7,168,499 B2 | 1/2007 | Cook et al. | | 2004/0011534 A1 | 1/2004 | Simonds et al. |
| 7,172,019 B2 | 2/2007 | Cook et al. | | 2004/0045616 A1 | 3/2004 | Cook et al. |
| 7,172,021 B2 | 2/2007 | Brisco et al. | | 2004/0045646 A1 | 3/2004 | Cook et al. |
| 7,172,024 B2 | 2/2007 | Cook et al. | | 2004/0045718 A1 | 3/2004 | Brisco et al. |
| 7,174,964 B2 | 2/2007 | Cook et al. | | 2004/0060706 A1 | 4/2004 | Stephenson |
| 7,185,710 B2 | 3/2007 | Cook et al. | | 2004/0065446 A1* | 4/2004 | Tran et al. .................. 166/384 |
| 7,191,841 B2 | 3/2007 | Sivley, IV | | 2004/0069499 A1 | 4/2004 | Cook et al. |
| 7,225,879 B2 | 6/2007 | Wylie et al. | | 2004/0112589 A1 | 6/2004 | Cook et al. |
| 7,231,985 B2 | 6/2007 | Cook et al. | | 2004/0112606 A1 | 6/2004 | Lewis et al. |
| 7,234,531 B2 | 6/2007 | Kendziora | | 2004/0118574 A1 | 6/2004 | Cook et al. |
| 7,234,968 B2 | 6/2007 | Lottmann et al. | | 2004/0123983 A1 | 7/2004 | Cook et al. |
| 7,240,728 B2 | 7/2007 | Cook et al. | | 2004/0123988 A1 | 7/2004 | Cook et al. |
| 7,240,729 B2 | 7/2007 | Cook et al. | | 2004/0129431 A1 | 7/2004 | Jackson |
| 2001/0002626 A1 | 6/2001 | Frank et al. | | 2004/0159446 A1 | 8/2004 | Haugen et al. |
| 2001/0018354 A1 | 8/2001 | Pigni | | 2004/0174017 A1 | 9/2004 | Brill et al. |
| 2001/0020532 A1 | 9/2001 | Naugh et al. | | 2004/0188099 A1 | 9/2004 | Cook et al. |
| 2001/0045284 A1 | 11/2001 | Simpson et al. | | 2004/0194278 A1 | 10/2004 | Brill et al. |
| 2001/0045289 A1 | 11/2001 | Cook et al. | | 2004/0194966 A1 | 10/2004 | Zimmerman |
| 2001/0047870 A1 | 12/2001 | Cook et al. | | 2004/0216506 A1 | 11/2004 | Simpson et al. |
| 2002/0011339 A1 | 1/2002 | Murray | | 2004/0216873 A1 | 11/2004 | Frost, Jr. et al. |
| 2002/0014339 A1 | 2/2002 | Ross | | 2004/0221996 A1 | 11/2004 | Burge |
| 2002/0020524 A1 | 2/2002 | Gano | | 2004/0228679 A1 | 11/2004 | Reavis et al. |
| 2002/0020531 A1 | 2/2002 | Ohmer | | 2004/0231839 A1 | 11/2004 | Ellington et al. |
| 2002/0033261 A1 | 3/2002 | Metcalfe | | 2004/0231843 A1 | 11/2004 | Simpson |
| 2002/0060068 A1 | 5/2002 | Cook et al. | | 2004/0231855 A1 | 11/2004 | Cook et al. |
| 2002/0062956 A1 | 5/2002 | Murray et al. | | 2004/0238181 A1 | 12/2004 | Cook et al. |
| 2002/0066576 A1 | 6/2002 | Cook et al. | | 2004/0244968 A1 | 12/2004 | Cook et al. |
| 2002/0066578 A1 | 6/2002 | Broome | | 2004/0251034 A1 | 12/2004 | Kendziora et al. |
| 2002/0070023 A1 | 6/2002 | Turner et al. | | 2004/0262014 A1 | 12/2004 | Cook et al. |
| 2002/0070031 A1 | 6/2002 | Voll et al. | | 2005/0011641 A1 | 1/2005 | Cook et al. |
| 2002/0079101 A1 | 6/2002 | Baugh et al. | | 2005/0015963 A1 | 1/2005 | Costa et al. |
| 2002/0084070 A1 | 7/2002 | Voll et al. | | 2005/0028988 A1 | 2/2005 | Cook et al. |
| 2002/0092654 A1 | 7/2002 | Coronado et al. | | 2005/0039910 A1 | 2/2005 | Lohbeck |
| 2002/0108756 A1 | 8/2002 | Harrall et al. | | 2005/0039927 A1* | 2/2005 | Wetzel et al. ............... 166/384 |
| 2002/0139540 A1 | 10/2002 | Lauritzen | | 2005/0039928 A1 | 2/2005 | Cook et al. |
| 2002/0144822 A1 | 10/2002 | Hackworth et al. | | 2005/0045324 A1 | 3/2005 | Cook et al. |
| 2002/0148612 A1 | 10/2002 | Cook et al. | | 2005/0045341 A1 | 3/2005 | Cook et al. |
| 2002/0185274 A1 | 12/2002 | Simpson et al. | | 2005/0045342 A1 | 3/2005 | Luke et al. |
| 2002/0189816 A1 | 12/2002 | Cook et al. | | 2005/0056433 A1 | 3/2005 | Ring et al. |
| 2002/0195252 A1 | 12/2002 | Maguire et al. | | 2005/0056434 A1 | 3/2005 | Watson et al. |
| 2002/0195256 A1 | 12/2002 | Metcalfe et al. | | 2005/0077051 A1 | 4/2005 | Cook et al. |
| 2003/0024708 A1 | 2/2003 | Ring et al. | | 2005/0081358 A1 | 4/2005 | Cook et al. |
| 2003/0024711 A1 | 2/2003 | Simpson et al. | | 2005/0087337 A1 | 4/2005 | Brisco et al. |
| 2003/0034177 A1 | 2/2003 | Chitwood et al. | | 2005/0098323 A1 | 5/2005 | Cook et al. |
| 2003/0042022 A1 | 3/2003 | Lauritzen et al. | | 2005/0103502 A1 | 5/2005 | Watson et al. |
| 2003/0047322 A1 | 3/2003 | Maguire et al. | | 2005/0123639 A1 | 6/2005 | Ring et al. |
| 2003/0047323 A1 | 3/2003 | Jackson et al. | | 2005/0133225 A1 | 6/2005 | Oosterling |
| 2003/0056991 A1 | 3/2003 | Hahn et al. | | 2005/0138790 A1 | 6/2005 | Cook et al. |
| 2003/0066655 A1 | 4/2003 | Cook et al. | | 2005/0144771 A1 | 7/2005 | Cook et al. |
| 2003/0067166 A1 | 4/2003 | Sivley, IV | | 2005/0144772 A1 | 7/2005 | Cook et al. |
| 2003/0075337 A1 | 4/2003 | Maguire | | 2005/0144777 A1 | 7/2005 | Cook et al. |
| 2003/0075338 A1 | 4/2003 | Sivley, IV | | 2005/0150098 A1 | 7/2005 | Cook et al. |
| 2003/0075339 A1 | 4/2003 | Gano et al. | | 2005/0150660 A1 | 7/2005 | Cook et al. |

| Publication No. | Date | Inventor | Country | Number | Date |
|---|---|---|---|---|---|
| 2005/0161228 A1 | 7/2005 | Cook et al. | CA | 2298139 | 8/2000 |
| 2005/0166387 A1 | 8/2005 | Cook et al. | CA | 2414449 | 2/2002 |
| 2005/0166388 A1 | 8/2005 | Cook et al. | CA | 2419806 | 4/2002 |
| 2005/0172473 A1 | 8/2005 | Cook et al. | CA | 2453034 | 1/2003 |
| 2005/0173108 A1 | 8/2005 | Cook | CA | 2234386 | 3/2003 |
| 2005/0183863 A1 | 8/2005 | Cook et al. | CA | 2398001 | 4/2003 |
| 2005/0205253 A1 | 9/2005 | Cook et al. | CA | 2466685 | 3/2004 |
| 2005/0217768 A1 | 10/2005 | Asahi et al. | CA | 2444756 A1 | 4/2004 |
| 2005/0217865 A1 | 10/2005 | Ring | CA | 2249139 | 1/2007 |
| 2005/0217866 A1 | 10/2005 | Watson et al. | DE | 174521 | 9/1952 |
| 2005/0223535 A1 | 10/2005 | Cook et al. | DE | 2458188 | 6/1975 |
| 2005/0224225 A1 | 10/2005 | Cook et al. | DE | 203767 | 11/1983 |
| 2005/0230102 A1 | 10/2005 | Cook et al. | DE | 278517 A1 | 5/1990 |
| 2005/0230103 A1 | 10/2005 | Cook et al. | EP | 0084940 A1 | 8/1983 |
| 2005/0230104 A1 | 10/2005 | Cook et al. | EP | 0272511 A | 6/1988 |
| 2005/0230123 A1 | 10/2005 | Waddell et al. | EP | 0294264 A1 | 12/1988 |
| 2005/0236159 A1 | 10/2005 | Costa et al. | EP | 0553566 A1 | 8/1993 |
| 2005/0236163 A1 | 10/2005 | Cook et al. | EP | 620289 A1 | 10/1994 |
| 2005/0244578 A1 | 11/2005 | Van Egmond et al. | EP | 0633391 A2 | 1/1995 |
| 2005/0246883 A1 | 11/2005 | Alliot et al. | EP | 0713953 B1 | 11/1995 |
| 2005/0247453 A1 | 11/2005 | Shuster et al. | EP | 0823534 A1 | 2/1998 |
| 2005/0265788 A1 | 12/2005 | Renkema | EP | 0881354 A2 | 12/1998 |
| 2005/0269107 A1 | 12/2005 | Cook et al. | EP | 0881359 A1 | 12/1998 |
| 2006/0027371 A1 | 2/2006 | Gorrara | EP | 0899420 A1 | 3/1999 |
| 2006/0032640 A1 | 2/2006 | Costa et al. | EP | 0937861 A2 | 6/1999 |
| 2006/0048948 A1 | 3/2006 | Noel | EP | 0952305 A1 | 10/1999 |
| 2006/0054330 A1 | 3/2006 | Ring et al. | EP | 0952306 A1 | 10/1999 |
| 2006/0065403 A1 | 3/2006 | Watson et al. | EP | 1141515 | 6/2000 |
| 2006/0065406 A1 | 3/2006 | Shuster et al. | EP | 1235972 | 5/2001 |
| 2006/0096762 A1 | 5/2006 | Brisco | EP | 1106778 A1 | 6/2001 |
| 2006/0102360 A1 | 5/2006 | Brisco | EP | 1152119 A2 | 11/2001 |
| 2006/0112768 A1 | 6/2006 | Shuster et al. | EP | 1152120 A2 | 11/2001 |
| 2006/0113086 A1 | 6/2006 | Costa et al. | EP | 1152120 A3 | 6/2002 |
| 2006/0162937 A1 | 7/2006 | Costa et al. | EP | 1306519 A2 | 5/2003 |
| 2006/0163460 A1 | 7/2006 | Kerstan et al. | EP | 1505251 | 2/2005 |
| 2006/0196679 A1 | 9/2006 | Brisco et al. | EP | 1505251 A2 | 2/2005 |
| 2006/0207760 A1 | 9/2006 | Watson et al. | EP | 1555386 A1 | 7/2005 |
| 2006/0208488 A1 | 9/2006 | Costa | EP | 1505251 A3 | 2/2007 |
| 2006/0213668 A1 | 9/2006 | Cook et al. | FR | 1325596 | 3/1963 |
| 2006/0219414 A1 | 10/2006 | Shuster | FR | 233607 A1 | 3/1986 |
| 2006/0225892 A1 | 10/2006 | Watson et al. | FR | 2583398 A1 | 12/1986 |
| 2006/0243444 A1 | 11/2006 | Brisco et al. | FR | 2717855 A1 | 9/1995 |
| 2006/0266527 A1 | 11/2006 | Brisco et al. | FR | 2741907 A1 | 6/1997 |
| 2006/0272826 A1 | 12/2006 | Shuster et al. | FR | 2780751 | 1/2000 |
| 2007/0012456 A1 | 1/2007 | Cook et al. | FR | 2841626 A1 | 1/2004 |
| 2007/0017572 A1 | 1/2007 | Cook et al. | GB | 2275705 | 3/1942 |
| 2007/0034383 A1 | 2/2007 | Shuster et al. | GB | 557823 | 12/1943 |
| 2007/0039742 A1 | 2/2007 | Costa | GB | 788150 | 12/1957 |
| 2007/0131431 A1 | 6/2007 | Shuster et al. | GB | 851096 | 10/1960 |
| 2007/0144735 A1* | 6/2007 | Lloyd et al. ............ 166/206 | GB | 961750 | 6/1964 |
| 2007/0154270 A1 | 7/2007 | Waddell et al. | GB | 1000383 | 10/1965 |
| | | | GB | 1008383 | 10/1965 |
| FOREIGN PATENT DOCUMENTS | | | GB | 1062610 | 3/1967 |
| | | | GB | 1111536 | 5/1968 |
| AU | 767364 | 6/2000 | GB | 1520552 | 8/1976 |
| AU | 770008 | 8/2000 | GB | 1448304 | 9/1976 |
| AU | 770359 | 8/2000 | GB | 1460864 | 1/1977 |
| AU | 771884 | 8/2000 | GB | 1542847 | 3/1979 |
| AU | 776580 | 1/2001 | GB | 1563740 | 3/1980 |
| AU | 782901 | 4/2001 | GB | 1582767 | 1/1981 |
| AU | 783245 | 5/2001 | GB | 2058877 | 4/1981 |
| AU | 773168 | 7/2001 | GB | 2108228 | 5/1983 |
| AU | 780123 | 8/2001 | GB | 2115860 | 9/1983 |
| AU | 01/283026 | 2/2002 | GB | 2124275 A | 2/1984 |
| AU | 01/292695 B2 | 3/2002 | GB | 2125876 | 3/1984 |
| AU | 01/294802 B2 | 4/2002 | GB | 2194978 A | 3/1988 |
| AU | 02/239857 B2 | 9/2002 | GB | 2211446 A | 7/1989 |
| CA | 736288 | 6/1966 | GB | 2211573 A | 7/1989 |
| CA | 771462 | 11/1967 | GB | 2216926 A | 10/1989 |
| CA | 1171310 | 7/1984 | GB | 2243191 A | 10/1991 |
| CA | 2289811 | 11/1999 | GB | 2256910 A | 12/1992 |
| CA | 2292171 | 6/2000 | GB | 2257184 A | 1/1993 |
| CA | 2497854 | 6/2000 | GB | 2275705 A | 9/1994 |

| | | | | | | |
|---|---|---|---|---|---|---|
| GB | 2279383 | | 1/1995 | GB | 2385619 B | 10/2003 |
| GB | 2305682 | A | 4/1997 | GB | 2385620 B | 10/2003 |
| GB | 2322655 | A | 9/1998 | GB | 2385621 B | 10/2003 |
| GB | 2325949 | A | 12/1998 | GB | 2385622 B | 10/2003 |
| GB | 2326896 | A | 1/1999 | GB | 2385623 B | 10/2003 |
| GB | 2329916 | A | 4/1999 | GB | 2387405 A | 10/2003 |
| GB | 2331103 | A | 5/1999 | GB | 2387861 A | 10/2003 |
| GB | 2329918 | A | 7/1999 | GB | 2388134 A | 11/2003 |
| GB | 2336383 | A | 10/1999 | GB | 2388860 A | 11/2003 |
| GB | 2343691 | A | 5/2000 | GB | 2355738 B | 12/2003 |
| GB | 2344606 | A | 6/2000 | GB | 2374622 B | 12/2003 |
| GB | 2345308 | A | 7/2000 | GB | 2388391 B | 12/2003 |
| GB | 2346165 | A | 8/2000 | GB | 2388392 B | 12/2003 |
| GB | 2346632 | A | 8/2000 | GB | 2388393 B | 12/2003 |
| GB | 2347445 | A | 9/2000 | GB | 2388394 B | 12/2003 |
| GB | 2347446 | A | 9/2000 | GB | 2388395 B | 12/2003 |
| GB | 2347950 | A | 9/2000 | GB | 2391028 A | 1/2004 |
| GB | 2347952 | A | 9/2000 | GB | 2356651 B | 2/2004 |
| GB | 2348223 | A | 9/2000 | GB | 2368865 B | 2/2004 |
| GB | 2348657 | A | 10/2000 | GB | 2388860 B | 2/2004 |
| GB | 2348661 | A | 10/2000 | GB | 2388861 B | 2/2004 |
| GB | 2350137 | B | 11/2000 | GB | 2388862 B | 2/2004 |
| GB | 2355738 | A | 12/2000 | GB | 2391886 A | 2/2004 |
| GB | 2356651 | A | 5/2001 | GB | 2390628 B | 3/2004 |
| GB | 2357099 | A | 6/2001 | GB | 2391033 B | 3/2004 |
| GB | 2359837 | B | 9/2001 | GB | 2392686 A | 3/2004 |
| GB | 2361724 | A | 10/2001 | GB | 2393199 A | 3/2004 |
| GB | 2365898 | A | 2/2002 | GB | 2373524 B | 4/2004 |
| GB | 2367842 | A | 4/2002 | GB | 2390387 B | 4/2004 |
| GB | 2368865 | A | 5/2002 | GB | 2392686 B | 4/2004 |
| GB | 2370301 | A | 6/2002 | GB | 2392691 B | 4/2004 |
| GB | 2371064 | A | 7/2002 | GB | 2391575 B | 5/2004 |
| GB | 2371574 | A | 7/2002 | GB | 2394979 A | 5/2004 |
| GB | 2373524 | A | 9/2002 | GB | 2395506 A | 5/2004 |
| GB | 2374098 | A | 10/2002 | GB | 2392932 B | 6/2004 |
| GB | 2374622 | A | 10/2002 | GB | 2395734 A | 6/2004 |
| GB | 2375560 | A | 11/2002 | GB | 2396635 A | 6/2004 |
| GB | 2380213 | A | 4/2003 | GB | 2396640 A | 6/2004 |
| GB | 2380503 | A | 4/2003 | GB | 2396641 A | 6/2004 |
| GB | 2381019 | A | 4/2003 | GB | 2396642 A | 6/2004 |
| GB | 2343691 | B | 5/2003 | GB | 2396643 A | 6/2004 |
| GB | 2382364 | A | 5/2003 | GB | 2396644 A | 6/2004 |
| GB | 2382607 | A | 6/2003 | GB | 2396646 A | 6/2004 |
| GB | 2382828 | A | 6/2003 | GB | 2373468 B | 7/2004 |
| GB | 2344606 | B | 8/2003 | GB | 2396689 A | 7/2004 |
| GB | 2347950 | B | 8/2003 | GB | 2397261 A | 7/2004 |
| GB | 2380213 | B | 8/2003 | GB | 2397262 A | 7/2004 |
| GB | 2380214 | B | 8/2003 | GB | 2397263 A | 7/2004 |
| GB | 2380215 | B | 8/2003 | GB | 2397264 A | 7/2004 |
| GB | 2384807 | C | 8/2003 | GB | 2397265 A | 7/2004 |
| GB | 2348223 | B | 9/2003 | GB | 2398087 A | 8/2004 |
| GB | 2347952 | B | 10/2003 | GB | 2398317 A | 8/2004 |
| GB | 2348657 | B | 10/2003 | GB | 2398318 A | 8/2004 |
| GB | 2358358 | B | 10/2003 | GB | 2398319 A | 8/2004 |
| GB | 2358359 | B | 10/2003 | GB | 2398320 A | 8/2004 |
| GB | 2384800 | B | 10/2003 | GB | 2398321 A | 8/2004 |
| GB | 2384801 | B | 10/2003 | GB | 2398322 A | 8/2004 |
| GB | 2384802 | B | 10/2003 | GB | 2398323 A | 8/2004 |
| GB | 2384803 | B | 10/2003 | GB | 2398326 A | 8/2004 |
| GB | 2384804 | B | 10/2003 | GB | 2382367 B | 9/2004 |
| GB | 2384805 | B | 10/2003 | GB | 2396641 B | 9/2004 |
| GB | 2384806 | B | 10/2003 | GB | 2396643 B | 9/2004 |
| GB | 2384807 | B | 10/2003 | GB | 2397261 B | 9/2004 |
| GB | 2384808 | B | 10/2003 | GB | 2397262 B | 9/2004 |
| GB | 2385353 | B | 10/2003 | GB | 2397263 B | 9/2004 |
| GB | 2385354 | B | 10/2003 | GB | 2397264 B | 9/2004 |
| GB | 2385355 | B | 10/2003 | GB | 2397265 B | 9/2004 |
| GB | 2385356 | B | 10/2003 | GB | 2399120 A | 9/2004 |
| GB | 2385357 | B | 10/2003 | GB | 2399579 A | 9/2004 |
| GB | 2385360 | B | 10/2003 | GB | 2399580 A | 9/2004 |
| GB | 2385361 | B | 10/2003 | GB | 2399837 A | 9/2004 |
| GB | 2385362 | B | 10/2003 | GB | 2399848 A | 9/2004 |
| GB | 2385363 | B | 10/2003 | GB | 2399849 A | 9/2004 |

| | | | | | | |
|---|---|---|---|---|---|---|
| GB | 2399850 | A | 9/2004 | GB | 2410518 | A | 8/2005 |
| GB | 2384502 | B | 10/2004 | GB | 2380503 | B | 10/2005 |
| GB | 2396644 | B | 10/2004 | GB | 2398317 | B | 10/2005 |
| GB | 2400126 | A | 10/2004 | GB | 2398318 | B | 10/2005 |
| GB | 2400393 | A | 10/2004 | GB | 2398319 | B | 10/2005 |
| GB | 2400624 | A | 10/2004 | GB | 2398321 | B | 10/2005 |
| GB | 2396640 | B | 11/2004 | GB | 2398322 | B | 10/2005 |
| GB | 2396642 | B | 11/2004 | GB | 2400393 | B | 10/2005 |
| GB | 2401136 | A | 11/2004 | GB | 2412681 | A | 10/2005 |
| GB | 2401137 | A | 11/2004 | GB | 2412682 | A | 10/2005 |
| GB | 2401138 | A | 11/2004 | GB | 2394979 | B | 11/2005 |
| GB | 2401630 | A | 11/2004 | GB | 2414493 | A | 11/2005 |
| GB | 2401631 | A | 11/2004 | GB | 2409217 | B | 12/2005 |
| GB | 2401632 | A | 11/2004 | GB | 2410518 | B | 12/2005 |
| GB | 2401633 | A | 11/2004 | GB | 2414749 | A | 12/2005 |
| GB | 2401634 | A | 11/2004 | GB | 2414750 | A | 12/2005 |
| GB | 2401635 | A | 11/2004 | GB | 2414751 | A | 12/2005 |
| GB | 2401636 | A | 11/2004 | GB | 2415003 | A | 12/2005 |
| GB | 2401637 | A | 11/2004 | GB | 2415215 | | 12/2005 |
| GB | 2401638 | A | 11/2004 | GB | 2415219 | A | 12/2005 |
| GB | 2401639 | A | 11/2004 | GB | 2395506 | B | 1/2006 |
| GB | 2381019 | B | 12/2004 | GB | 2412681 | B | 1/2006 |
| GB | 2382368 | B | 12/2004 | GB | 2412682 | B | 1/2006 |
| GB | 2401136 | B | 12/2004 | GB | 2415979 | A | 1/2006 |
| GB | 2401137 | B | 12/2004 | GB | 2415982 | A | 1/2006 |
| GB | 2401138 | B | 12/2004 | GB | 2415983 | A | 1/2006 |
| GB | 2403970 | A | 1/2005 | GB | 2415987 | A | 1/2006 |
| GB | 2403971 | A | 1/2005 | GB | 2415988 | A | 1/2006 |
| GB | 2403972 | A | 1/2005 | GB | 2416177 | A | 1/2006 |
| GB | 2040402 | A | 2/2005 | GB | 2416361 | A | 1/2006 |
| GB | 2400624 | B | 2/2005 | GB | 2408278 | B | 2/2006 |
| GB | 2404676 | A | 2/2005 | GB | 2416556 | A | 2/2006 |
| GB | 2404677 | A | 2/2005 | GB | 2416794 | A | 2/2006 |
| GB | 2404680 | A | 2/2005 | GB | 2416795 | A | 2/2006 |
| GB | 2388134 | B | 3/2005 | GB | 2417273 | A | 2/2006 |
| GB | 2398320 | B | 3/2005 | GB | 2417275 | A | 2/2006 |
| GB | 2398323 | B | 3/2005 | GB | 2406126 | A | 3/2006 |
| GB | 2399120 | B | 3/2005 | GB | 2418216 | A | 3/2006 |
| GB | 2399848 | B | 3/2005 | GB | 2418217 | A | 3/2006 |
| GB | 2399849 | B | 3/2005 | GB | 2418690 | A | 4/2006 |
| GB | 2405893 | A | 3/2005 | GB | 2418941 | A | 4/2006 |
| GB | 2406117 | A | 3/2005 | GB | 2418942 | A | 4/2006 |
| GB | 2406118 | A | 3/2005 | GB | 2418943 | A | 4/2006 |
| GB | 2406119 | A | 3/2005 | GB | 2418944 | A | 4/2006 |
| GB | 2406120 | A | 3/2005 | GB | 2419907 | A | 5/2006 |
| GB | 2406125 | A | 3/2005 | GB | 2419913 | A | 5/2006 |
| GB | 2406599 | A | 4/2005 | GB | 2400126 | B | 6/2006 |
| GB | 2389597 | B | 5/2005 | GB | 2414749 | B | 6/2006 |
| GB | 2399119 | B | 5/2005 | GB | 2420810 | A | 6/2006 |
| GB | 2399580 | B | 5/2005 | GB | 2421257 | A | 6/2006 |
| GB | 2401630 | B | 5/2005 | GB | 2421258 | A | 6/2006 |
| GB | 2401631 | B | 5/2005 | GB | 2421259 | A | 6/2006 |
| GB | 2401632 | B | 5/2005 | GB | 2421262 | A | 6/2006 |
| GB | 2401633 | B | 5/2005 | GB | 2421529 | A | 6/2006 |
| GB | 2401634 | B | 5/2005 | GB | 2422164 | A | 7/2006 |
| GB | 2401635 | B | 5/2005 | GB | 2406599 | B | 8/2006 |
| GB | 2401636 | B | 5/2005 | GB | 2414493 | B | 8/2006 |
| GB | 2401637 | B | 5/2005 | GB | 2418690 | B | 8/2006 |
| GB | 2401638 | B | 5/2005 | GB | 2418944 | B | 8/2006 |
| GB | 2401639 | B | 5/2005 | GB | 2421257 | B | 8/2006 |
| GB | 2407593 | A | 5/2005 | GB | 2421258 | B | 8/2006 |
| GB | 2408277 | A | 5/2005 | GB | 2421259 | B | 8/2006 |
| GB | 2408278 | A | 5/2005 | GB | 2422859 | A | 8/2006 |
| GB | 2399579 | B | 6/2005 | GB | 2422860 | A | 8/2006 |
| GB | 2409216 | A | 6/2005 | GB | 2423317 | A | 8/2006 |
| GB | 2409218 | A | 6/2005 | GB | 2404676 | B | 9/2006 |
| GB | 2401893 | B | 7/2005 | GB | 2418941 | B | 9/2006 |
| GB | 2410280 | | 7/2005 | GB | 2418942 | B | 9/2006 |
| GB | 2390622 | B | 8/2005 | GB | 2418943 | B | 9/2006 |
| GB | 2398326 | B | 8/2005 | GB | 2424077 | A | 9/2006 |
| GB | 2403970 | B | 8/2005 | GB | 2405893 | B | 10/2006 |
| GB | 2403971 | B | 8/2005 | GB | 2413136 | A | 10/2006 |
| GB | 2403972 | B | 8/2005 | GB | 2417273 | B | 10/2006 |

| | | | | | | |
|---|---|---|---|---|---|---|
| GB | 2418216 B | 10/2006 | | SU | 1663179 A2 | 7/1991 |
| GB | 2418217 B | 10/2006 | | SU | 1663180 A1 | 7/1991 |
| GB | 2419907 B | 10/2006 | | SU | 1677225 A1 | 9/1991 |
| GB | 2422860 B | 10/2006 | | SU | 1677248 A1 | 9/1991 |
| GB | 2406125 B | 11/2006 | | SU | 1686123 A1 | 10/1991 |
| GB | 2415004 B | 12/2006 | | SU | 1686124 A1 | 10/1991 |
| GB | 2422859 B | 12/2006 | | SU | 1686125 A1 | 10/1991 |
| GB | 2423317 B | 12/2006 | | SU | 1698413 A1 | 12/1991 |
| GB | 2426993 A | 12/2006 | | SU | 1710694 A1 | 2/1992 |
| GB | 2427636 A | 1/2007 | | SU | 1730429 A1 | 4/1992 |
| GB | 2427885 A | 1/2007 | | SU | 1745873 A1 | 7/1992 |
| GB | 2427886 A | 1/2007 | | SU | 1747673 A1 | 7/1992 |
| GB | 2410280 B | 4/2007 | | SU | 1749267 A1 | 7/1992 |
| GB | 2412178 B | 5/2007 | | SU | 1786241 A1 | 1/1993 |
| GB | 2415215 B | 5/2007 | | SU | 1804543 A3 | 3/1993 |
| ID | 012.197 | 8/2004 | | SU | 1810482 A1 | 4/1993 |
| ID | 044.392 A | 9/2005 | | SU | 1818459 A1 | 5/1993 |
| ID | 046.2804 A | 8/2006 | | SU | 1295799 A1 | 2/1995 |
| JP | 208458 | 10/1985 | | SU | 2068940 C1 | 11/1996 |
| JP | 6475715 | 3/1989 | | WO | WO 81/00132 A1 | 1/1981 |
| JP | 102875 | 4/1995 | | WO | WO 90/05598 A | 5/1990 |
| JP | 11-169975 | 6/1999 | | WO | WO 92/01859 A1 | 2/1992 |
| JP | 94068 A | 4/2000 | | WO | WO 92/08875 A2 | 5/1992 |
| JP | 107870 A | 4/2000 | | WO | WO 93/25799 A1 | 12/1993 |
| JP | 162192 | 6/2000 | | WO | WO 93/25800 | 12/1993 |
| JP | 2001-47161 | 2/2001 | | WO | WO 93/25800 A1 | 12/1993 |
| NL | 9001081 | 12/1991 | | WO | WO 94/21887 A1 | 9/1994 |
| RO | 113267 B1 | 5/1998 | | WO | WO 94/25655 A1 | 11/1994 |
| RU | 2016345 C1 | 7/1994 | | WO | WO 95/03476 A1 | 2/1995 |
| RU | 2039214 C1 | 7/1995 | | WO | WO 96/01937 A1 | 1/1996 |
| RU | 2056201 C1 | 3/1996 | | WO | WO 96/10710 | 4/1996 |
| RU | 2064357 C1 | 7/1996 | | WO | WO 96/21083 A1 | 7/1996 |
| RU | 2068943 C1 | 11/1996 | | WO | WO 96/26350 A1 | 8/1996 |
| RU | 2079633 C1 | 5/1997 | | WO | WO 96/10710 | 11/1996 |
| RU | 2083798 C1 | 7/1997 | | WO | WO 96/37681 A1 | 11/1996 |
| RU | 2091655 C1 | 9/1997 | | WO | WO 97/06346 A1 | 2/1997 |
| RU | 2095179 C1 | 11/1997 | | WO | WO 97/11306 A1 | 3/1997 |
| RU | 2105128 C1 | 2/1998 | | WO | WO 97/17524 A2 | 5/1997 |
| RU | 2108445 C1 | 4/1998 | | WO | WO 97/17526 A2 | 5/1997 |
| RU | 2144128 C1 | 1/2000 | | WO | WO 97/17527 A2 | 5/1997 |
| SU | 350833 | 9/1972 | | WO | WO 97/20130 A2 | 6/1997 |
| SU | 511468 | 9/1976 | | WO | WO 97/21901 A2 | 6/1997 |
| SU | 607950 | 5/1978 | | WO | WO 97/35084 A1 | 9/1997 |
| SU | 612004 | 6/1978 | | WO | WO 98/00626 A1 | 1/1998 |
| SU | 620582 | 8/1978 | | WO | WO 98/07957 A1 | 2/1998 |
| SU | 641070 | 1/1979 | | WO | WO 98/09053 A2 | 3/1998 |
| SU | 309114 | 5/1979 | | WO | WO 98/22690 A1 | 5/1998 |
| SU | 874952 | 6/1979 | | WO | WO 98/26152 A1 | 6/1998 |
| SU | 832049 | 5/1981 | | WO | WO 98/42947 A1 | 10/1998 |
| SU | 976019 | 5/1981 | | WO | WO 98/49423 A1 | 11/1998 |
| SU | 976020 | 5/1981 | | WO | WO 99/02818 A1 | 1/1999 |
| SU | 853089 | 8/1981 | | WO | WO 99/04135 A1 | 1/1999 |
| SU | 894169 | 12/1981 | | WO | WO 99/06670 A1 | 2/1999 |
| SU | 899850 | 1/1982 | | WO | WO 99/08827 A1 | 2/1999 |
| SU | 907220 | 2/1982 | | WO | WO 99/08828 A1 | 2/1999 |
| SU | 953172 | 8/1982 | | WO | WO 99/18328 A1 | 4/1999 |
| SU | 959878 | 9/1982 | | WO | WO 99/23354 A1 | 5/1999 |
| SU | 989038 | 1/1983 | | WO | WO 99/25524 A1 | 5/1999 |
| SU | 1002514 | 3/1983 | | WO | WO 99/25951 A1 | 5/1999 |
| SU | 1041671 | 9/1983 | | WO | WO 99/35368 A1 | 7/1999 |
| SU | 1051222 A | 10/1983 | | WO | WO 99/43923 A1 | 9/1999 |
| SU | 1077803 A | 3/1984 | | WO | WO 00/01926 A1 | 1/2000 |
| SU | 1086118 A | 4/1984 | | WO | WO 00/04271 A1 | 1/2000 |
| SU | 1158400 A | 5/1985 | | WO | WO 00/08301 A2 | 2/2000 |
| SU | 1212575 A | 2/1986 | | WO | WO 00/18635 | 4/2000 |
| SU | 1250637 A1 | 8/1986 | | WO | WO 00/26500 A1 | 5/2000 |
| SU | 1324722 A1 | 7/1987 | | WO | WO 00/26501 A1 | 5/2000 |
| SU | 1411434 A1 | 7/1988 | | WO | WO 00/26502 A1 | 5/2000 |
| SU | 1430498 A1 | 10/1988 | | WO | WO 00/31375 A1 | 6/2000 |
| SU | 1432190 A1 | 10/1988 | | WO | WO 00/37766 A2 | 6/2000 |
| SU | 1601330 A1 | 10/1990 | | WO | WO 00/37767 A2 | 6/2000 |
| SU | 1627663 A | 2/1991 | | WO | WO 00/37768 A1 | 6/2000 |
| SU | 1659621 A1 | 6/1991 | | WO | WO 00/37771 A1 | 6/2000 |

| | | | | | | | |
|---|---|---|---|---|---|---|---|
| WO | WO 00/37772 | A1 | 6/2000 | WO | WO 03/058022 | A2 | 7/2003 |
| WO | WO 00/39432 | A1 | 7/2000 | WO | WO 03/058022 | A3 | 7/2003 |
| WO | WO 00/46484 | A1 | 8/2000 | WO | WO 03/059549 | A1 | 7/2003 |
| WO | WO 00/50727 | A1 | 8/2000 | WO | WO 03/064813 | A1 | 8/2003 |
| WO | WO 00/50732 | A1 | 8/2000 | WO | WO 03/069115 | A3 | 8/2003 |
| WO | WO 00/50733 | A1 | 8/2000 | WO | WO 03/071086 | A2 | 8/2003 |
| WO | WO 00/66877 | | 11/2000 | WO | WO 03/071086 | A3 | 8/2003 |
| WO | WO 00/77431 | A2 | 12/2000 | WO | WO 03/078785 | A2 | 9/2003 |
| WO | WO 01/04520 | A1 | 1/2001 | WO | WO 03/078785 | A3 | 9/2003 |
| WO | WO 01/04535 | A1 | 1/2001 | WO | WO 03/086675 | A2 | 10/2003 |
| WO | WO 01/47161 | | 2/2001 | WO | WO 03/086675 | A3 | 10/2003 |
| WO | WO 01/18353 | | 3/2001 | WO | WO 03/089161 | A2 | 10/2003 |
| WO | WO 01/18354 | A1 | 3/2001 | WO | WO 03/089161 | A3 | 10/2003 |
| WO | WO 01/21929 | A1 | 3/2001 | WO | WO 03/093623 | A2 | 11/2003 |
| WO | WO 01/26860 | A1 | 4/2001 | WO | WO 03/093623 | A3 | 11/2003 |
| WO | WO 01/33037 | A1 | 5/2001 | WO | WO 03/093624 | | 11/2003 |
| WO | WO 01/38693 | A1 | 5/2001 | WO | WO 03/102365 | A1 | 12/2003 |
| WO | WO 01/60545 | A1 | 8/2001 | WO | WO 03/104601 | A2 | 12/2003 |
| WO | WO 01/83943 | A1 | 11/2001 | WO | WO 03/104601 | A3 | 12/2003 |
| WO | WO 01/98623 | A1 | 12/2001 | WO | WO 03/106130 | A2 | 12/2003 |
| WO | WO 02/01102 | A1 | 1/2002 | WO | WO 03/106130 | A3 | 12/2003 |
| WO | WO 02/10550 | A1 | 2/2002 | WO | WO 2004/000337 | A1 | 1/2004 |
| WO | WO 02/10551 | A1 | 2/2002 | WO | WO 2004/007711 | | 1/2004 |
| WO | WO 02/20941 | A1 | 3/2002 | WO | WO 2004/008073 | | 1/2004 |
| WO | WO 02/23007 | A1 | 3/2002 | WO | WO 2004/009950 | A1 | 1/2004 |
| WO | WO 02/25059 | A1 | 3/2002 | WO | WO 2004/010039 | A2 | 1/2004 |
| WO | WO 02/28560 | | 4/2002 | WO | WO 2004/010039 | A3 | 1/2004 |
| WO | WO 02/29199 | A1 | 4/2002 | WO | WO 2004/010317 | | 1/2004 |
| WO | WO 02/38343 | A2 | 5/2002 | WO | WO 2004/010712 | | 1/2004 |
| WO | WO 02/38343 | A3 | 5/2002 | WO | WO 2004/010762 | | 2/2004 |
| WO | WO 02/40825 | A1 | 5/2002 | WO | WO 2004/011776 | A2 | 2/2004 |
| WO | WO 02/053867 | A2 | 7/2002 | WO | WO 2004/011776 | A3 | 2/2004 |
| WO | WO 02/053867 | A3 | 7/2002 | WO | WO 2004/011973 | | 2/2004 |
| WO | WO 02/059456 | A1 | 8/2002 | WO | WO 2004/013462 | | 2/2004 |
| WO | WO 02/066783 | A1 | 8/2002 | WO | WO 2004/015241 | | 2/2004 |
| WO | WO 02/068792 | A1 | 9/2002 | WO | WO 2004/018823 | A2 | 3/2004 |
| WO | WO 02/073000 | A1 | 9/2002 | WO | WO 2004/018823 | A3 | 3/2004 |
| WO | WO 02/075107 | A1 | 9/2002 | WO | WO 2004/018824 | A2 | 3/2004 |
| WO | WO 02/077411 | A1 | 10/2002 | WO | WO 2004/018824 | A3 | 3/2004 |
| WO | WO 02/081863 | A1 | 10/2002 | WO | WO 2004/020895 | A2 | 3/2004 |
| WO | WO 02/081864 | A2 | 10/2002 | WO | WO 2004/020895 | A3 | 3/2004 |
| WO | WO 02/086285 | A1 | 10/2002 | WO | WO 2004/023014 | A2 | 3/2004 |
| WO | WO 02/086286 | A2 | 10/2002 | WO | WO 2004/023014 | A3 | 3/2004 |
| WO | WO 02/085181 | A1 | 11/2002 | WO | WO 2004/026017 | A2 | 4/2004 |
| WO | WO 02/090713 | A1 | 11/2002 | WO | WO 2004/026017 | A3 | 4/2004 |
| WO | WO 02/163192 | | 11/2002 | WO | WO 2004/026073 | A2 | 4/2004 |
| WO | WO 02/103150 | A2 | 12/2002 | WO | WO 2004/026073 | A3 | 4/2004 |
| WO | WO 03/000690 | | 1/2003 | WO | WO 2004/026500 | A2 | 4/2004 |
| WO | WO 03/004819 | A2 | 1/2003 | WO | WO 2004/026500 | A3 | 4/2004 |
| WO | WO 03/004819 | A3 | 1/2003 | WO | WO 2004/027200 | A2 | 4/2004 |
| WO | WO 03/004820 | A2 | 1/2003 | WO | WO 2004/027200 | A3 | 4/2004 |
| WO | WO 03/004820 | A3 | 1/2003 | WO | WO 2004/027201 | | 4/2004 |
| WO | WO 03/004837 | | 1/2003 | WO | WO 2004/027201 | A2 | 4/2004 |
| WO | WO 03/008756 | A1 | 1/2003 | WO | WO 2004/027204 | A2 | 4/2004 |
| WO | WO 03/012255 | A1 | 2/2003 | WO | WO 2004/027204 | A3 | 4/2004 |
| WO | WO 03/014153 | | 2/2003 | WO | WO 2004/027205 | A2 | 4/2004 |
| WO | WO 03/016669 | A2 | 2/2003 | WO | WO 2004/027205 | A3 | 4/2004 |
| WO | WO 03/016669 | A3 | 2/2003 | WO | WO 2004/027318 | | 4/2004 |
| WO | WO 03/023178 | A2 | 3/2003 | WO | WO 2004/027392 | A1 | 4/2004 |
| WO | WO 03/023178 | A3 | 3/2003 | WO | WO 2004/027786 | A2 | 4/2004 |
| WO | WO 03/023179 | A2 | 3/2003 | WO | WO 2004/027786 | A3 | 4/2004 |
| WO | WO 03/023179 | A3 | 3/2003 | WO | WO 2004/028936 | | 4/2004 |
| WO | WO 03/029607 | A1 | 4/2003 | WO | WO 2004/053434 | A2 | 6/2004 |
| WO | WO 03/029608 | A1 | 4/2003 | WO | WO 2004/053434 | A3 | 6/2004 |
| WO | WO 03/036018 | A2 | 5/2003 | WO | WO 2004/057715 | A2 | 7/2004 |
| WO | WO 03/042486 | A2 | 5/2003 | WO | WO 2004/057715 | A3 | 7/2004 |
| WO | WO 03/042486 | A3 | 5/2003 | WO | WO 2004/067961 | A2 | 8/2004 |
| WO | WO 03/042487 | A2 | 5/2003 | WO | WO 2004/067961 | A3 | 8/2004 |
| WO | WO 03/042487 | A3 | 5/2003 | WO | WO 2004/072436 | A1 | 8/2004 |
| WO | WO 03/042489 | A2 | 5/2003 | WO | WO 2004/074622 | A2 | 9/2004 |
| WO | WO 03/048520 | A1 | 6/2003 | WO | WO 2004/074622 | A3 | 9/2004 |
| WO | WO 03/048521 | A2 | 6/2003 | WO | WO 2004/076798 | A2 | 9/2004 |
| WO | WO 03/055616 | A2 | 7/2003 | WO | WO 2004/076798 | A3 | 9/2004 |

| | | | |
|---|---|---|---|
| WO | WO 2004/081346 A2 | 9/2004 |
| WO | WO 2004/083591 A2 | 9/2004 |
| WO | WO 2004/083591 A3 | 9/2004 |
| WO | WO 2004/083592 A2 | 9/2004 |
| WO | WO 2004/083592 A3 | 9/2004 |
| WO | WO 2004/083593 A2 | 9/2004 |
| WO | WO 2004/083594 A2 | 9/2004 |
| WO | WO 2004/083594 A3 | 9/2004 |
| WO | WO 2004/085790 A2 | 10/2004 |
| WO | WO 2004/089608 A2 | 10/2004 |
| WO | WO 2004/089608 A3 | 10/2004 |
| WO | WO 2004/092527 A2 | 10/2004 |
| WO | WO 2004/092528 A2 | 10/2004 |
| WO | WO 2004/092528 A3 | 10/2004 |
| WO | WO 2004/092530 A2 | 10/2004 |
| WO | WO 2004/092530 A3 | 10/2004 |
| WO | WO 2004/094766 A2 | 11/2004 |
| WO | WO 2004/094766 A3 | 11/2004 |
| WO | WO 2005/017303 A2 | 2/2005 |
| WO | WO 2005/021921 A2 | 3/2005 |
| WO | WO 2005/021921 A3 | 3/2005 |
| WO | WO 2005/021922 A2 | 3/2005 |
| WO | WO 2005/021922 A3 | 3/2005 |
| WO | WO 2005/023391 | 3/2005 |
| WO | WO 2005/024170 A2 | 3/2005 |
| WO | WO 2005/024170 A3 | 3/2005 |
| WO | WO 2005/024171 A3 | 3/2005 |
| WO | WO 2005/027318 | 3/2005 |
| WO | WO 2005/028446 | 3/2005 |
| WO | WO 2005/028451 | 3/2005 |
| WO | WO 2005/028453 | 3/2005 |
| WO | WO 2005/028473 | 3/2005 |
| WO | WO 2005/028641 | 3/2005 |
| WO | WO 2005/028642 | 3/2005 |
| WO | WO 2005/028669 | 3/2005 |
| WO | WO 2005/028803 A2 | 3/2005 |
| WO | WO 2005/028819 | 3/2005 |
| WO | WO 2005/028936 | 3/2005 |
| WO | WO 2005/043122 | 5/2005 |
| WO | WO 2005/061852 | 7/2005 |
| WO | WO 2005/071212 A1 | 8/2005 |
| WO | WO 2005/079186 A2 | 9/2005 |
| WO | WO 2005/079186 A3 | 9/2005 |
| WO | WO 2005/081803 A2 | 9/2005 |
| WO | WO 2005/086614 A2 | 9/2005 |
| WO | WO 2006/002449 | 1/2006 |
| WO | WO 2006/010674 | 2/2006 |
| WO | WO 2006/014333 A2 | 2/2006 |
| WO | WO 2006/017459 A2 | 2/2006 |
| WO | WO 2006/020723 A2 | 2/2006 |
| WO | WO 2006/020726 A2 | 2/2006 |
| WO | WO 2006/020734 A2 | 2/2006 |
| WO | WO 2006/020734 A3 | 2/2006 |
| WO | WO 2006/020809 A2 | 2/2006 |
| WO | WO 2006/020810 A2 | 2/2006 |
| WO | WO 2006/020810 A3 | 2/2006 |
| WO | WO 2006/020827 A2 | 2/2006 |
| WO | WO 2006/020827 A3 | 2/2006 |
| WO | WO 2006/020913 A2 | 2/2006 |
| WO | WO 2006/020913 A3 | 2/2006 |
| WO | WO 2006/020960 A2 | 2/2006 |
| WO | WO 2006/033720 A2 | 3/2006 |
| WO | WO 2006/060387 A2 | 6/2006 |
| WO | WO 2006/060387 A3 | 6/2006 |
| WO | WO 2006/079072 A2 | 7/2006 |
| WO | WO 2006/079072 A3 | 7/2006 |
| WO | WO 2006/088743 A2 | 8/2006 |
| WO | WO 2006/088743 A3 | 8/2006 |
| WO | WO 2006/096762 A1 | 9/2006 |
| WO | WO 2006/102171 A2 | 9/2006 |
| WO | WO 2006/102556 A2 | 9/2006 |
| WO | WO 2007/014339 A2 | 2/2007 |

OTHER PUBLICATIONS

Neal J. Adams, Drilling Engineering, A Complete Well Planning Approach, 1985, pp. 618-627, PennWell Publishing Company, Tulsa, Oklahoma.
Baker Hughes, EXPatch Expandable Cladding System, Copyright 2002, Baker Hughes Inc.
Kate Blasingame, Gerry Cales, Solid Expandable Tubular Technology in Mature Basins, Copyright 2003, pp. 1-10, AAPG/SPE.
J.C.M. Braas, C.O. Aihevba, M. Shandoodi, R.H. Van Noort, M.N. Baaijens, Water Production Management—PDO's Successful Application of Expandable Technology, Copyright 2002, pp. 1-8, Society of Petroleum Engineers.
V. Brizmer, Y. Kligerman, I. Etson, A Laser Surface Textured Parallel Thrust Bearing, 2003, pp. 397-403, vol. 46; Issue 3.
Jim Brock, Scott Costa, Lev Ring, Andrei Filippov, An Expanded Horizon, Feb. 2000, pp. 115-117.
Bill Buckler, Nick Steinsberger, Kevin Waddell, Rune Gusevik, Edwin Zwald, Expandable Cased-hole Liner Remediates Prolific Gas Well and Minimizes Loss of Production, Copyright 2002, pp. 1-6.
Michael D. Bullock, Tubulars Technology—Expandable Tubular Technology Continues to Broaden Range of Applications, Advances Grow Expandable Applications, Sep. 2004, The American Oil & Gas Reporter.
G.L. Gales, The Development and Applications of Solid Expandable Tubular Technology, Jun. 10, 2003, pp. 1-11.
Gerry Cales, Tom Grant, Larry Book, Reducing Non-Productive Time Through the Use of Solid Expandable Tubulars: How to Beat the Curve Through Pre-Planning, Copyright 2004, Offshore Technology Conference.
Gerry Gales, David Shepherd, Brad Wiest, Pat York, Chan Daigle, Larry Rose, Mike Patterson, Subsidence Remediation—Extending Well Life Through the Use of Solid Expandable Casing Systems, Mar. 27, 2001, pp. 1-16, American Association of Drilling Engineers.
Don Campo, Gerald Cales, Colley Andrews, Mike Bullock, Mark Rivenbark, Patrick York, Case Histories—Drilling and Recompletion Applications Using Solid Expandable Tubular Technology, Copyright 2002, pp. 1-13, Society of Petroleum Engineers.
Case History—Eemskanaal—2, Groningen, Feb. 2002, Enventure Global Technology.
Case History—Graham Ranch No. 1, Newark East Barnett Field, Feb. 2002, Enventure Global Technology.
Case History—K.K. Camel No. 1, Ridge Field, Lafayette Parish, Louisiana, Feb. 2002, Enventure Global Technology.
Case History—Mississippi Canyon 809, URSA TLP, OCS-G 5868, No. A-12, Mar. 2004, Enventure Global Technology.
Case History—Unocal Sequoia, Mississippi Canyon 941 Well No. 2, 2005, Enventure Global Technology.
Case History—Yibal 381, Oman, Feb. 2002, Enventure Global Technology.
Lance Cook, Same Internal Casing Diameter From Surface to TD—Drilling Deeper than Ever Before, pp. 1-2, Jul. 2002, Offshore Magazine.
Adrian Cottrill, Core Ideas Expanding Into the Mainstream, Jul. 26, 2002, pp. 26-27, Upstream Magazine.
Chan L. Daigle, Donald B. Campo, Carey J. Naquin, Rudy Cardenas, Lev M. Ring, Patrick L. York, Expandable Tubulars: Field Examples of Application in Well Construction and Remediation, Copyright 2000, pp. 1-14, Society of Petroleum Engineers.
Ali Daneshy, Management Report, Technology Strategy Breeds Value, May 2004.
Data Sheet—Enventure Cased-Hole Liner (CHL) System, Dec. 2002, pp. 1-2, Enventure Global Technology.
Data Sheet—Enventure Openhold Liner (OHL) System, Dec. 2002, pp. 1-2, Enventure Global Technology.
Data Sheet— Window Exit Applications OHL Window Exit Expansion, Jun. 2003, pp. 1-2, Enventure Global Technology.
Bill Dean, Lance Cook, David Brisco, Monodiameter Drilling Liner—From Concept to Reality, Copyright 2003, pp. 1-15, Society of Petroleum Engineers.

Karl Demong, Breakthroughs using Solid Expandable Tubulars to Construct Extended Reach Wells, Copyright, 2004, pp. 1-13, Society of Petroleum Engineers.

Karl Demong, Mark Rivenbark, Carl Dismuke, Expandable Tubulars Enable Multilaterals without Compromise on Hole Size, Casing Design in Complex Wells, Jun. 2003, PennWell Corporation.

Karl Demong, Mark Rivenbark, Khalid Syed Hussain, Planning the Well Construction Process for the use of Solid Expandable Casing, Copyright 2003, pp. 1-10, Society of Petroleum Engineers.

Laurence Demoulin, Tendance Technologie, Les tubes expansibles changent la face du forage petrolier, Jul. 3, 2003, pp. 50-52, Issue No. 2878.

Kenneth Dupal, Donald B. Campo, Colley J. Andrews, R. Lance Cook, Lev M. Ring, Patrick L. York, Realization of the MonoDiameter Well: Evolution of a Game-Changing Technology, Copyright 2002, pp. 1-10, Issue No. 14312, Offshore Technology Conference.

Kenneth K. Dupal, Donald B. Campo, John E. Lofton, Don Weisinger, R. Lance Cook, Michael D. Bullock, Thomas P. Grant, Patrick L. York, Solid Expandable Tubular Technology—A Year of Case Histories in the Drilling Environment, Copyright 27, 2001, pp. 1-16, Issue No. 67770, Society of Petroleum Engineers.

Ken Dupal, Carey J. Naquin, Chan Daigle, Lance Cook, Pat York, Deep Offshore Technology, Well Design With Expandable Tubulars Reduces Costs and Increases Success in Deepwater Applications, 2000, pp. 2-16.

Gier Owe Egge, Production Enhancement Technology, Mar. 10, 2003, pp. 1-18.

EIS Expandable Isolation Sleeve, Feb. 2003.

Letter from Darin H. Duphome of Baker Hughes to William Norvell of Beime, Maynard & Parsons, L.L.P. dated Apr. 1, 2005.

SET Technology: The Facts, Copyright 2004, pp. 1-25.

Solid expandable tubulars are enabling technology, Drilling Contractor, Mar./Apr. 2001.

Enventure ready to rejuvenate the North Sea, Pipe & Tubular Services, Sep. 2004.

Carlos Escobar, Bill Dean, Brian, Race, Kevin Waddell, Increasing Solid Expandable Tubular Technology Reliability in a Myriad of Downhole EnVironments, Copyright 2003, Society of Petroleum Engineers.

Izhak Etsion, Gregory Halperin, A laser surface textured hydrostatic mechanical seal, Sealing Technology, Mar. 2003.

Expandable Casing Accesses Remote Reservoirs, Petroleum Engineer International, Apr. 1999.

Expandable Sand Screens, Weatherford Completion Systems, Copyright 2002, pp. 1-40.

Andrei Filippov, Robert Mack, Lance Cook, Patrick York, Lev Ring, Terry McCoy, Expandable Tubular Solutions, Copyright 1999, pp. 1-16, Issue 56500, Society of Petroleum Engineers.

First ever SET workshop held in Aberdeen, Roustabout, Oct. 2004.

Perry A. Fischer, Expendables and the dream of the monodiameter well: a status report, Jul. 2004, World Oil.

Rick Von Flatern, Oilfield Service trio target Jules Verne Territory, Aug. 17, 2001, OilOnline—The Original Online Source for the Oil Industry.

Rick Fontova, Solid Expandable Tubulars (SET) Provide Value to Operators Worldwide in a Variety of Applications, Apr. 2005, EP Journal of Technology, pp. 1-17.

Fraunhofer IWU—Research Area: Sheet Metal Forming—Superpositions of Vibrations, Copyright 2001.

William Furlow, Casing expansion, test process fine tuned on ultra-deepwater well, Offshore, Dec. 2000, PennWell Corporation.

William Furlow, Expandable solid casing reduces telescope effect, Offshore, pp. 102, 140, Issue: Aug. 1998, PennWell Corporation.

William Furlow, Agbada well solid tubulars expanded bottom up, screens expanded top down, Offshore, Issue: Jan. 2002, PennWell Corporation.

Mike Gilmer, Brent Emerson, World's First Completion Set Inside Expandable Screen, High Tech Wells, Copyright 2003, pp. 1-7.

Thomas P. Grant, Michael D. Bullock, Deepwater Expandable Openhole Liner Case Histories: Learnings Through Field Applications, Offshore Technology Conference, Copyright 2002, pp. 1-6, Issue 14218.

Philip Guichelaar, Karalyn Folkert, Izhak Etsion, Steven Pride, Effect of Micro-Surface Texturing on Breakaway Torque and Blister Formation on Carbon-Graphite Faces in a Mechanical Seal, Journal of the Society of Tribologists and Lubrication Engineers, Aug. 2002, pp. 18-21.

Rune Gusevik, Randy Merritt, Reaching Deep Reservoir Targets Using Solid Expandable Tubulars, Society of Petroleum Engineers, Copyright 2002, pp. 1-8, Issue 77612.

Henry Haefke, Yvonne Gerbig, Gabriel Dumitru, Valerio Romano, Microtexturing of Functional Surfaces for Improving Their Tribological Performance, Proceedings of the International Tribology Conference, 2000, pp. 217-221, Nagasaki.

Completion Products, Halliburton, Copyright 1996.

Ian D. Harris, Tube Welding, www.tubenet.org, accessed Oct. 25, 2006.

Richard C. Haut, Qamar Sharif, Meeting Economic Challenges of Deepwater Drilling With Expandable—Tubular Technology, Deep Offshore Technology Conference, 1999.

Jennifer Pallanich Hull, MonoDiameter technology keeps hole diameter to TD, Offshore, Copyright 2002, pp. 1-2, Issue—Oct. 2002, PennWell Corporation.

G.R. Linsell, Trib-Gel A Chemical Cold Welding Agent, Trib Tech, Jan. 5, 2004, pp. 1-5.

Todd E. Lizotte, Scratching the surface, PT Design, pp. 41-44, Issue'Jun. 1999.

C. Lee Lohoefer, Ben Mathis, David Brisco, Kevin Waddell, Lev Ring, Patrick York, Expandable Liner Hanger Provides Cost-Effective Alternative Solution, Society of Petroleum Engineers, Copyright 2000, pp. 1-12, Issue 59151.

R.D. Mack, Terry McCoy, Lev Ring, How in situ expansion affects casing and tubing properties, World Oil magazine, pp. 69-71, Issue Jul. 1999, Gulf Publishing Company.

Robert Mack, Andrei Filippov, Larry Kendziora, Lev Ring, In-Situ Expansion of Casing and Tubing—Effect on Mechanical Properties and Resistance to Sulfide Stress Cracking, Corrosion 2000, Copyright 2000, pp. 1-13, Issue 00164.

Randy M. Merritt, Rune Gusevik, William Buckler, Nick Steinsberger, Well remediation using expandable cased-hole liners, World Oil, Copyright 2002, pp. 56-65, Issue Jul. 2002, Gulf Publishing Company, U.S.A.

Melvin J. Moore, Donald B. Campo, Joel Hockaday, Lev Ring, Expandable Liner Hangers: Case Histories, Copyright 2002, pp. 1-11, Issue 14313, Offshore Technology Conference.

Melvin J. Moore, Warren J. Winters, Edwin Zwald, David Brisco, Field Trial Proves Upgrades to Solid Expandable Tubulars, Offshore Technology Conference, Copyright 2002, pp. 1-11, Issue 14217.

Shell and Halliburton Agree to Form Company to Develop and Market Expandable Casing Technology, News Release—Joint Venture, Jun. 3, 1998, pp. 1-2.

Norlizah Mohd Nor, Edmund Huang, Chin Hon Voon, James Lau, Michael Ruggier, Transforming Conventional Wells to Bigbore Completions Using Solid Expandable Tubular Technology, Offshore Technology Conference, Copyright 2002, pp. 1.8, Issue 14315.

Michael Patin, Doug Keel, Craig Johnson, Virgil Newton, Overcoming Well Control Challenges with Solid Expandable Tubular Technology, Offshore Technology Conference, Copyright 2003, pp. 1-5, Issue 15152.

Design and optimization of an ultrasonic die system for forming metal cans, Power Ultrasonics, Jul. 1, 2000.

Matt Ratliff, Changing Safety Paradigms in the Oil and Gas Industry, Society of Petroleum Engineers, Copyright 2004, pp. 1-6, Issue 90828.

Conoco and Tesco Unveil Revolutionary Drilling Rig, Rigzone News, Feb. 11, 2002.

Tesco Provides Casing Drilling Operations Update, Rigzone News, Oct. 16, 2001.

Mark Rivenbark, Karl Demong, Sami S. Mulhem, Glen Olivera, Solid Expandable Tubular Technology: The Value of Planned Installation vs. Contingency, Society for Petroleum Engineers, Copyright 2004, pp. 1-8, Issue 90821.

Mark Rivenbark, Karl Demong, Omar Al Faraj, Window Exit Sidetrack Enhancements Through the Use of Solid Expandable Casing, Society of Petroleum Engineers / International Association of Drilling Contractors, Copyright 2004, pp. 1-7, Issue 88030.

Eduardo Perez-Roca, Stacey Andrews, Doug Keel, Addressing Common Drilling Challenges Using Solid Expandable Tubular Technology, Society of Petroleum Engineers, Copyright 2003, pp. 1-9, Issue 80446.

Aviram Ronen, Izhak Etsion, Yuri Kligerman, Friction-Reducing Surface-Texturing in Reciprocating Automotive Components, Tribology Transactions, 2001, pp. 359-366, vol. 44.

G. Ryk, Y. Kligerman, I. Etsion, Experimental Investigation of Laser Surface Texturing for Reciprocating Automotive Components, Tribology Transactions, 2002, pp. 444-449, vol. 45.

Tom Sanders, Tim Baseflug, Neal Keith, Three Diverse Applications on Three Continents for a Single Major Operator, Offshore Technology Conference, Copyright 2004, pp. 1-8, Issue 16667.

SET Technology: The Facts, Enventure Global Technology, Copyright 2004, pp. 1-25.

Gertjan Siemers, Thompson Ukomah, Robert Mack, Greg Noel, John Donald, Development and Field Testing of Solid Expandable Corrosion Resistant Cased-hole Liners to Boost Gas Production in Corrosive Environments, Offshore Technology Conference, Copyright 2003, pp. 1-6, Issue 15149.

Slim Well: Stepping Stone to MonoDiameter, Enventure Global Technology, pp. 1-16, Issue Jun. 2003.

Maurice Smith, Pipe Dream Reality, New Technology Magazine, pp. 1-3, Issue Dec. 2003.

Solid Expandable Tubulars, Enventure Global Technology, pp. 1-16, Issue Mar. 2002.

Steven W. Sparling, Greg Noel, Expanding Oil Field Tubulars Through a Window Demonstrates Value and Provides New Well Construction Option, Offshore Technology Conference, Copyright 2004, pp. 1-9, Issue 16664.

Mike Sumrow, Shell drills world's first MonoDiameter well in South Texas, Oil & Gas Journal, Copyrigh 2002, Issue Oct. 21, 2002, PennWell Corporation.

Nicolas Touboul, Lee Womble, John Kotrla, Neal Keith, New Technologies Combine to Reduce Drilling Costs in Ultradeepwater Applications, Society of Petroleum Engineers, Copyright 2004, pp. 1-10, Issue 90830.

Letter from Tod T. Tumey of Tumey L.L.P. to Andrei Filippov of Mohawk Energy regarding analyzation of patents 6892819, 6695012, 6640903, 6631769, 6631759, 5348095, May 6, 2006.

Donald L. Turcotte, Gerald Schubert, Geodynamics Applications of Continuum Physics to Geological Problems, Copyright 1982, John Wiley & Sons, Inc., Canada.

Roger Van Noort, Mark Rivenbark, Mike Jones, Using Solid Expandable Tubulars for Openhole Water Shutoff, Society of Petroleum Engineers, Copyright 2002, pp. 1-6, Issue 78495.

Roger Van Noort, Majid Shandoodi, Mike Jones, Water Production Reduced Using Solid Expandable Tubular Technology to "Clad" in Fractured Carbonite Formation, Offshore Technology Conference, Copyright 2003, pp. 1-9, Issue 15153.

Rick Von Flatern, From exotic to routine—the offshore quick-step, Offshore Engineer, pp. 77-83, Issue Apr. 2004.

Rick Von Flatern, Oilfield service trio target Jules Verne territory, Offshore Engineer, pp. 1-4, Issue Aug. 2001.

Kevin Waddell, Advances in Single-diameter Well Technology: The Next Step to Cost-Effective Optimization, Society of Petroleum Engineers, Copyright 2004, pp. 1-10, Issue 90818.

Kevin Waddell, Rutmer Schuurmans, Installation of Solid Expandable Tubular Systems Through Milled Casing Windows, Society of Petroleum Engineers, Copyright 2004, pp. 1-10, Issue 87208.

Peggy Williams, Straightening the Drilling Curve, Drilling Technology, Issue Jan. 2003.

Threadlockers, Oilfield Catalog Jet-Lok Product Application Descriptions, www.jetlube.com accessed Aug. 8, 2003.

Low Temperature Bonding of Dissimilar and Hard-to-Bond Materials and Metals-Including, Materials Resources International, www.materialsresources.com, Accessed Jan. 5, 2004.

3d Surface Texture Parameters, www.michmet.com, accessed Jan. 22, 2004.

Glavanic Protection, Metallurgical Bonds, Custom Fabricatio—Spur Industries, www.spurind.com, accessed Jan. 5, 2004.

Examination Report dated Sep. 4, 2006 on Australian patent application No. 2001/278196.

Examination Report dated Oct. 4, 2006 on Australian patent application No. 2002/237757.

Examination Report dated Apr. 21, 2005 on Australian patent application No. 2001/278196.

Examination Report dated Apr. 28, 2005 on Australian patent application No. 2002/237757.

Examination Report dated Apr. 13, 2005 on Australian patent application No. 2002/240366.

Examination Report dated Jan. 19, 2006 on Australian patent application No. 2003/257878.

Examination Report dated Jan. 30, 2006 on Australian patent application No. 2003/257878.

Examination Report dated Jan. 19, 2006 on Australian patent application No. 2003/257881.

Examination Report dated Jan. 30, 2006 on Australian patent application No. 2003/257881.

Examination Report dated Jun. 14, 2006 on Australian patent application No. 2004/202805.

Examination Report dated Jun. 14, 2006 on Australian patent application No. 2004/202809.

Examination Report dated Jun. 14, 2006 on Australian patent application No. 2004/202812.

Examination Report dated Jun. 14, 2006 on Australian patent application No. 2004/202813.

Examination Report dated Jun. 14, 2006 on Australian patent application No. 2004/202815.

Examination Report dated Nov. 15, 2006 on Canadian patent application No. 2298139.

Examination Report dated Feb. 7, 2007 on Canadian patent application No. 2383231.

Examination Report dated Jan. 24, 2007 on Canadian patent application No. 2419806.

Examination Report dated Jan. 30, 2007 on Canadian patent application No. 2432030.

Examination Report dated Jan. 24, 2007 on Canadian patent application No. 2438807.

Examination Report dated Jan. 30, 2007 on Canadian patent application No. 2517524.

Examination Report dated Mar. 1, 2007 on Chinese PCT national patent application No. 02827985.9.

Examination Report dated Apr. 24, 2006 on European patent application No. 03728326.4.

Examination Report dated Jun. 28, 2006 on European patent application No. 03752486.5.

Search Report dated Nov. 14, 2005 on European application No. 03071281.2.

Search Report dated Nov. 7, 2005 on European application No. 03701281.

Search Report dated May 3, 2006 on European application No. 03723674.2.

Search Report dated Mar. 7, 2006 on European application No. 03728326.

Search Report dated Apr. 24, 2006 on European application No. 03728326.4.

Search Report dated Feb. 8, 2006 on European application No. 03752486.5.

Search Report dated Feb. 24, 2006 on European application No. 03759400.

Search Report dated Mar. 24, 2006 on European application No. 03759400.9.

Search Report dated Mar. 14, 2006 on European application No. 03793078.

Search Report dated Jun. 16, 2006 on European application No. 03793078.1.

Search Report dated Feb. 9, 2005 on European application No. 02806451.7.

Search. Report dated Nov. 7, 2005 on European application No. 03701281.

Search Report dated Nov. 22, 2005 on European application No. 03723674.2.

Examination Report dated Oct. 31, 2003 on British patent application No. 0219757.2.
Examination Report dated Nov. 25, 2003 on British patent application No. 0013661.4.
Examination Report dated Apr. 4, 2003 on British patent application No. 0208367.3.
Examination Report dated Nov. 4, 2003 on British patent application No. 0208367.3.
Examination Report dated Nov. 17, 2003 on British patent application No. 0208367.3.
Examination Report dated Jan. 30, 2004 on British patent application No. 0208367.3.
Examination Report dated Apr. 10, 2003 on British patent application No. 0212443.6.
Examination Report dated Feb. 9, 2004 on British patent application No. 0216409.3.
Examination Report dated Nov. 28, 2003 on British patent application No. 0300085.8.
Examination Report dated Dec. 1, 2003 on British patent application No. 030086.6.
Examination Report dated Sep. 10, 2004 on British patent application No. 0306046.4.
Examination Report dated Jul. 15, 2004 on British patent application No. 0314846.7.
Examination Report dated May 25, 2004 on British patent application No. 0320747.9.
Examination Report dated Jan. 31, 2006 on British patent application No. 03701281.2.
Examination Report dated Feb. 6, 2006 on British patent application No. 03723674.2.
Examination Report dated Oct. 29, 2004 on British patent application No. 0400018.8.
Examination Report dated Nov. 4, 2005 on British patent application No. 0400019.6.
Examination Report dated Oct. 29, 2004 on British patent application No. 0400019.6.
Examination Report dated Sep. 2, 2005 on British patent application No. 0400019.6.
Examination Report dated May 20, 2004 on British patent application No. 0404796.5.
Examination Report dated Jun. 28, 2004 on British patent application No. 0406257.6.
Examination Report dated Sep. 2, 2005 on British patent application No. 0406257.6.
Examination Report dated Feb. 21, 2006 on British patent application No. 0406257.6.
Examination Report dated Mar. 3, 2006 on British patent application No. 0406257.6.
Examination Report dated May 20, 2004 on British patent application No. 0406258.4.
Examination Report dated Jul. 12, 2004 on British patent application No. 0408672.4.
Examination Report dated Feb. 13, 2006 on British patent application No. 0412876.5.
Examination Report dated Dec. 8, 2004 on British patent application No. 0422419.2.
Examination Report dated Nov. 8, 2005 on British patent application No. 0422419.2.
Examination Report dated Dec. 15, 2005 on British patent application No. 0422893.8.
Examination Report dated Aug. 8, 2005 on British patent application No. 0422893.8.
Examination Report dated Nov. 24, 2005 on British patent application No. 0425948.7.
Examination Report dated Nov. 24, 2005 on British patent application No. 0425956.0.
Examination Report dated Feb. 9, 2005 on British patent application No. 0428141.5.
Examination Report dated Feb. 21, 2006 on British patent application No. 0428141.6.
Examination Report dated Apr. 5, 2006 on British patent application No. 0500275.3.
Examination Report dated Sep. 12, 2005 on British patent application No. 0500184.7.
Examination Report dated Sep. 6, 2005 on British patent application No. 0500600.2.
Examination Report dated Jan. 27, 2006 on British patent application No. 0501667.0.
Examination Report dated Nov. 15, 2005 on British patent application No. 0503250.3.
Examination Report dated Mar. 2, 2006 on British patent application No. 0503250.3.
Examination Report dated Sep. 22, 2005 on British patent application No. 0503470.7.
Examination Report dated Sep. 21, 2005 on British patent application No. 0506699.8.
Examination Report dated May 11, 2006 on British patent application No. 0506699.8.
Examination Report dated Jan. 17, 2006 on British patent application No. 0507979.3.
Examination Report dated Jun. 16, 2005 on British patent application No. 0507979.3.
Examination Report dated Sep. 29, 2005 on British patent application No. 0507980.1.
Examination Report dated Feb. 3, 2006 on British patent application No. 0509618.5.
Examination Report dated Feb. 14, 2006 on British patent application No. 0509620.1.
Examination Report dated Feb. 3, 2006 on British patent application No. 0509627.6.
Examination Report dated Feb. 3, 2006 on British patent application No. 0509629.2.
Examination Report dated Sep. 27, 2005 on British patent application No. 0509629.2.
Examination Report dated Feb. 3, 2006 on British patent application No. 0509630.0.
Examination Report dated Feb. 14, 2006 on British patent application No. 0509631.8.
Examination Report dated Nov. 9, 2005 on British patent application No. 0517448.7.
Examination Report dated Oct. 27, 2005 on British patent application No. 0518025.2.
Examination Report dated Nov. 29, 2005 on British patent application No. 0518039.3.
Examination Report dated Oct. 28, 2005 on British patent application No. 0518252.2.
Examination Report dated Nov. 9, 2005 on British patent application No. 0518799.2.
Examination Report dated Dec. 16, 2005 on British patent application No. 0518893.3.
Examination Report dated Mar. 8, 2006 on British patent application No. 0519989.8.
Examination Report dated Dec. 22, 2005 on British patent application No. 0521024.0.
Examination Report dated Dec. 13, 2005 on British patent application No. 0522050.4.
Examination Report dated Mar. 20, 2006 on British patent application No. 0602877.3.
Examination Report dated Aug. 28, 2002 on British patent application No. 0004285.3.
Examination Report dated Mar. 28, 2003 on British patent application No. 0004285.3.
Search and Examination Report dated Mar. 7, 2006 on British patent application No. 0522155.1.
Search and Examination Report dated Feb. 3, 2006 on British patent application No. 0525768.8.
Search and Examination Report dated Feb. 3, 2006 on British patent application No. 0525770.4.
Search and Examination Report dated Feb. 2, 2006 on British patent application No. 0525772.0.
Search and Examination Report dated Feb. 2, 2006 on British patent application No. 0525774.6.
Search and Examination Report dated Jun. 3, 2003 on British patent application No. 0004282.0.

Search and Examination Report dated Jul. 1, 2003 on British patent application No. 0225505.7.
Search and Examination Report dated Jun. 2, 2003 on British patent application No. 0308290.6.
Search and Examination Report dated Jun. 2, 2003 on British patent application No. 0308293.0.
Search and Examination Report dated Jul. 14, 2003 on British patent application No. 0308293.0.
Search and Examination Report dated Jun. 2, 2003 on British patent application No. 0308294.8.
Search and Examination Report dated Jul. 14, 2003 on British patent application No. 0308294.8.
Search and Examination Report dated Jun. 2, 2003 on British patent application No. 0308295.5.
Search and Examination Report dated Jul. 14, 2003 on British patent application No. 0308295.5.
Search and Examination Report dated Jun. 2, 2003 on British patent application No. 0308296.3.
Search and Examination Report dated Jul. 14, 2003 on British patent application No. 0308296.3.
Search and Examination Report dated Jun. 2, 2003 on British patent application No. 0308297.1.
Search and Examination Report dated Jul. 1, 2003 on British patent application No. 0308297.1.
Search and Examination Report dated Jun. 2, 2003 on British patent application No. 0308299.7.
Search and Examination Report dated Jun. 2, 2003 on British patent application No. 0308302.9.
Search and Examination Report dated Jun. 2, 2003 on British patent application No. 0308303.7.
Search and Examination Report dated Jul. 14, 2003 on British patent application No. 0308303.7.
Search and Examination Report dated Jun. 24, 2003 on British patent application No. 0310090.6.
Search and Examination Report dated Jun. 24, 2003 on British patent application No. 0310099.7.
Search and Examination Report dated Jun. 24, 2003 on British patent application No. 0310101.1.
Search and Examination Report dated Jun. 24, 2003 on British patent application No. 0310104.5.
Search and Examination Report dated Jun. 24, 2003 on British patent application No. 0310118.5.
Search and Examination Report dated Jun. 12, 2003 on British patent application No. 0310757.0.
Search and Examination Report dated Jun. 12, 2003 on British patent application No. 0310759.6.
Search and Examination Report dated Jun. 12, 2003 on British patent application No. 0310770.3.
Search and Examination Report dated Jun. 12, 2003 on British patent application No. 0310772.9.
Search and Examination Report dated Jun. 21, 2003 on British patent application No. 0310785.1.
Search and Examination Report dated Jun. 12, 2003 on British patent application No. 0310795.0.
Search and Examination Report dated Jun. 12, 2003 on British patent application No. 0310797.6.
Search and Examination Report dated Jun. 12, 2003 on British patent application No. 0310799.2.
Search and Examination Report dated Jun. 12, 2003 on British patent application No. 0310801.6.
Search and Examination Report dated Jun. 12, 2003 on British patent application No. 0310833.9.
Search and Examination Report dated Jun. 12, 2003 on British patent application No. 0310836.2.
Examination Report dated Aug. 7, 2003 on British patent application No. 0310836.2.
Search and Examination Report dated Sep. 3, 2003 on British patent application No. 0313406.1.
Search and Examination Report dated Aug. 14, 2003 on British patent application No. 0316883.8.
Search and Examination Report dated Nov. 25, 2003 on British patent application No. 0316883.8.
Search and Examination Report dated Aug. 14, 2003 on British patent application No. 0316886.1.
Search and Examination Report dated Nov. 25, 2003 on British patent application No. 0316886.1.
Search and Examination Report dated Aug. 14, 2003 on British patent application No. 0316887.9.
Search and Examination Report dated Nov. 25, 2003 on British patent application No. 0316887.9.
Search and Examination Report dated Sep. 3, 2003 on British patent application No. 0318545.1.
Search and Examination Report dated Sep. 3, 2003 on British patent application No. 0318547.4.
Search and Examination Report dated Sep. 3, 2003 on British patent application No. 0318547.7.
Search and Examination Report dated Sep. 3, 2003 on British patent application No. 0318549.3.
Search and Examination Report dated Sep. 3, 2003 on British patent application No. 0318550.1.
Search and Examination Report dated Dec. 16, 2003 on British patent application No. 0320579.6.
Search and Examination Report dated Dec. 17, 2003 on British patent application No. 0320580.4.
Search and Examination Report dated Dec. 19, 2003 on British patent application No. 0323891.2.
Search and Examination Report dated Nov. 4, 2003 on British patent application No. 0324172.6.
Search and Examination Report dated Nov. 4, 2003 on British patent application No. 0324172.6.
Search and Examination Report dated Nov. 4, 2003 on British patent application No. 0324174.2.
Search and Examination Report dated Nov. 18, 2003 on British patent application No. 0325071.9.
Examination Report dated Feb. 2, 2004 on British patent application No. 0325071.9.
Search and Examination Report dated Dec. 3, 2003 on British patent application No. 0325072.7.
Examination Report dated Feb. 5, 2004 on British patent application No. 0325072.7.
Examination Report dated Apr. 13, 2004 on British patent application No. 0325072.7.
Search and Examination Report dated Jun. 9, 2004 on British patent application No. 0403891.5.
Search and Examination Report dated Jun. 9, 2004 on British patent application No. 0403893.1.
Search and Examination Report dated Jun. 9, 2004 on British patent application No. 0403894.9.
Search and Examination Report dated Jun. 9, 2004 on British patent application No. 0403894.9.
Search and Examination Report dated Jun. 9, 2004 on British patent application No. 0403897.2.
Search and Examination Report dated Jun. 10, 2004 on British patent application No. 0403920.2.
Search and Examination Report dated Jun. 10, 2004 on British patent application No. 0403921.0.
Search and Examination Report dated Jun. 10, 2004 on British patent application No. 0403926.9.
Search and Examination Report dated Apr. 21, 2004 on British patent application No. 0404826.0.
Search and Examination Report dated Apr. 21, 2004 on British patent application No. 0404828.6.
Search and Examination Report dated Apr. 21, 2004 on British patent application No. 0404830.2.
Examination Report dated Aug. 17, 2004 on British patent application No. 0404830.2.
Search and Examination Report dated Apr. 21, 2004 on British patent application No. 0404832.8.
Search and Examination Report dated Apr. 21, 2004 on British patent application No. 0404833.6.
Search and Examination Report dated Aug. 19, 2004 on British patent application No. 0404833.6.
Search and Examination Report dated May 17, 2004 on British patent application No. 0404837.7.

Examination Report dated Jul. 12, 2004 on British patent application No. 0404837.7.
Search and Examination Report dated May 14, 2004 on British patent application No. 0404839.3.
Search and Examination Report dated May 14, 2004 on British patent application No. 0404842.7.
Search and Examination Report dated May 14, 2004 on British patent application No. 0404845.0.
Search and Examination Report dated May 17, 2004 on British patent application No. 0404849.2.
Search and Examination Report dated Jun. 30, 2004 on British patent application No. 0411698.4.
Search and Examination Report dated Jul. 14, 2004 on British patent application No. 0411892.3.
Search and Examination Report dated Jul. 15, 2004 on British patent application No. 0411893.1.
Search and Exainination Report dated Jul. 14, 2004 on British patent application No. 0411893.3.
Search and Examination Report dated Jun. 30, 2004 on British patent application No. 0411894.9.
Search and Examination Report dated Jul. 22, 2004 on British patent application No. 0412190.1.
Search and Examination Report dated Jul. 22, 2004 on British patent application No. 0412191.9.
Search and Examination Report dated Jul. 22, 2004 on British patent application No. 0412192.7.
Search and Examination Report dated Sep. 27, 2005 on British patent application No. 0412876.5.
Search and Examination Report dated Aug. 11, 2004 on. British patent application No. 0416834.0.
Search and Examination Report dated Nov. 16, 2004 on British patent application No. 0416834.0.
Search and Examination Report dated Aug. 25, 2004 on British patent application No. 0417810.9.
Search and Examination Report dated Aug. 25, 2004 on British patent application No. 0417811.7.
Search and Examination Report dated Aug. 25, 2004 on British patent application No. 0418005.5.
Search and Examination Report dated Sep. 10, 2004 on British patent application No. 0418425.5.
Search and Examination Report dated Sep. 10, 2004 on British patent application No. 0418426.3.
Search and Examination Report dated Sep. 10, 2004 on British patent application No. 0418427.1.
Search and Examination Report dated Sep. 10, 2004 on British patent application No. 0418429.7.
Search and Examination Report dated Sep. 10, 2004 on British patent application No. 0418429.7.
Search and Examination Report dated Sep. 10, 2004 on British patent application No. 0418430.5.
Search and Examination Report dated Sep. 10, 2004 on British patent application No. 0418431.3.
Search and Examination Report dated Sep. 10, 2004 on British patent application No. 0418432.1.
Search and Examination Report dated Sep. 10, 2004 on British patent application No. 0418433.9.
Search and Examination Report dated Sep. 10, 2004 on British patent application No. 0418439.6.
Search and Examination Report dated Sep. 10, 2004 on British patent application No. 0418442.0.
Search and Examination Report dated Nov. 24, 2004 on British patent application No. 0422893.8.
Search and Examination Report dated Nov. 12, 2004 on British patent application No. 0423416.7.
Search and Examination Report dated Nov. 12, 2004 on British patent application No. 0423417.5.
Search and Examination Report dated Nov. 12, 2004 on British patent application No. 0423418.3.
Search and Examination Report dated Apr. 14, 2005 on British patent application No. 0425948.7.
Search and Examination Report dated Apr. 14, 2005 on British patent application No. 0425951.1.
Search and Examination Report dated Apr. 14, 2005 on British patent application No. 0425956.0.
Search and Examination Report dated Jan. 12, 2005 on British patent application No. 0426155.8.
Search and Examination Report dated Jan. 12, 2005 on British patent application No. 0426156.6.
Search and Examination Report dated Jan. 12, 2005 on British patent application No. 0426157.4.
Search and Examination Report dated Feb. 15, 2005 on British patent application No. 0500600.2.
Search and Examination Report dated Mar. 21, 2005 on British patent application No. 0503470.7.
Search and Examination Report dated Jul. 22, 2005 on British patent application No. 0505039.8.
Search and Examination Report dated May 20, 2005 on British patent application No. 0506697.2.
Search and Examination Report dated Jun. 26, 2006 on British patent application No. 0506699.8.
Search and Examination Report dated Sep. 20, 2005 on British patent application No. 0506700.4.
Search and Examination Report dated Jun. 26, 2006 on British patent application No. 0506702.0.
Search and Examination Report dated Jun. 19, 2006 on British patent application No. 0507980.1.
Search and Examination Report dated Sep. 27, 2005 on British patent application No. 0509618.5.
Search and Examination Report dated Sep. 27, 2005 on British patent application No. 0509620.1.
Search and Examination Report dated Sep. 27, 2005 on British patent application No. 0509626.8.
Search and Examination Report dated Sep. 27, 2005 on British patent application No. 0509627.6.
Search and Examination Report dated Sep. 27, 2005 on British patent application No. 0509529.2.
Search and Examination Report dated Sep. 27, 2005 on British patent application No. 0509630.0.
Search and Examination Report dated Sep. 27, 2005 on British patent application No. 0509631.8.
Search and Examination Report dated Jul. 26, 2005 on British patent application No. 0512396.3.
Search and Examination Report dated Jul. 27, 2005 on British patent application No. 0512398.9.
Search and Examination Report dated Nov. 7, 2005 on British patent application No. 0516429.8.
Search and Examination Report dated Nov. 8, 2005 on British patent application No. 0516430.6.
Search and Examination Report dated Nov. 8, 2005 on British patent application No. 0516431.4.
Search and Examination Report dated Apr. 3, 2006 on British patent application No. 0521931.6.
Search and Examination Report dated Aug. 8, 2006 on British patent application No. 0522052.0.
Search and Examination Report dated Jan. 5, 2006 on British patent application No. 0522892.9.
Search and Examination Report dated Jan. 12, 2006 on British patent application No. 0523075.0.
Search and Examination Report dated Dec. 14, 2005 on British patent application No. 0523076.8.
Search and Examination Report dated Dec. 13, 2005 on British patent application No. 0523078.4.
Search and Examination Report dated Jan. 12, 2006 on British patent application No. 0523132.9.
Search and Examination Report dated Dec. 19, 2005 on British patent application No. 0524692.1.
Search and Examination Report dated Jan. 26, 2006 on British patent application No. 0525663.1.
Search and Examination Report dated Sep. 25, 2006 on British patent application No. 0602877.3.
Search and Examination Report dated Jul. 19, 2006 on British patent application No. 0609173.0.
Search and Examination Report dated Nov. 2, 2006 on British patent application No. 0613405.0.

Search and Examination Report dated Nov. 2, 2006 on British patent application No. 0613406.8.
Search Report dated Mar. 9, 2005 on British patent application No. 0415835.8.
Search Report dated Mar. 10, 2005 on British patent application No. 0415835.8.
Search Report dated Dec. 2, 2004 on British patent application No. 0415835.8.
Search Report dated Mar. 7, 2006 on British patent application No. 0519989.8.
Search Report dated Jul. 13, 2000 on British patent application No. 0003251.6.
Search Report dated Jan. 15, 2001 on British patent application No. 0004282.0.
Search Report dated Jul. 31, 2001 on British patent application No. 0004282.0.
Search Report dated Jul. 14, 2000 on British patent application No. 0004285.3.
Search Report dated Jan. 17, 2001 on British patent application No. 0004285.3.
Search Report dated Aug. 28, 2002 on British patent application No. 0004285.3.
Search Report dated Jul. 24, 2000 on British patent application No. 0005399.1.
Search Report dated Feb. 15, 2001 on British patent application No. 0005399.1.
Search Report dated Oct. 23, 2000 on British patent application No. 0013661.4.
Search Report dated Apr. 18, 2001 on British patent application No. 0013661.4.
Search Report dated Feb. 20, 2003 on British patent application No. 0013661.4.
Search Report dated Nov. 26, 2002 on British patent application No. 0219757.2.
Search Report dated Jan. 21, 2003 on British patent application No. 0219757.2.
Search Report dated Dec. 6, 2002 on British patent application No. 0220872.6.
Search Report dated Mar. 13, 2003 on British patent application No. 0220872.6.
Examination Report dated Oct. 29, 2004 on British patent application No. 0220872.6.
Search Report dated Mar. 6, 2003 on British patent application No. 0225505.7.
Examination Report dated Oct. 27, 2004 on British patent application No. 0225505.7.
Search Report dated Apr. 24, 2006 on British patent application No. 0507980.1.
Search Report dated Mar. 27, 2000 on British patent application No. 9926449.1.
Search Report dated Mar. 30, 2000 on British patent application No. 9926449.1.
Search Report dated Jul. 4, 2001 on British patent application No. 9926449.1.
Search Report dated Sep. 5, 2001 on British patent application No. 9926449.1.
Search Report dated Feb. 28, 2000 on British patent application No. 9926450.9.
Search Report dated May 15, 2000 on British patent application No. 9926450.9.
Search Report dated Nov. 22, 2002 on British patent application No. 9926450.9.
Search Report dated Jun. 27, 2000 on British patent application No. 9930398.4.
Examination Report dated Feb. 15, 2007 on Norwegian patent application No. 1999 5991.
Examination Report dated Sep. 20, 2006 on Norwegian patent application No. 2000 2876.
Examination Report dated Jan. 24, 2007 on Norwegian patent application No. 2002 0070.
Search Report dated Aug. 20, 2002 on Norwegian patent application 1999 5593.
Search Report dated May 13, 2006 on Norwegian patent application No. 2002 1613.
Search Report dated May 29, 2006 on Norwegian patent application No. 2002 3885.
Combined Search Report and Written Opinion dated Apr. 17, 2006 on PCT/US05/28869.
International Preliminary Examination Report dated Sep. 4, 2003 on PCT/US01/28960.
International Preliminary Examination Report dated Aug. 6, 2004 on PCT/US02/24399.
International Preliminary Examination Report dated Jun.1, 2005 on PCT/US02/25608.
International Preliminary Examination Report dated Jul. 7, 2004 on PCT/US02/25727.
International Preliminary Examination Report dated Apr. 14, 2004 on PCT/US02/36157.
International Preliminary Examination Report dated Jan. 4, 2005 on PCT/US02/36267.
International Preliminary Examination Report dated Feb. 18, 2005 on PCT/US02/39418.
International Preliminary Examination Report dated Nov. 8, 2005 on PCT/US02/39425.
International Preliminary Examination Report dated Dec. 9, 2004 on PCT/US03/04837.
International Preliminary Examination Report dated May 10, 2005 on PCT/US03/06544.
International Preliminary Examination Report dated Jul. 7, 2004 on PCT/US03/10144.
International Preliminary Examination Report dated Aug. 15, 2005 on PCT/US03/11765.
International Preliminary Examination Report dated Sep. 16, 2004 on PCT/US03/11765.
International Preliminary Examination Report dated Dec. 10, 2004 on PCT/US03/11765.
International Preliminary Examination Report dated Jul. 18, 2005 on PCT/US03/11765.
International Preliminary Examination Report dated Mar. 2, 2005 on PCT/US03/13787.
International Preliminary Examination Report dated Apr. 7, 2005 on PCT/US03/13787.
International Preliminary Examination Report dated May 12, 2005 on PCT/US03/14153.
International Preliminary Examination Report dated Nov. 14, 2005 on PCT/US03/15020.
International Preliminary Examination Report dated May 9, 2005 on PCT/US03/15020.
International Preliminary Examination Report dated Sep. 30, 2004 on PCT/US03/20870.
International Preliminary Examination Report dated May 25, 2005 on PCT/US03/25667.
International Preliminary Examination Report dated Aug. 30, 2005 on PCT/US03/25675.
International Preliminary Examination Report dated Aug. 17, 2004 on PCT/US03/25676.
International Preliminary Examination Report dated Aug. 17, 2004 on PCT/US03/25677.
International Preliminary Examination Report dated Dec. 20, 2004 on PCT/US03/25742.
International Preliminary Examination Report dated Dec. 8, 2004 on PCT/US03/29460.
International Preliminary Examination Report dated May 23, 2005 on PCT/US03/29858.
International Preliminary Examination Report dated Aug. 16, 2004 on PCT/US03/29859.
International Preliminary Examination Report dated May 23, 2005 on PCT/US03/38550.
International Preliminary Report on Patentability, Application PCT/US04/00631, Mar. 2, 2006.
International Preliminary Report on Patentability, Application PCT/US04/11973, Dec. 27, 2006.
International Preliminary Report on Patentability, Application PCT/US04/02122, May 13, 2005.

International Preliminary Report on Patentability, Application PCT/US04/04740, Jun. 27, 2006.
International Preliminary Report on Patentability, Application PCT/US04/04740, Apr. 27, 2005.
International Preliminary Report on Patentability, Application PCT/US04/06246, May 5, 2005.
International Preliminary Report on Patentability, Application PCT/US04/08030, Apr. 7, 2005.
International Preliminary Report on Patentability, Application PCT/US04/08030, Mar. 17, 2003.
International Preliminary Report on Patentability, Application PCT/US04/08030, Jun. 10, 2005.
International Preliminary Report on Patentability, Application PCT/US04/08073, May 9, 2005.
International Preliminary Report on Patentability, Application PCT/US04/08170, Jan. 13, 2005.
International Preliminary Report on Patentability, Application PCT/US04/08170, Sep. 29, 2005.
International Preliminary Report on Patentability, Application PCT/US04/08171, Sep. 13, 2005.
International Preliminary Report on Patentability, Application PCT/US04/10317, Jun. 23, 2006.
International Preliminary Report on Patentability, Application PCT/US04/11177, Jun. 9, 2005.
International Preliminary Report on Patentability, Application PCT/US04/28423, Jul. 13, 2005.
International Preliminary Report on Patentability, Application PCT/US04/28423, Jun. 19, 2006.
International Preliminary Report on Patentability, Application PCT/US04/28438, Sep. 20, 2005.
International Preliminary Report on Patentability, Application PCT/US04/28438, Sep. 20, 2005.
International Preliminary Report on Patentability, Application PCT/US04/28887, Sep. 27, 2006.
International Preliminary Report on Patentability, Application PCT/US04/28889, Aug. 1, 2006.
International Preliminary Report on Patentability, Application PCT/US05/28642, Jul. 14, 2006.
International Preliminary Report on Patentability, Application PCT/US05/28819, Feb. 12, 2007.
International Search Report, Application PCT/IL00/00245, Sep. 18, 2000.
International Search Report, Application PCT/US00/18635, Nov. 24, 2000.
International Search Report, Application PCT/US00/27645, Dec. 19, 2000.
International Search Report, Application PCT/US00/30022, Mar. 27, 2001.
International Search Report, Application PCT/US01/04753, Jul. 3, 2001.
International Search Report, Application PCT/US01/19014, Nov. 23, 2001.
International Search Report, Application PCT/US01/23815, Nov. 16, 2001.
International Search Report, Application PCT/US01/28960, Jan. 22, 2002.
International Search Report, Application PCT/US01/30256, Jan. 3, 2002.
International Search Report, Application PCT/US01/41446, Oct. 30, 2001.
International Search Report, Application PCT/US02/00093, May 30, 2002.
International Search Report, Application PCT/US02/00093, Aug. 6, 2002.
International Search Report, Application PCT/US02/00677, Jul. 17, 2002.
International Search Report, Application PCT/US02/00677, Feb. 24, 2004.
International Search Report, Application PCTIUS02/04353, Jun. 24, 2002.
International Search Report, Application PCT/US02/20256, Jan. 3, 2003.
International Search Report, Application PCT/US02/20477, Oct. 31, 2003.
International Search Report, Application PCT/US02/20477, Apr. 6, 2004.
International Search Report, Application PCT/US02/24399, Feb. 20, 2004.
International Search Report, Application PCT/US02/24399, Feb. 27, 2004.
International Search Report, Application PCT/US02/24399, Aug. 6, 2004.
International Search Report, Application PCT/US02/25608, May 24, 2004.
International Search Report, Application PCT/US02/25727, Feb. 19, 2004.
Examination Report, Application PCT/US02/25727, Jul. 7, 2004.
International Search Report, Application PCT/US02/29856, Dec. 16, 2002.
International Search Report, Application PCT/US02/36157, Sep. 29, 2003.
International Search Report, Application PCT/US02/36267, May 21, 2004.
International Search Report, Application PCT/US02/39418, Mar. 24, 2003.
International Search Report, Application PCT/US02/39425, May 28, 2004.
International Search Report, Application PCT/US03/00609, May 20, 2004.
International Search Report, Application PCT/US03/04837, May 28, 2004.
International Search Report, Application PCT/US03/06544, Jun. 9, 2004.
International Search Report, Application PCT/US03/10144, Oct. 31, 2003.
International Search Report, Application PCT/US03/11765, Nov. 13, 2003.
International Search Report, Application PCT/US03/13787, May 28, 2004.
International Search Report, Application PCT/US03/14153, May 28, 2004.
International Search Report, Application PCT/US03/15020, Nov. 14, 2005.
International Search Report, Application PCT/US03/15020, Jul. 30, 2003.
International Search Report, Application PCT/US03/18530, Jun. 24, 2004.
International Search Report, Application PCT/US03/19993, May 24, 2004.
International Search Report, Application PCT/US03/20694, Nov. 12, 2003.
International Search Report, Application PCT/US03/20870, May 24, 2004.
International Search Report, Application PCT/US03/20870, Sep. 30, 2004.
International Search Report, Application PCT/US03/24779, Mar. 3, 2004.
International Search Report, Application PCT/US03/25667, Feb. 26, 2004.
International Search Report, Application PCT/US03/25675, May 25, 2004.
International Search Report, Application PCT/US03/25676, May 17, 2004.
International Search Report, Application PCT/US03/25677, May 21, 2004.
International Search Report, Application PCT/US03/25707, Jun. 23, 2004.
International Search Report, Application PCT/US03/25715, Apr. 9, 2004.
International Search Report, Application PCT/US03/25716, Jan. 16, 2005.
International Search Report, Application PCT/US03/25742, May 27, 2004.
International Search Report, Application PCT/US03/29460, May 25, 2004.

International Search Report, Application PCT/US03/29858, Jun. 30, 2004.
International Search Report, Application PCT/US03/29859, May 21, 2004.
International Search Report, Application PCT/US03/38550, Jun. 15, 2004.
International Search Report, Application PCT/US04/00631, Mar. 28, 2005.
International Search Report, Application PCT/US04/10317, May 25, 2006.
International Search Report, Application PCT/US04/28831, Dec. 19, 2005.
International Search Report, Application PCT/US04/28889, Nov. 14, 2005.
International Search Report, Application PCT/US05/28669, Apr. 17, 2006.
International Search Report and Written Opinion, Application PCT/US04/26345, Oct. 5, 2006.
International Search Report and Written Opinion, Application PCT/US05/28446, Oct. 27, 2006.
International Search Report and Written Opinion, Application PCT/US06/02449, Oct. 24, 2006.
International Search Report and Written Opinion, Application PCT/US04/10762, Sep. 1, 2005.
International Search Report and Written Opinion, Application PCT/US04/00631, Mar. 28, 2005.
International Search Report and Written Opinion, Application PCT/US04/02122, Feb. 24, 2005.
International Search Report and Written Opinion, Application PCT/US04/04740, Jan. 19, 2005.
International Search Report and Written Opinion, Application PCT/US04/06246, Jan. 26, 2005.
International Search Report and Written Opinion, Application PCT/US04/07711, Nov. 28, 2006.
International Search Report and Written Opinion, Application PCT/US04/08030, Jan. 6, 2005.
International Search Report and Written Opinion, Application PCT/US04/08073, Mar. 4, 2005.
International Search Report and Written Opinion, Application PCT/US04/08170, Jan. 13, 2005.
International Search Report and Written Opinion, Application PCT/US04/08171, Feb. 16, 2005.
International Search Report and Written Opinion, Application PCT/US04/11177, Feb. 14, 2005.
International Search Report and Written Opinion, Application PCT/US04/11973, Sep. 27, 2005.
International Search Report and Written Opinion, Application PCT/US04/28423, Jul. 13, 2005.
International Search Report and Written Opinion, Application PCT/US04/28438, Mar. 14, 2005.
International Search Report and Written Opinion, Application PCT/US05/28473, Sep. 1, 2006.
International Search Report and Written Opinion, Application PCT/US05/28642, Jul. 14, 2006.
International Search Report and Written Opinion, Application PCT/US05/28819, Aug. 3, 2006.
International Search Report and Written Opinion, Application PCT/US06/04809, Aug. 29, 2006.
International Search Report and Written Opinion, Application PCT/US06/09886, Dec. 4, 2006.
Written Opinion, Application PCT/US01/19014, Dec. 10, 2002.
Written Opinion, Application PCT/US01/23815, Jul. 25, 2002.
Written Opinion, Application PCT/US01/28960, Dec. 2, 2002.
Written Opinion, Application PCT/US01/30256, Nov. 11, 2002.
Written Opinion, Application PCT/US01/30256, Nov. 27, 2002.
Written Opinion, Application PCT/US02/00093, Apr. 21, 2003.
Written Opinion, Application PCT/US02/00677, Apr. 17, 2003.
Written Opinion, Application PCT/US02/04353, Apr. 11, 2003.
Written Opinion, Application PCT/US02/20256, May 9, 2003.
Written Opinion, Application PCT/US02/24399, Apr. 28, 2004.
Written Opinion, Application PCT/US02/25608, Sep. 13, 2004.
Written Opinion, Application PCT/US02/25608, Feb. 2, 2005.
Written Opinion, Application PCT/US02/25727, May 17, 2004.
Written Opinion, Application PCT/US02/39418, Jun. 9, 2004.
Written Opinion, Application PCT/US02/39425, Nov. 22, 2004.
Written Opinion, Application PCT/US02/39425, Apr. 11, 2005.
Written Opinion, Application PCT/US03/06544, Feb. 18, 2005.
Written Opinion, Application PCT/US03/11765, May 11, 2004.
Written Opinion, Application PCT/US03/13787, Nov. 9, 2004.
Written Opinion, Application PCT/US03/14153, Sep. 9, 2004.
Written Opinion, Application PCT/US03/14153, Nov. 9, 2004.
Written Opinion, Application PCT/US03/18530, Sep. 13, 2004.
Written Opinion, Application PCT/US03/19993, Oct. 15, 2004.
Written Opinion, Application PCT/US03/25675, May 9, 2005.
Written Opinion, Application PCT/US03/29858, Jan. 21, 2005.
Written Opinion, Application PCT/US03/38550, Dec. 10, 2004.
Written Opinion, Application PCT/US04/08171, May 5, 2005.
Written Opinion, Application PCT/US04/29025, Jan. 4, 2007.
Examination Report dated Feb. 13, 2007 on Australian Patent Application No. 2002367017.
Examination Report dated Oct. 13, 2006 on Australian Patent Application No. 200400246.
Examination Report dated Sep. 22, 2006 on Australian Patent Application No. 2004200248.
Examination Report dated Jun. 5, 2007 on Brazilian patent application No. PI 9906143-0.
Examination Report dated Jul. 3, 2007 on Canadian Patent Application No. 2536623.
Examination Report dated Jun. 12, 2007 on Canadian Patent Application No. 2516140.
Examination Report dated Feb. 20, 2007 on Canadian Patent Application No. 2428819.
Examination Report dated Feb. 26, 2007 on Canadian Patent Application No. 2389094.
Examination Report dated Jul. 4, 2007 on European Patent Application No. 3728326.4.
Examination Report dated Apr. 2, 2007 on European. Patent Application No. 3701281.2.
Examination Report dated Mar. 15, 2007 on British patent application No. 602877.3.
Examination Report dated Sep. 17, 2007 on British patent application No. 602877.3.
Examination Report dated Sep. 18, 2007 on British patent application No. 604359.
Examination Report dated Sep. 13, 2007 on British Patent application No. 604360.8.
Examination Report dated May 23, 2007 on British patent application No. 621060.3.
Examination Report dated Jul. 23, 2007 on British patent application No. 621060.3.
Examination Report dated Jun. 21, 2007 on British patent application No. 621059.5.
Examination Report dated Aug. 8, 2007 on British patent application No. 621059.5.
Examination Report dated Jun. 21, 2007 on British patent application No. 621053.8.
Examination Report dated Aug. 13, 2007 on British patent application No. 621053.8.
Examination Report dated Aug. 17, 2007 on British patent application No. 603576.
Examination. Report dated Aug. 7, 2007 on British patent application No. 613924.
Examination Report dated Feb. 28, 2007 on British patent application No. 621062.9.
Examination Report dated May 23, 2007 on British patent application No. 621062.9.
Examination Report dated Jul. 23, 2007 on British patent application No. 621062.9.
Examination Report dated Apr. 5, 2007 on British patent application No. 613406.8.
Examination Report dated Jun. 22, 2007 on British patent application No. 609173.
Examination Report dated Sep. 14, 2007 on British patent application No. 623634.3.
Examination Report dated Jul. 5, 2007 on British patent application No. 624328.1.

Examination Report dated Sep. 4, 2007 on British patent application No. 624328.1.
Examination Report dated Aug. 7, 2007 on British patent application No. 624327.3.
Examination Report dated Sep. 5, 2007 on British patent application No. 624394.3.
Examination Report dated Sep. 5, 2007 on British patent application No. 624768.
Examination Report dated Sep. 13, 2007 on British patent application No. 624779.5.
Examination Report dated Aug. 15, 2007 on British patent application No. 625615.
Examination Report dated Jul. 26, 2007 on British patent application No. 522049.6.
Examination Report dated Mar. 5, 2007 on British patent application No. 522049.6.
Examination Report dated Sep. 7, 2007 on British patent application No. 522049.6.
Examination Report dated Aug. 13, 2007 on British patent application No. 625636.6.
Examination Report dated Jul. 16, 2007 on British patent application No. 522155.1.
Search and Examination Report dated Aug. 16, 2007 on British patent application No. 621054.6.
Search and Examination Report dated Mar. 30, 2007 on British patent application No. 702797.2.
Search and Examination Report dated Aug. 2, 2007 on British Patent application No. 702797.2.
Search and Examination Report dated Mar. 19, 2007 on British patent application No. 624327.3.
Search and Examination Report dated Aug. 15, 2007 on British patent application No. 624327.3.
Search and Examination Report dated Mar. 19, 2007 on British patent application No. 625615.
Search and Examination Report dated Jun. 28, 2007 on British patent application No. 707073.3.
Search and Examination Report dated Jul. 31, 2007 on British patent application No. 706794.5.
Search and Examination Report dated Jun. 7, 2007 on British patent application No. 706799.4.
Search and Examination Report dated Sep. 3, 2007 on British patent application No. 715477.6.
Search and Examination Report dated Sep. 3, 2007 on British patent application No. 715478.4.
Search and Examination Report dated Sep. 3, 2007 on British patent application No. 715362.
Search and Examination Report dated Sep. 4, 2007 on British patent application No. 715357.
Search and Examination Report dated Sep. 4, 2007 on British patent application No. 715365.3.
Search and Examination Report dated Mar. 15, 2007 on British patent application No. 625636.6.
Search and Examination Report dated Mar. 15, 2007 on British patent application No. 624394.3.
Search and Examination Report dated Mar. 15, 2007 on British patent application No. 604357.4.
Search and Examination Report dated Mar. 15, 2007 on British patent application No. 623631.9.
Search and Examination Report dated Mar. 15, 2007 on British patent application No. 623634.3.
Search and Examination Report dated Apr. 24, 2007 on British patent application No. 702989.5.
Search and Examination Report dated Mar. 15, 2007 on British patent application No. 624779.5.
Search and Examination Report dated Mar. 15, 2007 on British patent application No. 624790.2.
Search and Examination Report dated Mar. 15, 2007 on British patent application No. 603995.2.
Search and Examination Report dated Mar. 15, 2007 on British patent application No. 6043593.
Search and Examination Report dated Mar. 15, 2007 on British patent application No. 604360.8.
Search Report Jun. 6, 2007 on British patent application No. 613406.8.
Substantive Examination dated Jul. 25, 2007 on Mexican patent application No. PA/A/2004/006681.
Examination Report dated Aug. 31, 2007 on Norwegian Patent Application No. 20002876.
Examination Report dated May 23, 2007 on Norwegian patent application No. 20001281.
Examination Report dated Jul. 26, 2007 on Norwegian patent application No. 20021613.
Examination Report dated Oct. 10, 2005 on Norwegian patent application No. 20000924.
Examination Report dated Aug. 3, 2007 on Norwegian patent application No. 20000924.
International Preliminary Exam Report, application PCT/US06/009886, May 23, 2007.

* cited by examiner

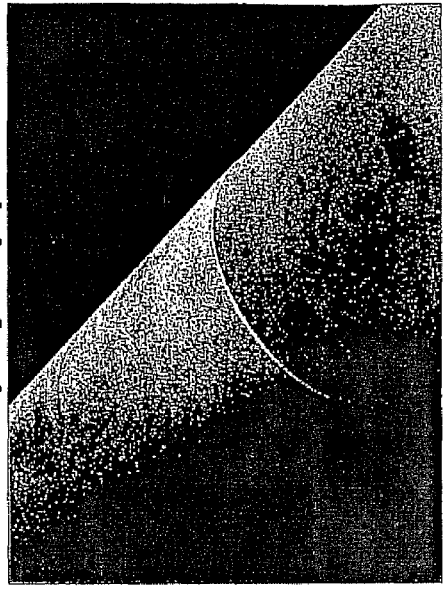
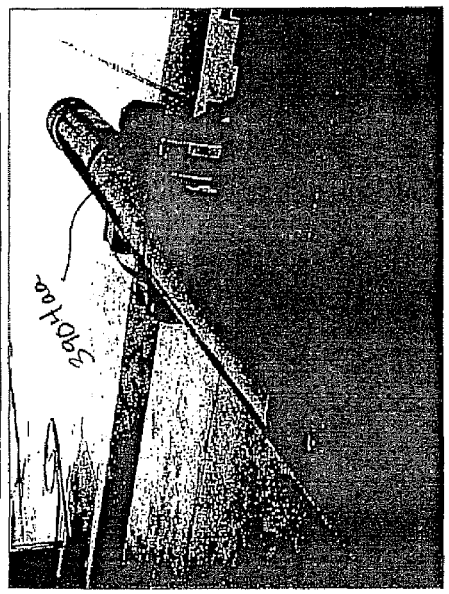
FIGURE 41c

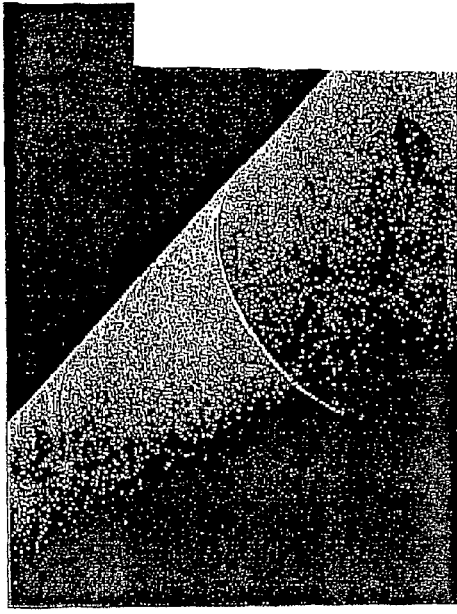
FIGURE 41d

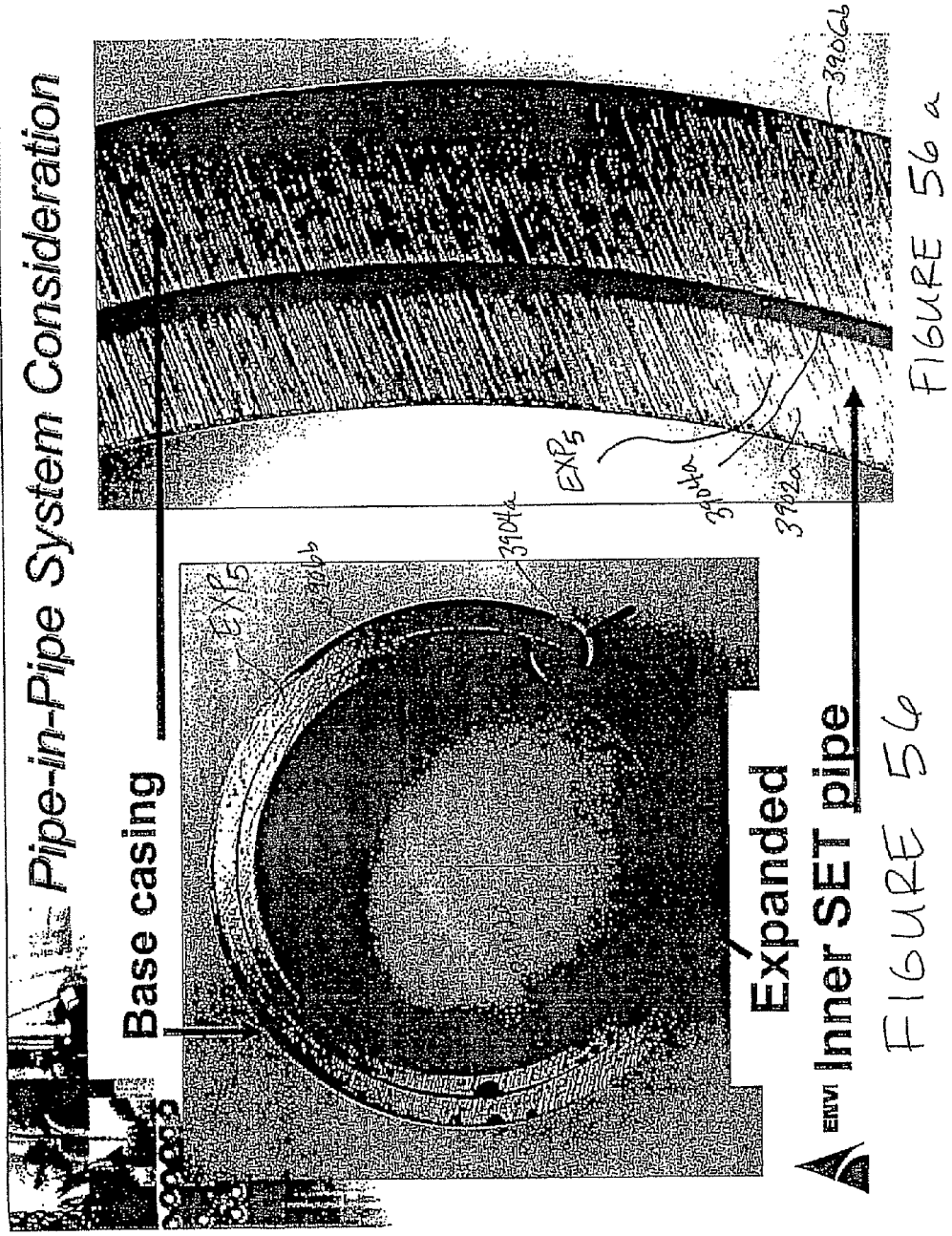

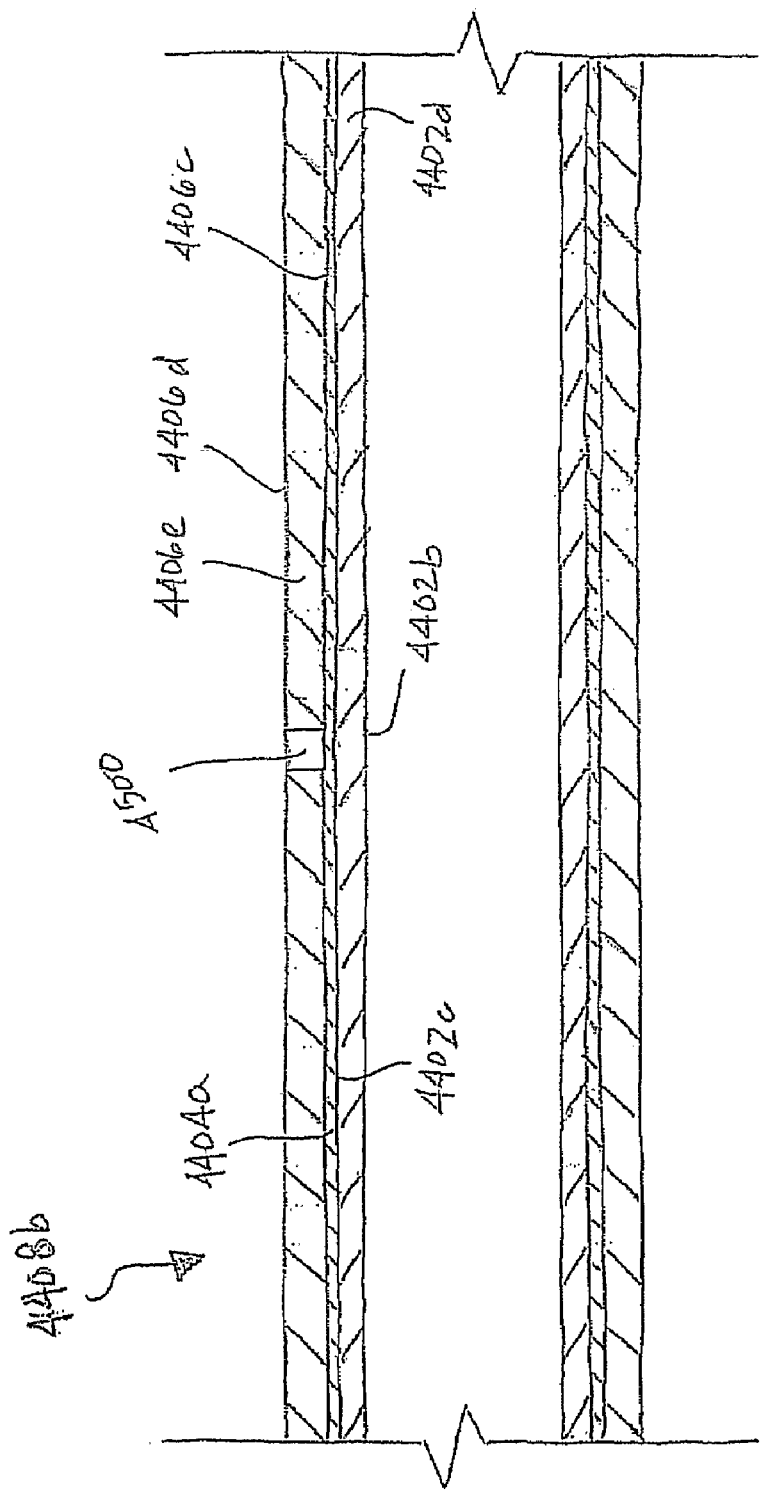

Treatment: Plastic Coating
Collapse at Pressure: 14238 PSI
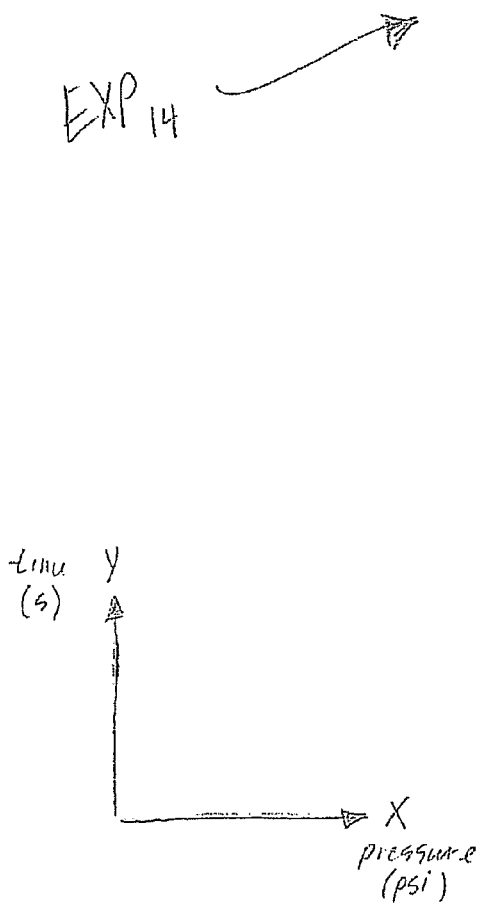
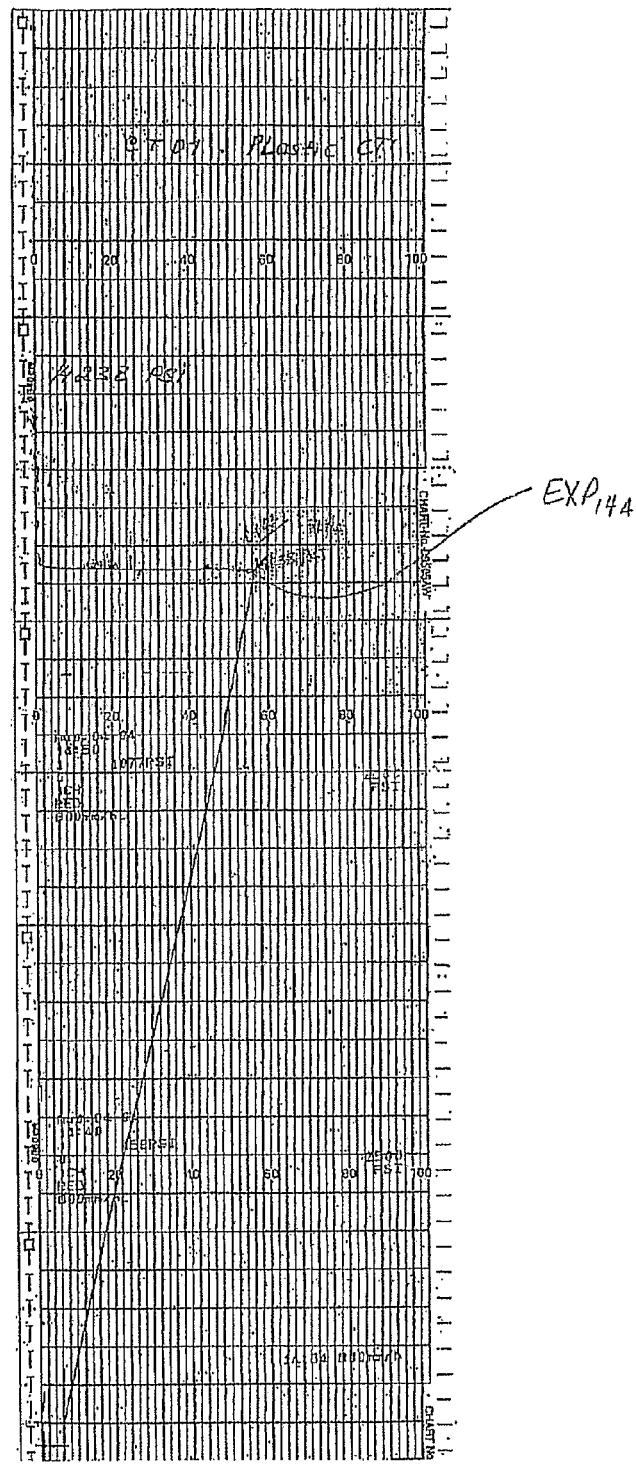
FIGURE 72

Treatment: Aluminum Coating
Collapse at Pressure: 20730 PSI
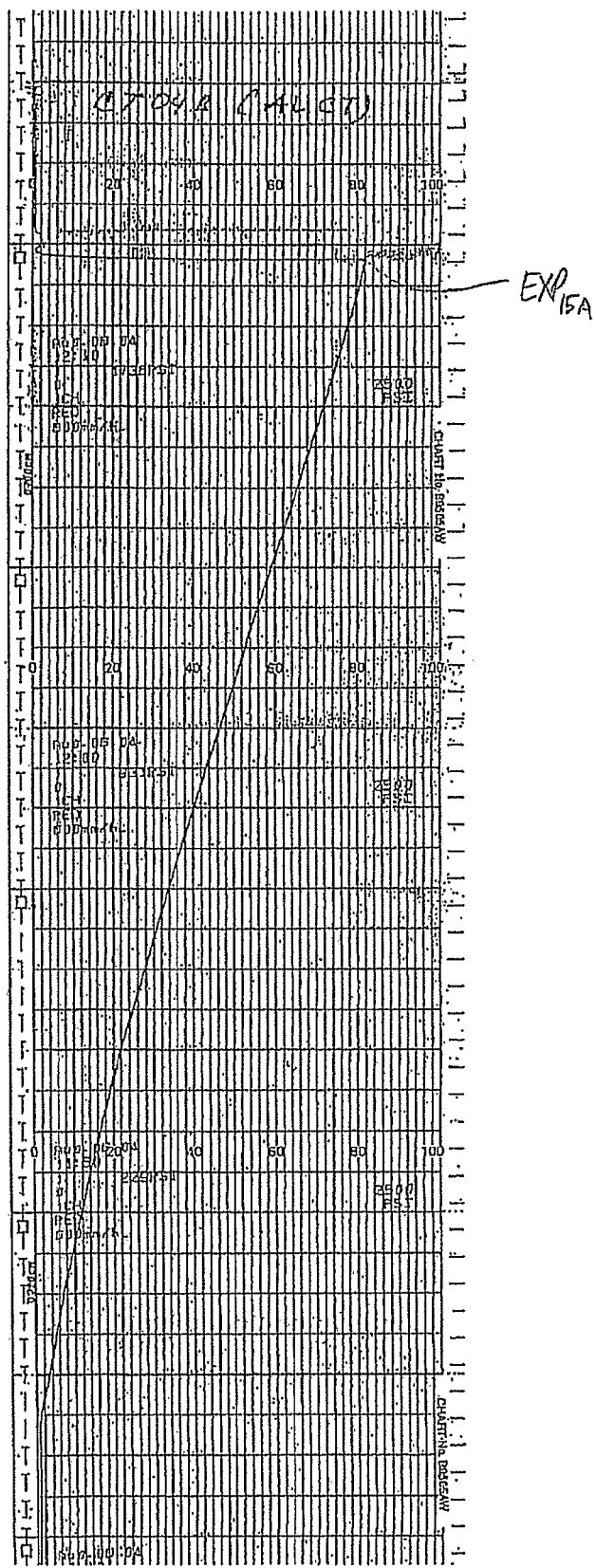
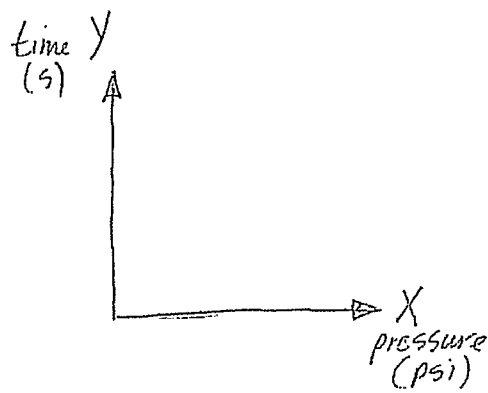
FIGURE 73

Treatment: Aluminum Zinc Coating
Collapse at Pressure: 20200 PSI
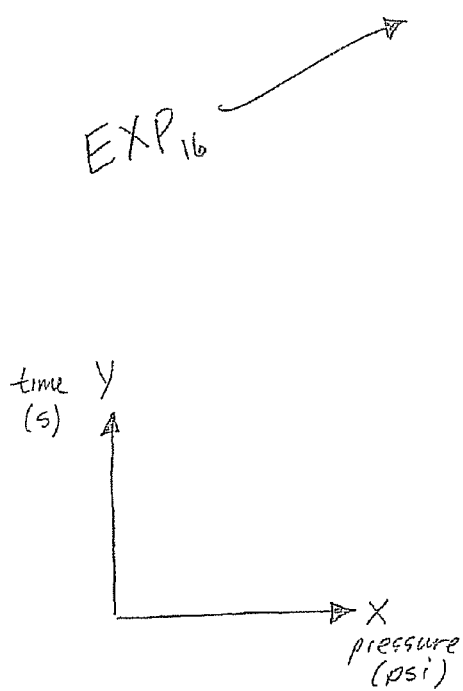
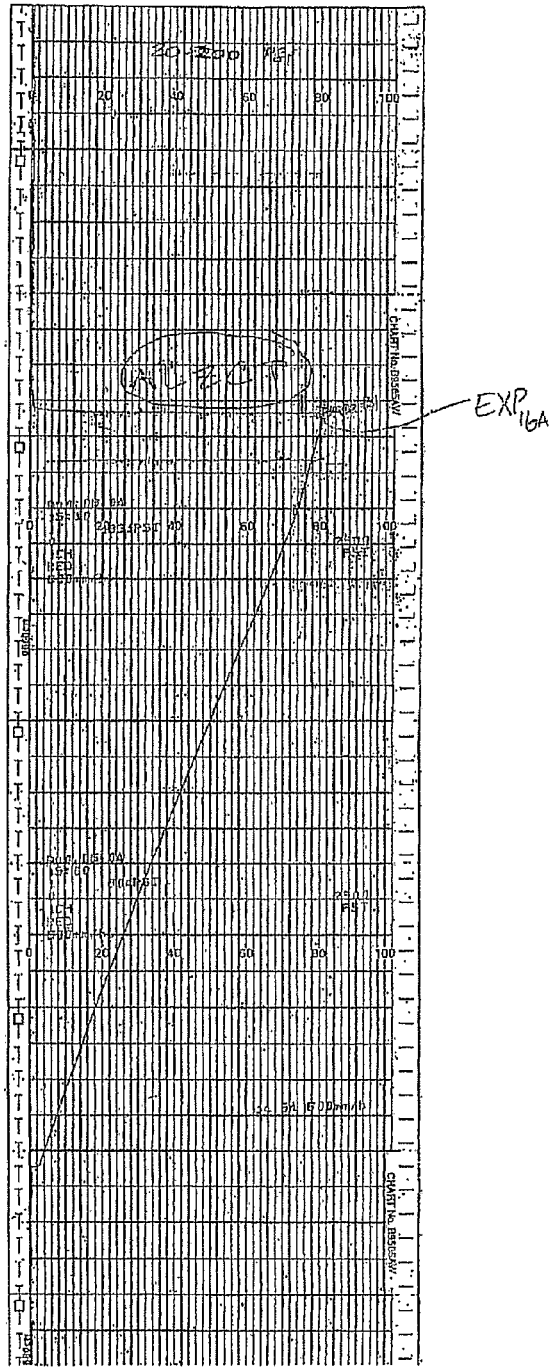
FIGURE 74

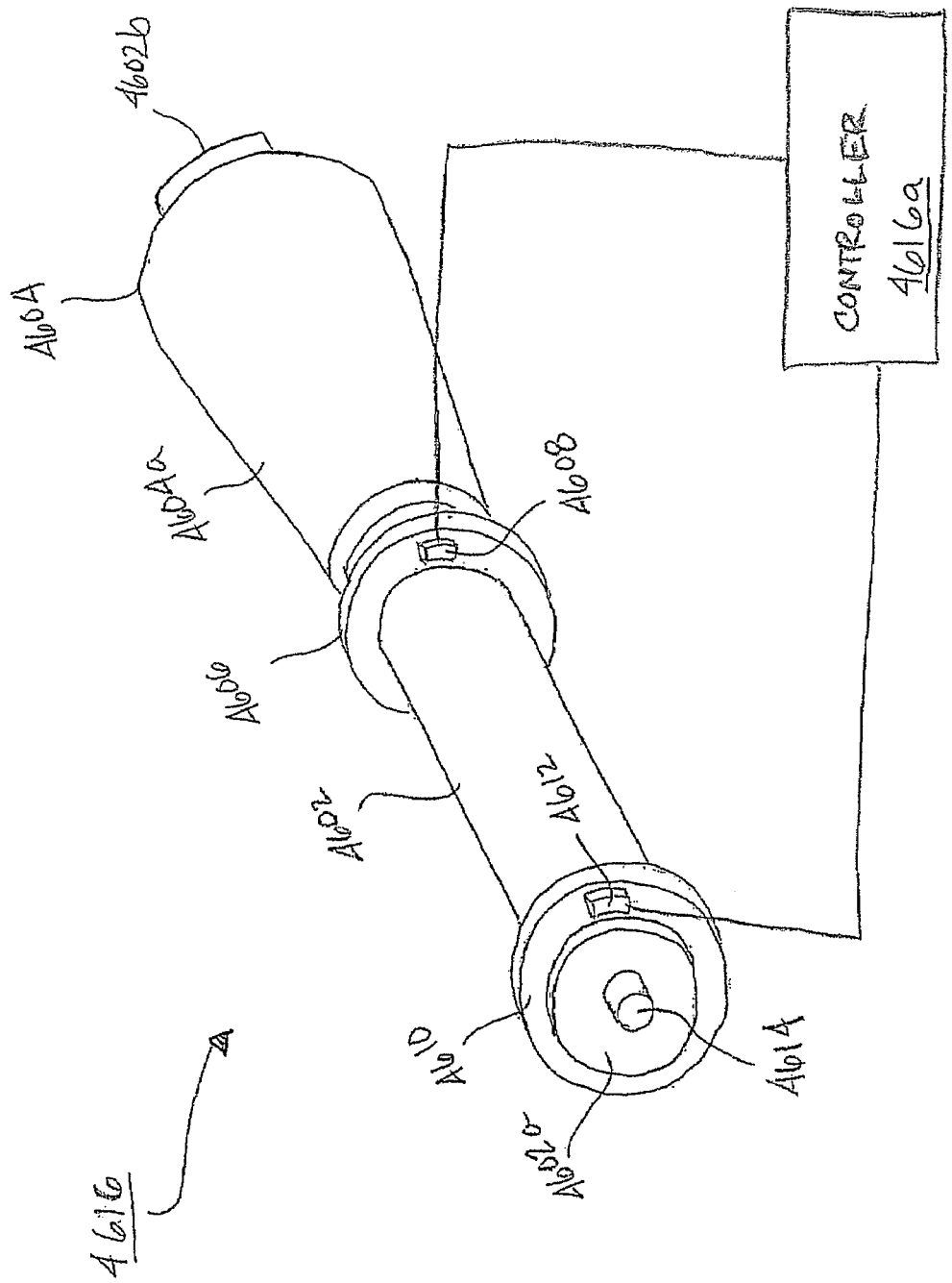

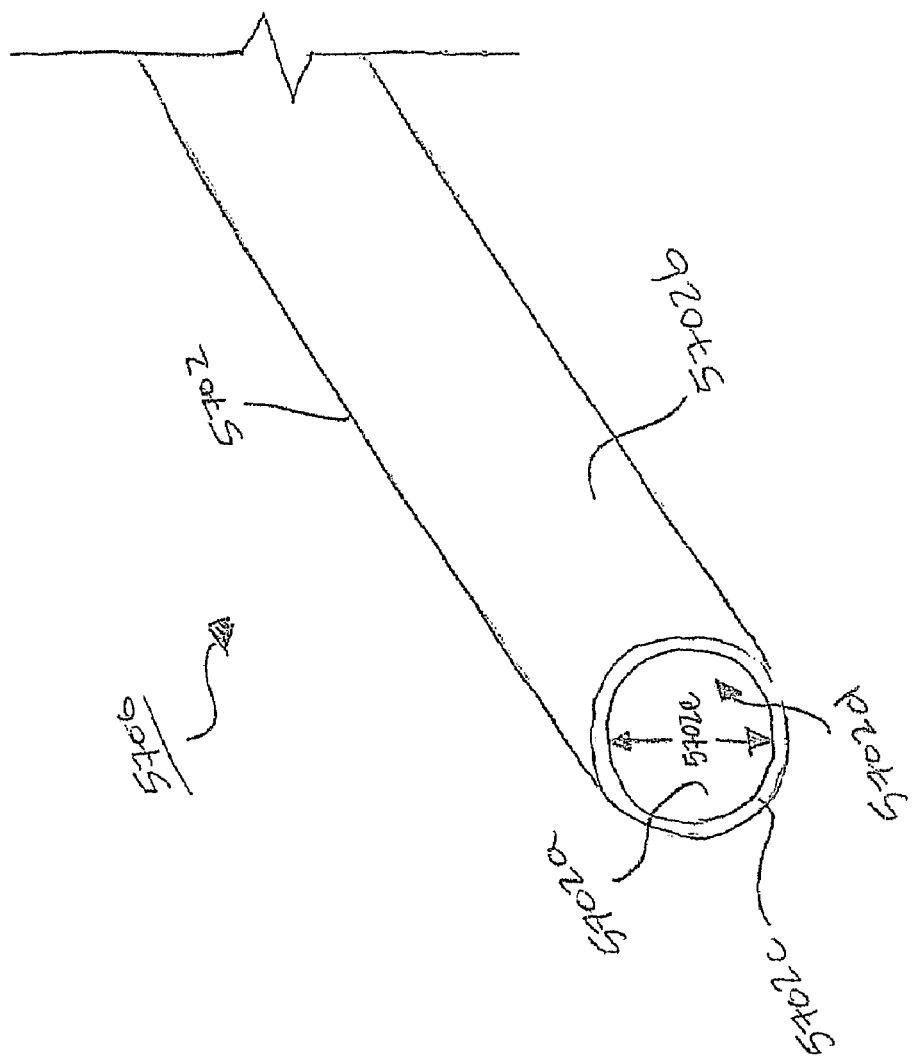

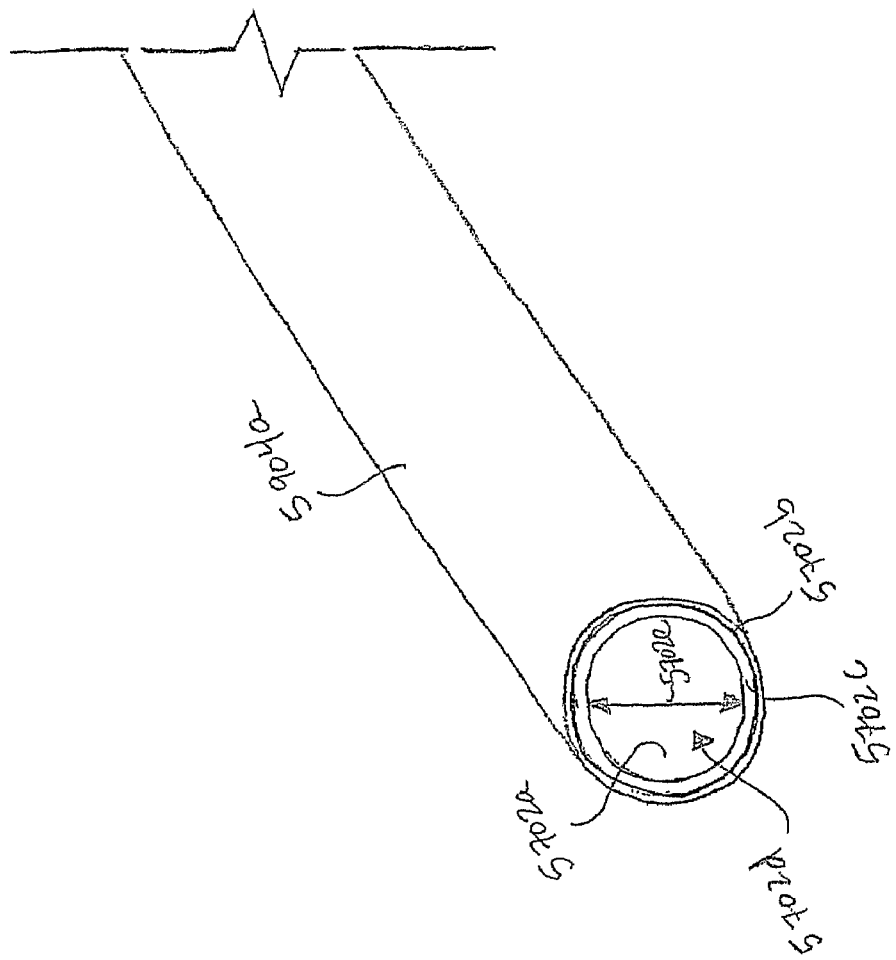

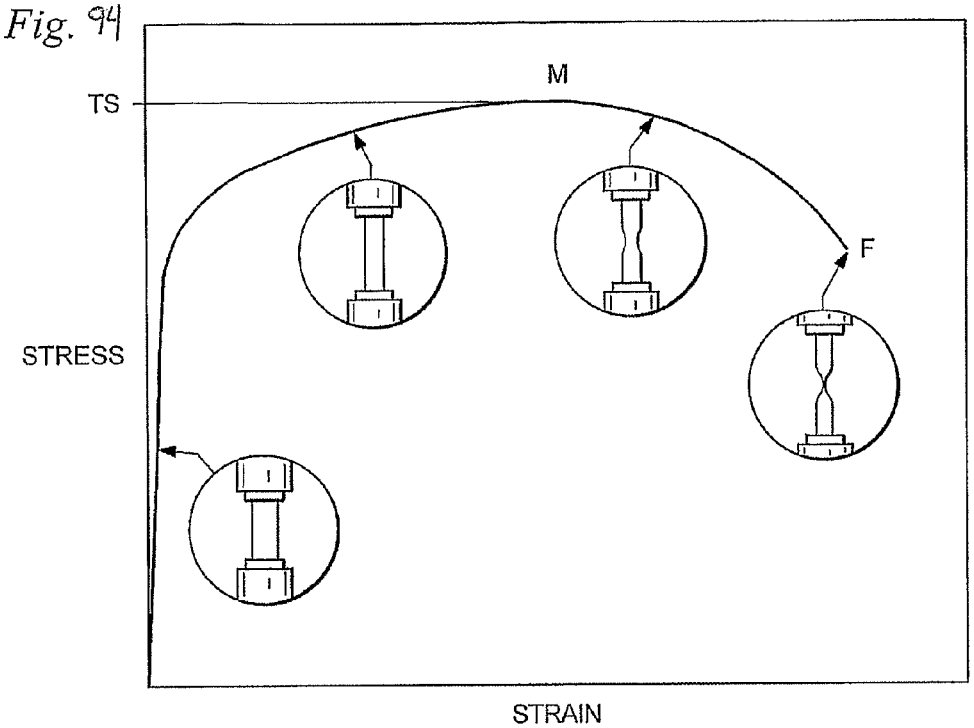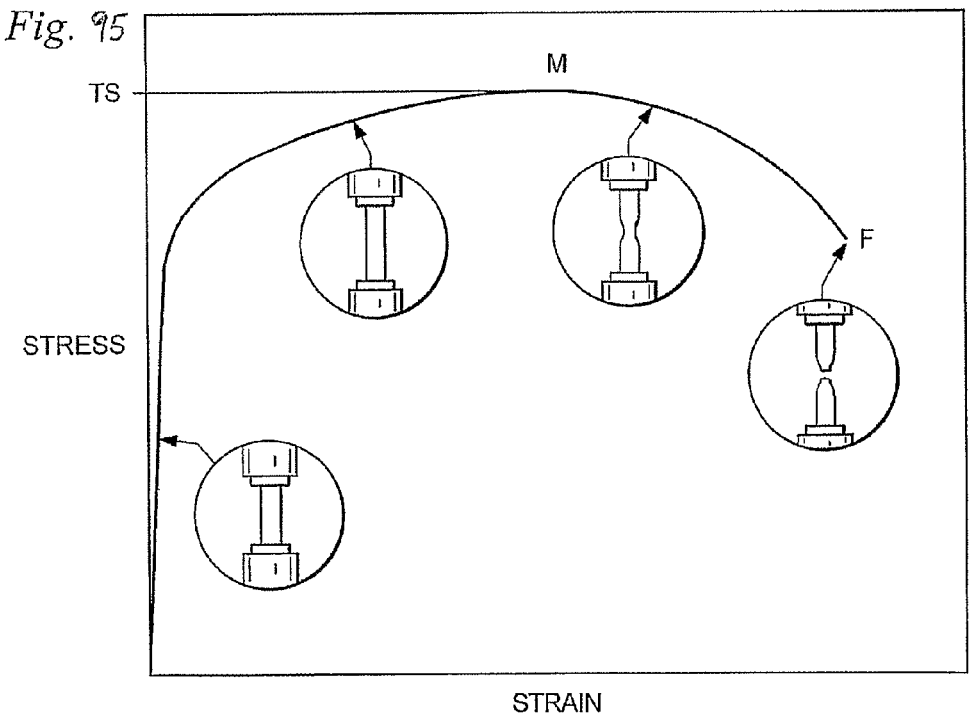

EXPANDABLE TUBULAR

CROSS REFERENCE TO RELATED APPLICATIONS

Cross Reference

This application is a United States national phase application of co-pending international patent application number PCT/US2005/028936, filed Aug. 12, 2005, which claims priority to U.S. Provisional Patent application No. 60/601,502, filed Aug. 13, 2004, the disclosures of which are incorporated herein by reference.

This application is a continuation-in-part of PCT Application US05/27318, filed on Jul. 29, 2005, which was a continuation-in-part of PCT Application PCT/US2004/028887, filed on Sep. 7, 2004.

This application is related to the following co-pending applications: (1) U.S. Pat. No. 6,497,289, which was filed as U.S. patent application Ser. No. 09/454,139, filed on Dec. 3, 1999, which claims priority from provisional application 60/111,293, filed on Dec. 7, 1998, (2) U.S. patent application Ser. No. 09/510,913, filed on Feb. 23, 2000, which claims priority from provisional application 60/121,702, filed on Feb. 25, 1999, (3) U.S. patent application Ser. No. 09/502,350, filed on Feb. 10, 2000, which claims priority from provisional application 60/119,611, filed on Feb. 11, 1999, (4) U.S. Pat. No. 6,328,113, which was filed as U.S. patent application Ser. No. 09/440,338, filed on Nov. 15, 1999, which claims priority from provisional application 60/108,558, filed on Nov. 16, 1998, (5) U.S. patent application Ser. No. 10/169,434, filed on Jul. 1, 2002, which claims priority from provisional application 60/183,546, filed on Feb. 18, 2000, (6) U.S. patent application Ser. No. 09/523,468, filed on Mar. 10, 2000, which claims priority from provisional application 60/124,042, filed on Mar. 11, 1999, (7) U.S. Pat. No. 6,568,471, which was filed as patent application Ser. No. 09/512,895, filed on Feb. 24, 2000, which claims priority from provisional application 60/121,841, filed on Feb. 26, 1999, (8) U.S. Pat. No. 6,575,240, which was filed as patent application Ser. No. 09/511,941, filed on Feb. 24, 2000, which claims priority from provisional application 60/121,907, filed on Feb. 26, 1999, (9) U.S. Pat. No. 6,557,640, which was filed as patent application Ser. No. 09/588,946, filed on Jun. 7, 2000, which claims priority from provisional application 60/137,998, filed on Jun. 7, 1999, (10) U.S. patent application Ser. No. 09/981,916, filed on Oct. 18, 2001 as a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (11) U.S. Pat. No. 6,604,763, which was filed as application Ser. No. 09/559,122, filed on Apr. 26, 2000, which claims priority from provisional application 60/131,106, filed on Apr. 26, 1999, (12) U.S. patent application Ser. No. 10/030,593, filed on Jan. 8, 2002, which claims priority from provisional application 60/146,203, filed on Jul. 29, 1999, (13) U.S. provisional patent application Ser. No. 60/143,039, filed on Jul. 9, 1999, (14) U.S. patent application Ser. No. 10/111,982, filed on Apr. 30, 2002, which claims priority from provisional patent application Ser. No. 60/162,671, filed on Nov. 1, 1999, (15) U.S. provisional patent application Ser. No. 60/154,047, filed on Sep. 16, 1999, (16) U.S. provisional patent application Ser. No. 60/438,828, filed on Jan. 9, 2003, (17) U.S. Pat. No. 6,564,875, which was filed as application Ser. No. 09/679,907, on Oct. 5, 2000, which claims priority from provisional patent application Ser. No. 60/159,082, filed on Oct. 12, 1999, (18) U.S. patent application Ser. No. 10/089,419, filed on Mar. 27, 2002, which claims priority from provisional patent application Ser. No. 60/159,039, filed on Oct. 12, 1999, (19) U.S. patent application Ser. No. 09/679,906, filed on Oct. 5, 2000, which claims priority from provisional patent application Ser. No. 60/159,033, filed on Oct. 12, 1999, (20) U.S. patent application Ser. No. 10/303,992, filed on Nov. 22, 2002, which claims priority from provisional patent application Ser. No. 60/212,359, filed on Jun. 19, 2000, (21) U.S. provisional patent application Ser. No. 60/165,228, filed on Nov. 12, 1999, (22) U.S. provisional patent application Ser. No. 60/455,051, filed on Mar. 14, 2003, (23) PCT application US02/2477, filed on Jun. 26, 2002, which claims priority from U.S. provisional patent application Ser. No. 60/303,711, filed on Jul. 6, 2001, (24) U.S. patent application Ser. No. 10/311,412, filed on Dec. 12, 2002, which claims priority from provisional patent application Ser. No. 60/221,443, filed on Jul. 28, 2000, (25) U.S. patent application Ser. No. 10/322,947, filed on Dec. 18, 2002, which claims priority from provisional patent application Ser. No. 60/221,645, filed on Jul. 28, 2000, (26) U.S. patent application Ser. No. 10/322,947, filed on Jan. 22, 2003, which claims priority from provisional patent application Ser. No. 60/233,638, filed on Sep. 18, 2000, (27) U.S. patent application Ser. No. 10/406,648, filed on Mar. 31, 2003, which claims priority from provisional patent application Ser. No. 60/237,334, filed on Oct. 2, 2000, (28) PCT application US02/04353, filed on Feb. 14, 2002, which claims priority from U.S. provisional patent application Ser. No. 60/270,007, filed on Feb. 20, 2001, (29) U.S. patent application Ser. No. 10/465,835, filed on Jun. 13, 2003, which claims priority from provisional patent application Ser. No. 60/262,434, filed on Jan. 17, 2001, (30) U.S. patent application Ser. No. 10/465,831, filed on Jun. 13, 2003, which claims priority from U.S. provisional patent application Ser. No. 60/259,486, filed on Jan. 3, 2001, (31) U.S. provisional patent application Ser. No. 60/452,303, filed on Mar. 5, 2003, (32) U.S. Pat. No. 6,470,966, which was filed as patent application Ser. No. 09/850,093, filed on May 7, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (33) U.S. Pat. No. 6,561,227, which was filed as patent application Ser. No. 09/852,026, filed on May 9, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (34) U.S. patent application Ser. No. 09/852,027, filed on May 9, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (35) PCT Application US02/25608, filed on Aug. 13, 2002, which claims priority from provisional application 60/318,021, filed on Sep. 7, 2001, (36) PCT Application US02/24399, filed on Aug. 1, 2002, which claims priority from U.S. provisional patent application Ser. No. 60/313,453, filed on Aug. 20, 2001, (37) PCT Application US02/29856, filed on Sep. 19, 2002, which claims priority from U.S. provisional patent application Ser. No. 60/326,886, filed on Oct. 3, 2001, (38) PCT Application US02/20256, filed on Jun. 26, 2002, which claims priority from U.S. provisional patent application Ser. No. 60/303,740, filed on Jul. 6, 2001, (39) U.S. patent application Ser. No. 09/962,469, filed on Sep. 25, 2001, which is a divisional of U.S. patent application Ser. No. 09/523,468, filed on Mar. 10, 2000, which claims priority from provisional application 60/124,042, filed on Mar. 11, 1999, (40) U.S. patent application Ser. No. 09/962,470, filed on Sep. 25, 2001, which is a divisional of U.S. patent application Ser. No. 09/523,468, filed on Mar. 10, 2000, which claims priority from provisional application 60/124,042, filed on Mar. 11, 1999, (41) U.S. patent application Ser. No. 09/962,471, filed on Sep. 25, 2001, which is a divisional of U.S. patent application Ser. No. 09/523,468, filed on Mar. 10, 2000, which claims priority from provisional application 60/124,042, filed on Mar. 11, 1999, (42) U.S. patent application Ser. No. 09/962,467, filed on Sep. 25, 2001, which is a divisional of U.S. patent application Ser. No. 09/523,468, filed on Mar. 10, 2000, which claims priority from provisional application 60/124,042, filed on Mar. 11, 1999, (43) U.S. patent application Ser. No. 09/962,468, filed on Sep. 25, 2001, which is a divisional of U.S. patent application Ser. No. 09/523,468, filed on Mar. 10, 2000, which claims priority from provisional application 60/124,042, filed on Mar. 11, 1999, (44) PCT application US 02/25727, filed on Aug. 14, 2002, which claims priority from U.S. provisional patent application Ser. No. 60/317,985, filed on Sep. 6, 2001, and U.S. provisional patent application Ser. No. 60/318,386, filed on Sep. 10, 2001, (45) PCT application US 02/39425, filed on Dec. 10, 2002, which claims priority from U.S. provisional patent application Ser. No. 60/343,674, filed on Dec. 27, 2001, (46) U.S. utility patent application Ser. No. 09/969,922, filed on Oct. 3, 2001, which is a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (47) U.S. utility patent application Ser. No. 10/516,467, filed on Dec. 10, 2001, which is a continuation application of U.S. utility patent application Ser. No. 09/969,922, filed on Oct. 3, 2001, which is a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (48) PCT application US 03/00609, filed on Jan. 9, 2003, which claims priority from U.S. provisional patent application Ser. No. 60/357,372, filed on Feb. 15, 2002, (49) U.S. patent application Ser. No. 10/074,703, filed on Feb. 12, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (50) U.S. patent application Ser. No. 10/074,244, filed on Feb. 12, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (51) U.S. patent application Ser. No. 10/076,660, filed on Feb. 15, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (52) U.S. patent application Ser. No. 10/076,661, filed on Feb. 15, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (53) U.S. patent application Ser. No. 10/076,659, filed on Feb. 15, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (54) U.S. patent application Ser. No. 10/078,928, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (55) U.S. patent application Ser. No. 10/078,922, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (56) U.S. patent application Ser. No. 10/078,921, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (57) U.S. patent application Ser. No. 10/261,928, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (58) U.S. patent application Ser. No. 10/079,276, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (59) U.S. patent application Ser. No. 10/262,009, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (60) U.S. patent application Ser. No. 10/092,481, filed on Mar. 7, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (61) U.S. patent application Ser. No. 10/261,926, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (62) PCT application US 02/36157, filed on Nov. 12, 2002, which claims priority from U.S. provisional patent application Ser. No. 60/338,996, filed on Nov. 12, 2001, (63) PCT application US 02/36267, filed on Nov. 12, 2002, which claims priority from U.S. provisional patent application Ser. No. 60/339,013, filed on Nov. 12, 2001, (64) PCT application US 03/11765, filed on Apr. 16, 2003, which claims priority from U.S. provisional patent application Ser. No. 60/383,917, filed on May 29, 2002, (65) PCT application US 03/15020, filed on May 12, 2003, which claims priority from U.S. provisional patent application Ser. No. 60/391,703, filed on Jun. 26, 2002, (66) PCT application US 02/39418, filed on Dec. 10, 2002, which claims priority from U.S. provisional patent application Ser. No. 60/346,309, filed on Jan. 7, 2002, (67) PCT application US 03/06544, filed on Mar. 4, 2003, which claims priority from U.S. provisional patent application Ser. No. 60/372,048, filed on Apr. 12, 2002, (68) U.S. patent application Ser. No. 10/331,718, filed on Dec. 30, 2002, which is a divisional U.S. patent application Ser. No. 09/679,906, filed on Oct. 5, 2000, which claims priority from provisional patent application Ser. No. 60/159,033, filed on Oct. 12, 1999, (69) PCT application US 03/04837, filed on Feb. 29, 2003, which claims priority from U.S. provisional patent application Ser. No. 60/363,829, filed on Mar. 13, 2002, (70) U.S. patent application Ser. No. 10/261,927, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (71) U.S. patent application Ser. No. 10/262,008, filed on Oct. 1, 2002, which is a divisional of U.S. Pat. No. 6,557,640, which was filed as patent application Ser. No. 09/588, 946, filed on Jun. 7, 2000, which claims priority from provisional application 60/137,998, filed on Jun. 7, 1999, (72) U.S. patent application Ser. No. 10/261,925, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (73) U.S. patent application Ser. No. 10/199,524, filed on Jul. 19, 2002, which is a continuation of U.S. Pat. No. 6,497,289, which was filed as U.S. patent application Ser. No. 09/454,139, filed on Dec. 3, 1999, which claims priority from provisional application 60/111,293, filed on Dec. 7, 1998, (74) PCT application US 03/10144, filed on Mar. 28, 2003, which claims priority from U.S. provisional patent application Ser. No. 60/372,632, filed on Apr. 15, 2002, (75) U.S. provisional patent application Ser. No. 60/412,542, filed on Sep. 20, 2002, (76) PCT application US 03/14153, filed on May 6, 2003, which claims priority from U.S. provisional patent application Ser. No. 60/380,147, filed on May 6, 2002, (77) PCT application US 03/19993, filed on Jun. 24, 2003, which claims priority from U.S. provisional patent application Ser. No. 60/397,284, filed on Jul. 19, 2002, (78) PCT application US 03/13787, filed on May 5, 2003, which claims priority from U.S. provisional patent application Ser. No. 60/387,486, filed on Jun. 10, 2002, (79) PCT application US 03/18530, filed on Jun. 11, 2003, which claims priority from U.S. provisional patent application Ser. No. 60/387,961, filed on Jun. 12, 2002, (80) PCT application US 03/20694, filed on Jul. 1, 2003, which claims priority from U.S. provisional patent application Ser. No. 60/398,061, filed on Jul. 24, 2002, (81) PCT application US 03/20870, filed on Jul. 2, 2003, which claims priority from U.S. provisional patent application Ser. No. 60/399,240, filed on Jul. 29, 2002, (82) U.S. provisional patent application Ser. No. 60/412,487, filed on Sep. 20, 2002, (83) U.S. provisional patent application Ser. No. 60/412,488, filed on Sep. 20, 2002, (84) U.S. patent application Ser. No. 10/280,356, filed on Oct. 25, 2002, which is a continuation of U.S. Pat. No. 6,470,966, which was filed as patent application Ser. No. 09/850,093, filed on May 7, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (85) U.S. provisional patent application Ser. No. 60/412,177, filed on Sep. 20, 2002, (86) U.S. provisional patent application Ser. No. 60/412,653, filed on Sep. 20, 2002, (87) U.S. provisional patent application Ser. No. 60/405,610, filed on Aug. 23, 2002, (88) U.S. provisional patent application Ser. No. 60/405,394, filed on Aug. 23, 2002, (89) U.S. provisional patent application Ser. No. 60/412,544, filed on Sep. 20, 2002, (90) PCT application US 03/24779, filed on Aug. 8, 2003, which claims priority from U.S. provisional patent application Ser. No. 60/407,442, filed on Aug. 30, 2002, (91) U.S. provisional patent application Ser. No. 60/423,363, filed on Dec. 10, 2002, (92) U.S. provisional patent application Ser. No. 60/412,196, filed on Sep. 20, 2002, (93) U.S. provisional patent application Ser. No. 60/412,187, filed on Sep. 20, 2002, (94) U.S. provisional patent application Ser. No. 60/412,371, filed on Sep. 20, 2002, (95) U.S. patent application Ser. No. 10/382,325, filed on Mar. 5, 2003, which is a continuation of U.S. Pat. No. 6,557,640, which was filed as patent application Ser. No. 09/588,946, filed on Jun. 7, 2000, which claims priority from provisional application 60/137,998, filed on Jun. 7, 1999, (96) U.S. patent application Ser. No. 10/624,842, filed on Jul. 22, 2003, which is a divisional of U.S. patent application Ser. No. 09/502,350, filed on Feb. 10, 2000, which claims priority from provisional application 60/119,611, filed on Feb. 11, 1999, (97) U.S. provisional patent application Ser. No. 60/431,184, filed on Dec. 5, 2002, (98) U.S. provisional patent application Ser. No. 60/448,526, filed on Feb. 18, 2003, (99) U.S. provisional patent application Ser. No. 60/461,539, filed on Apr. 9, 2003, (100) U.S. provisional patent application Ser. No. 60/462,750, filed on Apr. 14, 2003, (101) U.S. provisional patent application Ser. No. 60/436,106, filed on Dec. 23, 2002, (102) U.S. provisional patent application Ser. No. 60/442,942, filed on Jan. 27, 2003, (103) U.S. provisional patent application Ser. No. 60/442,938, filed on Jan. 27, 2003, (104) U.S. provisional patent application Ser. No. 60/418,687, filed on Apr. 18, 2003, (105) U.S. provisional patent application Ser. No. 60/454,896, filed on Mar. 14, 2003, (106) U.S. provisional patent application Ser. No. 60/450,504, filed on Feb. 26, 2003, (107) U.S. provisional patent application Ser. No. 60/451,152, filed on Mar. 9, 2003, (108) U.S. provisional patent application Ser. No. 60/455,124, filed on Mar. 17, 2003, (109) U.S. provisional patent application Ser. No. 60/453,678, filed on Mar. 11, 2003, (110) U.S. patent application Ser. No. 10/421,682, filed on Apr. 23, 2003, which is a continuation of U.S. patent application Ser. No. 09/523,468, filed on Mar. 10, 2000, which claims priority from provisional application 60/124,042, filed on Mar. 11, 1999, (111) U.S. provisional patent application Ser. No. 60/457,965, filed on Mar. 27, 2003, (112) U.S. provisional patent application Ser. No. 60/455,718, filed on Mar. 18, 2003, (113) U.S. Pat. No. 6,550,821, which was filed as patent application Ser. No. 09/811,734, filed on Mar. 19, 2001, (114) U.S. patent application Ser. No. 10/436,467, filed on May 12, 2003, which is a continuation of U.S. Pat. No. 6,604,763, which was filed as application Ser. No. 09/559,122, filed on Apr. 26, 2000, which claims priority from provisional application 60/131,106, filed on Apr. 26, 1999, (115) U.S. provisional patent application Ser. No. 60/459,776, filed on Apr. 2, 2003, (116) U.S. provisional patent application Ser. No. 60/461,094, filed on Apr. 8, 2003, (117) U.S. provisional patent application Ser. No. 60/461,038, filed on Apr. 7, 2003, (118) U.S. provisional patent application Ser. No. 60/463,586, filed on Apr. 17, 2003, (119) U.S. provisional patent application Ser. No. 60/472,240, filed on May 20, 2003, (120) U.S. patent application Ser. No. 10/619,285, filed on Jul. 14, 2003, which is a continuation-in-part of U.S. utility patent application Ser. No. 09/969,922, filed on Oct. 3, 2001, which is a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (121) U.S. utility patent application Ser. No. 10/418,688, which was filed on Apr. 18, 2003, as a division of U.S. utility patent application Ser. No. 09/523,468, filed on Mar. 10, 2000, which claims priority from provisional application 60/124,042, filed on Mar. 11, 1999, (122) PCT patent application serial no. PCT/US2004/06246, filed on Feb. 26, 2004, (123) PCT patent application serial number PCT/US2004/08170, filed on Mar. 15, 2004, (124) PCT patent application serial number PCT/US2004/08171, filed on Mar. 15, 2004, (125) PCT patent application serial number PCT/US2004/08073, filed on Mar. 18, 2004, (126) PCT patent application serial number PCT/US2004/07711, filed on Mar. 11, 2004, (127) PCT patent application serial number PCT/US2004/029025, filed on Mar. 26, 2004, (128) PCT patent application serial number PCT/US2004/010317, filed on Apr. 2, 2004, (129) PCT patent application serial number PCT/US2004/010712, filed on Apr. 6, 2004, (130) PCT patent application serial number PCT/US2004/010762, filed on Apr. 6, 2004, (131) PCT patent application serial number PCT/US2004/011973, filed on Apr. 15, 2004, (132) U.S. provisional patent application Ser. No. 60/495, 056, filed on Aug. 14, 2003, (133) U.S. provisional patent application Ser. No. 60/600,679, filed on Aug. 11, 2004, (134) PCT patent application serial number PCT/US05/27318, filed on Jul. 29, 2004, the disclosures of which are incorporated herein by reference.

BACKGROUND

This disclosure relates generally to oil and gas exploration, and in particular to forming and repairing wellbore casings to facilitate oil and gas exploration.

SUMMARY

According to one aspect of the present disclosure, a method of forming a tubular liner within a preexisting structure is provided that includes positioning a tubular assembly within the preexisting structure; and radially expanding and plastically deforming the tubular assembly within the preexisting structure, wherein, prior to the radial expansion and plastic deformation of the tubular assembly, a predetermined portion of the tubular assembly has a lower yield point than another portion of the tubular assembly.

According to another aspect of the present disclosure, an expandable tubular member is provided that includes a steel alloy including: 0.065% C, 1.44% Mn, 0.01% P, 0.002% S, 0.24% Si, 0.01% Cu, 0.01% Ni, and 0.02% Cr.

According to another aspect of the present disclosure, an expandable tubular member is provided that includes a steel alloy including: 0.18% C, 1.28% Mn, 0.017% P, 0.004% S, 0.29% Si, 0.01% Cu, 0.01% Ni, and 0.03% Cr.

According to another aspect of the present disclosure, an expandable tubular member is provided that includes a steel alloy including: 0.08% C, 0.82% Mn, 0.006% P, 0.003% S, 0.30% Si, 0.16% Cu, 0.05% Ni, and 0.05% Cr.

According to another aspect of the present disclosure, an expandable tubular member is provided that includes a steel alloy including: 0.02% C, 1.31% Mn, 0.02% P, 0.001% S, 0.45% Si, 9.1% Ni, and 18.7% Cr.

According to another aspect of the present disclosure, an expandable tubular member is provided, wherein the yield point of the expandable tubular member is at most about 46.9 ksi prior to a radial expansion and plastic deformation; and wherein the yield point of the expandable tubular member is at least about 65.9 ksi after the radial expansion and plastic deformation.

According to another aspect of the present disclosure, an expandable tubular member is provided, wherein a yield point of the expandable tubular member after a radial expansion and plastic deformation is at least about 40% greater than the yield point of the expandable tubular member prior to the radial expansion and plastic deformation.

According to another aspect of the present disclosure, an expandable tubular member is provided, wherein the anisotropy of the expandable tubular member, prior to the radial expansion and plastic deformation, is at least about 1.48.

According to another aspect of the present disclosure, an expandable tubular member is provided, wherein the yield point of the expandable tubular member is at most about 57.8 ksi prior to the radial expansion and plastic deformation; and wherein the yield point of the expandable tubular member is at least about 74.4 ksi after the radial expansion and plastic deformation.

According to another aspect of the present disclosure, an expandable tubular member is provided, wherein the yield point of the expandable tubular member after a radial expansion and plastic deformation is at least about 28% greater than the yield point of the expandable tubular member prior to the radial expansion and plastic deformation.

According to another aspect of the present disclosure, an expandable tubular member is provided, wherein the anisotropy of the expandable tubular member, prior to the radial expansion and plastic deformation, is at least about 1.04.

According to another aspect of the present disclosure, an expandable tubular member is provided, wherein the anisotropy of the expandable tubular member, prior to the radial expansion and plastic deformation, is at least about 1.92.

According to another aspect of the present disclosure, an expandable tubular member is provided, wherein the anisotropy of the expandable tubular member, prior to the radial expansion and plastic deformation, is at least about 1.34.

According to another aspect of the present disclosure, an expandable tubular member is provided, wherein the anisotropy of the expandable tubular member, prior to the radial expansion and plastic deformation, ranges from about 1.04 to about 1.92.

According to another aspect of the present disclosure, an expandable tubular member is provided, wherein the yield point of the expandable tubular member, prior to the radial expansion and plastic deformation, ranges from about 47.6 ksi to about 61.7 ksi.

According to another aspect of the present disclosure, an expandable tubular member is provided, wherein the expandability coefficient of the expandable tubular member, prior to the radial expansion and plastic deformation, is greater than 0.12.

According to another aspect of the present disclosure, an expandable tubular member is provided, wherein the expandability coefficient of the expandable tubular member is greater than the expandability coefficient of another portion of the expandable tubular member.

According to another aspect of the present disclosure, an expandable tubular member is provided, wherein the tubular member has a higher ductility and a lower yield point prior to a radial expansion and plastic deformation than after the radial expansion and plastic deformation.

According to another aspect of the present disclosure, a method of radially expanding and plastically deforming a tubular assembly including a first tubular member coupled to a second tubular member is provided that includes radially expanding and plastically deforming the tubular assembly within a preexisting structure, and using less power to radially expand each unit length of the first tubular member than to radially expand each unit length of the second tubular member.

According to another aspect of the present disclosure, a system for radially expanding and plastically deforming a tubular assembly including a first tubular member coupled to a second tubular member is provided that includes means for radially expanding the tubular assembly within a preexisting structure, and means for using less power to radially expand each unit length of the first tubular member than required to radially expand each unit length of the second tubular member.

According to another aspect of the present disclosure, a method of manufacturing a tubular member is provided that includes processing a tubular member until the tubular member is characterized by one or more intermediate characteristics; positioning the tubular member within a preexisting structure, and processing the tubular member within the preexisting structure until the tubular member is characterized one or more final characteristics.

According to another aspect of the present disclosure, an apparatus is provided that includes an expandable tubular assembly; and an expansion device coupled to the expandable tubular assembly; wherein a predetermined portion of the expandable tubular assembly has a lower yield point than another portion of the expandable tubular assembly.

According to another aspect of the present disclosure, an expandable tubular member is provided, wherein a yield point of the expandable tubular member after a radial expansion and plastic deformation is at least about 5.8% greater than the yield point of the expandable tubular member prior to the radial expansion and plastic deformation.

According to another aspect of the present disclosure, a method of determining the expandability of a selected tubular member is provided that includes determining an anisotropy value for the selected tubular member, determining a strain hardening value for the selected tubular member; and multiplying the anisotropy value times the strain hardening value to generate an expandability value for the selected tubular member.

According to another aspect of the present disclosure, a method of radially expanding and plastically deforming tubular members is provided that includes selecting a tubular member; determining an anisotropy value for the selected tubular member; determining a strain hardening value for the selected tubular member; multiplying the anisotropy value times the strain hardening value to generate an expandability value for the selected tubular member; and if the anisotropy value is greater than 0.12, then radially expanding and plastically deforming the selected tubular member.

According to another aspect of the present disclosure, a radially expandable tubular member apparatus is provided that includes a first tubular member; a second tubular member engaged with the first tubular member forming a joint; and a sleeve overlapping and coupling the first and second tubular members at the joint; wherein, prior to a radial expansion and plastic deformation of the apparatus, a predetermined portion of the apparatus has a lower yield point than another portion of the apparatus.

According to another aspect of the present disclosure, a radially expandable tubular member apparatus is provided that includes: a first tubular member; a second tubular member engaged with the first tubular member forming a joint; a sleeve overlapping and coupling the first and second tubular members at the joint; the sleeve having opposite tapered ends and a flange engaged in a recess formed in an adjacent tubular member; and one of the tapered ends being a surface formed on the flange; wherein, prior to a radial expansion and plastic deformation of the apparatus, a predetermined portion of the apparatus has a lower yield point than another portion of the apparatus.

According to another aspect of the present disclosure, a method of joining radially expandable tubular members is provided that includes: providing a first tubular member; engaging a second tubular member with the first tubular member to form a joint; providing a sleeve; mounting the sleeve for overlapping and coupling the first and second tubular members at the joint; wherein the first tubular member, the second tubular member, and the sleeve define a tubular assembly; and radially expanding and plastically deforming the tubular assembly; wherein, prior to the radial expansion and plastic deformation, a predetermined portion of the tubular assembly has a lower yield point than another portion of the tubular assembly.

According to another aspect of the present disclosure, a method of joining radially expandable tubular members is provided that includes providing a first tubular member; engaging a second tubular member with the first tubular member to form a joint; providing a sleeve having opposite tapered ends and a flange, one of the tapered ends being a surface formed on the flange; mounting the sleeve for overlapping and coupling the first and second tubular members at the joint, wherein the flange is engaged in a recess formed in an adjacent one of the tubular members; wherein the first tubular member, the second tubular member, and the sleeve define a tubular assembly; and radially expanding and plastically deforming the tubular assembly; wherein, prior to the radial expansion and plastic deformation, a predetermined portion of the tubular assembly has a lower yield point than another portion of the tubular assembly.

According to another aspect of the present disclosure, an expandable tubular assembly is provided that includes a first tubular member; a second tubular member coupled to the first tubular member; a first threaded connection for coupling a portion of the first and second tubular members; a second threaded connection spaced apart from the first threaded connection for coupling another portion of the first and second tubular members; a tubular sleeve coupled to and receiving end portions of the first and second tubular members; and a sealing element positioned between the first and second spaced apart threaded connections for sealing an interface between the first and second tubular member; wherein the sealing element is positioned within an annulus defined between the first and second tubular members; and wherein, prior to a radial expansion and plastic deformation of the assembly, a predetermined portion of the assembly has a lower yield point than another portion of the apparatus.

According to another aspect of the present disclosure, a method of joining radially expandable tubular members is provided that includes: providing a first tubular member; providing a second tubular member; providing a sleeve; mounting the sleeve for overlapping and coupling the first and second tubular members; threadably coupling the first and second tubular members at a first location; threadably coupling the first and second tubular members at a second location spaced apart from the first location; sealing an interface between the first and second tubular members between the first and second locations using a compressible sealing element, wherein the first tubular member, second tubular member, sleeve, and the sealing element define a tubular assembly; and radially expanding and plastically deforming the tubular assembly; wherein, prior to the radial expansion and plastic deformation, a predetermined portion of the tubular assembly has a lower yield point than another portion of the tubular assembly.

According to another aspect of the present disclosure, an expandable tubular member is provided, wherein the carbon content of the tubular member is less than or equal to 0.12 percent; and wherein the carbon equivalent value for the tubular member is less than 0.21.

According to another aspect of the present disclosure, an expandable tubular member is provided, wherein the carbon content of the tubular member is greater than 0.12 percent; and wherein the carbon equivalent value for the tubular member is less than 0.36.

According to another aspect of the present disclosure, a method of selecting tubular members for radial expansion and plastic deformation is provided that includes selecting a tubular member from a collection of tubular member; determining a carbon content of the selected tubular member; determining a carbon equivalent value for the selected tubular member; and if the carbon content of the selected tubular member is less than or equal to 0.12 percent and the carbon equivalent value for the selected tubular member is less than 0.21, then determining that the selected tubular member is suitable for radial expansion and plastic deformation.

According to another aspect of the present disclosure, a method of selecting tubular members for radial expansion and plastic deformation is provided that includes selecting a tubular member from a collection of tubular member; determining a carbon content of the selected tubular member; determining a carbon equivalent value for the selected tubular member; and if the carbon content of the selected tubular member is greater than 0.12 percent and the carbon equivalent value for the selected tubular member is less than 0.36, then determining that the selected tubular member is suitable for radial expansion and plastic deformation.

According to another aspect of the present disclosure, an expandable tubular member is provided that includes a tubular body; wherein a yield point of an inner tubular portion of the tubular body is less than a yield point of an outer tubular portion of the tubular body.

According to another aspect of the present disclosure, a method of manufacturing an expandable tubular member has been provided that includes: providing a tubular member; heat treating the tubular member; and quenching the tubular member; wherein following the quenching, the tubular member comprises a microstructure comprising a hard phase structure and a soft phase structure.

According to another aspect of the present disclosure, an expandable tubular member has been provided that includes a steel alloy comprising: 0.07% Carbon, 1.64% Manganese, 0.011% Phosphor, 0.001% Sulfur, 0.23% Silicon, 0.5% Nickel, 0.51% Chrome, 0.31% Molybdenum, 0.15% Copper, 0.021% Aluminum, 0.04% Vanadium, 0.03% Niobium, and 0.007% Titanium.

According to another aspect of the present disclosure, an expandable tubular member has been provided that includes a collapse strength of approximately 70 ksi comprising: 0.07% Carbon, 1.64% Manganese, 0.011% Phosphor, 0.001% Sulfur, 0.23% Silicon, 0.5% Nickel, 0.51% Chrome, 0.31% Molybdenum, 0.15% Copper, 0.021% Aluminum, 0.04% Vanadium, 0.03% Niobium, and 0.007% Titanium, wherein, upon radial expansion and plastic deformation, the collapse strength increases to approximately 110 ksi.

According to another aspect of the present disclosure, an expandable tubular member has been provided that includes an outer surface and means for increasing the collapse strength of a tubular assembly when the expandable tubular member is radially expanded and plastically deformed against a preexisting structure, the means coupled to the outer surface.

According to another aspect of the present disclosure, a preexisting structure for accepting an expandable tubular member has been provided that includes a passage defined by the structure, an inner surface on the passage and means for increasing the collapse strength of a tubular assembly when an expandable tubular member is radially expanded and plastically deformed against the preexisting structure, the means coupled to the inner surface.

According to another aspect of the present disclosure, an expandable tubular assembly has been provided that includes a structure defining a passage therein, an expandable tubular member positioned in the passage and means for increasing the collapse strength of the assembly when the expandable tubular member is radially expanded and plastically deformed against the structure, the means positioned between the expandable tubular member and the structure.

According to another aspect of the present disclosure, a tubular assembly has been provided that includes a structure defining a passage therein, an expandable tubular member positioned in the passage and an interstitial layer positioned between the structure and expandable tubular member, wherein the collapse strength of the assembly with the interstitial layer is at least 20% greater than the collapse strength without the interstitial layer.

According to another aspect of the present disclosure, a tubular assembly has been provided that includes a structure defining a passage therein, an expandable tubular member positioned in the passage and an interstitial layer positioned between the structure and expandable tubular member, wherein the collapse strength of the assembly with the interstitial layer is at least 30% greater than the collapse strength without the interstitial layer.

According to another aspect of the present disclosure, a tubular assembly has been provided that includes a structure defining a passage therein, an expandable tubular member positioned in the passage and an interstitial layer positioned between the structure and expandable tubular member, wherein the collapse strength of the assembly with the interstitial layer is at least 40% greater than the collapse strength without the interstitial layer.

According to another aspect of the present disclosure, a tubular assembly has been provided that includes a structure defining a passage therein, an expandable tubular member positioned in the passage and an interstitial layer positioned between the structure and expandable tubular member, wherein the collapse strength of the assembly with the interstitial layer is at least 50% greater than the collapse strength without the interstitial layer.

According to another aspect of the present disclosure, an expandable tubular assembly has been provided that includes an outer tubular member comprising a steel alloy and defining a passage, an inner tubular member comprising a steel alloy and positioned in the passage and an interstitial layer between the inner tubular member and the outer tubular member, the interstitial layer comprising an aluminum material lining an inner surface of the outer tubular member, whereby the collapse strength of the assembly with the interstitial layer is greater than the collapse strength of the assembly without the interstitial layer.

According to another aspect of the present disclosure, a method for increasing the collapse strength of a tubular assembly has been provided that includes providing a preexisting structure defining a passage therein, providing an expandable tubular member, coating the expandable tubular member with an interstitial material, positioning the expandable tubular member in the passage defined by the preexisting structure and expanding the expandable tubular member such that the interstitial material engages the preexisting structure, whereby the collapse strength of the preexisting structure and expandable tubular member with the interstitial material is greater than the collapse strength of the preexisting structure and expandable tubular member without the interstitial material.

According to another aspect of the present disclosure, a method for increasing the collapse strength of a tubular assembly has been provided that includes providing a preexisting structure defining a passage therein, providing an expandable tubular member, coating the preexisting structure with an interstitial material, positioning the expandable tubular member in the passage defined by the preexisting structure and expanding the expandable tubular member such that the interstitial material engages the expandable tubular member, whereby the collapse strength of the preexisting structure and expandable tubular member with the interstitial material is greater than the collapse strength of the preexisting structure and expandable tubular member without the interstitial material.

According to another aspect of the present disclosure, an expandable tubular member has been provided that includes an outer surface and an interstitial layer on the outer surface, wherein the interstitial layer comprises an aluminum material resulting in a required expansion operating pressure of approximately 3900 psi for the tubular member.

According to another aspect of the present disclosure, an expandable tubular assembly has been provided that includes an outer surface and an interstitial layer on the outer surface, wherein the interstitial layer comprises an aluminum/zinc material resulting in a required expansion operating pressure of approximately 3700 psi for the tubular member.

According to another aspect of the present disclosure, an expandable tubular assembly has been provided that includes an outer surface and an interstitial layer on the outer surface, wherein the interstitial layer comprises an plastic material resulting in a required expansion operating pressure of approximately 3600 psi for the tubular member.

According to another aspect of the present disclosure, an expandable tubular assembly has been provided that includes a structure defining a passage therein, an expandable tubular member positioned in the passage and an interstitial layer positioned between the expandable tubular member and the structure, wherein the interstitial layer has a thickness of approximately 0.05 inches to 0.15 inches.

According to another aspect of the present disclosure, an expandable tubular assembly has been provided that includes a structure defining a passage therein, an expandable tubular member positioned in the passage and an interstitial layer positioned between the expandable tubular member and the structure, wherein the interstitial layer has a thickness of approximately 0.07 inches to 0.13 inches.

According to another aspect of the present disclosure, an expandable tubular assembly has been provided that includes a structure defining a passage therein, an expandable tubular member positioned in the passage and an interstitial layer positioned between the expandable tubular member and the structure, wherein the interstitial layer has a thickness of approximately 0.06 inches to 0.14 inches.

According to another aspect of the present disclosure, an expandable tubular assembly has been provided that includes a structure defining a passage therein, an expandable tubular member positioned in the passage and an interstitial layer positioned between the expandable tubular member and the structure, wherein the interstitial layer has a thickness of approximately 1.6 mm to 2.5 mm between the structure and the expandable tubular member.

According to another aspect of the present disclosure, an expandable tubular assembly has been provided that includes a structure defining a passage therein, an expandable tubular member positioned in the passage and an interstitial layer positioned between the expandable tubular member and the structure, wherein the interstitial layer has a thickness of approximately 2.6 mm to 3.1 mm between the structure and the expandable tubular member.

According to another aspect of the present disclosure, an expandable tubular assembly has been provided that includes a structure defining a passage therein, an expandable tubular member positioned in the passage and an interstitial layer positioned between the expandable tubular member and the structure, wherein the interstitial layer has a thickness of approximately 1.9 mm to 2.5 mm between the structure and the expandable tubular member.

According to another aspect of the present disclosure, an expandable tubular assembly has been provided that includes a structure defining a passage therein, an expandable tubular member positioned in the passage, an interstitial layer positioned between the expandable tubular member and the structure and a collapse strength greater than approximately 20000 psi.

According to another aspect of the present disclosure, an expandable tubular assembly has been provided that includes a structure defining a passage therein, an expandable tubular member positioned in the passage, an interstitial layer positioned between the expandable tubular member and the structure and a collapse strength greater than approximately 14000 psi.

According to another aspect of the present disclosure, a method for determining the collapse resistance of a tubular assembly has been provided that includes measuring the collapse resistance of a first tubular member, measuring the collapse resistance of a second tubular member, determining the value of a reinforcement factor for a reinforcement of the first and second tubular members and multiplying the reinforcement factor by the sum of the collapse resistance of the first tubular member and the collapse resistance of the second tubular member.

According to another aspect of the present disclosure, an expandable tubular assembly has been provided that includes a structure defining a passage therein, an expandable tubular member positioned in the passage and means for modifying the residual stresses in at least one of the structure and the expandable tubular member when the expandable tubular member is radially expanded and plastically deformed against the structure, the means positioned between the expandable tubular member and the structure.

According to another aspect of the present disclosure, an expandable tubular assembly is provided that includes a structure defining a passage therein, an expandable tubular member positioned in the passage, and means for providing a substantially uniform distance between the expandable tubular member and the structure after radial expansion and plastic deformation of the expandable tubular member in the passage.

According to another aspect of the present disclosure, an expandable tubular assembly is provided that includes a structure defining a passage therein, an expandable tubular member positioned in the passage, and means for creating a circumferential tensile force in the structure upon radial expansion and plastic deformation of the expandable tubular member in the passage, whereby the circumferential tensile force increases the collapse strength of the combined structure and expandable tubular member.

According to another aspect of the present disclosure, an expandable tubular assembly is provided that includes a first tubular member comprising a first tubular member wall thickness and defining a passage, a second tubular member comprising a second tubular member wall thickness and positioned in the passage, and means for increasing the collapse strength of the combined first tubular member and the second tubular member upon radial expansion and plastic deformation of the first tubular member in the passage, whereby the increased collapse strength exceeds the theoretically calculated collapse strength of a tubular member having a thickness approximately equal to the sum of the first tubular wall thickness and the second tubular wall thickness.

According to another aspect of the present disclosure, an expandable tubular assembly is provided that includes a structure defining a passage therein, an expandable tubular member positioned in the passage, and means for increasing the collapse strength of the expandable tubular member upon radial expansion and plastic deformation of the expandable tubular member in the passage, the means positioned between the expandable tubular member and the structure.

According to another aspect of the present disclosure, a method for increasing the collapse strength of a tubular assembly is provided that includes providing an expandable tubular member, selecting a soft metal having a yield strength which is less than the yield strength of the expandable tubular member, applying the soft metal to an outer surface of the expandable tubular member, positioning the expandable tubular member in a preexisting structure, and radially expanding and plastically deforming the expandable tubular member such that the soft metal forms an interstitial layer between the preexisting structure and the expandable tubular member, whereby the selecting comprises selecting a soft metal such that, upon radial expansion and plastic deformation, the interstitial layer results in an increased collapse strength of the combined expandable tubular member and the preexisting structure.

According to another aspect of the present disclosure, a method for increasing the collapse strength of a tubular assembly is provided that includes providing an expandable tubular member, selecting a soft metal having a yield strength which is less than the yield strength of the expandable tubular member, applying the soft metal to an outer surface of the expandable tubular member, positioning the expandable tubular member in a preexisting structure, radially expanding and plastically deforming the expandable tubular member such that the soft metal forms an interstitial layer between the preexisting structure and the expandable tubular member, and creating a circumferential tensile force in the preexisting structure resulting in an increased collapse strength of the combined expandable tubular member and the preexisting structure.

According to another aspect of the present disclosure, a method for increasing the collapse strength of a tubular assembly is provided that includes providing an expandable tubular member, applying a layer of material to the outer surface of the expandable tubular member, positioning the expandable tubular member in a preexisting structure, radially expanding and plastically deforming the expandable tubular member, and providing a substantially uniform distance between the expandable tubular member and the preexisting structure with the interstitial layer after radial expansion and plastic deformation.

According to another aspect of the present disclosure, a method for increasing the collapse strength of a tubular assembly is provided that includes providing an expandable tubular member, applying a soft metal having a yield strength which is less than the yield strength of the expandable tubular member to the outer surface of the expandable tubular member, positioning the expandable tubular member in a preexisting structure, and creating a circumferential tensile force in the preexisting structure by radially expanding and plastically deforming the expandable tubular member such that the soft metal engages the preexisting structure According to another aspect of the present disclosure, a method for increasing the collapse strength of a tubular assembly is provided that includes providing an expandable tubular member, applying a soft metal having a yield strength which is less than the yield strength of the expandable tubular member to the outer surface of the expandable tubular member, positioning the expandable tubular member in a preexisting structure, and creating a tubular assembly by expanding the expandable tubular member such that the soft metal engages the preexisting structure, whereby the tubular assembly has a collapse strength which exceeds a theoretical collapse strength of a tubular member having a thickness equal to the sum of a thickness of the expandable tubular member and a thickness of the preexisting structure. According to another aspect of the present disclosure, a tubular member expansion apparatus is provided that includes an expansion member, and an expansion monitoring device coupled to the expansion member and operable to monitor the radial expansion and plastic deformation of an expandable tubular member by the expansion member.

According to another aspect of the present disclosure, a tubular member expansion apparatus is provided that includes means for radially expanding and plastically deforming an expandable tubular member, and means for monitoring the radial expansion and plastic deformation of an expandable tubular member coupled to the means for radially expanding and plastically deforming an expandable tubular member.

According to another aspect of the present disclosure, a tubular member expansion apparatus is provided that includes a first anchor, an elongated threaded member rotatably coupled to the first anchor; and an expansion device mounted to the elongated threaded member and operable to translate along the length of the elongated threaded member when the expansion device is positioned in an expandable tubular member and the elongated threaded member is rotated.

According to another aspect of the present disclosure, a tubular member expansion apparatus is provided that includes means for anchoring to an inner surface of a preexisting structure, an elongated threaded member rotatably coupled to the means for anchoring to an inner surface of a preexisting structure, and means for radially expanding and plastically deforming an expandable tubular member coupled to the elongated threaded member and operable to translate along the length of the elongated threaded member when the elongated threaded member is rotated.

According to another aspect of the present disclosure, an expandable tubular member is provided that includes a formation defining a passageway having a formation wall, an expandable tubular member comprising an elastomer coating on an outer surface of the expandable tubular member, whereby the expandable tubular member is positioned in the passageway and radially expanded and plastically deformed such that the elastomer coating directly engages the formation wall.

According to another aspect of the present disclosure, a method for radially expanding and plastically deforming an expandable tubular member is provided that includes providing an expandable tubular member, positioning an expansion device comprising an expansion monitoring device in the expandable tubular member, radially expanding and plastically deforming the expandable tubular member with the expansion device, and monitoring the radial expansion and plastic deformation of the expandable tubular member with the expansion monitoring device.

According to another aspect of the present disclosure, a method for radially expanding and plastically deforming an expandable tubular member is provided that includes providing an expandable tubular member positioned in a preexisting structure, positioning an elongated threaded member in the expandable tubular member, the elongated threaded member comprising an expansion device, and radially expanding and plastically deforming the expandable tubular member by rotating the elongated threaded member such that the expansion device translates along the length of the elongated threaded member.

According to another aspect of the present disclosure, a method for radially expanding and plastically deforming an expandable tubular member is provided that includes providing an expandable tubular member, coating the expandable tubular member with an elastomer, positioning the expandable tubular member in a passageway defined by a formation and including an inner wall, and radially expanding and plastically deforming the expandable tubular member into engagement with the inner wall.

According to another aspect of the present disclosure, a tubular member expansion apparatus is provided that includes an expansion cone, an elongated member extending from the expansion cone, a centralizing member located along the length of the elongated member, and an expansion monitoring device coupled to the elongated member and operable to allow a user to monitor the acoustical signals during the radial expansion and plastic deformation of an expandable tubular member by the expansion cone.

According to another aspect of the present disclosure, a tubular member expansion apparatus is provided that includes an expansion cone, a drill string coupled to the expansion cone, and an expansion monitoring device comprising a spring-mass assembly coupled to the expansion cone by the drill string and operable to allow a user to monitor the vibration signals during the radial expansion and plastic deformation of an expandable tubular member by the expansion cone.

According to another aspect of the present disclosure, tubular member expansion apparatus is provided that includes an expansion cone, an elongated member extending from the expansion cone, a centralizing member located along the length of the elongated member, an expansion monitoring device coupled to the elongated member and operable to allow a user to monitor the acoustical signals during the radial expansion and plastic deformation of an expandable tubular member by the expansion cone, and a controller coupled to the expansion monitoring device and operable to adjust the operation of the expansion cone in response to the acoustical signals received from the expansion monitoring device.

According to another aspect of the present disclosure, a tubular member expansion apparatus is provided that includes an expansion cone, a drill string coupled to the expansion cone, and an expansion monitoring device comprising a spring-mass assembly coupled to the expansion cone by the drill string and operable to allow a user to monitor the vibration signals during the radial expansion and plastic deformation of an expandable tubular member by the expansion cone, and a controller coupled to the expansion monitoring device and operable to adjust the operation of the expansion cone in response to the vibration signals received from the expansion monitoring device.

According to another aspect of the present disclosure, a tubular member expansion apparatus is provided that includes a first anchor comprising an engagement member operable to engage an inner surface of a preexisting structure and a mounting device operable to mount the first anchor to an expandable tubular member, a bearing mounted to the first anchor, an elongated threaded member rotatably coupled to the bearing, a driveshaft coupled to the elongated threaded member through the bearing and operable to rotate the elongated threaded member relative to the first anchor, and an expansion cone mounted to the elongated threaded member and operable to translate along the length of the elongated threaded member when the expansion cone is positioned in an expandable tubular member and the elongated threaded member is rotated.

According to another aspect of the present disclosure, a tubular member expansion apparatus is provided that includes a first anchor comprising an engagement member operable to engage an inner surface of an expandable tubular member, a bearing mounted to the first anchor, an elongated threaded member rotatably coupled to the bearing, a driveshaft coupled to the elongated threaded member through the bearing and operable to rotate the elongated threaded member relative to the first anchor, a second anchor coupled to the drive shaft, whereby the second anchor comprises a second anchor engagement member operable to engage an inner surface of a preexisting structure and a mounting device operable to mount the second anchor to an expandable tubular member, and an expansion cone mounted to the elongated threaded member and operable to translate along the length of the elongated threaded member when the expansion cone is positioned in an expandable tubular member and the elongated threaded member is rotated.

According to another aspect of the present disclosure, a method for radially expanding and plastically deforming an expandable tubular member is provided that includes providing an expandable tubular member, positioning an expansion device comprising an expansion monitoring device in the expandable tubular member, radially expanding and plastically deforming the expandable tubular member with the expansion device, and monitoring the acoustical signals produced during radial expansion and plastic deformation of the expandable tubular member with the expansion monitoring device.

According to another aspect of the present disclosure, a method for radially expanding and plastically deforming an expandable tubular member is provided that includes providing an expandable tubular member, positioning an expansion device comprising an expansion monitoring device in the expandable tubular member, radially expanding and plastically deforming the expandable tubular member with the expansion device, and monitoring the vibration signals produced during radial expansion and plastic deformation of the expandable tubular member with the expansion monitoring device.

According to another aspect of the present disclosure, a method for radially expanding and plastically deforming an expandable tubular member is provided that includes providing an expandable tubular member positioned in a preexisting structure, positioning an elongated threaded member in the expandable tubular member, the elongated threaded member comprising an expansion device, anchoring an anchor to an inner wall of a preexisting structure, whereby the elongated threaded member is rotatably coupled to the anchor, mounting the anchor to the expandable tubular member, and radially expanding and plastically deforming the expandable tubular member by rotating the elongated threaded member such that the expansion device translates along the length of the elongated threaded member.

According to another aspect of the present disclosure, a method for radially expanding and plastically deforming an expandable tubular is provided that includes providing an expandable tubular member positioned in a preexisting structure, positioning an elongated threaded member in the expandable tubular member, the elongated threaded member comprising an expansion device, anchoring a first anchor to an inner wall of a preexisting structure, whereby the elongated threaded member is rotatably coupled to the anchor, mounting the first anchor to the expandable tubular member, anchoring a second anchor to an inner wall of the expandable tubular member, whereby the elongated threaded member is rotatably coupled to the second anchor and radially expanding and plastically deforming the expandable tubular member by rotating the elongated threaded member such that the expansion device translates along the length of the elongated threaded member.

According to another aspect of the present disclosure, a method for radially expanding and plastically deforming an expandable tubular member is provided that includes providing an expandable tubular member, coating the expandable tubular member with an elastomer, positioning the expandable tubular member in a passageway defined by a formation and including an inner wall, determining a formation rebound, radially expanding and plastically deforming the expandable tubular member into engagement with the inner wall, such that the expandable tubular member comprises a preliminary inside diameter and, upon the formation rebound, the expandable tubular member comprises a desired inside diameter.

According to one aspect of the present disclosure, a method of testing a tubular member for suitability for expansion is provided using an expandability coefficient determined pursuant to a stress-strain test of a tubular member using axial loading.

According to another aspect of the present disclosure, a tubular member is selected for suitability for expansion on a basis comprising use of an expandability coefficient determined pursuant to a stress-strain test of a tubular member using axial loading.

According to another aspect of the present disclosure, a method of testing a tubular member for suitability for expansion is provided using an expandability coefficient determined pursuant to a stress-strain test using axial loading comprising calculation of plastic strain ratio for obtaining the expansion coefficient pursuant to test results and using the formula:

$$f = \frac{\ln\frac{b_o}{b_k}}{\ln\frac{L_k b_k}{l_o b_o}} \quad \text{Equation 1}$$

where, f—expandability coefficient bo & bk—initial and final tube area (inch^2)

Lo & Lk—initial and final tube length (inch)

b=(D^2−d^2)/4—cross section tube area.

According to another aspect of the present disclosure, a tubular member is selected for suitability for expansion on a basis comprising use of an expandability coefficient determined pursuant to a stress-strain test using axial loading comprising calculation of plastic strain ratio for obtaining the expansion coefficient pursuant to test results and using the formula:

$$f = \frac{\ln\frac{b_o}{b_k}}{\ln\frac{L_k b_k}{l_o b_o}} \quad \text{Equation 1}$$

where, f—expandability coefficient bo & bk—initial and final tube area (inch^2)

Lo & Lk—initial and final tube length (inch)

b=(D^2−d^2)/4—cross section tube area.

According to another aspect of the present disclosure, a tubular member is selected for suitability for expansion on a basis comprising use of an expandability coefficient determined pursuant to a stress-strain test using axial loading and one or more physical properties of the tubular member selected from stress-strain properties in one or more directional orientations of the material, Charpy V-notch impact value in one or more directional orientations of the material, stress rupture burst strength, stress rupture collapse strength, strain-hardening exponent (n-value), hardness and yield strength.

According to another aspect of the present disclosure, a method for manufacturing an expandable member used to complete a structure by radially expanding and plastically deforming the expandable member is provided that includes forming the expandable member from a steel alloy comprising a charpy energy of at least about 90 ft-lbs.

According to another aspect of the present disclosure, an expandable member for use in completing a structure by radially expanding and plastically deforming the expandable member is provided that includes a steel alloy comprising a charpy energy of at least about 90 ft-lbs.

According to another aspect of the present disclosure, a structural completion positioned within a structure is provided that includes one or more radially expanded and plastically deformed expandable members positioned within the structure; wherein one or more of the radially expanded and plastically deformed expandable members are fabricated from a steel alloy comprising a charpy energy of at least about 90 ft-lbs.

According to another aspect of the present disclosure, a method for manufacturing an expandable member used to complete a structure by radially expanding and plastically deforming the expandable member is provided that includes forming the expandable member from a steel alloy comprising a weight percentage of carbon of less than about 0.08%.

According to another aspect of the present disclosure, an expandable member for use in completing a wellbore by radially expanding and plastically deforming the expandable member at a downhole location in the wellbore is provided that includes a steel alloy comprising a weight percentage of carbon of less than about 0.08%.

According to another aspect of the present disclosure, a structural completion is provided that includes one or more radially expanded and plastically deformed expandable members positioned within the wellbore; wherein one or more of the radially expanded and plastically deformed expandable members are fabricated from a steel alloy comprising a weight percentage of carbon of less than about 0.08%.

According to another aspect of the present disclosure, a method for manufacturing an expandable member used to complete a structure by radially expanding and plastically deforming the expandable member is provided that includes forming the expandable member from a steel alloy comprising a weight percentage of carbon of less than about 0.20% and a charpy V-notch impact toughness of at least about 6 joules.

According to another aspect of the present disclosure, an expandable member for use in completing a structure by radially expanding and plastically deforming the expandable member is provided that includes a steel alloy comprising a weight percentage of carbon of less than about 0.20% and a charpy V-notch impact toughness of at least about 6 joules.

According to another aspect of the present disclosure, a structural completion is provided that includes one or more radially expanded and plastically deformed expandable members; wherein one or more of the radially expanded and plastically deformed expandable members are fabricated from a steel alloy comprising a weight percentage of carbon of less than about 0.20% and a charpy V-notch impact toughness of at least about 6 joules.

According to another aspect of the present disclosure, a method for manufacturing an expandable member used to complete a structure by radially expanding and plastically deforming the expandable member is provided that includes forming the expandable member from a steel alloy comprising the following ranges of weight percentages: C, from about 0.002 to about 0.08; Si, from about 0.009 to about 0.30; Mn, from about 0.10 to about 1.92; P, from about 0.004 to about 0.07; S, from about 0.0008 to about 0.006; Al, up to about 0.04; N, up to about 0.01; Cu, up to about 0.3; Cr, up to about 0.5; Ni, up to about 18; Nb, up to about 0.12; Ti, up to about 0.6; Co, up to about 9; and Mo, up to about 5.

According to another aspect of the present disclosure, an expandable member for use in completing a structure by radially expanding and plastically deforming the expandable member is provided that includes a steel alloy comprising the following ranges of weight percentages: C, from about 0.002 to about 0.08; Si, from about 0.009 to about 0.30; Mn, from about 0.10 to about 1.92; P, from about 0.004 to about 0.07; S, from about 0.0008 to about 0.006; Al, up to about 0.04; N, up to about 0.01; Cu, up to about 0.3; Cr, up to about 0.5; Ni, up to about 18; Nb, up to about 0.12; Ti, up to about 0.6; Co, up to about 9; and Mo, up to about 5.

According to another aspect of the present disclosure, a structural completion is provided that includes one or more radially expanded and plastically deformed expandable members; wherein one or more of the radially expanded and plastically deformed expandable members are fabricated from a steel alloy comprising the following ranges of weight percentages: C, from about 0.002 to about 0.08; Si, from about 0.009 to about 0.30; Mn, from about 0.10 to about 1.92; P, from about 0.004 to about 0.07; S, from about 0.0008 to about 0.006; Al, up to about 0.04; N, up to about 0.01; Cu, up to about 0.3; Cr, up to about 0.5; Ni, up to about 18; Nb, up to about 0.12; Ti, up to about 0.6; Co, up to about 9; and Mo, up to about 5.

According to another aspect of the present disclosure, a method for manufacturing an expandable tubular member used to complete a structure by radially expanding and plastically deforming the expandable member is provided that includes forming the expandable tubular member with a ratio of the of an outside diameter of the expandable tubular member to a wall thickness of the expandable tubular member ranging from about 12 to 22.

According to another aspect of the present disclosure, an expandable member for use in completing a structure by radially expanding and plastically deforming the expandable member is provided that includes an expandable tubular member with a ratio of the of an outside diameter of the expandable tubular member to a wall thickness of the expandable tubular member ranging from about 12 to 22.

According to another aspect of the present disclosure, a structural completion is provided that includes one or more radially expanded and plastically deformed expandable members positioned within the structure; wherein one or more of the radially expanded and plastically deformed expandable members are fabricated from an expandable tubular member with a ratio of the of an outside diameter of the expandable tubular member to a wall thickness of the expandable tubular member ranging from about 12 to 22.

According to another aspect of the present disclosure, a method of constructing a structure is provided that includes radially expanding and plastically deforming an expandable member; wherein an outer portion of the wall thickness of the radially expanded and plastically deformed expandable member comprises tensile residual stresses.

According to another aspect of the present disclosure, a structural completion is provided that includes one or more radially expanded and plastically deformed expandable members; wherein an outer portion of the wall thickness of one or more of the radially expanded and plastically deformed expandable members comprises tensile residual stresses.

According to another aspect of the present disclosure, a method of constructing a structure using an expandable tubular member is provided that includes strain aging the expandable member; and then radially expanding and plastically deforming the expandable member.

According to another aspect of the present disclosure, a method for manufacturing a tubular member used to complete a wellbore by radially expanding the tubular member at a downhole location in the wellbore comprising: forming a steel alloy comprising a concentration of carbon between approximately 0.002% and 0.08% by weight of the steel alloy.

BRIEF DESCRIPTION OF THE DRAWINGS

FIG. 35b is a graphical illustration of an exemplary embodiment of the variation in the yield point for the expandable tubular member of FIG. 35a.

FIG. 41c is a perspective view illustrating an exemplary embodiment of the expandable tubular member and layer of FIG. 41a where the coating layer is plastic according to the method of FIG. 39.

FIG. 41d is a perspective view illustrating an exemplary embodiment of the expandable tubular member and layer of FIG. 41a where the coating layer is aluminum according to the method of FIG. 39.

FIG. 55b is a chart view illustrating an exemplary experimental embodiment of the thickness of the interstitial layer for a plurality of tubular assemblies produced by the method of FIG. 39.

FIG. 56a is a close up cross sectional view illustrating an exemplary experimental embodiment of a tubular assembly produced by the method of FIG. 39 but omitting the coating with a layer of material.

FIG. 62c is a graphical view illustrating an exemplary experimental embodiment of the wall thickness of a preexisting structure for a tubular assembly produced by the method of FIG. 39.

FIG. 68 is a perspective view illustrating an exemplary embodiment of the expandable tubular member and layer within the preexisting structure of FIG. 67 with the expandable tubular member being expanded according to the method of FIG. 64.

FIG. 69b is a schematic view illustrating an exemplary embodiment of the expandable tubular member and layer expanded within the preexisting structure of FIG. 69a with a circumferential tensile force in the preexisting structure.

FIG. 70 is a cross sectional view illustrating an exemplary embodiment of the expandable tubular member and layer expanded within the preexisting structure of FIG. 69a with a testing aperture formed in the preexisting structure in order to collapse test the expandable tubular member.

FIG. 72 is a graph illustrating an exemplary experimental embodiment of a collapse test conducted on the expandable tubular member and the preexisting structure of FIG. 69a with a plastic used as the layer between them.

FIG. 73 is a graph illustrating an exemplary experimental embodiment of a collapse test conducted on the expandable tubular member and the preexisting structure of FIG. 69a with an aluminum material used as the layer between them.

FIG. 74 is a graph illustrating an exemplary experimental embodiment of a collapse test conducted on the expandable tubular member and the preexisting structure of FIG. 69a with an aluminum and zinc material used as the layer between them.

FIG. 76b is a side view illustrating an exemplary embodiment of the tubular member expansion apparatus of FIG. 76a.

FIG. 76c is a schematic and perspective view illustrating an exemplary alternative embodiment of the tubular member expansion apparatus of FIGS. 76a and 76b.

FIG. 82b is a side view illustrating an exemplary alternative embodiment of the tubular member expansion apparatus of FIG. 82a.

FIG. 82c is a schematic view illustrating an exemplary alternative embodiment of the tubular member expansion apparatus of FIG. 82a.

FIG. 83b is a partial cross sectional view illustrating an exemplary embodiment of the tubular member expansion apparatus of FIG. 82 radially expanding and plastically deforming the expandable tubular member of FIG. 81.

FIG. 84 is a partial cross sectional view illustrating an exemplary embodiment of an expandable tubular member positioned in a preexisting structure.

FIG. 85a is a side view illustrating an exemplary embodiment of a tubular member expansion apparatus used with the expandable tubular member of FIG. 84.

FIG. 85b is a partial cross sectional view illustrating an exemplary embodiment of the tubular member expansion apparatus of FIG. 85a.

FIG. 86a is a flow chart illustrating an exemplary embodiment of a method for radially expanding and plastically deforming an expandable tubular member.

FIG. 86b is a partial cross sectional view illustrating an exemplary embodiment of the tubular member expansion apparatus of FIG. 85a radially expanding and plastically deforming the expandable tubular member of FIG. 84.

FIG. 87 is a partial cross sectional view illustrating an exemplary embodiment of an expandable tubular member positioned in a preexisting structure.

FIG. 88a is a side view illustrating an exemplary embodiment of a tubular member expansion apparatus used with the expandable tubular member of FIG. 87.

FIG. 88b is a partial cross sectional view illustrating an exemplary embodiment of the tubular member expansion apparatus of FIG. 88a.

FIG. 89a is a flow chart illustrating an exemplary embodiment of a method for radially expanding and plastically deforming an expandable tubular member.

FIG. 89b is a partial cross sectional view illustrating an exemplary embodiment of the tubular member expansion apparatus of FIG. 88a radially expanding and plastically deforming the expandable tubular member of FIG. 87.

FIG. 90 is a perspective view illustrating an exemplary embodiment of an expandable tubular member.

Figure 91:
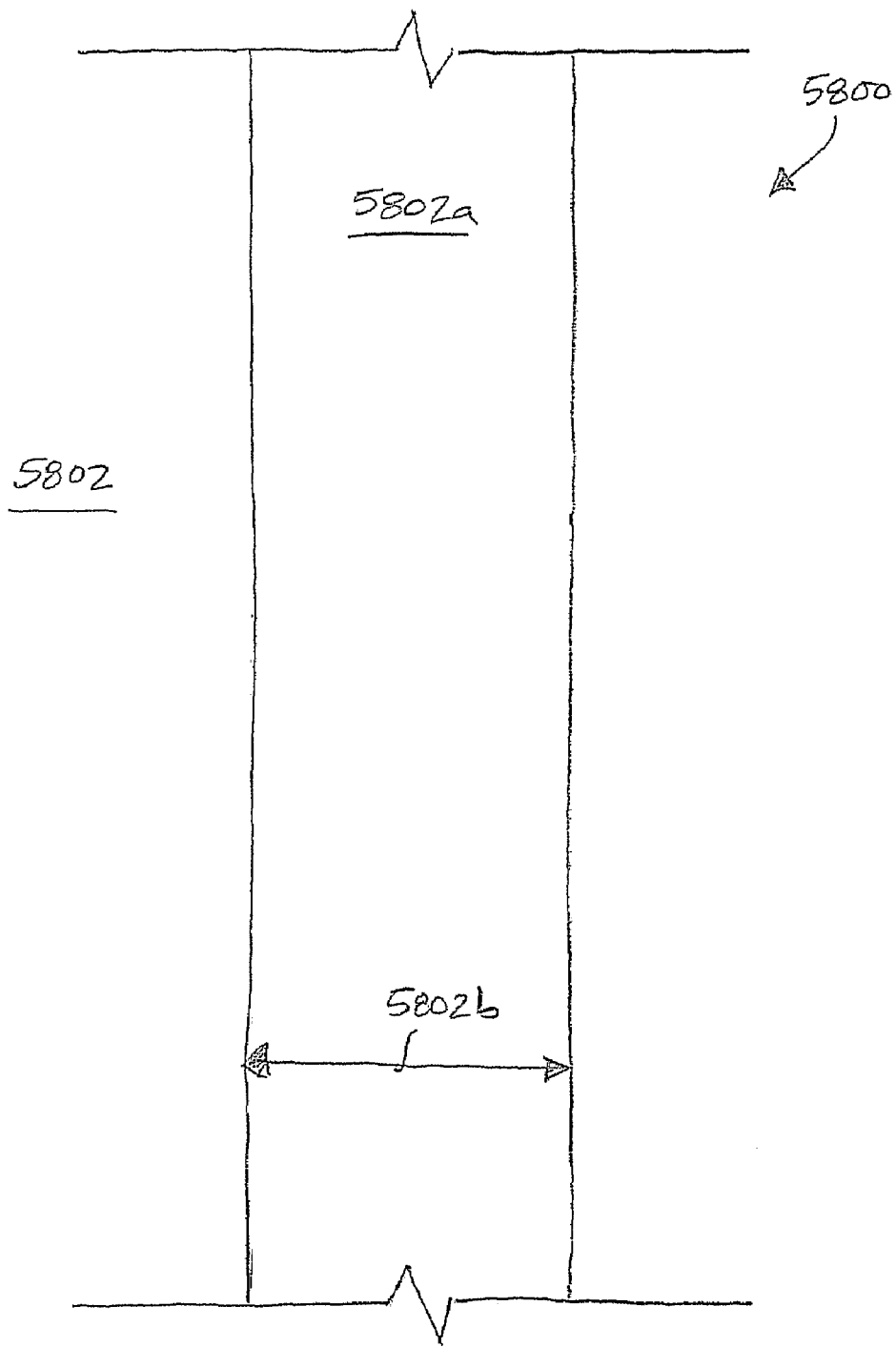

FIG. 91 is a partial cross sectional view illustrating an exemplary embodiment of a formation used with the expandable tubular member of FIG. 90.

Figure 92A:
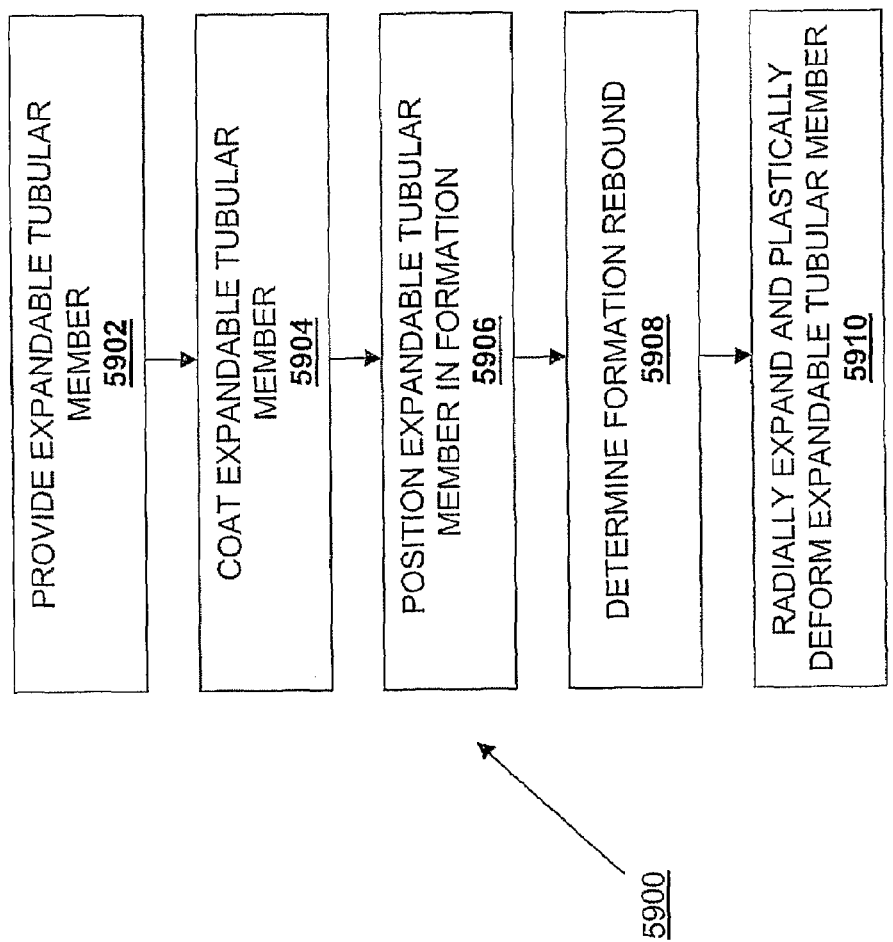

FIG. 92a is a flow chart illustrating an exemplary embodiment of a method for radially expanding and plastically deforming an expandable tubular member.

FIG. 92b is a perspective view illustrating an exemplary embodiment of the expandable tubular member of FIG. 90 coated with an elastomer layer.

Figure 92C:
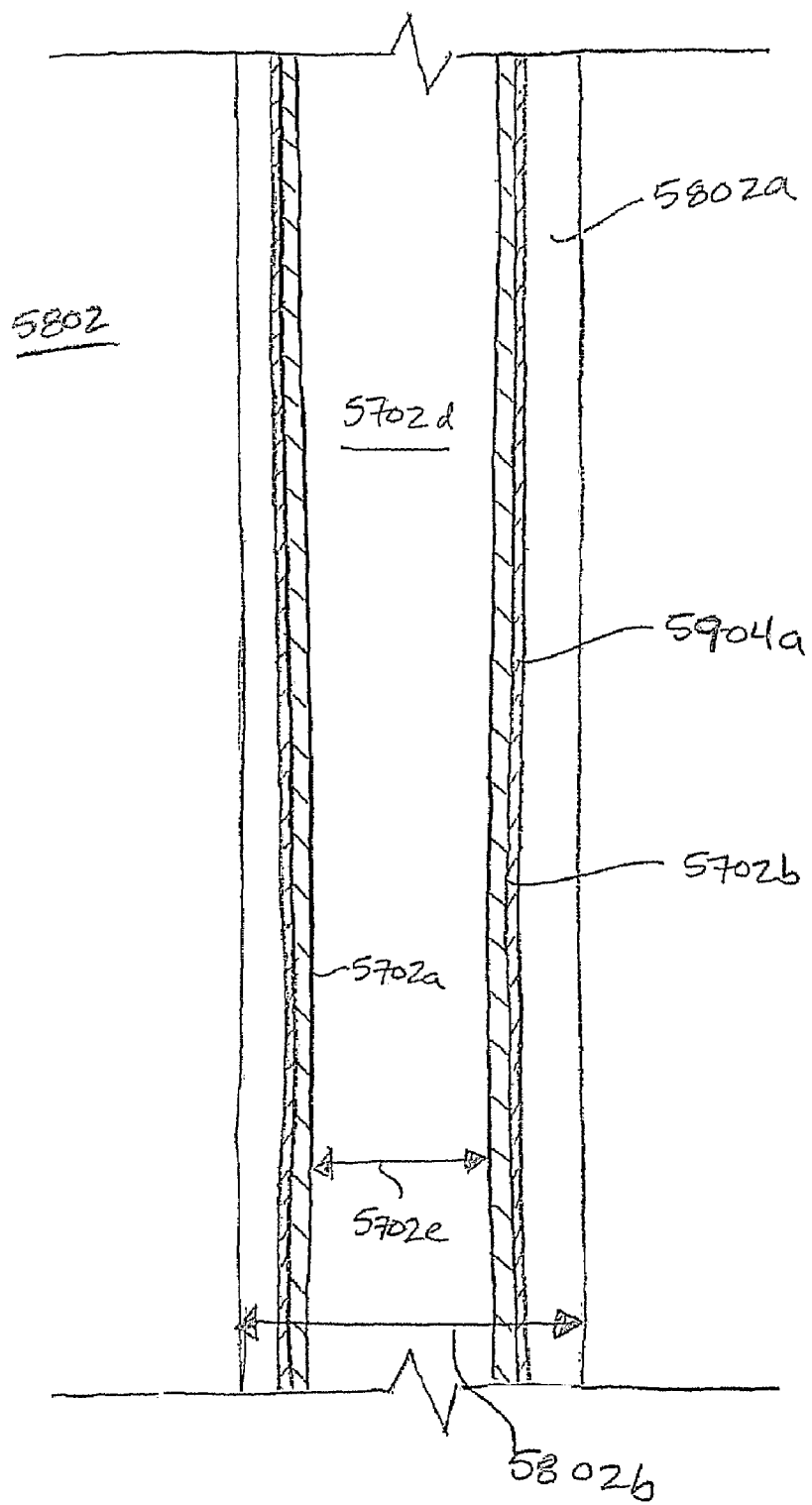

FIG. 92c is a partial cross sectional view illustrating an exemplary embodiment of the expandable tubular member of FIG. 92b positioned in the formation of FIG. 91.

Figure 92D:
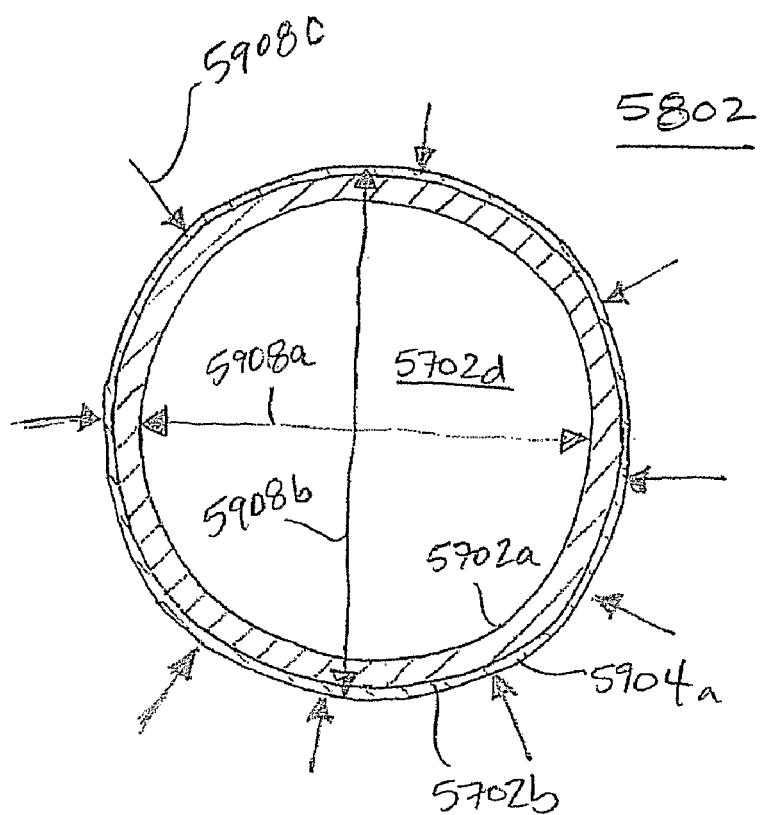

FIG. 92d is a partial cross sectional view illustrating the expandable tubular member of FIG. 92b expanded in the formation of FIG. 91 prior to formation rebound.

Figure 92E:
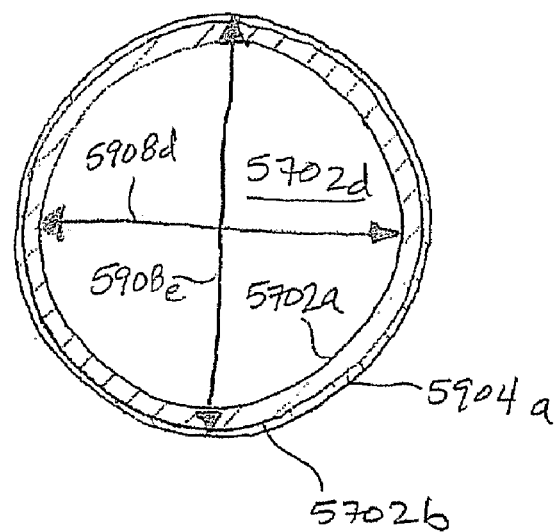

FIG. 92e is a partial cross sectional view illustrating the expandable tubular member of FIG. 92b expanded in the formation of FIG. 91 after formation rebound.

Figure 92F:
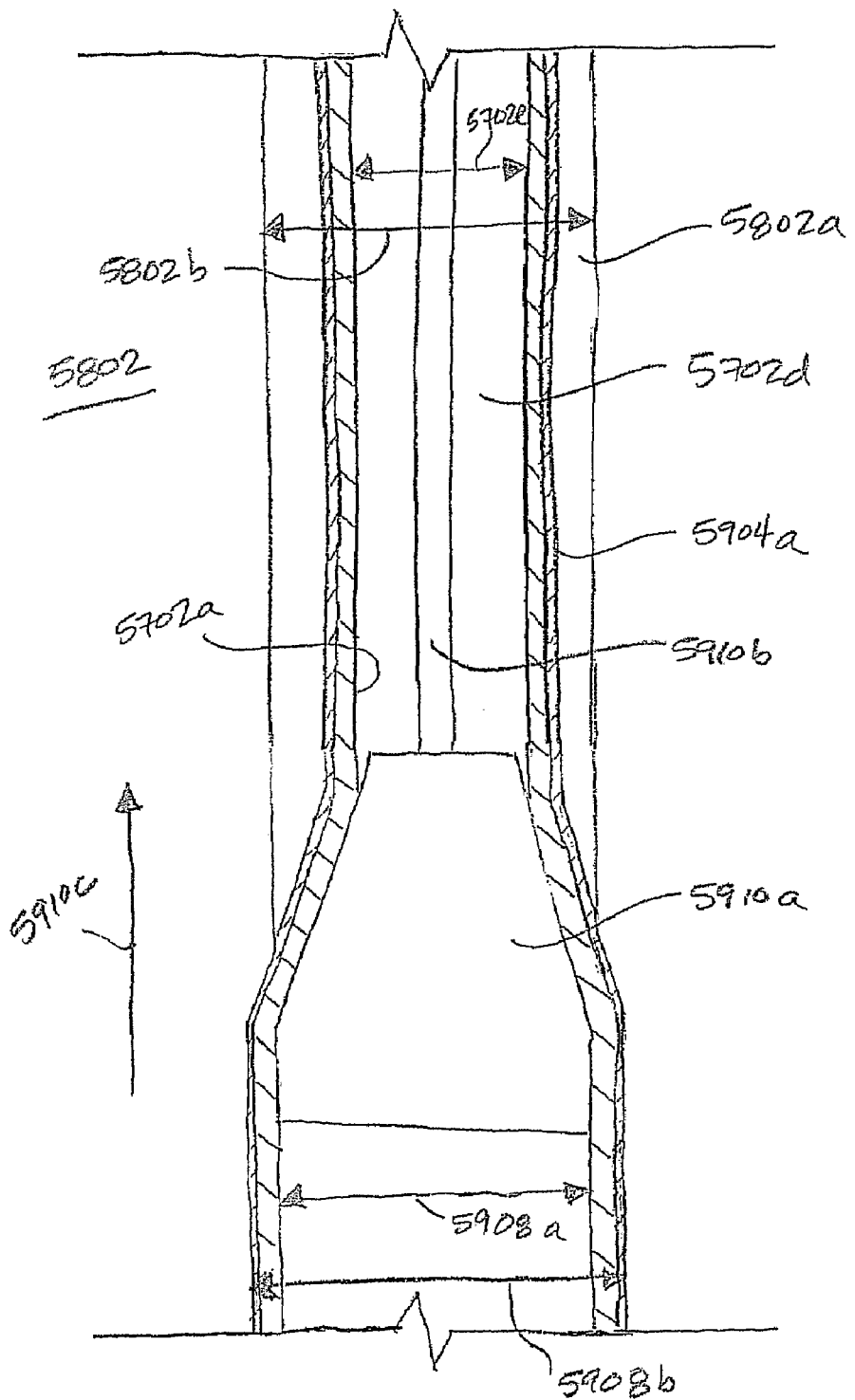

FIG. 92f is a partial cross sectional view illustrating an exemplary embodiment of the expandable tubular member of FIG. 92b being expanded in the formation of FIG. 91.

Figure 93:
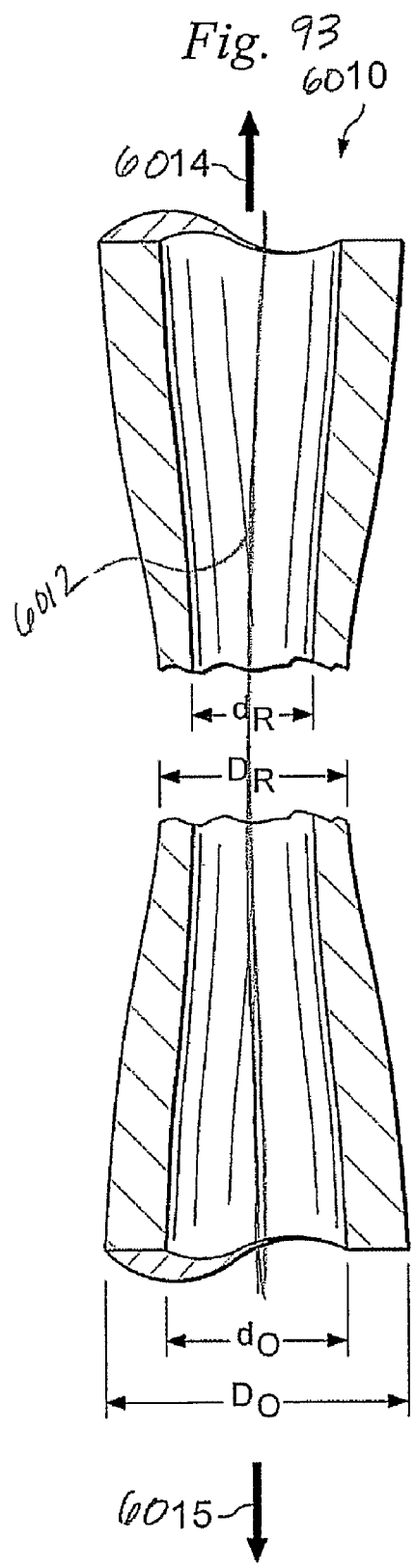

FIG. 93 is a schematic fragmentary cross-sectional view illustrating an exemplary embodiment along a plane along and through the central axis of a tubular member that is tested to failure with axial opposed forces.

FIG. 94 is a stress-strain curve illustrating an exemplary embodiment representing values for stress and strain that may be plotted for solid specimen sample.

FIG. 95 is a schematically view illustrating an exemplary embodiment of a stress strain curve representing values from a test on a tubular member according to an illustrative example of one aspect of the invention.

DETAILED DESCRIPTION OF THE ILLUSTRATIVE EMBODIMENTS

Figure 1:
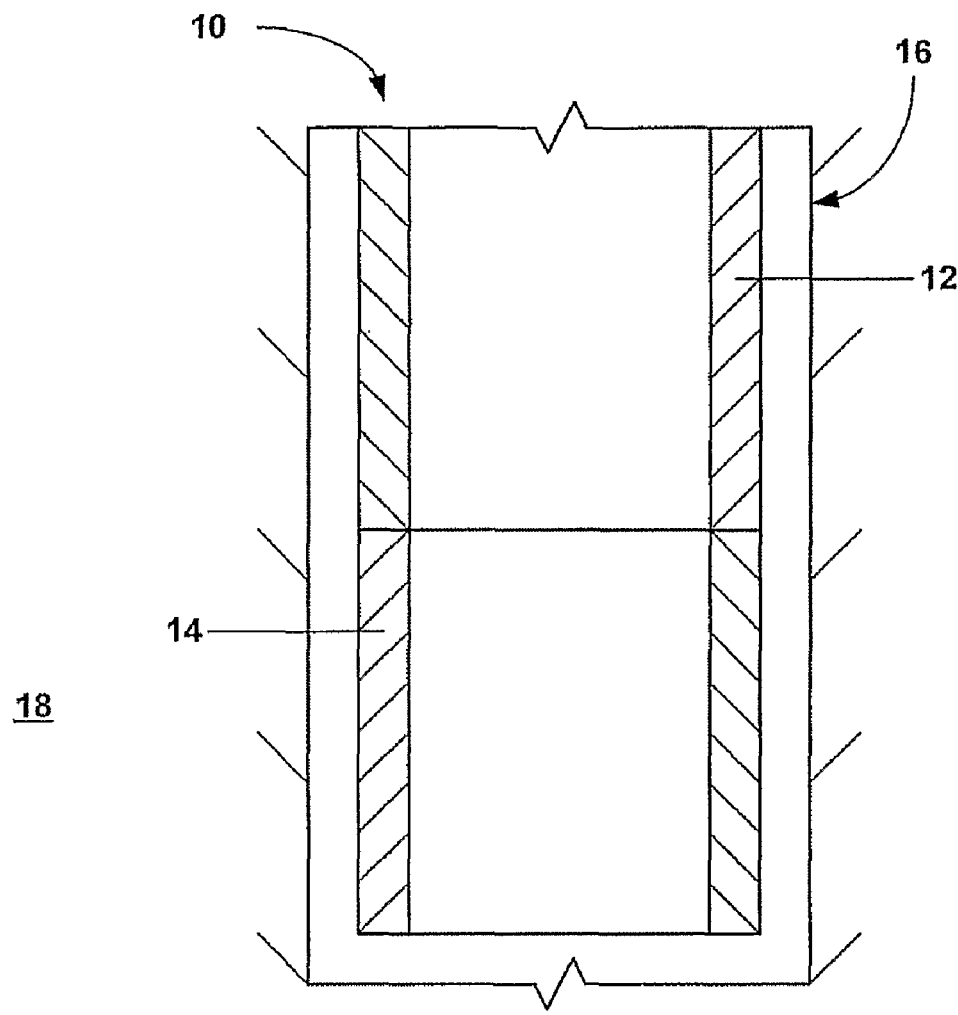
FIG. 1 is a fragmentary cross sectional view of an exemplary embodiment of an expandable tubular member positioned within a preexisting structure.

Referring initially to FIG. 1, an exemplary embodiment of an expandable tubular assembly 10 includes a first expandable tubular member 12 coupled to a second expandable tubular member 14. In several exemplary embodiments, the ends of the first and second expandable tubular members, 12 and 14, are coupled using, for example, a conventional mechanical coupling, a welded connection, a brazed connection, a threaded connection, and/or an interference fit connection. In an exemplary embodiment, the first expandable tubular member 12 has a plastic yield point $YP_1$, and the second expandable tubular member 14 has a plastic yield point $YP_2$. In an exemplary embodiment, the expandable tubular assembly 10 is positioned within a preexisting structure such as, for example, a wellbore 16 that traverses a subterranean formation 18.

Figure 2:
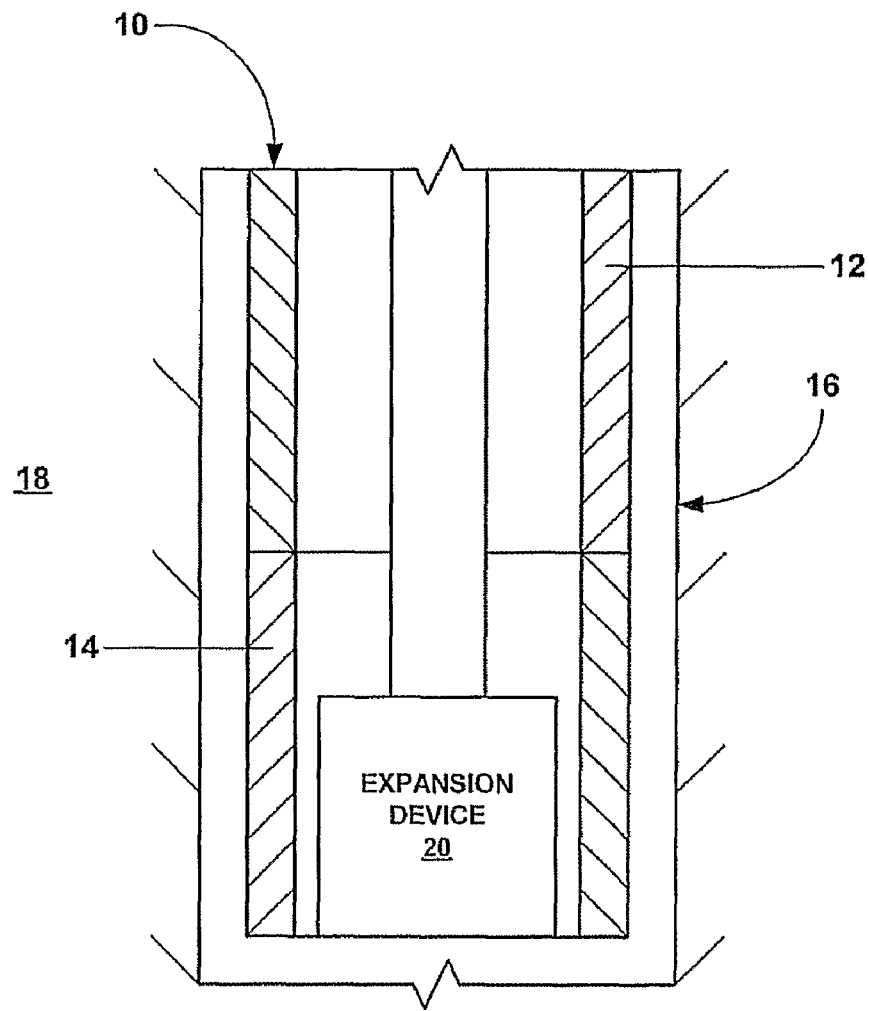
FIG. 2 is a fragmentary cross sectional view of the expandable tubular member of FIG. 1 after positioning an expansion device within the expandable tubular member.

As illustrated in FIG. 2, an expansion device 20 may then be positioned within the second expandable tubular member 14. In several exemplary embodiments, the expansion device 20 may include, for example, one or more of the following conventional expansion devices: a) an expansion cone; b) a rotary expansion device; c) a hydroforming expansion device; d) an impulsive force expansion device; d) any one of the expansion devices commercially available from, or disclosed in any of the published patent applications or issued patents, of Weatherford International, Baker Hughes, Halliburton Energy Services, Shell Oil Co., Schlumberger, and/or Enventure Global Technology L.L.C. In several exemplary embodiments, the expansion device 20 is positioned within the second expandable tubular member 14 before, during, or after the placement of the expandable tubular assembly 10 within the preexisting structure 16.

Figure 3:
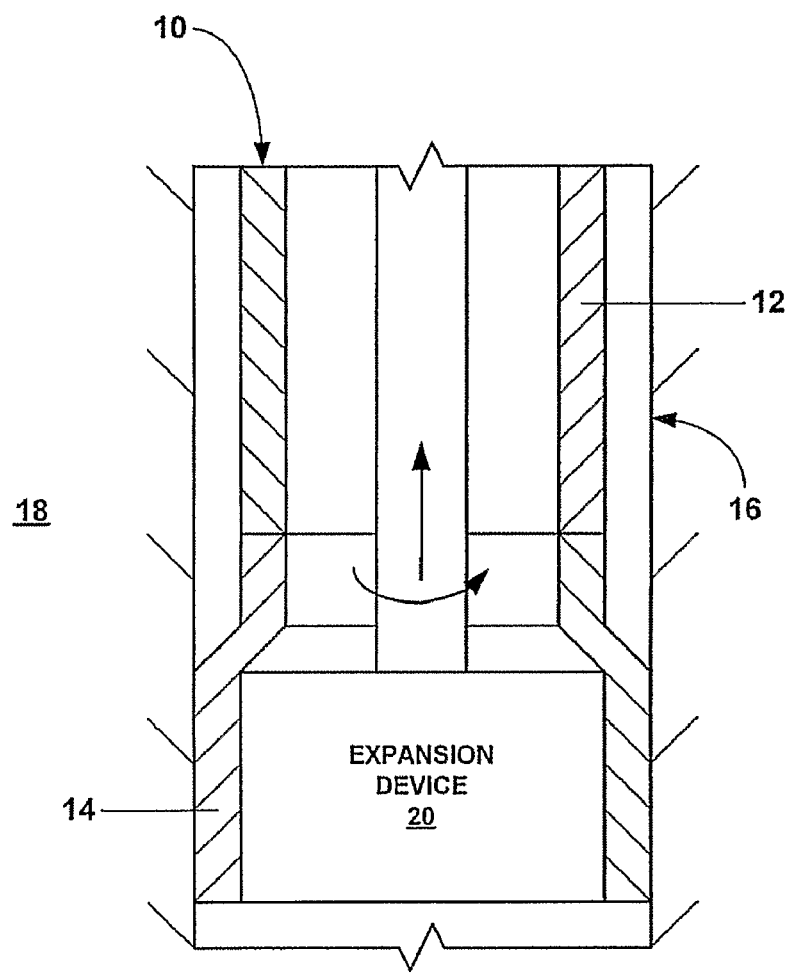
FIG. 3 is a fragmentary cross sectional view of the expandable tubular member of FIG. 2 after operating the expansion device within the expandable tubular member to radially expand and plastically deform a portion of the expandable tubular member.

As illustrated in FIG. 3, the expansion device 20 may then be operated to radially expand and plastically deform at least a portion of the second expandable tubular member 14 to form a bell-shaped section.

Figure 4:
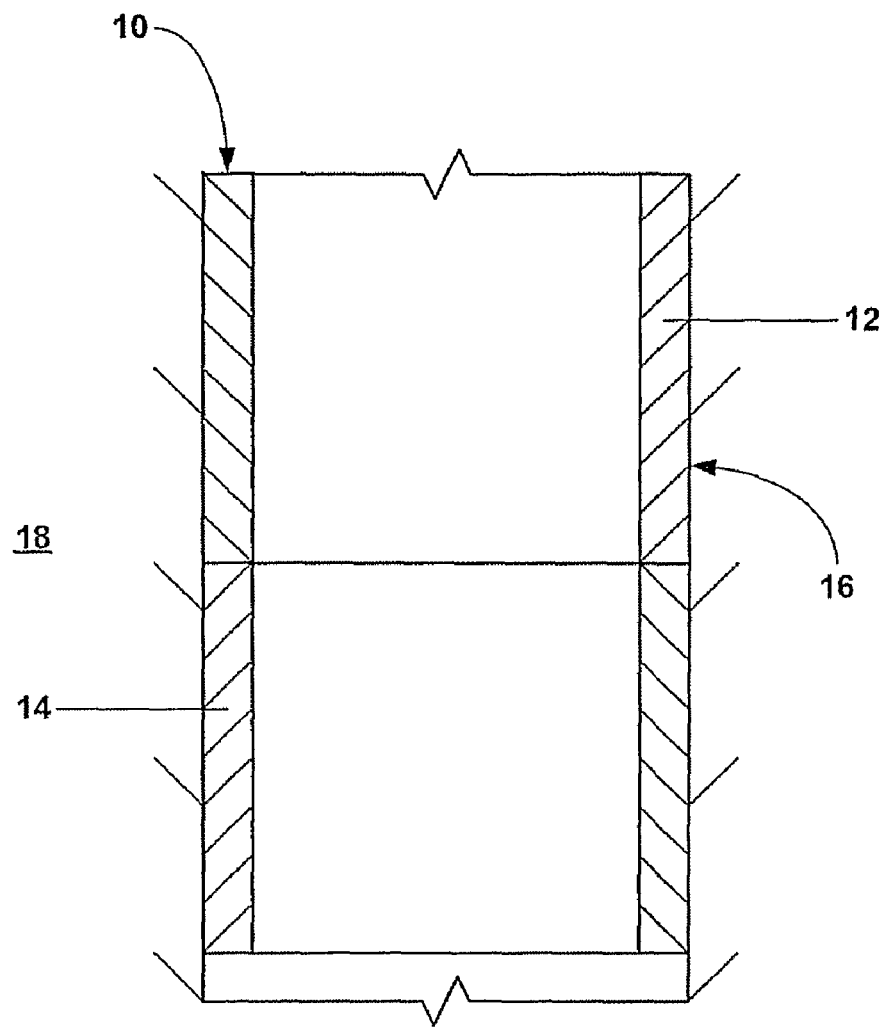
FIG. 4 is a fragmentary cross sectional view of the expandable tubular member of FIG. 3 after operating the expansion device within the expandable tubular member to radially expand and plastically deform another portion of the expandable tubular member.

As illustrated in FIG. 4, the expansion device 20 may then be operated to radially expand and plastically deform the remaining portion of the second expandable tubular member 14 and at least a portion of the first expandable tubular member 12.

In an exemplary embodiment, at least a portion of at least a portion of at least one of the first and second expandable tubular members, 12 and 14, are radially expanded into intimate contact with the interior surface of the preexisting structure 16.

Figure 5:
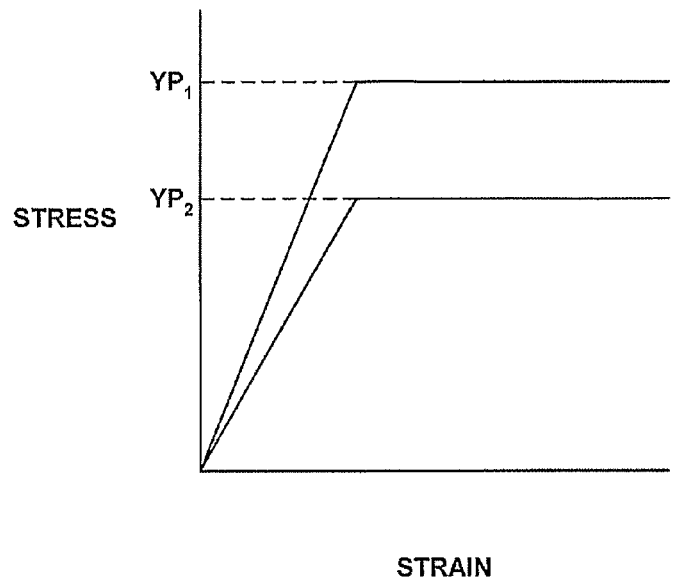
FIG. 5 is a graphical illustration of exemplary embodiments of the stress/strain curves for several portions of the expandable tubular member of FIGS. 1-4.

In an exemplary embodiment, as illustrated in FIG. 5, the plastic yield point $YP_1$ is greater than the plastic yield point $YP_2$. In this manner, in an exemplary embodiment, the amount of power and/or energy required to radially expand the second expandable tubular member 14 is less than the amount of power and/or energy required to radially expand the first expandable tubular member 12.

Figure 6:
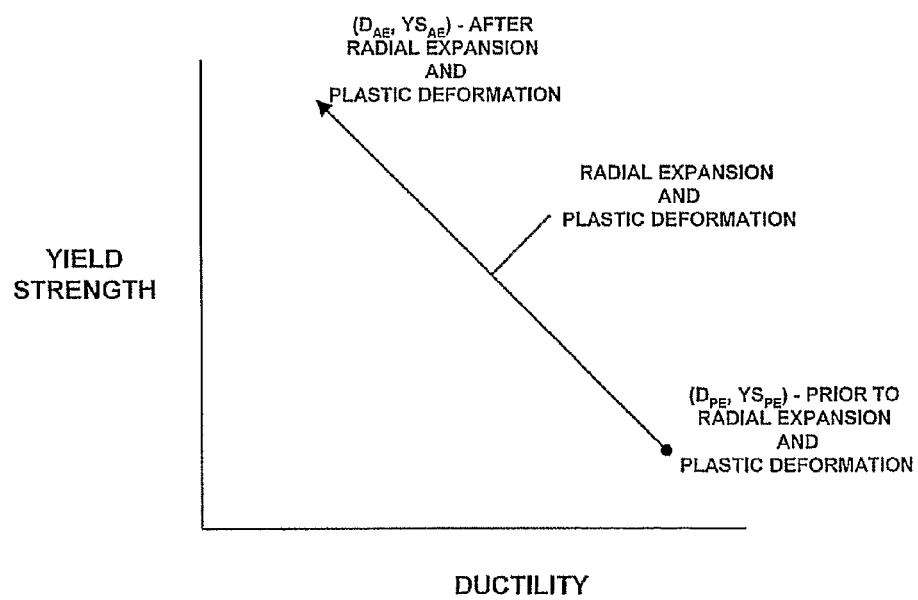
FIG. 6 is a graphical illustration of the an exemplary embodiment of the yield strength vs. ductility curve for at least a portion of the expandable tubular member of FIGS. 1-4.

In an exemplary embodiment, as illustrated in FIG. 6, the first expandable tubular member 12 and/or the second expandable tubular member 14 have a ductility $D_{PE}$ and a yield strength $YS_{PE}$ prior to radial expansion and plastic deformation, and a ductility $D_{AE}$ and a yield strength $YS_{AE}$ after radial expansion and plastic deformation. In an exemplary embodiment, $D_{PE}$ is greater than $D_{AE}$, and $YS_{AE}$ is greater than $YS_{PE}$. In this manner, the first expandable tubular member 12 and/or the second expandable tubular member 14 are transformed during the radial expansion and plastic deformation process. Furthermore, in this manner, in an exemplary embodiment, the amount of power and/or energy required to radially expand each unit length of the first and/or second expandable tubular members, 12 and 14, is reduced. Furthermore, because the $YS_{AE}$ is greater than $YS_{PE}$, the collapse strength of the first expandable tubular member 12 and/or the second expandable tubular member 14 is increased after the radial expansion and plastic deformation process.

Figure 7:
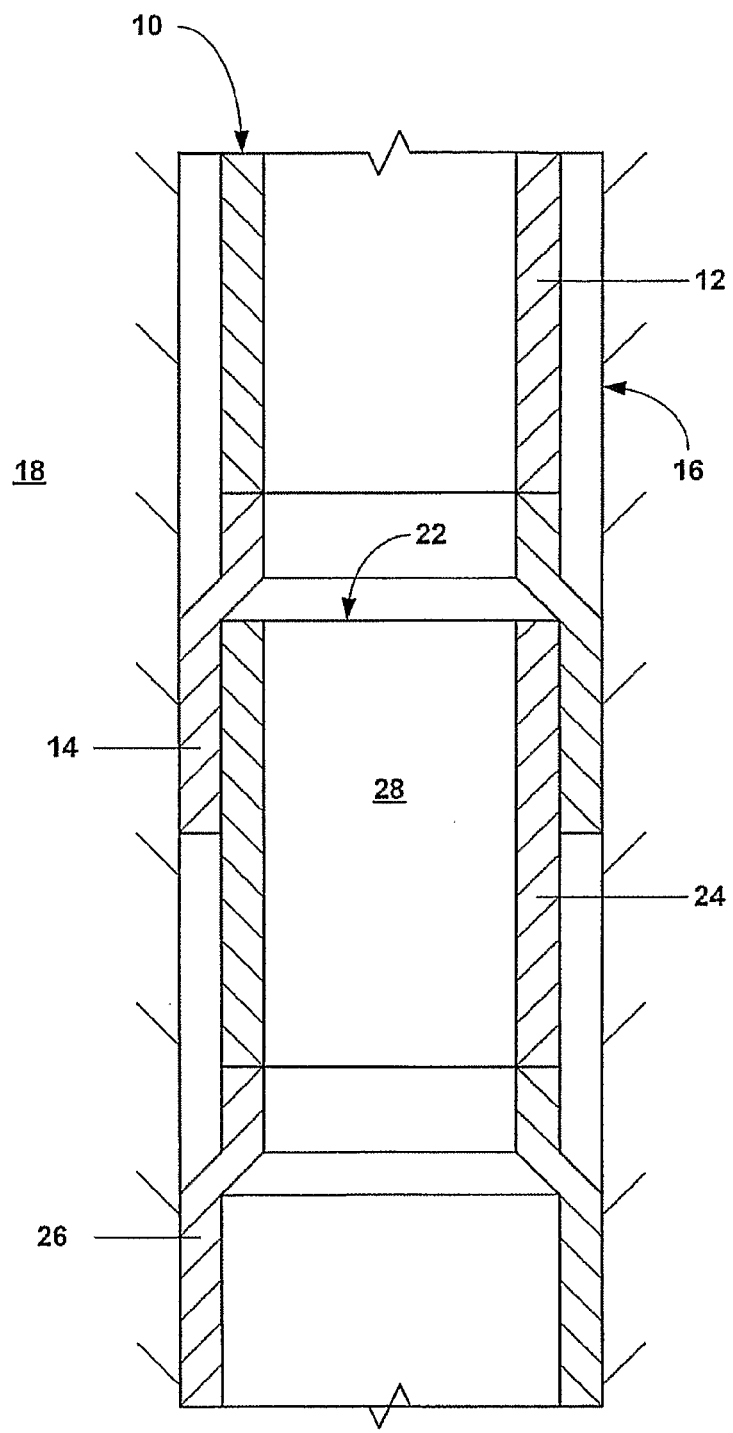
FIG. 7 is a fragmentary cross sectional illustration of an embodiment of a series of overlapping expandable tubular members.

In an exemplary embodiment, as illustrated in FIG. 7, following the completion of the radial expansion and plastic deformation of the expandable tubular assembly 10 described above with reference to FIGS. 1-4, at least a portion of the second expandable tubular member 14 has an inside diameter that is greater than at least the inside diameter of the first expandable tubular member 12. In this manner a bell-shaped section is formed using at least a portion of the second expandable tubular member 14. Another expandable tubular assembly 22 that includes a first expandable tubular member 24 and a second expandable tubular member 26 may then be positioned in overlapping relation to the first expandable tubular assembly 10 and radially expanded and plastically deformed using the methods described above with reference to FIGS. 1-4. Furthermore, following the completion of the radial expansion and plastic deformation of the expandable tubular assembly 20, in an exemplary embodiment, at least a portion of the second expandable tubular member 26 has an inside diameter that is greater than at least the inside diameter of the first expandable tubular member 24. In this manner a bell-shaped section is formed using at least a portion of the second expandable tubular member 26. Furthermore, in this manner, a mono-diameter tubular assembly is formed that defines an internal passage 28 having a substantially constant cross-sectional area and/or inside diameter.

Figure 8:
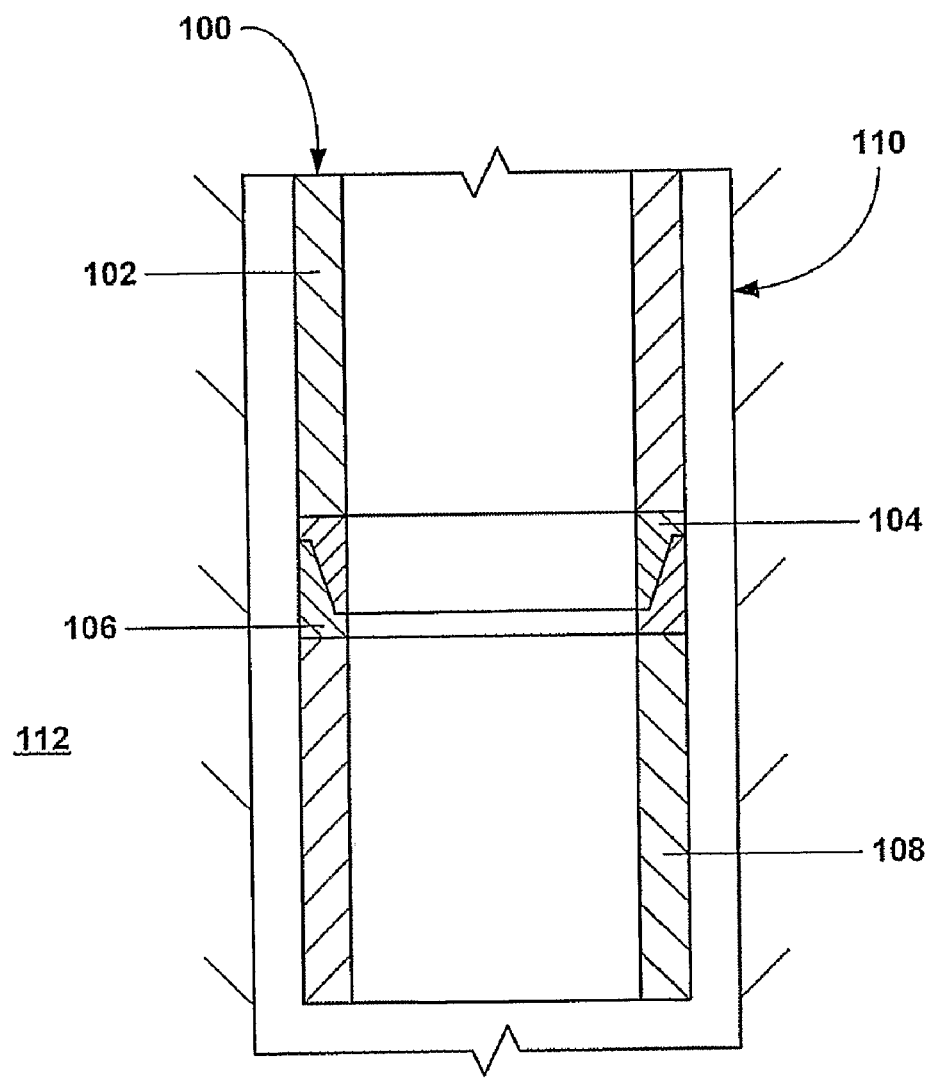
FIG. 8 is a fragmentary cross sectional view of an exemplary embodiment of an expandable tubular member positioned within a preexisting structure.

Referring to FIG. 8, an exemplary embodiment of an expandable tubular assembly 100 includes a first expandable tubular member 102 coupled to a tubular coupling 104. The tubular coupling 104 is coupled to a tubular coupling 106. The tubular coupling 106 is coupled to a second expandable tubular member 108. In several exemplary embodiments, the tubular couplings, 104 and 106, provide a tubular coupling assembly for coupling the first and second expandable tubular members, 102 and 108, together that may include, for example, a conventional mechanical coupling, a welded connection, a brazed connection, a threaded connection, and/or an interference fit connection. In an exemplary embodiment, the first and second expandable tubular members 12 have a plastic yield point $YP_1$, and the tubular couplings, 104 and 106, have a plastic yield point $YP_2$. In an exemplary embodiment, the expandable tubular assembly 100 is positioned within a preexisting structure such as, for example, a wellbore 110 that traverses a subterranean formation 112.

Figure 9:
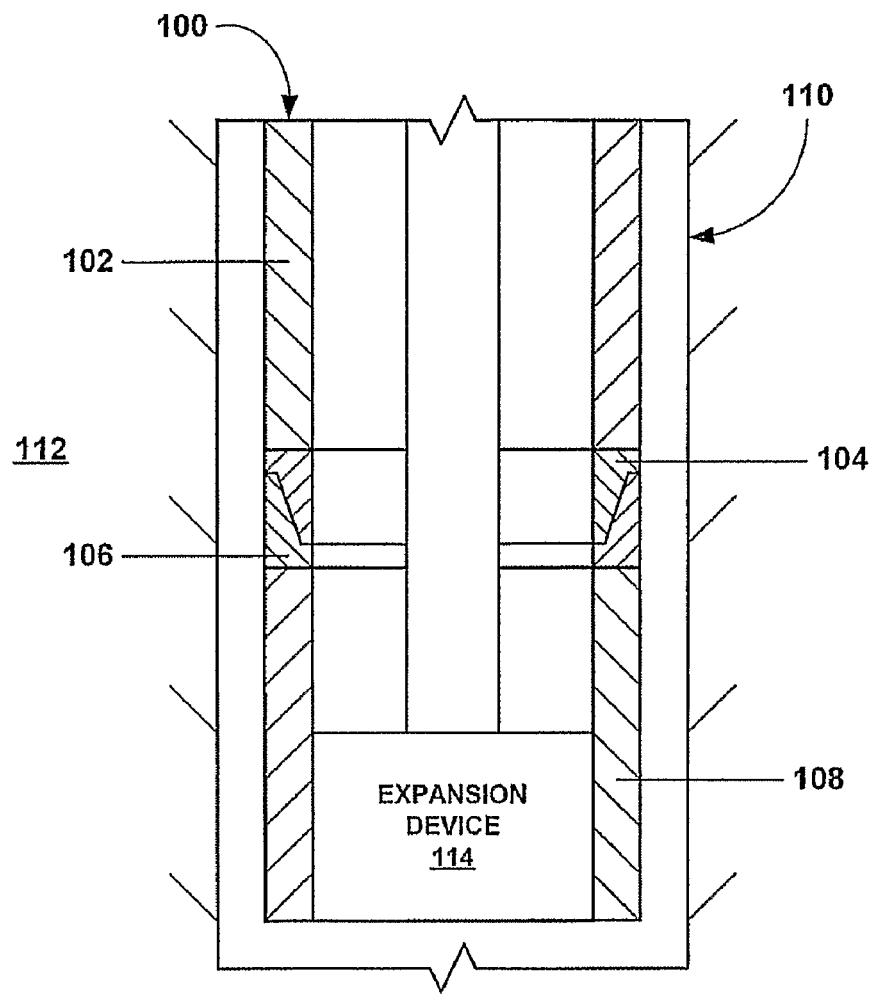
FIG. 9 is a fragmentary cross sectional view of the expandable tubular member of FIG. 8 after positioning an expansion device within the expandable tubular member.

As illustrated in FIG. 9, an expansion device 114 may then be positioned within the second expandable tubular member 108. In several exemplary embodiments, the expansion device 114 may include, for example, one or more of the following conventional expansion devices: a) an expansion cone; b) a rotary expansion device; c) a hydroforming expansion device; d) an impulsive force expansion device; d) any one of the expansion devices commercially available from, or disclosed in any of the published patent applications or issued patents, of Weatherford International, Baker Hughes, Halliburton Energy Services, Shell Oil Co., Schlumberger, and/or Enventure Global Technology L.L.C. In several exemplary embodiments, the expansion device 114 is positioned within the second expandable tubular member 108 before, during, or after the placement of the expandable tubular assembly 100 within the preexisting structure 110.

Figure 10:
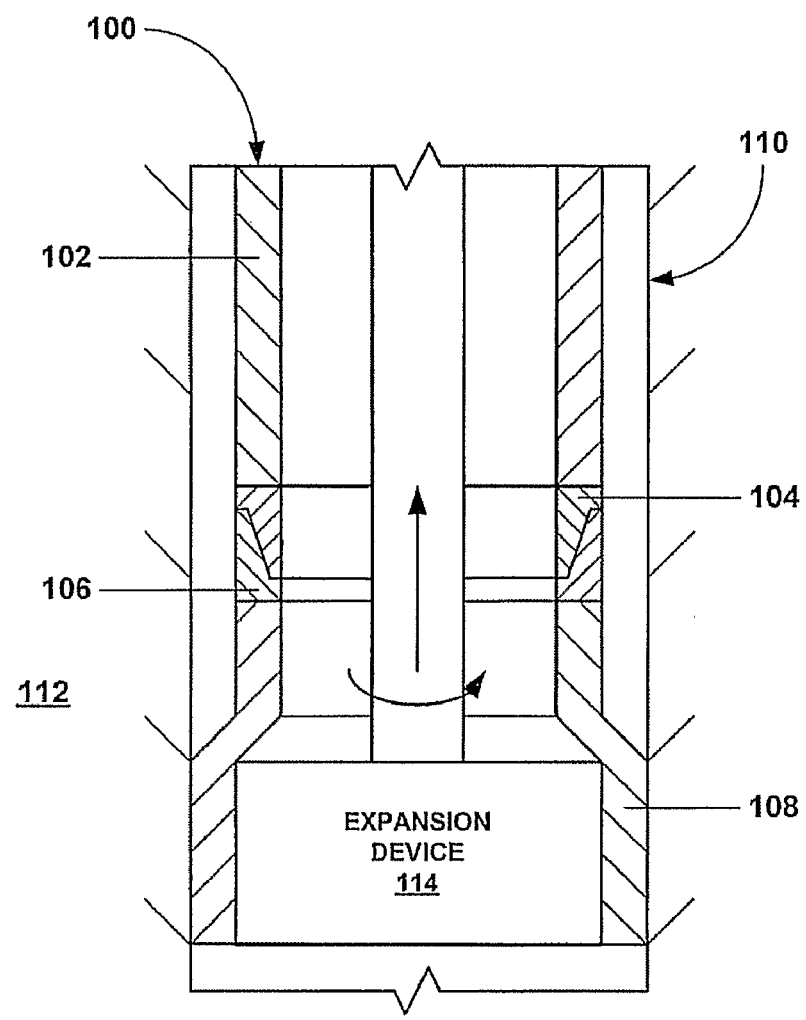
FIG. 10 is a fragmentary cross sectional view of the expandable tubular member of FIG. 9 after operating the expansion device within the expandable tubular member to radially expand and plastically deform a portion of the expandable tubular member.

As illustrated in FIG. 10, the expansion device 114 may then be operated to radially expand and plastically deform at least a portion of the second expandable tubular member 108 to form a bell-shaped section.

Figure 11:
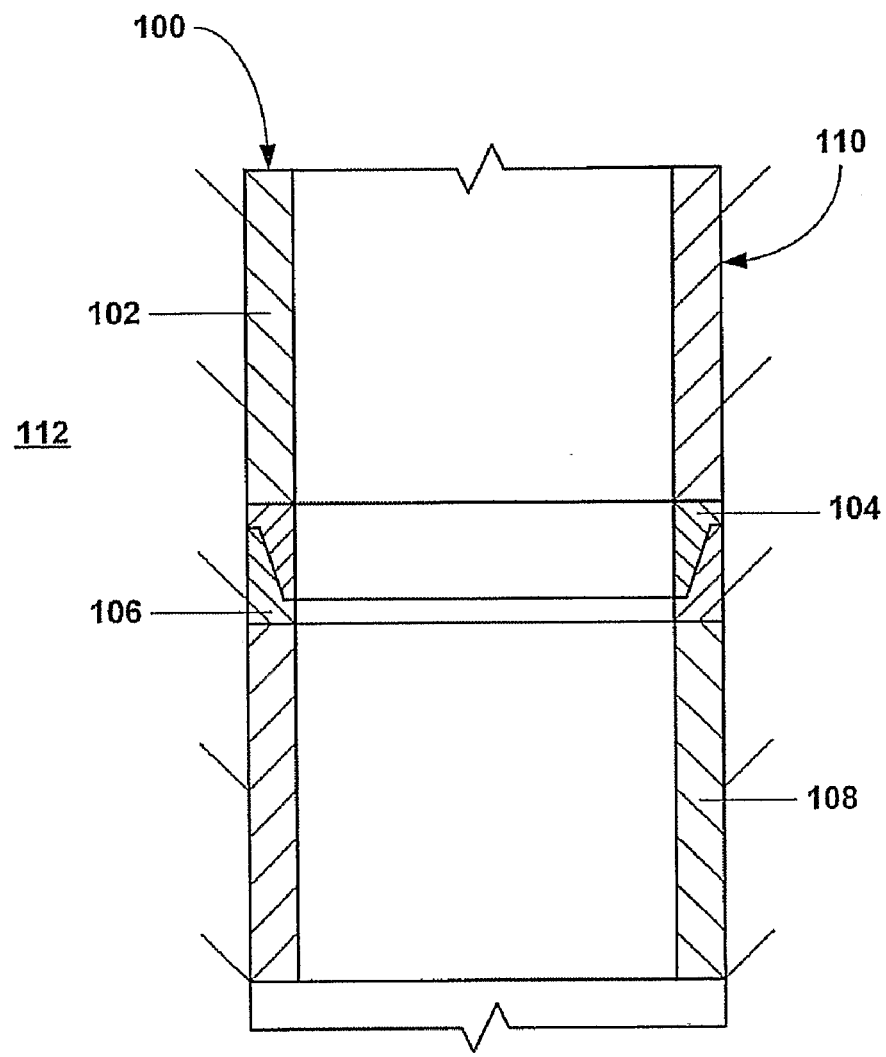
FIG. 11 is a fragmentary cross sectional view of the expandable tubular member of FIG. 10 after operating the expansion device within the expandable tubular member to radially expand and plastically deform another portion of the expandable tubular member.

As illustrated in FIG. 11, the expansion device 114 may then be operated to radially expand and plastically deform the remaining portion of the second expandable tubular member 108, the tubular couplings, 104 and 106, and at least a portion of the first expandable tubular member 102.

In an exemplary embodiment, at least a portion of at least a portion of at least one of the first and second expandable tubular members, 102 and 108, are radially expanded into intimate contact with the interior surface of the preexisting structure 110.

Figure 12:
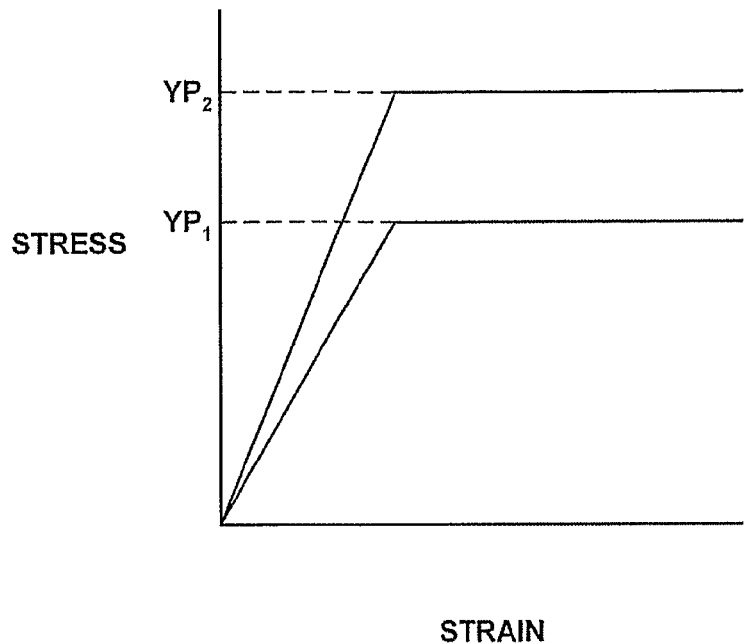
FIG. 12 is a graphical illustration of exemplary embodiments of the stress/strain curves for several portions of the expandable tubular member of FIGS. 8-11.

In an exemplary embodiment, as illustrated in FIG. 12, the plastic yield point $YP_1$ is less than the plastic yield point $YP_2$. In this manner, in an exemplary embodiment, the amount of power and/or energy required to radially expand each unit length of the first and second expandable tubular members, 102 and 108, is less than the amount of power and/or energy required to radially expand each unit length of the tubular couplings, 104 and 106.

Figure 13:
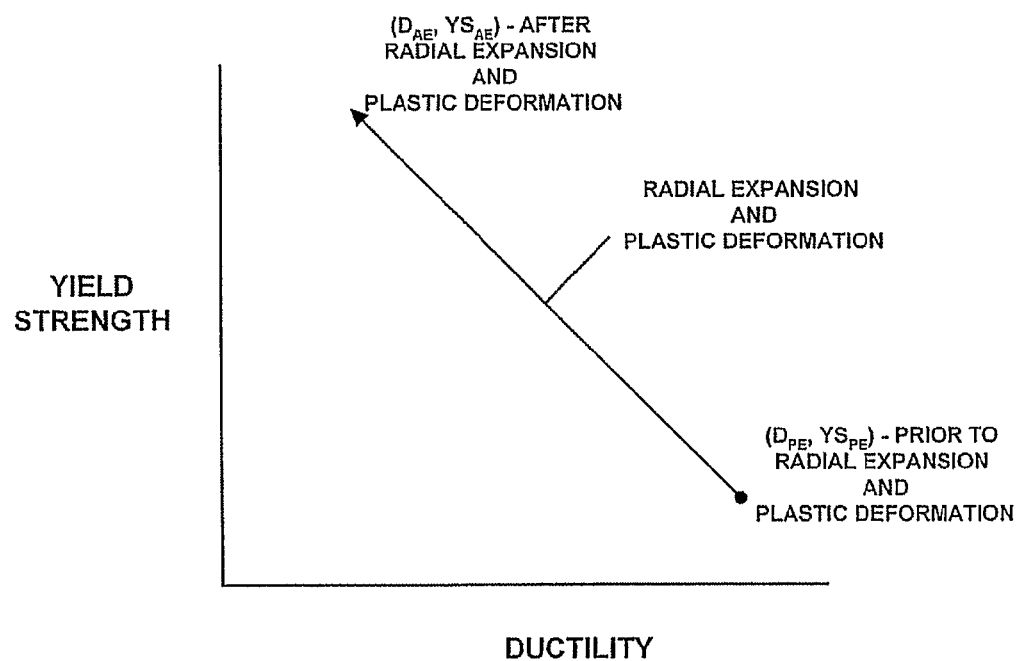
FIG. 13 is a graphical illustration of an exemplary embodiment of the yield strength vs. ductility curve for at least a portion of the expandable tubular member of FIGS. 8-11.

In an exemplary embodiment, as illustrated in FIG. 13, the first expandable tubular member 12 and/or the second expandable tubular member 14 have a ductility $D_{PE}$ and a yield strength $YS_{PE}$ prior to radial expansion and plastic deformation, and a ductility $D_{AE}$ and a yield strength $YS_{AE}$ after radial expansion and plastic deformation. In an exemplary embodiment, $D_{PE}$ is greater than $D_{AE}$, and $YS_{AE}$ is greater than $YS_{PE}$. In this manner, the first expandable tubular member 12 and/or the second expandable tubular member 14 are transformed during the radial expansion and plastic deformation process. Furthermore, in this manner, in an exemplary embodiment, the amount of power and/or energy required to radially expand each unit length of the first and/or second expandable tubular members, 12 and 14, is reduced. Furthermore, because the $YS_{AE}$ is greater than $YS_{PE}$, the collapse strength of the first expandable tubular member 12 and/or the second expandable tubular member 14 is increased after the radial expansion and plastic deformation process.

Figure 14:
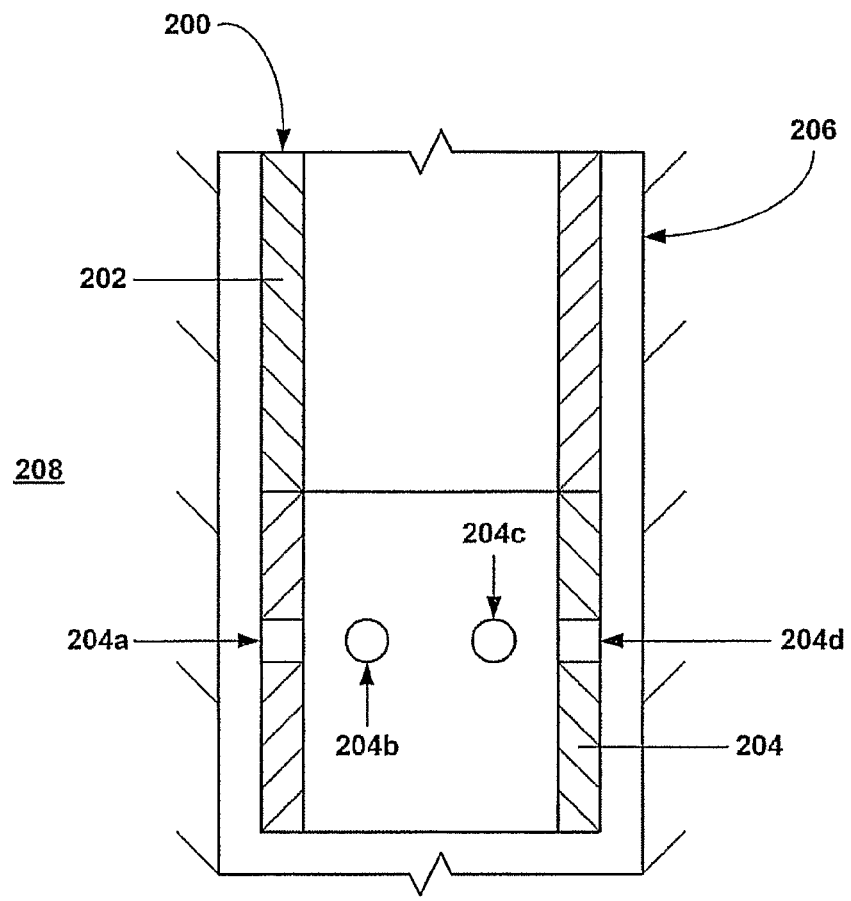
FIG. 14 is a fragmentary cross sectional view of an exemplary embodiment of an expandable tubular member positioned within a preexisting structure.

Referring to FIG. 14, an exemplary embodiment of an expandable tubular assembly 200 includes a first expandable tubular member 202 coupled to a second expandable tubular member 204 that defines radial openings 204a, 204b, 204c, and 204d. In several exemplary embodiments, the ends of the first and second expandable tubular members, 202 and 204, are coupled using, for example, a conventional mechanical coupling, a welded connection, a brazed connection, a threaded connection, and/or an interference fit connection. In an exemplary embodiment, one or more of the radial openings, 204a, 204b, 204c, and 204d, have circular, oval, square, and/or irregular cross sections and/or include portions that extend to and interrupt either end of the second expandable tubular member 204. In an exemplary embodiment, the expandable tubular assembly 200 is positioned within a preexisting structure such as, for example, a wellbore 206 that traverses a subterranean formation 208.

Figure 15:
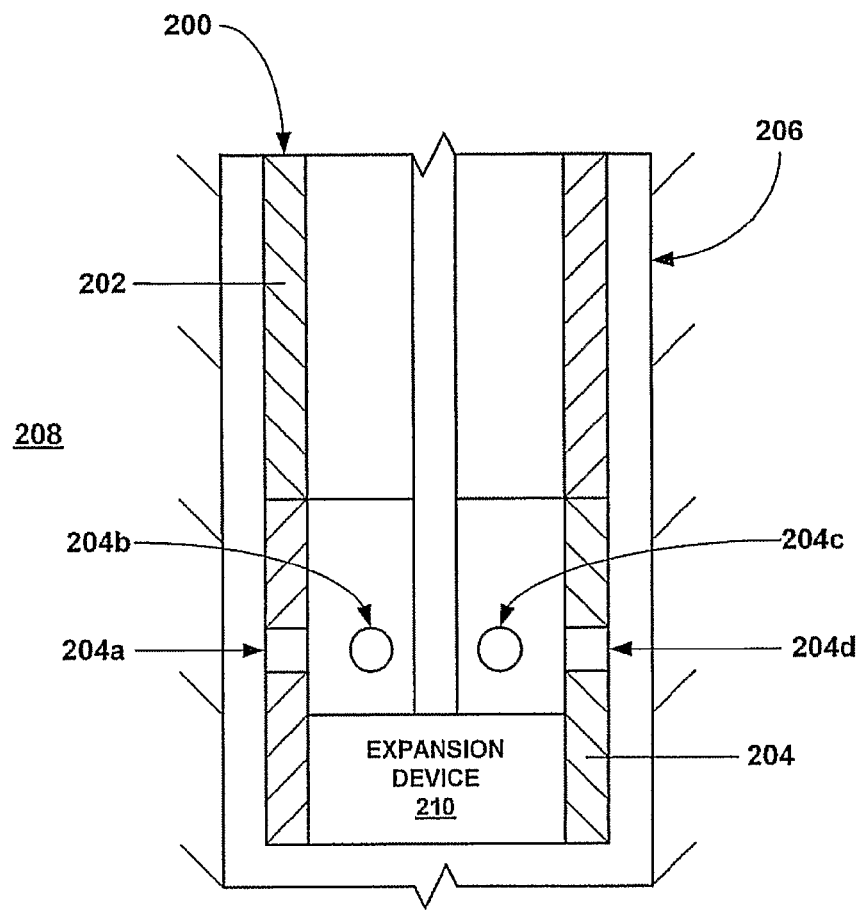
FIG. 15 is a fragmentary cross sectional view of the expandable tubular member of FIG. 14 after positioning an expansion device within the expandable tubular member.

As illustrated in FIG. 15, an expansion device 210 may then be positioned within the second expandable tubular member 204. In several exemplary embodiments, the expansion device 210 may include, for example, one or more of the following conventional expansion devices: a) an expansion cone; b) a rotary expansion device; c) a hydroforming expansion device; d) an impulsive force expansion device; d) any one of the expansion devices commercially available from, or disclosed in any of the published patent applications or issued patents, of Weatherford International, Baker Hughes, Halliburton Energy Services, Shell Oil Co., Schlumberger, and/or Enventure Global Technology L.L.C. In several exemplary embodiments, the expansion device 210 is positioned within the second expandable tubular member 204 before, during, or after the placement of the expandable tubular assembly 200 within the preexisting structure 206.

Figure 16:
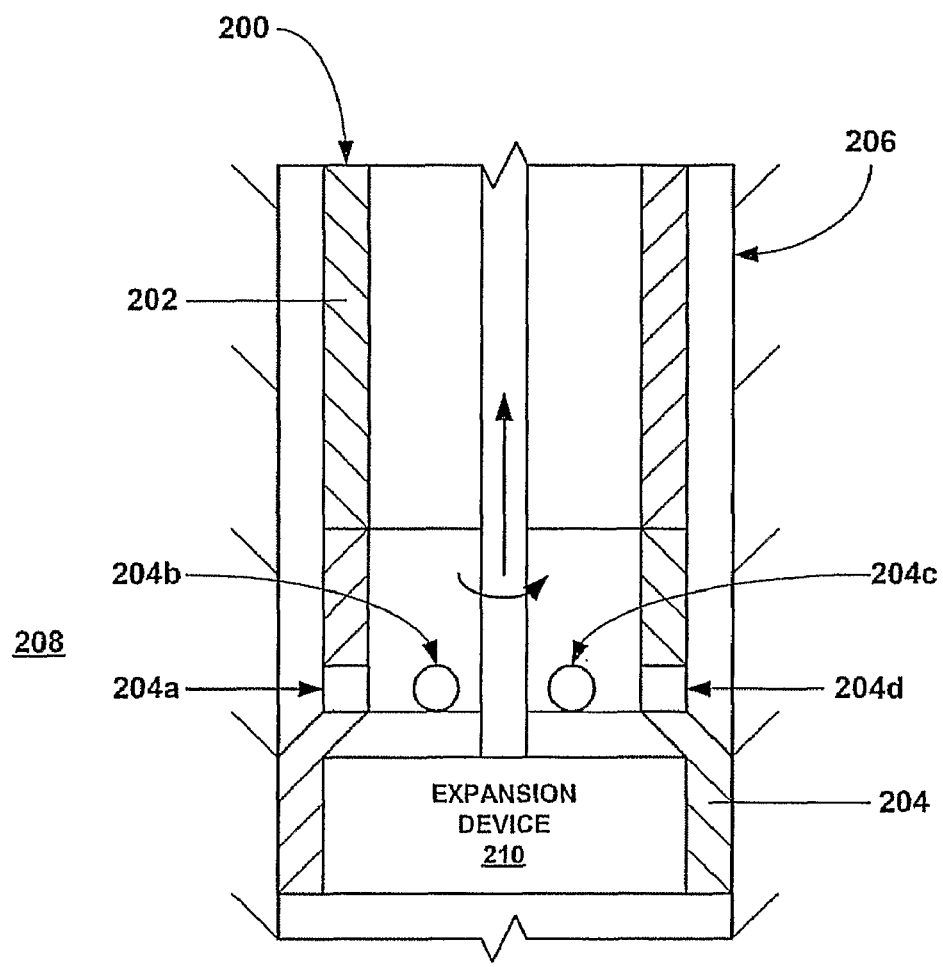
FIG. 16 is a fragmentary cross sectional view of the expandable tubular member of FIG. 15 after operating the expansion device within the expandable tubular member to radially expand and plastically deform a portion of the expandable tubular member.
Figure 17:
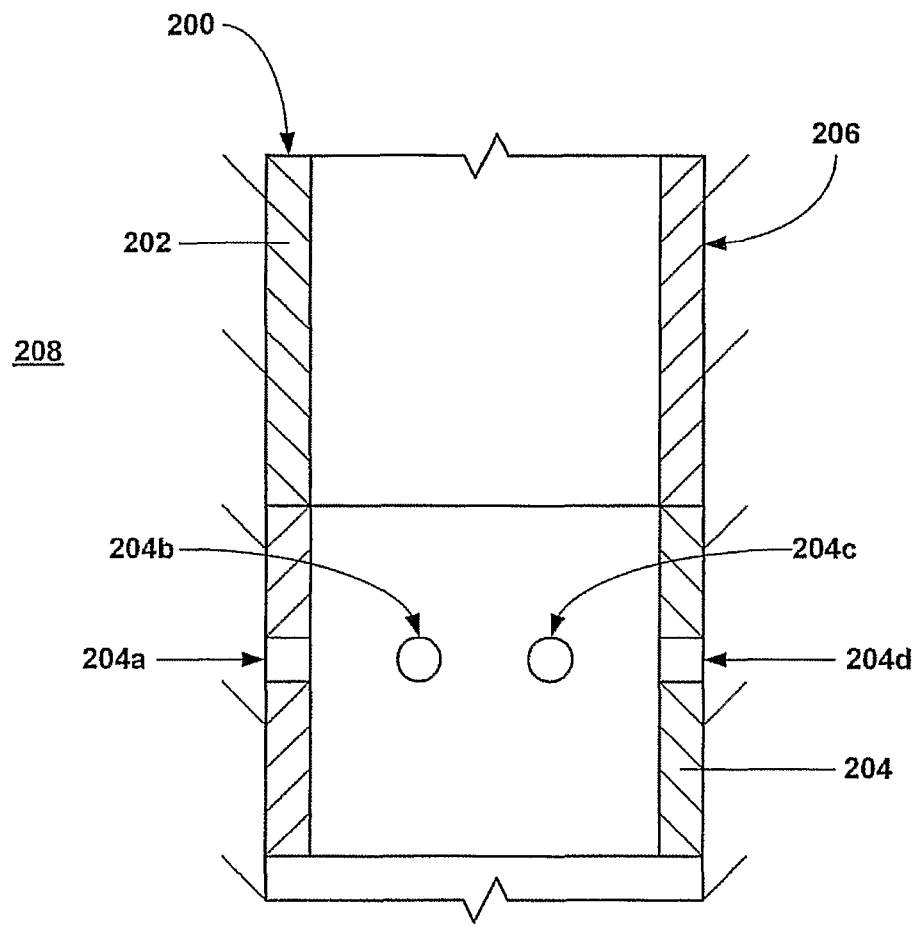
FIG. 17 is a fragmentary cross sectional view of the expandable tubular member of FIG. 16 after operating the expansion device within the expandable tubular member to radially expand and plastically deform another portion of the expandable tubular member.

As illustrated in FIG. 16, the expansion device 210 may then be operated to radially expand and plastically deform at least a portion of the second expandable tubular member 204 to form a bell-shaped section.

As illustrated in FIG. 16, the expansion device 20 may then be operated to radially expand and plastically deform the remaining portion of the second expandable tubular member 204 and at least a portion of the first expandable tubular member 202.

In an exemplary embodiment, the anisotropy ratio AR for the first and second expandable tubular members is defined by the following equation:

$$AR = ln(WT_f/WT_o)/ln(D_f/D_o);$$ (Equation 2)

where AR=anisotropy ratio;

where $WT_f$=final wall thickness of the expandable tubular member following the radial expansion and plastic deformation of the expandable tubular member;

where $WT_i$=initial wall thickness of the expandable tubular member prior to the radial expansion and plastic deformation of the expandable tubular member;

where $D_f$=final inside diameter of the expandable tubular member following the radial expansion and plastic deformation of the expandable tubular member; and where $D_i$=initial inside diameter of the expandable tubular member prior to the radial expansion and plastic deformation of the expandable tubular member.

In an exemplary embodiment, the anisotropy ratio AR for the first and/or second expandable tubular members, 204 and 204, is greater than 1.

In an exemplary experimental embodiment, the second expandable tubular member 204 had an anisotropy ratio AR greater than 1, and the radial expansion and plastic deformation of the second expandable tubular member did not result in any of the openings, 204a, 204b, 204c, and 204d, splitting or otherwise fracturing the remaining portions of the second expandable tubular member. This was an unexpected result.

Figure 18:
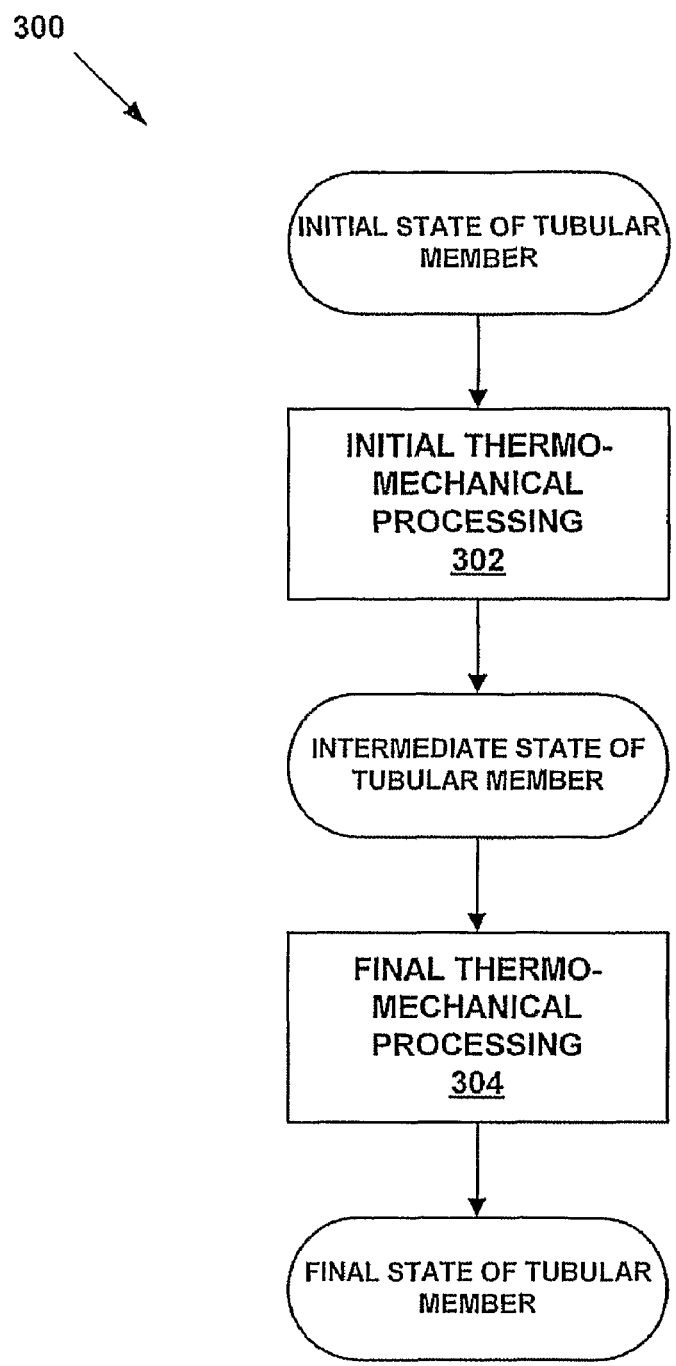
FIG. 18 is a flow chart illustration of an exemplary embodiment of a method of processing an expandable tubular member.

Referring to FIG. 18, in an exemplary embodiment, one or more of the expandable tubular members, 12, 14, 24, 26, 102, 104, 106, 108, 202 and/or 204 are processed using a method 300 in which a tubular member in an initial state is thermo-mechanically processed in step 302. In an exemplary embodiment, the thermo-mechanical processing 302 includes one or more heat treating and/or mechanical forming processes. As a result, of the thermo-mechanical processing 302, the tubular member is transformed to an intermediate state. The tubular member is then further thermo-mechanically processed in step 304. In an exemplary embodiment, the thermo-mechanical processing 304 includes one or more heat treating and/or mechanical forming processes. As a result, of the thermo-mechanical processing 304, the tubular member is transformed to a final state.

Figure 19:
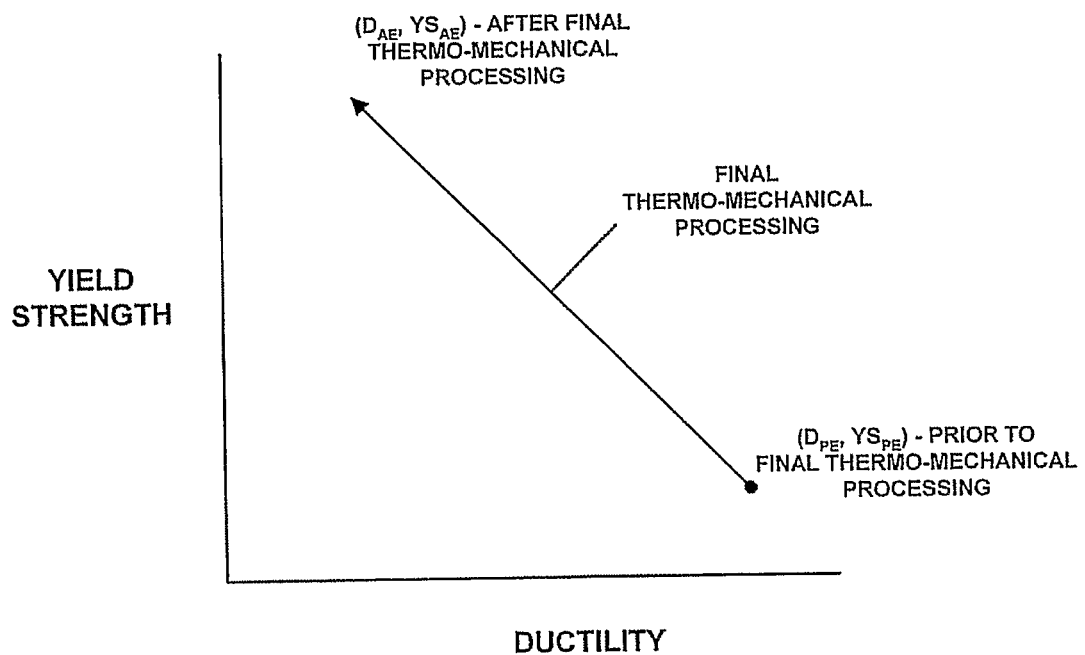
FIG. 19 is a graphical illustration of the an exemplary embodiment of the yield strength vs. ductility curve for at least a portion of the expandable tubular member during the operation of the method of FIG. 18.

In an exemplary embodiment, as illustrated in FIG. 19, during the operation of the method 300, the tubular member has a ductility $D_{PE}$ and a yield strength $YS_{PE}$ prior to the final thermo-mechanical processing in step 304, and a ductility $D_{AE}$ and a yield strength $YS_{AE}$ after final thermo-mechanical processing. In an exemplary embodiment, $D_{PE}$ is greater than $D_{AE}$, and $YS_{AE}$ is greater than $YS_{PE}$. In this manner, the amount of energy and/or power required to transform the tubular member, using mechanical forming processes, during the final thermo-mechanical processing in step 304 is reduced. Furthermore, in this manner, because the $YS_{AE}$ is greater than $YS_{PE}$, the collapse strength of the tubular member is increased after the final thermo-mechanical processing in step 304.

In an exemplary embodiment, one or more of the expandable tubular members, 12, 14, 24, 26, 102, 104, 106, 108, 202 and/or 204, have the following characteristics:

| Characteristic | Value |
|---|---|
| Tensile Strength | 60 to 120 ksi |
| Yield Strength | 50 to 100 ksi |
| Y/T Ratio | Maximum of 50/85% |
| Elongation During Radial Expansion and Plastic Deformation | Minimum of 35% |
| Width Reduction During Radial Expansion and Plastic Deformation | Minimum of 40% |
| Wall Thickness Reduction During Radial Expansion and Plastic Deformation | Minimum of 30% |
| Anisotropy | Minimum of 1.5 |
| Minimum Absorbed Energy at −4 F. (−20 C.) in the Longitudinal Direction | 80 ft-lb |
| Minimum Absorbed Energy at −4 F. (−20 C.) in the Transverse Direction | 60 ft-lb |
| Minimum Absorbed Energy at −4 F. (−20 C.) Transverse To A Weld Area | 60 ft-lb |
| Flare Expansion Testing | Minimum of 75% Without A Failure |
| Increase in Yield Strength Due To Radial Expansion and Plastic Deformation | Greater than 5.4% |

In an exemplary embodiment, one or more of the line expandable tubular members, 12, 14, 24, 26, 102, 104, 106, 108, 202 and/or 204, are characterized by an expandability coefficient f:

i. f=r×n ii. where f=expandability coefficient;

1. r=anisotropy coefficient; and
2. n=strain hardening exponent.

In an exemplary embodiment, the anisotropy coefficient for one or more of the expandable tubular members, 12, 14, 24, 26, 102, 104, 106, 108, 202 and/or 204 is greater than 1. In an exemplary embodiment, the strain hardening exponent for one or more of the expandable tubular members, 12, 14, 24, 26, 102, 104, 106, 108, 202 and/or 204 is greater than 0.12. In an exemplary embodiment, the expandability coefficient for one or more of the expandable tubular members, 12, 14, 24, 26, 102, 104, 106, 108, 202 and/or 204 is greater than 0.12.

In an exemplary embodiment, a tubular member having a higher expandability coefficient requires less power and/or energy to radially expand and plastically deform each unit length than a tubular member having a lower expandability coefficient. In an exemplary embodiment, a tubular member having a higher expandability coefficient requires less power and/or energy per unit length to radially expand and plastically deform than a tubular member having a lower expandability coefficient.

In several exemplary experimental embodiments, one or more of the expandable tubular members, 12, 14, 24, 26, 102, 104, 106, 108, 202 and/or 204, are steel alloys having one of the following compositions:

| | Element and Percentage By Weight | | | | | | | |
|---|---|---|---|---|---|---|---|---|
| Steel Alloy | C | Mn | P | S | Si | Cu | Ni | Cr |
| Steel Alloy | C | Mn | P | S | Si | Cu | Ni | Cr |
| A | 0.065 | 1.44 | 0.01 | 0.002 | 0.24 | 0.01 | 0.01 | 0.02 |
| B | 0.18 | 1.28 | 0.017 | 0.004 | 0.29 | 0.01 | 0.01 | 0.03 |
| C | 0.08 | 0.82 | 0.006 | 0.003 | 0.30 | 0.16 | 0.05 | 0.05 |
| D | 0.02 | 1.31 | 0.02 | 0.001 | 0.45 | — | 9.1 | 18.7 |

Figure 20:
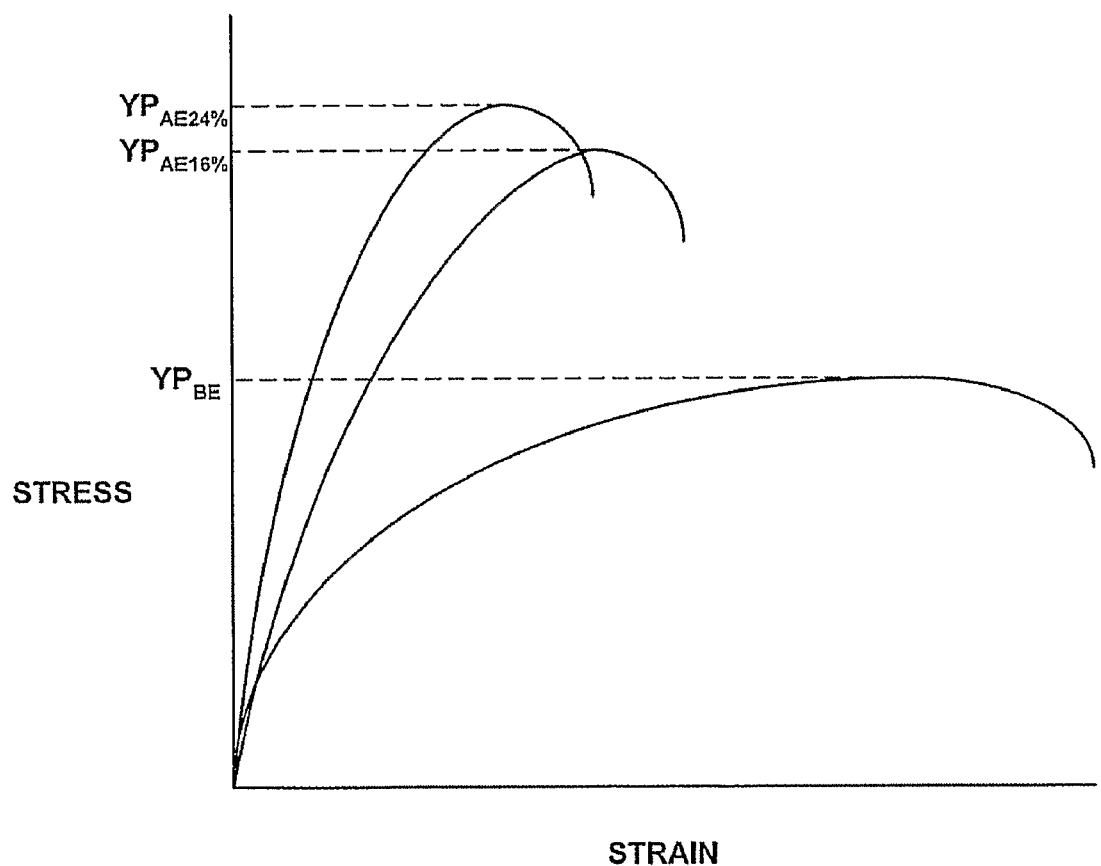
FIG. 20 is a graphical illustration of stress/strain curves for an exemplary embodiment of an expandable tubular member.

In exemplary experimental embodiment, as illustrated in FIG. 20, a sample of an expandable tubular member composed of Alloy A exhibited a yield point before radial expansion and plastic deformation $YP_{BE}$, a yield point after radial expansion and plastic deformation of about 16% $YP_{AE16\%}$, and a yield point after radial expansion and plastic deformation of about 24% $YP_{AE24\%}$. In an exemplary experimental embodiment, $YP_{AE24\%} > YP_{AE16\%} > YP_{BE}$. Furthermore, in an exemplary experimental embodiment, the ductility of the sample of the expandable tubular member composed of Alloy A also exhibited a higher ductility prior to radial expansion and plastic deformation than after radial expansion and plastic deformation. These were unexpected results.

In an exemplary experimental embodiment, a sample of an expandable tubular member composed of Alloy A exhibited the following tensile characteristics before and after radial expansion and plastic deformation:

| | Yield Point ksi | Yield Ratio | Elongation % | Width Reduction % | Wall Thickness Reduction % | Anisotropy |
|---|---|---|---|---|---|---|
| Before Radial Expansion and Plastic Deformation | 46.9 | 0.69 | 53 | −52 | 55 | 0.93 |
| After 16% Radial Expansion | 65.9 | 0.83 | 17 | 42 | 51 | 0.78 |
| After 24% Radial Expansion | 68.5 | 0.83 | 5 | 44 | 54 | 0.76 |
| % Increase | 40% for 16% radial expansion 46% for 24% radial expansion | | | | | |

Figure 21:
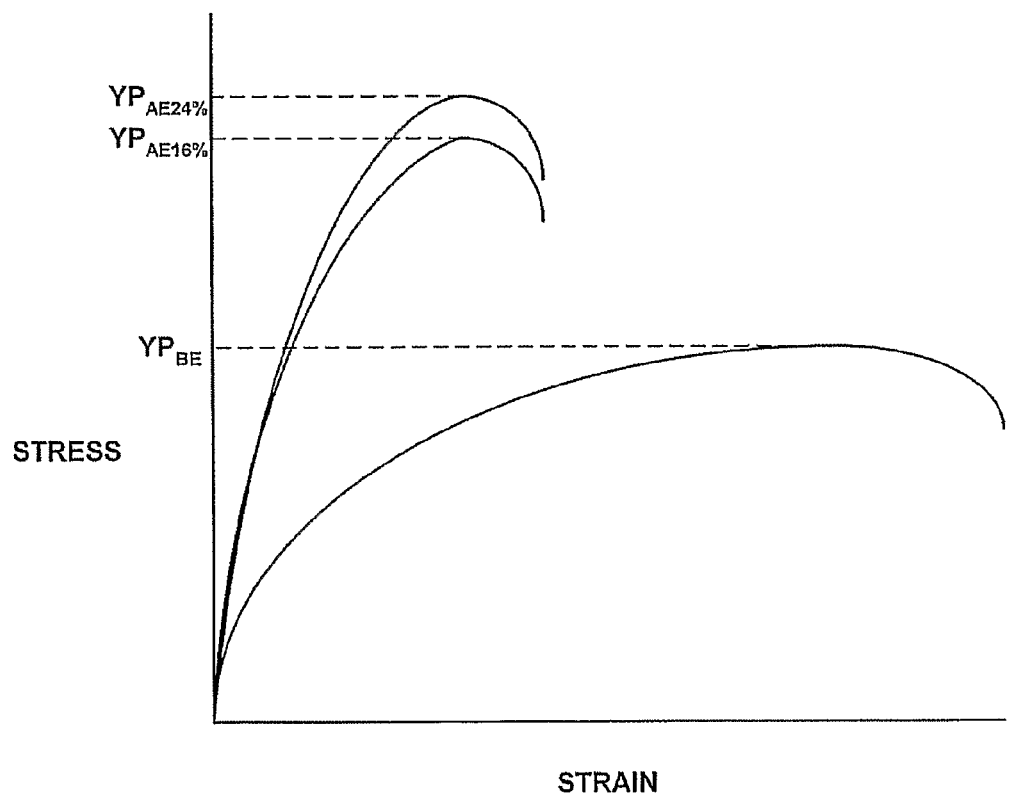
FIG. 21 is a graphical illustration of stress/strain curves for an exemplary embodiment of an expandable tubular member.

In exemplary experimental embodiment, as illustrated in FIG. 21, a sample of an expandable tubular member composed of Alloy B exhibited a yield point before radial expansion and plastic deformation $YP_{BE}$, a yield point after radial expansion and plastic deformation of about 16% $YP_{AE16\%}$, and a yield point after radial expansion and plastic deformation of about 24% $YP_{AE24\%}$. In an exemplary embodiment, $YP_{AE24\%} > YP_{AE16\%} > YP_{BE}$. Furthermore, in an exemplary experimental embodiment, the ductility of the sample of the expandable tubular member composed of Alloy B also exhibited a higher ductility prior to radial expansion and plastic deformation than after radial expansion and plastic deformation. These were unexpected results.

In an exemplary experimental embodiment, a sample of an expandable tubular member composed of Alloy B exhibited the following tensile characteristics before and after radial expansion and plastic deformation:

| | Yield Point ksi | Yield Ratio | Elongation % | Width Reduction % | Wall Thickness Reduction % | Anisotropy |
|---|---|---|---|---|---|---|
| Before Radial Expansion and Plastic Deformation | 57.8 | 0.71 | 44 | 43 | 46 | 0.93 |
| After 16% Radial Expansion | 74.4 | 0.84 | 16 | 38 | 42 | 0.87 |
| After 24% Radial Expansion | 79.8 | 0.86 | 20 | 36 | 42 | 0.81 |
| % Increase | 28.7% increase for 16% radial expansion 38% increase for 24% radial expansion | | | | | |

In an exemplary experimental embodiment, samples of expandable tubulars composed of Alloys A, B, C, and D exhibited the following tensile characteristics prior to radial expansion and plastic deformation:

| Steel Alloy | Yield ksi | Yield Ratio | Elongation % | Aniso-tropy | Absorbed Energy ft-lb | Expandability Coefficient |
|---|---|---|---|---|---|---|
| A | 47.6 | 0.71 | 44 | 1.48 | 145 | |
| B | 57.8 | 0.71 | 44 | 1.04 | 62.2 | |
| C | 61.7 | 0.80 | 39 | 1.92 | 268 | |
| D | 48 | 0.55 | 56 | 1.34 | — | |

In an exemplary embodiment, one or more of the expandable tubular members, 12, 14, 24, 26, 102, 104, 106, 108, 202 and/or 204 have a strain hardening exponent greater than 0.12, and a yield ratio is less than 0.85.

In an exemplary embodiment, the carbon equivalent $C_e$, for tubular members having a carbon content (by weight percentage) less than or equal to 0.12%, is given by the following expression:

$$C_e = C + Mn/6 + (Cr+Mo+V+Ti+Nb)/5 + (Ni+Cu)/15 \quad \text{(Equation 3)}$$

where $C_e$=carbon equivalent value;
a. C=carbon percentage by weight;
b. Mn=manganese percentage by weight;
c. Cr=chromium percentage by weight;
d. Mo=molybdenum percentage by weight;
e. V=vanadium percentage by weight;
f. Ti=titanium percentage by weight;
g. Nb=niobium percentage by weight;
h. Ni=nickel percentage by weight; and
i. Cu=copper percentage by weight.

In an exemplary embodiment, the carbon equivalent value $C_e$, for tubular members having a carbon content less than or equal to 0.12% (by weight), for one or more of the expandable tubular members, 12, 14, 24, 26, 102, 104, 106, 108, 202 and/or 204 is less than 0.21.

In an exemplary embodiment, the carbon equivalent $C_e$, for tubular members having more than 0.12% carbon content (by weight), is given by the following expression:

$$C_e = C + Si/30 + (Mn+Cu+Cr)/20 + Ni/60 + Mo/15 + V/10 + 5*B \quad \text{(Equation 4)}$$

where
$C_e$=carbon equivalent value;
a. C=carbon percentage by weight;
b. Si=silicon percentage by weight;
c. Mn=manganese percentage by weight;
d. Cu=copper percentage by weight;
e. Cr=chromium percentage by weight;
f. Ni=nickel percentage by weight;
g. Mo=molybdenum percentage by weight;
h. V=vanadium percentage by weight; and
i. B=boron percentage by weight.

In an exemplary embodiment, the carbon equivalent value $C_e$, for tubular members having greater than 0.12% carbon content (by weight), for one or more of the expandable tubular members, 12, 14, 24, 26, 102, 104, 106, 108, 202 and/or 204 is less than 0.36.

Figure 22:
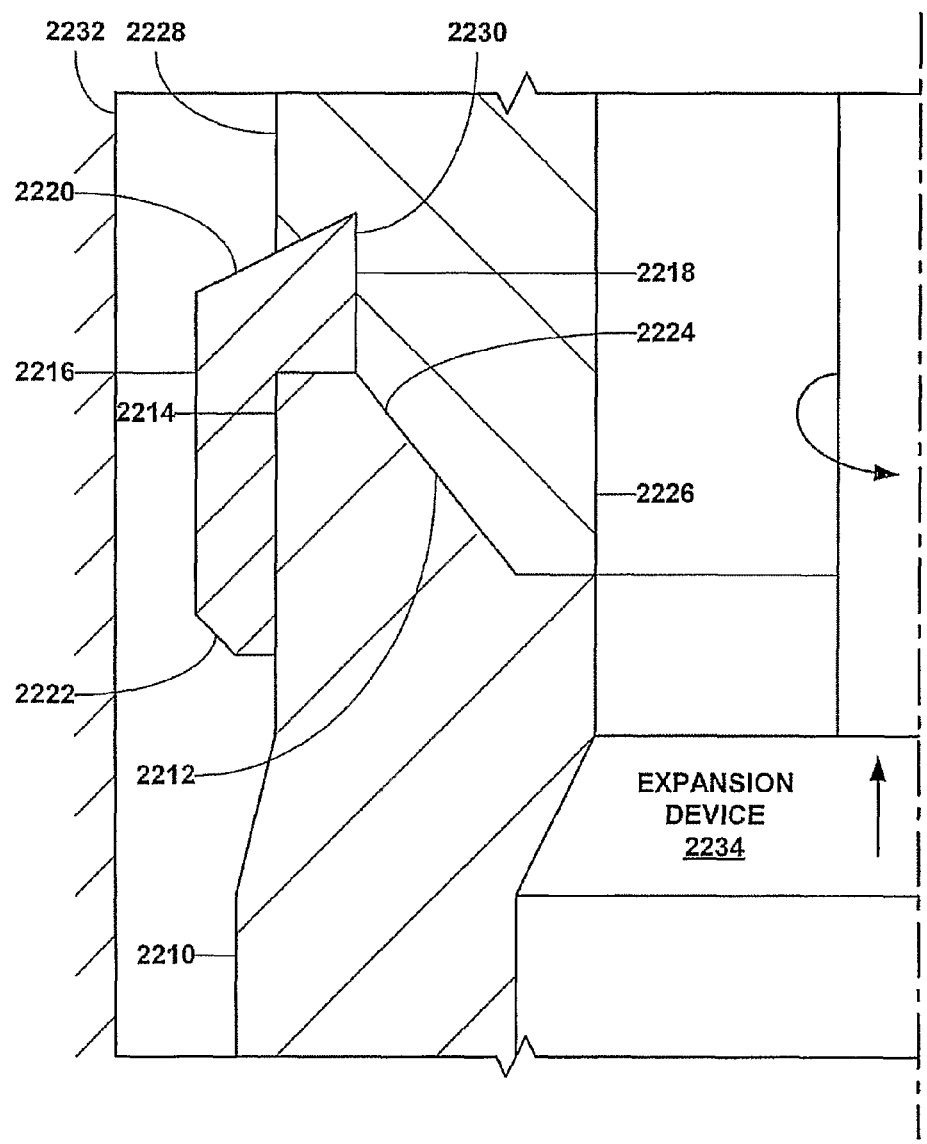
FIG. 22 is a fragmentary cross-sectional view illustrating an embodiment of the radial expansion and plastic deformation of a portion of a first tubular member having an internally threaded connection at an end portion, an embodiment of a tubular sleeve supported by the end portion of the first tubular member, and a second tubular member having an externally threaded portion coupled to the internally threaded portion of the first tubular member and engaged by a flange of the sleeve. The sleeve includes the flange at one end for increasing axial compression loading.

Referring to FIG. 22 in an exemplary embodiment, a first tubular member 2210 includes an internally threaded connection 2212 at an end portion 2214. A first end of a tubular sleeve 2216 that includes an internal flange 2218 having a tapered portion 2220, and a second end that includes a tapered portion 2222, is then mounted upon and receives the end portion 2214 of the first tubular member 2210. In an exemplary embodiment, the end portion 2214 of the first tubular member 2210 abuts one side of the internal flange 2218 of the tubular sleeve 2216, and the internal diameter of the internal flange 2218 of the tubular sleeve 2216 is substantially equal to or greater than the maximum internal diameter of the internally threaded connection 2212 of the end portion 2214 of the first tubular member 2210. An externally threaded connection 2224 of an end portion 2226 of a second tubular member 2228 having an annular recess 2230 is then positioned within the tubular sleeve 2216 and threadably coupled to the internally threaded connection 2212 of the end portion 2214 of the first tubular member 2210. In an exemplary embodiment, the internal flange 2218 of the tubular sleeve 2216 mates with and is received within the annular recess 2230 of the end portion 2226 of the second tubular member 2228. Thus, the tubular sleeve 2216 is coupled to and surrounds the external surfaces of the first and second tubular members, 2210 and 2228.

The internally threaded connection 2212 of the end portion 2214 of the first tubular member 2210 is a box connection, and the externally threaded connection 2224 of the end portion 2226 of the second tubular member 2228 is a pin connection. In an exemplary embodiment, the internal diameter of the tubular sleeve 2216 is at least approximately 0.020" greater than the outside diameters of the first and second tubular members, 2210 and 2228. In this manner, during the threaded coupling of the first and second tubular members, 2210 and 2228, fluidic materials within the first and second tubular members may be vented from the tubular members.

As illustrated in FIG. 22, the first and second tubular members, 2210 and 2228, and the tubular sleeve 2216 may be positioned within another structure 2232 such as, for example, a cased or uncased wellbore, and radially expanded and plastically deformed, for example, by displacing and/or rotating a conventional expansion device 2234 within and/or through the interiors of the first and second tubular members. The tapered portions, 2220 and 2222, of the tubular sleeve 2216 facilitate the insertion and movement of the first and second tubular members within and through the structure 2232, and the movement of the expansion device 2234 through the interiors of the first and second tubular members, 2210 and 2228, may be, for example, from top to bottom or from bottom to top.

During the radial expansion and plastic deformation of the first and second tubular members, 2210 and 2228, the tubular sleeve 2216 is also radially expanded and plastically deformed. As a result, the tubular sleeve 2216 may be maintained in circumferential tension and the end portions, 2214 and 2226, of the first and second tubular members, 2210 and 2228, may be maintained in circumferential compression.

Sleeve 2216 increases the axial compression loading of the connection between tubular members 2210 and 2228 before and after expansion by the expansion device 2234. Sleeve 2216 may, for example, be secured to tubular members 2210 and 2228 by a heat shrink fit.

In several alternative embodiments, the first and second tubular members, 2210 and 2228, are radially expanded and plastically deformed using other conventional methods for radially expanding and plastically deforming tubular members such as, for example, internal pressurization, hydroforming, and/or roller expansion devices and/or any one or combination of the conventional commercially available expansion products and services available from Baker Hughes, Weatherford International, and/or Enventure Global Technology L.L.C.

The use of the tubular sleeve 2216 during (a) the coupling of the first tubular member 2210 to the second tubular member 2228, (b) the placement of the first and second tubular members in the structure 2232, and (c) the radial expansion and plastic deformation of the first and second tubular members provides a number of significant benefits. For example, the tubular sleeve 2216 protects the exterior surfaces of the end portions, 2214 and 2226, of the first and second tubular members, 2210 and 2228, during handling and insertion of the tubular members within the structure 2232. In this manner, damage to the exterior surfaces of the end portions, 2214 and 2226, of the first and second tubular members, 2210 and 2228, is avoided that could otherwise result in stress concentrations that could cause a catastrophic failure during subsequent radial expansion operations. Furthermore, the tubular sleeve 2216 provides an alignment guide that facilitates the insertion and threaded coupling of the second tubular member 2228 to the first tubular member 2210. In this manner, misalignment that could result in damage to the threaded connections, 2212 and 2224, of the first and second tubular members, 2210 and 2228, may be avoided. In addition, during the relative rotation of the second tubular member with respect to the first tubular member, required during the threaded coupling of the first and second tubular members, the tubular sleeve 2216 provides an indication of to what degree the first and second tubular members are threadably coupled. For example, if the tubular sleeve 2216 can be easily rotated, that would indicate that the first and second tubular members, 2210 and 2228, are not fully threadably coupled and in intimate contact with the internal flange 2218 of the tubular sleeve. Furthermore, the tubular sleeve 2216 may prevent crack propagation during the radial expansion and plastic deformation of the first and second tubular members, 2210 and 2228. In this manner, failure modes such as, for example, longitudinal cracks in the end portions, 2214 and 2226, of the first and second tubular members may be limited in severity or eliminated all together. In addition, after completing the radial expansion and plastic deformation of the first and second tubular members, 2210 and 2228, the tubular sleeve 2216 may provide a fluid tight metal-to-metal seal between interior surface of the tubular sleeve 2216 and the exterior surfaces of the end portions, 2214 and 2226, of the first and second tubular members. In this manner, fluidic materials are prevented from passing through the threaded connections, 2212 and 2224, of the first and second tubular members, 2210 and 2228, into the annulus between the first and second tubular members and the structure 2232. Furthermore, because, following the radial expansion and plastic deformation of the first and second tubular members, 2210 and 2228, the tubular sleeve 2216 may be maintained in circumferential tension and the end portions, 2214 and 2226, of the first and second tubular members, 2210 and 2228, may be maintained in circumferential compression, axial loads and/or torque loads may be transmitted through the tubular sleeve.

In several exemplary embodiments, one or more portions of the first and second tubular members, 2210 and 2228, and the tubular sleeve 2216 have one or more of the material properties of one or more of the tubular members 12, 14, 24, 26, 102, 104, 106, 108, 202 and/or 204.

Figure 23:
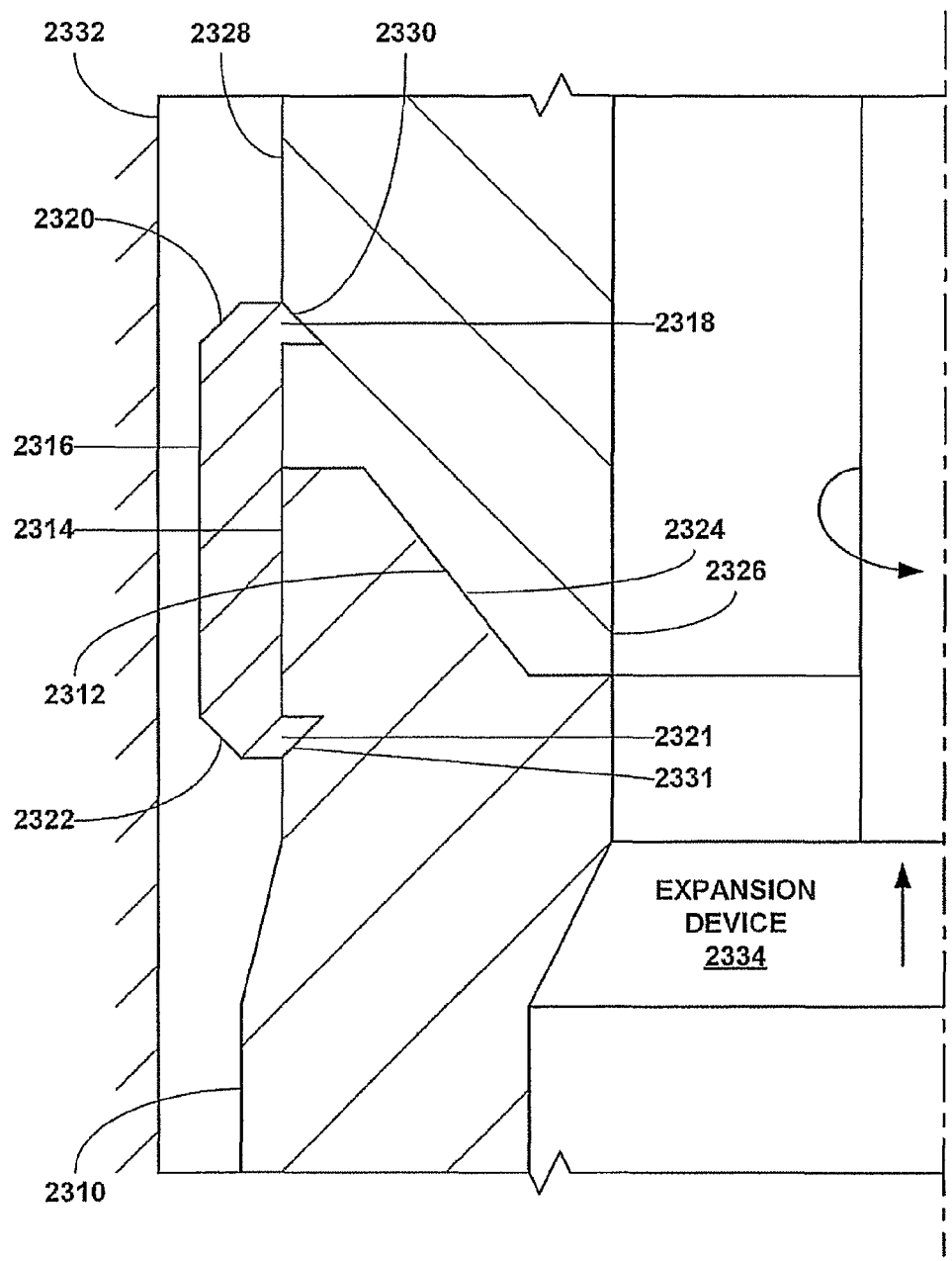
FIG. 23 is a fragmentary cross-sectional view illustrating an embodiment of the radial expansion and plastic deformation of a portion of a first tubular member having an internally threaded connection at an end portion, a second tubular member having an externally threaded portion coupled to the internally threaded portion of the first tubular member, and an embodiment of a tubular sleeve supported by the end portion of both tubular members. The sleeve includes flanges at opposite ends for increasing axial tension loading.

Referring to FIG. 23, in an exemplary embodiment, a first tubular member 210 includes an internally threaded connection 2312 at an end portion 2314. A first end of a tubular sleeve 2316 includes an internal flange 2318 and a tapered portion 2320. A second end of the sleeve 2316 includes an internal flange 2321 and a tapered portion 2322. An externally threaded connection 2324 of an end portion 2326 of a second tubular member 2328 having an annular recess 2330, is then positioned within the tubular sleeve 2316 and threadably coupled to the internally threaded connection 2312 of the end portion 2314 of the first tubular member 2310. The internal flange 2318 of the sleeve 2316 mates with and is received within the annular recess 2330.

The first tubular member 2310 includes a recess 2331. The internal flange 2321 mates with and is received within the annular recess 2331. Thus, the sleeve 2316 is coupled to and surrounds the external surfaces of the first and second tubular members 2310 and 2328.

The internally threaded connection 2312 of the end portion 2314 of the first tubular member 2310 is a box connection, and the externally threaded connection 2324 of the end portion 2326 of the second tubular member 2328 is a pin connection. In an exemplary embodiment, the internal diameter of the tubular sleeve 2316 is at least approximately 0.020" greater than the outside diameters of the first and second tubular members 2310 and 2328. In this manner, during the threaded coupling of the first and second tubular members 2310 and 2328, fluidic materials within the first and second tubular members may be vented from the tubular members.

As illustrated in FIG. 23, the first and second tubular members 2310 and 2328, and the tubular sleeve 2316 may then be positioned within another structure 2332 such as, for example, a wellbore, and radially expanded and plastically deformed, for example, by displacing and/or rotating an expansion device 2334 through and/or within the interiors of the first and second tubular members. The tapered portions 2320 and 2322, of the tubular sleeve 2316 facilitates the insertion and movement of the first and second tubular members within and through the structure 2332, and the displacement of the expansion device 2334 through the interiors of the first and second tubular members 2310 and 2328, may be from top to bottom or from bottom to top.

During the radial expansion and plastic deformation of the first and second tubular members 2310 and 2328, the tubular sleeve 2316 is also radially expanded and plastically deformed. In an exemplary embodiment, as a result, the tubular sleeve 2316 may be maintained in circumferential tension and the end portions 2314 and 2326, of the first and second tubular members 2310 and 2328, may be maintained in circumferential compression.

Sleeve 2316 increases the axial tension loading of the connection between tubular members 2310 and 2328 before and after expansion by the expansion device 2334. Sleeve 2316 may be secured to tubular members 2310 and 2328 by a heat shrink fit.

In several exemplary embodiments, one or more portions of the first and second tubular members, 2310 and 2328, and the tubular sleeve 2316 have one or more of the material properties of one or more of the tubular members 12, 14, 24, 26, 102, 104, 106, 108, 202 and/or 204.

Figure 24:
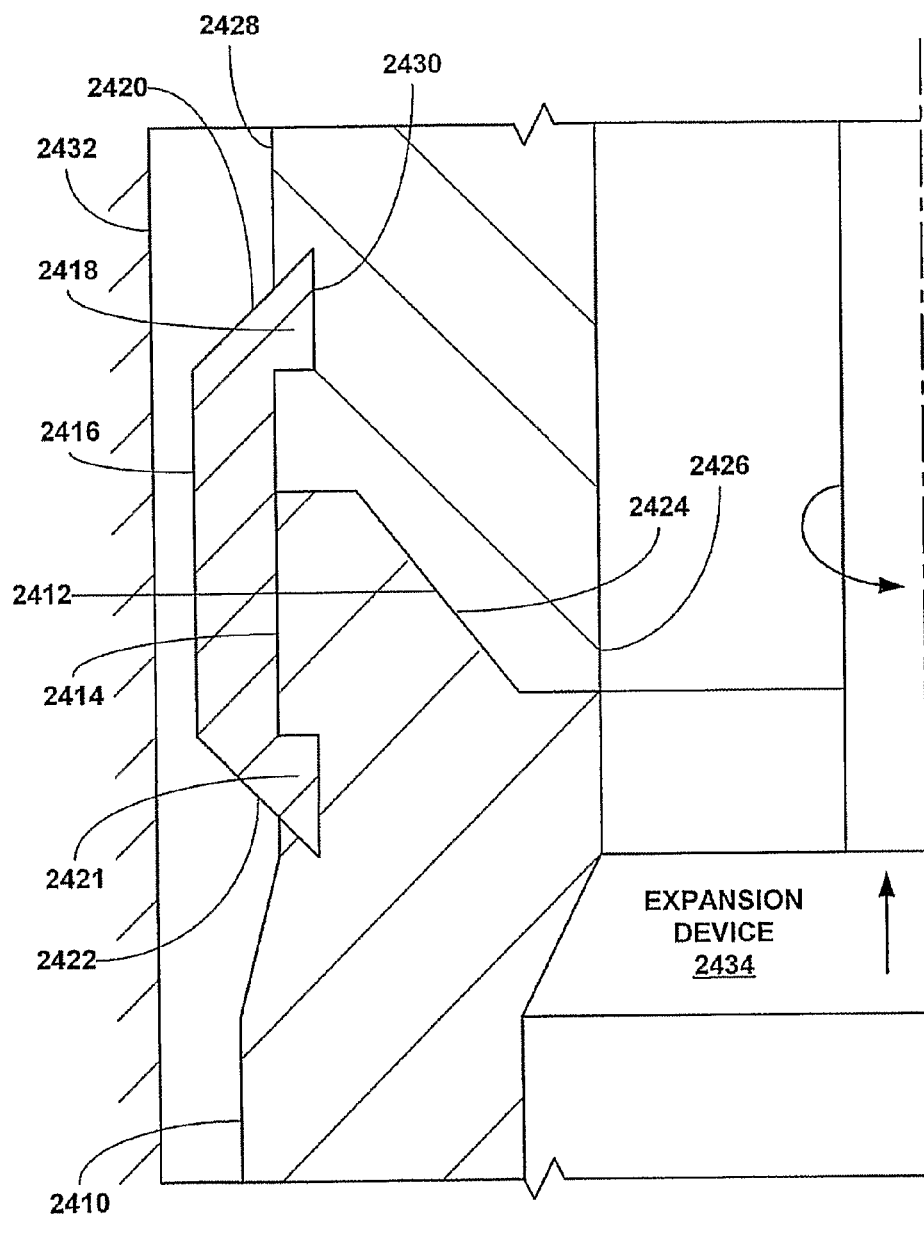
FIG. 24 is a fragmentary cross-sectional illustration of the radial expansion and plastic deformation of a portion of a first tubular member having an internally threaded connection at an end portion, a second tubular member having an externally threaded portion coupled to the internally threaded portion of the first tubular member, and an embodiment of a tubular sleeve supported by the end portion of both tubular members. The sleeve includes flanges at opposite ends for increasing axial compression/tension loading.

Referring to FIG. 24, in an exemplary embodiment, a first tubular member 2410 includes an internally threaded connection 2412 at an end portion 2414. A first end of a tubular sleeve 2416 includes an internal flange 2418 and a tapered portion 2420. A second end of the sleeve 2416 includes an internal flange 2421 and a tapered portion 2422. An externally threaded connection 2424 of an end portion 2426 of a second tubular member 2428 having an annular recess 2430, is then positioned within the tubular sleeve 2416 and threadably coupled to the internally threaded connection 2412 of the end portion 2414 of the first tubular member 2410. The internal flange 2418 of the sleeve 2416 mates with and is received within the annular recess 2430. The first tubular member 2410 includes a recess 2431. The internal flange 2421 mates with and is received within the annular recess 2431. Thus, the sleeve 2416 is coupled to and surrounds the external surfaces of the first and second tubular members 2410 and 2428.

The internally threaded connection 2412 of the end portion 2414 of the first tubular member 2410 is a box connection, and the externally threaded connection 2424 of the end portion 2426 of the second tubular member 2428 is a pin connection. In an exemplary embodiment, the internal diameter of the tubular sleeve 2416 is at least approximately 0.020" greater than the outside diameters of the first and second tubular members 2410 and 2428. In this manner, during the threaded coupling of the first and second tubular members 2410 and 2428, fluidic materials within the first and second tubular members may be vented from the tubular members.

As illustrated in FIG. 24, the first and second tubular members 2410 and 2428, and the tubular sleeve 2416 may then be positioned within another structure 2432 such as, for example, a wellbore, and radially expanded and plastically deformed, for example, by displacing and/or rotating an expansion device 2434 through and/or within the interiors of the first and second tubular members. The tapered portions 2420 and 2422, of the tubular sleeve 2416 facilitate the insertion and movement of the first and second tubular members within and through the structure 2432, and the displacement of the expansion device 2434 through the interiors of the first and second tubular members, 2410 and 2428, may be from top to bottom or from bottom to top.

During the radial expansion and plastic deformation of the first and second tubular members, 2410 and 2428, the tubular sleeve 2416 is also radially expanded and plastically deformed. In an exemplary embodiment, as a result, the tubular sleeve 2416 may be maintained in circumferential tension and the end portions, 2414 and 2426, of the first and second tubular members, 2410 and 2428, may be maintained in circumferential compression.

The sleeve 2416 increases the axial compression and tension loading of the connection between tubular members 2410 and 2428 before and after expansion by expansion device 2424. Sleeve 2416 may be secured to tubular members 2410 and 2428 by a heat shrink fit.

In several exemplary embodiments, one or more portions of the first and second tubular members 2410 and 2428, and the tubular sleeve 2416 have one or more of the material properties of one or more of the tubular members 12, 14, 24, 26, 102, 104, 106, 108, 202 and/or 204.

Figure 25:
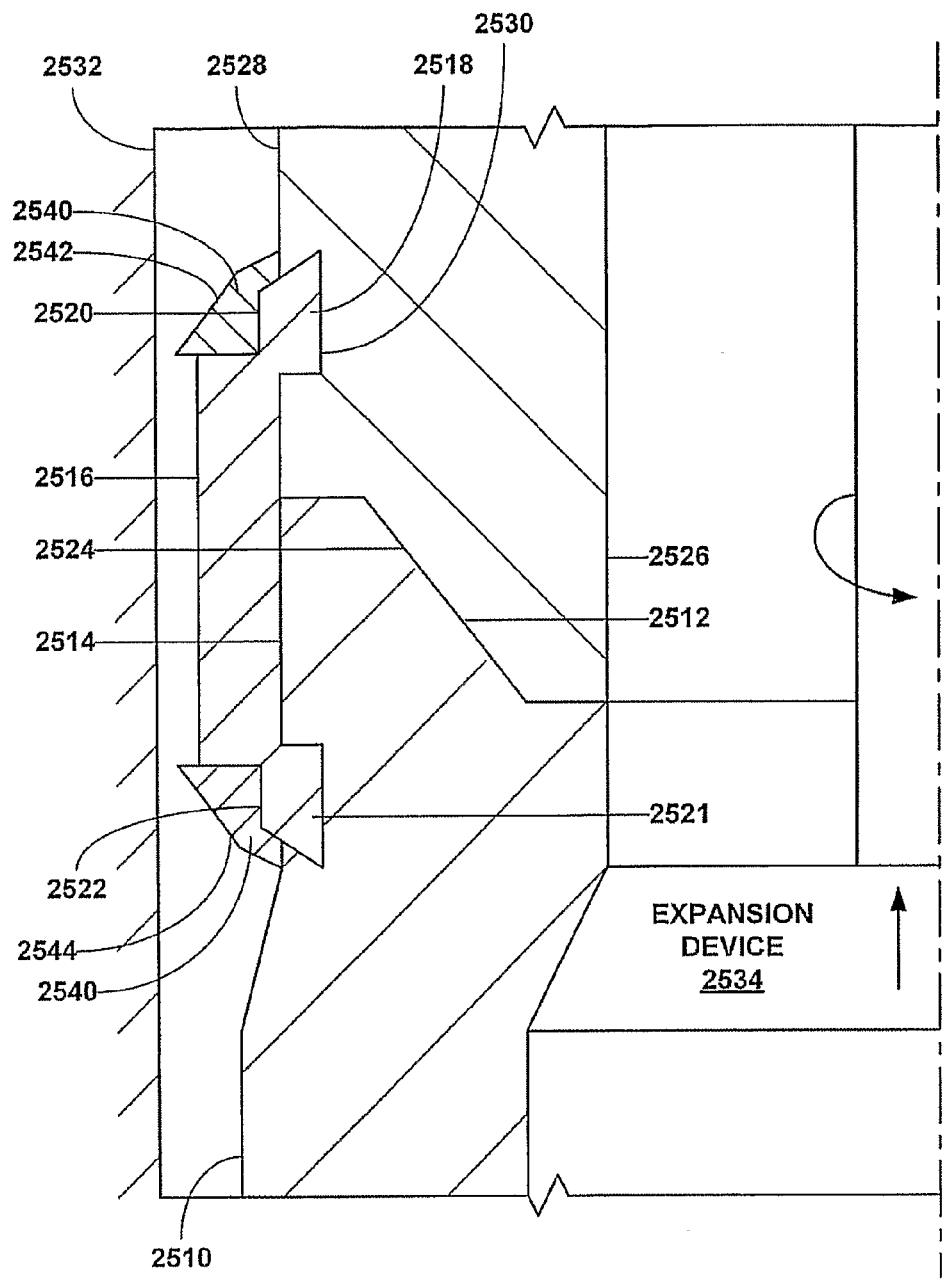
FIG. 25 is a fragmentary cross-sectional illustration of the radial expansion and plastic deformation of a portion of a first tubular member having an internally threaded connection at an end portion, a second tubular member having an externally threaded portion coupled to the internally threaded portion of the first tubular member, and an embodiment of a tubular sleeve supported by the end portion of both tubular members. The sleeve includes flanges at opposite ends having sacrificial material thereon.

Referring to FIG. 25, in an exemplary embodiment, a first tubular member 2510 includes an internally threaded connection 2512 at an end portion 2514. A first end of a tubular sleeve 2516 includes an internal flange 2518 and a relief 2520. A second end of the sleeve 2516 includes an internal flange 2521 and a relief 2522. An externally threaded connection 2524 of an end portion 2526 of a second tubular member 2528 having an annular recess 2530, is then positioned within the tubular sleeve 2516 and threadably coupled to the internally threaded connection 2512 of the end portion 2514 of the first tubular member 2510. The internal flange 2518 of the sleeve 2516 mates with and is received within the annular recess 2530. The first tubular member 2510 includes a recess 2531. The internal flange 2521 mates with and is received within the annular recess 2531. Thus, the sleeve 2516 is coupled to and surrounds the external surfaces of the first and second tubular members 2510 and 2528.

The internally threaded connection 2512 of the end portion 2514 of the first tubular member 2510 is a box connection, and the externally threaded connection 2524 of the end portion 2526 of the second tubular member 2528 is a pin connection. In an exemplary embodiment, the internal diameter of the tubular sleeve 2516 is at least approximately 0.020" greater than the outside diameters of the first and second tubular members 2510 and 2528. In this manner, during the threaded coupling of the first and second tubular members 2510 and 2528, fluidic materials within the first and second tubular members may be vented from the tubular members.

As illustrated in FIG. 25, the first and second tubular members 2510 and 2528, and the tubular sleeve 2516 may then be positioned within another structure 2532 such as, for example, a wellbore, and radially expanded and plastically deformed, for example, by displacing and/or rotating an expansion device 2534 through and/or within the interiors of the first and second tubular members. The reliefs 2520 and 2522 are each filled with a sacrificial material 2540 including a tapered surface 2542 and 2544, respectively. The material 2540 may be a metal or a synthetic, and is provided to facilitate the insertion and movement of the first and second tubular members 2510 and 2528, through the structure 2532. The displacement of the expansion device 2534 through the interiors of the first and second tubular members 2510 and 2528, may, for example, be from top to bottom or from bottom to top.

During the radial expansion and plastic deformation of the first and second tubular members 2510 and 2528, the tubular sleeve 2516 is also radially expanded and plastically deformed. In an exemplary embodiment, as a result, the tubular sleeve 2516 may be maintained in circumferential tension and the end portions 2514 and 2526, of the first and second tubular members, 2510 and 2528, may be maintained in circumferential compression.

The addition of the sacrificial material 2540, provided on sleeve 2516, avoids stress risers on the sleeve 2516 and the tubular member 2510. The tapered surfaces 2542 and 2544 are intended to wear or even become damaged, thus incurring such wear or damage which would otherwise be borne by sleeve 2516. Sleeve 2516 may be secured to tubular members 2510 and 2528 by a heat shrink fit.

In several exemplary embodiments, one or more portions of the first and second tubular members, 2510 and 2528, and the tubular sleeve 2516 have one or more of the material properties of one or more of the tubular members 12, 14, 24, 26, 102, 104, 106, 108, 202 and/or 204.

Figure 26:
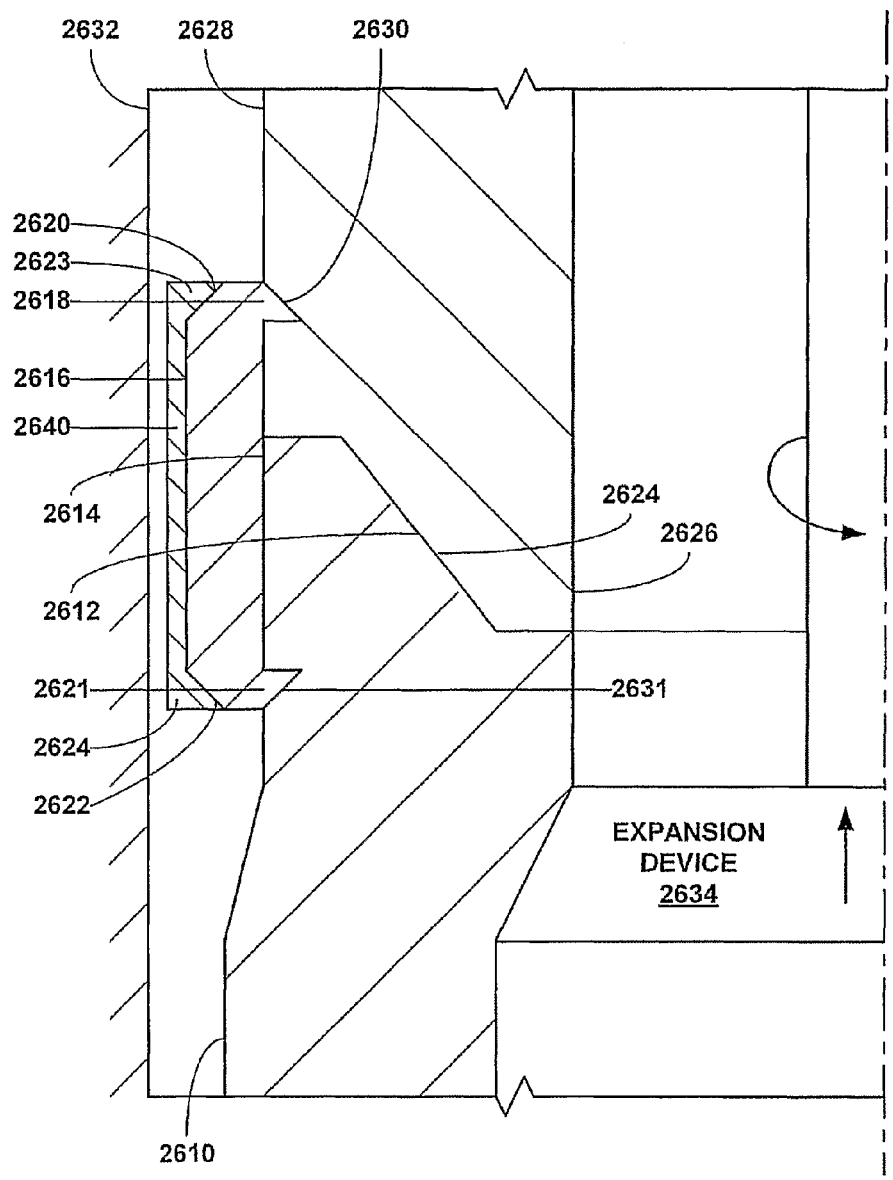
FIG. 26 is a fragmentary cross-sectional illustration of the radial expansion and plastic deformation of a portion of a first tubular member having an internally threaded connection at an end portion, a second tubular member having an externally threaded portion coupled to the internally threaded portion of the first tubular member, and an embodiment of a tubular sleeve supported by the end portion of both tubular members. The sleeve includes a thin walled cylinder of sacrificial material.

Referring to FIG. 26, in an exemplary embodiment, a first tubular member 2610 includes an internally threaded connection 2612 at an end portion 2614. A first end of a tubular sleeve 2616 includes an internal flange 2618 and a tapered portion 2620. A second end of the sleeve 2616 includes an internal flange 2621 and a tapered portion 2622. An externally threaded connection 2624 of an end portion 2626 of a second tubular member 2628 having an annular recess 2630, is then positioned within the tubular sleeve 2616 and threadably coupled to the internally threaded connection 2612 of the end portion 2614 of the first tubular member 2610. The internal flange 2618 of the sleeve 2616 mates with and is received within the annular recess 2630.

The first tubular member 2610 includes a recess 2631. The internal flange 2621 mates with and is received within the annular recess 2631. Thus, the sleeve 2616 is coupled to and surrounds the external surfaces of the first and second tubular members 2610 and 2628.

The internally threaded connection 2612 of the end portion 2614 of the first tubular member 2610 is a box connection, and the externally threaded connection 2624 of the end portion 2626 of the second tubular member 2628 is a pin connection. In an exemplary embodiment, the internal diameter of the tubular sleeve 2616 is at least approximately 0.020" greater than the outside diameters of the first and second tubular members 2610 and 2628. In this manner, during the threaded coupling of the first and second tubular members 2610 and 2628, fluidic materials within the first and second tubular members may be vented from the tubular members.

As illustrated in FIG. 26, the first and second tubular members 2610 and 2628, and the tubular sleeve 2616 may then be positioned within another structure 2632 such as, for example, a wellbore, and radially expanded and plastically deformed, for example, by displacing and/or rotating an expansion device 2634 through and/or within the interiors of the first and second tubular members. The tapered portions 2620 and 2622, of the tubular sleeve 2616 facilitates the insertion and movement of the first and second tubular members within and through the structure 2632, and the displacement of the expansion device 2634 through the interiors of the first and second tubular members 2610 and 2628, may, for example, be from top to bottom or from bottom to top.

During the radial expansion and plastic deformation of the first and second tubular members 2610 and 2628, the tubular sleeve 2616 is also radially expanded and plastically deformed. In an exemplary embodiment, as a result, the tubular sleeve 2616 may be maintained in circumferential tension and the end portions 2614 and 2626, of the first and second tubular members 2610 and 2628, may be maintained in circumferential compression.

Sleeve 2616 is covered by a thin walled cylinder of sacrificial material 2640. Spaces 2623 and 2624, adjacent tapered portions 2620 and 2622, respectively, are also filled with an excess of the sacrificial material 2640. The material may be a metal or a synthetic, and is provided to facilitate the insertion and movement of the first and second tubular members 2610 and 2628, through the structure 2632.

The addition of the sacrificial material 2640, provided on sleeve 2616, avoids stress risers on the sleeve 2616 and the tubular member 2610. The excess of the sacrificial material 2640 adjacent tapered portions 2620 and 2622 are intended to wear or even become damaged, thus incurring such wear or damage which would otherwise be borne by sleeve 2616. Sleeve 2616 may be secured to tubular members 2610 and 2628 by a heat shrink fit.

In several exemplary embodiments, one or more portions of the first and second tubular members, 2610 and 2628, and the tubular sleeve 2616 have one or more of the material properties of one or more of the tubular members 12, 14, 24, 26, 102, 104, 106, 108, 202 and/or 204.

Figure 27:
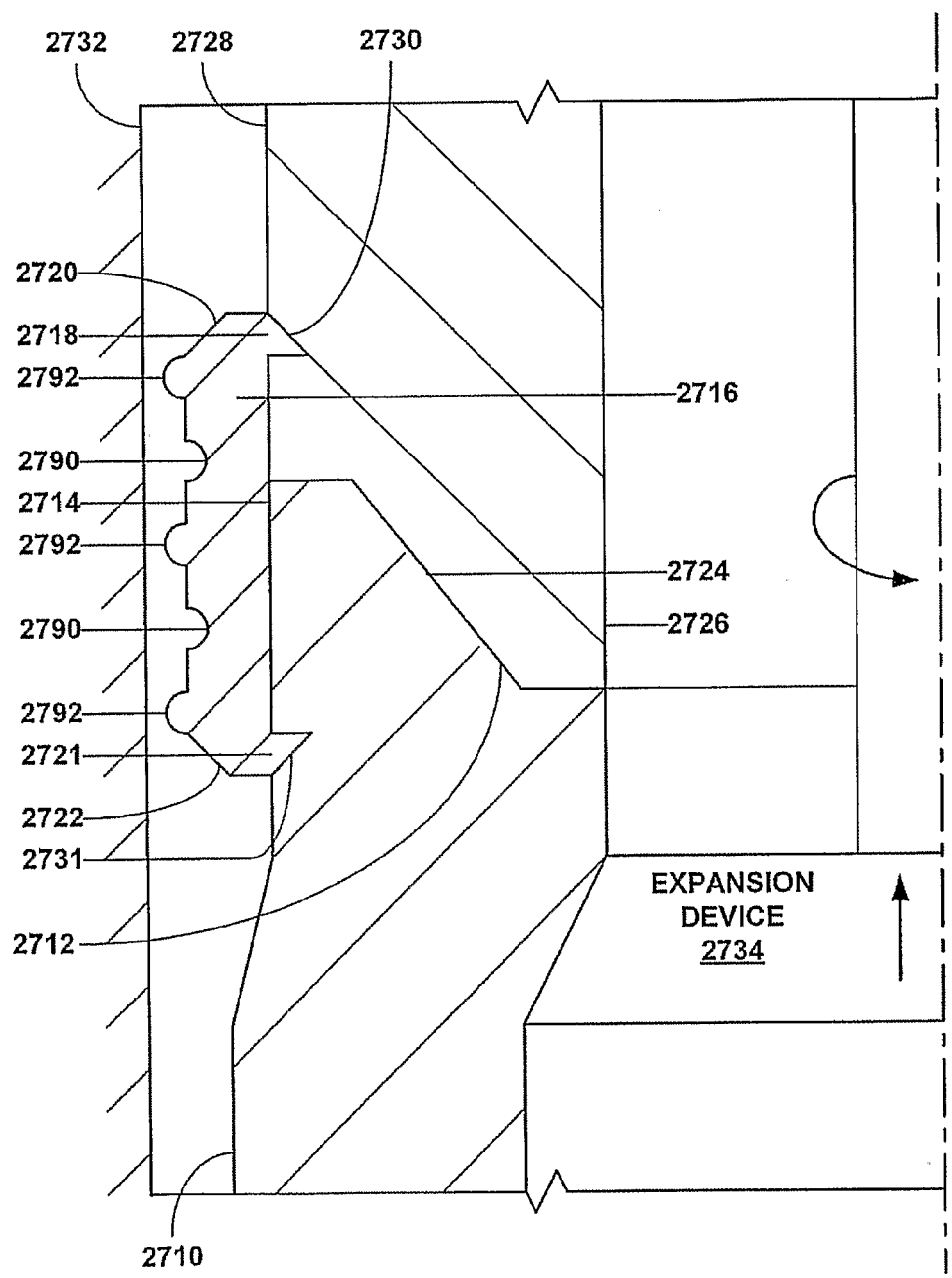
FIG. 27 is a fragmentary cross-sectional illustration of the radial expansion and plastic deformation of a portion of a first tubular member having an internally threaded connection at an end portion, a second tubular member having an externally threaded portion coupled to the internally threaded portion of the first tubular member, and an embodiment of a tubular sleeve supported by the end portion of both tubular members. The sleeve includes a variable thickness along the length thereof.

Referring to FIG. 27, in an exemplary embodiment, a first tubular member 2710 includes an internally threaded connection 2712 at an end portion 2714. A first end of a tubular sleeve 2716 includes an internal flange 2718 and a tapered portion 2720. A second end of the sleeve 2716 includes an internal flange 2721 and a tapered portion 2722. An externally threaded connection 2724 of an end portion 2726 of a second tubular member 2728 having an annular recess 2730, is then positioned within the tubular sleeve 2716 and threadably coupled to the internally threaded connection 2712 of the end portion 2714 of the first tubular member 2710. The internal flange 2718 of the sleeve 2716 mates with and is received within the annular recess 2730.

The first tubular member 2710 includes a recess 2731. The internal flange 2721 mates with and is received within the annular recess 2731. Thus, the sleeve 2716 is coupled to and surrounds the external surfaces of the first and second tubular members 2710 and 2728.

The internally threaded connection 2712 of the end portion 2714 of the first tubular member 2710 is a box connection, and the externally threaded connection 2724 of the end portion 2726 of the second tubular member 2728 is a pin connection. In an exemplary embodiment, the internal diameter of the tubular sleeve 2716 is at least approximately 0.020" greater than the outside diameters of the first and second tubular members 2710 and 2728. In this manner, during the threaded coupling of the first and second tubular members 2710 and 2728, fluidic materials within the first and second tubular members may be vented from the tubular members.

As illustrated in FIG. 27, the first and second tubular members 2710 and 2728, and the tubular sleeve 2716 may then be positioned within another structure 2732 such as, for example, a wellbore, and radially expanded and plastically deformed, for example, by displacing and/or rotating an expansion device 2734 through and/or within the interiors of the first and second tubular members. The tapered portions 2720 and 2722, of the tubular sleeve 2716 facilitates the insertion and movement of the first and second tubular members within and through the structure 2732, and the displacement of the expansion device 2734 through the interiors of the first and second tubular members 2710 and 2728, may be from top to bottom or from bottom to top.

During the radial expansion and plastic deformation of the first and second tubular members 2710 and 2728, the tubular sleeve 2716 is also radially expanded and plastically deformed. In an exemplary embodiment, as a result, the tubular sleeve 2716 may be maintained in circumferential tension and the end portions 2714 and 2726, of the first and second tubular members 2710 and 2728, may be maintained in circumferential compression.

Sleeve 2716 has a variable thickness due to one or more reduced thickness portions 2790 and/or increased thickness portions 2792.

Varying the thickness of sleeve 2716 provides the ability to control or induce stresses at selected positions along the length of sleeve 2716 and the end portions 2724 and 2726. Sleeve 2716 may be secured to tubular members 2710 and 2728 by a heat shrink fit.

In several exemplary embodiments, one or more portions of the first and second tubular members, 2710 and 2728, and the tubular sleeve 2716 have one or more of the material properties of one or more of the tubular members 12, 14, 24, 26, 102, 104, 106, 108, 202 and/or 204.

Figure 28:
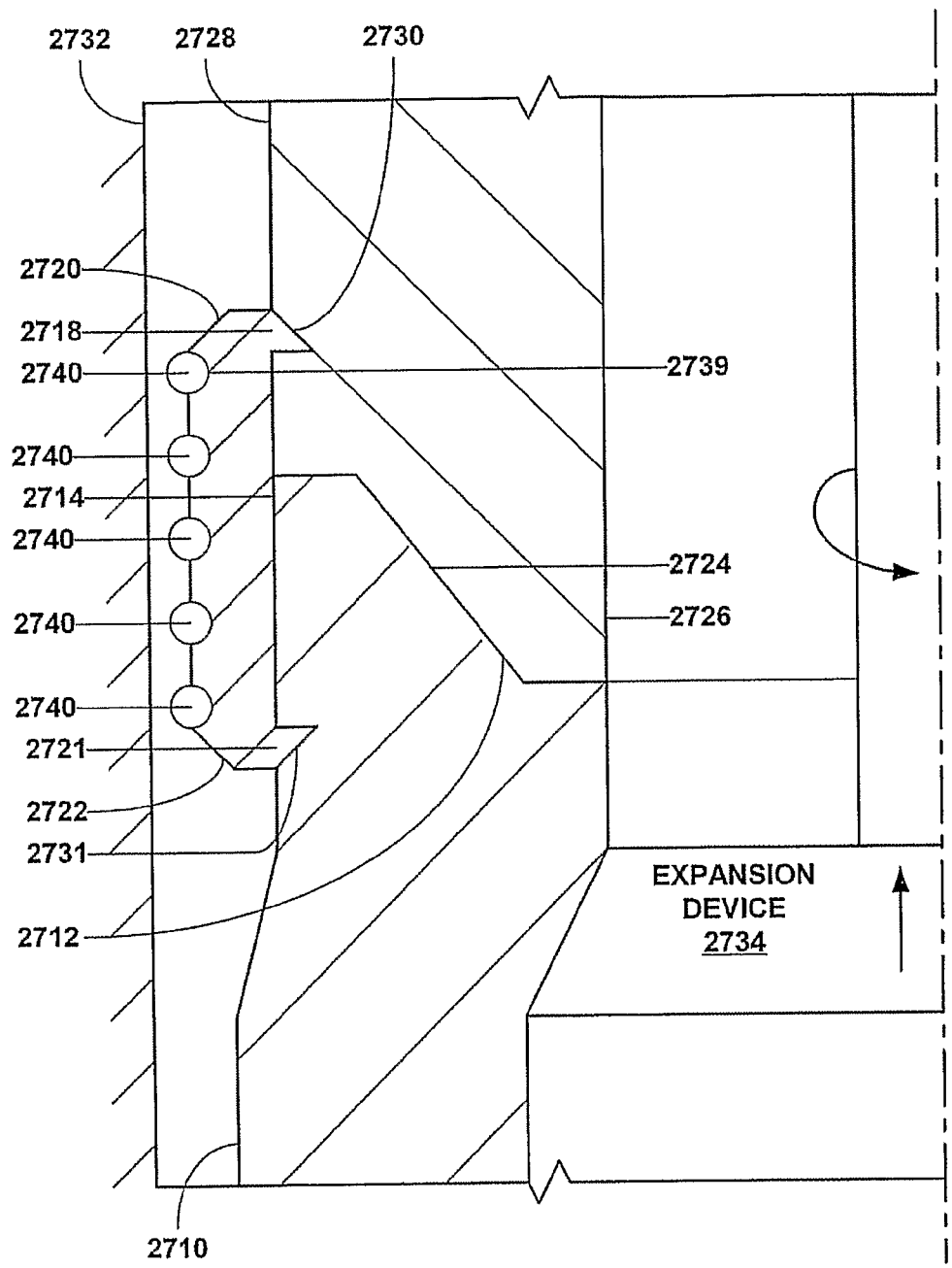
FIG. 28 is a fragmentary cross-sectional illustration of the radial expansion and plastic deformation of a portion of a first tubular member having an internally threaded connection at an end portion, a second tubular member having an externally threaded portion coupled to the internally threaded portion of the first tubular member, and an embodiment of a tubular sleeve supported by the end portion of both tubular members. The sleeve includes a member coiled onto grooves formed in the sleeve for varying the sleeve thickness.

Referring to FIG. 28, in an alternative embodiment, instead of varying the thickness of sleeve 2716, the same result described above with reference to FIG. 27, may be achieved by adding a member 2740 which may be coiled onto the grooves 2739 formed in sleeve 2716, thus varying the thickness along the length of sleeve 2716.

Figure 29:
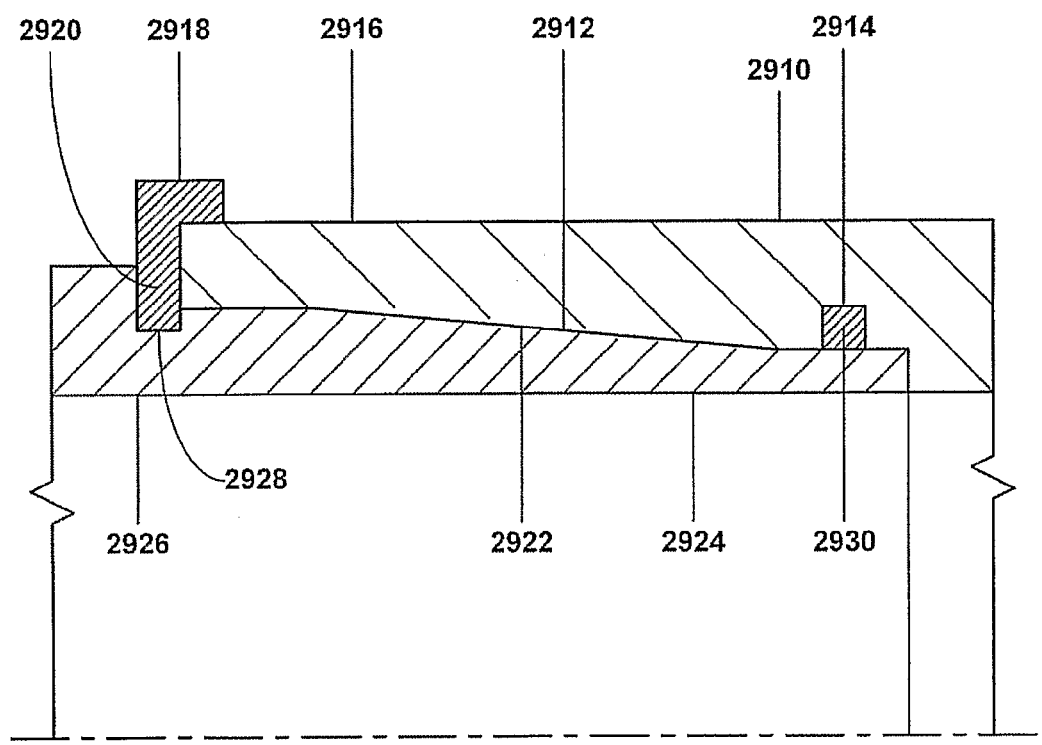
FIG. 29 is a fragmentary cross-sectional illustration of an exemplary embodiment of an expandable connection.

Referring to FIG. 29, in an exemplary embodiment, a first tubular member 2910 includes an internally threaded connection 2912 and an internal annular recess 2914 at an end portion 2916. A first end of a tubular sleeve 2918 includes an internal flange 2920, and a second end of the sleeve 2916 mates with and receives the end portion 2916 of the first tubular member 2910. An externally threaded connection 2922 of an end portion 2924 of a second tubular member 2926 having an annular recess 2928, is then positioned within the tubular sleeve 2918 and threadably coupled to the internally threaded connection 2912 of the end portion 2916 of the first tubular member 2910. The internal flange 2920 of the sleeve 2918 mates with and is received within the annular recess 2928. A sealing element 2930 is received within the internal annular recess 2914 of the end portion 2916 of the first tubular member 2910.

The internally threaded connection 2912 of the end portion 2916 of the first tubular member 2910 is a box connection, and the externally threaded connection 2922 of the end portion 2924 of the second tubular member 2926 is a pin connection. In an exemplary embodiment, the internal diameter of the tubular sleeve 2918 is at least approximately 0.020" greater than the outside diameters of the first tubular member 2910. In this manner, during the threaded coupling of the first and second tubular members 2910 and 2926, fluidic materials within the first and second tubular members may be vented from the tubular members.

The first and second tubular members 2910 and 2926, and the tubular sleeve 2918 may be positioned within another structure such as, for example, a wellbore, and radially expanded and plastically deformed, for example, by displacing and/or rotating an expansion device through and/or within the interiors of the first and second tubular members.

During the radial expansion and plastic deformation of the first and second tubular members 2910 and 2926, the tubular sleeve 2918 is also radially expanded and plastically deformed. In an exemplary embodiment, as a result, the tubular sleeve 2918 may be maintained in circumferential tension and the end portions 2916 and 2924, of the first and second tubular members 2910 and 2926, respectively, may be maintained in circumferential compression.

In an exemplary embodiment, before, during, and after the radial expansion and plastic deformation of the first and second tubular members 2910 and 2926, and the tubular sleeve 2918, the sealing element 2930 seals the interface between the first and second tubular members. In an exemplary embodiment, during and after the radial expansion and plastic deformation of the first and second tubular members 2910 and 2926, and the tubular sleeve 2918, a metal to metal seal is formed between at least one of: the first and second tubular members 2910 and 2926, the first tubular member and the tubular sleeve 2918, and/or the second tubular member and the tubular sleeve. In an exemplary embodiment, the metal to metal seal is both fluid tight and gas tight.

In several exemplary embodiments, one or more portions of the first and second tubular members, 2910 and 2926, the tubular sleeve 2918, and the sealing element 2930 have one or more of the material properties of one or more of the tubular members 12, 14, 24, 26, 102, 104, 106, 108, 202 and/or 204.

Figure 30A:
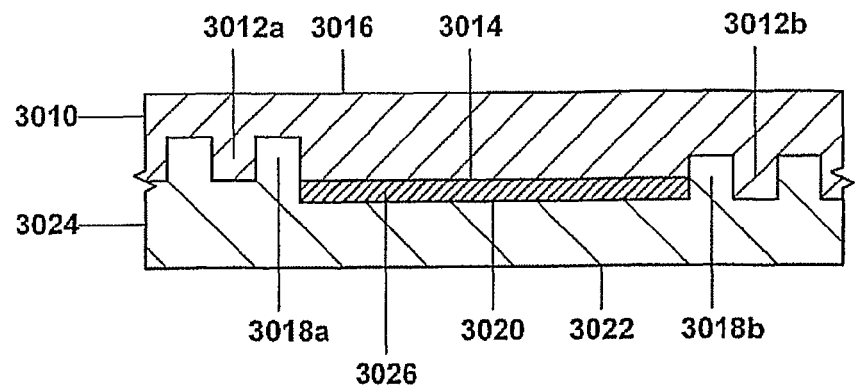
FIGS. 30a-30c are fragmentary cross-sectional illustrations of exemplary embodiments of expandable connections.

Referring to FIG. 30a, in an exemplary embodiment, a first tubular member 3010 includes internally threaded connections 3012a and 3012b, spaced apart by a cylindrical internal surface 3014, at an end portion 3016. Externally threaded connections 3018a and 3018b, spaced apart by a cylindrical external surface 3020, of an end portion 3022 of a second tubular member 3024 are threadably coupled to the internally threaded connections, 3012a and 3012b, respectively, of the end portion 3016 of the first tubular member 3010. A sealing element 3026 is received within an annulus defined between the internal cylindrical surface 3014 of the first tubular member 3010 and the external cylindrical surface 3020 of the second tubular member 3024.

The internally threaded connections, 3012a and 3012b, of the end portion 3016 of the first tubular member 3010 are box connections, and the externally threaded connections, 3018a and 3018b, of the end portion 3022 of the second tubular member 3024 are pin connections. In an exemplary embodiment, the sealing element 3026 is an elastomeric and/or metallic sealing element.

The first and second tubular members 3010 and 3024 may be positioned within another structure such as, for example, a wellbore, and radially expanded and plastically deformed, for example, by displacing and/or rotating an expansion device through and/or within the interiors of the first and second tubular members.

In an exemplary embodiment, before, during, and after the radial expansion and plastic deformation of the first and second tubular members 3010 and 3024, the sealing element 3026 seals the interface between the first and second tubular members. In an exemplary embodiment, before, during and/or after the radial expansion and plastic deformation of the first and second tubular members 3010 and 3024, a metal to metal seal is formed between at least one of: the first and second tubular members 3010 and 3024, the first tubular member and the sealing element 3026, and/or the second tubular member and the sealing element. In an exemplary embodiment, the metal to metal seal is both fluid tight and gas tight.

In an alternative embodiment, the sealing element 3026 is omitted, and during and/or after the radial expansion and plastic deformation of the first and second tubular members 3010 and 3024, a metal to metal seal is formed between the first and second tubular members.

In several exemplary embodiments, one or more portions of the first and second tubular members, 3010 and 3024, the sealing element 3026 have one or more of the material properties of one or more of the tubular members 12, 14, 24, 26, 102, 104, 106, 108, 202 and/or 204.

Figure 30B:
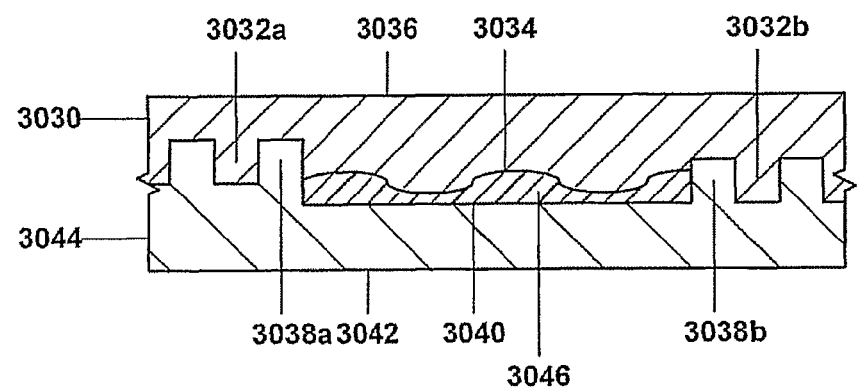

Referring to FIG. 30b, in an exemplary embodiment, a first tubular member 3030 includes internally threaded connections 3032a and 3032b, spaced apart by an undulating approximately cylindrical internal surface 3034, at an end portion 3036. Externally threaded connections 3038a and 3038b, spaced apart by a cylindrical external surface 3040, of an end portion 3042 of a second tubular member 3044 are threadably coupled to the internally threaded connections, 3032a and 3032b, respectively, of the end portion 3036 of the first tubular member 3030. A sealing element 3046 is received within an annulus defined between the undulating approximately cylindrical internal surface 3034 of the first tubular member 3030 and the external cylindrical surface 3040 of the second tubular member 3044.

The internally threaded connections, 3032a and 3032b, of the end portion 3036 of the first tubular member 3030 are box connections, and the externally threaded connections, 3038a and 3038b, of the end portion 3042 of the second tubular member 3044 are pin connections. In an exemplary embodiment, the sealing element 3046 is an elastomeric and/or metallic sealing element.

The first and second tubular members 3030 and 3044 may be positioned within another structure such as, for example, a wellbore, and radially expanded and plastically deformed, for example, by displacing and/or rotating an expansion device through and/or within the interiors of the first and second tubular members.

In an exemplary embodiment, before, during, and after the radial expansion and plastic deformation of the first and second tubular members 3030 and 3044, the sealing element 3046 seals the interface between the first and second tubular members. In an exemplary embodiment, before, during and/or after the radial expansion and plastic deformation of the first and second tubular members 3030 and 3044, a metal to metal seal is formed between at least one of: the first and second tubular members 3030 and 3044, the first tubular member and the sealing element 3046, and/or the second tubular member and the sealing element. In an exemplary embodiment, the metal to metal seal is both fluid tight and gas tight.

In an alternative embodiment, the sealing element 3046 is omitted, and during and/or after the radial expansion and plastic deformation of the first and second tubular members 3030 and 3044, a metal to metal seal is formed between the first and second tubular members.

In several exemplary embodiments, one or more portions of the first and second tubular members, 3030 and 3044, the sealing element 3046 have one or more of the material properties of one or more of the tubular members 12, 14, 24, 26, 102, 104, 106, 108, 202 and/or 204.

Figure 30C:
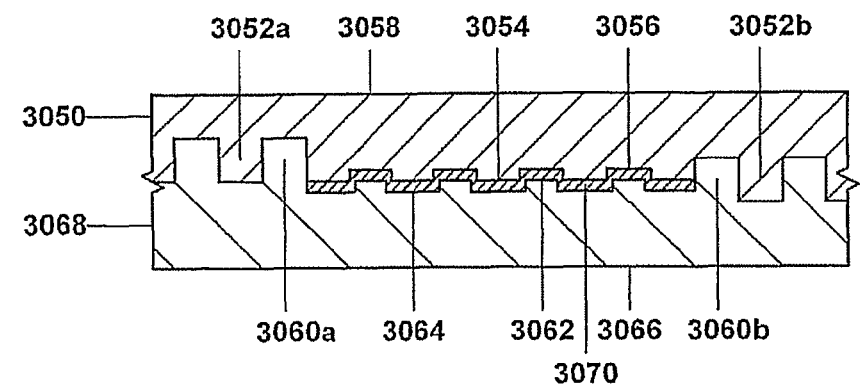

Referring to FIG. 30c, in an exemplary embodiment, a first tubular member 3050 includes internally threaded connections 3052a and 3052b, spaced apart by a cylindrical internal surface 3054 including one or more square grooves 3056, at an end portion 3058. Externally threaded connections 3060a and 3060b, spaced apart by a cylindrical external surface 3062 including one or more square grooves 3064, of an end portion 3066 of a second tubular member 3068 are threadably coupled to the internally threaded connections, 3052a and 3052b, respectively, of the end portion 3058 of the first tubular member 3050. A sealing element 3070 is received within an annulus defined between the cylindrical internal surface 3054 of the first tubular member 3050 and the external cylindrical surface 3062 of the second tubular member 3068.

The internally threaded connections, 3052a and 3052b, of the end portion 3058 of the first tubular member 3050 are box connections, and the externally threaded connections, 3060a and 3060b, of the end portion 3066 of the second tubular member 3068 are pin connections. In an exemplary embodiment, the sealing element 3070 is an elastomeric and/or metallic sealing element.

The first and second tubular members 3050 and 3068 may be positioned within another structure such as, for example, a wellbore, and radially expanded and plastically deformed, for example, by displacing and/or rotating an expansion device through and/or within the interiors of the first and second tubular members.

In an exemplary embodiment, before, during, and after the radial expansion and plastic deformation of the first and second tubular members 3050 and 3068, the sealing element 3070 seals the interface between the first and second tubular members. In an exemplary embodiment, before, during and/or after the radial expansion and plastic deformation of the first and second tubular members, 3050 and 3068, a metal to metal seal is formed between at least one of: the first and second tubular members, the first tubular member and the sealing element 3070, and/or the second tubular member and the sealing element. In an exemplary embodiment, the metal to metal seal is both fluid tight and gas tight.

In an alternative embodiment, the sealing element 3070 is omitted, and during and/or after the radial expansion and plastic deformation of the first and second tubular members 950 and 968, a metal to metal seal is formed between the first and second tubular members.

In several exemplary embodiments, one or more portions of the first and second tubular members, 3050 and 3068, the sealing element 3070 have one or more of the material properties of one or more of the tubular members 12, 14, 24, 26, 102, 104, 106, 108, 202 and/or 204.

Figure 31:
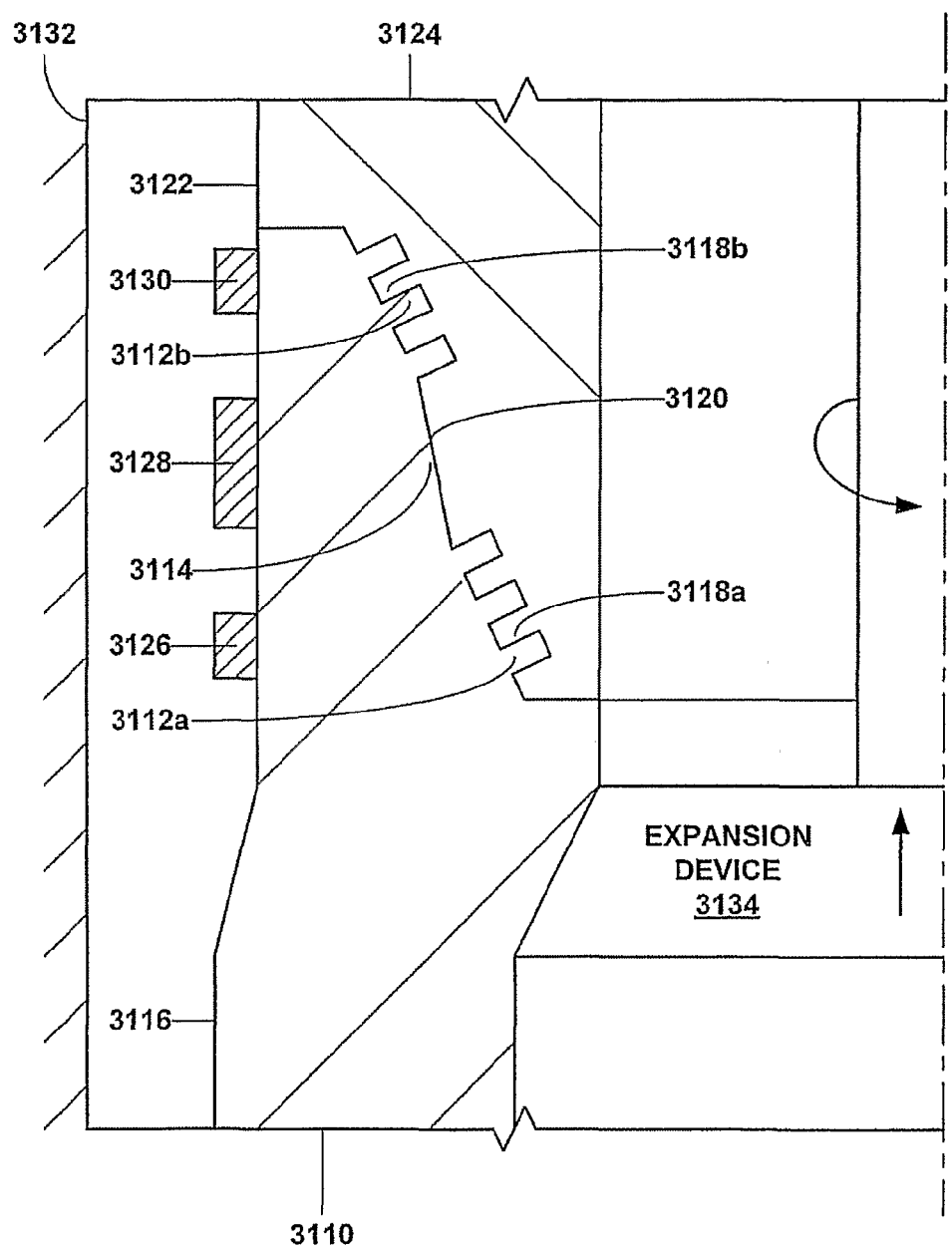
FIG. 31 is a fragmentary cross-sectional illustration of an exemplary embodiment of an expandable connection.

Referring to FIG. 31, in an exemplary embodiment, a first tubular member 3110 includes internally threaded connections, 3112a and 3112b, spaced apart by a non-threaded internal surface 3114, at an end portion 3116. Externally threaded connections, 3118a and 3118b, spaced apart by a non-threaded external surface 3120, of an end portion 3122 of a second tubular member 3124 are threadably coupled to the internally threaded connections, 3112a and 3112b, respectively, of the end portion 3122 of the first tubular member 3124.

First, second, and/or third tubular sleeves, 3126, 3128, and 3130, are coupled the external surface of the first tubular member 3110 in opposing relation to the threaded connection formed by the internal and external threads, 3112a and 3118a, the interface between the non-threaded surfaces, 3114 and 3120, and the threaded connection formed by the internal and external threads, 3112b and 3118b, respectively.

The internally threaded connections, 3112a and 3112b, of the end portion 3116 of the first tubular member 3110 are box connections, and the externally threaded connections, 3118a and 3118b, of the end portion 3122 of the second tubular member 3124 are pin connections.

The first and second tubular members 3110 and 3124, and the tubular sleeves 3126, 3128, and/or 3130, may then be positioned within another structure 3132 such as, for example, a wellbore, and radially expanded and plastically deformed, for example, by displacing and/or rotating an expansion device 3134 through and/or within the interiors of the first and second tubular members.

During the radial expansion and plastic deformation of the first and second tubular members 3110 and 3124, the tubular sleeves 3126, 3128 and/or 3130 are also radially expanded and plastically deformed. In an exemplary embodiment, as a result, the tubular sleeves 3126, 3128, and/or 3130 are maintained in circumferential tension and the end portions 3116 and 3122, of the first and second tubular members 3110 and 3124, may be maintained in circumferential compression.

The sleeves 3126, 3128, and/or 3130 may, for example, be secured to the first tubular member 3110 by a heat shrink fit.

In several exemplary embodiments, one or more portions of the first and second tubular members, 3110 and 3124, and the sleeves, 3126, 3128, and 3130, have one or more of the material properties of one or more of the tubular members 12, 14, 24, 26, 102, 104, 106, 108, 202 and/or 204.

Figure 32A:
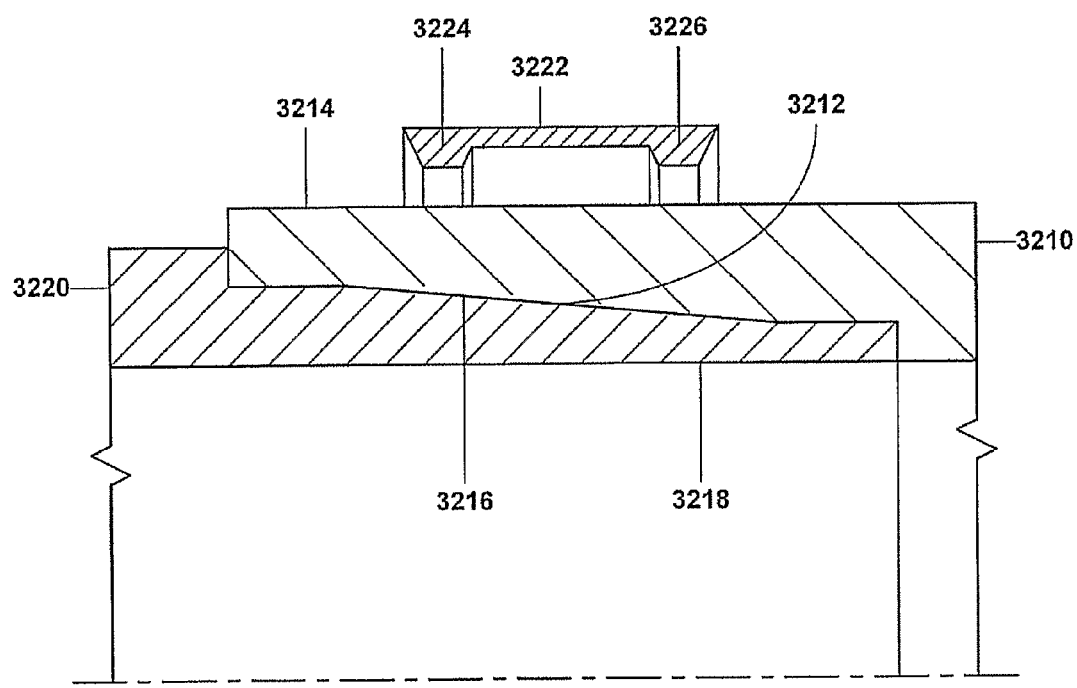
FIGS. 32a and 32b are fragmentary cross-sectional illustrations of the formation of an exemplary embodiment of an expandable connection.

Referring to FIG. 32a, in an exemplary embodiment, a first tubular member 3210 includes an internally threaded connection 3212 at an end portion 3214. An externally threaded connection 3216 of an end portion 3218 of a second tubular member 3220 are threadably coupled to the internally threaded connection 3212 of the end portion 3214 of the first tubular member 3210.

The internally threaded connection 3212 of the end portion 3214 of the first tubular member 3210 is a box connection, and the externally threaded connection 3216 of the end portion 3218 of the second tubular member 3220 is a pin connection.

Figure 32B:
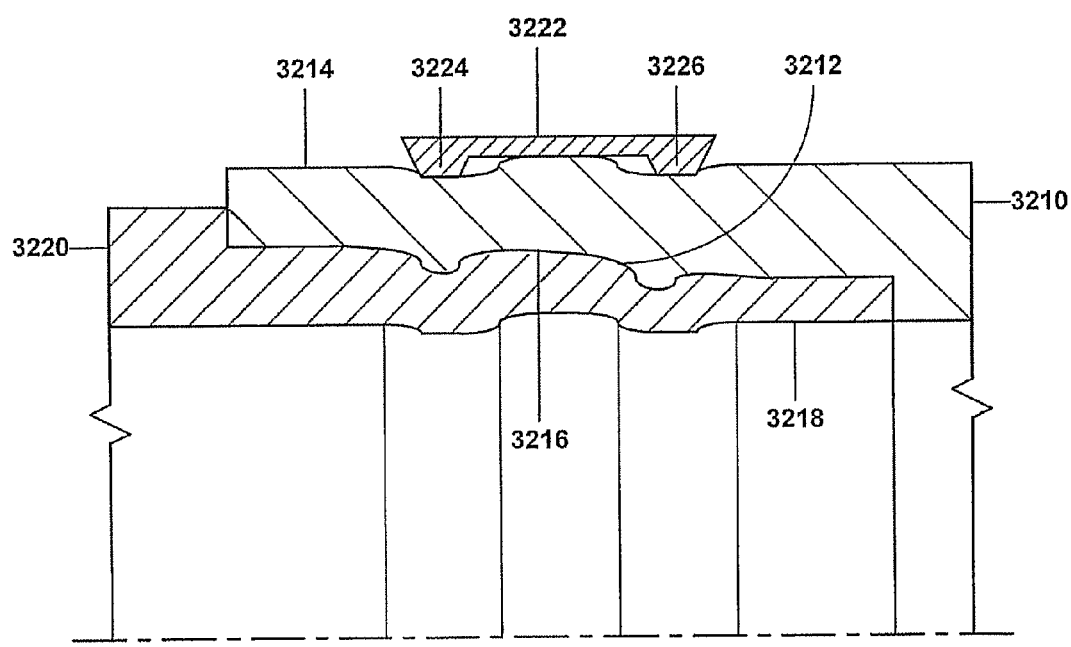

A tubular sleeve 3222 including internal flanges 3224 and 3226 is positioned proximate and surrounding the end portion 3214 of the first tubular member 3210. As illustrated in FIG. 32b, the tubular sleeve 3222 is then forced into engagement with the external surface of the end portion 3214 of the first tubular member 3210 in a conventional manner. As a result, the end portions, 3214 and 3218, of the first and second tubular members, 3210 and 3220, are upset in an undulating fashion.

The first and second tubular members 3210 and 3220, and the tubular sleeve 3222, may then be positioned within another structure such as, for example, a wellbore, and radially expanded and plastically deformed, for example, by displacing and/or rotating an expansion device through and/or within the interiors of the first and second tubular members.

During the radial expansion and plastic deformation of the first and second tubular members 3210 and 3220, the tubular sleeve 3222 is also radially expanded and plastically deformed. In an exemplary embodiment, as a result, the tubular sleeve 3222 is maintained in circumferential tension and the end portions 3214 and 3218, of the first and second tubular members 3210 and 3220, may be maintained in circumferential compression.

In several exemplary embodiments, one or more portions of the first and second tubular members, 3210 and 3220, and the sleeve 3222 have one or more of the material properties of one or more of the tubular members 12, 14, 24, 26, 102, 104, 106, 108, 202 and/or 204.

Figure 33:
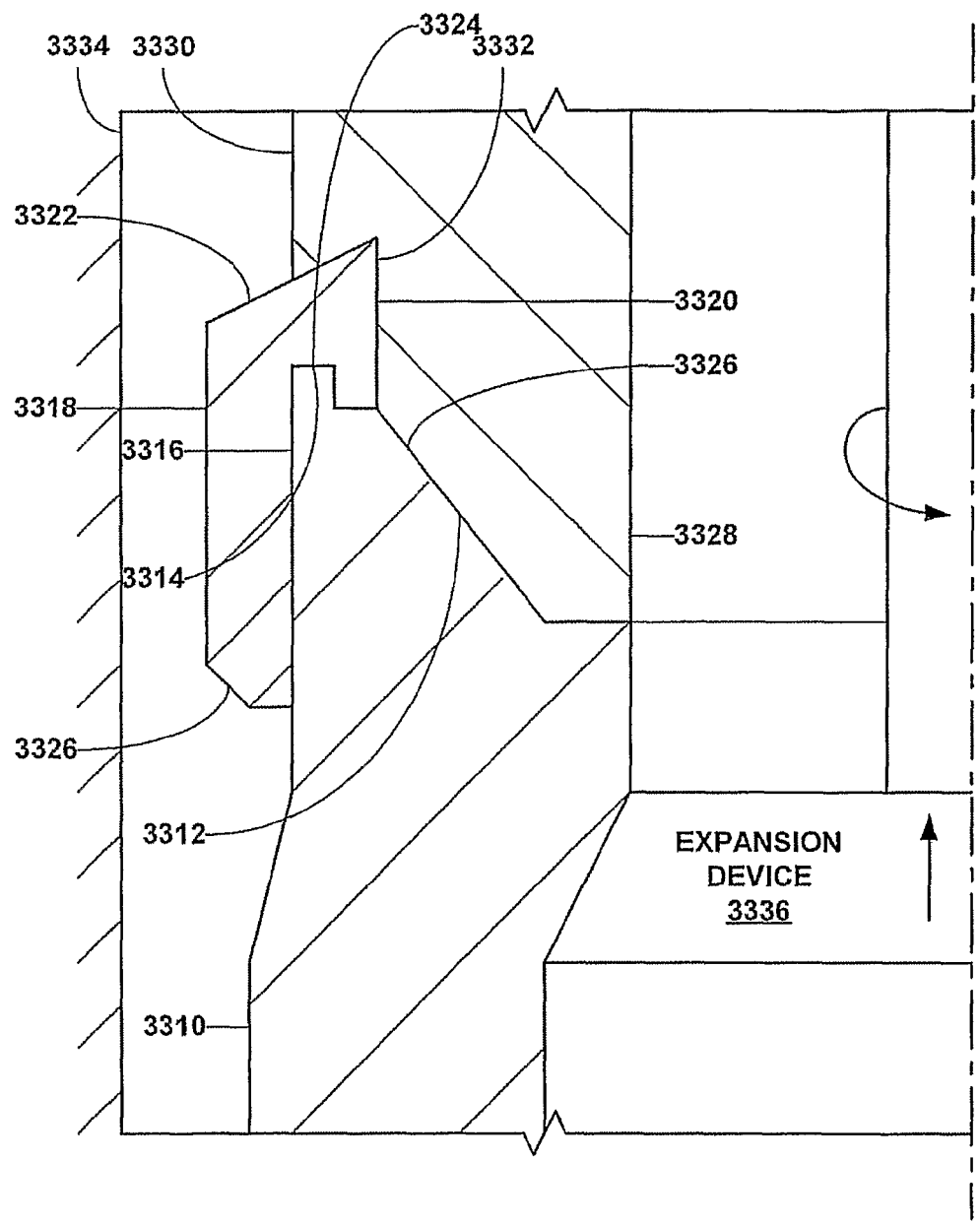
FIG. 33 is a fragmentary cross-sectional illustration of an exemplary embodiment of an expandable connection.

Referring to FIG. 33, in an exemplary embodiment, a first tubular member 3310 includes an internally threaded connection 3312 and an annular projection 3314 at an end portion 3316.

A first end of a tubular sleeve 3318 that includes an internal flange 3320 having a tapered portion 3322 and an annular recess 3324 for receiving the annular projection 3314 of the first tubular member 3310, and a second end that includes a tapered portion 3326, is then mounted upon and receives the end portion 3316 of the first tubular member 3310.

In an exemplary embodiment, the end portion 3316 of the first tubular member 3310 abuts one side of the internal flange 3320 of the tubular sleeve 3318 and the annular projection 3314 of the end portion of the first tubular member mates with and is received within the annular recess 3324 of the internal flange of the tubular sleeve, and the internal diameter of the internal flange 3320 of the tubular sleeve 3318 is substantially equal to or greater than the maximum internal diameter of the internally threaded connection 3312 of the end portion 3316 of the first tubular member 3310. An externally threaded connection 3326 of an end portion 3328 of a second tubular member 3330 having an annular recess 3332 is then positioned within the tubular sleeve 3318 and threadably coupled to the internally threaded connection 3312 of the end portion 3316 of the first tubular member 3310. In an exemplary embodiment, the internal flange 3332 of the tubular sleeve 3318 mates with and is received within the annular recess 3332 of the end portion 3328 of the second tubular member 3330. Thus, the tubular sleeve 3318 is coupled to and surrounds the external surfaces of the first and second tubular members, 3310 and 3328.

The internally threaded connection 3312 of the end portion 3316 of the first tubular member 3310 is a box connection, and the externally threaded connection 3326 of the end portion 3328 of the second tubular member 3330 is a pin connection. In an exemplary embodiment, the internal diameter of the tubular sleeve 3318 is at least approximately 0.020" greater than the outside diameters of the first and second tubular members, 3310 and 3330. In this manner, during the threaded coupling of the first and second tubular members, 3310 and 3330, fluidic materials within the first and second tubular members may be vented from the tubular members.

As illustrated in FIG. 33, the first and second tubular members, 3310 and 3330, and the tubular sleeve 3318 may be positioned within another structure 3334 such as, for example, a cased or uncased wellbore, and radially expanded and plastically deformed, for example, by displacing and/or rotating a conventional expansion device 3336 within and/or through the interiors of the first and second tubular members. The tapered portions, 3322 and 3326, of the tubular sleeve 3318 facilitate the insertion and movement of the first and second tubular members within and through the structure 3334, and the movement of the expansion device 3336 through the interiors of the first and second tubular members, 3310 and 3330, may, for example, be from top to bottom or from bottom to top.

During the radial expansion and plastic deformation of the first and second tubular members, 3310 and 3330, the tubular sleeve 3318 is also radially expanded and plastically deformed. As a result, the tubular sleeve 3318 may be maintained in circumferential tension and the end portions, 3316 and 3328, of the first and second tubular members, 3310 and 3330, may be maintained in circumferential compression.

Sleeve 3316 increases the axial compression loading of the connection between tubular members 3310 and 3330 before and after expansion by the expansion device 3336. Sleeve 3316 may be secured to tubular members 3310 and 3330, for example, by a heat shrink fit.

In several alternative embodiments, the first and second tubular members, 3310 and 3330, are radially expanded and plastically deformed using other conventional methods for radially expanding and plastically deforming tubular members such as, for example, internal pressurization, hydroforming, and/or roller expansion devices and/or any one or combination of the conventional commercially available expansion products and services available from Baker Hughes, Weatherford International, and/or Enventure Global Technology L.L.C.

The use of the tubular sleeve 3318 during (a) the coupling of the first tubular member 3310 to the second tubular member 3330, (b) the placement of the first and second tubular members in the structure 3334, and (c) the radial expansion and plastic deformation of the first and second tubular members provides a number of significant benefits. For example, the tubular sleeve 3318 protects the exterior surfaces of the end portions, 3316 and 3328, of the first and second tubular members, 3310 and 3330, during handling and insertion of the tubular members within the structure 3334. In this manner, damage to the exterior surfaces of the end portions, 3316 and 3328, of the first and second tubular members, 3310 and 3330, is avoided that could otherwise result in stress concentrations that could cause a catastrophic failure during subsequent radial expansion operations. Furthermore, the tubular sleeve 3318 provides an alignment guide that facilitates the insertion and threaded coupling of the second tubular member 3330 to the first tubular member 3310. In this manner, misalignment that could result in damage to the threaded connections, 3312 and 3326, of the first and second tubular members, 3310 and 3330, may be avoided. In addition, during the relative rotation of the second tubular member with respect to the first tubular member, required during the threaded coupling of the first and second tubular members, the tubular sleeve 3318 provides an indication of to what degree the first and second tubular members are threadably coupled. For example, if the tubular sleeve 3318 can be easily rotated, that would indicate that the first and second tubular members, 3310 and 3330, are not fully threadably coupled and in intimate contact with the internal flange 3320 of the tubular sleeve. Furthermore, the tubular sleeve 3318 may prevent crack propagation during the radial expansion and plastic deformation of the first and second tubular members, 3310 and 3330. In this manner, failure modes such as, for example, longitudinal cracks in the end portions, 3316 and 3328, of the first and second tubular members may be limited in severity or eliminated all together. In addition, after completing the radial expansion and plastic deformation of the first and second tubular members, 3310 and 3330, the tubular sleeve 3318 may provide a fluid tight metal-to-metal seal between interior surface of the tubular sleeve 3318 and the exterior surfaces of the end portions, 3316 and 3328, of the first and second tubular members. In this manner, fluidic materials are prevented from passing through the threaded connections, 3312 and 3326, of the first and second tubular members, 3310 and 3330, into the annulus between the first and second tubular members and the structure 3334. Furthermore, because, following the radial expansion and plastic deformation of the first and second tubular members, 3310 and 3330, the tubular sleeve 3318 may be maintained in circumferential tension and the end portions, 3316 and 3328, of the first and second tubular members, 3310 and 3330, may be maintained in circumferential compression, axial loads and/or torque loads may be transmitted through the tubular sleeve.

In several exemplary embodiments, one or more portions of the first and second tubular members, 3310 and 3330, and the sleeve 3318 have one or more of the material properties of one or more of the tubular members 12, 14, 24, 26, 102, 104, 106, 108, 202 and/or 204.

Figure 34A:
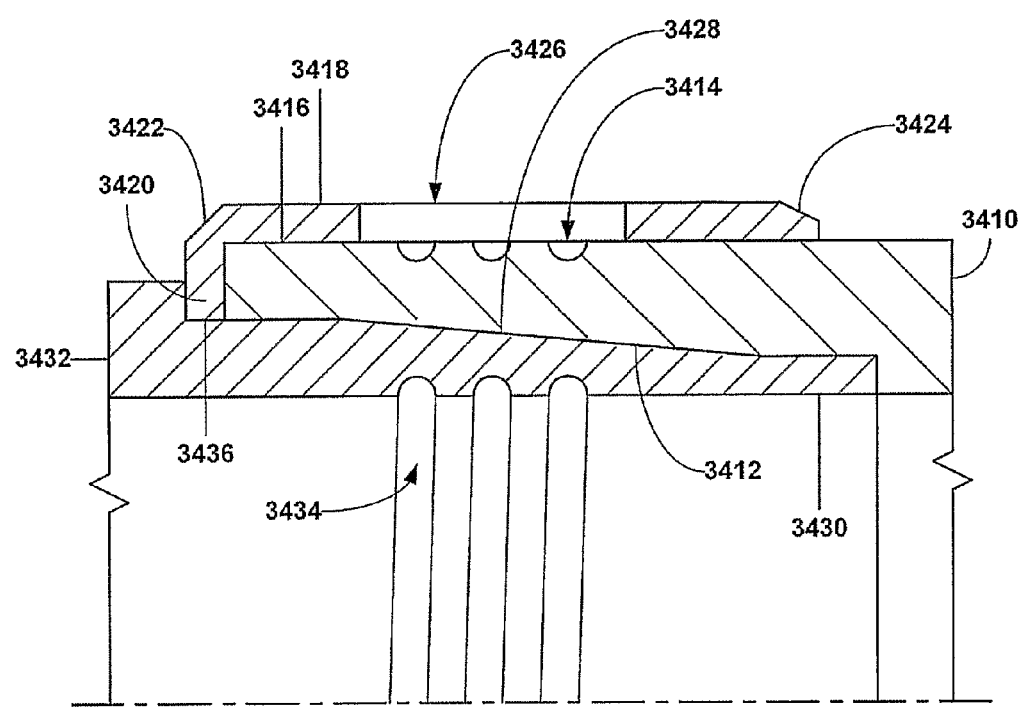
FIGS. 34a, 34b and 34c are fragmentary cross-sectional illustrations of an exemplary embodiment of an expandable connection.
Figure 34B:
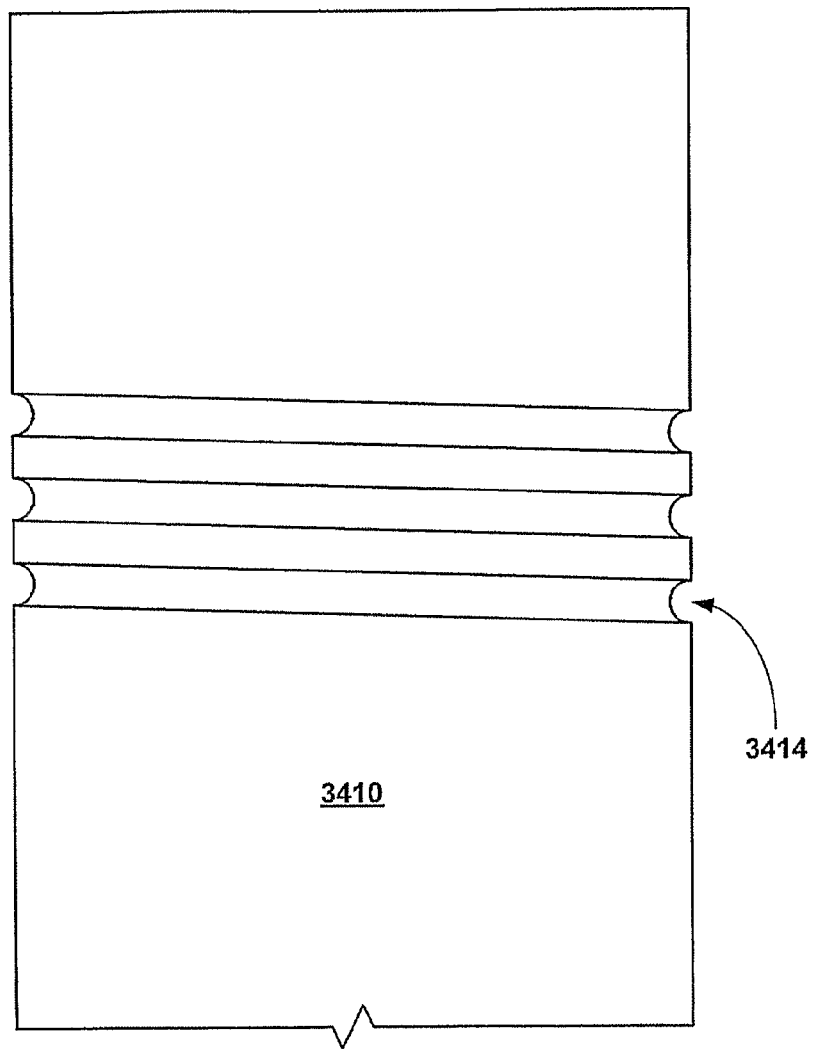
Figure 34C:
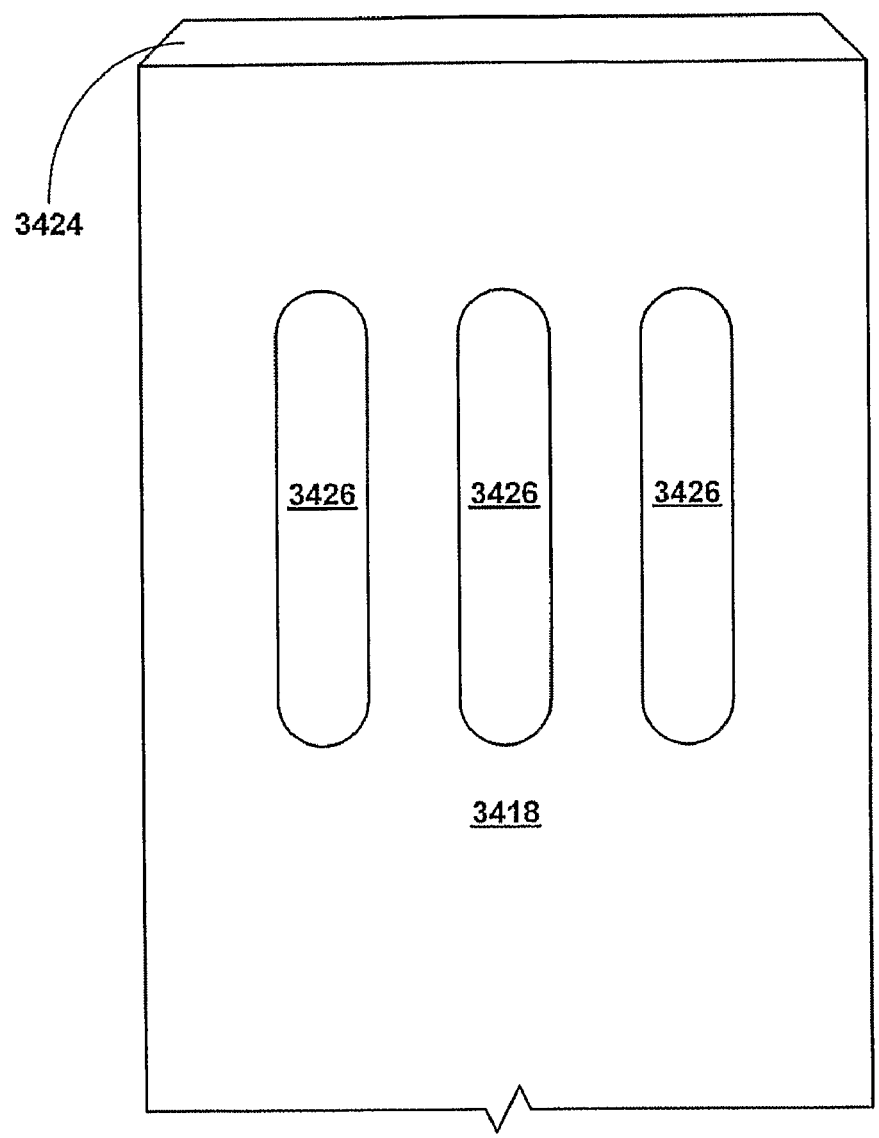

Referring to FIGS. 34a, 34b, and 34c, in an exemplary embodiment, a first tubular member 3410 includes an internally threaded connection 1312 and one or more external grooves 3414 at an end portion 3416.

A first end of a tubular sleeve 3418 that includes an internal flange 3420 and a tapered portion 3422, a second end that includes a tapered portion 3424, and an intermediate portion that includes one or more longitudinally aligned openings 3426, is then mounted upon and receives the end portion 3416 of the first tubular member 3410.

In an exemplary embodiment, the end portion 3416 of the first tubular member 3410 abuts one side of the internal flange 3420 of the tubular sleeve 3418, and the internal diameter of the internal flange 3420 of the tubular sleeve 3416 is substantially equal to or greater than the maximum internal diameter of the internally threaded connection 3412 of the end portion 3416 of the first tubular member 3410. An externally threaded connection 3428 of an end portion 3430 of a second tubular member 3432 that includes one or more internal grooves 3434 is then positioned within the tubular sleeve 3418 and threadably coupled to the internally threaded connection 3412 of the end portion 3416 of the first tubular member 3410. In an exemplary embodiment, the internal flange 3420 of the tubular sleeve 3418 mates with and is received within an annular recess 3436 defined in the end portion 3430 of the second tubular member 3432. Thus, the tubular sleeve 3418 is coupled to and surrounds the external surfaces of the first and second tubular members, 3410 and 3432.

The first and second tubular members, 3410 and 3432, and the tubular sleeve 3418 may be positioned within another structure such as, for example, a cased or uncased wellbore, and radially expanded and plastically deformed, for example, by displacing and/or rotating a conventional expansion device within and/or through the interiors of the first and second tubular members. The tapered portions, 3422 and 3424, of the tubular sleeve 3418 facilitate the insertion and movement of the first and second tubular members within and through the structure, and the movement of the expansion device through the interiors of the first and second tubular members, 3410 and 3432, may be from top to bottom or from bottom to top.

During the radial expansion and plastic deformation of the first and second tubular members, 3410 and 3432, the tubular sleeve 3418 is also radially expanded and plastically deformed. As a result, the tubular sleeve 3418 may be maintained in circumferential tension and the end portions, 3416 and 3430, of the first and second tubular members, 3410 and 3432, may be maintained in circumferential compression.

Sleeve 3416 increases the axial compression loading of the connection between tubular members 3410 and 3432 before and after expansion by the expansion device. The sleeve 3418 may be secured to tubular members 3410 and 3432, for example, by a heat shrink fit.

During the radial expansion and plastic deformation of the first and second tubular members, 3410 and 3432, the grooves 3414 and/or 3434 and/or the openings 3426 provide stress concentrations that in turn apply added stress forces to the mating threads of the threaded connections, 3412 and 3428. As a result, during and after the radial expansion and plastic deformation of the first and second tubular members, 3410 and 3432, the mating threads of the threaded connections, 3412 and 3428, are maintained in metal to metal contact thereby providing a fluid and gas tight connection. In an exemplary embodiment, the orientations of the grooves 3414 and/or 3434 and the openings 3426 are orthogonal to one another. In an exemplary embodiment, the grooves 3414 and/or 3434 are helical grooves.

In several alternative embodiments, the first and second tubular members, 3410 and 3432, are radially expanded and plastically deformed using other conventional methods for radially expanding and plastically deforming tubular members such as, for example, internal pressurization, hydroforming, and/or roller expansion devices and/or any one or combination of the conventional commercially available expansion products and services available from Baker Hughes, Weatherford International, and/or Enventure Global Technology L.L.C.

The use of the tubular sleeve 3418 during (a) the coupling of the first tubular member 3410 to the second tubular member 3432, (b) the placement of the first and second tubular members in the structure, and (c) the radial expansion and plastic deformation of the first and second tubular members provides a number of significant benefits. For example, the tubular sleeve 3418 protects the exterior surfaces of the end portions, 3416 and 3430, of the first and second tubular members, 3410 and 3432, during handling and insertion of the tubular members within the structure. In this manner, damage to the exterior surfaces of the end portions, 3416 and 3430, of the first and second tubular members, 3410 and 3432, is avoided that could otherwise result in stress concentrations that could cause a catastrophic failure during subsequent radial expansion operations. Furthermore, the tubular sleeve 3418 provides an alignment guide that facilitates the insertion and threaded coupling of the second tubular member 3432 to the first tubular member 3410. In this manner, misalignment that could result in damage to the threaded connections, 3412 and 3428, of the first and second tubular members, 3410 and 3432, may be avoided. In addition, during the relative rotation of the second tubular member with respect to the first tubular member, required during the threaded coupling of the first and second tubular members, the tubular sleeve 3416 provides an indication of to what degree the first and second tubular members are threadably coupled. For example, if the tubular sleeve 3418 can be easily rotated, that would indicate that the first and second tubular members, 3410 and 3432, are not fully threadably coupled and in intimate contact with the internal flange 3420 of the tubular sleeve. Furthermore, the tubular sleeve 3418 may prevent crack propagation during the radial expansion and plastic deformation of the first and second tubular members, 3410 and 3432. In this manner, failure modes such as, for example, longitudinal cracks in the end portions, 3416 and 3430, of the first and second tubular members may be limited in severity or eliminated all together. In addition, after completing the radial expansion and plastic deformation of the first and second tubular members, 3410 and 3432, the tubular sleeve 3418 may provide a fluid and gas tight metal-to-metal seal between interior surface of the tubular sleeve 3418 and the exterior surfaces of the end portions, 3416 and 3430, of the first and second tubular members. In this manner, fluidic materials are prevented from passing through the threaded connections, 3412 and 3430, of the first and second tubular members, 3410 and 3432, into the annulus between the first and second tubular members and the structure. Furthermore, because, following the radial expansion and plastic deformation of the first and second tubular members, 3410 and 3432, the tubular sleeve 3418 may be maintained in circumferential tension and the end portions, 3416 and 3430, of the first and second tubular members, 3410 and 3432, may be maintained in circumferential compression, axial loads and/or torque loads may be transmitted through the tubular sleeve.

In several exemplary embodiments, the first and second tubular members described above with reference to FIGS. 1 to 34c are radially expanded and plastically deformed using the expansion device in a conventional manner and/or using one or more of the methods and apparatus disclosed in one or more of the following: The present application is related to the following: (1) U.S. patent application Ser. No. 09/454,139, filed on Dec. 3, 1999, (2) U.S. patent application Ser. No. 09/510,913, filed on Feb. 23, 2000, (3) U.S. patent application Ser. No. 09/502,350, filed on Feb. 10, 2000, (4) U.S. patent application Ser. No. 09/440,338, filed on Nov. 15, 1999, (5) U.S. patent application Ser. No. 09/523,460, filed on Mar. 10, 2000, (6) U.S. patent application Ser. No. 09/512,895, filed on Feb. 24, 2000, (7) U.S. patent application Ser. No. 09/511,941, filed on Feb. 24, 2000, (8) U.S. patent application Ser. No. 09/588,946, filed on Jun. 7, 2000, (9) U.S. patent application Ser. No. 09/559,122, filed on Apr. 26, 2000, (10) PCT patent application serial no. PCT/US00/18635, filed on Jul. 9, 2000, (11) U.S. provisional patent application Ser. No. 60/162,671, filed on Nov. 1, 1999, (12) U.S. provisional patent application Ser. No. 60/154,047, filed on Sep. 16, 1999, (13) U.S. provisional patent application Ser. No. 60/159,082, filed on Oct. 12, 1999, (14) U.S. provisional patent application Ser. No. 60/159,039, filed on Oct. 12, 1999, (15) U.S. provisional patent application Ser. No. 60/159,033, filed on Oct. 12, 1999, (16) U.S. provisional patent application Ser. No. 60/212,359, filed on Jun. 19, 2000, (17) U.S. provisional patent application Ser. No. 60/165,228, filed on Nov. 12, 1999, (18) U.S. provisional patent application Ser. No. 60/221,443, filed on Jul. 28, 2000, (19) U.S. provisional patent application Ser. No. 60/221,645, filed on Jul. 28, 2000, (20) U.S. provisional patent application Ser. No. 60/233,638, filed on Sep. 18, 2000, (21) U.S. provisional patent application Ser. No. 60/237,334, filed on Oct. 2, 2000, (22) U.S. provisional patent application Ser. No. 60/270,007, filed on Feb. 20, 2001, (23) U.S. provisional patent application Ser. No. 60/262,434, filed on Jan. 17, 2001, (24) U.S. provisional patent application Ser. No. 60/259,486, filed on Jan. 3, 2001, (25) U.S. provisional patent application Ser. No. 60/303,740, filed on Jul. 6, 2001, (26) U.S. provisional patent application Ser. No. 60/313,453, filed on Aug. 20, 2001, (27) U.S. provisional patent application Ser. No. 60/317,985, filed on Sep. 6, 2001, (28) U.S. provisional patent application Ser. No. 60/3318,386, filed on Sep. 10, 2001, (29) U.S. utility patent application Ser. No. 09/969,922, filed on Oct. 3, 2001, (30) U.S. utility patent application Ser. No. 10/016,467, filed on Dec. 10, 2001, (31) U.S. provisional patent application Ser. No. 60/343,674, filed on Dec. 27, 2001; and (32) U.S. provisional patent application Ser. No. 60/346,309, filed on Jan. 7, 2002, the disclosures of which are incorporated herein by reference.

Figure 35A:
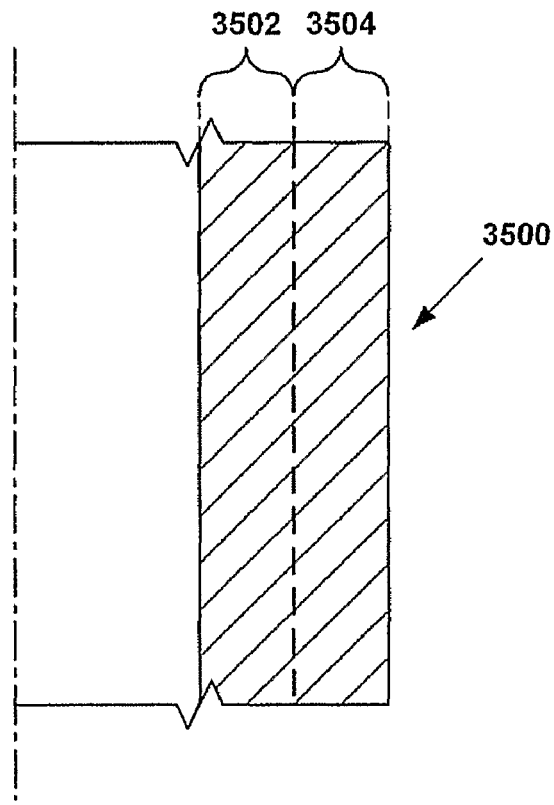
FIG. 35a is a fragmentary cross-sectional illustration of an exemplary embodiment of an expandable tubular member.

Referring to FIG. 35a an exemplary embodiment of an expandable tubular member 3500 includes a first tubular region 3502 and a second tubular portion 3504. In an exemplary embodiment, the material properties of the first and second tubular regions, 3502 and 3504, are different. In an exemplary embodiment, the yield points of the first and second tubular regions, 3502 and 3504, are different. In an exemplary embodiment, the yield point of the first tubular region 3502 is less than the yield point of the second tubular region 3504. In several exemplary embodiments, one or more of the expandable tubular members, 12, 14, 24, 26, 102, 104, 106, 108, 202 and/or 204 incorporate the tubular member 3500.

Figure 35B:
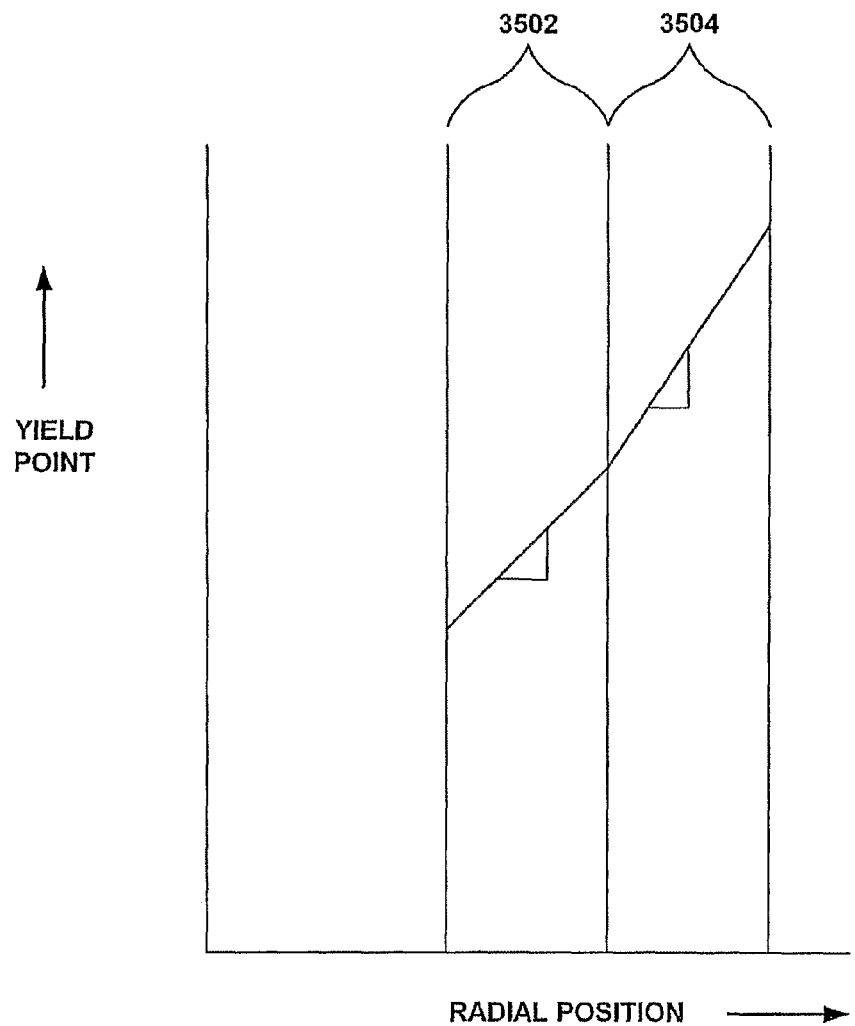

Referring to FIG. 35b, in an exemplary embodiment, the yield point within the first and second tubular regions, 3502a and 3502b, of the expandable tubular member 3502 vary as a function of the radial position within the expandable tubular member. In an exemplary embodiment, the yield point increases as a function of the radial position within the expandable tubular member 3502. In an exemplary embodiment, the relationship between the yield point and the radial position within the expandable tubular member 3502 is a linear relationship. In an exemplary embodiment, the relationship between the yield point and the radial position within the expandable tubular member 3502 is a non-linear relationship. In an exemplary embodiment, the yield point increases at different rates within the first and second tubular regions, 3502a and 3502b, as a function of the radial position within the expandable tubular member 3502. In an exemplary embodiment, the functional relationship, and value, of the yield points within the first and second tubular regions, 3502a and 3502b, of the expandable tubular member 3502 are modified by the radial expansion and plastic deformation of the expandable tubular member.

In several exemplary embodiments, one or more of the expandable tubular members, 12, 14, 24, 26, 102, 104, 106, 108, 202, 204 and/or 3502, prior to a radial expansion and plastic deformation, include a microstructure that is a combination of a hard phase, such as martensite, a soft phase, such as ferrite, and a transitionary phase, such as retained austentite. In this manner, the hard phase provides high strength, the soft phase provides ductility, and the transitionary phase transitions to a hard phase, such as martensite, during a radial expansion and plastic deformation. Furthermore, in this manner, the yield point of the tubular member increases as a result of the radial expansion and plastic deformation. Further, in this manner, the tubular member is ductile, prior to the radial expansion and plastic deformation, thereby facilitating the radial expansion and plastic deformation. In an exemplary embodiment, the composition of a dual-phase expandable tubular member includes (weight percentages): about 0.1% C, 1.2% Mn, and 0.3% Si.

Figure 36A:
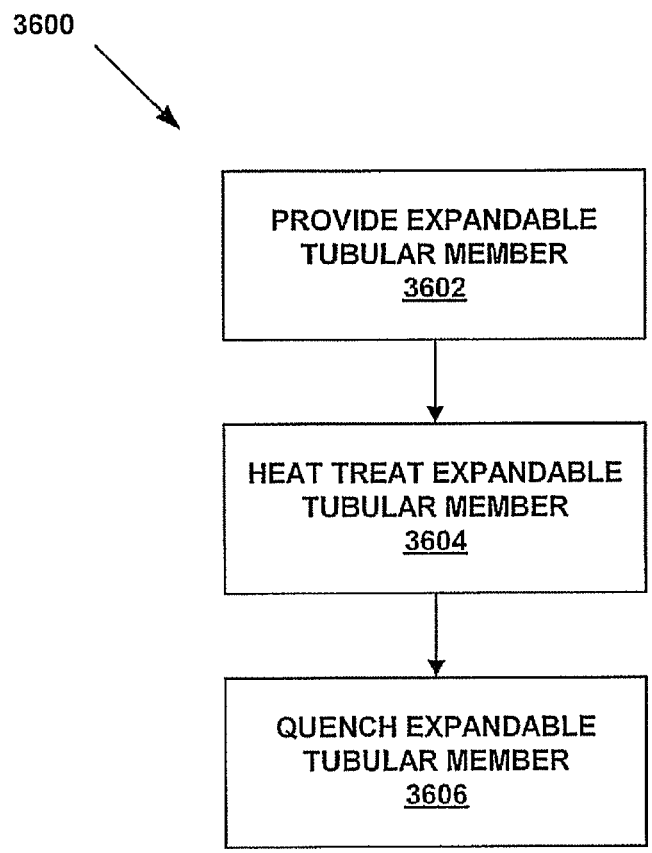
FIG. 36a is a flow chart illustration of an exemplary embodiment of a method for processing a tubular member.
Figure 36B:
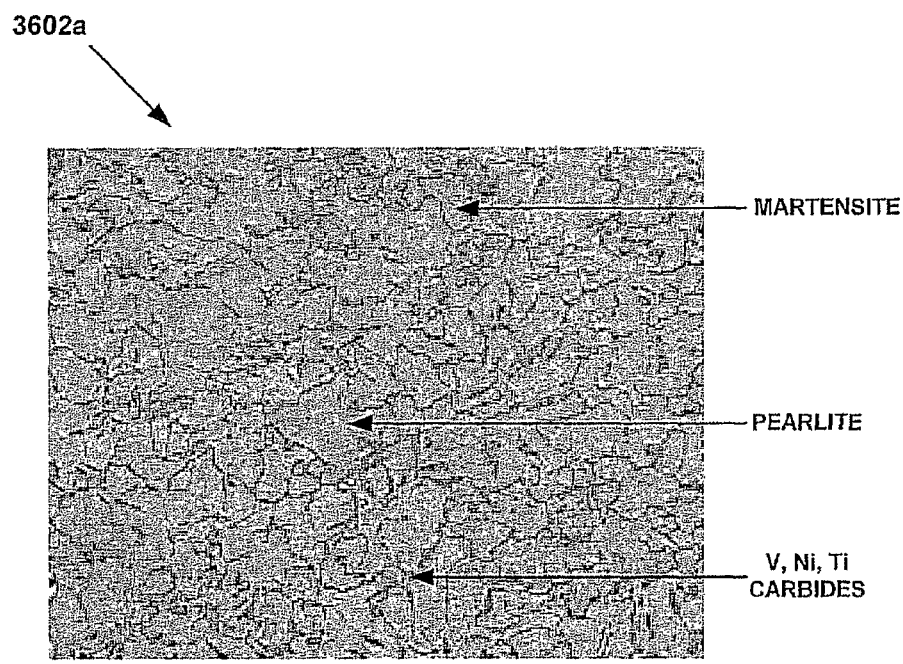
FIG. 36b is an illustration of the microstructure of an exemplary embodiment of a tubular member prior to thermal processing.
Figure 36C:
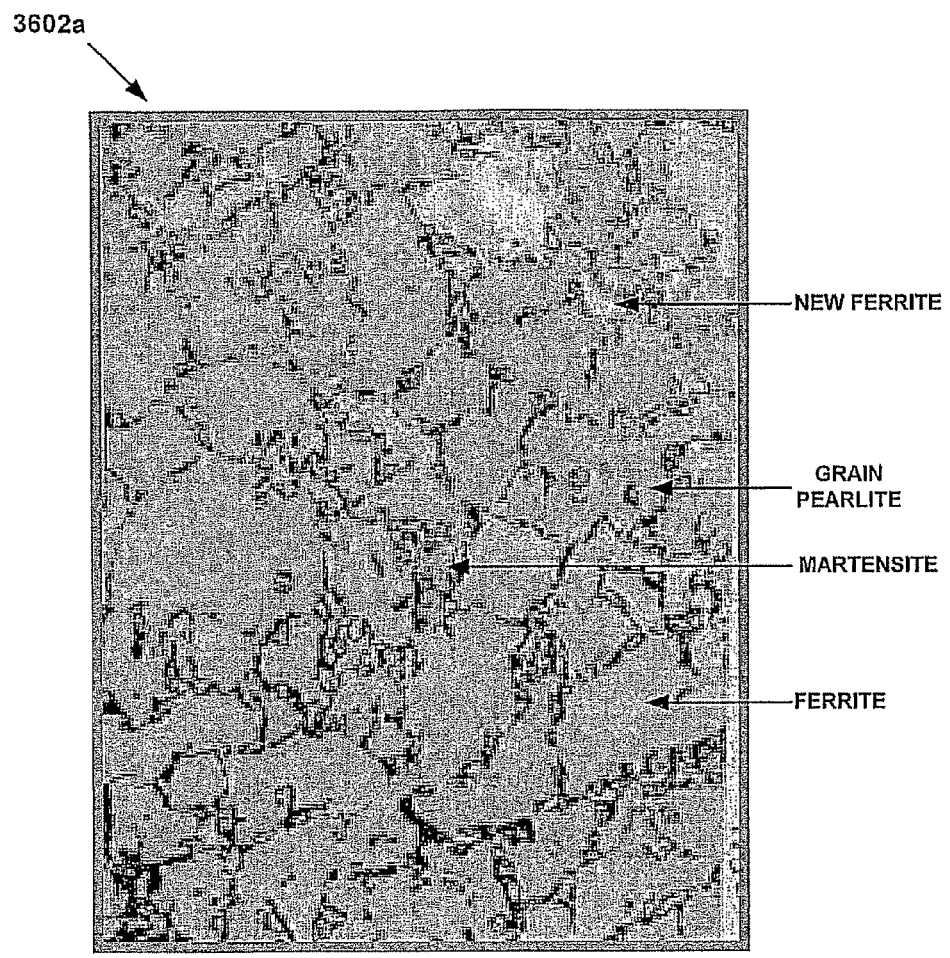
FIG. 36c is an illustration of the microstructure of an exemplary embodiment of a tubular member after thermal processing.

In an exemplary experimental embodiment, as illustrated in FIGS. 36a-36c, one or more of the expandable tubular members, 12, 14, 24, 26, 102, 104, 106, 108, 202, 204 and/or 3502 are processed in accordance with a method 3600, in which, in step 3602, an expandable tubular member 3602a is provided that is a steel alloy having following material composition (by weight percentage): 0.065% C, 1.44% Mn, 0.01% P, 0.002% S, 0.24% Si, 0.01% Cu, 0.01% Ni, 0.02% Cr, 0.05% V, 0.01% Mo, 0.01% Nb, and 0.01% Ti. In an exemplary experimental embodiment, the expandable tubular member 3602a provided in step 3602 has a yield strength of 45 ksi, and a tensile strength of 69 ksi.

In an exemplary experimental embodiment, as illustrated in FIG. 36b, in step 3602, the expandable tubular member 3602a includes a microstructure that includes martensite, pearlite, and V, Ni, and/or Ti carbides.

In an exemplary embodiment, the expandable tubular member 3602a is then heated at a temperature of 790° C. for about 10 minutes in step 3604.

In an exemplary embodiment, the expandable tubular member 3602a is then quenched in water in step 3606.

In an exemplary experimental embodiment, as illustrated in FIG. 36c, following the completion of step 3606, the expandable tubular member 3602a includes a microstructure that includes new ferrite, grain pearlite, martensite, and ferrite. In an exemplary experimental embodiment, following the completion of step 3606, the expandable tubular member 3602a has a yield strength of 67 ksi, and a tensile strength of 95 ksi.

In an exemplary embodiment, the expandable tubular member 3602a is then radially expanded and plastically deformed using one or more of the methods and apparatus described above. In an exemplary embodiment, following the radial expansion and plastic deformation of the expandable tubular member 3602a, the yield strength of the expandable tubular member is about 95 ksi.

Figure 37A:
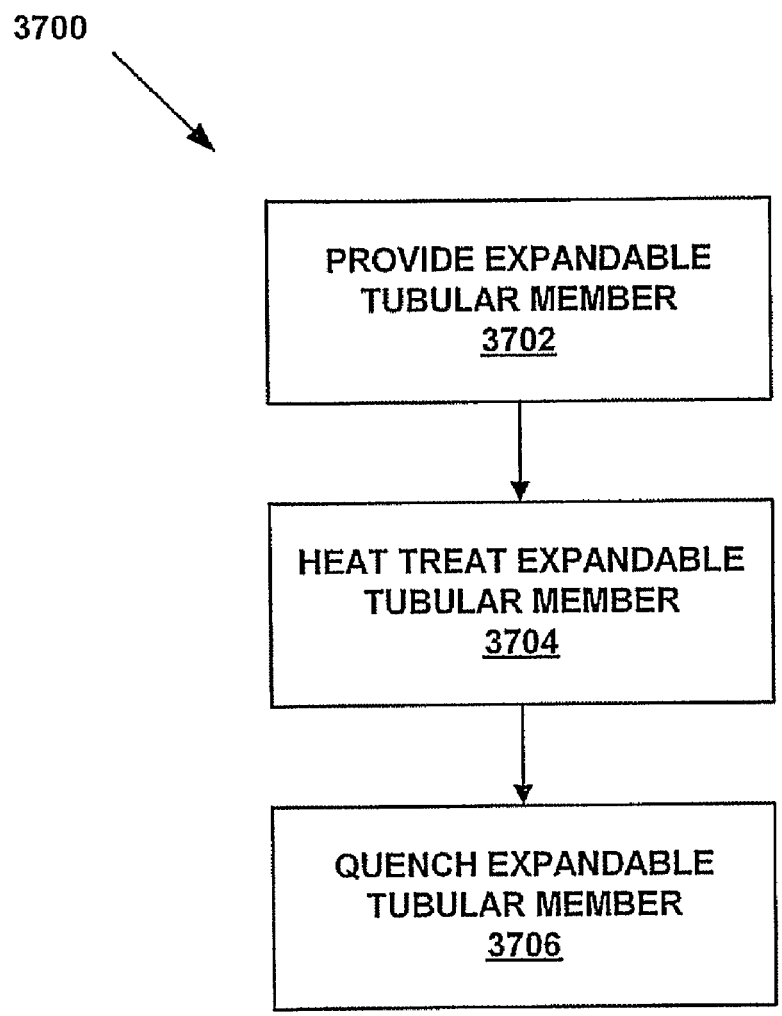
FIG. 37a is a flow chart illustration of an exemplary embodiment of a method for processing a tubular member.
Figure 37B:
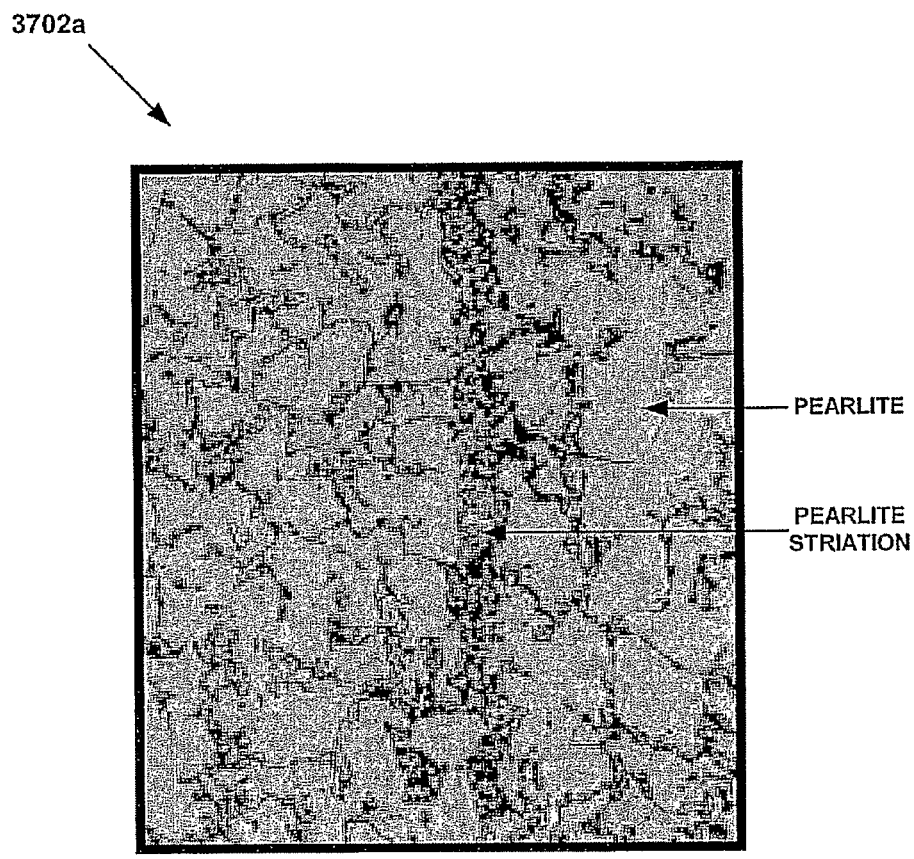
FIG. 37b is an illustration of the microstructure of an exemplary embodiment of a tubular member prior to thermal processing.
Figure 37C:
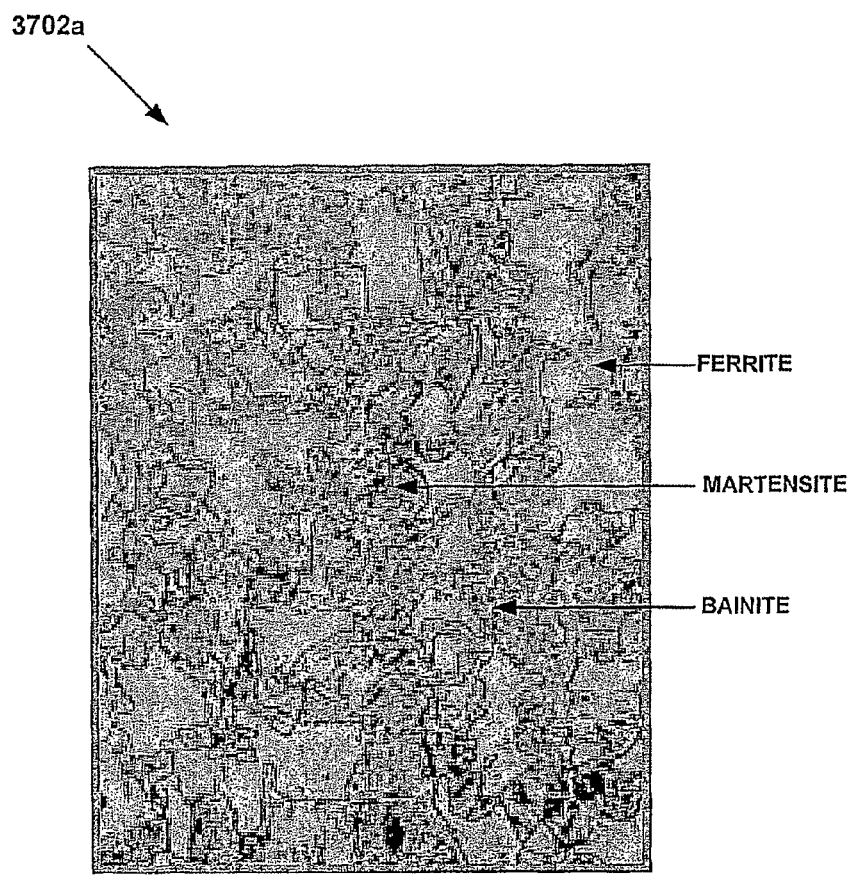
FIG. 37c is an illustration of the microstructure of an exemplary embodiment of a tubular member after thermal processing.

In an exemplary experimental embodiment, as illustrated in FIGS. 37a-37c, one or more of the expandable tubular members, 12, 14, 24, 26, 102, 104, 106, 108, 202, 204 and/or 3502 are processed in accordance with a method 3700, in which, in step 3702, an expandable tubular member 3702a is provided that is a steel alloy having following material composition (by weight percentage): 0.18% C, 1.28% Mn, 0.017% P, 0.004% S, 0.29% Si, 0.01% Cu, 0.01% Ni, 0.03% Cr, 0.04% V, 0.01% Mo, 0.03% Nb, and 0.01% Ti. In an exemplary experimental embodiment, the expandable tubular member 3702a provided in step 3702 has a yield strength of 60 ksi, and a tensile strength of 80 ksi.

In an exemplary experimental embodiment, as illustrated in FIG. 37b, in step 3702, the expandable tubular member 3702a includes a microstructure that includes pearlite and pearlite striation.

In an exemplary embodiment, the expandable tubular member 3702a is then heated at a temperature of 790° C. for about 10 minutes in step 3704.

In an exemplary embodiment, the expandable tubular member 3702a is then quenched in water in step 3706.

In an exemplary experimental embodiment, as illustrated in FIG. 37c, following the completion of step 3706, the expandable tubular member 3702a includes a microstructure that includes ferrite, martensite, and bainite. In an exemplary experimental embodiment, following the completion of step 3706, the expandable tubular member 3702a has a yield strength of 82 ksi, and a tensile strength of 130 ksi.

In an exemplary embodiment, the expandable tubular member 3702a is then radially expanded and plastically deformed using one or more of the methods and apparatus described above. In an exemplary embodiment, following the radial expansion and plastic deformation of the expandable tubular member 3702a, the yield strength of the expandable tubular member is about 130 ksi.

Figure 38A:
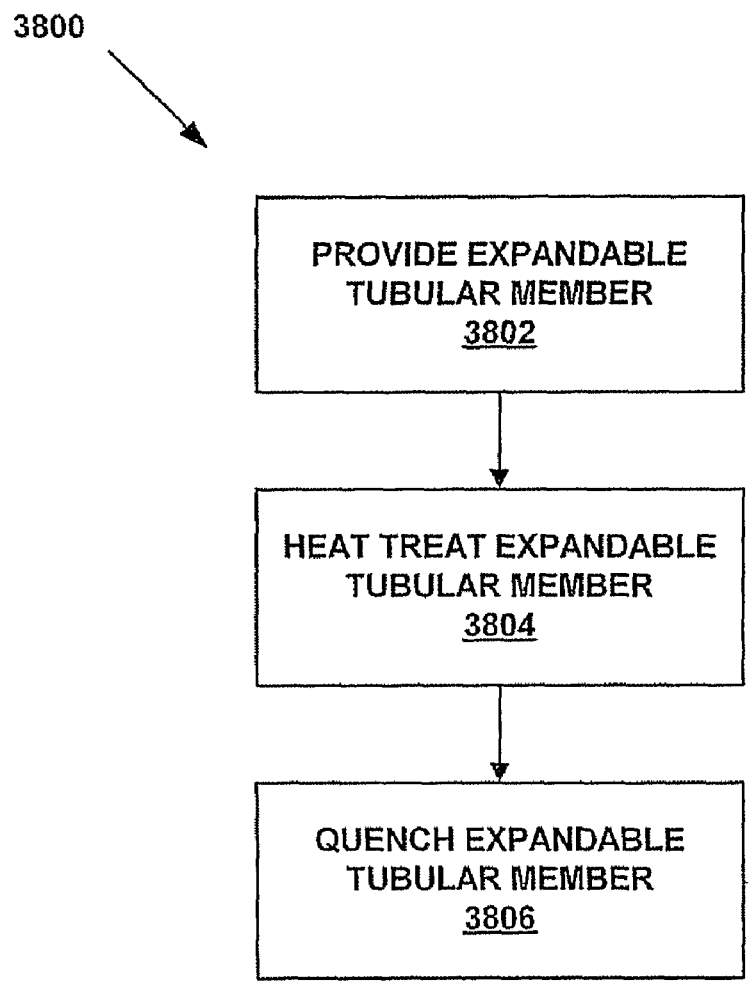
FIG. 38a is a flow chart illustration of an exemplary embodiment of a method for processing a tubular member.
Figure 38B:
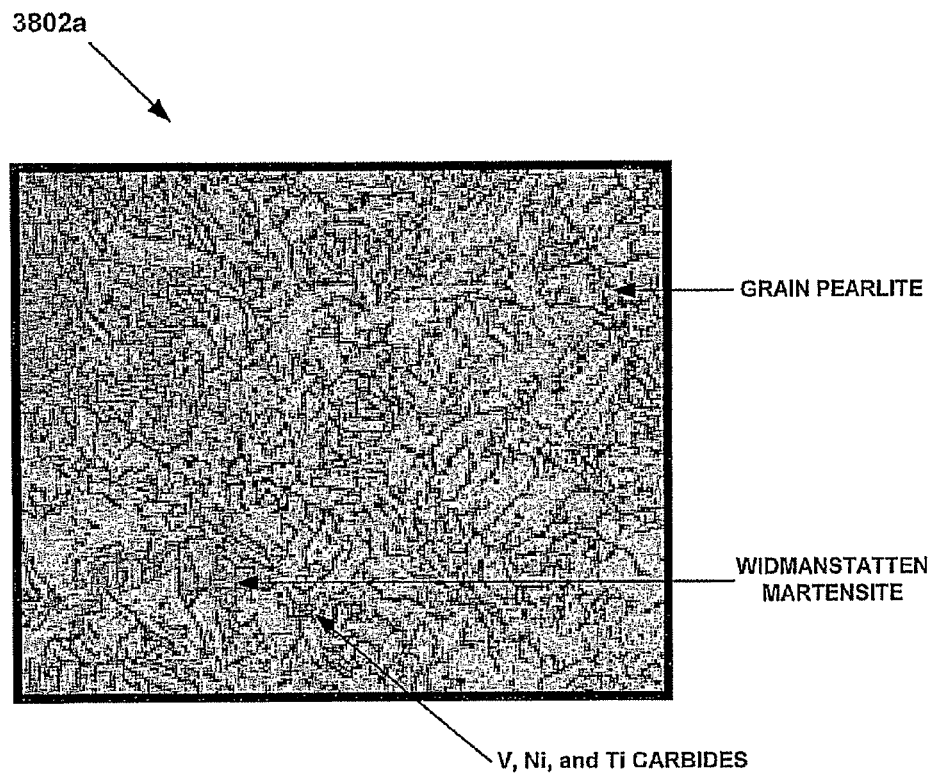
FIG. 38b is an illustration of the microstructure of an exemplary embodiment of a tubular member prior to thermal processing.
Figure 38C:
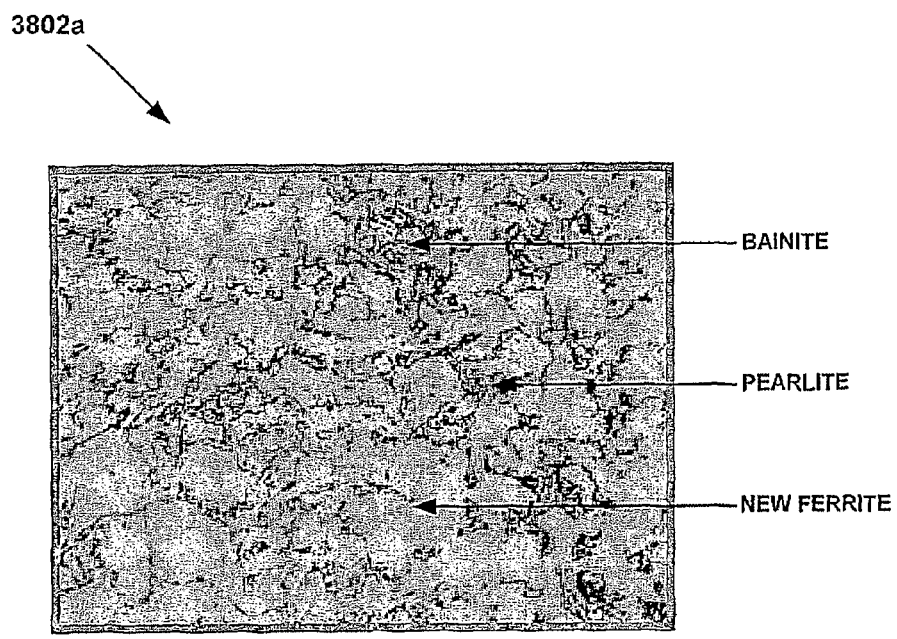
FIG. 38c is an illustration of the microstructure of an exemplary embodiment of a tubular member after thermal processing.

In an exemplary experimental embodiment, as illustrated in FIGS. 38a-38c, one or more of the expandable tubular members, 12, 14, 24, 26, 102, 104, 106, 108, 202, 204 and/or 3502 are processed in accordance with a method 3800, in which, in step 3802, an expandable tubular member 3802a is provided that is a steel alloy having following material composition (by weight percentage): 0.08% C, 0.82% Mn, 0.006% P, 0.003% S, 0.30% Si, 0.06% Cu, 0.05% Ni, 0.05% Cr, 0.03% V, 0.03% Mo, 0.01% Nb, and 0.01% Ti. In an exemplary experimental embodiment, the expandable tubular member 3802a provided in step 3802 has a yield strength of 56 ksi, and a tensile strength of 75 ksi.

In an exemplary experimental embodiment, as illustrated in FIG. 38b, in step 3802, the expandable tubular member 3802a includes a microstructure that includes grain pearlite, widmanstatten martensite and carbides of V, Ni, and/or Ti.

In an exemplary embodiment, the expandable tubular member 3802a is then heated at a temperature of 790° C. for about 10 minutes in step 3804.

In an exemplary embodiment, the expandable tubular member 3802a is then quenched in water in step 3806.

In an exemplary experimental embodiment, as illustrated in FIG. 38c, following the completion of step 3806, the expandable tubular member 3802a includes a microstructure that includes bainite, pearlite, and new ferrite. In an exemplary experimental embodiment, following the completion of step 3806, the expandable tubular member 3802a has a yield strength of 60 ksi, and a tensile strength of 97 ksi.

In an exemplary embodiment, the expandable tubular member 3802a is then radially expanded and plastically deformed using one or more of the methods and apparatus described above. In an exemplary embodiment, following the radial expansion and plastic deformation of the expandable tubular member 3802a, the yield strength of the expandable tubular member is about 97 ksi.

Figure 39:
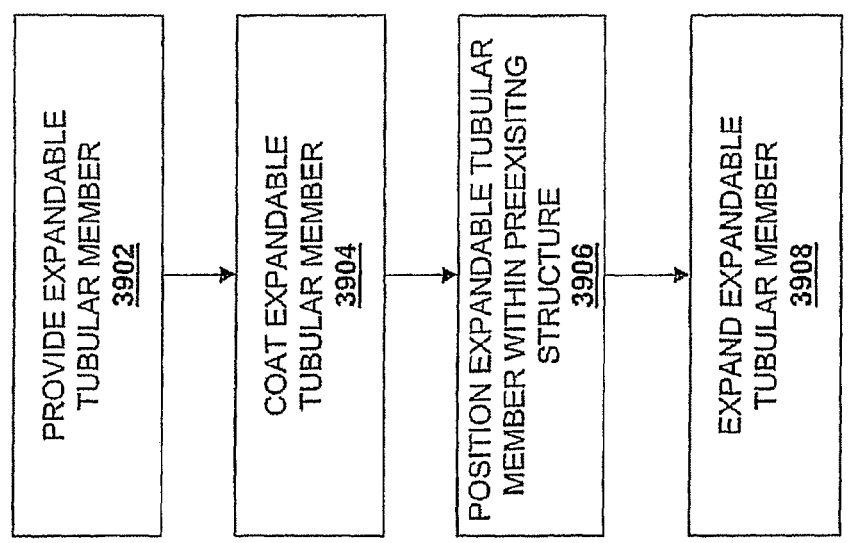
FIG. 39 is a schematic view illustrating an exemplary embodiment of a method for increasing the collapse strength of a tubular assembly.
Figure 40:
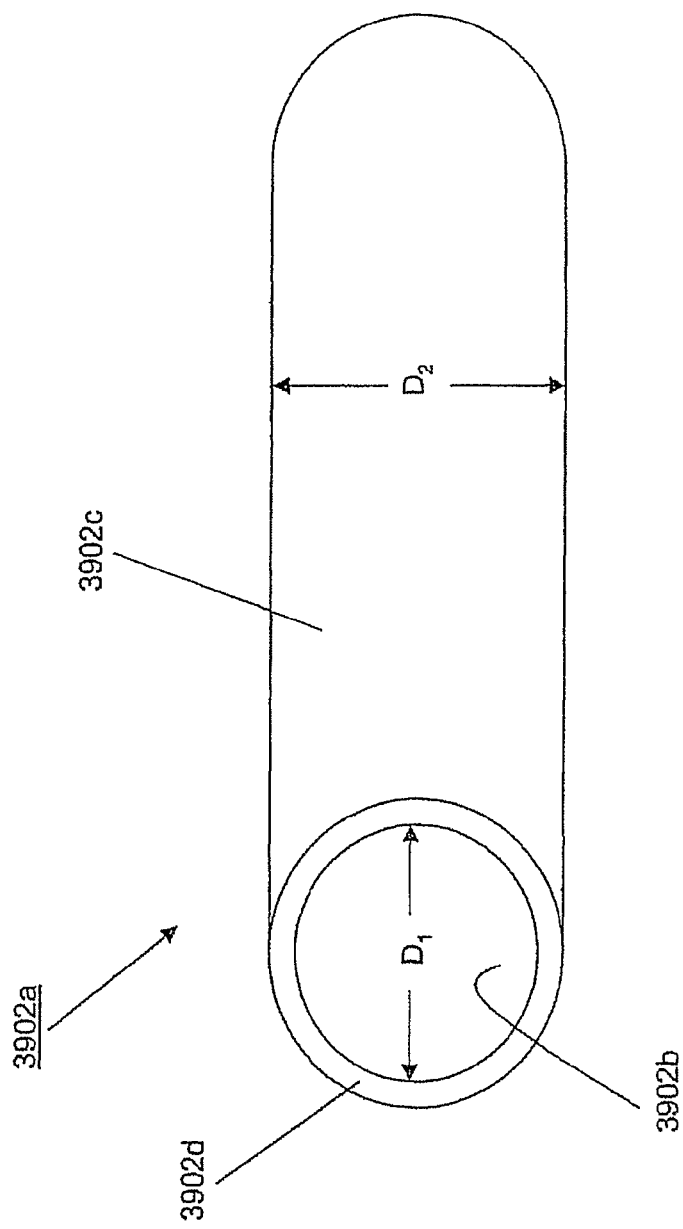
FIG. 40 is a perspective view illustrating an exemplary embodiment of an expandable tubular member used in the method of FIG. 39.

In an exemplary embodiment, as illustrated in FIGS. 39 and 40, a method 3900 for increasing the collapse strength of a tubular assembly begins with step 3902 in which an expandable tubular member 3902a is provided. The expandable tubular member 3902a includes an inner surface 3902b having an inner diameter $D_1$, an outer surface 3902c having an outer diameter $D_2$, and a wall thickness 3902d. In an exemplary embodiment, expandable tubular member 3902a may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the expandable tubular member 3902a may be, for example, the tubular assembly 10, 22, 100, or 200.

Figure 41A:
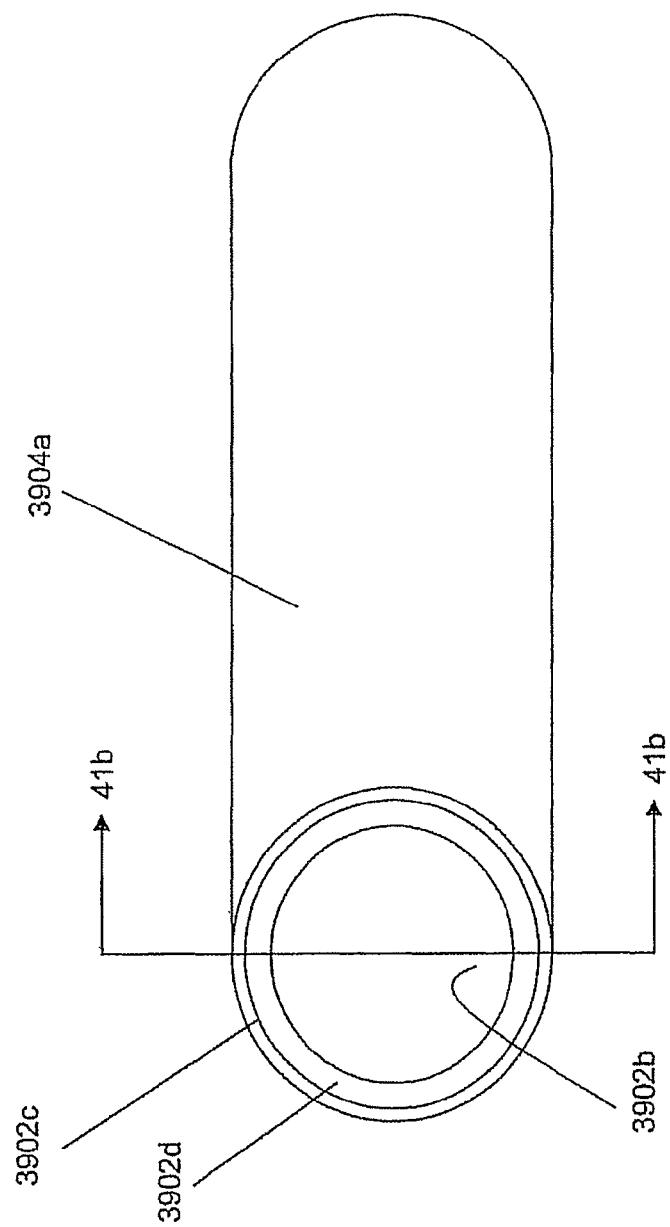
FIG. 41a is a perspective view illustrating an exemplary embodiment of the expandable tubular member of FIG. 40 coated with a layer of material according to the method of FIG. 39.
Figure 41B:
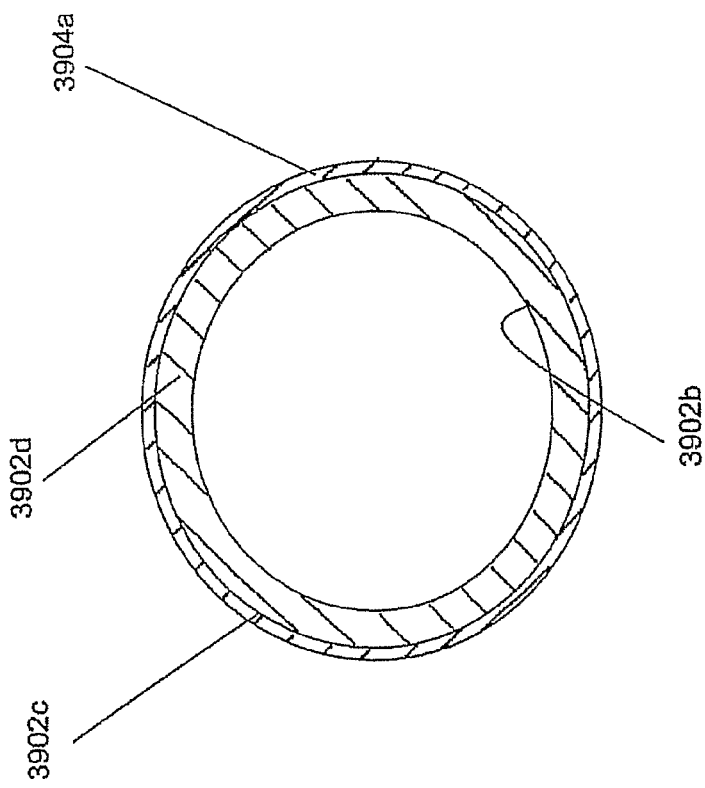
FIG. 41b is a cross sectional view taken along line 41b in FIG. 41a illustrating an exemplary embodiment of the expandable tubular member of FIG. 40 coated with a layer of material according to the method of FIG. 39.

Referring now to FIGS. 39, 41a, 41b, 41c and 41d, the method 3900 continues at step 3904 in which the expandable tubular member 3902a is coated with a layer 3904a of material. In an exemplary embodiment, the layer 3904a of material includes a plastic such as, for example, a PVC plastic 3904aa as illustrated in FIG. 41c, and/or a soft metal such as, for example, aluminum 3904ab as illustrated in FIG. 41d, an aluminum/zinc combination, or equivalent metals known in the art, and/or a composite material such as, for example, a carbon fiber material, and substantially covers the outer surface 3902c of expandable tubular member 3902a. In an exemplary embodiment, the layer 3904a of material is applied using conventional methods such as, for example, spray coating, vapor deposition, adhering layers of material to the surface, or a variety of other coating methods known in the art. In an exemplary embodiment, soft metals include metals having a lower yield strength than the expandable tubular member 3902a.

Figure 42:
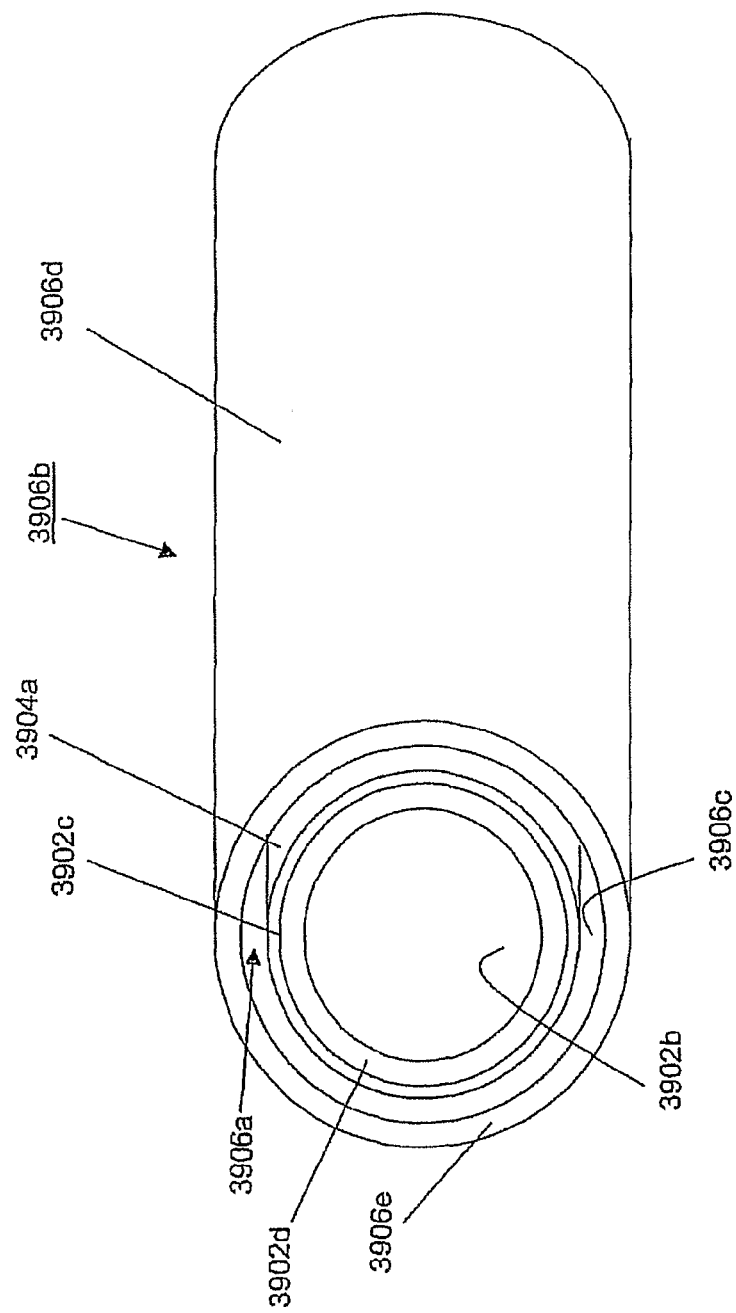
FIG. 42 is a perspective view illustrating an exemplary embodiment of the expandable tubular member and layer of FIG. 41a positioned within a preexisting structure according to the method of FIG. 39.

Referring now to FIGS. 39, 40 and 42, the method 3900 continues at step 3906 in which the expandable tubular member 3902a is positioned within a passage 3906a defined by a preexisting structure 3906b which includes an inner surface 3906c, an outer surface 3906d, and a wall thickness 3906e. In an exemplary embodiment, the preexisting structure 3906b may be, for example, the wellbores 16, 110, or 206. In an exemplary embodiment, the preexisting structure 3906b may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, preexisting structure 3906b may be, for example, the tubular assembly 10, 22, 100, or 200. In an exemplary embodiment, the cross sections of expandable tubular member 3902a and preexisting structure 3906b are substantially concentric when the expandable tubular member 3902a is positioned in the passage 3906a defined by preexisting structure 3906b.

Figure 43:
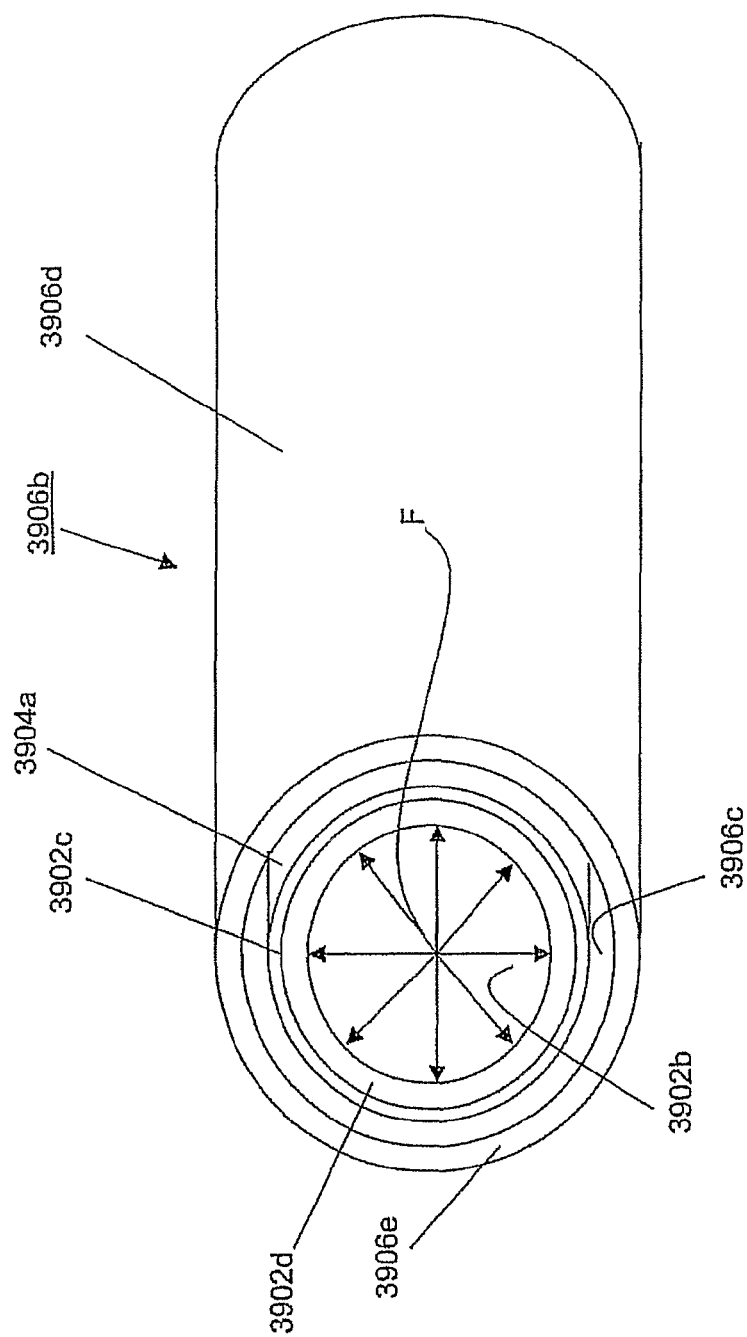
FIG. 43 is a perspective view illustrating an exemplary embodiment of the expandable tubular member and layer within the preexisting structure of FIG. 42 with the expandable tubular member being expanded according to the method of FIG. 39.
Figure 44:
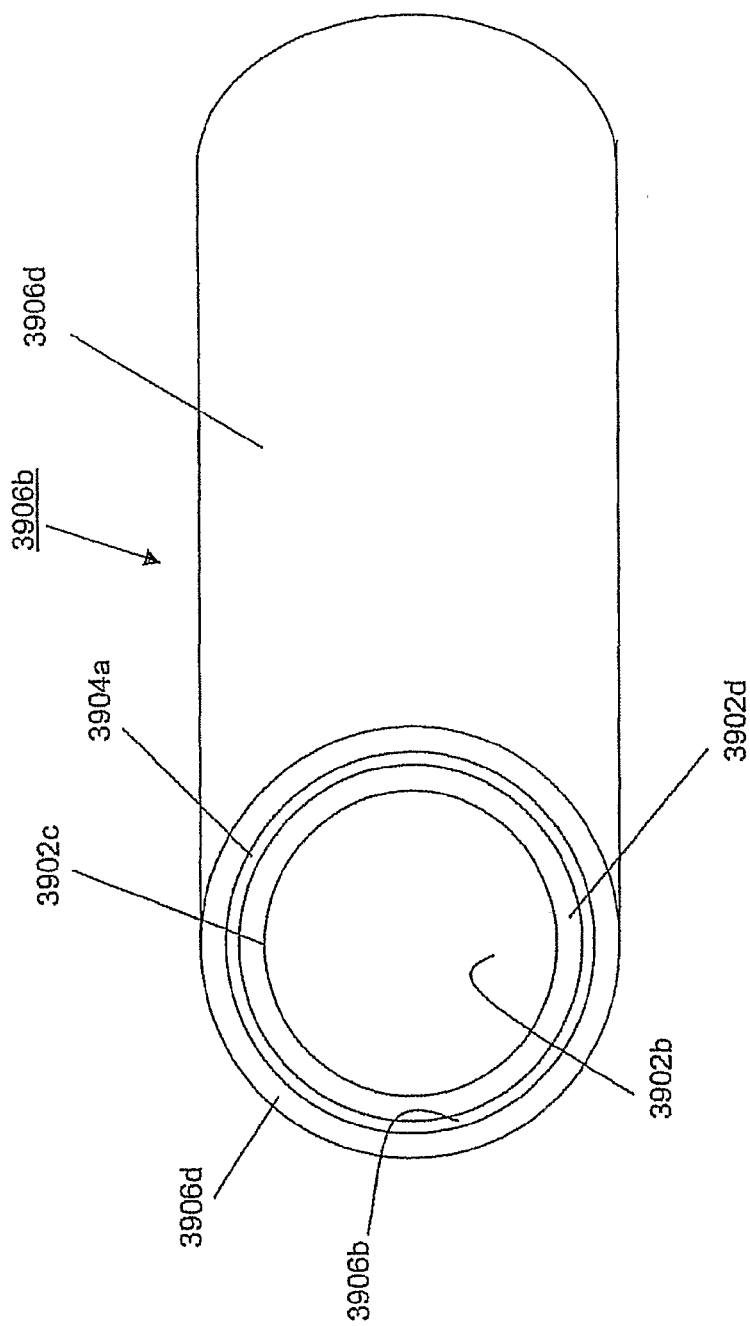
FIG. 44 is a perspective view illustrating an exemplary embodiment of the expandable tubular member and layer within the preexisting structure of FIG. 42 with the expandable tubular member expanded according to the method of FIG. 39.

Referring now to FIGS. 39, 43, and 44a, the method continues at step 3908 in which the expandable tubular member 3902a is radially expanded and plastically deformed. In an exemplary embodiment, a force F is applied radially towards the inner surface 3902b of expandable tubular member 3902a, the force F being sufficient to radially expand and plastically deform the expandable tubular member 3902a and the accompanying layer 3904a on its outer surface 3902c. The force F increases the inner diameter $D_1$ and the outer diameter $D_2$ of expandable tubular member 3902a until the layer 3904a engages the inner surface 3906c of preexisting structure 3906b and forms an interstitial layer between the expandable tubular member 3902a and the preexisting structure 3906b. In several exemplary embodiments, the expandable tubular member 3902a is radially expanded and plastically deformed using one or more conventional commercially available devices and/or using one or more of the methods disclosed in the present application.

In an exemplary embodiment, following step 3908 of method 3900, the layer 3904a forms an interstitial layer filling some or all of the annulus between the expandable tubular member 3902a and the preexisting structure 3906b. In an exemplary embodiment, the interstitial layer formed from the layer 3904a between the expandable tubular member 3902a and the preexisting structure 3906b results in the combination of expandable tubular member 3902a, the layer 3904a, and the preexisting structure 3906b exhibiting a higher collapse strength than would be exhibited without the interstitial layer. In an exemplary embodiment, the radial expansion and plastic deformation of expandable tubular member 3902a with layer 3904a into engagement with preexisting structure 3906b results in a modification of the residual stresses in one or both of the expandable tubular member 3902a and the preexisting structure 3906b. In an exemplary embodiment, the radial expansion and plastic deformation of expandable tubular member 3902a with layer 3904a into engagement with preexisting structure 3906b places at least a portion of the wall thickness of preexisting structure 3906b in circumferential tension.

Figure 45:
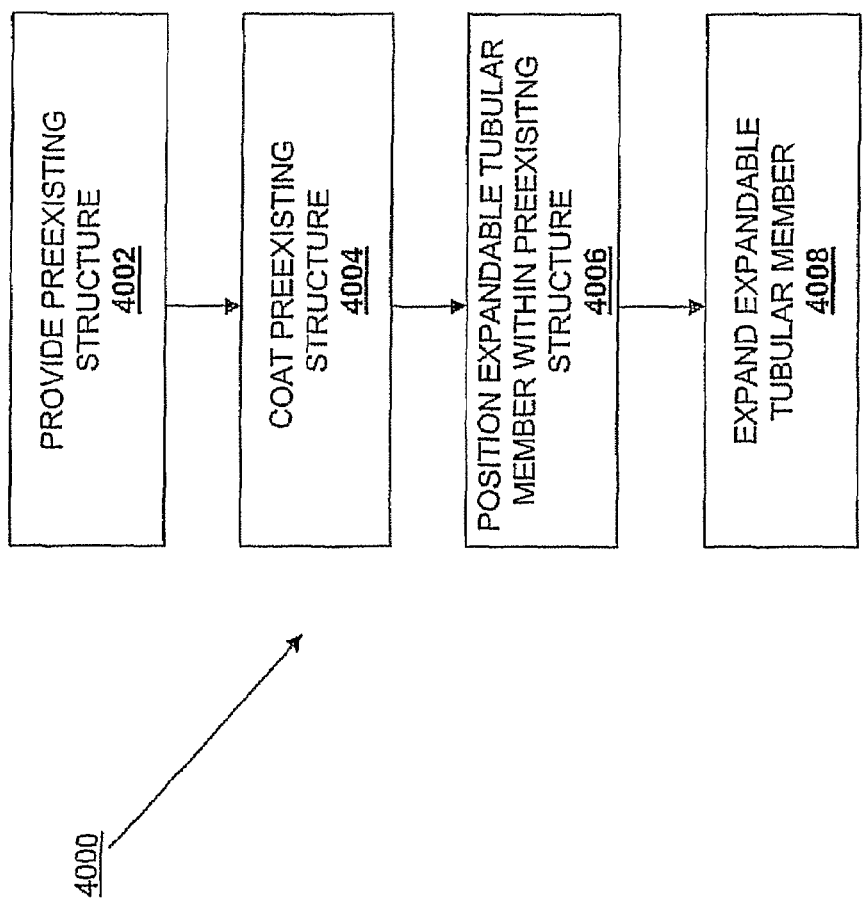
FIG. 45 is a schematic view illustrating an exemplary embodiment of a method for increasing the collapse strength of a tubular assembly.
Figure 46:
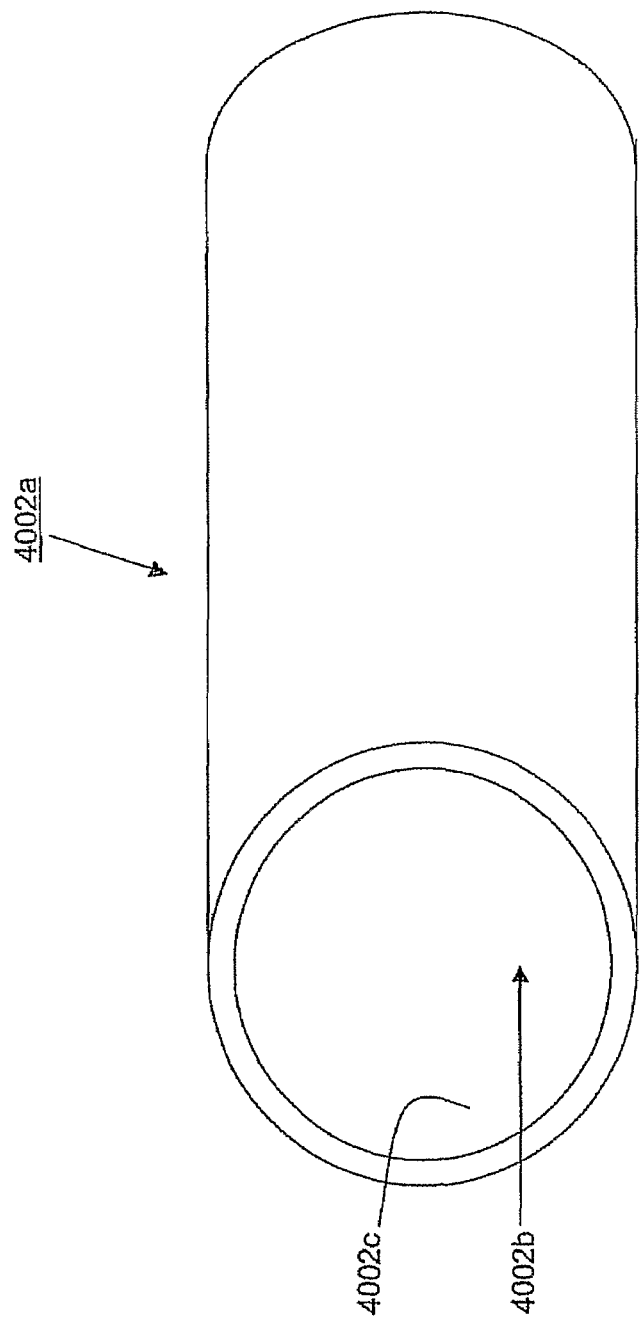
FIG. 46 is a perspective view illustrating an exemplary embodiment of a preexisting structure used in the method of FIG. 45.

In an alternative embodiment, as illustrated in FIGS. 45 and 46, a method 4000 for increasing the collapse strength of a tubular assembly begins with step 4002 in which a preexisting structure 4002a is provided. The preexisting structure 4002a defines a substantially cylindrical passage 4002b and includes an inner surface 4002c. In an exemplary embodiment, the preexisting structure 4002a may be, for example, the wellbores 16, 110, or 206. In an exemplary embodiment, the preexisting structure 4002a may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the preexisting structure 4002a may be, for example, the tubular assembly 10, 22, 100, or 200.

Figure 47A:
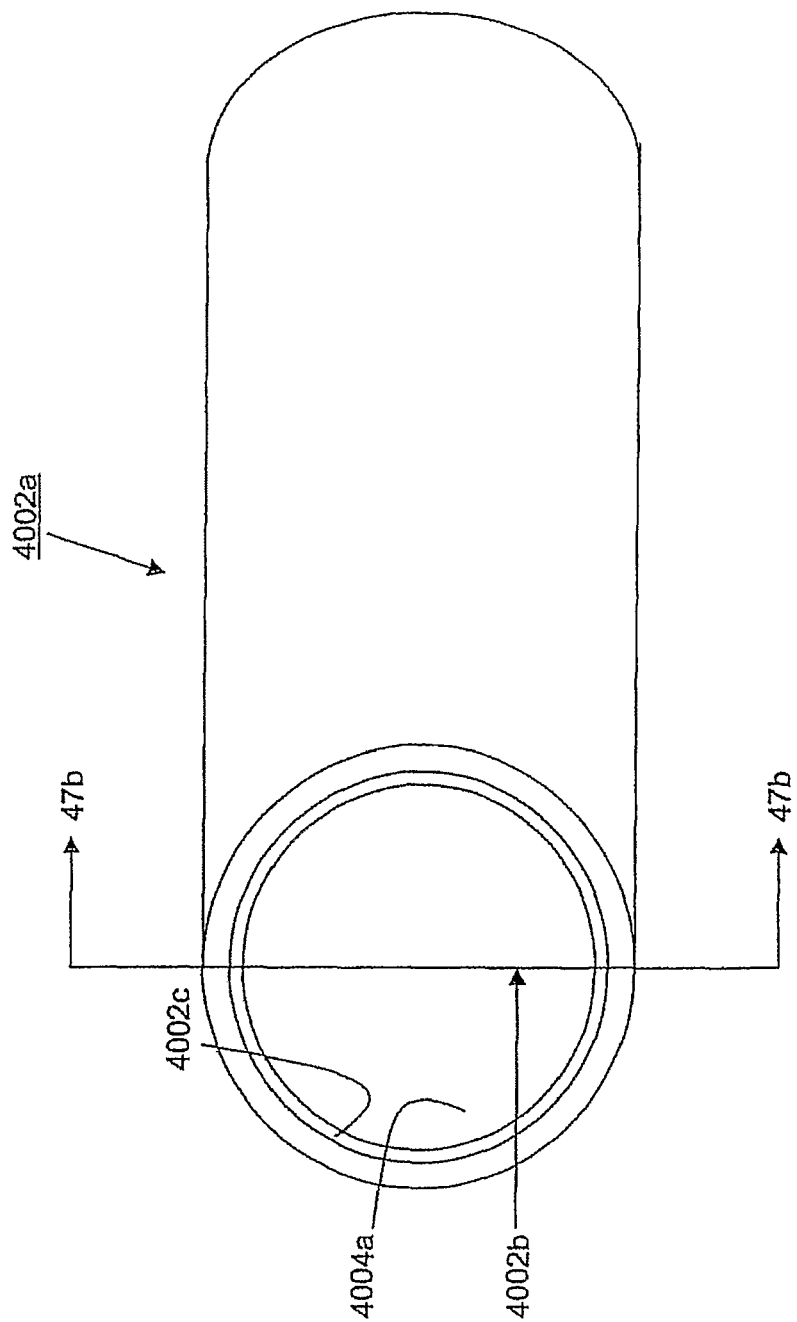
FIG. 47a is a perspective view illustrating an exemplary embodiment of the preexisting structure of FIG. 46 being coated with a layer of material according to the method of FIG. 45.
Figure 47B:
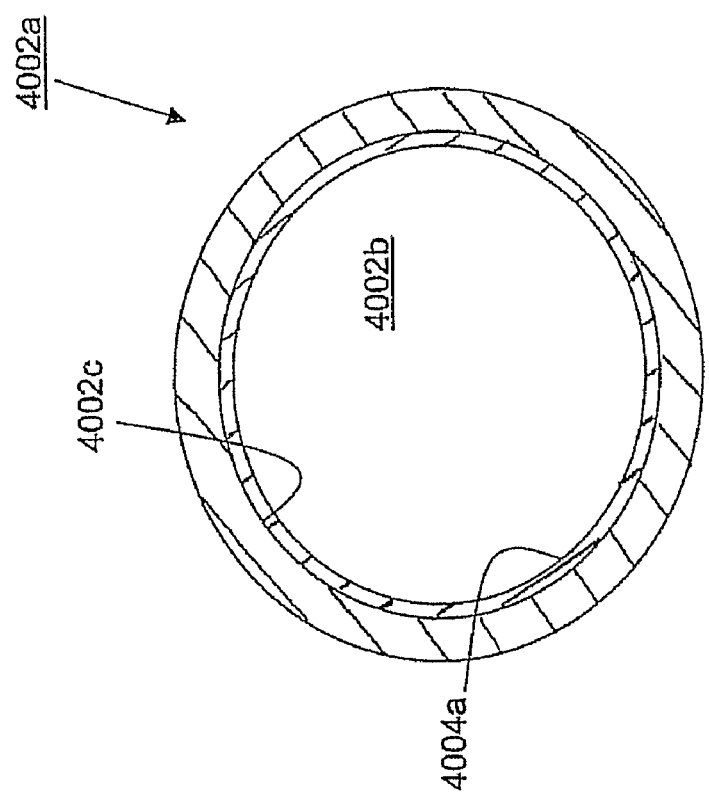
FIG. 47b is a cross sectional view taken along line 47b in FIG. 47a illustrating an exemplary embodiment of the preexisting structure of FIG. 46 coated with a layer of material according to the method of FIG. 45.

Referring now to FIGS. 45, 47a and 47b, the method 4000 continues at step 4004 in which the inner surface 4002c in passage 4002b of preexisting structure 4002a is coated with a layer 4004a of material. In an exemplary embodiment, the layer 3904a of material includes a plastic, and/or a soft metal such as, for example, aluminum, aluminum and zinc, or equivalent metals known in the art, and/or a composite material such as, for example, carbon fiber, and substantially covers the inner surface 4002c of preexisting structure 4002a. In an exemplary embodiment, the layer 3904a of material is applied using conventional methods such as, for example, spray coating, vapor deposition, adhering layers of material to the surface, or a variety of other coating methods known in the art. In an exemplary embodiment, soft metals include metals having a lower yield strength than the preexisting structure 4002a.

Figure 48:
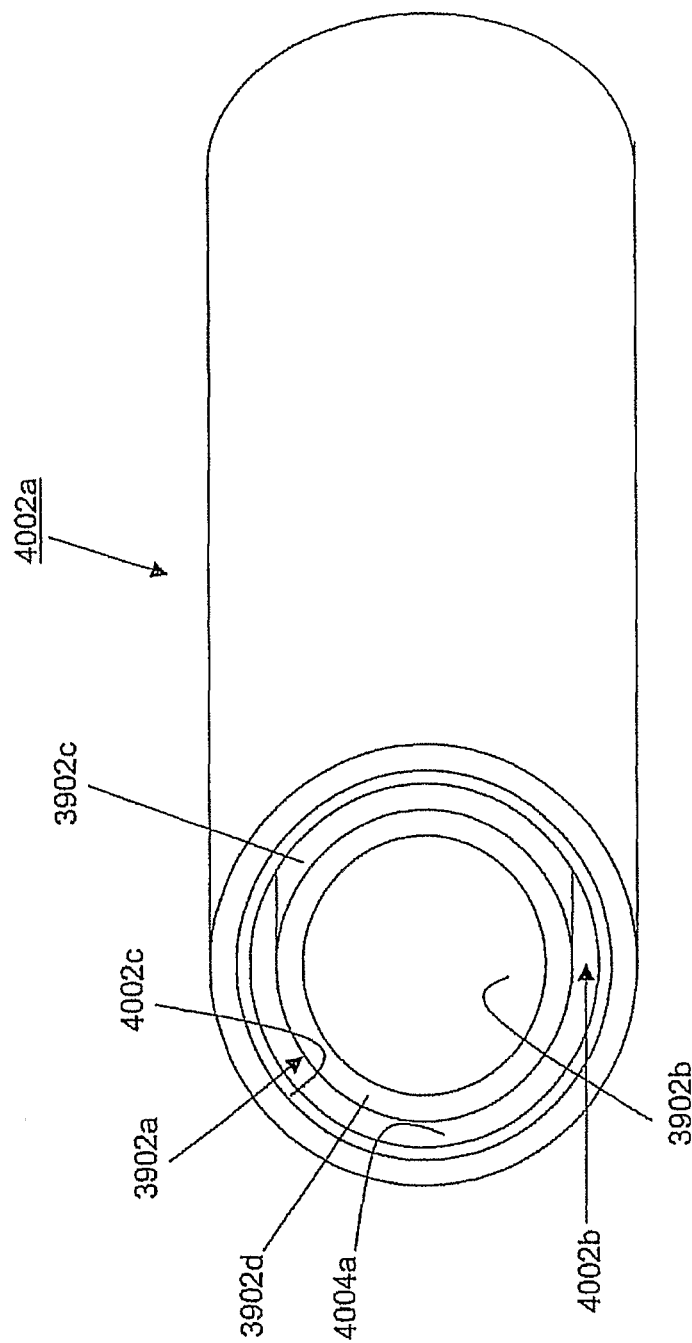
FIG. 48 is a perspective view illustrating an exemplary embodiment of an expandable tubular member positioned within the preexisting structure and layer of material of FIG. 47a according to the method of FIG. 45.

Referring now to FIGS. 40, 45 and 48, the method 4000 continues at step 4006 in which expandable tubular member 3902a including inner surface 3902b, outer surface 3902c, and wall thickness 3902d, is positioned within passage 4002b defined by preexisting structure 4002a. In an exemplary embodiment, the cross sections of expandable tubular member 3902a and preexisting structure 4002a are substantially concentric when the expandable tubular member 3902a is positioned in the passage 4002b defined by preexisting structure 4002a.

Figure 49:
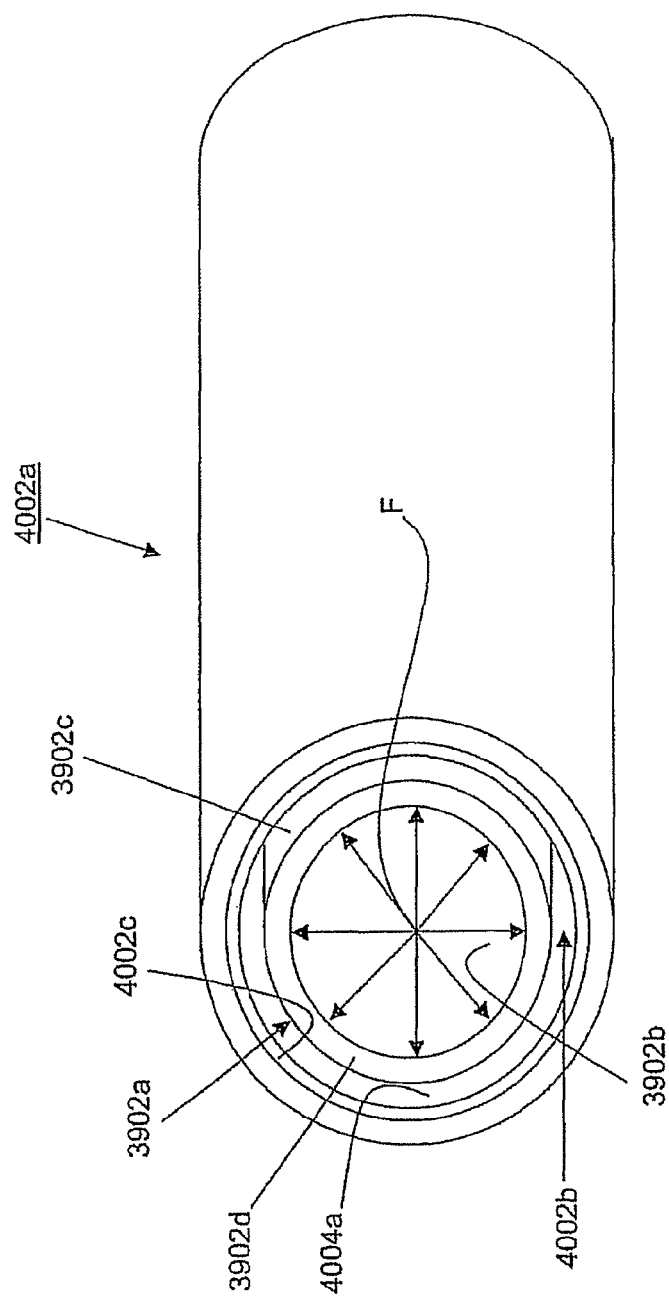
FIG. 49 is a perspective view illustrating an exemplary embodiment of the expandable tubular member within the preexisting structure and layer of FIG. 48 with the expandable tubular member being expanded according to the method of FIG. 45.
Figure 50:
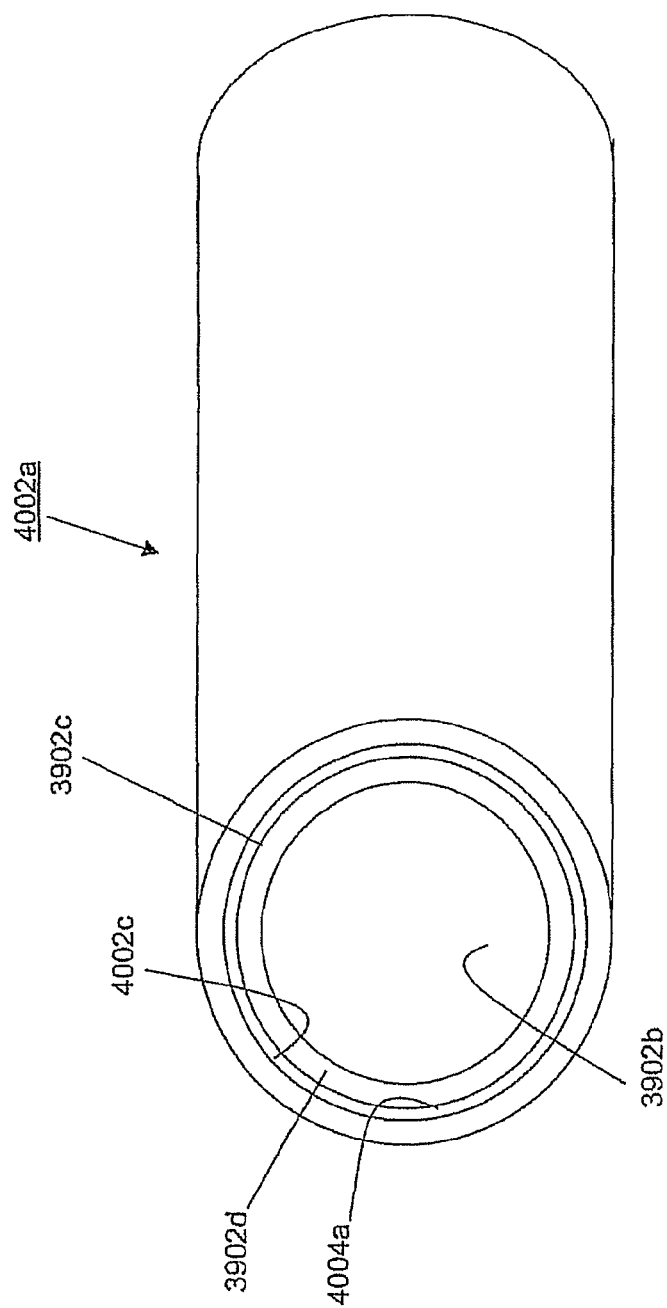
FIG. 50 is a perspective view illustrating an exemplary embodiment of the expandable tubular member within the preexisting structure and layer of FIG. 48 with the expandable tubular member expanded according to the method of FIG. 45.

Referring now to FIGS. 45, 49, and 50, the method 4000 continues at step 4008 in which the expandable tubular member 3902a is radially expanded and plastically deformed. In an exemplary embodiment, a force F is applied radially towards the inner surface 3902b of expandable tubular member 3902a, the force F being sufficient to radially expand and plastically deform the expandable tubular member 3902a. The force F increases the inner diameter $D_1$ and the outer diameter $D_2$ of expandable tubular member 3902a until the outer surface 3902c of expandable tubular member 3902a engages layer 4004a on preexisting structure 4002a and forms an interstitial layer between the expandable tubular member 3902a and the preexisting structure 4002a. In several exemplary embodiments, the expandable tubular member 3902a is radially expanded and plastically deformed using one or more conventional commercially available devices and/or using one or more of the methods disclosed in the present application.

In an exemplary embodiment, following step 4008 of method 4000, the layer 4004a forms an interstitial layer filling some or all of the annulus between the expandable tubular member 3902a and the preexisting structure 4002a. In an exemplary embodiment, the interstitial layer formed from the layer 4004a between the expandable tubular member 3902a and the preexisting structure 4002a results in the combination of the expandable tubular member 3902a, the layer 3904a, and the preexisting structure 4002a exhibiting a higher collapse strength than would be exhibited without the interstitial layer. In an exemplary embodiment, the radial expansion and plastic deformation of expandable tubular member 3902a into engagement with preexisting structure 4002a with layer 4004a results in a modification of the residual stresses in one or both of the expandable tubular member 3902a and the preexisting structure 4002a. In an exemplary embodiment, the radial expansion and plastic deformation of expandable tubular member 3902a with layer 4004a into engagement with preexisting structure 4002a places at least a portion of the wall thickness of the preexisting structure 4002a in circumferential tension.

Figure 51A:
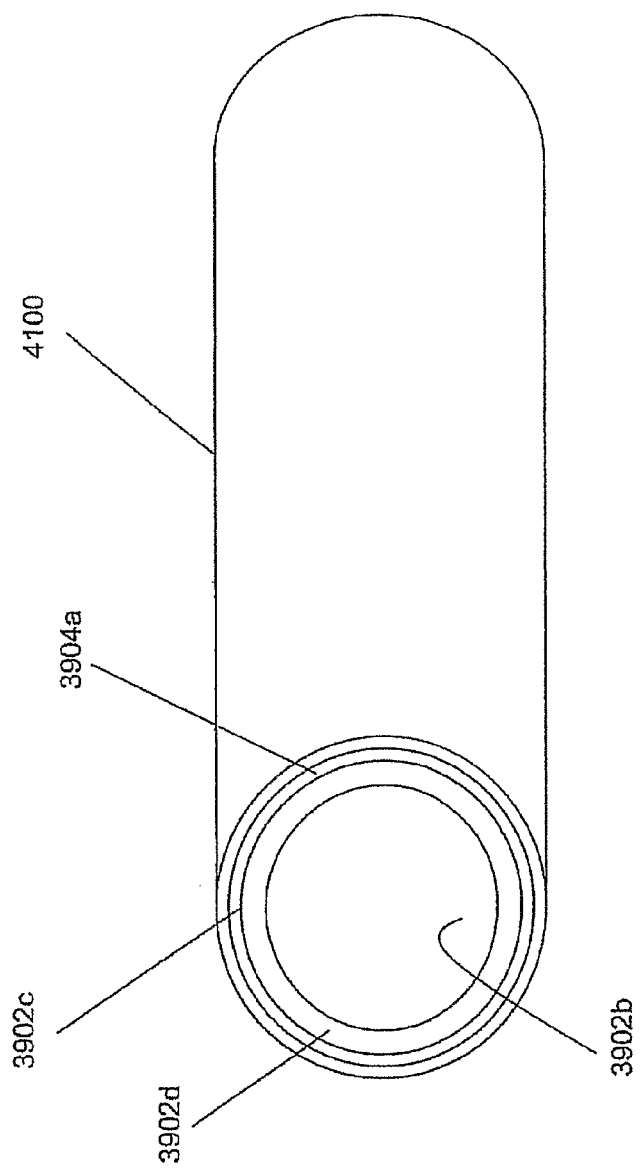
FIG. 51a is a perspective view illustrating an exemplary embodiment of the expandable tubular member of FIG. 40 coated with multiple layers of material according to the method of FIG. 39.

In an alternative embodiment, as illustrated in FIG. 51a, step 3904 of method 3900 may include coating multiple layers of material such as, for example, layers 3904a and 4100, on tubular member 3902a, illustrated in FIG. 40. In an exemplary embodiment, the layers 3904a and/or 4100 may be applied using conventional methods such as, for example, spray coating, vapor deposition, adhering layers of material to the surface, or a variety of other coating methods known in the art.

Figure 51B:
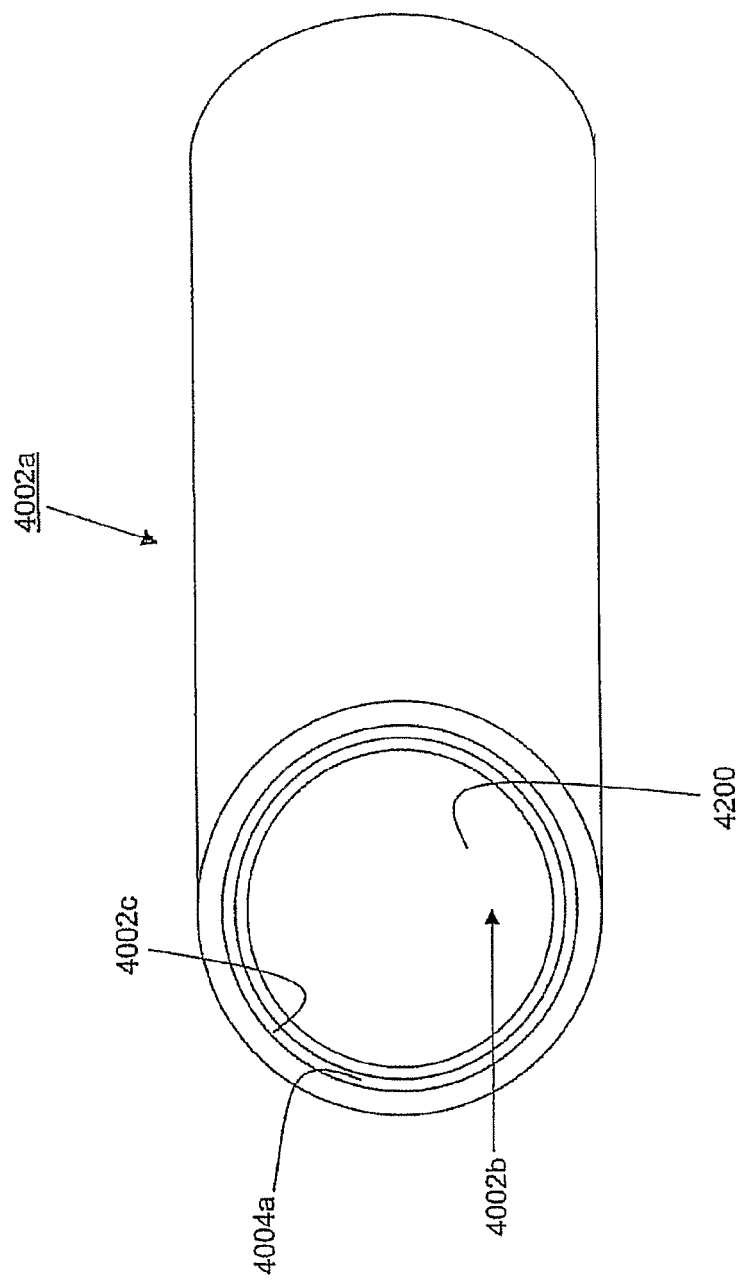
FIG. 51b is a perspective view illustrating an exemplary embodiment of the preexisting structure of FIG. 46 coated with multiple layers of material according to the method of FIG. 39.

In an alternative embodiment, as illustrated in FIG. 51b, step 4004 of method 4000 may include coating multiple layers of material such as, for example, layers 4002c and 4200, on tubular member 4002a. In an exemplary embodiment, the layers 4002c and 4200 may be applied using conventional methods such as, for example, spray coating, vapor deposition, adhering layers of material to the surface, or a variety of other coating methods known in the art.

In an exemplary embodiment, steps 3904 of method 3900 and step 4004 of method 4000 may include coating the expandable tubular member 3902a with a layer 3904a of varying thickness. In an exemplary embodiment, step 3904 of method 3900 may include coating the expandable tubular member 3902a with a non uniform layer 3904a which, for example, may include exposing portions of the outer surface 3902c of expandable tubular member 3902a. In an exemplary embodiment, step 4004 of method 4000 may include coating the preexisting structure 4002a with a non uniform layer 4004a which, for example, may include exposing portions of the inner surface 4002c of preexisting structure 4002a.

Figure 52A:
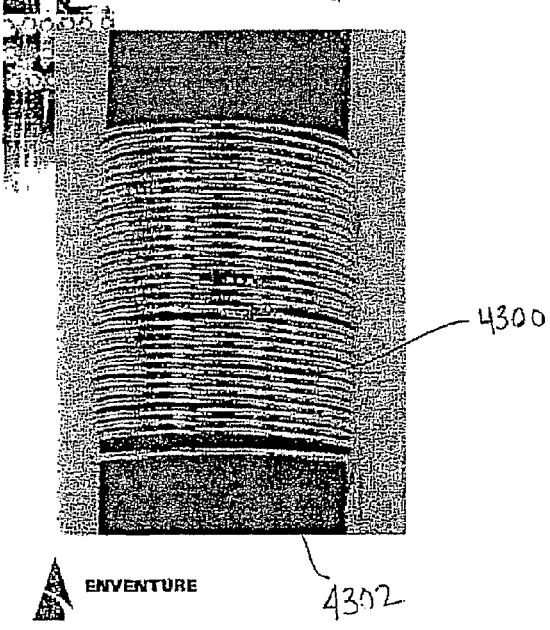
FIG. 52a is a perspective view illustrating an exemplary embodiment of the expandable tubular member of FIG. 40 coated by winding a wire around its circumference according to the method of FIG. 39.
Figure 52B:
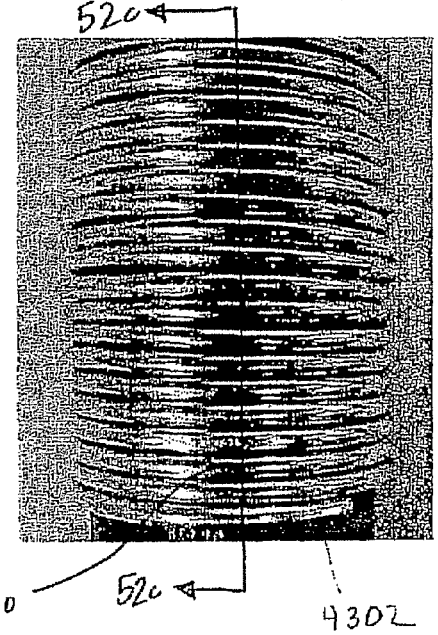
FIG. 52b is a perspective view illustrating an exemplary embodiment of the expandable tubular member of FIG. 40 coated by winding wire around its circumference according to the method of FIG. 39.
Figure 52C:
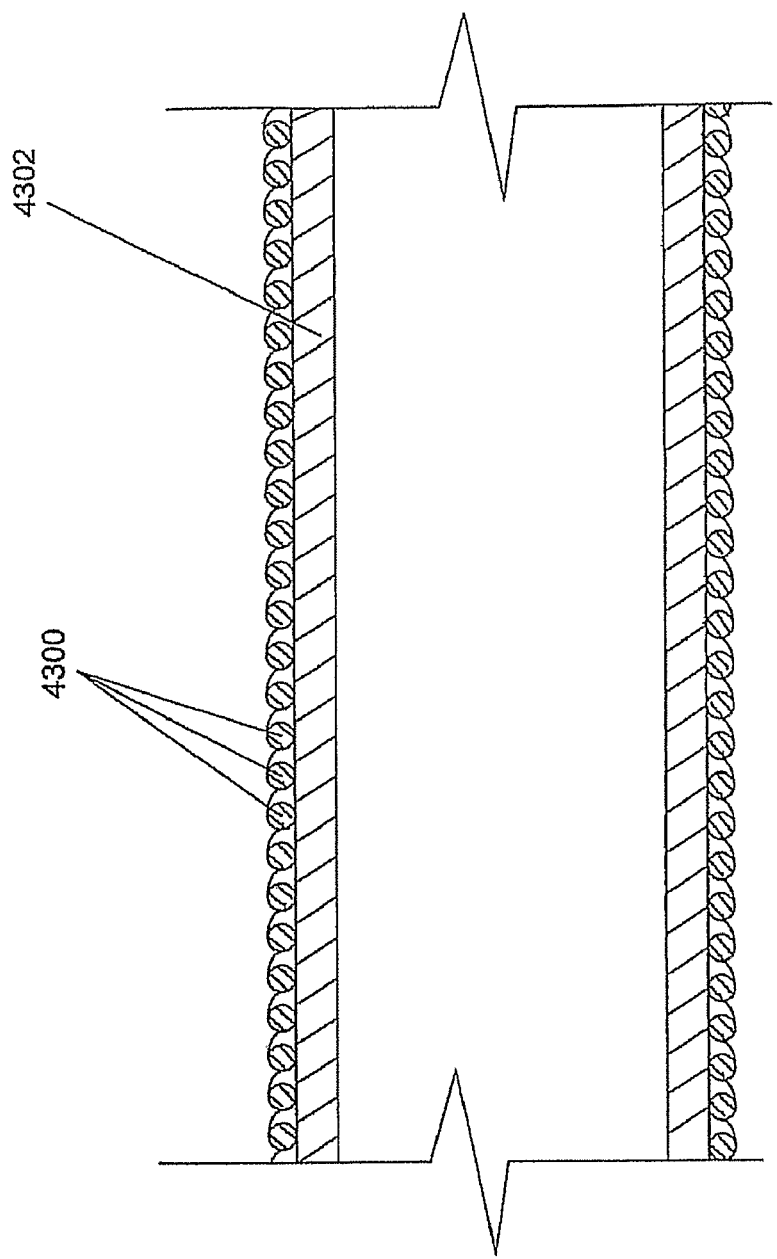
FIG. 52c is a cross sectional view taken along line 52c of FIG. 52b illustrating an exemplary embodiment of the expandable tubular member of FIG. 40 coated by winding wire around its circumference according to the method of FIG. 39.
Figure 52D:
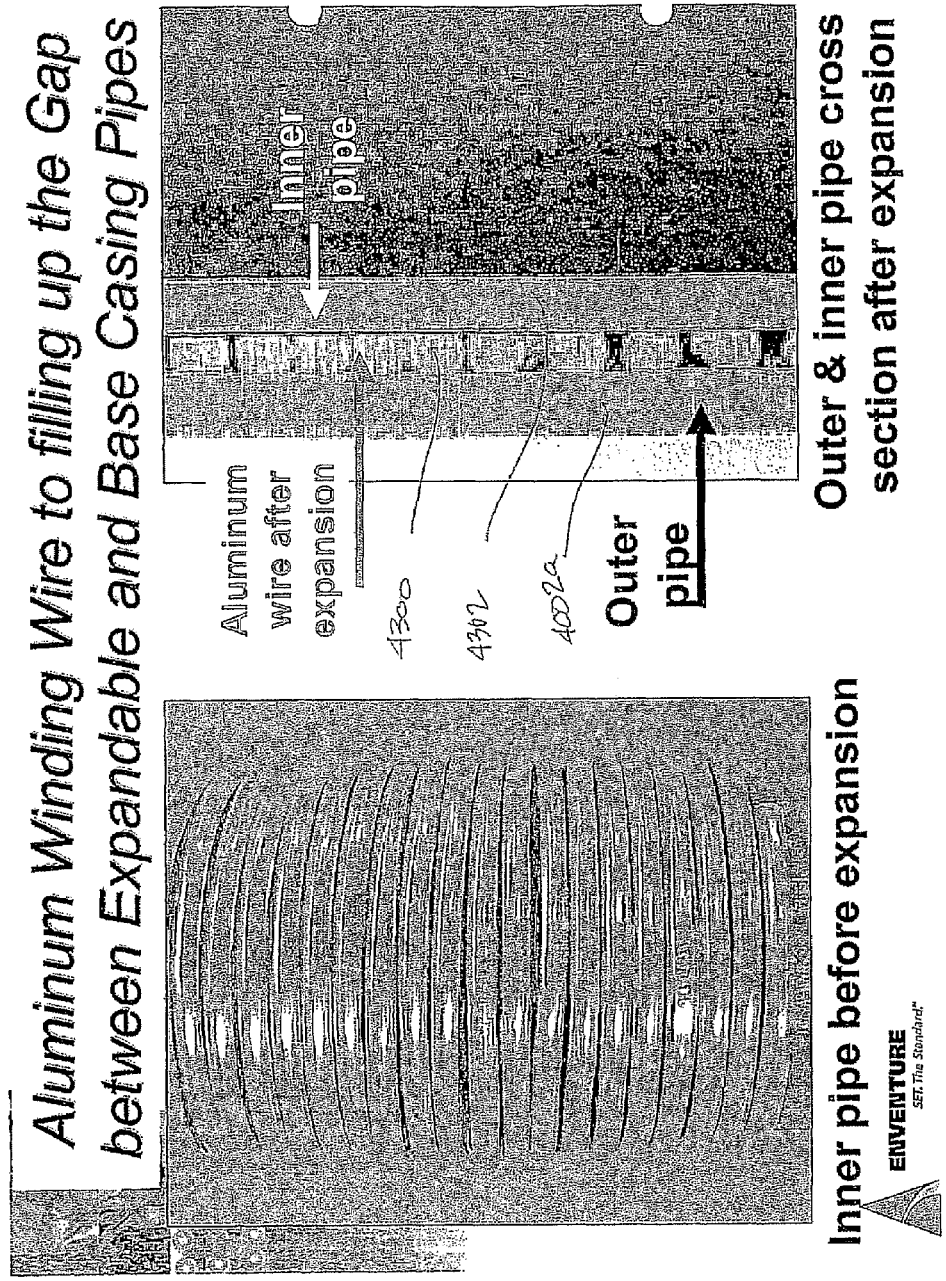
FIG. 52d is a cross sectional view illustrating an exemplary embodiment of the expandable tubular member of FIG. 40 coated by winding wire around its circumference according to the method of FIG. 39 after expansion in the preexisting structure of FIG. 42.

In an alternative embodiment, as illustrated in FIGS. 52a, 52b, 52c and 52d, step 3904 of method 3900 may be accomplished by laying a material 4300 around an expandable tubular member 4302, which may be the expandable tubular member 3902a in FIG. 40. The material 4300 may be positioned about the outer surface of the expandable tubular member 4302, as illustrated in FIGS. 52a, 52b, and 52c, such that after expansion of the tubular member 4302, the material 4300 forms an interstitial layer between the tubular member 4302 and the preexisting structure 4002a, illustrated in FIG. 52d, that increases the collapse strength of the tubular assembly which includes the tubular member 4302 and the preexisting structure 4002a. In an alternative embodiment, step 4004 of method 4000 may be accomplished by using the material 4300 to line the inner surface of the preexisting structure such as, for example, the inner surface 4002c of preexisting structure 4002a. In an exemplary embodiment, the material 4300 may be a plastic, and/or a metal such as, for example, aluminum, aluminum/zinc, or other equivalent metals known in the art, and/or a composite material such as, for example, carbon fiber. In an exemplary embodiment, the material 4300 may include a wire that is wound around the expandable tubular member 4302 or lined on the inner surface 4002c of preexisting structure 4002a. In an exemplary embodiment, the material 4300 may include a plurality of rings place around the expandable tubular member 4302 or lined on the inner surface 4002c of preexisting structure 4002a. In an exemplary embodiment, the material 4300 may be a plurality of discrete components placed on the expandable tubular member 4302 or lined on the inner surface 4002c or preexisting structure 4002a.

Figure 53:
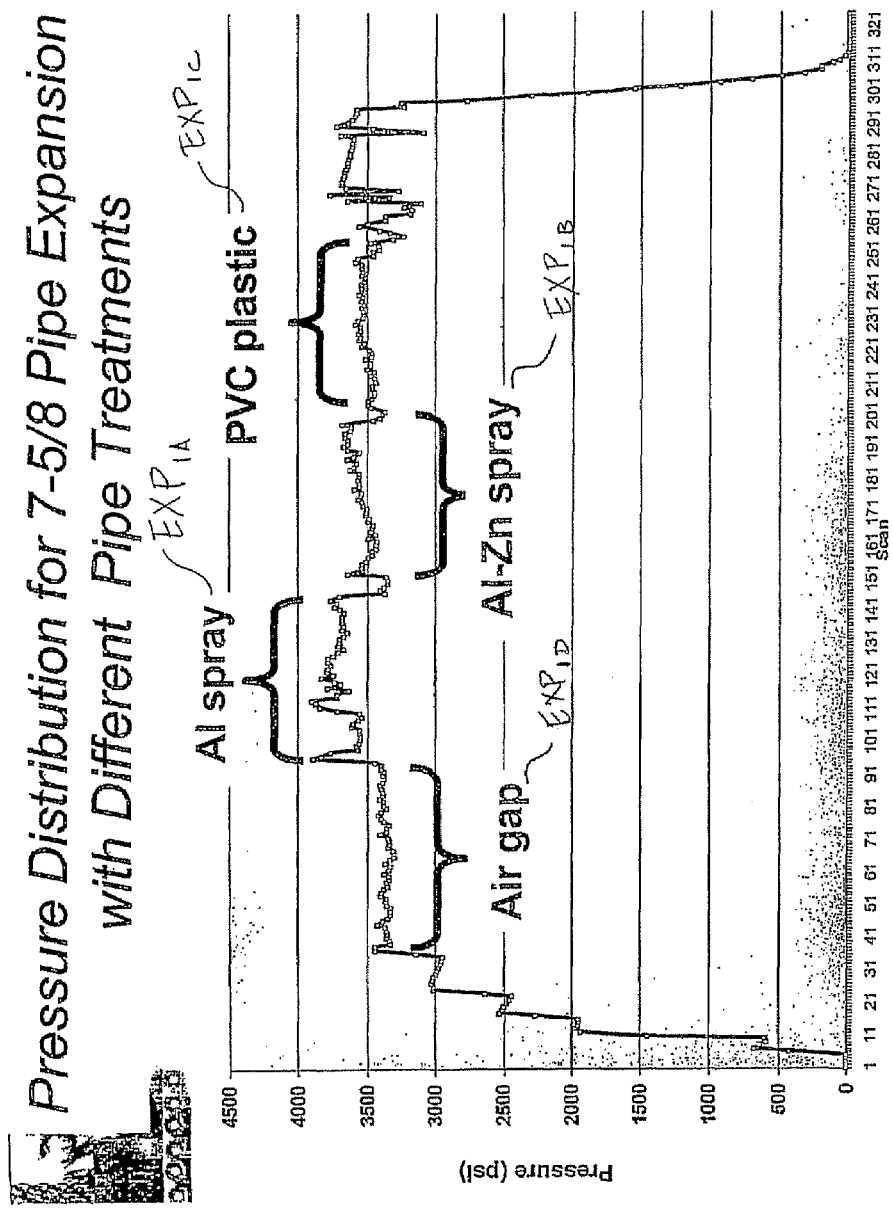
FIG. 53 is a chart view illustrating an exemplary experimental embodiment of the energy required to expand a plurality of tubular assemblies produced by the methods of FIG. 39 and FIG. 45.

In an exemplary experimental embodiment $EXP_1$ of method 3900, as illustrated in FIG. 53, a plurality of tubular members 3902a were provided, as per step 3902 of method 3900, which had a 7⅝ inch diameter. Each tubular member 3902a was coated, as per step 3904 of method 3900, with a layer 3904a. The tubular member 3902a was then radially expanded and plastically deformed and the energy necessary to radially expand and plastically deform it such as, for example, the operating pressure required to radially expand and plastically deform the tubular member 3902a, was recorded. In $EXP_{1A}$, the layer 3904a was aluminum, requiring a maximum operating pressure of approximately 3900 psi to radially expand and plastically deform the tubular member 3902a. In $EXP_{1B}$, the layer 3904a was aluminum/zinc, requiring a maximum operating pressure of approximately 3700 psi to radially expand and plastically deform the tubular member 3902a. In $EXP_{1C}$, the layer 3904a was PVC plastic, requiring a maximum operating pressure of approximately 3600 psi to radially expand and plastically deform the tubular member 3902a. In $EXP_{1D}$, the layer 3904a was omitted resulting in an air gap, and requiring a maximum operating pressure of approximately 3400 psi to radially expand and plastically deform the tubular member 3902a.

Figure 54A:
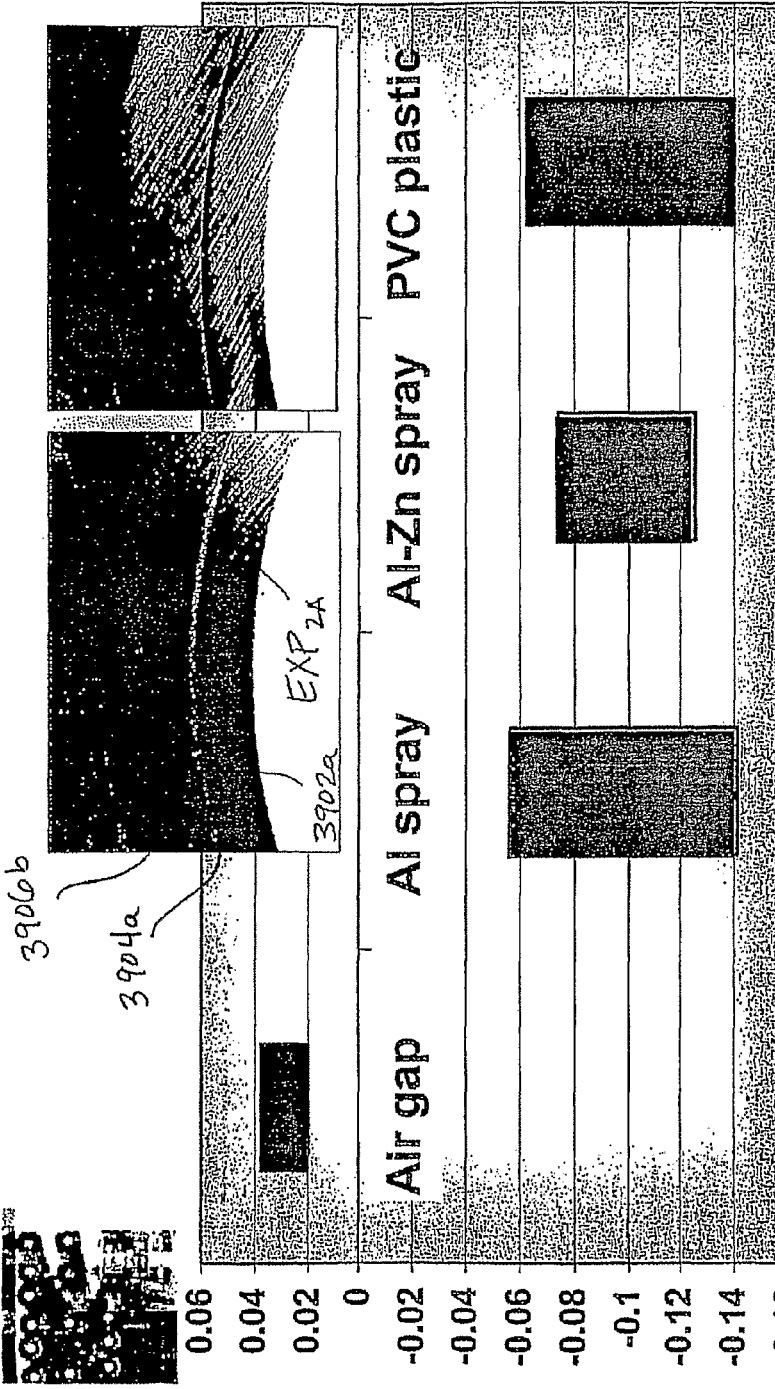
FIG. 54a is a cross sectional view illustrating an exemplary experimental embodiment of a tubular assembly produced by the method of FIG. 39.
Figure 54B:
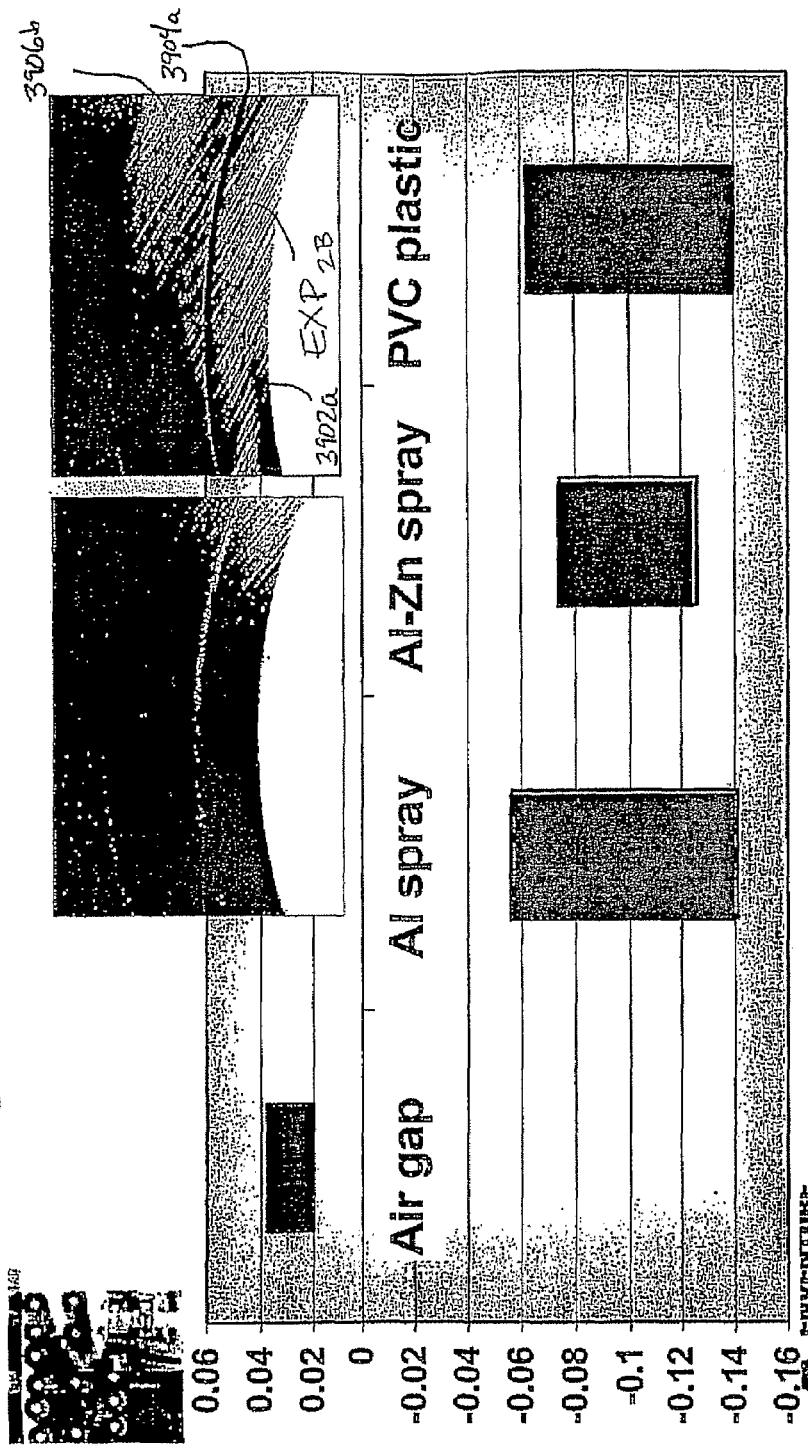
FIG. 54b is a cross sectional view illustrating an exemplary experimental embodiment of a tubular assembly produced by the method of FIG. 39.
Figure 54C:
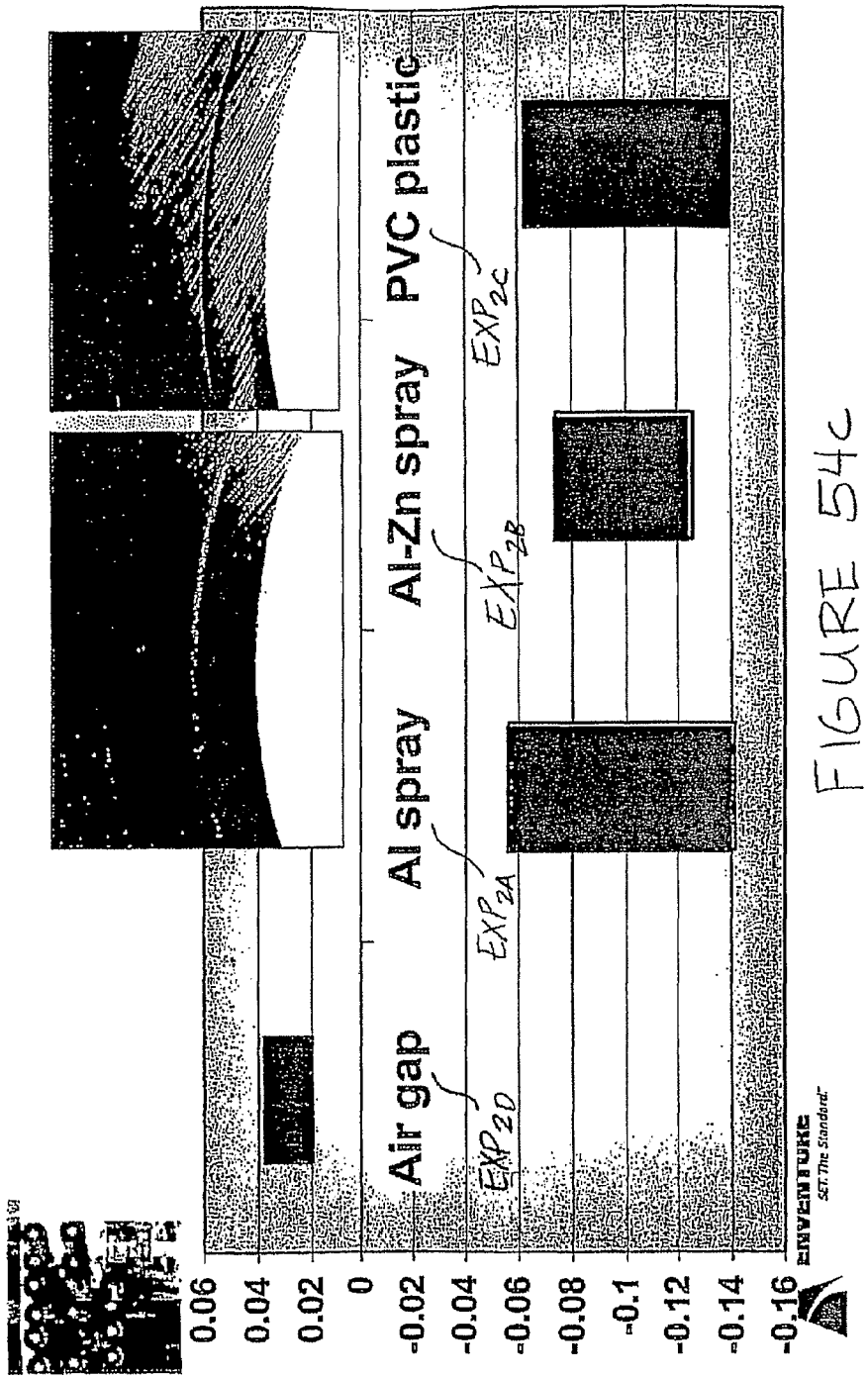
FIG. 54c is a chart view illustrating an exemplary experimental embodiment of the thickness of the interstitial layer for a plurality of tubular assemblies produced by the method of FIG. 39.

In an exemplary experimental embodiment $EXP_2$ of method 3900, as illustrated in FIGS. 54a, 54b, and 54c, a plurality of expandable tubular members 3902a were provided, as per step 3902 of method 3900. Each tubular member 3902a was coated, as per step 3904 of method 3900, with a layer 3904a. Each tubular member 3902a was then positioned within a preexisting structure 3906b as per step 3906 of method 3900. Each tubular member 3902a was then radially expanded and plastically deformed 13.3% and the thickness of layer 3904a between the tubular member 3902a and the preexisting structure 3906b was measured. In $EXP_{2A}$, the layer 3904a was aluminum and had a thickness between approximately 0.05 inches and 0.15 inches. In $EXP_{2B}$, the layer 3904a was aluminum/zinc and had a thickness between approximately 0.07 inches and 0.13 inches. In $EXP_{2C}$, the layer 3904a was PVC plastic and had a thickness between approximately 0.06 inches and 0.14 inches. In $EXP_{2D}$, the layer 3904a was omitted which resulted in an air gap between the tubular member 3902a and the preexisting structure 3906b between approximately 0.02 and 0.04 inches.

Figure 55A:
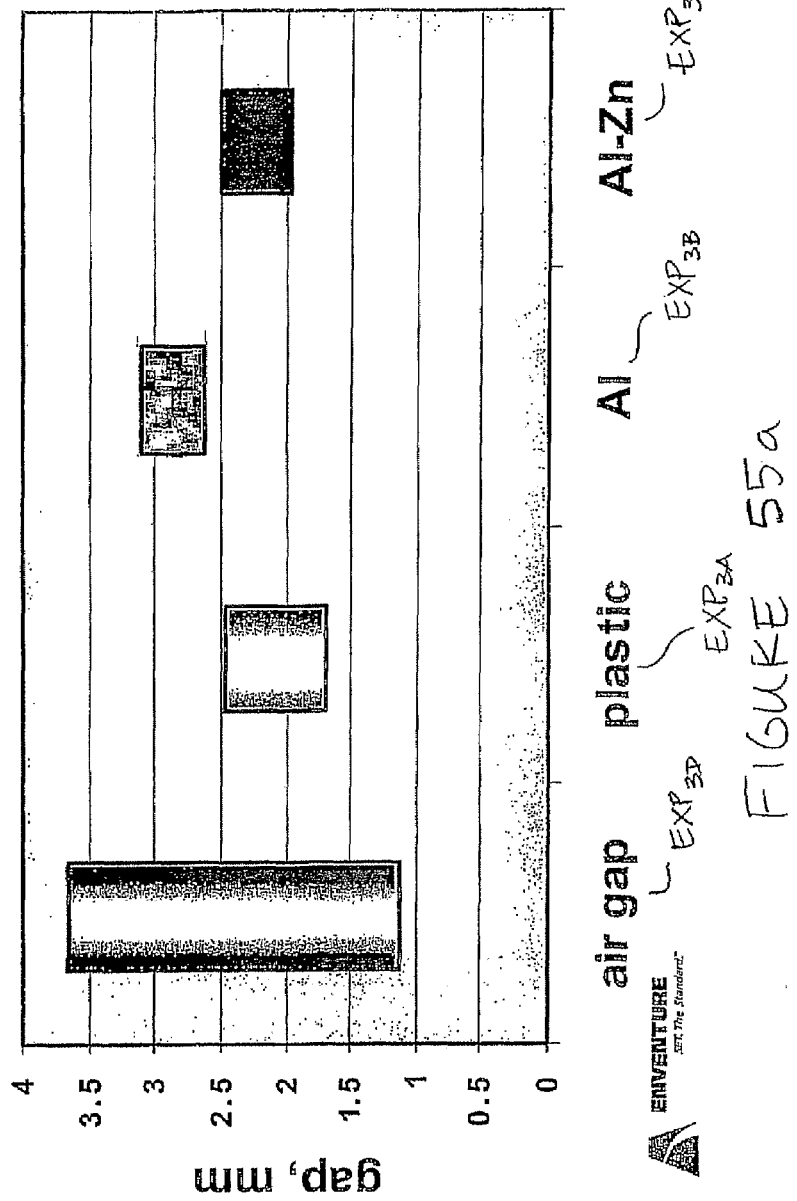
FIG. 55a is a chart view illustrating an exemplary experimental embodiment of the thickness of the interstitial layer for a plurality of tubular assemblies produced by the method of FIG. 39.

In an exemplary experimental embodiment $EXP_3$ of method 3900, illustrated in FIGS. 55a and 55b, a plurality of expandable tubular members 3902a were provided, as per step 3902 of method 3900. Each tubular member 3902a was coated, as per step 3904 of method 3900, with a layer 3904a. Each tubular member 3902a was then positioned within a preexisting structure 3906b as per step 3906 of method 3900. Each tubular member 3902a was then radially expanded and plastically deformed in a preexisting structure 3906b and the thickness of layer 3904a between the tubular member 3902a and the preexisting structure 3906b was measured. In $EXP_{3A}$, the layer 3904a was plastic with a thickness between approximately 1.6 mm and 2.5 mm. In $EXP_{3B}$, the layer 3904a was aluminum with a thickness between approximately 2.6 mm and 3.1 mm. In $EXP_{3C}$, the layer 3904a was aluminum/zinc with a thickness between approximately 1.9 mm and 2.5 mm. In $EXP_{3D}$, the layer 3904a was omitted, resulting in an air gap between the tubular member 3902a and the preexisting structure 3906b between approximately 1.1 mm and 1.7 mm. FIG. 55b illustrates the distribution of the gap thickness between the tubular member and the preexisting structure for $EXP_{3A}$, $EXP_{3B}$, $EXP_{3C}$, and $EXP_{3D}$, illustrating that combinations with an layer between the tubular member 3902a and the preexisting structure 3906b exhibit a more uniform gap distribution.

In an exemplary experimental embodiment $EXP_4$ of method 3900, a plurality of expandable tubular members 3902a were provided, as per step 3902 of method 3900. Each tubular member 3902a was coated, as per step 3904 of method 3900, with a layer 3904a. Each tubular member 3902a was then positioned within a preexisting structure 3906b as per step 3906 of method 3900. Each tubular member 3902a was then radially expanded and plastically deformed in a preexisting structure 3906b, and conventional collapse testing was performed on the tubular assembly comprised of the tubular member 3902a, layer 3904a and preexisting structure 3906b combination. For the testing, the preexisting structure 3906b was composed of a P-110 Grade pipe with an inner diameter of approximately 9⅝ inches. The expandable tubular member 3902a was composed of an LSX-80 Grade pipe, commercially available from Lone Star Steel, with an inner diameter of approximately 7⅝ inches. The tubular member assemblies exhibited the following collapse strengths:

| EXP₄ | Layer 3904a | Collapse Strength (psi) | Remarks |
|---|---|---|---|
| EXP₄ₐ | plastic | 14230 | This was an unexpected result. |
| EXP₄ᵦ | aluminum/zinc | 20500 | This was an unexpected result. |
| EXP₄c | air | 14190 | This was an unexpected result. |
| EXP₄ᴅ | aluminum | 20730 | This was an unexpected result. |

$EXP_{4A}$, $EXP_{4B}$, $EXP_{4C}$, and $EXP_{4D}$ illustrate that using a soft metal such as, for example aluminum and or aluminum/zinc, as layer 3904a in method 3900 increases the collapse strength of the tubular assembly comprising the expandable tubular member 3902a, layer 3904a, and preexisting structure 3906b by approximately 50% when compared to using a layer 3904a of plastic or omitting the layer 3904a. This was an unexpected result.

Figure 56:
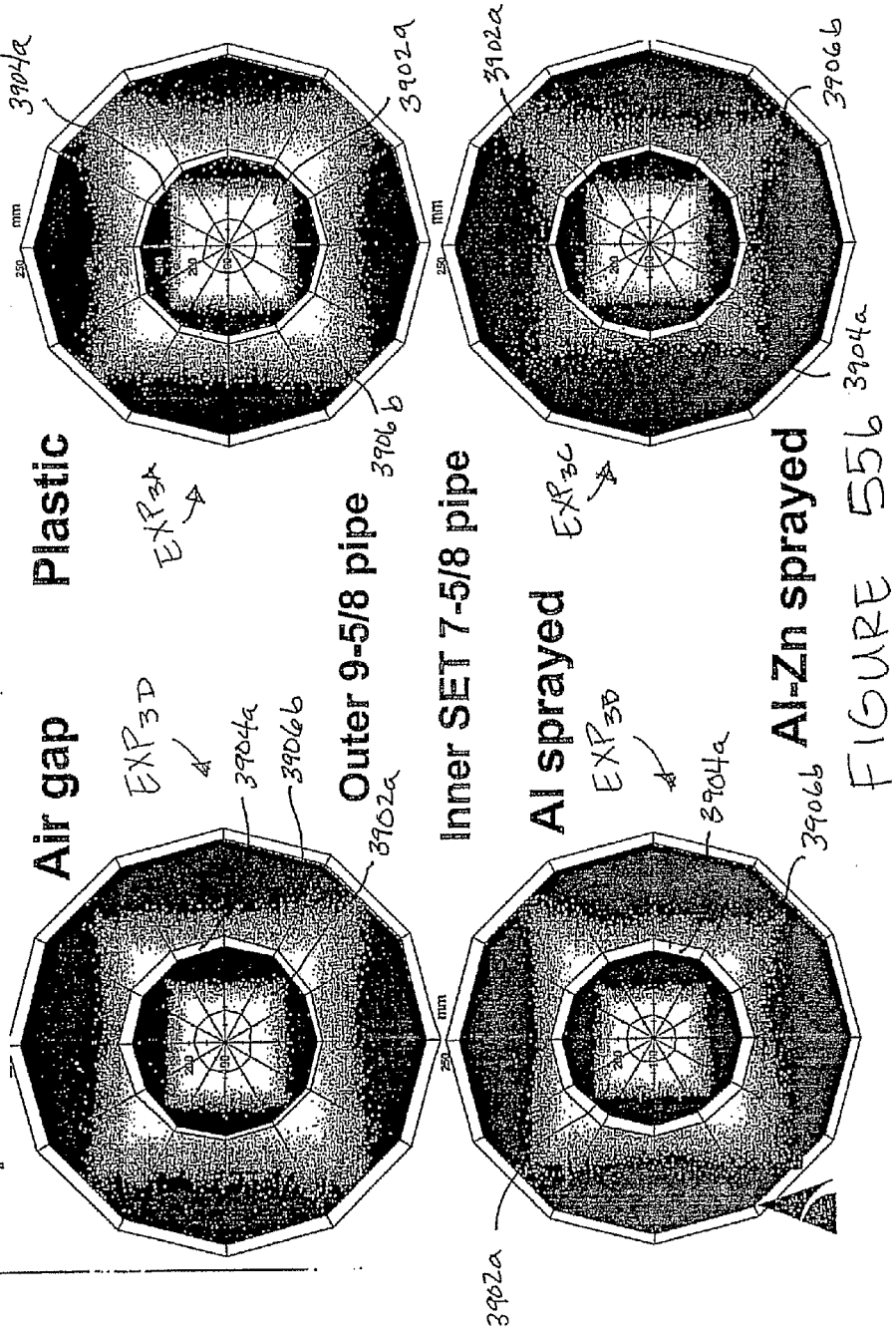
FIG. 56 is a cross sectional view illustrating an exemplary experimental embodiment of a tubular assembly produced by the method of FIG. 39 but omitting the coating with a layer of material.

In an exemplary experimental embodiment $EXP_5$ of method 3900, as illustrated in FIGS. 56 and 56a, an expandable tubular member 3902a was provided, as per step 3902 of method 3900. The coating of step 3904 with a layer 3904a was omitted. The tubular member 3902a was then positioned within a preexisting structure 3906b as per step 3906 of method 3900. The tubular member 3902a was then radially expanded and plastically deformed in a preexisting structure 3906b, resulting in an air gap between the tubular member 3902a and the preexisting structure.

In an exemplary embodiment, the collapse resistance of a tubular assembly that includes a pair of overlapping tubular members coupled to each other may be determined using the following equation:

$$P_{ct}=K(P_{co}+P_{ci}) \quad \text{(Equation 5)}$$

$P_{co}$ is the collapse resistance of an outer casing such as, for example, the preexisting structure 3906b or 4002a, or the wellbores 16, 110, or 206. $P_{ci}$ is the collapse resistance of an inner casing such as, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, 3500, or 3902a, or the tubular assembly 10, 22, 100, or 200. K is a reinforcement factor provided by a coating such as, for example, the coating 3904a or 4004a. In an exemplary embodiment, the reinforcement factor K increases as the strength of the material used for the coating increases.

Figures 57A, 57B:
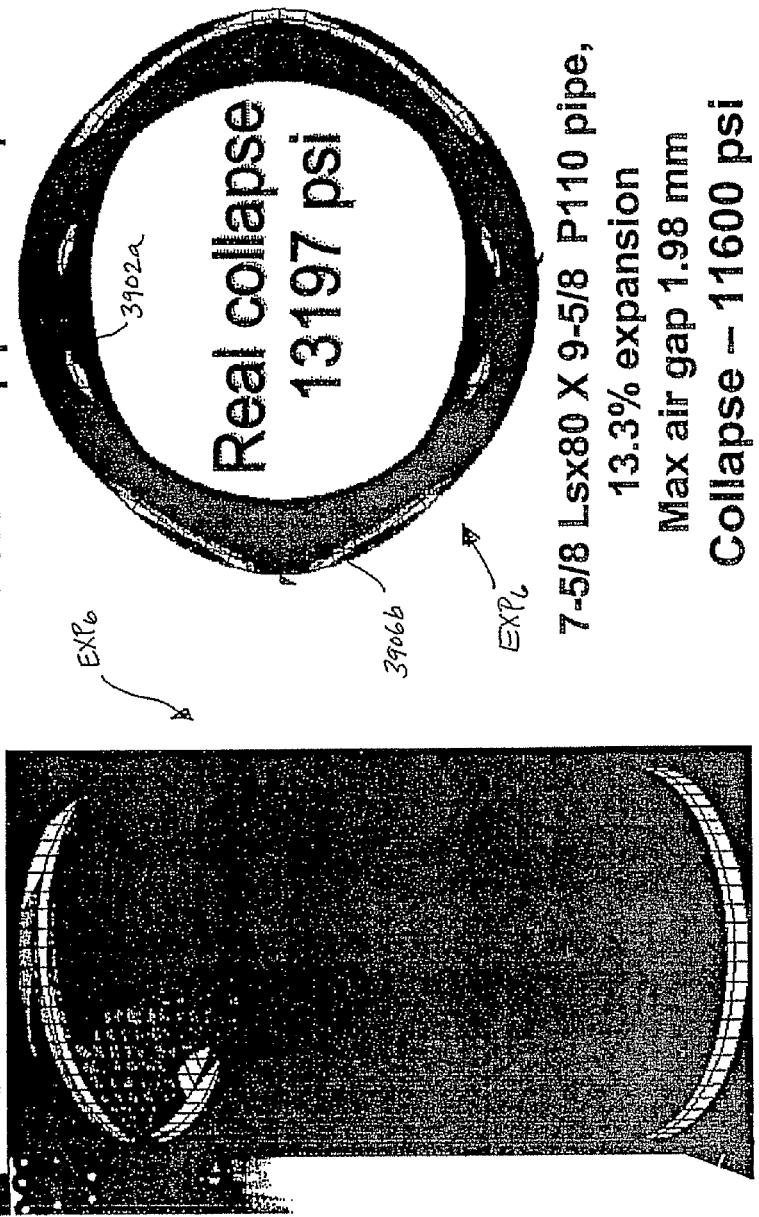
FIG. 57a is a graphical view illustrating an exemplary experimental embodiment of the collapse strength for a tubular assembly produced by the method of FIG. 39 but omitting the coating with a layer of material.
FIG. 57b is a graphical view illustrating an exemplary experimental embodiment of the thickness of the air gap for a tubular assembly produced by the method of FIG. 39 but omitting the coating with a layer of material.

In an exemplary experimental embodiment $EXP_6$ of method 3900, as illustrated in FIGS. 57a, 57b, a computer simulation was run for an expandable tubular member 3902a provided, as per step 3902 of method 3900, positioned within a preexisting structure 3906b, as per step 3906 of method 3900, and radially expanded and plastically deformed in the preexisting structure 3906b. The coating of step 3904 with a layer 3904a was omitted. The radial expansion and plastic deformation of expandable tubular member 3902a resulted in an air gap distribution between the expanded tubular member 3902a and the preexisting structure 3906b, illustrated in FIG. 58b. The tubular member 3902a was a LSX-80 Grade pipe, commercially available from Lone Star Steel, with a 7⅝ inch inner diameter and the preexisting structure 3906b was a P110 Grade pipe with a 9⅝ inch inner diameter. The tubular member 3902a was radially expanded and plastically deformed 13.3% from its original diameter. After expansion, the maximum air gap was approximately 2 mm. The expandable tubular member 3902a and preexisting structure 3906b combination exhibited a collapse strength of approximately 13200 psi. This was an unexpected result.

Figure 58:
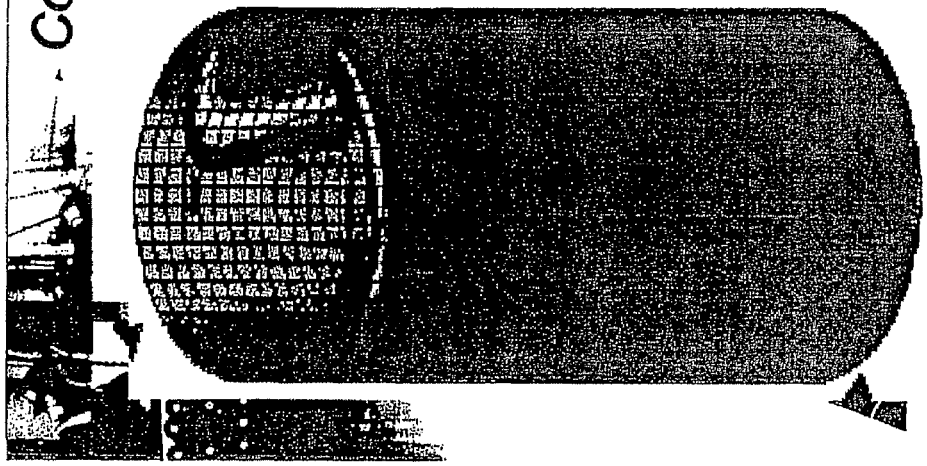
FIG. 58 is a graphical view illustrating an exemplary experimental embodiment of the thickness of the air gap and the collapse strength for a tubular assembly produced by the method of FIG. 39 but omitting the coating with a layer of material.

In an exemplary experimental embodiment $EXP_7$ of method 3900, as illustrated in FIG. 58, a computer simulation was run for an expandable tubular members 3902a provided, as per step 3902 of method 3900, positioned within a preexisting structure 3906b, as per step 3906 of method 3900, and radially expanded and plastically deformed in the preexisting structure 3906b. The coating of step 3904 with a layer 3904a was omitted. The radial expansion and plastic deformation of expandable tubular member 3902a resulted in an air gap distribution between the expanded tubular member 3902a and the preexisting structure 3906b, illustrated. The tubular member 3902a was a LSX-80 Grade pipe, commercially available from Lone Star Steel, with a 7⅝ inch inner diameter and the preexisting structure 3906b was a P110 Grade pipe with a 9⅝ inch inner diameter. The tubular member 3902a was radially expanded and plastically deformed 14.9% from its original diameter. After expansion, the maximum air gap was approximately 1.55 mm. The expandable tubular member 3902a and preexisting structure 3906b combination exhibited a collapse strength of approximately 13050 psi. This was an unexpected result.

Figure 59:
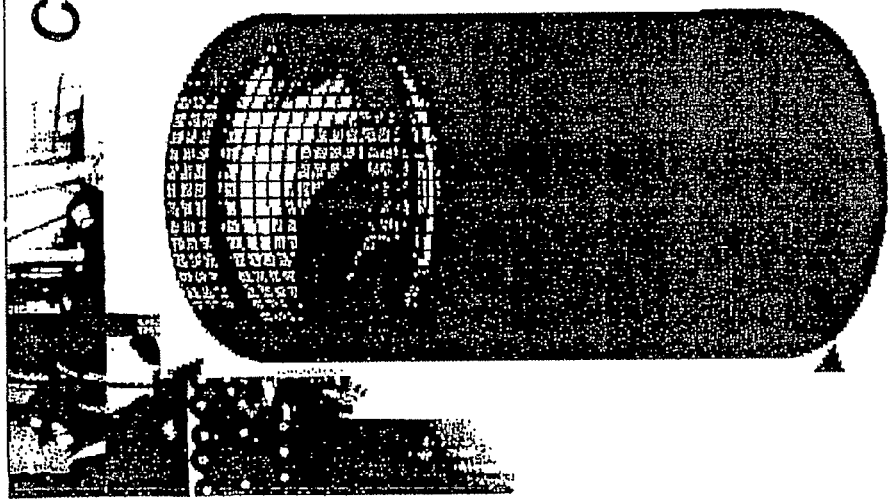
FIG. 59 is a graphical view illustrating an exemplary experimental embodiment of the thickness of the interstitial layer and the collapse strength for a tubular assembly produced by the method of FIG. 39.

In an exemplary experimental embodiment $EXP_8$ of method 3900, as illustrated in FIG. 59, a computer simulation was run for an expandable tubular member 3902a provided, as per step 3902 of method 3900, coated with a layer 3904a of soft metal, as per step 3904 of method 3900, positioned within a preexisting structure 3906b as per step 3906 of method 3900, and radially expanded and plastically deformed in a preexisting structure 3906b. The tubular member 3902a was a LSX-80 Grade pipe, commercially available from Lone Star Steel, with a 7⅝ inch inner diameter and the preexisting structure 3906b was a P110 Grade pipe with a 9⅝ inch inner diameter. In an exemplary embodiment, the soft metal distribution between the tubular member 3902a and the preexisting structure 3906b included aluminum. In an exemplary embodiment, the soft metal distribution between the tubular member 3902a and the preexisting structure 3906b included aluminum and zinc. The tubular member 3906 was radially expanded and plastically deformed 13.3% from its original diameter. After expansion, the soft metal layer 3904a included a maximum thickness of approximately 2 mm. The expandable tubular member 3902a, preexisting structure 3906b, and soft metal layer 3904a combination exhibited a collapse strength of greater than 20000 psi. This was an unexpected result.

Figure 60A:
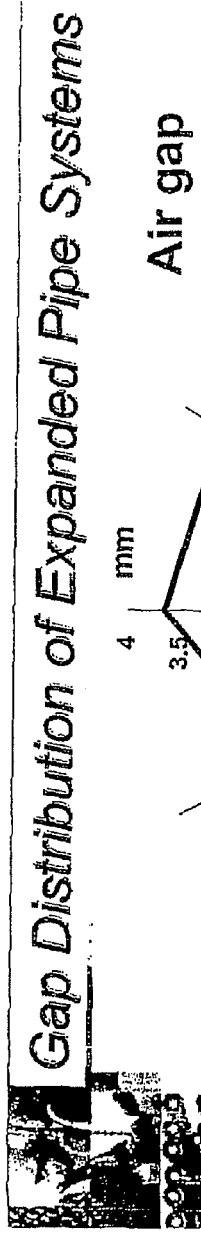
FIG. 60a is a graphical view illustrating an exemplary experimental embodiment of the thickness of the air gap for a tubular assembly produced by the method of FIG. 39 but omitting the coating with a layer of material.

In an exemplary experimental embodiment $EXP_{9A}$ of method 3900, as illustrated in FIG. 60a, an expandable tubular member 3902a was provided, as per step 3902 of method 3900. The expandable tubular member 3902a was then positioned within a preexisting structure 3906b, as per step 3906 of method 3900. The coating of step 3904 with a layer 3904a was omitted. The expandable tubular member 3902a was then radially expanded and plastically deformed in the preexisting structure 3906b, resulting in an air gap distribution between the expandable tubular member 3902a and the preexisting structure 3906b, which was then measured. A minimum air gap of approximately 1.2 mm and a maximum air gap of approximately 3.7 mm were exhibited. In an exemplary embodiment, the existence and non-uniformity of the air gap between the expandable tubular member 3902a and the preexisting structure 3906b results in portions of the preexisting structure 3906b which are not supported by the expanded expandable tubular member 3902a, lowering the collapse strength of the tubular assembly which includes the expanded expandable tubular member 3902a and the preexisting structure 3906b.

Figure 60B:
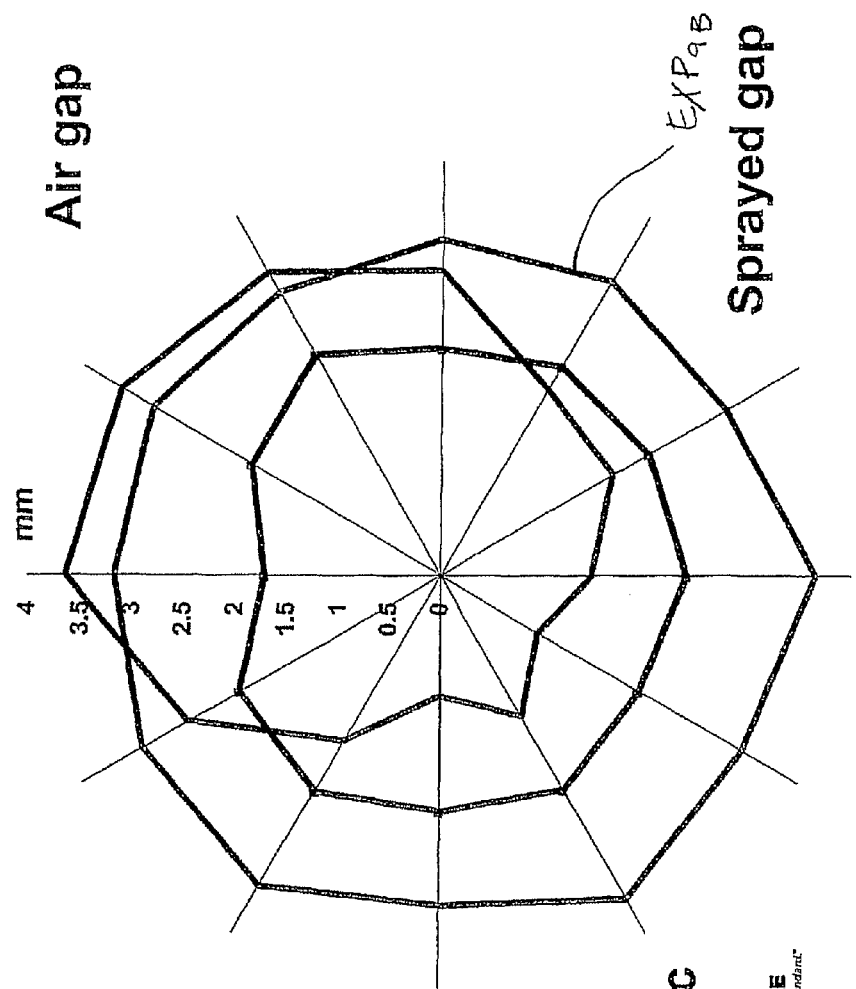
FIG. 60b is a graphical view illustrating an exemplary experimental embodiment of the thickness of the interstitial layer for a tubular assembly produced by the method of FIG. 39.

In an exemplary experimental embodiment $EXP_{9B}$ of method 3900, as illustrated in FIG. 60b, an expandable tubular member 3902a was provided, as per step 3902 of method 3900. The expandable tubular member 3902a was then coated with a layer 3904a of soft metal, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b and the soft metal layer 3904a between the expandable tubular member 3902a and the preexisting structure 3906b was measured. A minimum soft metal layer 3904a thickness of approximately 3.2 mm and a maximum soft metal layer 3904a thickness 5202b of approximately 3.7 mm were exhibited. In an exemplary embodiment, the existence and uniformity of the soft metal layer 3904a between the expandable tubular member 3902a and the preexisting structure 3906b results in a more uniform support of the preexisting structure 3906b by the expanded expandable tubular member 3902a, increasing the collapse strength of the tubular assembly which includes the expanded expandable tubular member 3902a and the preexisting structure 3906b with the soft metal layer 3904a between them.

Figure 60C:
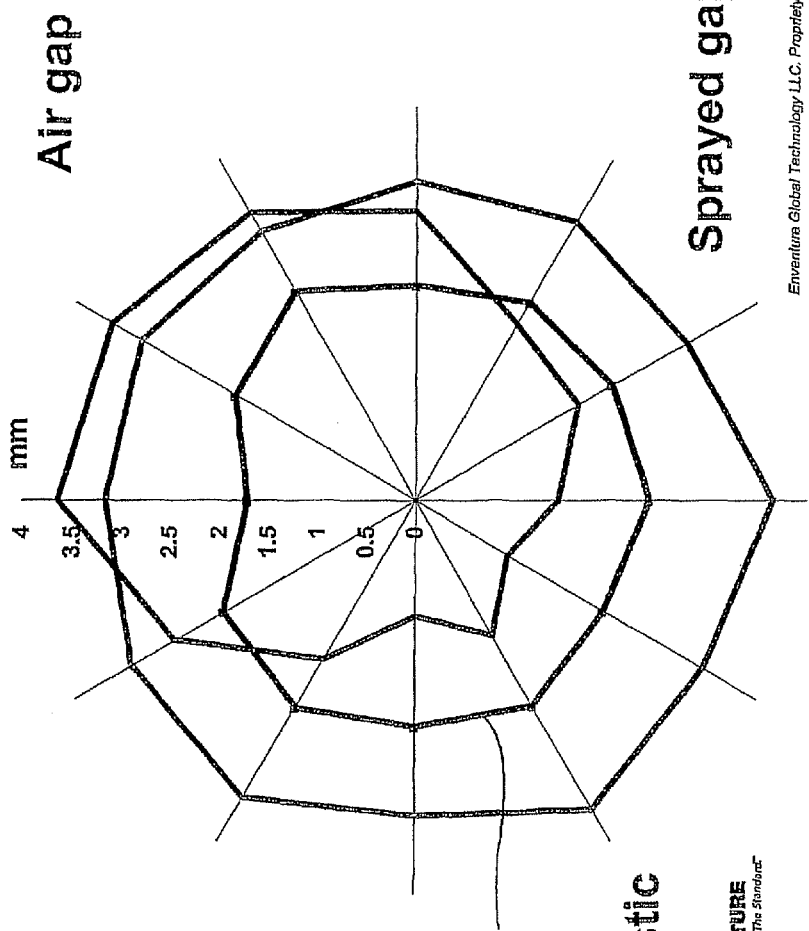
FIG. 60c is a graphical view illustrating an exemplary experimental embodiment of the thickness of the interstitial layer for a tubular assembly produced by the method of FIG. 39.

In an exemplary experimental embodiment $EXP_{9C}$ of method 3900, as illustrated in FIG. 60c, an expandable tubular member 3902a was provided, as per step 3902 of method 3900. The expandable tubular member 3902a was then coated with a layer 3904a of plastic, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b and the plastic layer 3904a between the expandable tubular member 3902a and the preexisting structure 3906b was measured. A minimum plastic layer 3904a thickness 5204a of approximately 1.7 mm and a maximum plastic layer 3904a thickness 5204b of approximately 2.5 mm were exhibited. In an exemplary embodiment, the uniformity of the plastic layer 3904a between the expandable tubular member 3902a and the preexisting structure 3906b results in a more uniform support of the preexisting structure 3906b by the expanded expandable tubular member 3902a.

Figure 61A:
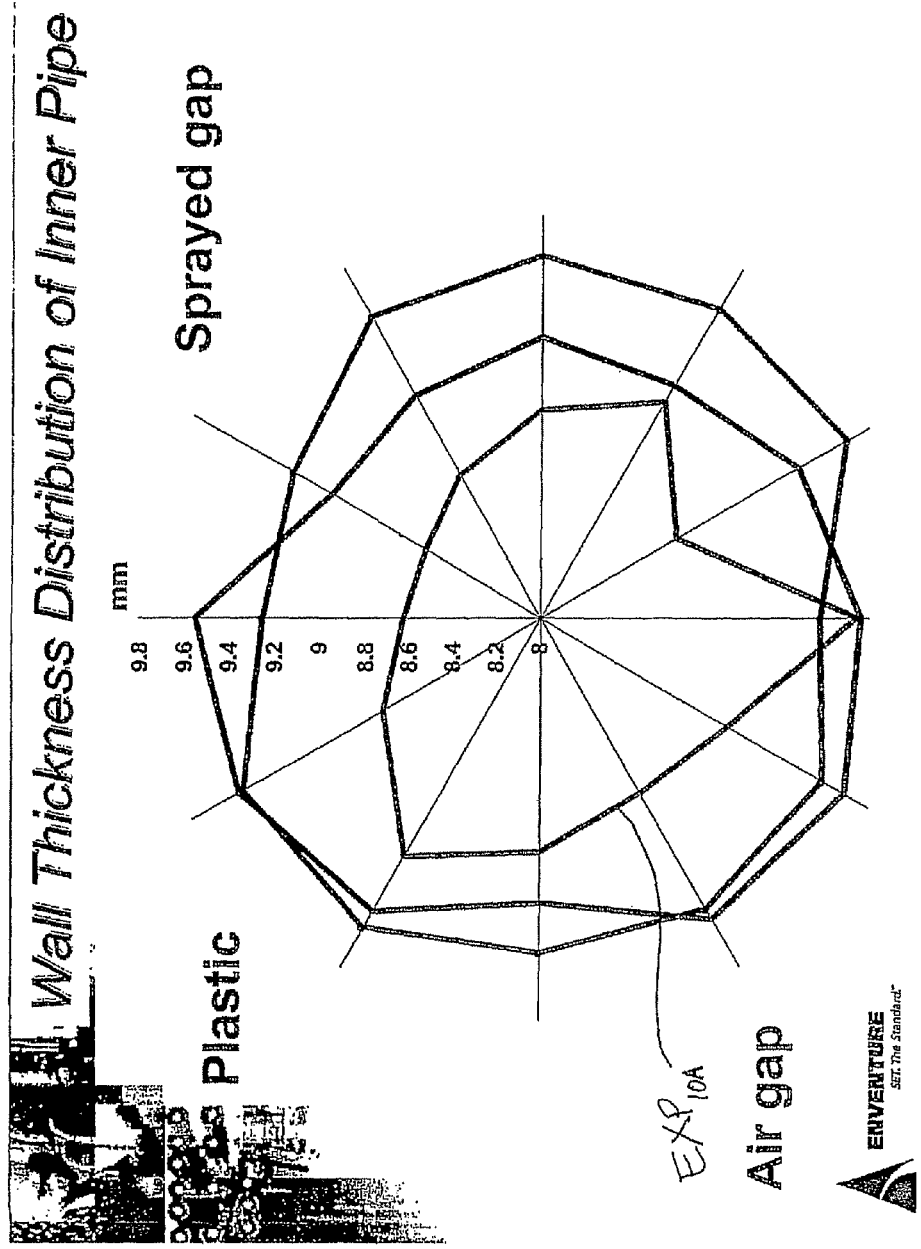
FIG. 61a is a graphical view illustrating an exemplary experimental embodiment of the wall thickness of an expandable tubular member for a tubular assembly produced by the method of FIG. 39 but omitting the coating with a layer of material.

In an exemplary experimental embodiment $EXP_{10A}$ of method 3900, as illustrated in FIG. 61a, an expandable tubular member 3902a was provided, as per step 3902 of method 3900. The expandable tubular member 3902a was then positioned within a preexisting structure 3906b, as per step 3906 of method 3900. The coating of step 3904 with a layer 3904a was omitted. The expandable tubular member 3902a was then radially expanded and plastically deformed in the preexisting structure, resulting in an air gap between the expandable tubular member 3902a and the preexisting structure 3906b. The wall thickness of the expandable tubular member 3902a was then measured. A minimum wall thickness for the expandable tubular member 3902a of approximately 8.6 mm and a maximum wall for the expandable tubular member 3902a of approximately 9.5 mm were exhibited.

Figure 61B:
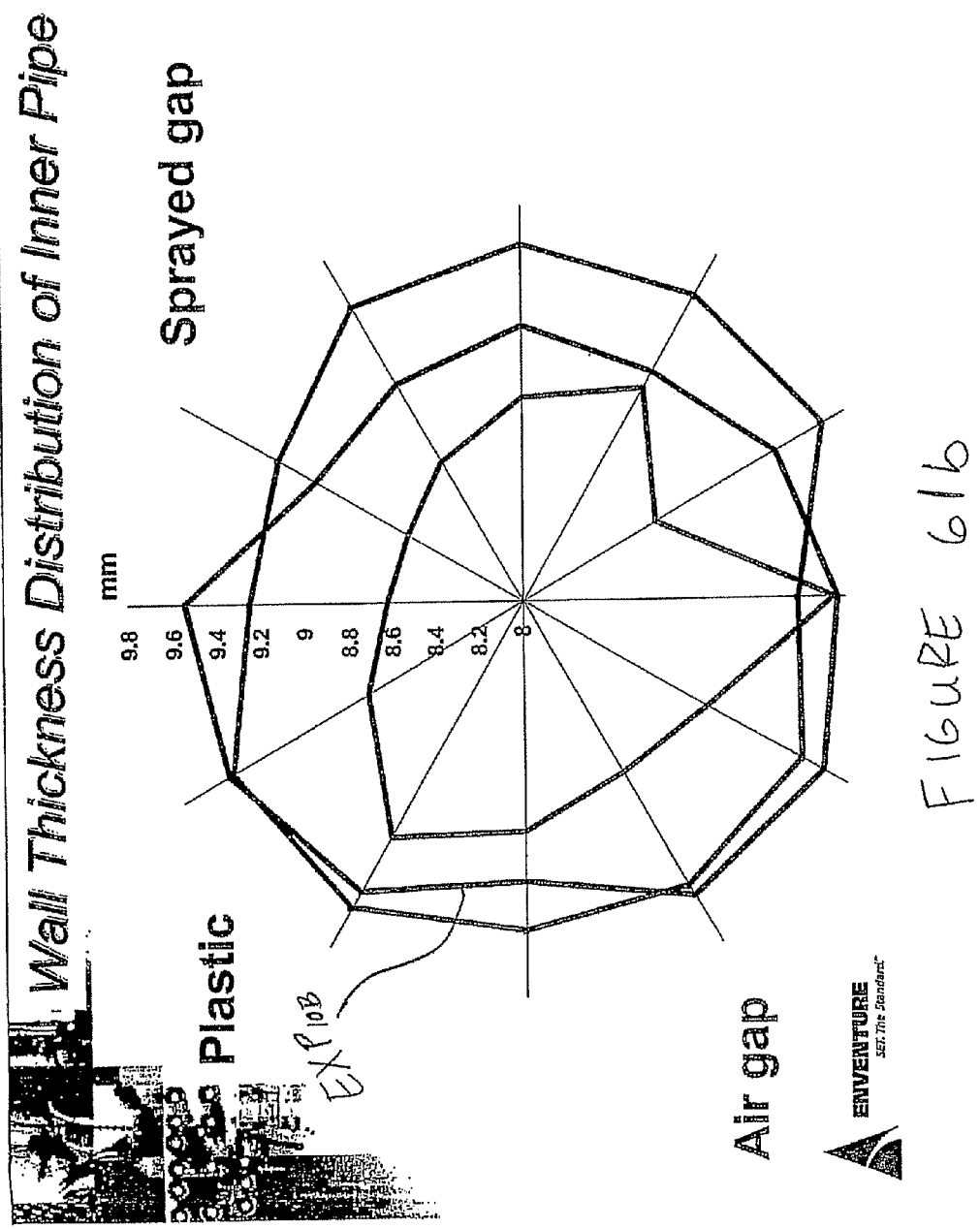
FIG. 61b is a graphical view illustrating an exemplary experimental embodiment of the wall thickness of an expandable tubular member for a tubular assembly produced by the method of FIG. 39.

In an exemplary experimental embodiment $EXP_{10B}$ of method 3900, as illustrated in FIG. 61b, an expandable tubular member 3902a was provided, as per step 3902 of method 3900. The expandable tubular member 3902a was then coated with a layer 3904a of plastic, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b. The wall thickness of the expandable tubular member 3902a was then measured. A minimum wall thickness for the expandable tubular member 3902a of approximately 9.1 mm and a maximum wall thickness for the expandable tubular member 3902a of approximately 9.6 mm were exhibited.

Figure 61C:
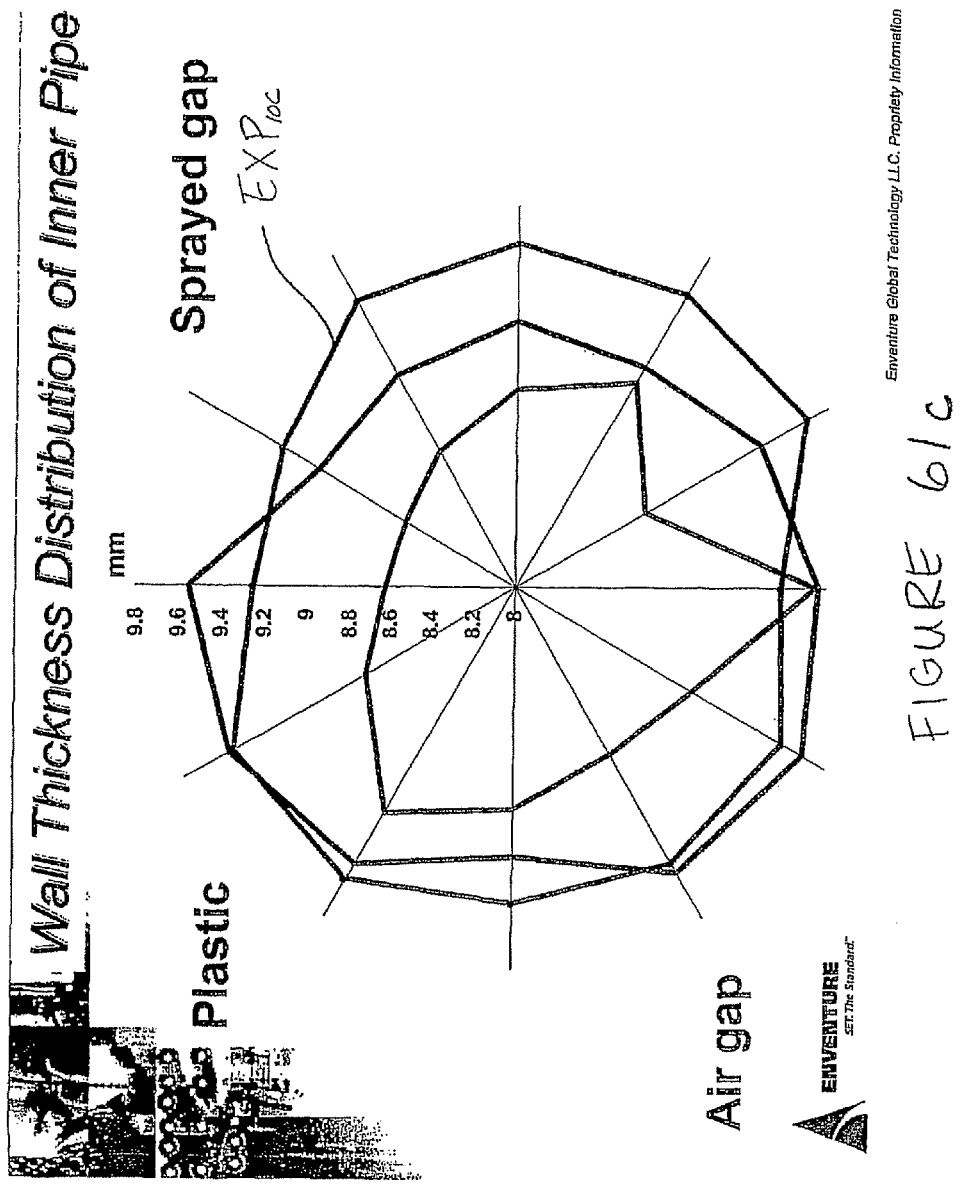
FIG. 61c is a graphical view illustrating an exemplary experimental embodiment of the wall thickness of an expandable tubular member for a tubular assembly produced by the method of FIG. 39.

In an exemplary experimental embodiment $EXP_{10C}$ of method 3900, as illustrated in FIG. 61c, an expandable tubular member 3902a was provided, as per step 3902 of method 3900. The expandable tubular member 3902a was then coated with a layer 3904a of soft metal, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b. The wall thickness of the expandable tubular member 3902a was then measured. A minimum wall thickness for the expandable tubular member 3902a of approximately 9.3 mm and a maximum wall thickness for the expandable tubular member 3902a of approximately 9.6 mm were exhibited.

Figure 62A:
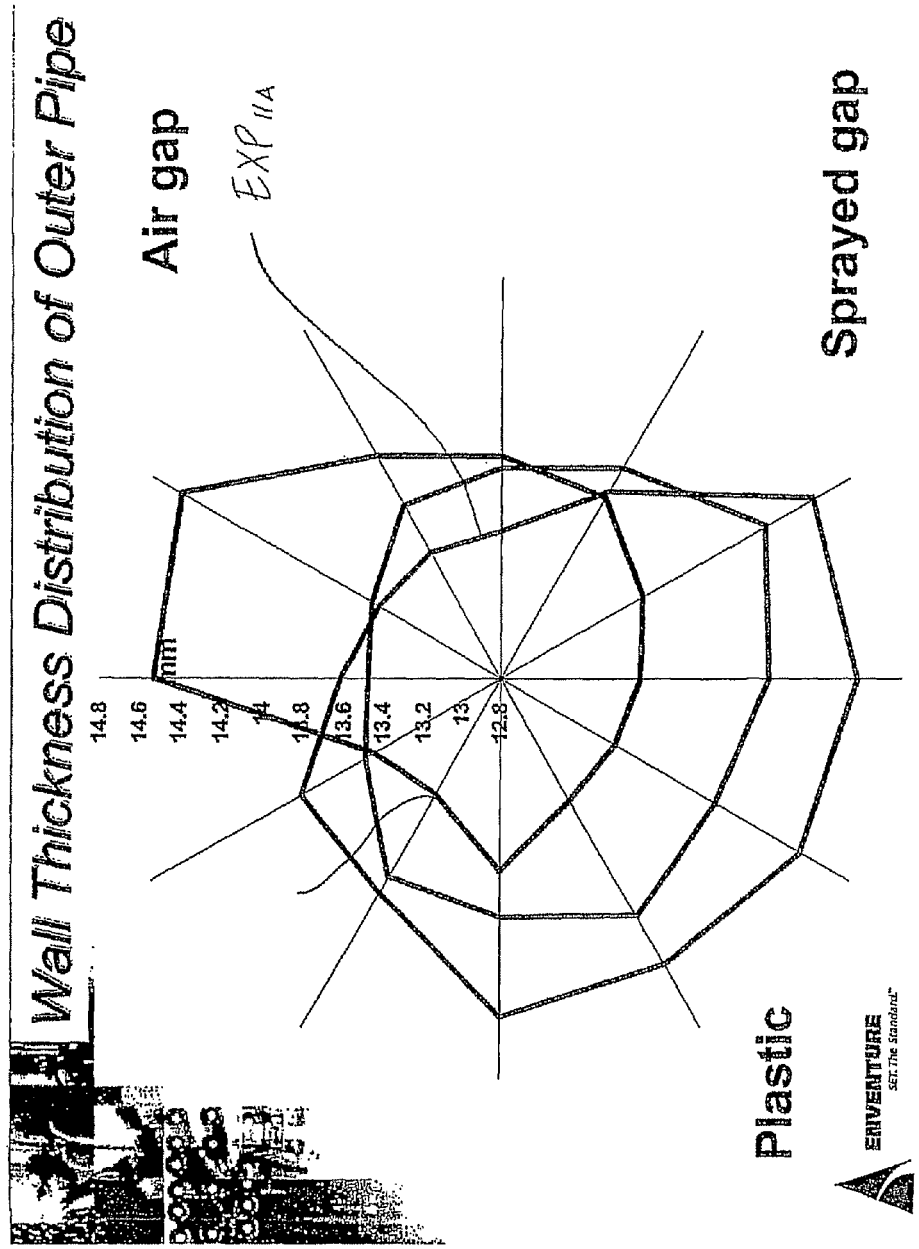
FIG. 62a is a graphical view illustrating an exemplary experimental embodiment of the wall thickness of a preexisting structure for a tubular assembly produced by the method of FIG. 39 but omitting the coating with a layer of material.

In an exemplary experimental embodiment $EXP_{11A}$ of method 3900, as illustrated in FIG. 62a, an expandable tubular member 3902a was provided, as per step 3902 of method 3900. The expandable tubular member 3902a was then positioned within a preexisting structure 3906b, as per step 3906 of method 3900. The coating of step 3904 with a layer 3904a was omitted. The expandable tubular member 3902a was then radially expanded and plastically deformed in the preexisting structure, resulting in an air gap between the expandable tubular member 3902a and the preexisting structure 3906b. The wall thickness of the preexisting structure 3906b was then measured. A minimum wall thickness for the preexisting structure 3906b of approximately 13.5 mm and a maximum wall thickness for the preexisting structure 3906b of approximately 14.6 mm were exhibited.

Figure 62B:
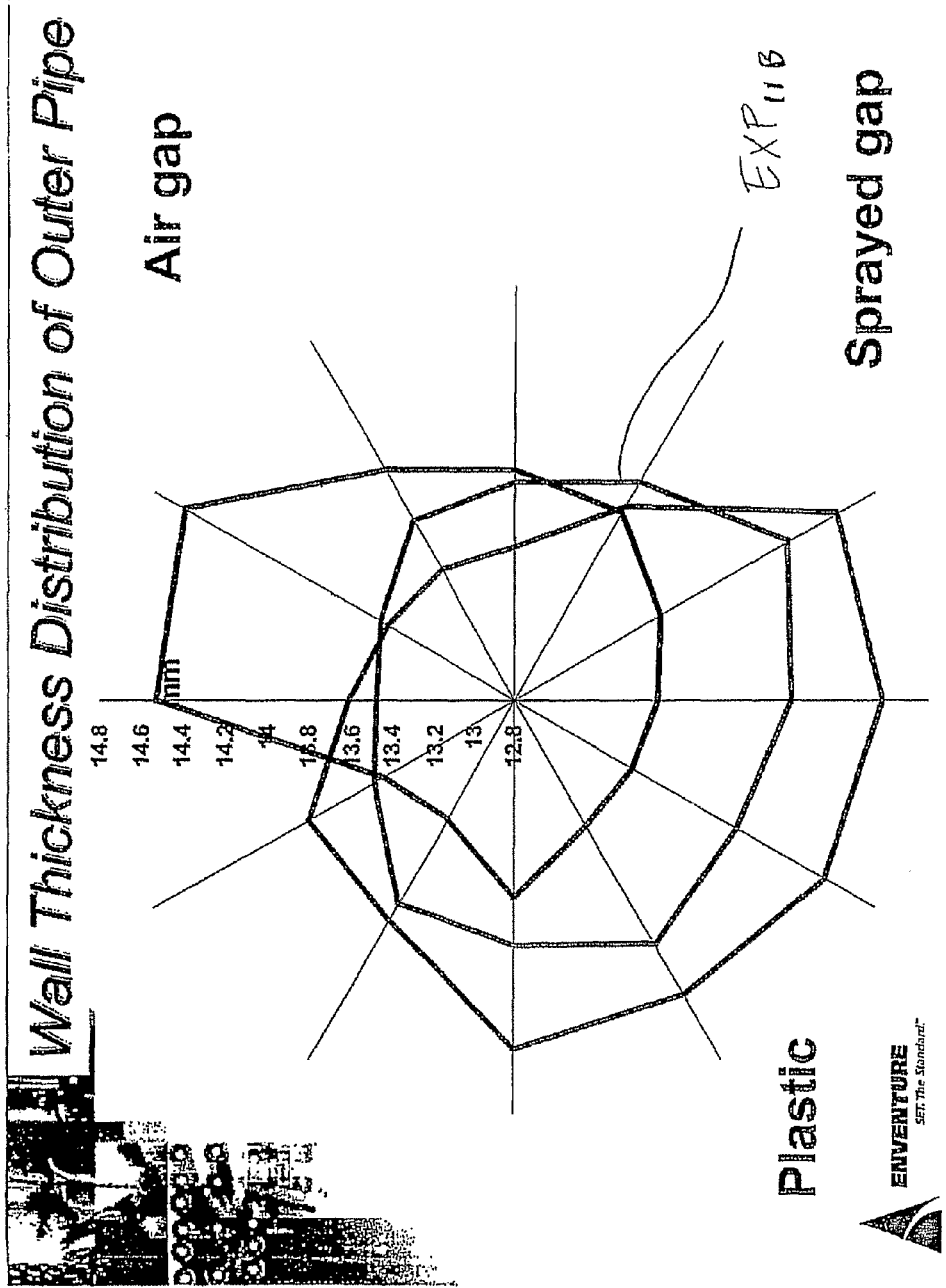
FIG. 62b is a graphical view illustrating an exemplary experimental embodiment of the wall thickness of a preexisting structure for a tubular assembly produced by the method of FIG. 39.
Figure 626:
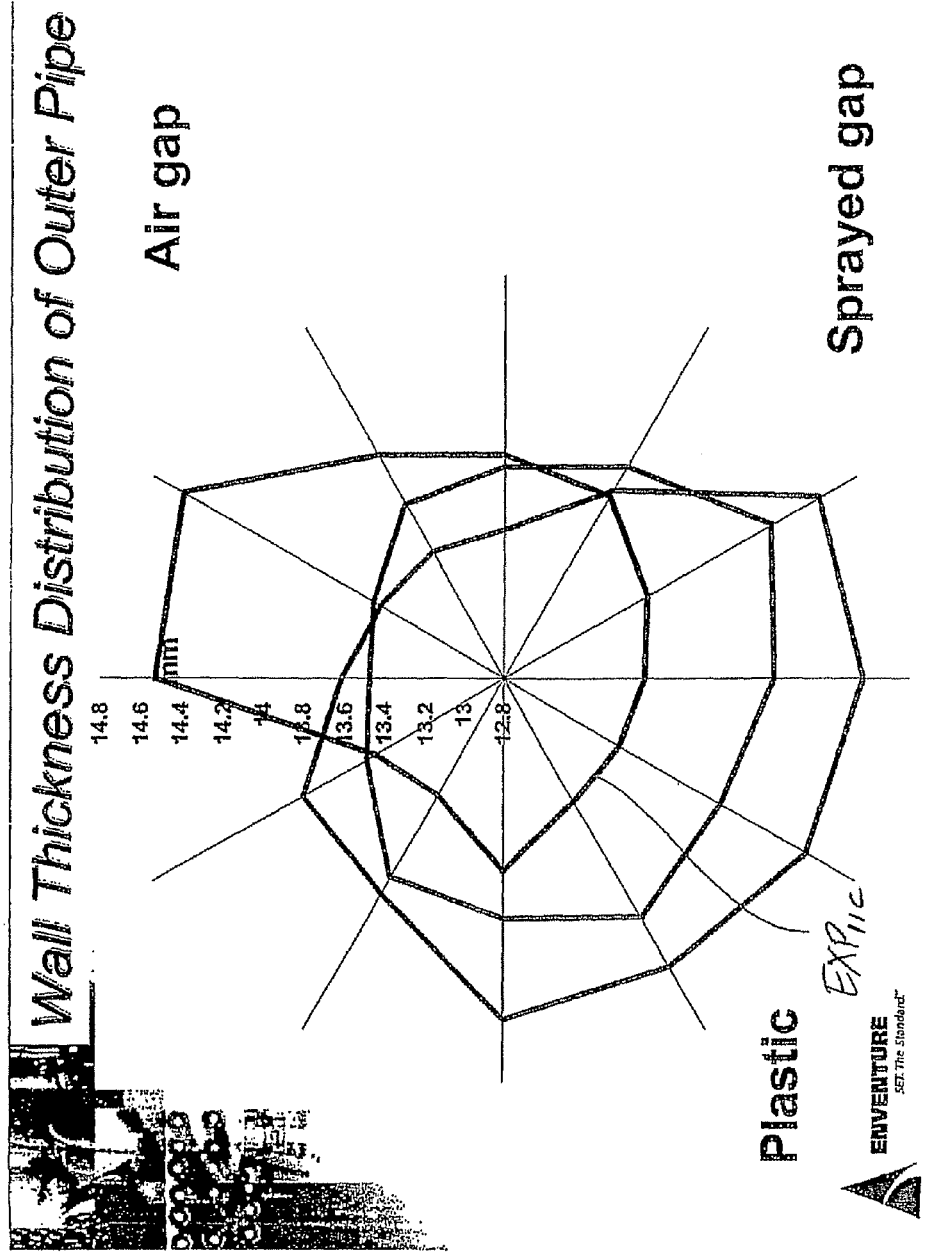

In an exemplary experimental embodiment $EXP_{11B}$ of method 3900, as illustrated in FIG. 62b, an expandable tubular member 3902a was provided, as per step 3902 of method 3900. The expandable tubular member 3902a was then coated with a layer 3904a of soft metal, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b. The wall thickness of the preexisting structure 3906b was then measured. A minimum wall thickness for the preexisting structure 3906b of approximately 13.5 mm and a maximum wall thickness for the preexisting structure 3906b of approximately 14.3 mm were exhibited.

In an exemplary experimental embodiment $EXP_{11C}$ of method 3900, as illustrated in FIG. 62c, an expandable tubular member 3902a was provided, as per step 3902 of method 3900. The expandable tubular member 3902a was then coated with a layer 3904a of plastic, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b. The wall thickness of the preexisting structure 3906b was then measured. A minimum wall thickness for the preexisting structure 3906b of approximately 13.5 mm and a maximum wall thickness for the preexisting structure 3906b of approximately 14.6 mm were exhibited.

Figure 63:
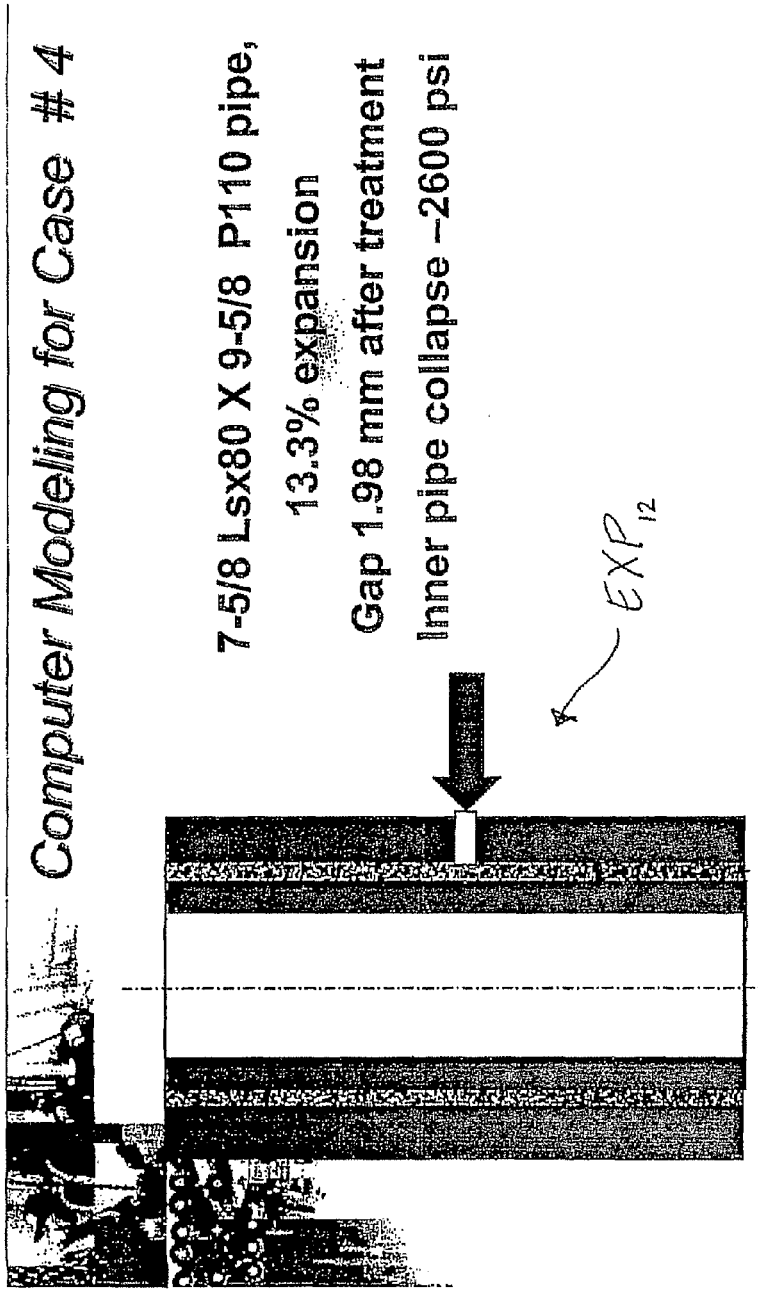
FIG. 63 is a graphical view illustrating an exemplary experimental embodiment of the collapse strength for a tubular assembly produced by the method of FIG. 39.

In an exemplary experimental embodiment $EXP_{12}$ of method 3900, as illustrated in FIG. 63, an expandable tubular member 3902a was provided, as per step 3902 of method 3900. The expandable tubular member 3902a was then coated with a layer 3904a, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b. The expandable tubular member 3902a was radially expanded and plastically deformed 13.3% from its original inner diameter against the preexisting structure 3906b. The expandable tubular member 3902a was an LSX-80 Grade pipe, commercially available from Lone Star Steel, with a 7⅝ inch inner diameter and the preexisting structure 3906b was a P110 Grade pipe with a 9⅝ inch inner diameter. The collapse strength of the expandable tubular member 3902a with layer 3904a and preexisting structure 3906b was measured at approximately 6300 psi. This was an unexpected result.

In an exemplary experimental embodiment of method 3900, an expandable tubular member 3902a was provided, as per step 3902 of method 3900. The expandable tubular member 3902a was then coated with a layer 3904a, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b. an expandable tubular member 3902a was provided, as per step 3902 of method 3900. The expandable tubular member 3902a was then coated with a layer 3904a, as per step 3904 of method 3900. The expandable tubular member 3902a was then positioned within a preexisting structure 3906b, as per step 3906 of method 3900. The expandable tubular member 3902a was then radially expanded and plastically deformed in the preexisting structure 3906b, expanding the preexisting structure 3096b by approximately 1 mm. The measurements and grades for the expandable tubular member 3902a and preexisting structure 3906b where:

|  | Outside diameter (mm) | Wall thickness (mm) | Grade |
|---|---|---|---|
| Preexisting structure | 219.1 | 13.58 | X65 |
| Expandable tubular member | 178.9 | 2.5 | 316L |

The collapse strength of the expandable tubular member 3902a and the preexisting structure 3906b combination was measure before and after expansion and found to increase by 21%.

In an exemplary experimental embodiment, an expandable tubular member was provided which had a collapse strength of approximately 70 ksi and included, by weight percent, 0.07% Carbon, 1.64% Manganese, 0.011% Phosphor, 0.001% Sulfur, 0.23% Silicon, 0.5% Nickel, 0.51% Chrome, 0.31% Molybdenum, 0.15% Copper, 0.021% Aluminum, 0.04% Vanadium, 0.03% Niobium, and 0.007% Titanium. Upon radial expansion and plastic deformation of the expandable tubular member, the collapse strength of the expandable tubular member increased to approximately 110 ksi.

Figure 64:
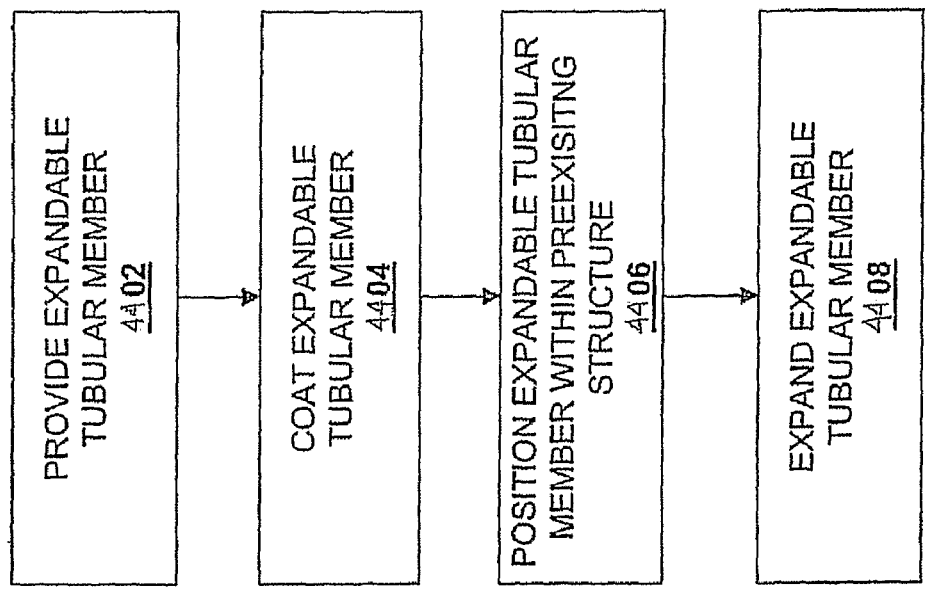
FIG. 64 is a flow chart illustrating an exemplary embodiment of a method for increasing the collapse strength of a tubular assembly.
Figure 65:
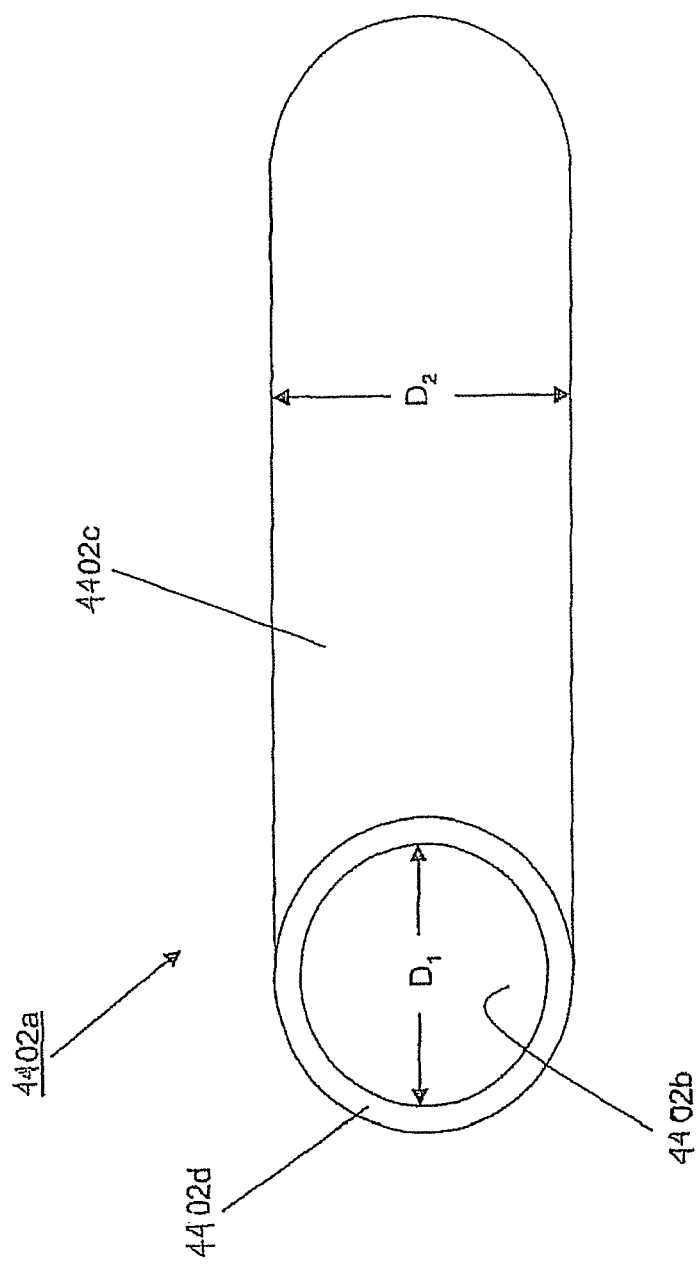
FIG. 65 is a perspective view illustrating an exemplary embodiment of an expandable tubular member used in the method of FIG. 64.

In an exemplary embodiment, as illustrated in FIGS. 64 and 65, a method 4400 for increasing the collapse strength of a tubular assembly begins with step 4402 in which an expandable tubular member 4402a is provided. The expandable tubular member 4402a includes an inner surface 4402b having an inner diameter $D_1$, an outer surface 4402c having an outer diameter $D_2$, and a wall thickness 4402d. In an exemplary embodiment, expandable tubular member 4402a may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the expandable tubular member 4402a may be, for example, the tubular assembly 10, 22, 100, or 200.

Figure 66A:
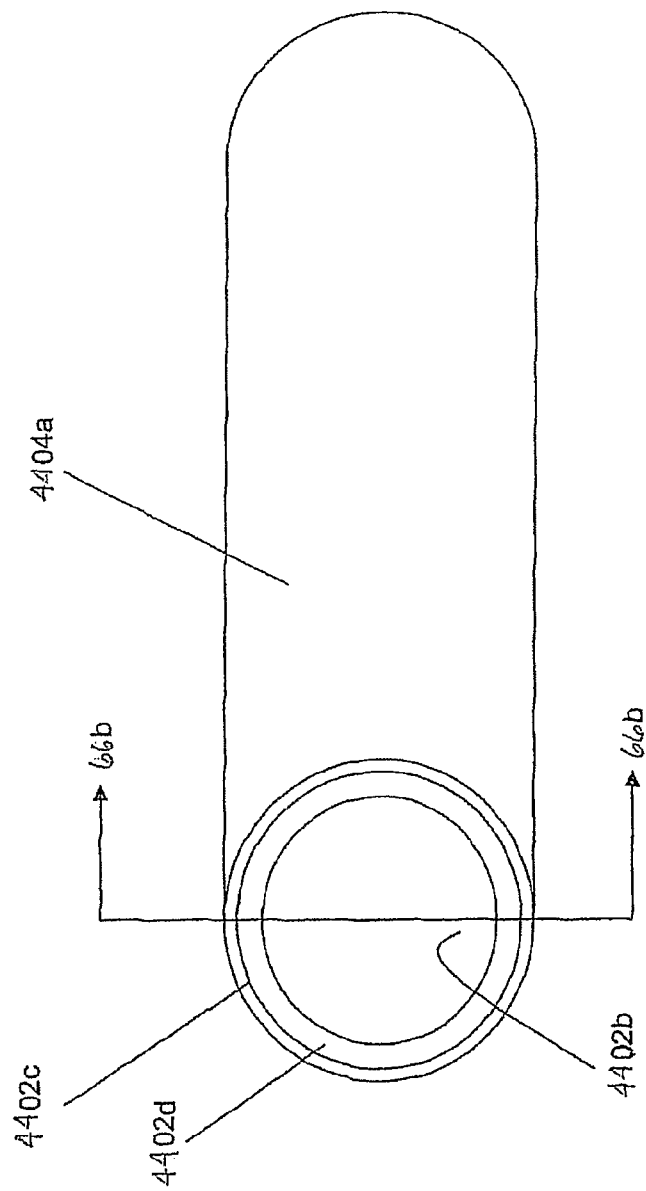
FIG. 66a is a perspective view illustrating an exemplary embodiment of the expandable tubular member of FIG. 65 coated with a layer of material according to the method of FIG. 64.
Figure 66B:
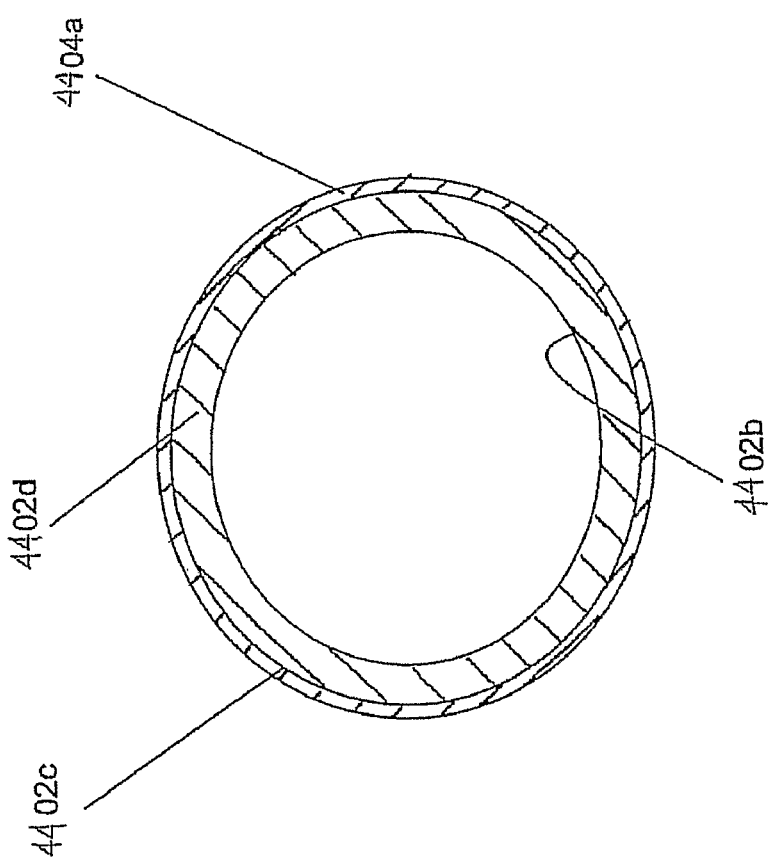
FIG. 66b is a cross sectional view taken along line 66b in FIG. 66a illustrating an exemplary embodiment of the expandable tubular member of FIG. 65 coated with a layer of material according to the method of FIG. 64.

Referring now to FIGS. 64, 66a and 66b, the method 4400 continues at step 4404 in which the expandable tubular member 4402a is coated with a layer 4404a of material. In an exemplary embodiment, the layer 4404a of material includes a plastic such as, for example, a PVC plastic, and/or a soft metal such as, for example, aluminum, an aluminum/zinc combination, or equivalent metals known in the art, and/or a composite material such as, for example, a carbon fiber material, and substantially covers the outer surface 4402c of expandable tubular member 4402a. In an exemplary embodiment, the layer 4404a of material is applied using conventional methods such as, for example, spray coating, vapor deposition, adhering layers of material to the surface, or a variety of other coating methods known in the art. In an exemplary embodiment, soft metals include metals having a lower yield strength than the expandable tubular member 4402a.

Figure 67:
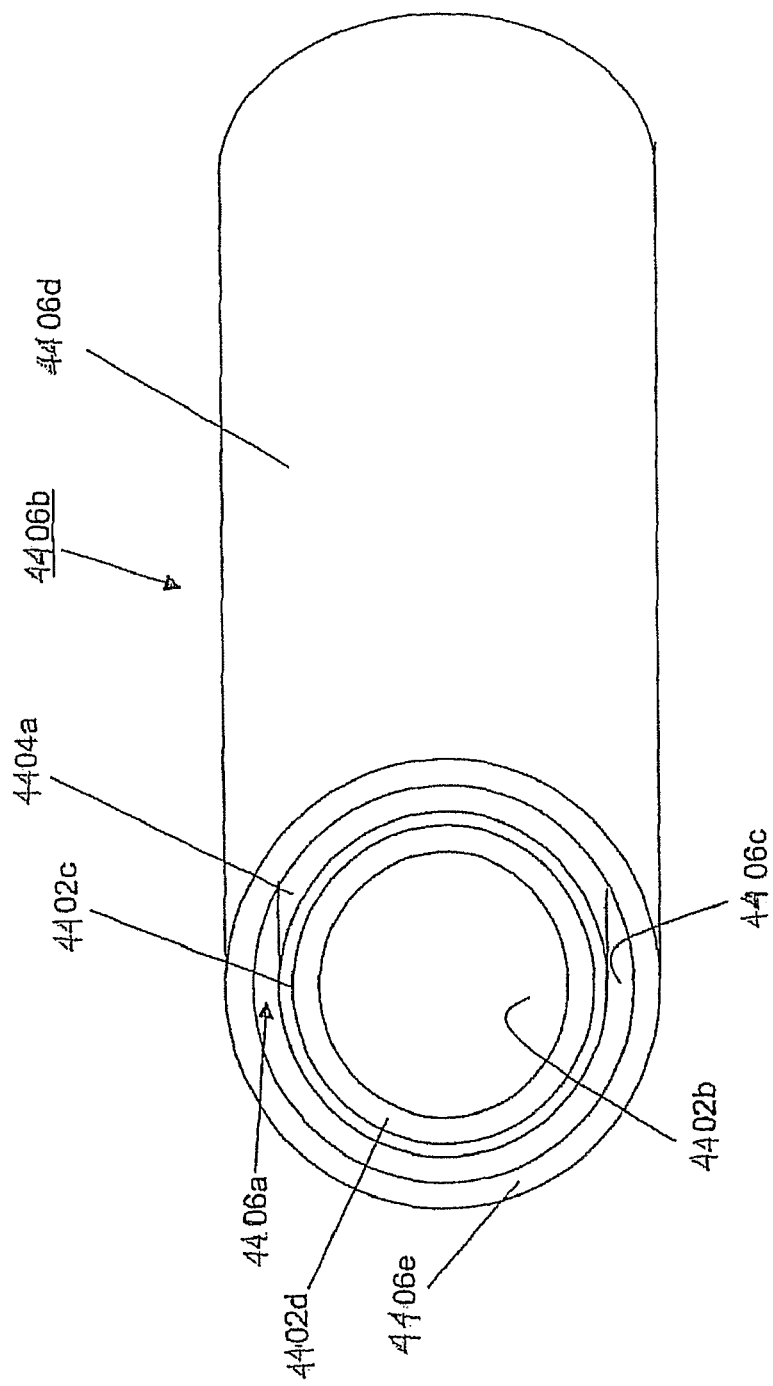
FIG. 67 is a perspective view illustrating an exemplary embodiment of the expandable tubular member and layer of FIG. 66a positioned within a preexisting structure according to the method of FIG. 64.
Figure 6B:
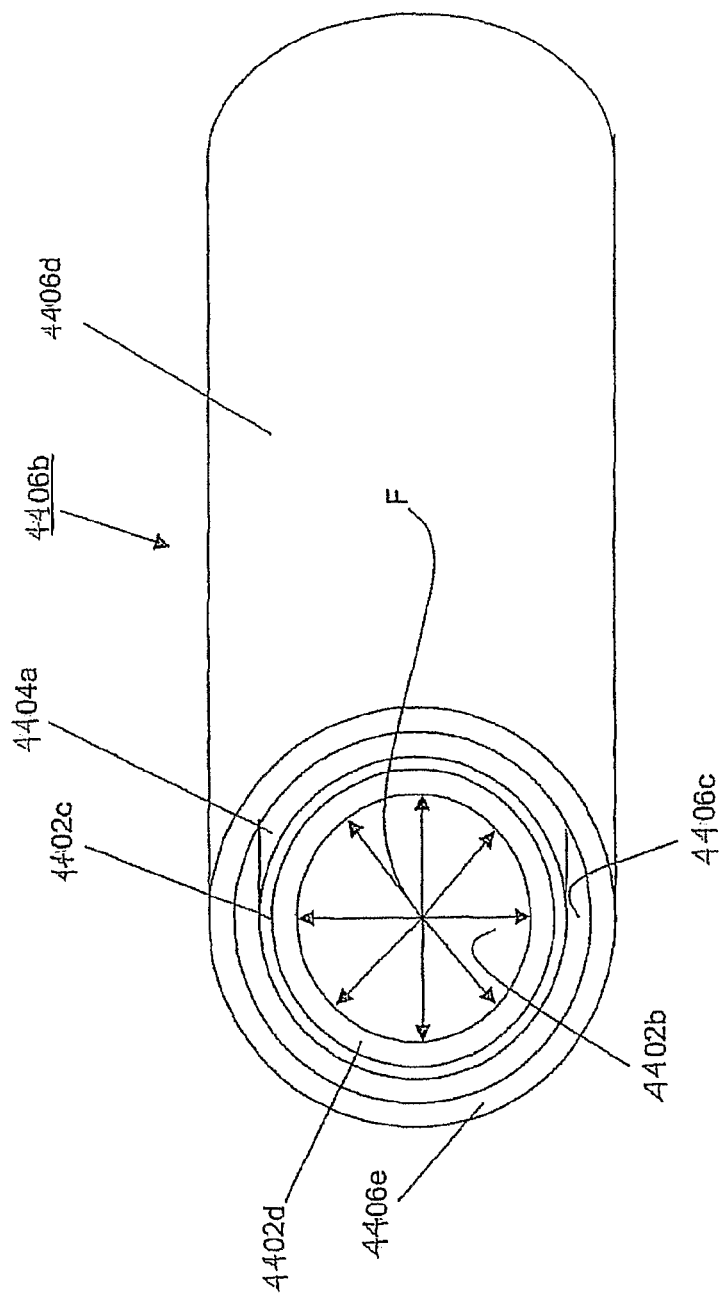
Figure 69A:
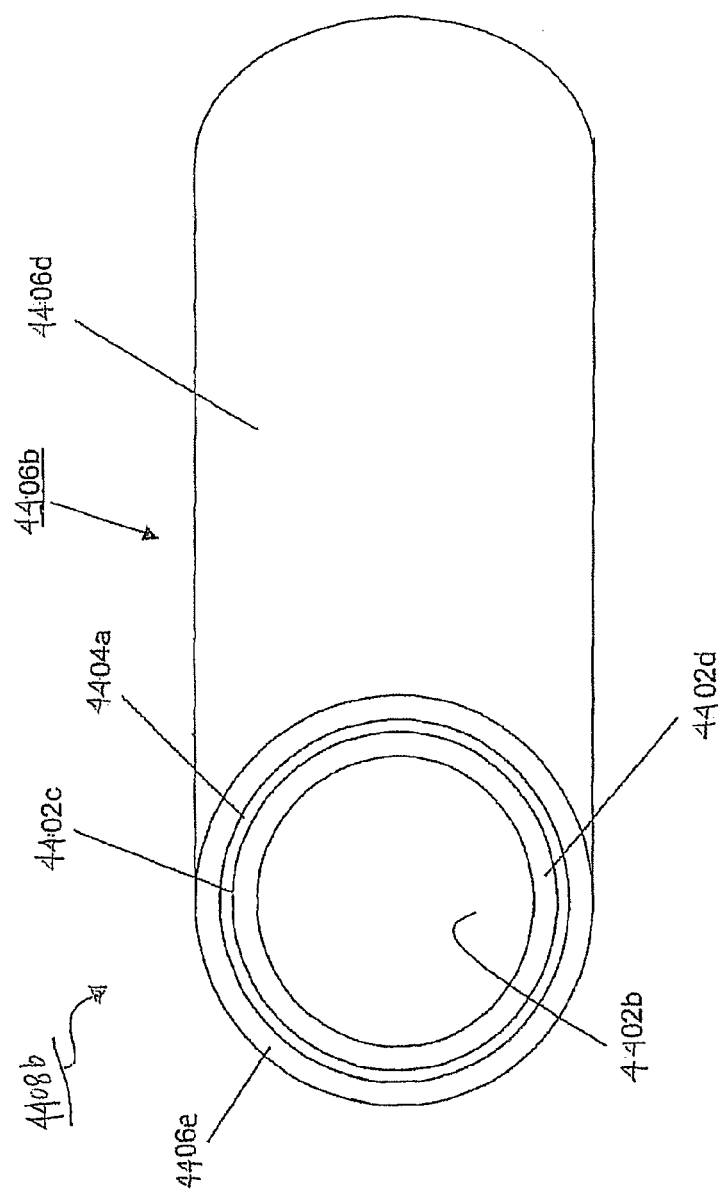
FIG. 69a is a perspective view illustrating an exemplary embodiment of the expandable tubular member and layer within the preexisting structure of FIG. 67 with the expandable tubular member expanded according to the method of FIG. 64.
Figure 696:
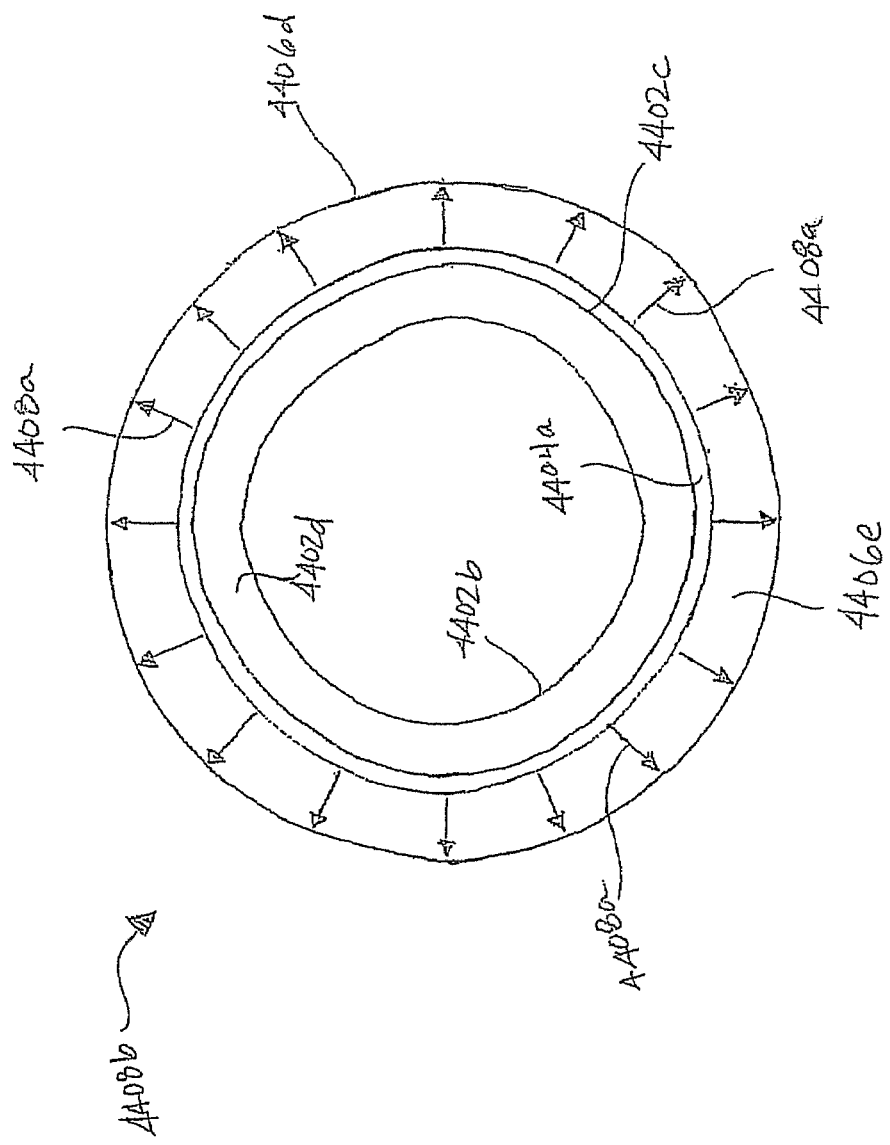

Referring now to FIGS. 64, 65 and 67, the method 4400 continues at step 4406 in which the expandable tubular member 4402a is positioned within a passage 4406a defined by a preexisting structure 4406b which includes an inner surface 4406c, an outer surface 4406d, and a wall thickness 4406e. In an exemplary embodiment, the preexisting structure 4406b may be, for example, the wellbores 16, 110, or 206. In an exemplary embodiment, the preexisting structure 4406b may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, preexisting structure 4406b may be, for example, the tubular assembly 10, 22, 100, or 200. In an exemplary embodiment, the cross sections of expandable tubular member 4402a and preexisting structure 4406b are substantially concentric when the expandable tubular member 4402a is positioned in the passage 4406a defined by preexisting structure 4406b.

Referring now to FIGS. 64, 68, 69a, and 69b, the method 4400 continues at step 4408 in which the expandable tubular member 4402a is radially expanded and plastically deformed. In an exemplary embodiment, a force F is applied radially towards the inner surface 4402b of expandable tubular member 4402a, the force F being sufficient to radially expand and plastically deform the expandable tubular member 4402a and the accompanying layer 4404a on its outer surface 4402c. The force F increases the inner diameter $D_1$ and the outer diameter $D_2$ of expandable tubular member 4402a until the layer 4404a engages the inner surface 4406c of preexisting structure 4406b and forms an interstitial layer between the expandable tubular member 4402a and the preexisting structure 4406b. In several exemplary embodiments, the expandable tubular member 4402a is radially expanded and plastically deformed using one or more conventional commercially available devices and/or using one or more of the methods disclosed in the present application.

In an exemplary embodiment, following step 4408 of method 4400, the layer 4404a forms an interstitial layer filling some or all of the annulus between the expandable tubular member 4402a and the preexisting structure 4406b. In an exemplary embodiment, the interstitial layer formed from the layer 4404a between the expandable tubular member 4402a and the preexisting structure 4406b results in the combination of expandable tubular member 4402a, the layer 4404a, and the preexisting structure 4406b exhibiting a higher collapse strength than would be exhibited without the interstitial layer. In an exemplary embodiment, the radial expansion and plastic deformation of expandable tubular member 4402a with layer 4404a into engagement with preexisting structure 4406b results in a modification of the residual stresses in one or both of the expandable tubular member 4402a and the preexisting structure 4406b. In an exemplary embodiment, the radial expansion and plastic deformation of expandable tubular member 4402a with layer 4404a into engagement with preexisting structure 4406b places at least a portion of the wall thickness of preexisting structure 4406b in circumferential tension.

In an exemplary embodiment, the radial expansion and plastic deformation of expandable tubular member 4402a with layer 4404a into engagement with preexisting structure 4406b provides a circumferential tensile force 4408a in the preexisting structure 4406b which exists about the circumference of the preexisting structure 4406b and is directed radially outward on the preexisting structure 4406b, as illustrated in FIG. 69b. The circumferential tensile force 4408a results in a tubular assembly 4408b which includes the tubular member 4402a, the layer 4404a, and the preexisting structure 4406b and which exhibits a higher collapse strength than is theoretically calculated using API Collapse modeling for a tubular member having a wall thickness equal to the sum of the wall thickness 4402d of the tubular member 4402a and the wall thickness 4406e of the preexisting structure 4406b. In an exemplary embodiment, the circumferential tensile force 4408a increases the collapse strength of the tubular assembly 4408b by providing a force which is opposite to a collapse inducing force, such that the collapse inducing force must be sufficient to collapse the tubular member 4402a and the preexisting structure 4406b, while also overcoming the circumferential tensile force 4408a.

In an exemplary experimental embodiment, the method 4400 was carried out to provide a tubular assembly 4408b with which to conduct collapse testing. The tubular member 4402a was provided having a 7⅝ inch outside diameter $D_2$ and a 0.375 inch wall thickness 4402d. The theoretical collapse strength of the tubular member 4402a was calculated to be approximately 2600 psi using API Collapse modeling. The preexisting structure 4406b was provided having a 9⅝ inch outside diameter and a 0.535 inch wall thickness 4406e. The theoretical collapse strength of the preexisting structure 4406b was calculated to be approximately 7587 psi using API Collapse modeling. The tubular member 4402a was then expanded 13.3% inside the preexisting structure 4406b such that the tubular member 4402a had an 8.505 inch outside diameter $D_2$, a 7.790 inch inside diameter $D_1$, and a 0.357 inch wall thickness 4402d. The expansion of the tubular member 4402a was conducted similar to method 4400, but without adding the layer 4404a to the outside surface of the tubular member 4402a, resulting in an air gap between the tubular member 4402a and the preexisting structure 4406b. The theoretical collapse strength of a tubular member having a 9⅝ inch outside diameter and an approximately 0.9 inch wall thickness, which is the combined thickness of the tubular member 4402a and the preexisting structure 4406b, was calculated to be approximately 16850 psi using API Collapse modeling. Collapse testing was then performed on the tubular assembly including the tubular member 4402a and the preexisting structure 4406b but without the layer 4404a, and a collapse pressure of 13197 psi was recorded. The following table summarizes the results of the collapse testing conducted on the tubular assembly 4408b including the tubular member 4402a and the preexisting structure 4406b but without the layer 4404a:

| tubular member 4402a theoretical collapse strength (psi) | preexisting structure 4406b theoretical collapse strength (psi) | tubular assembly 4408b theoretical collapse strength (psi) | tubular assembly 4408b measured collapse strength (psi) | remarks |
|---|---|---|---|---|
| 2600 | 7587 | 16850 | 13197 | None. |

In an exemplary experimental embodiment, the method 4400 was carried out to provide a tubular assembly 4408b with which to conduct collapse testing. The tubular member 4402a was provided having a 7⅝ inch outside diameter $D_2$ and a 0.375 inch wall thickness 4402d. The theoretical collapse strength of the tubular member 4402a was calculated to be approximately 2600 psi using API Collapse modeling. The preexisting structure 4406b was provided having a 9⅝ inch outside diameter and a 0.535 inch wall thickness 4406e. The theoretical collapse strength of the preexisting structure 4406b was calculated to be approximately 7587 psi using API Collapse modeling. The tubular member 4402a was then expanded 13.3% inside the preexisting structure 4406b such that the tubular member 4402a had an 8.505 inch outside diameter $D_2$, a 7.790 inch inside diameter $D_1$, and a 0.357 inch wall thickness 4402d. The expansion of the tubular member 4402a was conducted as per the method 4400, using a plastic material for the layer 4404a added to the outside surface of the tubular member 4402a. The theoretical collapse strength of a tubular member having a 9⅝ inch outside diameter and an approximately 0.9 inch wall thickness, which is the combined thickness of the tubular member 4402a and the preexisting structure 4406b, was calculated to be approximately 16850 psi using API Collapse modeling. Collapse testing was then performed on the tubular assembly including the tubular member 4402a with the plastic material layer 4404a and the preexisting structure 4406b, and a collapse pressure of 15063 psi was recorded. The 15063 psi collapse strength was a 14.14% collapse strength improvement over a tubular assembly including the tubular member 4402a and the preexisting structure 4406b but without the layer 4404a. This was an unexpected result. The following table summarizes the results of the collapse testing conducted on the tubular assembly 4408b including the tubular member 4402a and the preexisting structure 4406b with the plastic material layer 4404a:

| tubular member 4402a theoretical collapse strength (psi) | preexisting structure 4406b theoretical collapse strength (psi) | tubular assembly 4408b theoretical collapse strength (psi) | tubular assembly 4408b measured collapse strength (psi) | remarks |
|---|---|---|---|---|
| 2600 | 7587 | 16850 | 15063 | This was an unexpected result. |

In an exemplary experimental embodiment, the method 4400 was carried out to provide a tubular assembly 4408b with which to conduct collapse testing. The tubular member 4402a was provided having a 7⅝ inch outside diameter $D_2$ and a 0.375 inch wall thickness 4402d. The theoretical collapse strength of the tubular member 4402a was calculated to be approximately 2600 psi using API Collapse modeling. The preexisting structure 4406b was provided having a 9⅝ inch outside diameter and a 0.535 inch wall thickness 4406e. The theoretical collapse strength of the preexisting structure 4406b was calculated to be approximately 7587 psi using API Collapse modeling. The tubular member 4402a was then expanded 13.3% inside the preexisting structure 4406b such that the tubular member 4402a had an 8.505 inch outside diameter $D_2$, a 7.790 inch inside diameter $D_1$, and a 0.357 inch wall thickness 4402d. The expansion of the tubular member 4402a was conducted as per the method 4400, using a aluminum material for the layer 4404a added to the outside surface of the tubular member 4402a. The theoretical collapse strength of a tubular member having a 9⅝ inch outside diameter and an approximately 0.9 inch wall thickness, which is the combined thickness of the tubular member 4402a and the preexisting structure 4406b, was calculated to be approximately 16850 psi using API Collapse modeling. Collapse testing was then performed on the tubular assembly including the tubular member 4402a with the aluminum material layer 4404a and the preexisting structure 4406b, and a collapse pressure of at least 20000 psi was recorded. The tubular assembly including the tubular member 4402a with the aluminum material layer 4404a and the preexisting structure 4406b withstood the maximum 20000 psi pressure that the test chamber was capable of producing. The at least 20000 psi collapse strength was at least a 51.15% collapse strength improvement over a tubular assembly including the tubular member 4402a and the preexisting structure 4406b but without the layer 4404a. This was an unexpected result. The at least 20000 psi collapse strength also exceeded the 16850 psi theoretical collapse strength calculated using API Collapse modeling. This was an unexpected result. The following table summarizes the results of the collapse testing conducted on the tubular assembly 4408b including the tubular member 4402a and the preexisting structure 4406b with the aluminum material layer 4404a:

| tubular member 4402a theoretical collapse strength (psi) | preexisting structure 4406b theoretical collapse strength (psi) | tubular assembly 4408b theoretical collapse strength (psi) | tubular assembly 4408b measured collapse strength (psi) | remarks |
|---|---|---|---|---|
| 2600 | 7587 | 16850 | at least 20000 | This was an unexpected result. |

Referring now to FIG. 70, in an exemplary experimental embodiment, the method 4400 was carried out to provide a tubular assembly 4408b with which to conduct collapse testing. The tubular member 4402a was provided having a 7⅝ inch outside diameter $D_2$ and a 0.375 inch wall thickness 4402d. The theoretical collapse strength of the tubular member 4402a was calculated to be approximately 2600 psi using API Collapse modeling. The preexisting structure 4406b was provided having a 9⅝ inch outside diameter and a 0.535 inch wall thickness 4406e. The theoretical collapse strength of the preexisting structure 4406b was calculated to be approximately 7587 psi using API Collapse modeling. The tubular member 4402a was then expanded 13.3% inside the preexisting structure 4406b such that the tubular member 4402a had an 8.505 inch outside diameter $D_2$, a 7.790 inch inside diameter $D_1$, and a 0.357 inch wall thickness 4402d. The expansion of the tubular member 4402a was conducted as per the method 4400, using an aluminum/zinc material for the layer 4404a added to the outside surface of the tubular member 4402a. A test aperture 4500 was formed in the preexisting structure 4406b which extended from the outside surface 4406d, through the wall thickness 4406e, and to the inside surface 4406c of the preexisting structure 4406b. Pressure was applied to the tubular member 4402a through the testing aperture 4500, and a collapse pressure of 6246 psi was recorded. The 6246 psi collapse strength exceeded the 2600 psi theoretical collapse strength calculated using API Collapse modeling. This was an unexpected result. The following table summarizes the results of the collapse testing conducted on the tubular member 4402a after expanding the tubular member 4402a in the preexisting structure 4406b with the aluminum/zinc material layer 4404a:

| tubular member 4402a theoretical collapse strength (psi) | preexisting structure 4406b theoretical collapse strength (psi) | tubular assembly 4408b theoretical collapse strength (psi) | tubular member 4402a measured collapse strength (psi) | remarks |
|---|---|---|---|---|
| 2600 | 7587 | 16850 | 6246 | This was an unexpected result. |

Figure 71:
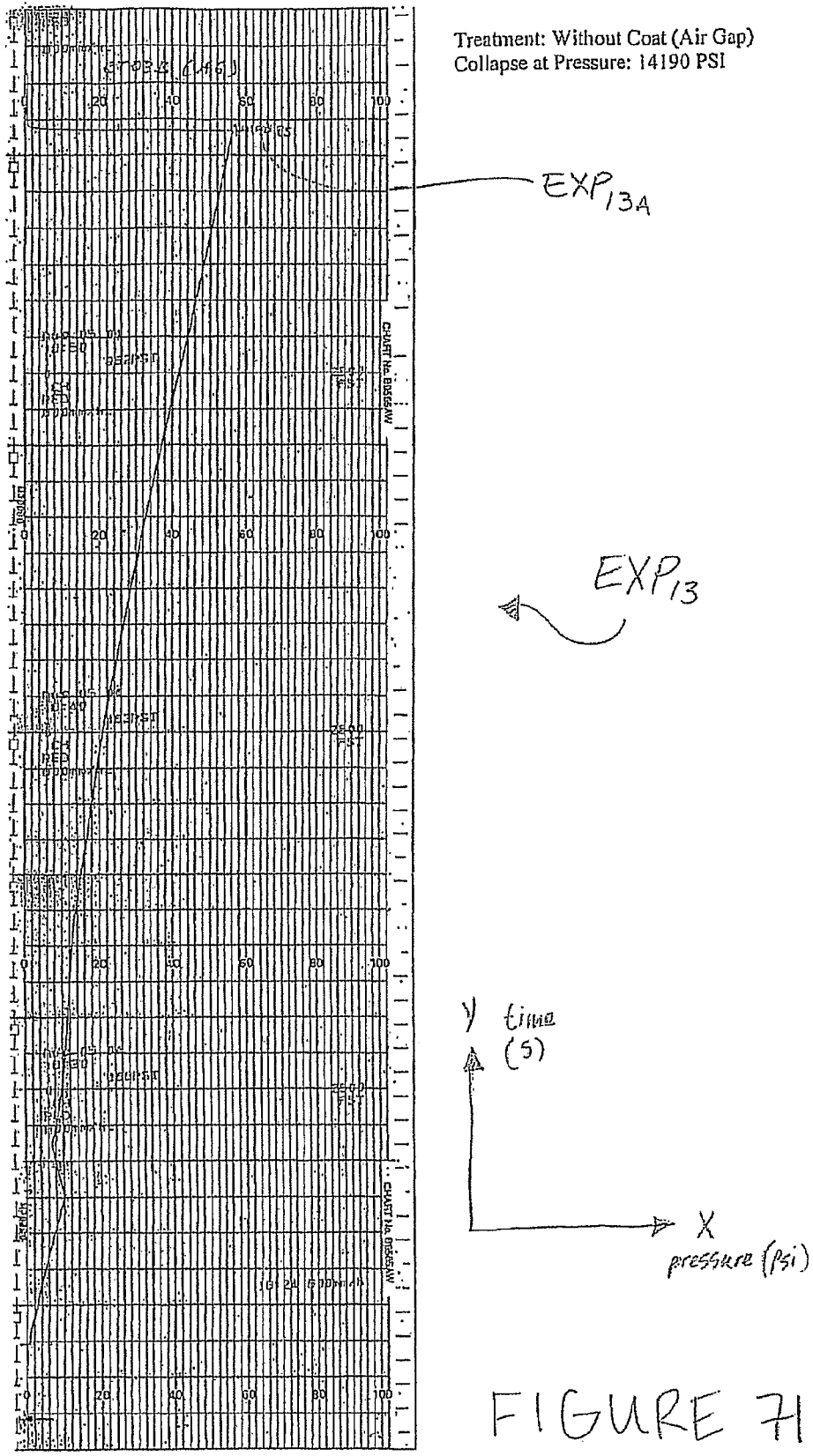
FIG. 71 is a graph illustrating an exemplary experimental embodiment of a collapse test conducted on the expandable tubular member and the preexisting structure of FIG. 69a but with an air gap rather than the layer between them.

Referring now to FIG. 71, in an exemplary experimental embodiment $EXP_{13}$, the method 4400 was carried out to provide a tubular assembly 4408b with which to conduct collapse testing. The tubular member 4402a was provided which was fabricated from a LSX-80 Grade material, commercially available from Lone Star Steel, and included a 7⅝ inch outside diameter $D_2$. The theoretical collapse strength of the tubular member 4402a was calculated to be approximately 2600 psi using API Collapse modeling. The preexisting structure 4406b was provided which was fabricated from a P-110 Grade material and included a 9⅝ inch outside diameter. The theoretical collapse strength of the preexisting structure 4406b was calculated to be approximately 7587 psi using API Collapse modeling. The tubular member 4402a was then expanded inside the preexisting structure 4406b. The expansion of the tubular member 4402a was conducted similar to method 4400, but without adding the layer 4404a to the outside surface of the tubular member 4402a, resulting in an air gap between the tubular member 4402a and the preexisting structure 4406b. The theoretical collapse strength of a tubular assembly including the tubular member 4402a and the preexisting structure 4406b was calculated to be approximately 16850 psi using API Collapse modeling. Collapse testing was then performed on the tubular assembly including the tubular member 4402a and the preexisting structure 4406b but without the layer 4404a, as illustrated in FIG. 71. The graph of FIG. 71 shows pressure plotted on the X axis and time plotted on the Y axis. The pressure was increased to a data point $EXP_{13A}$ where the tubular assembly 4408a collapsed. The pressure recorded at data point $EXP_{13A}$ was 14190 psi. The following table summarizes the results of the collapse testing conducted on the tubular assembly 4408b including the tubular member 4402a and the preexisting structure 4406b but without the layer 4404a:

| tubular member 4402a theoretical collapse strength (psi) | preexisting structure 4406b theoretical collapse strength (psi) | tubular assembly 4408b theoretical collapse strength (psi) | tubular assembly 4408b measured collapse strength (psi) | remarks |
|---|---|---|---|---|
| 2600 | 7587 | 16850 | 14190 | None. |

Referring now to FIG. 72, in an exemplary experimental embodiment $EXP_{14}$, the method 4400 was carried out to provide a tubular assembly 4408b with which to conduct collapse testing. The tubular member 4402a was provided which was fabricated from a LSX-80 Grade material, commercially available from Lone Star Steel, and included a 7⅝ inch outside diameter $D_2$. The theoretical collapse strength of the tubular member 4402a was calculated to be approximately 2600 psi using API Collapse modeling. The preexisting structure 4406b was provided which was fabricated from a P-110 Grade material and included a 9⅝ inch outside diameter. The theoretical collapse strength of the preexisting structure 4406b was calculated to be approximately 7587 psi using API Collapse modeling. The tubular member 4402a was then expanded inside the preexisting structure 4406b. The expansion of the tubular member 4402a was conducted as per the method 4400, using a plastic material for the layer 4404a added to the outside surface of the tubular member 4402a. The theoretical collapse strength of a tubular assembly including the tubular member 4402a and the preexisting structure 4406b was calculated to be approximately 16850 psi using API Collapse modeling. Collapse testing was then performed on the tubular assembly including the tubular member 4402a with the plastic material layer 4404a and the preexisting structure 4406b, as illustrated in FIG. 72. The graph of FIG. 72 shows pressure plotted on the X axis and time plotted on the Y axis. The pressure was increased to a data point $EXP_{14A}$ where the tubular assembly 4408a collapsed. The pressure recorded at data point $EXP_{14A}$ was 14238 psi. The following table summarizes the results of the collapse testing conducted on the tubular assembly 4408b including the tubular member 4402a and the preexisting structure 4406b with the plastic material layer 4404a:

Plastic material layer 4404a results:

| tubular member 4402a theoretical collapse strength (psi) | preexisting structure 4406b theoretical collapse strength (psi) | tubular assembly 4408b theoretical collapse strength (psi) | tubular assembly 4408b measured collapse strength (psi) | remarks |
|---|---|---|---|---|
| 2600 | 7587 | 16850 | 14238 | This was an unexpected result. |

Referring now to FIG. 73, in an exemplary experimental embodiment $EXP_{15}$, the method 4400 was carried out to provide a tubular assembly 4408b with which to conduct collapse testing. The tubular member 4402a was provided which was fabricated from a LSX-80 Grade material, commercially available from Lone Star Steel, and included a 7⅝ inch outside diameter $D_2$. The theoretical collapse strength of the tubular member 4402a was calculated to be approximately 2600 psi using API Collapse modeling. The preexisting structure 4406b was provided which was fabricated from a P-110 Grade material and included a 9⅝ inch outside diameter. The theoretical collapse strength of the preexisting structure 4406b was calculated to be approximately 7587 psi using API Collapse modeling. The tubular member 4402a was then expanded inside the preexisting structure 4406b. The expansion of the tubular member 4402a was conducted as per the method 4400, using an aluminum material for the layer 4404a added to the outside surface of the tubular member 4402a. The theoretical collapse strength of a tubular assembly including the tubular member 4402a and the preexisting structure 4406b was calculated to be approximately 16850 psi using API Collapse modeling. Collapse testing was then performed on the tubular assembly including the tubular member 4402a with the aluminum material layer 4404a and the preexisting structure 4406b, as illustrated in FIG. 73. The graph of FIG. 73 shows pressure plotted on the X axis and time plotted on the Y axis. The pressure was increased to a data point $EXP_{15A}$ where the tubular assembly 4408a collapsed. The pressure recorded at data point $EXP_{15A}$ was 20730 psi. The 20730 psi collapse strength was a 46.09% collapse strength improvement over a tubular assembly including the tubular member 4402a and the preexisting structure 4406b but without the layer 4404a. This was an unexpected result. The 20730 psi collapse strength also exceeded the 16850 psi theoretical collapse strength calculated using API Collapse modeling. This was an unexpected result. The following table summarizes the results of the collapse testing conducted on the tubular assembly 4408b including the tubular member 4402a and the preexisting structure 4406b with the aluminum material layer 4404a:

| tubular member 4402a theoretical collapse strength (psi) | preexisting structure 4406b theoretical collapse strength (psi) | tubular assembly 4408b theoretical collapse strength (psi) | tubular assembly 4408b measured collapse strength (psi) | remarks |
|---|---|---|---|---|
| 2600 | 7587 | 16850 | 20730 | This was an unexpected result. |

Referring now to FIG. 74, in an exemplary experimental embodiment $EXP_{16}$, the method 4400 was carried out to provide a tubular assembly 4408b with which to conduct collapse testing. The tubular member 4402a was provided which was fabricated from a LSX-80 Grade material, commercially available from Lone Star Steel, and included a 7⅝ inch outside diameter $D_2$. The theoretical collapse strength of the tubular member 4402a was calculated to be approximately 2600 psi using API Collapse modeling. The preexisting structure 4406b was provided which was fabricated from a P-110 Grade material and included a 9⅝ inch outside diameter. The theoretical collapse strength of the preexisting structure 4406b was calculated to be approximately 7587 psi using API Collapse modeling. The tubular member 4402a was then expanded inside the preexisting structure 4406b. The expansion of the tubular member 4402a was conducted as per the method 4400, using an aluminum-zinc material for the layer 4404a added to the outside surface of the tubular member 4402a. The theoretical collapse strength of a tubular assembly including the tubular member 4402a and the preexisting structure 4406b was calculated to be approximately 16850 psi using API Collapse modeling. Collapse testing was then performed on the tubular assembly including the tubular member 4402a with the aluminum-zinc material layer 4404a and the preexisting structure 4406b, as illustrated in FIG. 74. The graph of FIG. 74 shows pressure plotted on the X axis and time plotted on the Y axis. The pressure was increased to a data point $EXP_{164}$ where the tubular assembly 4408a collapsed. The pressure recorded at data point $EXP_{164}$ was 20200 psi. The 20200 psi collapse strength was a 42.35% collapse strength improvement over a tubular assembly including the tubular member 4402a and the preexisting structure 4406b but without the layer 4404a. This was an unexpected result. The 20200 psi collapse strength also exceeded the 16850 psi theoretical collapse strength calculated using API Collapse modeling. This was an unexpected result. The following table summarizes the results of the collapse testing conducted on the tubular assembly 4408b including the tubular member 4402a and the preexisting structure 4406b with the aluminum material layer 4404a:

| tubular member 4402a theoretical collapse strength (psi) | preexisting structure 4406b theoretical collapse strength (psi) | tubular assembly 4408b theoretical collapse strength (psi) | tubular assembly 4408b measured collapse strength (psi) | remarks |
| --- | --- | --- | --- | --- |
| 2600 | 7587 | 16850 | 20200 | This was an unexpected result. |

Figure 75:
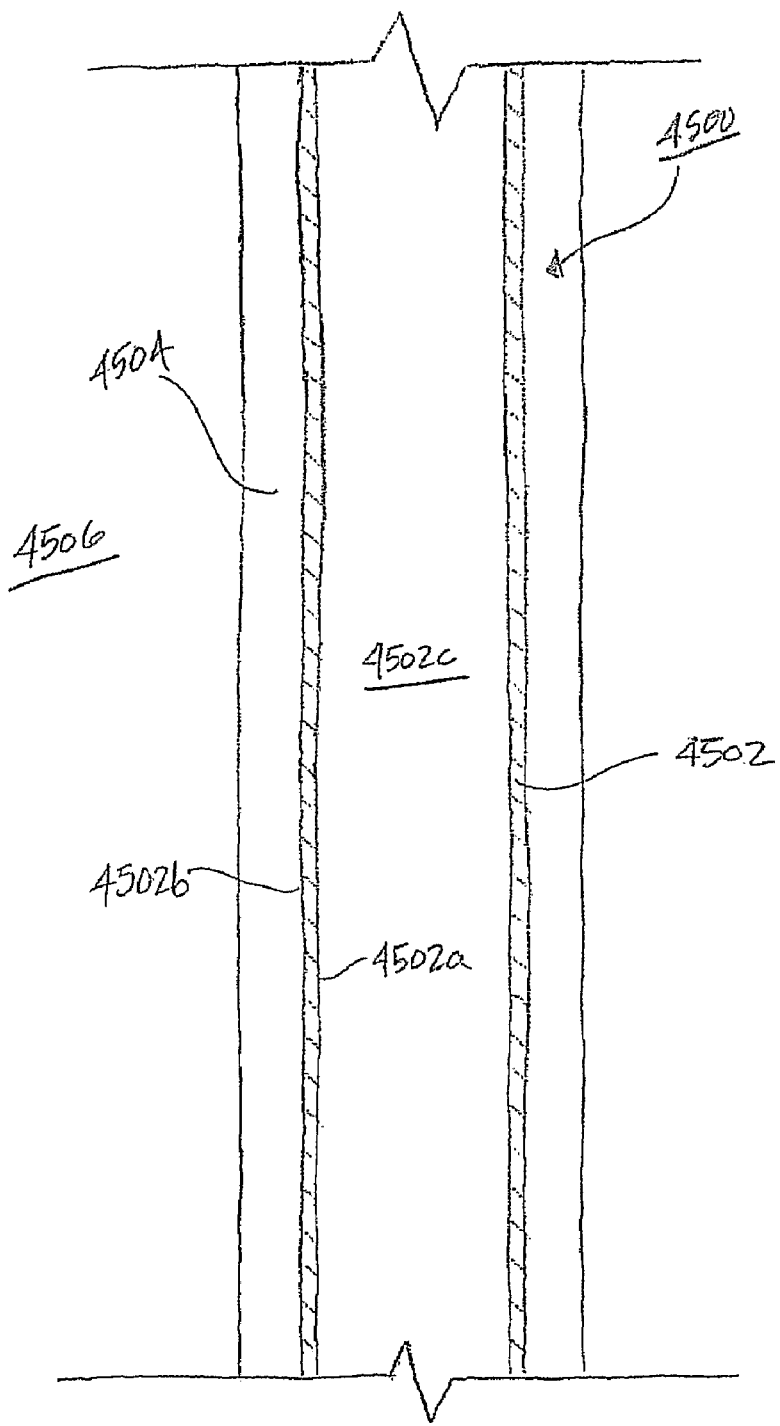
FIG. 75 is a partial cross sectional view illustrating an exemplary embodiment of an expandable tubular member positioned in a preexisting structure.

Referring now to FIG. 75, an expandable tubular member 4500 is illustrated. The expandable tubular member 4500 may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the expandable tubular member 4500 may be, for example, the tubular assembly 10, 22, 100, or 200. The expandable tubular member 4500 includes an elongated member 4502 having an inner surface 4502a, an outer surface 4502b located opposite the inner surface 4502a, and defines a passageway 4502c along its length. The expandable tubular member 4500 is positioned in a passageway 4504 which is defined by a preexisting structure 4506. In an exemplary embodiment, the preexisting structure 4506 may be an earth formation and the passageway 4504 may be a wellbore. In an exemplary embodiment, the preexisting structure 4506 may be a tubular member such as, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500 or the tubular assembly 10, 22, 100, or 200.

Figure 76A:
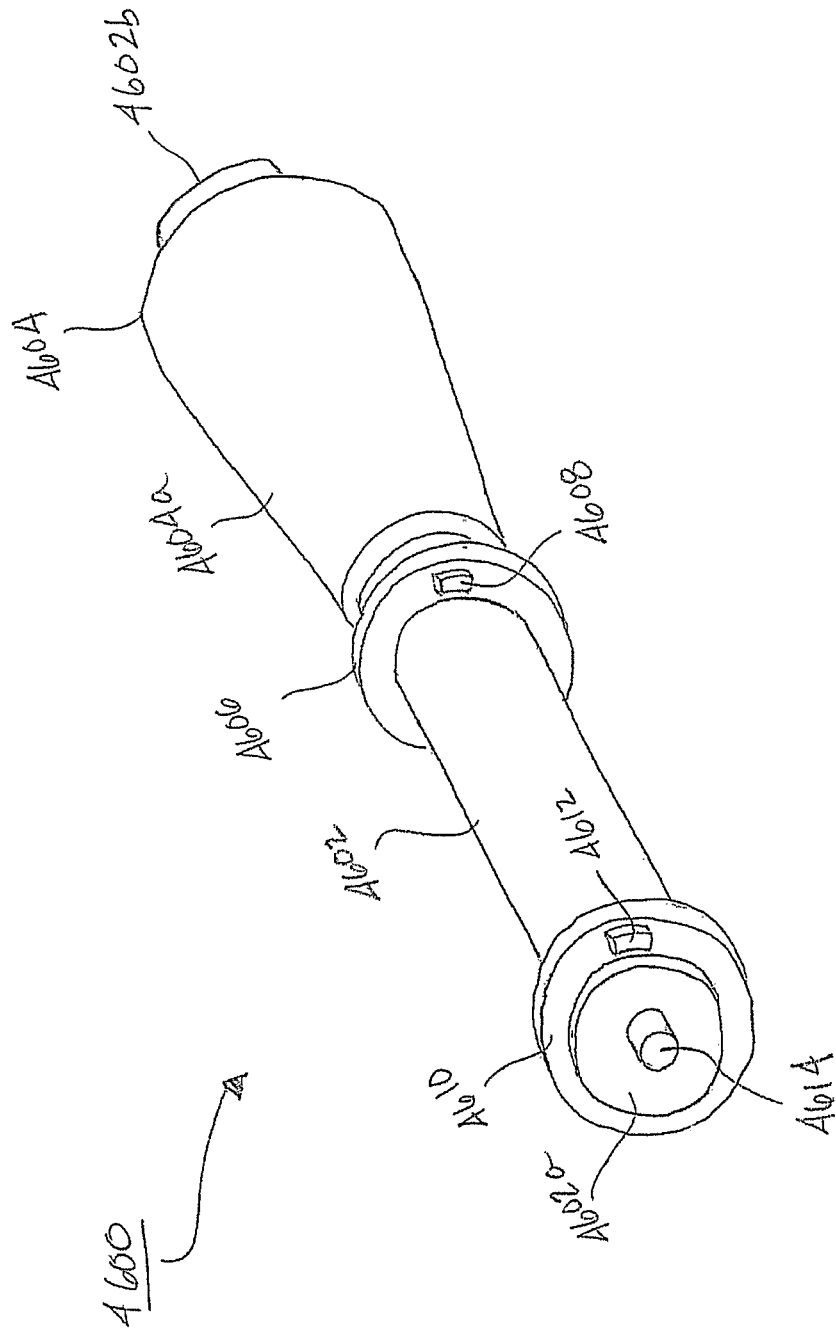
FIG. 76a is a perspective view illustrating an exemplary embodiment of a tubular member expansion apparatus used with the expandable tubular member of FIG. 75.
Figure 76B:
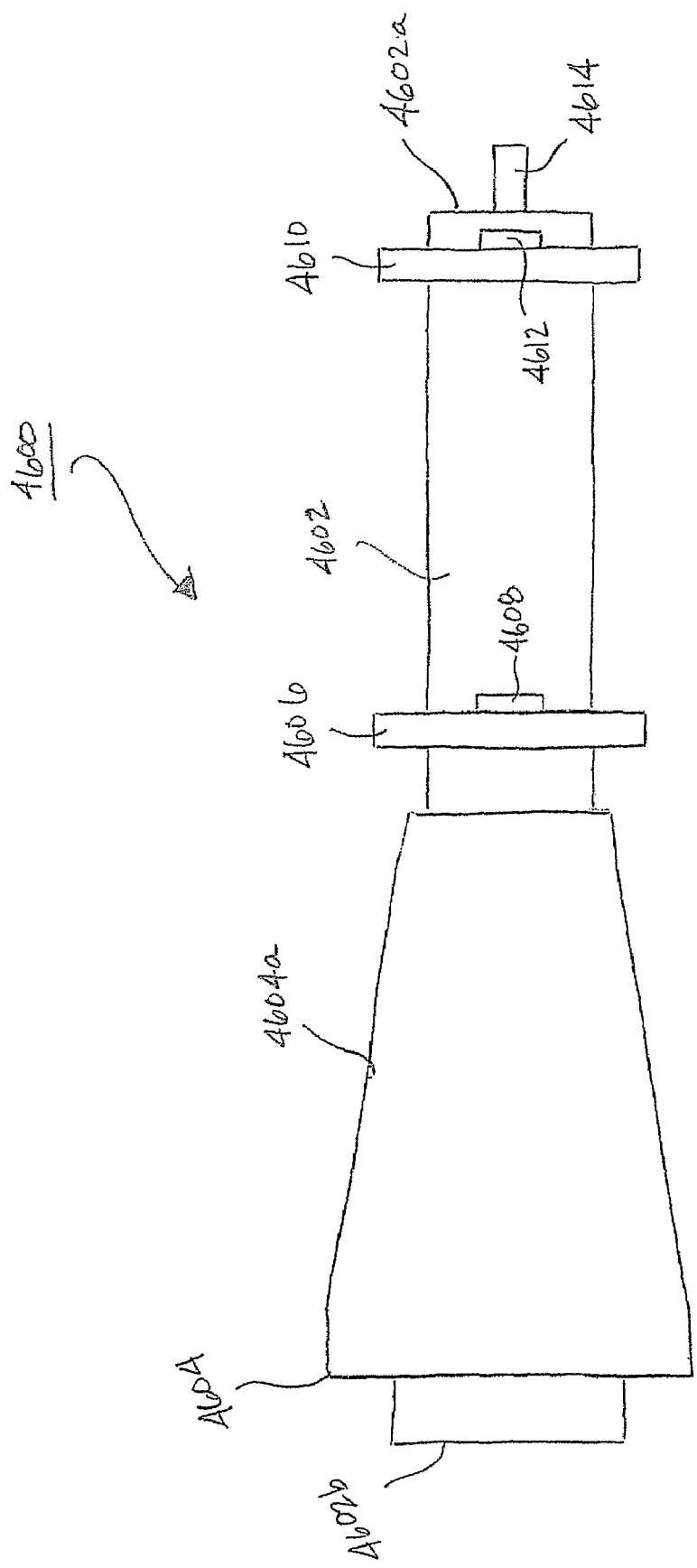

Referring now to FIGS. 76a and 76b, a tubular member expansion apparatus 4600 is illustrated. The tubular member expansion apparatus 4600 includes an elongated cylindrical member 4602 having a pair of opposing distal ends 4602a and 4602b. An expansion member 4604 is located on the elongated cylindrical member 4602 adjacent the distal end 4602b and, in an exemplary embodiment, includes a substantially conical surface 4604a along its length. A centralizing flange member 4606 extends from the elongated cylindrical member 4602 adjacent the expansion member 4604 and includes an expansion monitoring device 4608 coupled to its surface. A centralizing flange member 4610 extends from the elongated cylindrical member 4602 adjacent the distal end 4602a and includes an expansion monitoring device 4612 coupled to its surface. A drill string coupler 4614 extends from the distal end 4602a of the elongated cylindrical member 4602. In an exemplary embodiment, the expansion monitoring devices 4608 and 4612 includes accelerometers used for measuring acoustical signals. In an exemplary embodiment, the expansion monitoring devices 4608 and 4612 may measure operational signals such as, for example, vibration, acoustical, pressure, temperature, acceleration, and a variety of other operating signals known in the art. Furthermore, the signals from the expansion monitoring devices 4608 and 4612 may further be processed to adaptively modify the operation of the tubular member expansion apparatus 4600. In an exemplary embodiment, the expansion member 4604 may include a variety of expansion devices such as, for example, a rotary expansion device, an expansion cone, a hydroforming device, combinations thereof, and/or a variety of expansion devices known in the art.

Referring now to FIG. 76c, in an alternative embodiment, a tubular member expansion apparatus 4616 is substantially similar in design and operation to the tubular member expansion apparatus 4600, described above with reference to FIGS. 76a and 76b, with the provision of a controller 4616a. The controller 4616a is coupled to the expansion monitoring devices 4608 and 4612 and is operable to monitor and control tubular member expansion apparatus 4616, for example, as a function of the signals generated by the expansion monitoring devices 4608 and 4612.

Figure 77A:
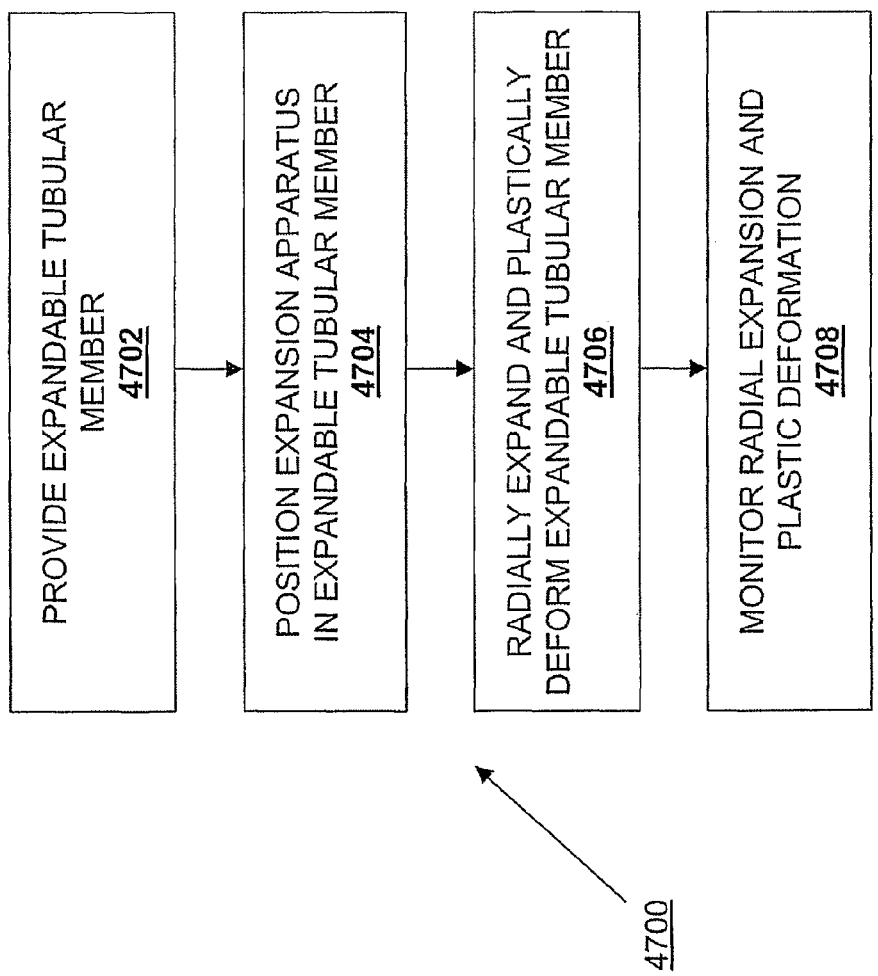
FIG. 77a is a flow chart illustrating an exemplary embodiment of a method for radially expanding and plastically deforming an expandable tubular member.
Figure 77B:
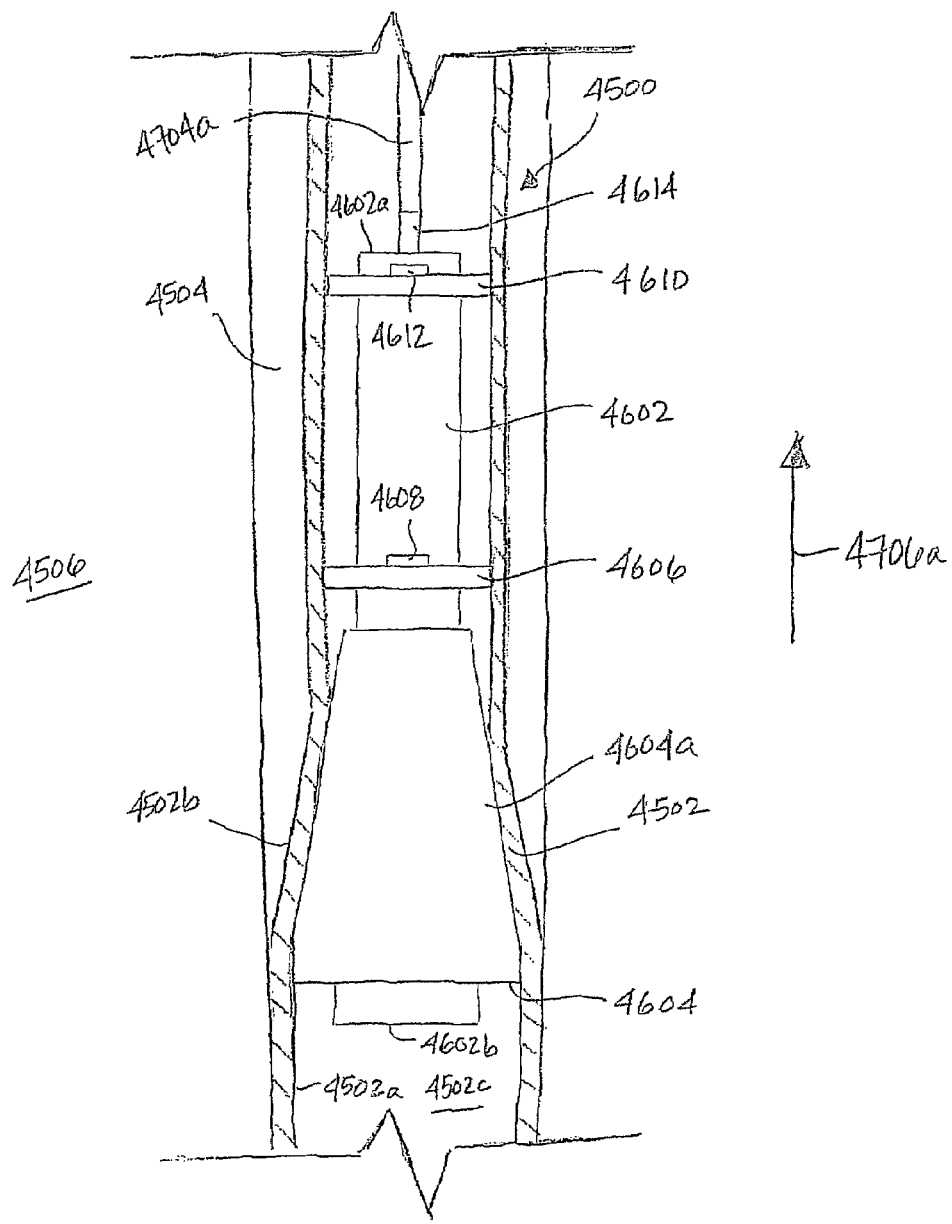
FIG. 77b is a partial cross sectional view illustrating an exemplary embodiment of the tubular member expansion apparatus of FIG. 76a radially expanding and plastically deforming the expandable tubular member of FIG. 75.

Referring now to FIGS. 77a and 77b, a method 4700 for radially expanding and plastically deforming an expandable tubular member is illustrated. The method 4700 begins at step 4702 where the expandable tubular member 4500, described above with reference to FIG. 75, is provided. The method 4700 then proceeds to step 4704 where the tubular member expansion apparatus 4600 is positioned in the expandable tubular member 4500. A drill string 4704a is coupled to the drill string coupler 4614, and the tubular member expansion apparatus 4600 is positioned in the passageway 4502c of the expandable tubular member 4500 such that the centralizing member 4610 engages the inner surface 4502a of the expandable tubular member 4500, the centralizing member 4606 engages the inner surface 4502a of the expandable tubular member 4500, and the conical surface 4604a of the expansion member 4604 engages the inner surface 4502a of the expandable tubular member 4500, as illustrated in FIG. 77b. Engagement of the conical surface 4604a with the inner surface 4502a of the expandable tubular member 4500 radially expands and plastically deforms the expandable tubular member 4500 such that the outer surface 4502b of the expandable tubular member 4500 engages the preexisting structure 4506.

The method 4700 then proceeds to step 4706 where the expandable tubular member 4500 is radially expanded and plastically deformed. The tubular member expansion apparatus 4600 is moved in a direction 4706a through the passageway 4502c of the expandable tubular member 4500, which radially expands and plastically deforms the expandable tubular member 4500 along its length such that the outer surface 4502b of the expandable tubular member 4500 engages the preexisting structure 4506 along its length. In an exemplary embodiment, the tubular member expansion apparatus 4600 may radially expand and plastically deform the expandable tubular member 4500 using a variety of methods such as, for example, pulling the tubular member expansion apparatus 4600 through the passageway 4502*c* with the drill string 4704*a*, pumping a pressurized fluid adjacent the distal end 4602*b* of the tubular member expansion apparatus 4600 to push the tubular member expansion apparatus 4600 through the passageway 4502*c*, a variety of other methods known in the art and/or one or more of the methods disclosed in one or more of the following: (1) U.S. Pat. No. 6,497,289, which was filed as U.S. patent application Ser. No. 09/454,139, filed on Dec. 3, 1999, which claims priority from provisional application 60/111,293, filed on Dec. 7, 1998, (2) U.S. patent application Ser. No. 09/510,913, filed on Feb. 23, 2000, which claims priority from provisional application 60/121,702, filed on Feb. 25, 1999, (3) U.S. patent application Ser. No. 09/502,350, filed on Feb. 10, 2000, which claims priority from provisional application 60/119,611, filed on Feb. 11, 1999, (4) U.S. Pat. No. 6,328,113, which was filed as U.S. patent application Ser. No. 09/440,338, filed on Nov. 15, 1999, which claims priority from provisional application 60/108,558, filed on Nov. 16, 1998, (5) U.S. patent application Ser. No. 10/169,434, filed on Jul. 1, 2002, which claims priority from provisional application 60/183,546, filed on Feb. 18, 2000, (6) U.S. patent application Ser. No. 09/523,468, filed on Mar. 10, 2000, which claims priority from provisional application 60/124,042, filed on Mar. 11, 1999, (7) U.S. Pat. No. 6,568,471, which was filed as patent application Ser. No. 09/512,895, filed on Feb. 24, 2000, which claims priority from provisional application 60/121,841, filed on Feb. 26, 1999, (8) U.S. Pat. No. 6,575,240, which was filed as patent application Ser. No. 09/511,941, filed on Feb. 24, 2000, which claims priority from provisional application 60/121,907, filed on Feb. 26, 1999, (9) U.S. Pat. No. 6,557,640, which was filed as patent application Ser. No. 09/588,946, filed on Jun. 7, 2000, which claims priority from provisional application 60/137,998, filed on Jun. 7, 1999, (10) U.S. patent application Ser. No. 09/981,916, filed on Oct. 18, 2001 as a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (11) U.S. Pat. No. 6,604,763, which was filed as application Ser. No. 09/559,122, filed on Apr. 26, 2000, which claims priority from provisional application 60/131,106, filed on Apr. 26, 1999, (12) U.S. patent application Ser. No. 10/030,593, filed on Jan. 8, 2002, which claims priority from provisional application 60/146,203, filed on Jul. 29, 1999, (13) U.S. provisional patent application Ser. No. 60/143,039, filed on Jul. 9, 1999, (14) U.S. patent application Ser. No. 10/111,982, filed on Apr. 30, 2002, which claims priority from provisional patent application Ser. No. 60/162,671, filed on Nov. 1, 1999, (15) U.S. provisional patent application Ser. No. 60/154,047, filed on Sep. 16, 1999, (16) U.S. provisional patent application Ser. No. 60/438,828, filed on Jan. 9, 2003, (17) U.S. Pat. No. 6,564,875, which was filed as application Ser. No. 09/679,907, on Oct. 5, 2000, which claims priority from provisional patent application Ser. No. 60/159,082, filed on Oct. 12, 1999, (18) U.S. patent application Ser. No. 10/089,419, filed on Mar. 27, 2002, which claims priority from provisional patent application Ser. No. 60/159,039, filed on Oct. 12, 1999, (19) U.S. patent application Ser. No. 09/679,906, filed on Oct. 5, 2000, which claims priority from provisional patent application Ser. No. 60/159,033, filed on Oct. 12, 1999, (20) U.S. patent application Ser. No. 10/303,992, filed on Nov. 22, 2002, which claims priority from provisional patent application Ser. No. 60/212,359, filed on Jun. 19, 2000, (21) U.S. provisional patent application Ser. No. 60/165,228, filed on Nov. 12, 1999, (22) U.S. provisional patent application Ser. No. 60/455,051, filed on Mar. 14, 2003, (23) PCT application US02/2477, filed on Jun. 26, 2002, which claims priority from U.S. provisional patent application Ser. No. 60/303,711, filed on Jul. 6, 2001, (24) U.S. patent application Ser. No. 10/311,412, filed on Dec. 12, 2002, which claims priority from provisional patent application Ser. No. 60/221,443, filed on Jul. 28, 2000, (25) U.S. patent application Ser. No. 10/322,947, filed on Dec. 18, 2002, which claims priority from provisional patent application Ser. No. 60/221,645, filed on Jul. 28, 2000, (26) U.S. patent application Ser. No. 10/322,947, filed on Jan. 22, 2003, which claims priority from provisional patent application Ser. No. 60/233,638, filed on Sep. 18, 2000, (27) U.S. patent application Ser. No. 10/406,648, filed on Mar. 31, 2003, which claims priority from provisional patent application Ser. No. 60/237,334, filed on Oct. 2, 2000, (28) PCT application US02/04353, filed on Feb. 14, 2002, which claims priority from U.S. provisional patent application Ser. No. 60/270,007, filed on Feb. 20, 2001, (29) U.S. patent application Ser. No. 10/465,835, filed on Jun. 13, 2003, which claims priority from provisional patent application Ser. No. 60/262,434, filed on Jan. 17, 2001, (30) U.S. patent application Ser. No. 10/465,831, filed on Jun. 13, 2003, which claims priority from U.S. provisional patent application Ser. No. 60/259,486, filed on Jan. 3, 2001, (31) U.S. provisional patent application Ser. No. 60/452,303, filed on Mar. 5, 2003, (32) U.S. Pat. No. 6,470,966, which was filed as patent application Ser. No. 09/850,093, filed on May 7, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (33) U.S. Pat. No. 6,561,227, which was filed as patent application Ser. No. 09/852,026, filed on May 9, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (34) U.S. patent application Ser. No. 09/852,027, filed on May 9, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (35) PCT Application US02/25608, filed on Aug. 13, 2002, which claims priority from provisional application 60/318,021, filed on Sep. 7, 2001, (36) PCT Application US02/24399, filed on Aug. 1, 2002, which claims priority from U.S. provisional patent application Ser. No. 60/313,453, filed on Aug. 20, 2001, (37) PCT Application US02/29856, filed on Sep. 19, 2002, which claims priority from U.S. provisional patent application Ser. No. 60/326,886, filed on Oct. 3, 2001, (38) PCT Application US02/20256, filed on Jun. 26, 2002, which claims priority from U.S. provisional patent application Ser. No. 60/303,740, filed on Jul. 6, 2001, (39) U.S. patent application Ser. No. 09/962,469, filed on Sep. 25, 2001, which is a divisional of U.S. patent application Ser. No. 09/523,468, filed on Mar. 10, 2000, which claims priority from provisional application 60/124,042, filed on Mar. 11, 1999, (40) U.S. patent application Ser. No. 09/962,470, filed on Sep. 25, 2001, which is a divisional of U.S. patent application Ser. No. 09/523,468, filed on Mar. 10, 2000, which claims priority from provisional application 60/124,042, filed on Mar. 11, 1999, (41) U.S. patent application Ser. No. 09/962,471, filed on Sep. 25, 2001, which is a divisional of U.S. patent application Ser. No. 09/523,468, filed on Mar. 10, 2000, which claims priority from provisional application 60/124,042, filed on Mar. 11, 1999, (42) U.S. patent application Ser. No. 09/962,467, filed on Sep. 25, 2001, which is a divisional of U.S. patent application Ser. No. 09/523,468, filed on Mar. 10, 2000, which claims priority from provisional application 60/124,042, filed on Mar. 11, 1999, (43) U.S. patent application Ser. No. 09/962,468, filed on Sep. 25, 2001, which is a divisional of U.S. patent application Ser. No. 09/523,468, filed on Mar. 10, 2000, which claims priority from provisional application 60/124,042, filed on Mar. 11, 1999, (44) PCT application US 02/25727, filed on Aug. 14, 2002, which claims priority from U.S. provisional patent application Ser. No. 60/317,985, filed on Sep. 6, 2001, and U.S. provisional patent application Ser. No. 60/318,386, filed on Sep. 10, 2001, (45) PCT application US 02/39425, filed on Dec. 10, 2002, which claims priority from U.S. provisional patent application Ser. No. 60/343,674, filed on Dec. 27, 2001, (46) U.S. utility patent application Ser. No. 09/969,922, filed on Oct. 3, 2001, which is a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (47) U.S. utility patent application Ser. No. 10/516,467, filed on Dec. 10, 2001, which is a continuation application of U.S. utility patent application Ser. No. 09/969,922, filed on Oct. 3, 2001, which is a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (48) PCT application US 03/00609, filed on Jan. 9, 2003, which claims priority from U.S. provisional patent application Ser. No. 60/357,372, filed on Feb. 15, 2002, (49) U.S. patent application Ser. No. 10/074,703, filed on Feb. 12, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (50) U.S. patent application Ser. No. 10/074,244, filed on Feb. 12, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (51) U.S. patent application Ser. No. 10/076,660, filed on Feb. 15, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (52) U.S. patent application Ser. No. 10/076,661, filed on Feb. 15, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (53) U.S. patent application Ser. No. 10/076,659, filed on Feb. 15, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (54) U.S. patent application Ser. No. 10/078,928, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (55) U.S. patent application Ser. No. 10/078,922, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (56) U.S. patent application Ser. No. 10/078,921, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (57) U.S. patent application Ser. No. 10/261,928, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (58) U.S. patent application Ser. No. 10/079,276, filed on Feb. 20, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (59) U.S. patent application Ser. No. 10/262,009, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (60) U.S. patent application Ser. No. 10/092,481, filed on Mar. 7, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (61) U.S. patent application Ser. No. 10/261,926, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (62) PCT application US 02/36157, filed on Nov. 12, 2002, which claims priority from U.S. provisional patent application Ser. No. 60/338,996, filed on Nov. 12, 2001, (63) PCT application US 02/36267, filed on Nov. 12, 2002, which claims priority from U.S. provisional patent application Ser. No. 60/339,013, filed on Nov. 12, 2001, (64) PCT application US 03/11765, filed on Apr. 16, 2003, which claims priority from U.S. provisional patent application Ser. No. 60/383,917, filed on May 29, 2002, (65) PCT application US 03/15020, filed on May 12, 2003, which claims priority from U.S. provisional patent application Ser. No. 60/391,703, filed on Jun. 26, 2002, (66) PCT application US 02/39418, filed on Dec. 10, 2002, which claims priority from U.S. provisional patent application Ser. No. 60/346,309, filed on Jan. 7, 2002, (67) PCT application US 03/06544, filed on Mar. 4, 2003, which claims priority from U.S. provisional patent application Ser. No. 60/372,048, filed on Apr. 12, 2002, (68) U.S. patent application Ser. No. 10/331,718, filed on Dec. 30, 2002, which is a divisional U.S. patent application Ser. No. 09/679,906, filed on Oct. 5, 2000, which claims priority from provisional patent application Ser. No. 60/159,033, filed on Oct. 12, 1999, (69) PCT application US 03/04837, filed on Feb. 29, 2003, which claims priority from U.S. provisional patent application Ser. No. 60/363,829, filed on Mar. 13, 2002, (70) U.S. patent application Ser. No. 10/261,927, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (71) U.S. patent application Ser. No. 10/262,008, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (72) U.S. patent application Ser. No. 10/261,925, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (73) U.S. patent application Ser. No. 10/199,524, filed on Jul. 19, 2002, which is a continuation of U.S. Pat. No. 6,497,289, which was filed as U.S. patent application Ser. No. 09/454,139, filed on Dec. 3, 1999, which claims priority from provisional application 60/111,293, filed on Dec. 7, 1998, (74) PCT application US 03/10144, filed on Mar. 28, 2003, which claims priority from U.S. provisional patent application Ser. No. 60/372,632, filed on Apr. 15, 2002, (75) U.S. provisional patent application Ser. No. 60/412,542, filed on Sep. 20, 2002, (76) PCT application US 03/14153, filed on May 6, 2003, which claims priority from U.S. provisional patent application Ser. No. 60/380,147, filed on May 6, 2002, (77) PCT application US 03/19993, filed on Jun. 24, 2003, which claims priority from U.S. provisional patent application Ser. No. 60/397,284, filed on Jul. 19, 2002, (78) PCT application US 03/13787, filed on May 5, 2003, which claims priority from U.S. provisional patent application Ser. No. 60/387,486, filed on Jun. 10, 2002, (79) PCT application US 03/18530, filed on Jun. 11, 2003, which claims priority from U.S. provisional patent application Ser. No. 60/387,961, filed on Jun. 12, 2002, (80) PCT application US 03/20694, filed on Jul. 1, 2003, which claims priority from U.S. provisional patent application Ser. No. 60/398,061, filed on Jul. 24, 2002, (81) PCT application US 03/20870, filed on Jul. 2, 2003, which claims priority from U.S. provisional patent application Ser. No. 60/399,240, filed on Jul. 29, 2002, (82) U.S. provisional patent application Ser. No. 60/412,487, filed on Sep. 20, 2002, (83) U.S. provisional patent application Ser. No. 60/412,488, filed on Sep. 20, 2002, (84) U.S. patent application Ser. No. 10/280,356, filed on Oct. 25, 2002, which is a continuation of U.S. Pat. No. 6,470,966, which was filed as patent application Ser. No. 09/850,093, filed on May 7, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (85) U.S. provisional patent application Ser. No. 60/412,177, filed on Sep. 20, 2002, (86) U.S. provisional patent application Ser. No. 60/412,653, filed on Sep. 20, 2002, (87) U.S. provisional patent application Ser. No. 60/405,610, filed on Aug. 23, 2002, (88) U.S. provisional patent application Ser. No. 60/405,394, filed on Aug. 23, 2002, (89) U.S. provisional patent application Ser. No. 60/412,544, filed on Sep. 20, 2002, (90) PCT application US 03/24779, filed on Aug. 8, 2003, which claims priority from U.S. provisional patent application Ser. No. 60/407,442, filed on Aug. 30, 2002, (91) U.S. provisional patent application Ser. No. 60/423,363, filed on Dec. 10, 2002, (92) U.S. provisional patent application Ser. No. 60/412,196, filed on Sep. 20, 2002, (93) U.S. provisional patent application Ser. No. 60/412,187, filed on Sep. 20, 2002, (94) U.S. provisional patent application Ser. No. 60/412,371, filed on Sep. 20, 2002, (95) U.S. patent application Ser. No. 10/382,325, filed on Mar. 5, 2003, which is a continuation of U.S. Pat. No. 6,557,640, which was filed as patent application Ser. No. 09/588,946, filed on Jun. 7, 2000, which claims priority from provisional application 60/137,998, filed on Jun. 7, 1999, (96) U.S. patent application Ser. No. 10/624,842, filed on Jul. 22, 2003, which is a divisional of U.S. patent application Ser. No. 09/502,350, filed on Feb. 10, 2000, which claims priority from provisional application 60/119,611, filed on Feb. 11, 1999, (97) U.S. provisional patent application Ser. No. 60/431,184, filed on Dec. 5, 2002, (98) U.S. provisional patent application Ser. No. 60/448,526, filed on Feb. 18, 2003, (99) U.S. provisional patent application Ser. No. 60/461,539, filed on Apr. 9, 2003, (100) U.S. provisional patent application Ser. No. 60/462,750, filed on Apr. 14, 2003, (101) U.S. provisional patent application Ser. No. 60/436,106, filed on Dec. 23, 2002, (102) U.S. provisional patent application Ser. No. 60/442,942, filed on Jan. 27, 2003, (103) U.S. provisional patent application Ser. No. 60/442,938, filed on Jan. 27, 2003, (104) U.S. provisional patent application Ser. No. 60/418,687, filed on Apr. 18, 2003, (105) U.S. provisional patent application Ser. No. 60/454,896, filed on Mar. 14, 2003, (106) U.S. provisional patent application Ser. No. 60/450,504, filed on Feb. 26, 2003, (107) U.S. provisional patent application Ser. No. 60/451,152, filed on Mar. 9, 2003, (108) U.S. provisional patent application Ser. No. 60/455,124, filed on Mar. 17, 2003, (109) U.S. provisional patent application Ser. No. 60/453,678, filed on Mar. 11, 2003, (110) U.S. patent application Ser. No. 10/421,682, filed on Apr. 23, 2003, which is a continuation of U.S. patent application Ser. No. 09/523,468, filed on Mar. 10, 2000, which claims priority from provisional application 60/124,042, filed on Mar. 11, 1999, (111) U.S. provisional patent application Ser. No. 60/457,965, filed on Mar. 27, 2003, (112) U.S. provisional patent application Ser. No. 60/455,718, filed on Mar. 18, 2003, (113) U.S. Pat. No. 6,550,821, which was filed as patent application Ser. No. 09/811,734, filed on Mar. 19, 2001, (114) U.S. patent application Ser. No. 10/436,467, filed on May 12, 2003, which is a continuation of U.S. Pat. No. 6,604,763, which was filed as application Ser. No. 09/559,122, filed on Apr. 26, 2000, which claims priority from provisional application 60/131,106, filed on Apr. 26, 1999, (115) U.S. provisional patent application Ser. No. 60/459,776, filed on Apr. 2, 2003, (116) U.S. provisional patent application Ser. No. 60/461,094, filed on Apr. 8, 2003, (117) U.S. provisional patent application Ser. No. 60/461,038, filed on Apr. 7, 2003, (118) U.S. provisional patent application Ser. No. 60/463,586, filed on Apr. 17, 2003, (119) U.S. provisional patent application Ser. No. 60/472,240, filed on May 20, 2003, (120) U.S. patent application Ser. No. 10/619,285, filed on Jul. 14, 2003, which is a continuation-in-part of U.S. utility patent application Ser. No. 09/969,922, filed on Oct. 3, 2001, which is a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (121) U.S. utility patent application Ser. No. 10/418,688, which was filed on Apr. 18, 2003, as a division of U.S. utility patent application Ser. No. 09/523,468, filed on Mar. 10, 2000, which claims priority from provisional application 60/124,042, filed on Mar. 11, 1999, (122) PCT patent application serial no. PCT/US2004/06246, filed on Feb. 26, 2004, (123) PCT patent application serial number PCT/US2004/08170, filed on Mar. 15, 2004, (124) PCT patent application serial number PCT/US2004/08171, filed on Mar. 15, 2004, (125) PCT patent application serial number PCT/US2004/08073, filed on Mar. 18, 2004, (126) PCT patent application serial number PCT/US2004/07711, filed on Mar. 11, 2004, (127) PCT patent application serial number PCT/US2004/029025, filed on Mar. 26, 2004, (128) PCT patent application serial number PCT/US2004/010317, filed on Apr. 2, 2004, (129) PCT patent application serial number PCT/US2004/010712, filed on Apr. 6, 2004, (130) PCT patent application serial number PCT/US2004/010762, filed on Apr. 6, 2004, (131) PCT patent application serial number PCT/US2004/011973, filed on Apr. 15, 2004, (132) U.S. provisional patent application Ser. No. 60/495,056, filed on Aug. 14, 2003, (133) U.S. provisional patent application Ser. No. 60/600,679, filed on Aug. 11, 2004, (134) PCT patent application serial number PCT/US05/27318, filed on Jul. 29, 2005, the disclosures of which are incorporated herein by reference.

The method 4700 then proceeds to step 4708 where the radial expansion and plastic deformation of the expandable tubular member 4500 is monitored. In an exemplary embodiment, the expansion monitoring devices 4608 and 4612 measure the signals produced during the radial expansion and plastic deformation of the expandable tubular member 4500 by the tubular member expansion apparatus 4600 such as, for example, vibration signals, acoustical signals, pressure signals, temperature signals, acceleration signals, and a variety of other operating signals known in the art. The signals produced may then be analyzed to determine characteristics of the radial expansion and plastic deformation of the expandable tubular member 4500 during the radial expansion and plastic deformation. In an exemplary embodiment, the controller 4616a, illustrated in FIG. 76c, receives the acoustical signals from the expansion monitoring devices 4608 and 4612 and adjusts the movement of the tubular member expansion apparatus 4616 through the expandable tubular member 4500 to increase the efficiency of the radial expansion and plastic deformation.

Figure 78A:
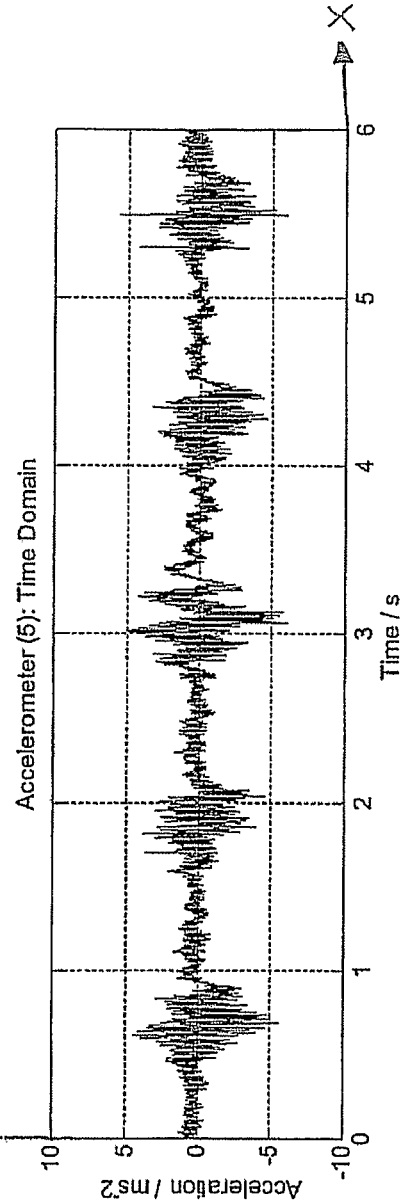
FIG. 78a is a graph illustrating an exemplary experimental embodiment of the tubular member expansion apparatus of FIG. 76a exhibiting normal expansion characteristics during the radial expansion and plastic deformation of the expandable tubular member of FIG. 75.
Figure 78B:
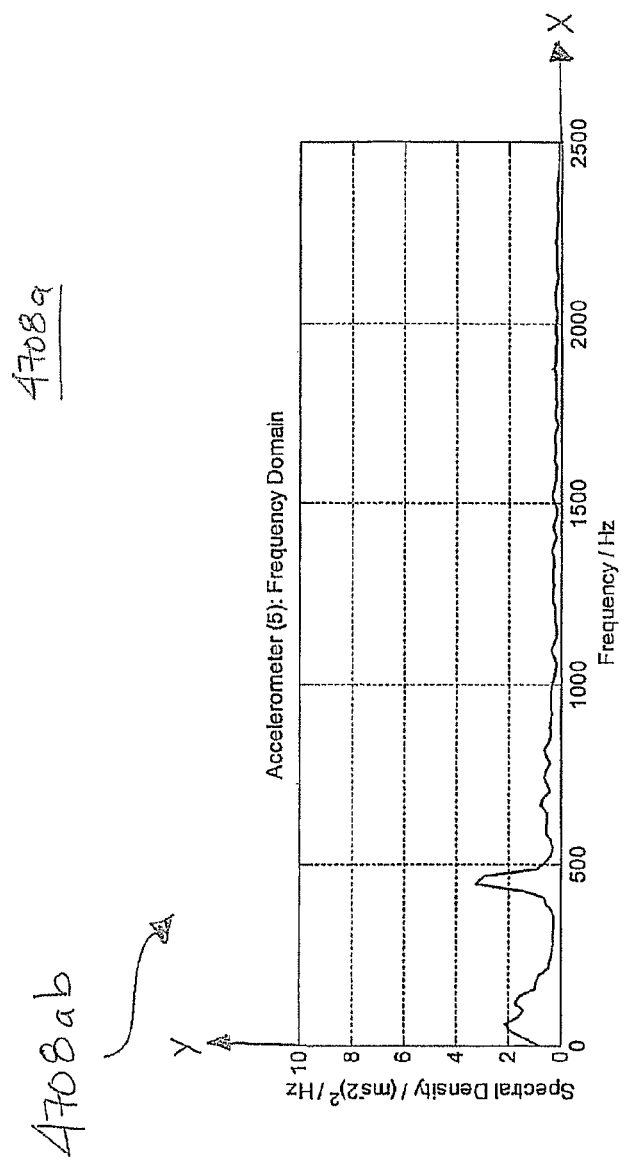
FIG. 78b is a graph illustrating an exemplary experimental embodiment of the tubular member expansion apparatus of FIG. 76a exhibiting normal expansion characteristics during the radial expansion and plastic deformation of the expandable tubular member of FIG. 75.

Referring now to FIGS. 78a and 78b, in an exemplary experimental embodiment 4708a, during step 4708 of method 4700, a graph 4708aa of acceleration versus time was produced from data provided by the expansion monitoring devices 4608 and 4612, illustrated in FIG. 78a. The graph 4708aa shows periods of relatively high acceleration activity between periods of relatively low acceleration activity, which was indicative of normal expansion characteristics. The graphical signature for normal expansion characteristics, illustrated in FIG. 78a, was an unexpected result. A graph 4708ab of spectral density versus frequency was also produced from data provided by the expansion monitoring devices 4608 and 4612, as illustrated in FIG. 78b. The graph 4708ab shows a peak in spectral density at a frequency of approximately 500 Hz, which was indicative of normal expansion characteristics. The graphical signature for normal expansion characteristics, illustrated in FIG. 78b, was an unexpected result. Thus, a method and apparatus is provided which allow the monitoring of normal expansion characteristics during the radial expansion and plastic deformation of the expandable tubular member 4500 by the tubular member expansion apparatus 4600.

Figure 79A:
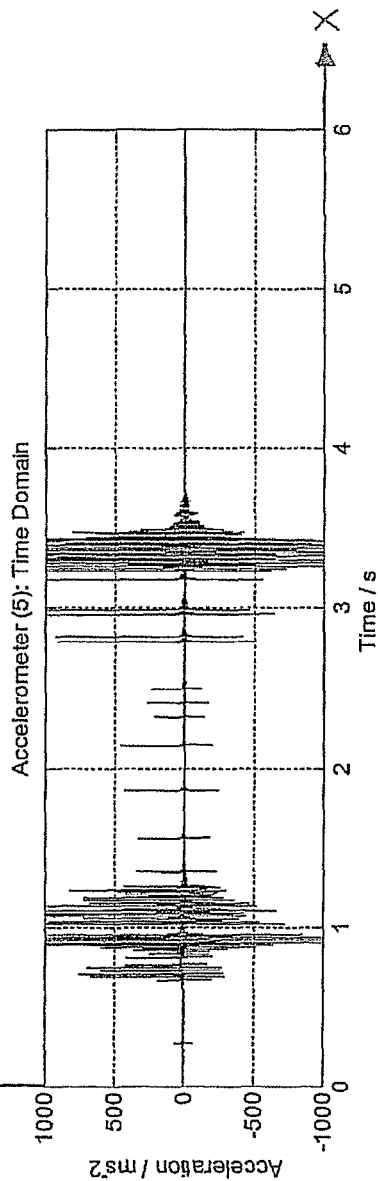
FIG. 79a is a graph illustrating an exemplary experimental embodiment of the tubular member expansion apparatus of FIG. 76a exhibiting slip-stick expansion characteristics during the radial expansion and plastic deformation of the expandable tubular member of FIG. 75.
Figure 79B:
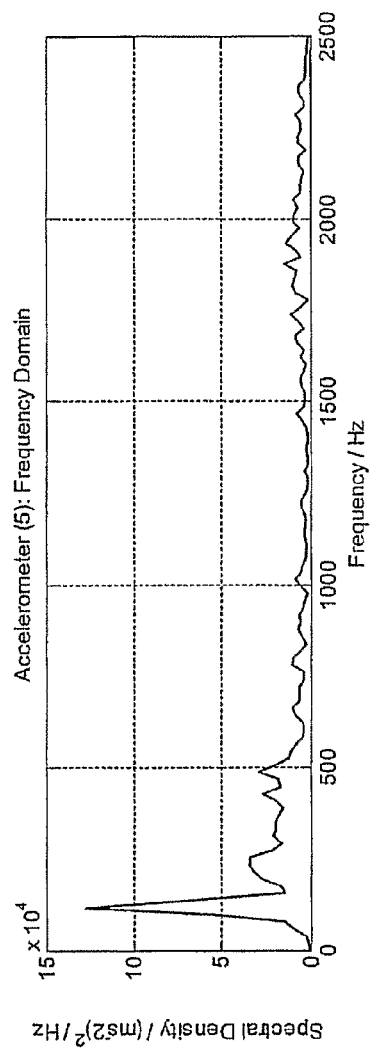
FIG. 79b is a graph illustrating an exemplary experimental embodiment of the tubular member expansion apparatus of FIG. 76a exhibiting slip-stick expansion characteristics during the radial expansion and plastic deformation of the expandable tubular member of FIG. 75.

Referring now to FIGS. 79a and 79b, in an exemplary experimental embodiment 4708b, during step 4708 of method 4700, a graph 4708ba of acceleration versus time was produced from data provided by the expansion monitoring devices 4608 and 4612, illustrated in FIG. 79a. The graph 4708ba shows peaks of very high acceleration relative to peak accelerations expected during normal expansion, illustrated in FIG. 78a, with periods of no acceleration between the peaks, which was indicative of slip-stick expansion characteristics, where the tubular member expansion apparatus 4600 intermittedly catches and releases from the expandable tubular member 4500 creating an inefficient expansion which can wear away or weaken the expandable tubular member 4500. The graphical signature for slip-stick expansion characteristics, illustrated in FIG. 79a, was an unexpected result. A graph 4708bb of spectral density versus frequency was also produced from data provided by the expansion monitoring devices 4608 and 4612, as illustrated in FIG. 79b. The graph 4708bb shows a peak in spectral density at a frequency of approximately 100 Hz, which was indicative of slip-stick expansion characteristics. The graphical signature for slip-stick expansion characteristics, illustrated in FIG. 79b, was an unexpected result. Thus, a method and apparatus is provided which allow the monitoring of slip-stick expansion characteristics during the radial expansion and plastic deformation of the expandable tubular member 4500 by the tubular member expansion apparatus 4600.

Figure 80A:
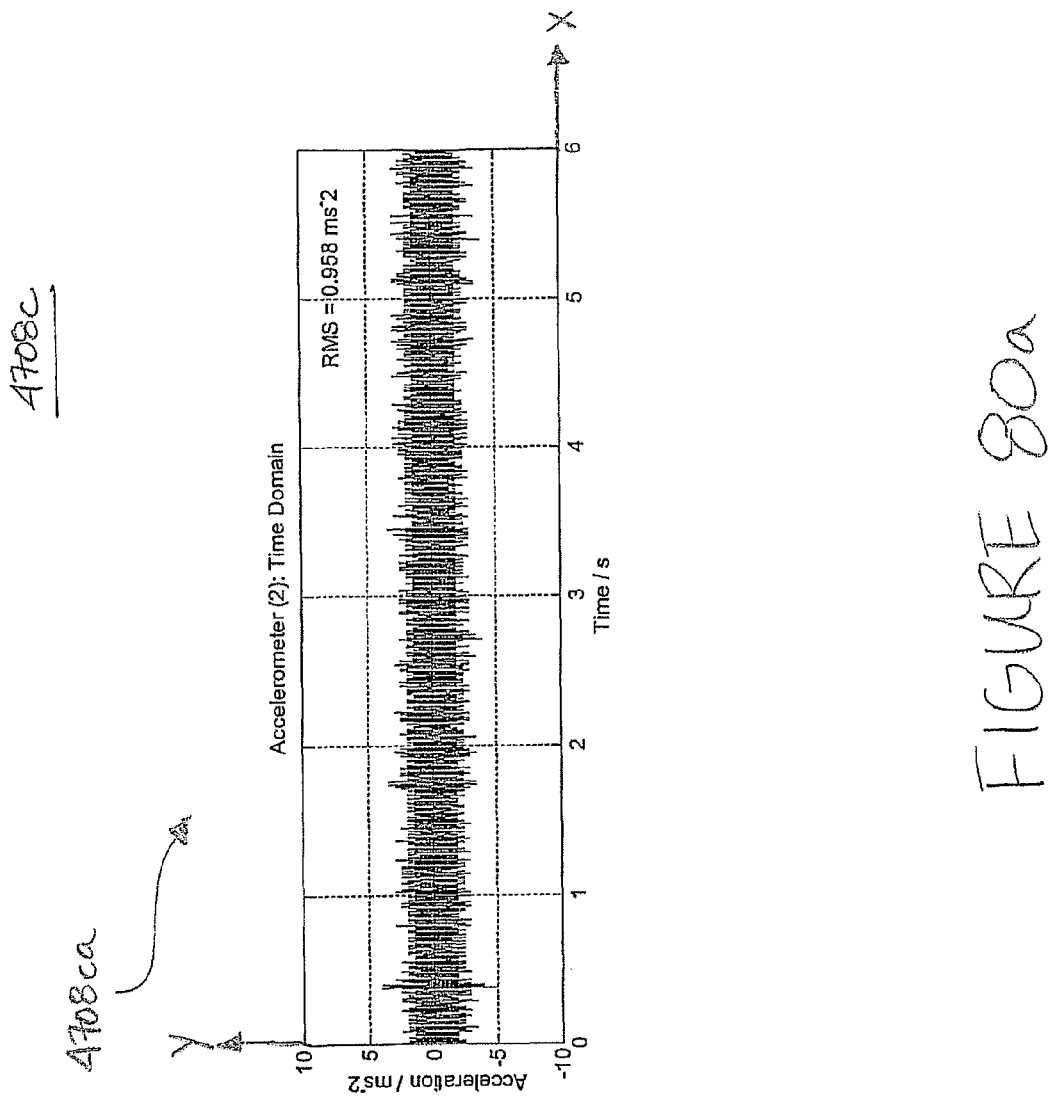
FIG. 80a is a graph illustrating an exemplary experimental embodiment of the tubular member expansion apparatus of FIG. 76a exhibiting jetting expansion characteristics during the radial expansion and plastic deformation of the expandable tubular member of FIG. 75.
Figure 80B:
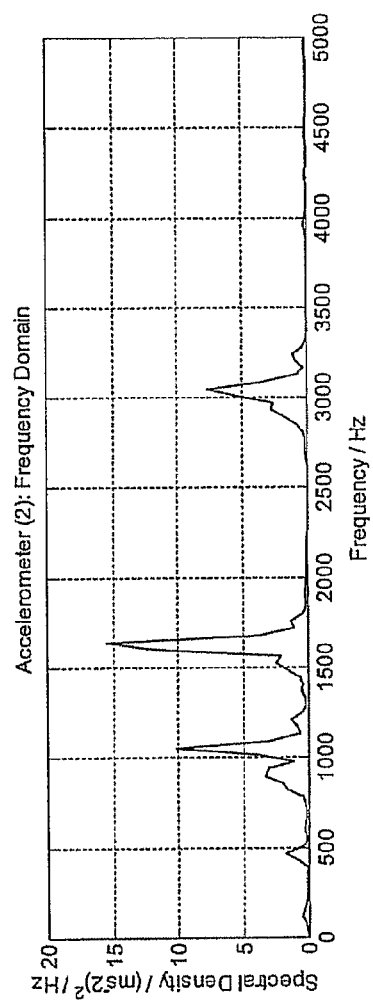
FIG. 80b is a graph illustrating an exemplary experimental embodiment of the tubular member expansion apparatus of FIG. 76a exhibiting jetting expansion characteristics during the radial expansion and plastic deformation of the expandable tubular member of FIG. 75.

Referring now to FIGS. 80a and 80b, in an exemplary experimental embodiment 4708c, during step 4708 of method 4700, a graph 4708ca of acceleration versus time was produced from data provided by the expansion monitoring devices 4608 and 4612, illustrated in FIG. 80a. The graph 4708ca shows continuous peaks of acceleration approximately equal to peak accelerations expected during normal expansion, illustrated in FIG. 78a, which was indicative of jetting expansion characteristics, where the tubular member expansion apparatus 4600 releases from the expandable tubular member 4500 and allows pressurized fluid to flow between the tubular member expansion apparatus 4600 and the expandable tubular member 4500, which can cause erosion of the expandable tubular member 4500. The graphical signature for jetting expansion characteristics, illustrated in FIG. 80a, was an unexpected result. A graph 4708cb of spectral density versus frequency was also produced from data provided by the expansion monitoring devices 4608 and 4612, as illustrated in FIG. 80b. The graph 4708cb shows peaks in spectral density at frequencies of approximately 1000 Hz, 1600 Hz, and 3000 Hz, which was indicative of jetting expansion characteristics. The graphical signature for jetting expansion characteristics, illustrated in FIG. 80b, was an unexpected result. Thus, a method and apparatus is provided which allow the monitoring of jetting expansion characteristics during the radial expansion and plastic deformation of the expandable tubular member 4500 by the tubular member expansion apparatus 4600.

Figure 81:
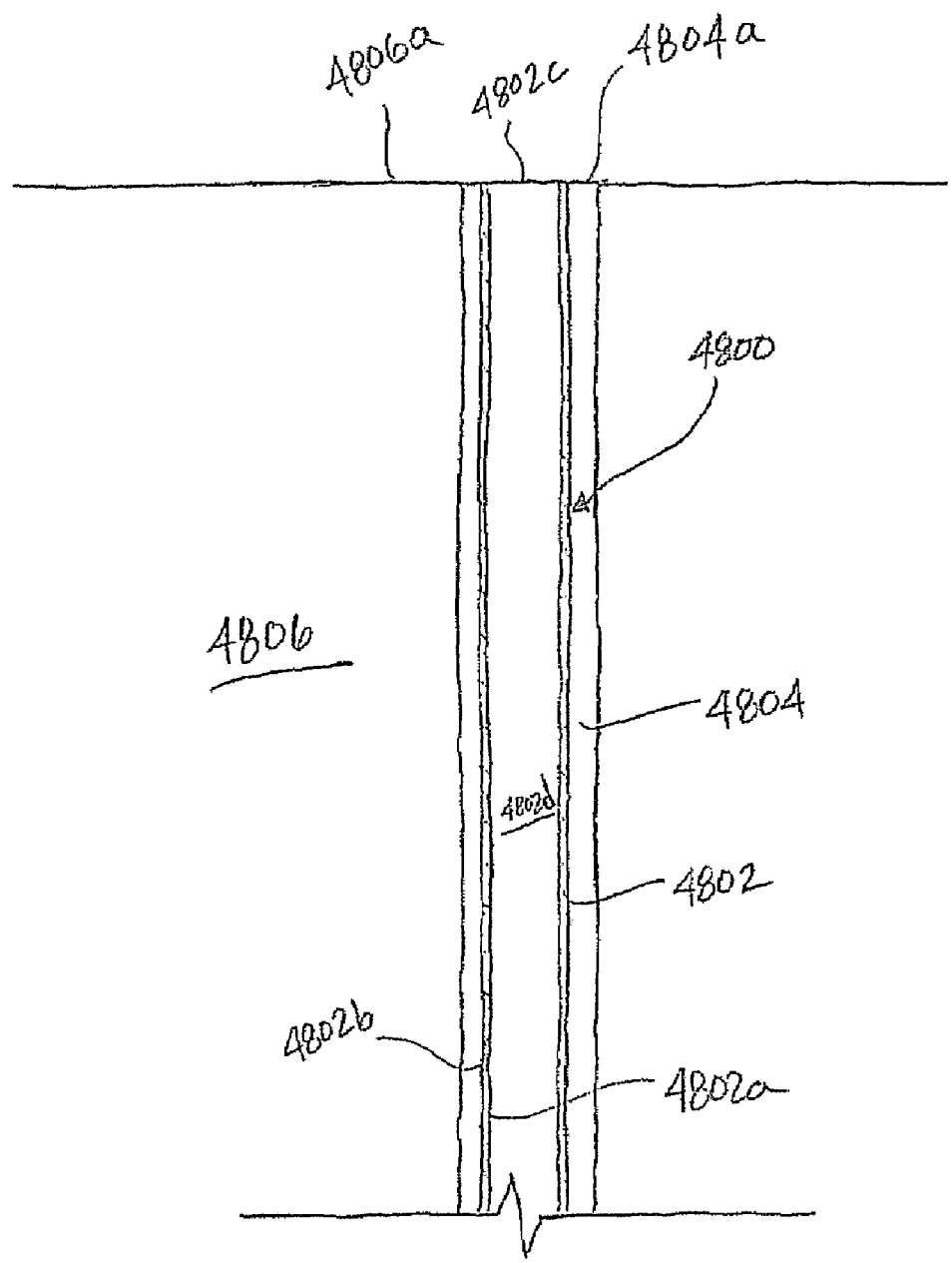
FIG. 81 is a partial cross sectional view illustrating an exemplary embodiment of an expandable tubular member positioned in a preexisting structure.

Referring now to FIG. 81, an expandable tubular member 4800 is illustrated. The expandable tubular member 4800 may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the expandable tubular member 4800 may be, for example, the tubular assembly 10, 22, 100, or 200. The expandable tubular member 4800 includes an elongated member 4802 having an inner surface 4802a, an outer surface 4802b located opposite the inner surface 4802a, a distal end 4802c, and defines a passageway 4802d along its length. The expandable tubular member 4800 is positioned in a passageway 4804 having an entrance 4804a, both which are defined by a preexisting structure 4806 having a top surface 4806a. In an exemplary embodiment, the preexisting structure 4806 may be an earth formation and the passageway 4804 may be a wellbore. In an exemplary embodiment, the preexisting structure 4806 may be a tubular member such as, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500 or the tubular assembly 10, 22, 100, or 200.

Figure 82A:
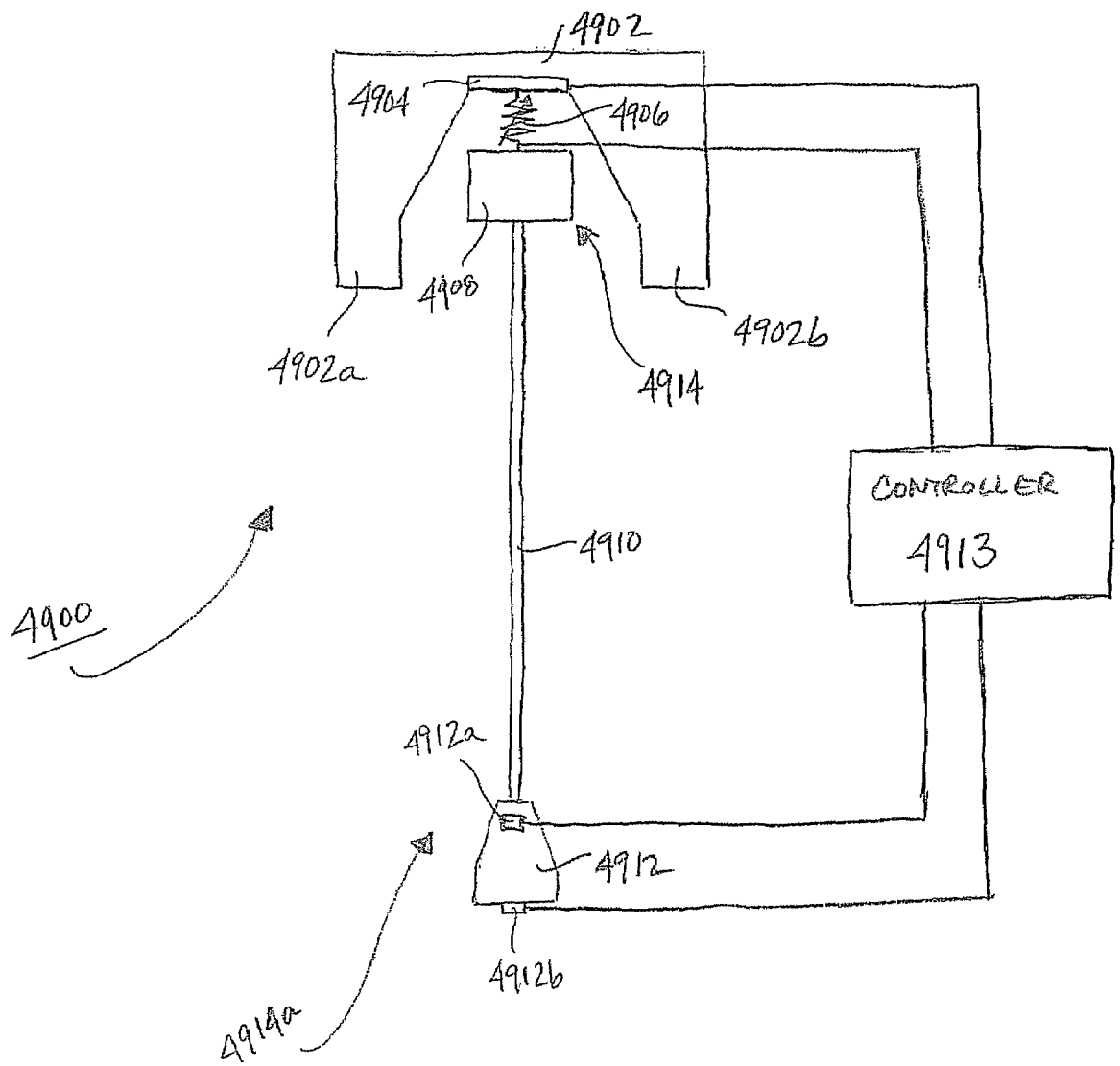
FIG. 82a is a side view illustrating an exemplary embodiment of a tubular member expansion apparatus used with the expandable tubular member of FIG. 81.

Referring now to FIG. 82a, a tubular member expansion apparatus 4900 is illustrated. The tubular member expansion apparatus 4900 includes a base 4902 having a plurality of support legs 4902a and 4902b. A vibration detection device 4904 is centrally located on the base 4902 between the support legs 4902a and 4902b. A conventional spring 4906 is mounted to the vibration detection device 4904 and a conventional drill string spool 4908 is mounted to the spring 4906 and opposite the vibration detection device 4904. In an exemplary embodiment, the spring 4906 is a variable spring as illustrated and the spring rate of the spring 4906 may be adjusted manually or automatically. A conventional drill string 4910 extends from the drill string spool 4908 and includes a conventional expansion device 4912 coupled to its distal end. A plurality of expansion monitoring devices 4912*a* and 4912*b* are coupled to the expansion device 4912 and are operable to measure operating parameters such as, for example, acoustic signals, vibration signals, temperature, pressure, acceleration, and a variety of other operating parameters known in the art. In an exemplary embodiment, the vibration detection device 4904, the spring 4906, and the drill string spool 4908 provide an expansion monitoring device 4914 with the spring 4906, the drill string spool 4908, the drill string 4910, and the expansion device 4912 acting as a spring-mass system 4914*a* and the vibration detection device 4904 detecting the changes in vibration of the spring-mass system. A controller 4913 is coupled to the vibration detection device 4904, the spring 4906, and the expansion monitoring devices 4912*a* and 4912*b* and is operable to receive signals from the vibration detection device 4904 and the expansion monitoring devices 4912*a* and 4912*b* and adjust the spring rate of the spring 4906 in response to those signals.

Figure 82B:
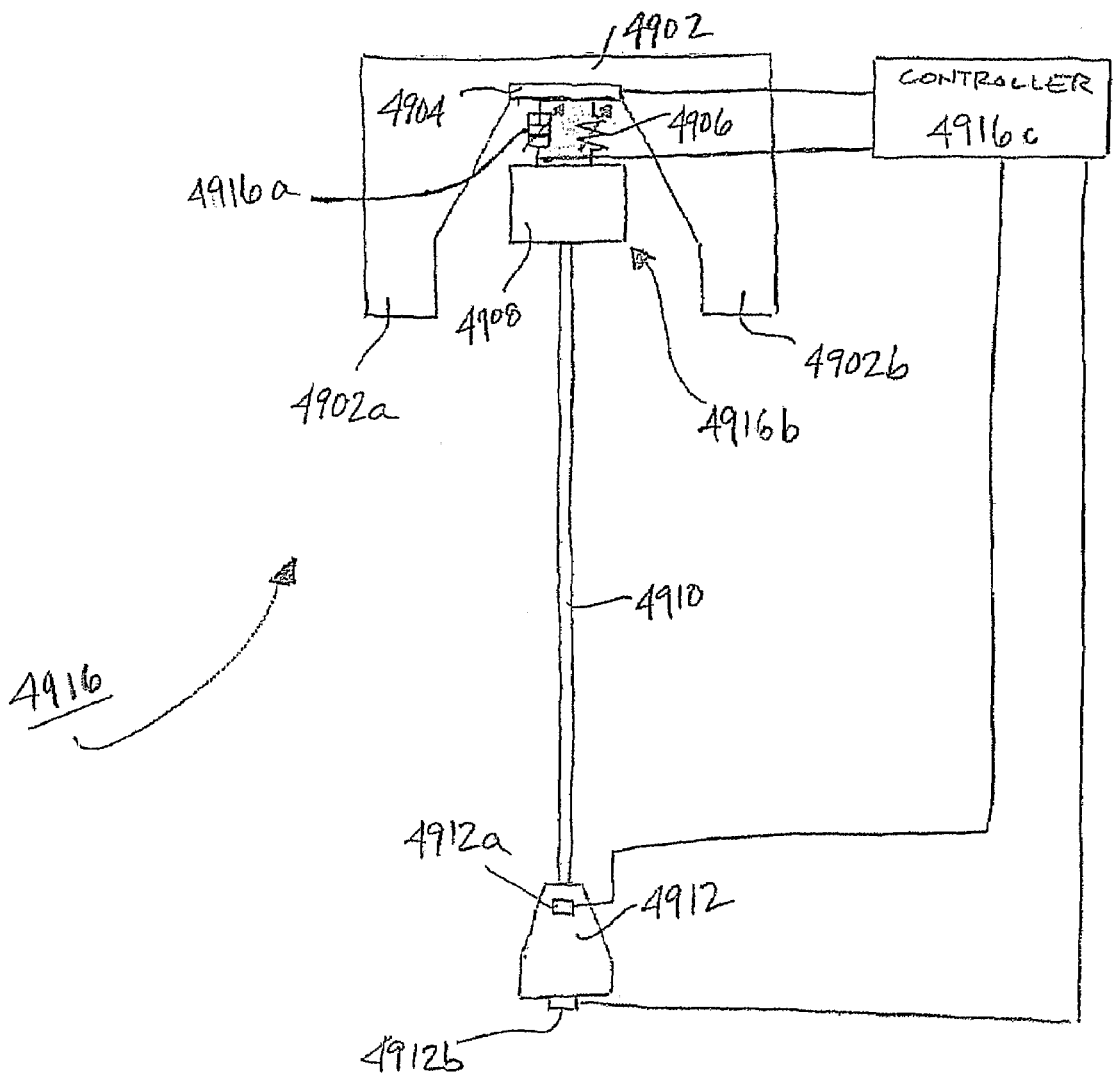

Referring now to FIG. 82*b*, in an alternative embodiment, a tubular member expansion apparatus 4916 is substantially similar in design and operation to the tubular member expansion apparatus 4900 described above with reference to FIG. 82*a*, with the provision of a damping member 4916*a*. The damping member 4916*a* is mounted to the vibration detection device 4904 and the conventional drill sting spool 4908 is mounted to the damping member 4916*a* and opposite the vibration detection device 4904. In an exemplary embodiment, the damping member 4916*a* is a variable damping member as illustrated, and the damping rate may be adjusted to a desired damping rate. The spring 4906, damping member 4916*a*, drill string spool 4908, drill string 4910, and expansion device 4912 act as a spring/mass/damping system 4916*b* which may be adjusted to adjust the frequency response characteristics of the system 4916*c*. In an exemplary embodiment, the system 4916*b* may include additional springs and/or damping members in series and/or in parallel. The tubular member expansion apparatus 4916 also includes a controller 4916*c* which is coupled to the vibration detection device 4904, the spring 4906, the damping member 4916*a*, and the expansion monitoring devices 4912*a* and 4912*b*. The controller 4916*c* is operable to receive signals from the vibration detection device 4904 and the expansion monitoring devices 4912*a* and 4912*b* and then adjust the damping coefficient of the damping rate of the damping member 4916*a* and the spring rate of the spring 4906 in order to adjust the system 4916*b* frequency response to a desired frequency response.

Figure 82C:
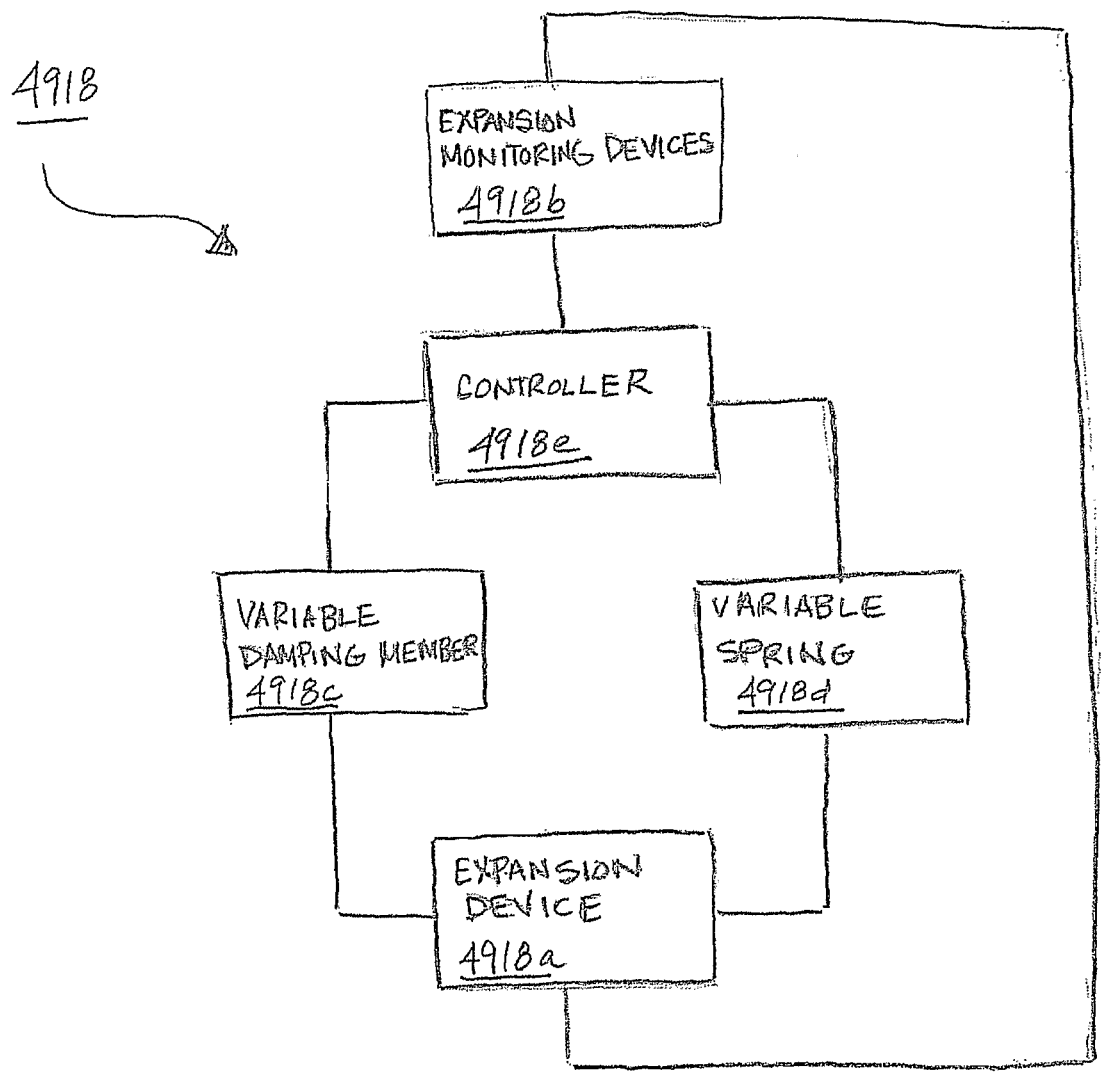

Referring now to FIG. 82*c*, in an alternative embodiment, a tubular member expansion apparatus 4918 is illustrated. The tubular member expansion apparatus 4918 includes an expansion device 4918*a*. The expansion device 4918*a* may be an expansion cone, a rotary expansion device, a hydroforming device, combinations thereof, and/or a variety of other expansion devices known in the art. The expansion device 4918*a* is coupled to a plurality of expansion monitoring devices 4918*b* which may be located at different locations on the expansion device 4918*a* and/or the tubular member to be expanded, and which are operable to measure operating parameters of the expansion device 4918*a* such as, for example, acoustical signals, vibration signals, temperature, pressure, acceleration, and a variety of other operating parameters known in the art. The expansion device 4918*a* is coupled to a variable damping member 4918*c* the damping rate of which may be adjusted to a desired damping rate. The expansion device 4918*a* is coupled to a variable spring 4918*d* the spring rate of which may be adjusted to a desired spring rate. A controller 4918*e* is coupled to the expansion monitoring devices 4918*b*, the variable damping member 4918*c*, and the variable spring 4918*d* and is operable to receive signals from the expansion monitoring devices 4918*a* and then adjust the damping coefficient of the damping rate of the damping member 4918*c* and the spring rate of the spring 4918*d* in order to adjust the frequency response of the expansion device 4918*a* to a desired frequency response.

Figure 83A:
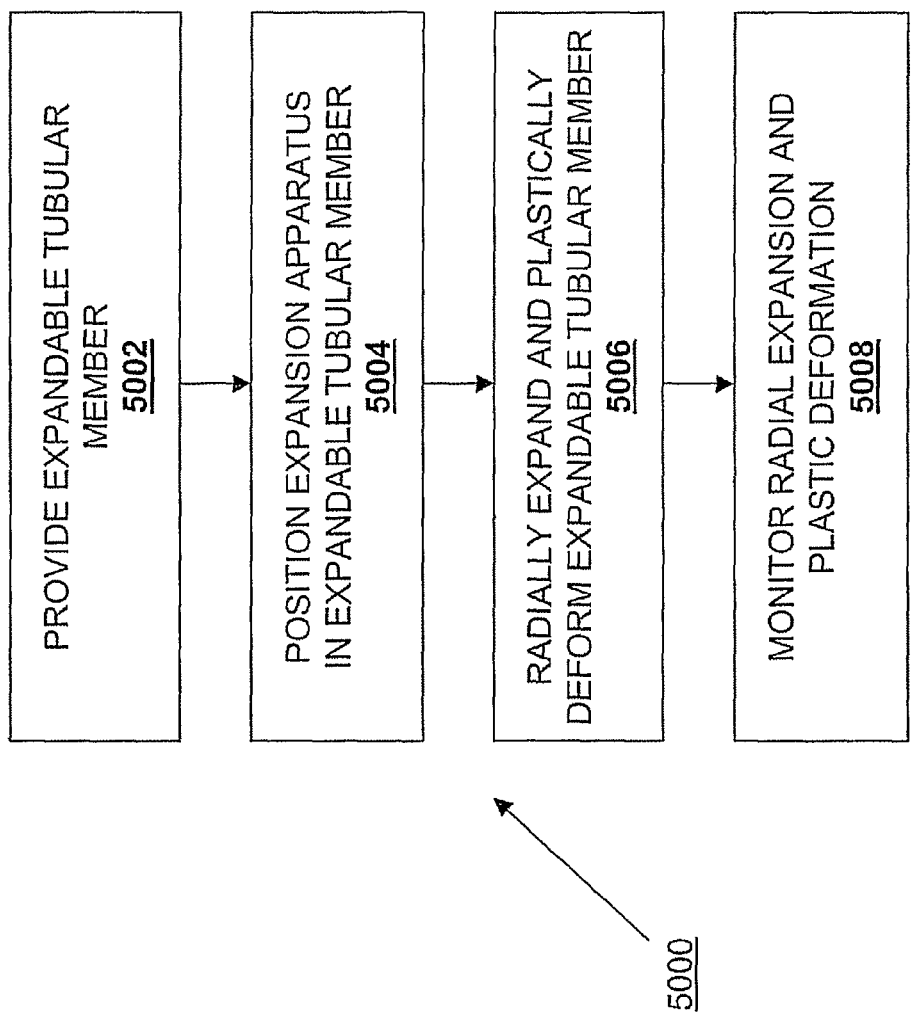
FIG. 83a is a flow chart illustrating an exemplary embodiment of a method for radially expanding and plastically deforming an expandable tubular member.
Figure 83B:
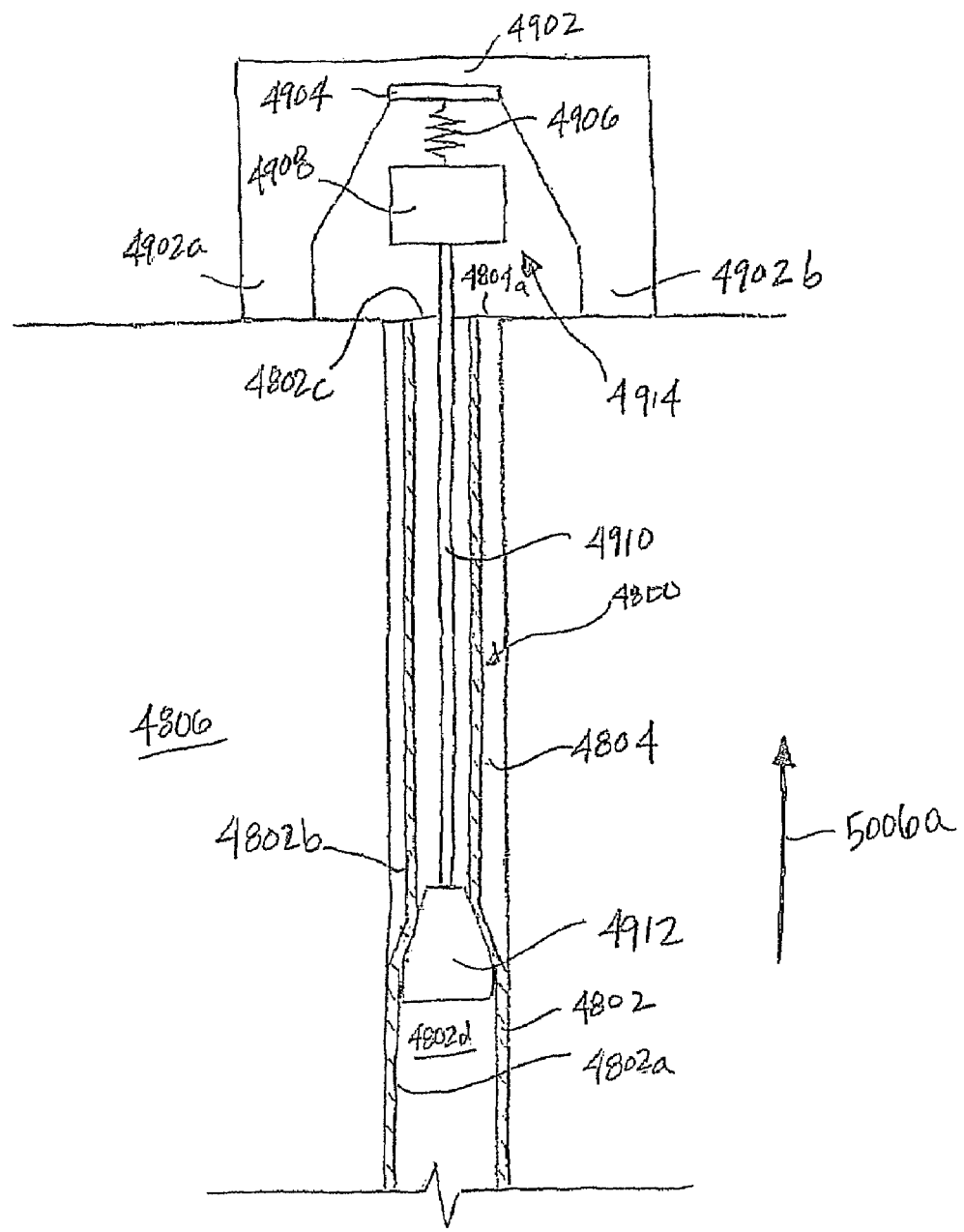

Referring now to FIGS. 83*a* and 83*b*, a method 5000 for radially expanding and plastically deforming an expandable tubular member is illustrated. The method 5000 begins at step 5002 where the expandable tubular member 4800, described above with reference to FIG. 81, is provided. In an exemplary embodiment, the expandable tubular member 4800 may be anchored to the preexisting structure 4806 such that the expandable tubular member 4800 does not move relative to the preexisting structure 4806. The method 5000 then proceeds to step 5004 where the tubular member expansion apparatus 4900 is positioned in the expandable tubular member 4800. The support legs 4902*a* and 4902*b* of the base 4902 are positioned on opposite sides of the entrance 4804*a* of the passageway 4804 such that the vibration detection device 4904 is positioned over the entrance 4804*a* of the passageway 4804. The spring 4906 and the drill string spool 4908 are positioned above the entrance 4804*a* of the passageway 4804 such that the drill string 4910 is positioned in the passageway 4802*d* of the expandable tubular member 4800. The expansion device 4912 is then positioned in the expandable tubular member 4800 by pulling it by the drill string 4910 into the passageway, resulting in the engagement of the expansion device 4912 and the inner surface 4802*b* of the expandable tubular member 4800. Engagement of the expansion device 4912 and the inner surface 4802*b* radially expands and plastically deforms the expandable tubular member 4800 such that the outer surface 4802*b* engages the preexisting structure 4806, as illustrated in FIG. 83*b*.

The method 5000 then proceeds to step 5006 where the expandable tubular member 4800 is radially expanded and plastically deformed. The tubular member expansion apparatus 4900 is moved in a direction 5006*a* through the passageway 4802*d* of the expandable tubular member 4800 using the drill string 4910, which radially expands and plastically deforms the expandable tubular member 4800 such that the outer surface 4802*b* engages the preexisting structure 4806. In an exemplary embodiment, the expandable tubular member 4800 is anchored to the preexisting structure 4806 such that the expandable tubular member 4800 does not move relative to the preexisting structure 4806 during step 5006 of the method 5000. The method 5000 then proceeds to step 5008 where the radial expansion and plastic deformation of the expandable tubular member 4500 is monitored. In an exemplary embodiment, the expansion monitoring device 4914 monitors the signals received by the vibration detection device 4904 from the spring/mass system 4914*a* as it radially expands and plastically deforms the expandable tubular member 4800. The signals produced may then be analyzed to determine characteristics of the radial expansion and plastic deformation such as, for example, normal expansion, slip-stick characteristics, or jetting characteristics, during the radial expansion and plastic deformation. In an exemplary embodiment, the expansion monitoring device 4914 may measure operational signals such as, for example, vibration, acoustical, pressure, temperature, acceleration, and a variety of other operating signals known in the art. Furthermore, the signals from the expansion monitoring device 4914 may further be processed to adaptively modify the operation of the tubular member expansion apparatus 4900 or 4916. In an exemplary embodiment, the expansion device 4912 may include a variety of expansion devices such as, for example, a rotary expansion device, an expansion cone, a hydroforming device, combinations thereof, and/or a variety of expansion devices known in the art.

Figure 84:
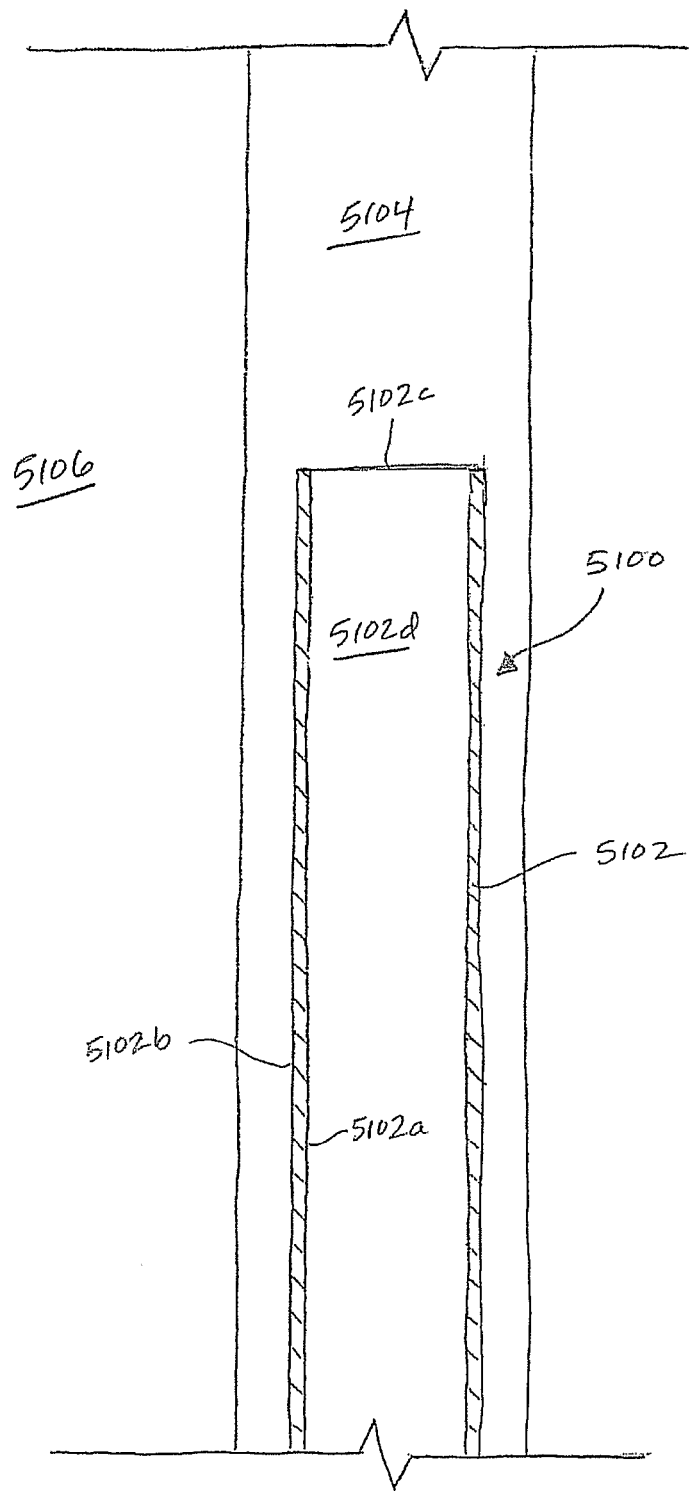

Referring now to FIG. 84, an expandable tubular member 5100 is illustrated. The expandable tubular member 5100 may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the expandable tubular member 5100 may be, for example, the tubular assembly 10, 22, 100, or 200. The expandable tubular member 5100 includes an elongated member 5102 having an inner surface 5102a, an outer surface 5102b located opposite the inner surface 5102a, a distal end 5102c, and defines a passageway 5102d along its length. The expandable tubular member 5100 is positioned in a passageway 5104 which is defined by a preexisting structure 5106. In an exemplary embodiment, the preexisting structure 5106 may be an earth formation and the passageway 5104 may be a wellbore. In an exemplary embodiment, the preexisting structure 5106 may be a tubular member such as, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500 or the tubular assembly 10, 22, 100, or 200.

Figure 85A:
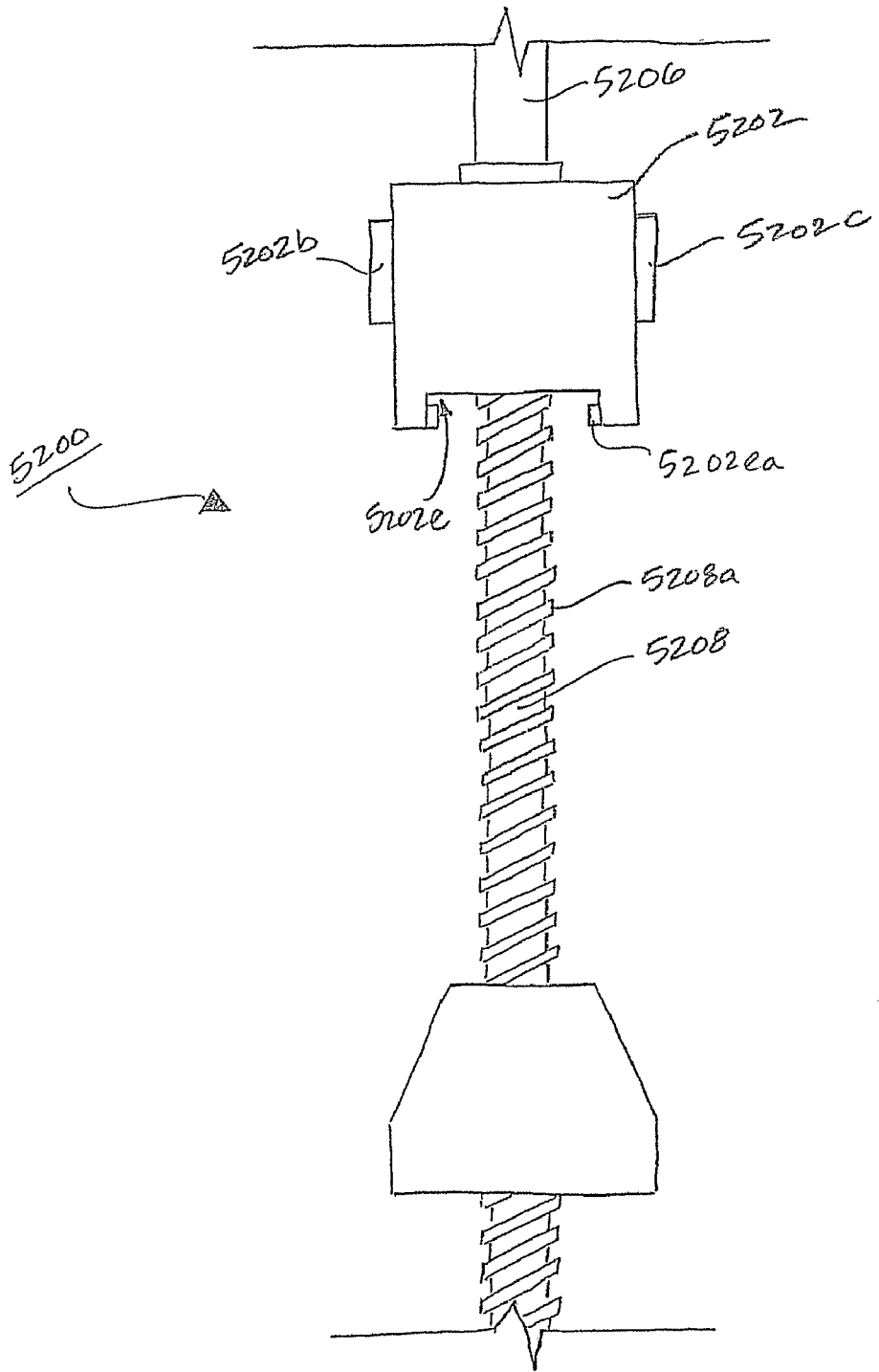
Figure 85B:
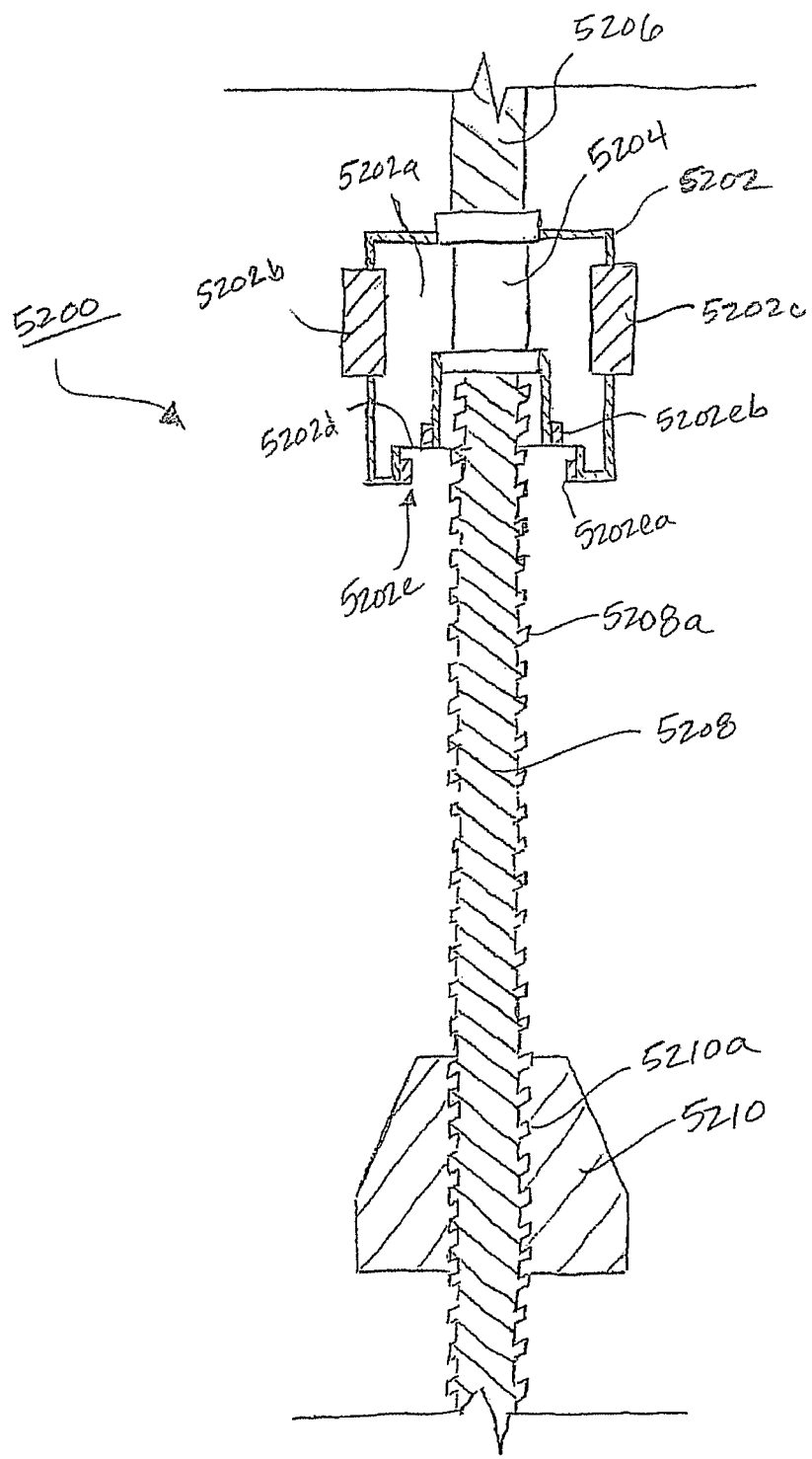

Referring now to FIGS. 85a and 85b, a tubular member expansion apparatus 5200 is illustrated. The tubular member expansion apparatus 5200 includes an anchor 5202 defining a annular cavity 5202a within the anchor 5202 and having a pair of engagement members 5202b and 5202c extending from opposite sides of the anchor 5202 and into the annular cavity 5202a. An annular mounting entrance 5202d which provide access to the cavity 5202a is included on a surface of the anchor 5202 and a annular mounting device 5202e including a pair of grips 5202ea and 5202eb are included on either side of the annular mounting entrance 5202d. A bearing 5204 is centrally located on the anchor 5202 and extends through the cavity 5202a. A driveshaft 5206 is rotatably coupled to the bearing 5204. An elongated threaded member 5208 is rotatably coupled to the bearing 5204 and the driveshaft 5206 and includes a plurality of threads 5208a located along its length. An expansion device 5210 includes a plurality of thread channels 5210a which couple the expansion device 5210 to the elongated threaded member 5208 by positioning the threads 5208a in the thread channels 5210a.

Figure 86A:
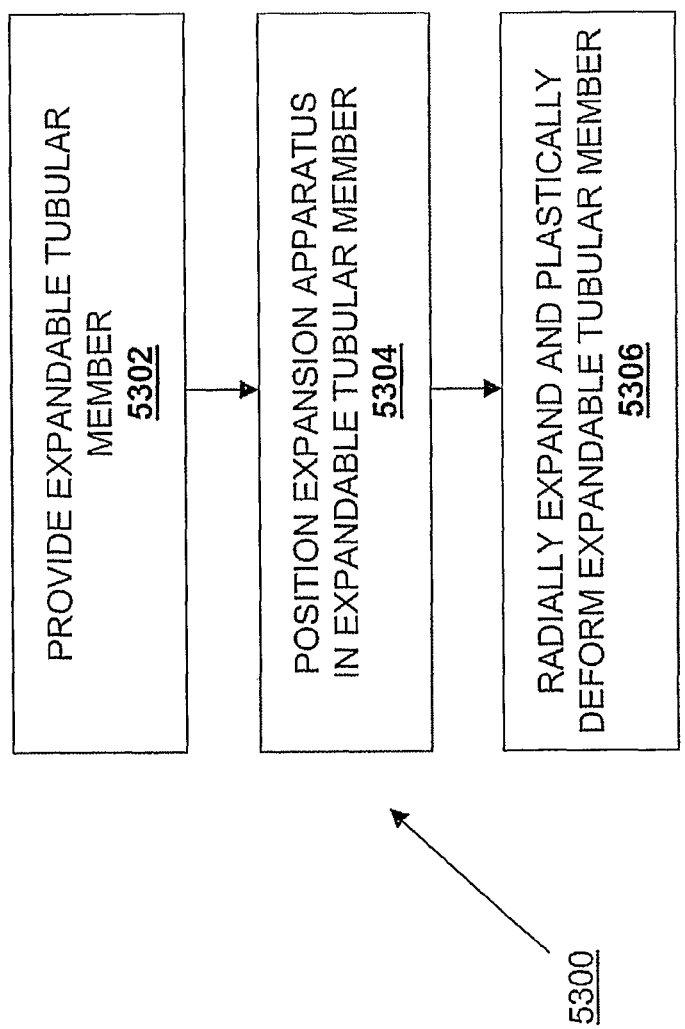
Figure 86B:
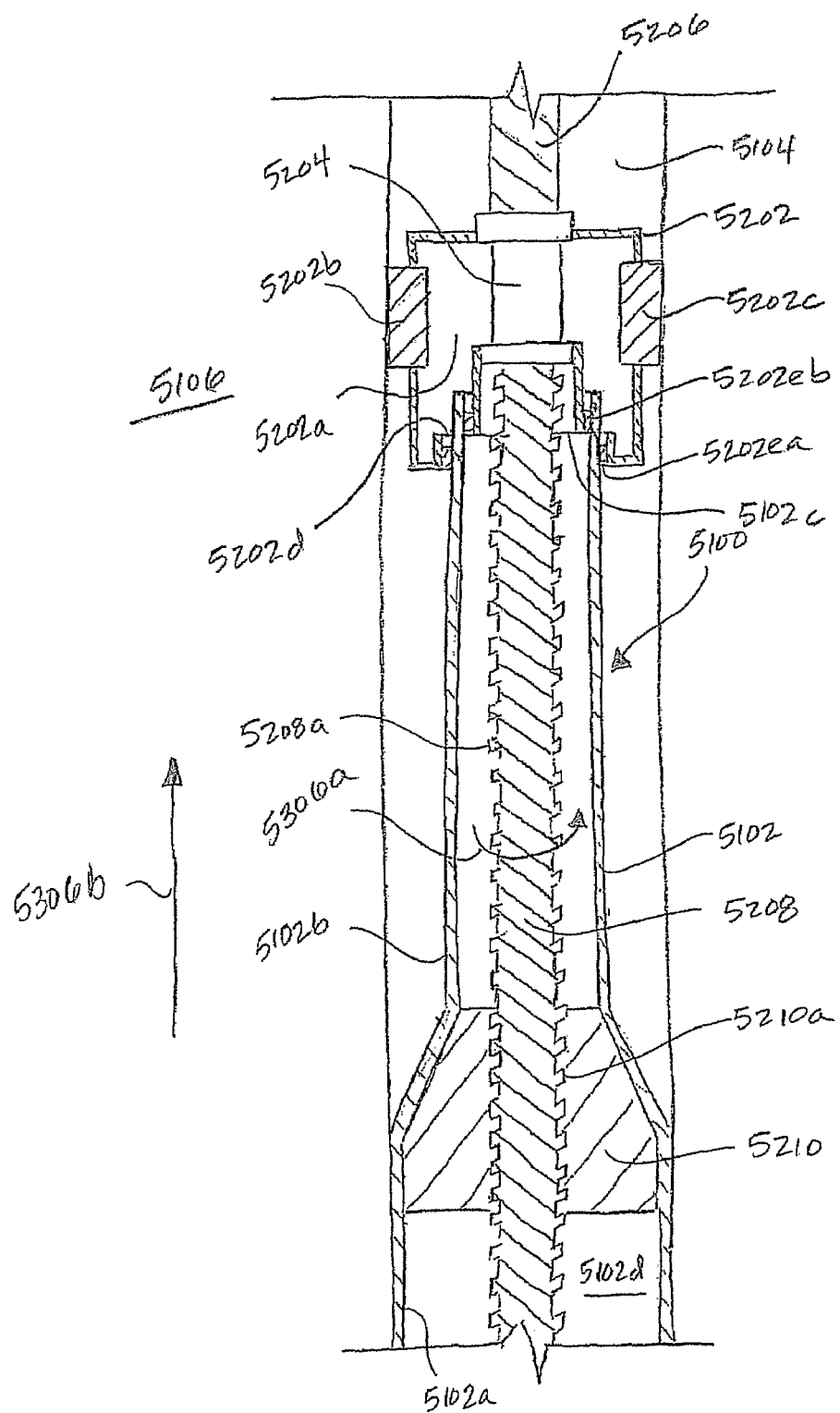

Referring now to FIGS. 86a and 86b, a method 5300 for radially expanding and plastically deforming an expandable tubular member is illustrated. The method 5300 begins at step 5302 where the expandable tubular member 5100 is provided positioned in the preexisting structure 5106, described above with reference to FIG. 84. The method 5300 then proceeds to step 5304 where the tubular member expansion apparatus 5200 is positioned in the expandable tubular member 5100. The elongated threaded member 5208 is positioned in the passageway 5102d of the expandable tubular member 5100 and the anchor 5202 is positioned in the passageway 5104 of the preexisting structure 5100 and adjacent the distal end 5102c of the expandable tubular member 5100. The distal end 5102c of the expandable tubular member 5100 is then moved through the annular mounting entrance 5202d and positioned in the annual mounting device 5202e such that the grips 5202ea and 5202eb engage the outer surface 5102b and the inner surface 5102a, respectively, mounting the anchor 5202 to the expandable tubular member 5100. The pair of engagement members 5202b and 5202c are engaged with the preexisting structure 5106 to secure the anchor 5202 to the preexisting structure 5106 such that the expandable tubular member 5100 does not move relative to the elongated threaded member 5208. With the elongated threaded member 5208 positioned in the passageway 5102d, the expansion device 5210 engages the inner surface 5102a of the expandable tubular member 5100 and radially expands and plastically deforms the expandable tubular member 5100 such that the outer surface 5102b of the expandable tubular member 5100 engages the preexisting structure 5106.

The method 5300 then proceeds to step 5306 where the expandable tubular member 5100 is radially expanded and plastically deformed. The driveshaft 5206 is rotated using conventional methods known in the art. The rotating of the driveshaft 5206 results in the rotation of the elongated threaded member 5208 in a direction 5306a, which causes the expansion device 5210 to move in a direction 5306b and along the length of the elongated threaded member 5208 due to the threaded coupling of the expansion device 5210 to the elongated threaded member 5208. As the expansion device 5210 moves in direction 5306b, the expandable tubular member 5100 is radially expanded and plastically deformed such that its outer surface 5102b engages the preexisting structure 5106 along its length, as illustrated in FIG. 86b. In an exemplary embodiment, the expansion device 5210 includes conventional features known in the art for allowing its movement in direction 5306a upon rotation of the elongated threaded member 5208.

Figure 87:
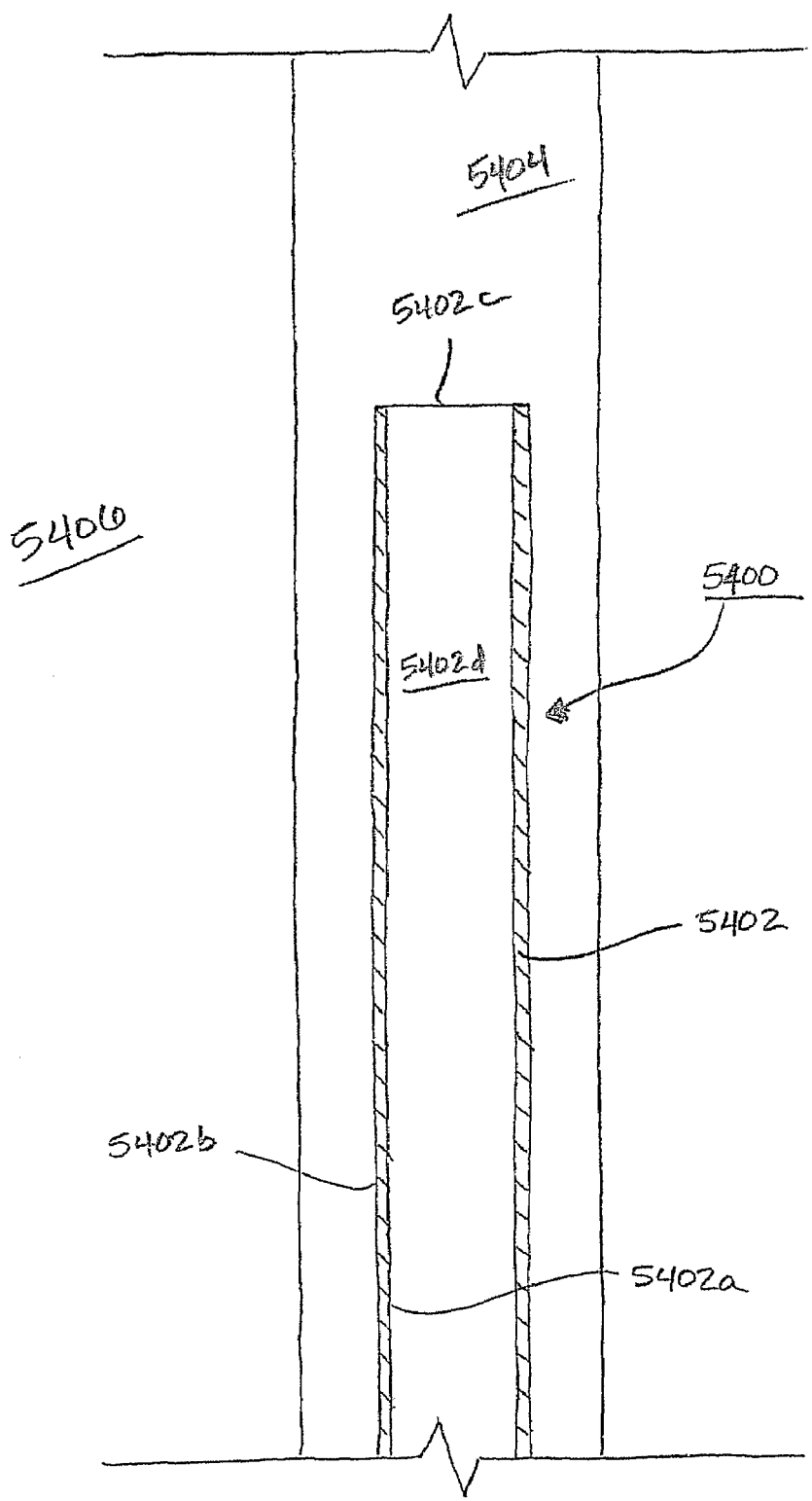

Referring now to FIG. 87, an expandable tubular member 5400 is illustrated. The expandable tubular member 5400 may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the expandable tubular member 5400 may be, for example, the tubular assembly 10, 22, 100, or 200. The expandable tubular member 5400 includes an elongated member 5402 having an inner surface 5402a, an outer surface 5402b located opposite the inner surface 5402a, a distal end 5402c, and defines a passageway 5402d along its length. The expandable tubular member 5400 is positioned in a passageway 5404 which is defined by a preexisting structure 5406. In an exemplary embodiment, the preexisting structure 5406 may be an earth formation and the passageway 5404 may be a wellbore. In an exemplary embodiment, the preexisting structure 5406 may be a tubular member such as, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500 or the tubular assembly 10, 22, 100, or 200.

Figure 88A:
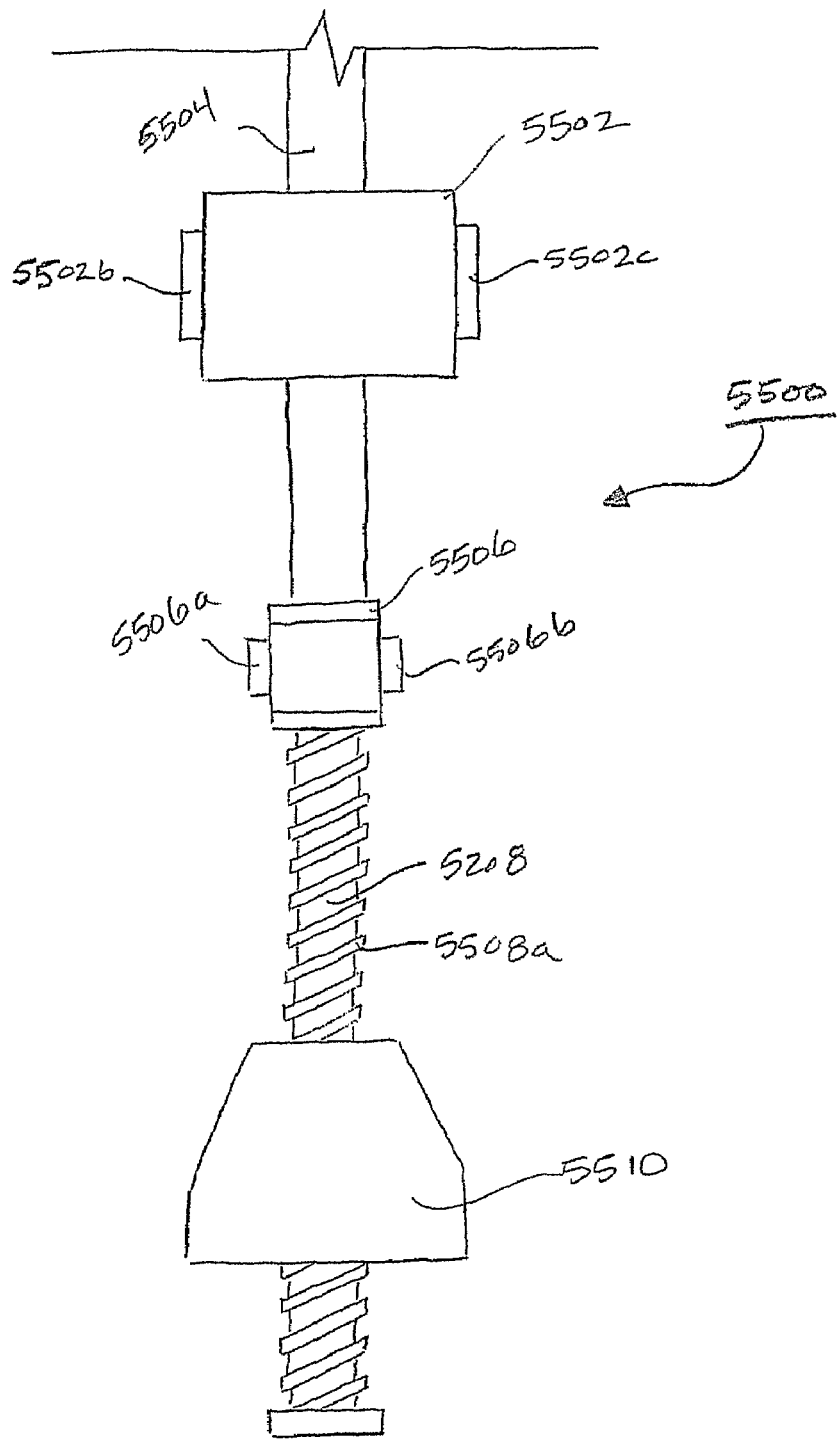
Figure 88B:
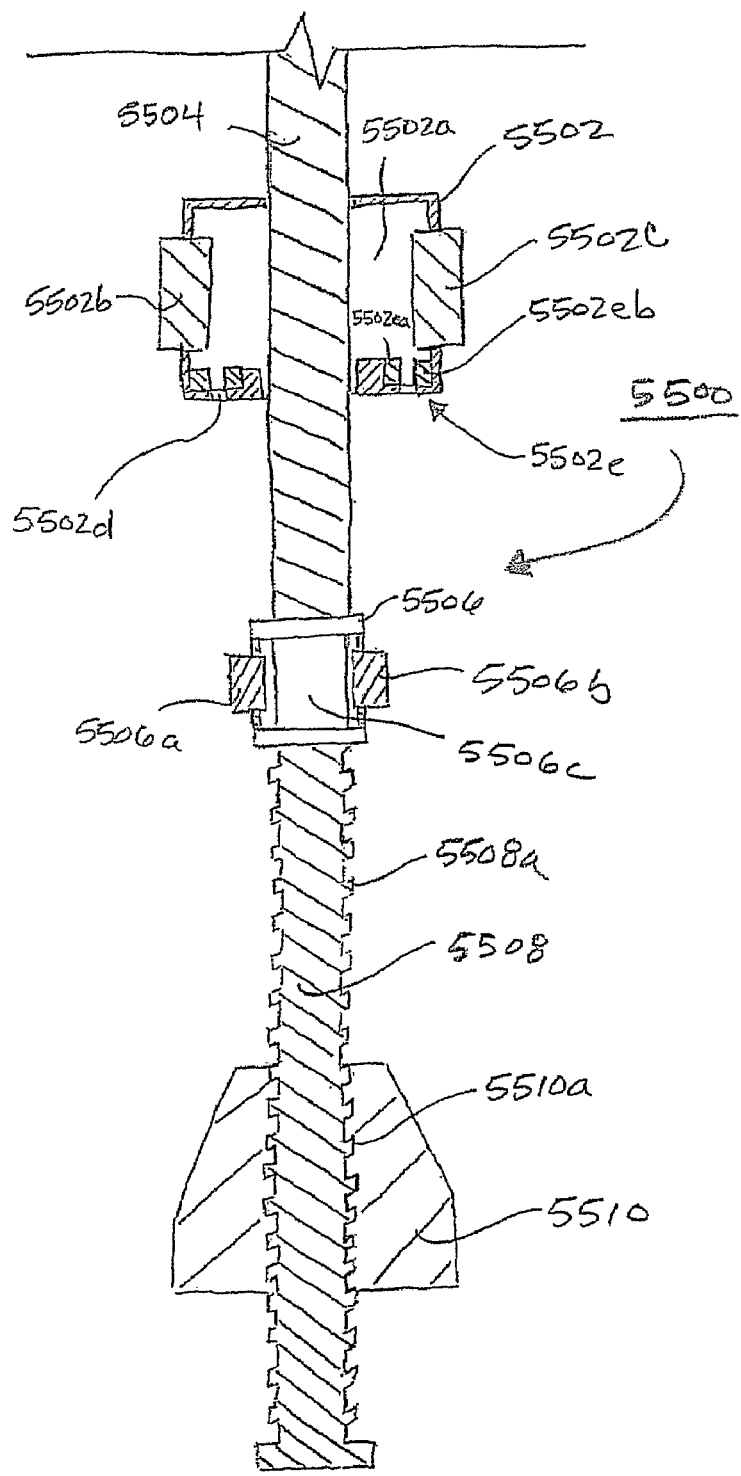

Referring now to FIGS. 88a and 88b, a tubular member expansion apparatus 5500 is illustrated. The tubular member expansion apparatus 5500 includes an anchor 5502 defining an annular cavity 5502a within the anchor 5502 and having a pair of engagement members 5502b and 5502c extending from opposite sides of the anchor 5502 and into the annular cavity 5202a. An annular mounting entrance 5502d which provide access to the cavity 5502a is included on a surface of the anchor 5502 and a annular mounting device 5502e including a pair of grips 5502ea and 5502eb are included on either side of the annular mounting entrance 5502d. A driveshaft 5204 is rotatably coupled to the anchor 5502 and extends through the cavity 5502a and from opposing sides of the anchor 5502. An centralizing anchor 5506 is coupled to a distal end of the drive shaft 5504 and includes a pair of engagement members 5506*a* and 5506*b* extending from opposing sides of the centralizing anchor 5506. A bearing 5506*c* is centrally located on the centralizing anchor 5506 and couples the driveshaft 5504 to the anchor 5506. An elongated threaded member 5208 is rotatably coupled to the bearing 5506*c* and the driveshaft 5504 and includes a plurality of threads 5508*a* located along its length. An expansion device 5510 includes a plurality of thread channels 5510*a* which couple the expansion device 5510 to the elongated threaded member 5508 by positioning the threads 5508*a* in the thread channels 5510*a*.

Figure 89A:
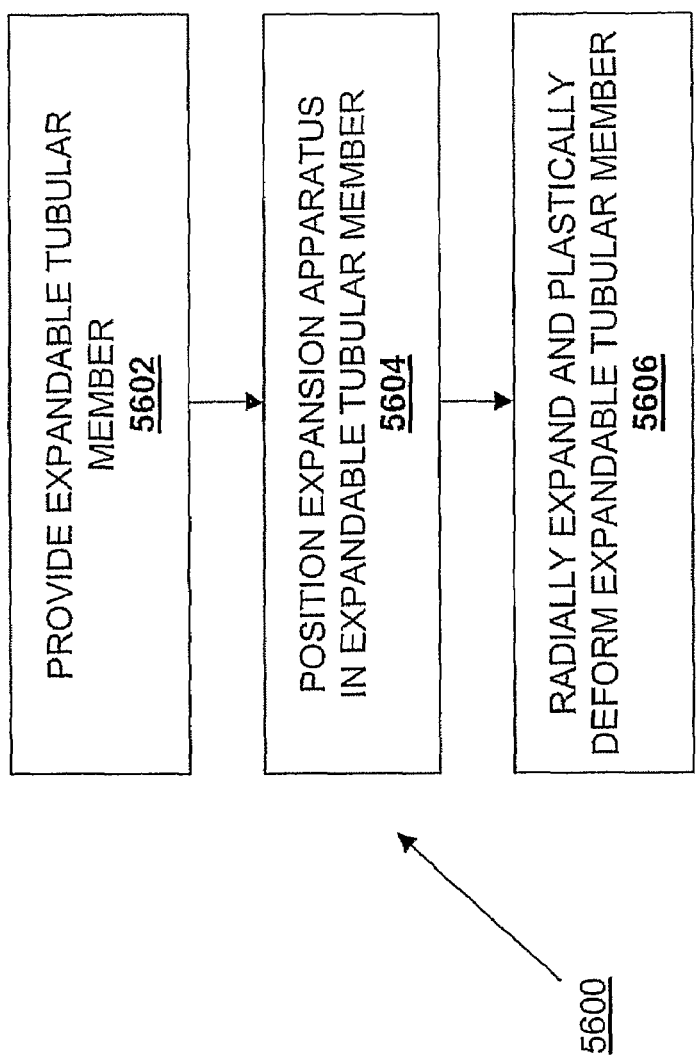
Figure 89B:
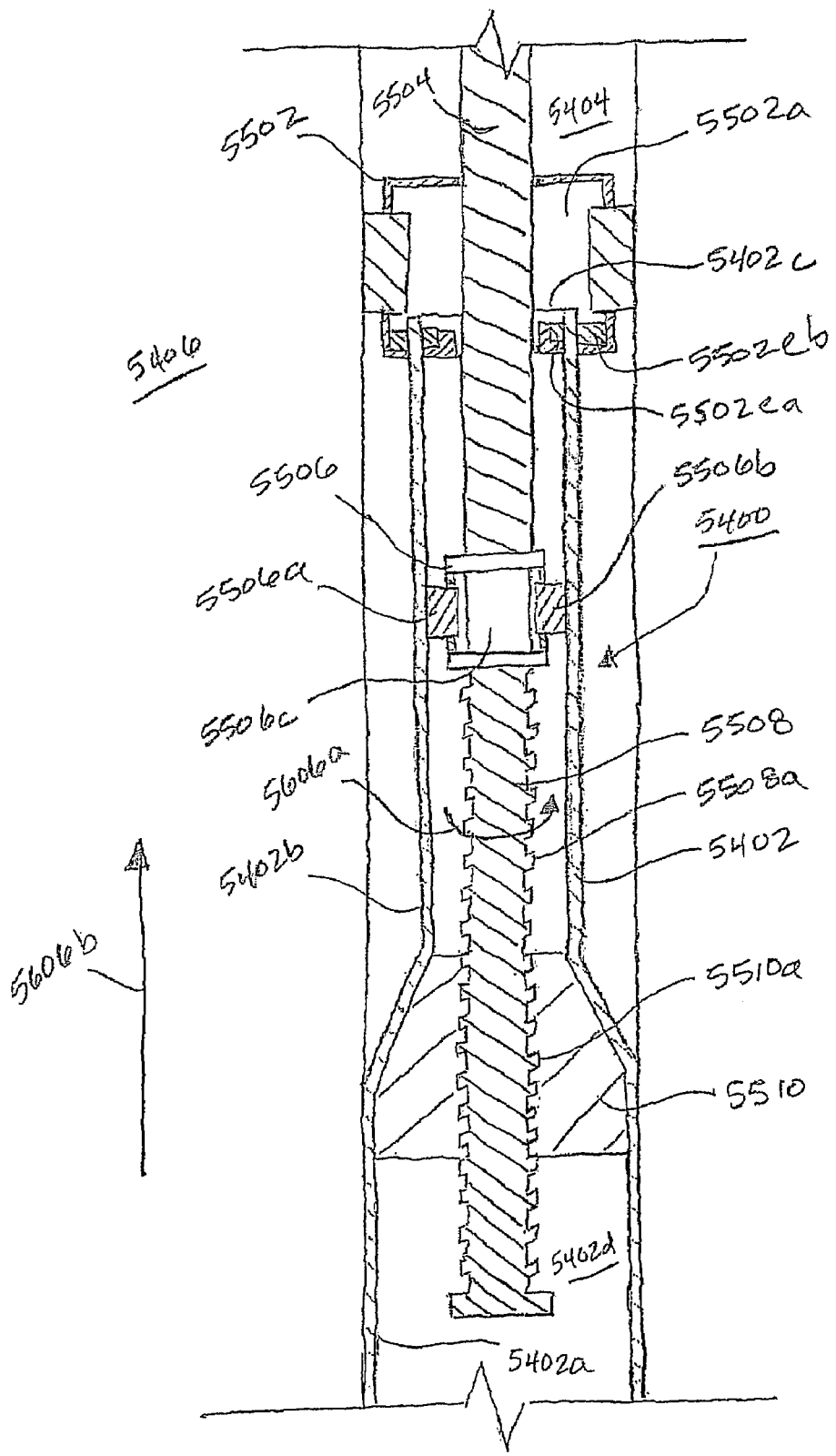

Referring now to FIGS. 89*a* and 89*b*, a method 5600 for radially expanding and plastically deforming an expandable tubular member is illustrated. The method 5600 begins at step 5602 where the expandable tubular member 5400 is provided positioned in the preexisting structure 5406, described above with reference to FIG. 87. The method 5600 then proceeds to step 5604 where the tubular member expansion apparatus 5500 is positioned in the expandable tubular member 5400. The elongated threaded member 5508 is positioned in the passageway 5402*d* of the expandable tubular member 5400 and the anchor 5502 is positioned adjacent the distal end 5402*c* of the expandable tubular member 5400. The distal end 5402*c* of the expandable tubular member 5400 is then moved through the annular mounting entrance 5502*d* and positioned in the annual mounting device 5502*e* such that the grips 5502*ea* and 5502*eb* engage the outer surface 5402*b* and the inner surface 5402*a*, respectively, mounting the anchor 5502 to the expandable tubular member 5400. The pair of engagement members 5502*b* and 5502*c* are engaged with the preexisting structure 5406 to secure the anchor 5502 to the preexisting structure 5406 such that the expandable tubular member 5400 does not move relative to the elongated threaded member 5508. With the elongated threaded member 5208 positioned in the passageway 5102*d*, the anchor 5506 is positioned in the passageway 5402*d* of the expandable tubular member 5400. The pair of engagement members 5506*a* and 5506*b* are engaged with the inner surface 5402*a* to secure the centralizing anchor 5506 in an centralized position in the passageway 5402*d* of the expandable tubular member 5400 and to ensure that the expandable tubular member 5400 does not move relative to the elongated threaded member 5508. With the elongated threaded member 5508 positioned in the passageway 5402*d*, the expansion device 5510 engages the inner surface 5402*a* of the expandable tubular member 5400 and radially expands and plastically deforms the expandable tubular member 5400 such that the outer surface 5402*b* of the expandable tubular member 5400 engages the preexisting structure 5406.

The method 5600 then proceeds to step 5606 where the expandable tubular member 5400 is radially expanded and plastically deformed. The driveshaft 5506 is rotated using convention methods known in the art. The rotating of the driveshaft 5506 results in the rotation of the elongated threaded member 5508 in a direction 5606*a*, which causes the expansion device 5510 to move in a direction 5606*b* and along the length of the elongated threaded member 5508 due to the threaded coupling of the expansion device 5510 to the elongated threaded member 5508. As the expansion device 5510 moves in direction 5606*b*, the expandable tubular member 5400 is radially expanded and plastically deformed into engagement with the preexisting structure 5406 along its length, as illustrated in FIG. 88*b*. In an exemplary embodiment, the expansion device 5510 includes conventional features known in the art for allowing its movement in direction 5606*a* upon rotation of the elongated threaded member 5508.

Referring now to FIG. 90, an expandable tubular member 5700 is illustrated. The expandable tubular member 5400 may be, for example, the tubular member 12, 14, 24, 26, 102, 108, 202, 204, 2210, 2228, 2310, 2328, 2410, 2428, 2510, 2528, 2610, 2628, 2710, 2728, 2910, 2926, 3010, 3024, 3030, 3044, 3050, 3068, 3110, 3124, 3210, 3220, 3310, 3330, 3410, 3432, or 3500. In an exemplary embodiment, the expandable tubular member 5400 may be, for example, the tubular assembly 10, 22, 100, or 200. The expandable tubular member 5700 include an elongated body 5702 having an inner surface 5702*a*, an outer surface 5702*b* located opposite the inner surface 5702*a*, a distal end 5702*c*, and defining a passageway 5702*d* along its length. The expandable tubular member 5700 includes an inside diameter 5702*e* along its length.

Referring now to FIG. 91, a formation 5800 is illustrated. Formation 5800 includes a volume of earth 5802 which defines a passageway 5802*a* having an inner diameter 5802*b*. In an exemplary embodiment, the volume of earth 5802 may include, for example, unconsolidated sand, carbonates, shale, hard rock, combinations thereof, or a variety of other volumes of earth known in the art.

Referring now to FIGS. 92*a* and 92*b*, a method 5900 for radially expanding and plastically deforming an expandable tubular member is illustrated. The method 5900 begins at step 5902 where the expandable tubular member 5700, described above with reference to FIG. 90, is provided. The method 5900 then proceeds to step 5904 where the expandable tubular member 5700 is coated. An elastomer layer 5904*a* is applied to the outer surface 5702*b* of the expandable tubular member 5700 using methods known in the art. In an exemplary embodiment, the elastomer layer 5904*a* is applied continuously over the outer surface 5702*b*. In an exemplary embodiment, the elastomer layer 5904*a* is applied to discrete sections of the outer surface 5702*b*. In an exemplary embodiment, the elastomer layer 5904*a* varies in thickness over the outer surface 5702*b*.

Referring now to FIGS. 92*a*, 92*c*, 92*d*, and 92*e*, the method 5900 proceeds to step 5906 where the expandable tubular member 5700 is positioned in the formation 5800. The expandable tubular member 5700 is positioned in the passageway 5802*a* defined by the volume of earth 5802 such that the elastomer layer 5904 is adjacent the volume of earth 5802, illustrated in FIG. 92*c*. The method 5900 then proceeds to step 5908 where the formation rebound is determined. The expandable tubular member 5700 will be expanded into engagement with the formation 5800 such that the inner diameter 5702*e* of the expandable tubular member 5700 increases to an initial expanded diameter 5908*a* and the inner diameter 5802*b* of the formation 5800 increases to an initial expanded diameter 5908*b*, as illustrated in FIG. 92*d*. However, the formation 5800 will exert a force 5908*c* back against the expandable tubular member 5700, illustrated in FIG. 92*d*, which causes the initial expanded diameters 5908*a* and 5908*b* to shrink to final expanded diameters 5908*d* and 5908*e*, respectively, as illustrated in FIG. 92*e*. In an exemplary embodiment, the final expanded diameter of the expandable tubular member 5700 may be calculated using the following equation:

$$(OD_{rebound}/HD) - 1 = [(2t/D)((1+v_f)/(E_f)) + (1/E_t)]\sigma_y \quad \text{(Equation 6)}$$

Where $OD_{rebound}$ is the desired final outside diameter of the expandable tubular member 5700, HD is the hole diameter before expansion, t is the thickness of the expandable tubular member 5700, D is the initial diameter of the expandable tubular member 5700, $v_f$ is the Poisson's ratio of the formation 5800, $E_f$ is the Young's modulus of the formation 5800, $E_t$ is the Young's modulus of the expandable tubular member 5700, and $\sigma_y$ is the yield strength of the expandable tubular member 5700.

Referring now to FIGS. 92*a*, 92*d*, 92*e*, and 92*f*, the method 5900 then proceeds to step 5910 where the expandable tubular member 5700 is radially expanded and plastically deformed. An expansion device 5910*a* is positioned in the passageway 5702*d* of the expandable tubular member 5700 and coupled to a drill string 5910*b*. The expansion device 5910*a* is then moved through the passageway 5702*d* in a direction 5910*c*, which radially expands and plastically deforms the expandable tubular member 5700 such that the elastomer layer 5904*a* engages the formation 5800. The expansion device 5910*a* is chosen based on the formation rebound determination in step 5908 of the method 5900 such that the expandable tubular member 5700 and the formation 5800 will be expanded from inner diameters 5702*e* and 5802*b*, illustrated in FIG. 92*c*, to initial expanded diameters 5908*a* and 5908*b*, respectively, illustrated in FIGS. 92*d* and 92*f*, and then shrink back to the desired final expanded diameters 5908*d* and 5908*e*, respectively, illustrated in FIG. 92*e*.

One of the problems of the pipe material selection for expandable tubular application is an apparent contradiction or inconsistency between strength and elongation. To increase burst and collapse strength, material with higher yield strength is used. The higher yield strength generally corresponds to a decrease in the fracture toughness and correspondingly limits the extent of achievable expansion.

It is desirable to select the steel material for the tubing by balancing steel strength with amount absorbed energy measure by Charpy testing. Generally these tests are done on samples cut from tubular members. It has been found to be beneficial to cut directional samples both longitudinally oriented (aligned with the axis) and circumferentially oriented (generally perpendicular to the axis). This method of selecting samples is beneficial when both directional orientations are used yet does not completely evaluate possible and characteristic anisotropy throughout a tubular member. Moreover, for small diameter tubing samples representative of the circumferential direction may be difficult and sometimes impossible to obtain because of the significant curvature of the tubing.

To further facilitate evaluation of a tubular member for suitability for expansion it has been found beneficial according to one aspect of the invention to consider the plastic strain ratio. One such ratio is called a Lankford value (or r-value) which is the ratio of the strains occurring in the width and thickness directions measured in a single tension test. The plastic strain ratio (r or Lankford-value) with a value of greater than 1.0 is found to be more resistant to thinning and better suited to tubular expansion. Such a Lankford value is found to be a measure of plastic anisotropy. The Lankford value (r) may be calculate by the Equation 7 below:

$$r = \frac{\ln\frac{b_o}{b_k}}{\ln\frac{L_k b_k}{l_o b_o}} \quad \text{Equation 7}$$

where, r—normal anisotropy coefficient bo & bk—initial and final width

Lo & Lk—initial and final length

However, it is time consuming and labor intensive for this parameter to be measured using samples cut from real parts such as from the tubular members. The tubular members will have anisotropic characteristics due to crystallographic or "grain" orientation and mechanically induced differences such as impurities, inclusions, and voids, requiring multiple samples for reliably complete information. Moreover, with individual samples, only local characteristics are determined and the complete anisotropy of the tubular member may not be determinable. Further some of the tubular members have small diameters so that cutting samples oriented in a circumferential direction is not always possible. Information regarding the characteristics in the circumferential direction has been found to be important because the plastic deformation during expansion of the tubular members occurs to a very large extent in the circumferential direction.

In an exemplary embodiment, one aspect of the present disclosure comprises the development of a solution for anisotropy evaluation, including a kind of plastic strain ratio similar to the Lankford parameter that is measured using real tubular members subjected to axial loading.

FIG. 93 depicts in a schematic fragmentary cross-sectional view along a plane along and through the axis 6012 of a tubular member 6010 that is tested with axial opposed forces 6014 and 6015. The tubular member 6010 is axially stretched beyond the elastic limit, through yielding and to ultimate yield or fracture. Measurements of the force and the OD and ID during the process produce test data that can be used in the formula below to produce an expandability coefficient "f" as set forth in Equation 7 above. Alternatively a coefficient called a formability anisotropy coefficient F(r) that is function of the normal anisotropy Lankford coefficient r may be determined as in Equation 8 below:

$$F(r) = \frac{\ln\frac{b_o}{b_k}}{\ln\frac{L_k b_k}{l_o b_o}} \quad \text{Equation 8}$$

F(r)—formability anisotropy coefficient bo & bk—initial and final tube area (inch^2)

Lo & Lk—initial and final tube length (inch)

b=(D^2−d^2)/4—cross section tube area.

In either circumstance f or F(r) the use of this testing method for an entire tubular member provides useful information including anisotropic characteristics or anisotropy of the tubular member for selecting or producing beneficial tubular members for down hole expansion, similar to the use of the Lankford value for a sheet material.

Just as values for stress and strain may be plotted for solid specimen samples, as schematically depicted in FIG. 94, the values for conducting a test on the tubular member may also be plotted, as depicted in FIG. 95. On this basis the expansion coefficient f (or the formability coefficient F(r)) may be determined. It will be the best to measure distribution (Tensile-elongation) in longitudinal and circumferential directions simultaneously.

The foregoing expandability coefficient (or formability coefficient) is found to be useful in predicting good expansion results and may be further useful when used in combination with one or more other properties of a tubular member selected from stress-strain properties in one or more directional orientations of the material, strength & elongation, Charpy V-notch impact value in one or more directional orientations of the material, stress burst rupture, stress collapse rupture, yield strength, ductility, toughness, and strain-hardening exponent (n-value), and hardness.

In an exemplary embodiment, a tribological system is used to reduce friction and thereby minimize the expansion forces required during the radial expansion and plastic deformation of the tubular members that includes one or more of the following: (1) a tubular tribology system; (2) a drilling mud tribology system; (3) a lubrication tribology system; and (4) an expansion device tribology system.

In an exemplary embodiment, the tubular tribology system includes the application of coatings of lubricant to the interior surface of the tubular members.

In an exemplary embodiment, the drilling mud tribology system includes the addition of lubricating additives to the drilling mud.

In an exemplary embodiment, the lubrication tribology system includes the use of lubricating greases, self-lubricating expansion devices, automated injection/delivery of lubricating greases into the interface between an expansion device and the tubular members, surfaces within the interface between the expansion device and the expandable tubular member that are self-lubricating, surfaces within the interface between the expansion device and the expandable tubular member that are textured, self-lubricating surfaces within the interface between the expansion device and the expandable tubular member that include diamond and/or ceramic inserts, thermosprayed coatings, fluoropolymer coatings, PVD films, and/or CVD films.

In an exemplary embodiment, the tubular members include one or more of the following characteristics: high burst and collapse, the ability to be radially expanded more than about 40%, high fracture toughness, defect tolerance, strain recovery @ 150 F, good bending fatigue, optimal residual stresses, and corrosion resistance to H$_2$S in order to provide optimal characteristics during and after radial expansion and plastic deformation.

In an exemplary embodiment, the tubular members are fabricated from a steel alloy having a charpy energy of at least about 90 ft-lbs in order to provided enhanced characteristics during and after radial expansion and plastic deformation of the expandable tubular member.

In an exemplary embodiment, the tubular members are fabricated from a steel alloy having a weight percentage of carbon of less than about 0.08% in order to provide enhanced characteristics during and after radial expansion and plastic deformation of the tubular members.

In an exemplary embodiment, the tubular members are fabricated from a steel alloy having reduced sulfur content in order to minimize hydrogen induced cracking.

In an exemplary embodiment, the tubular members are fabricated from a steel alloy having a weight percentage of carbon of less than about 0.20% and a charpy-V-notch impact toughness of at least about 6 joules in order to provide enhanced characteristics during and after radial expansion and plastic deformation of the tubular members.

In an exemplary embodiment, the tubular members are fabricated from a steel alloy having a low weight percentage of carbon in order to enhance toughness, ductility, weldability, shelf energy, and hydrogen induced cracking resistance.

In several exemplary embodiments, the tubular members are fabricated from a steel alloy having the following percentage compositions in order to provide enhanced characteristics during and after radial expansion and plastic deformation of the tubular members:

|  | C | Si | Mn | P | S | Al | N | Cu | Cr | Ni | Nb | Ti | Co | Mo |
|---|---|---|---|---|---|---|---|---|---|---|---|---|---|---|
| EXAMPLE A | 0.030 | 0.22 | 1.74 | 0.005 | 0.0005 | 0.028 | 0.0037 | 0.30 | 0.26 | 0.15 | 0.095 | 0.014 | 0.0034 | |
| EXAMPLE B MIN | 0.020 | 0.23 | 1.70 | 0.004 | 0.0005 | 0.026 | 0.0030 | 0.27 | 0.26 | 0.16 | 0.096 | 0.012 | 0.0021 | |
| EXAMPLE B MAX | 0.032 | 0.26 | 1.92 | 0.009 | 0.0010 | 0.035 | 0.0047 | 0.32 | 0.29 | 0.18 | 0.120 | 0.016 | 0.0050 | |
| EXAMPLE C | 0.028 | 0.24 | 1.77 | 0.007 | 0.0008 | 0.030 | 0.0035 | 0.29 | 0.27 | 0.17 | 0.101 | 0.014 | 0.0028 | 0.0020 |
| EXAMPLE D | 0.08 | 0.30 | 0.5 | 0.07 | 0.005 | | 0.010 | 0.10 | 0.50 | 0.10 | | | | |
| EXAMPLE E | 0.0028 | 0.009 | 0.17 | 0.011 | 0.006 | 0.027 | 0.0029 | | 0.029 | 0.014 | 0.035 | 0.007 | | |
| EXAMPLE F | 0.03 | 0.1 | 0.1 | 0.015 | 0.005 | | | | | 18.0 | | 0.6 | 9 | 5 |
| EXAMPLE G | 0.002 | 0.01 | 0.15 | 0.07 | 0.005 | 0.04 | 0.0025 | | | | 0.015 | 0.010 | | |

In an exemplary embodiment, the ratio of the outside diameter D of the tubular members to the wall thickness t of the tubular members range from about 12 to 22 in order to enhance the collapse strength of the radially expanded and plastically deformed tubular members.

In an exemplary embodiment, the outer portion of the wall thickness of the radially expanded and plastically deformed tubular members includes tensile residual stresses in order to enhance the collapse strength following radial expansion and plastic deformation.

In several exemplary experimental embodiments, reducing residual stresses in samples of the tubular members prior to radial expansion and plastic deformation increased the collapse strength of the radially expanded and plastically deformed tubular members.

In several exemplary experimental embodiments, the collapse strength of radially expanded and plastically deformed samples of the tubulars were determined on an as-received basis, after strain aging at 250 F for 5 hours to reduce residual stresses, and after strain aging at 350 F for 14 days to reduce residual stresses as follows:

| Tubular Sample | Collapse Strength After 10% Radial Expansion |
|---|---|
| Tubular Sample 1 - as received from manufacturer | 4000 psi |
| Tubular Sample 1 - strain aged at 250 F. for 5 hours to reduce residual stresses | 4800 psi |
| Tubular Sample 1 - strain aged at 350 F. for 14 days to reduce residual stresses | 5000 psi |

As indicated by the above table, reducing residual stresses in the tubular members, prior to radial expansion and plastic deformation, significantly increased the resulting collapse strength-post expansion.

In several exemplary embodiments, the teachings of the present disclosure are combined with one or more of the teachings disclosed in FR 2 841 626, filed on Jun. 28, 2002, and published on Jan. 2, 2004, the disclosure of which is incorporated herein by reference.

A method of forming a tubular liner within a preexisting structure has been described that includes positioning a tubular assembly within the preexisting structure; and radially expanding and plastically deforming the tubular assembly within the preexisting structure, wherein, prior to the radial expansion and plastic deformation of the tubular assembly, a predetermined portion of the tubular assembly has a lower yield point than another portion of the tubular assembly. In an exemplary embodiment, the predetermined portion of the tubular assembly has a higher ductility and a lower yield point prior to the radial expansion and plastic deformation than after the radial expansion and plastic deformation. In an exemplary embodiment, the predetermined portion of the tubular assembly has a higher ductility prior to the radial expansion and plastic deformation than after the radial expansion and plastic deformation. In an exemplary embodiment, the predetermined portion of the tubular assembly has a lower yield point prior to the radial expansion and plastic deformation than after the radial expansion and plastic deformation. In an exemplary embodiment, the predetermined portion of the tubular assembly has a larger inside diameter after the radial expansion and plastic deformation than other portions of the tubular assembly. In an exemplary embodiment, the method further includes positioning another tubular assembly within the preexisting structure in overlapping relation to the tubular assembly; and radially expanding and plastically deforming the other tubular assembly within the preexisting structure, wherein, prior to the radial expansion and plastic deformation of the tubular assembly, a predetermined portion of the other tubular assembly has a lower yield point than another portion of the other tubular assembly. In an exemplary embodiment, the inside diameter of the radially expanded and plastically deformed other portion of the tubular assembly is equal to the inside diameter of the radially expanded and plastically deformed other portion of the other tubular assembly. In an exemplary embodiment, the predetermined portion of the tubular assembly includes an end portion of the tubular assembly. In an exemplary embodiment, the predetermined portion of the tubular assembly includes a plurality of predetermined portions of the tubular assembly. In an exemplary embodiment, the predetermined portion of the tubular assembly includes a plurality of spaced apart predetermined portions of the tubular assembly. In an exemplary embodiment, the other portion of the tubular assembly includes an end portion of the tubular assembly. In an exemplary embodiment, the other portion of the tubular assembly includes a plurality of other portions of the tubular assembly. In an exemplary embodiment, the other portion of the tubular assembly includes a plurality of spaced apart other portions of the tubular assembly. In an exemplary embodiment, the tubular assembly includes a plurality of tubular members coupled to one another by corresponding tubular couplings. In an exemplary embodiment, the tubular couplings include the predetermined portions of the tubular assembly; and wherein the tubular members comprise the other portion of the tubular assembly. In an exemplary embodiment, one or more of the tubular couplings include the predetermined portions of the tubular assembly. In an exemplary embodiment, one or more of the tubular members include the predetermined portions of the tubular assembly. In an exemplary embodiment, the predetermined portion of the tubular assembly defines one or more openings. In an exemplary embodiment, one or more of the openings include slots. In an exemplary embodiment, the anisotropy for the predetermined portion of the tubular assembly is greater than 1. In an exemplary embodiment, the anisotropy for the predetermined portion of the tubular assembly is greater than 1. In an exemplary embodiment, the strain hardening exponent for the predetermined portion of the tubular assembly is greater than 0.12. In an exemplary embodiment, the anisotropy for the predetermined portion of the tubular assembly is greater than 1; and the strain hardening exponent for the predetermined portion of the tubular assembly is greater than 0.12. In an exemplary embodiment, the predetermined portion of the tubular assembly is a first steel alloy including: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the tubular assembly is at most about 46.9 ksi prior to the radial expansion and plastic deformation; and the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.48. In an exemplary embodiment, the predetermined portion of the tubular assembly includes a second steel alloy including: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the tubular assembly is at most about 57.8 ksi prior to the radial expansion and plastic deformation; and the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.04. In an exemplary embodiment, the predetermined portion of the tubular assembly includes a third steel alloy including: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the tubular assembly, prior to the radial expansion and plastic deformation, is about 1.92. In an exemplary embodiment, the predetermined portion of the tubular assembly includes a fourth steel alloy including: 0.02% C, 1.31% Mn, 0.02% P, 0.001% S, 0.45% Si, 9.1% Ni, and 18.7% Cr. In an exemplary embodiment, the anisotropy of the predetermined portion of the tubular assembly, prior to the radial expansion and plastic deformation, is about 1.34. In an exemplary embodiment, the yield point of the predetermined portion of the tubular assembly is at most about 46.9 ksi prior to the radial expansion and plastic deformation; and wherein the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.48. In an exemplary embodiment, the yield point of the predetermined portion of the tubular assembly is at most about 57.8 ksi prior to the radial expansion and plastic deformation; and the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.04. In an exemplary embodiment, the anisotropy of the predetermined portion of the tubular assembly, prior to the radial expansion and plastic deformation, is at least about 1.92. In an exemplary embodiment, the anisotropy of the predetermined portion of the tubular assembly, prior to the radial expansion and plastic deformation, is at least about 1.34. In an exemplary embodiment, the anisotropy of the predetermined portion of the tubular assembly, prior to the radial expansion and plastic deformation, ranges from about 1.04 to about 1.92. In an exemplary embodiment, the yield point of the predetermined portion of the tubular assembly, prior to the radial expansion and plastic deformation, ranges from about 47.6 ksi to about 61.7 ksi. In an exemplary embodiment, the expandability coefficient of the predetermined portion of the tubular assembly, prior to the radial expansion and plastic deformation, is greater than 0.12. In an exemplary embodiment, the expandability coefficient of the predetermined portion of the tubular assembly is greater than the expandability coefficient of the other portion of the tubular assembly. In an exemplary embodiment, the tubular assembly includes a wellbore casing, a pipeline, or a structural support. In an exemplary embodiment, the carbon content of the predetermined portion of the tubular assembly is less than or equal to 0.12 percent; and wherein the carbon equivalent value for the predetermined portion of the tubular assembly is less than 0.21. In an exemplary embodiment, the carbon content of the predetermined portion of the tubular assembly is greater than 0.12 percent; and wherein the carbon equivalent value for the predetermined portion of the tubular assembly is less than 0.36. In an exemplary embodiment, a yield point of an inner tubular portion of at least a portion of the tubular assembly is less than a yield point of an outer tubular portion of the portion of the tubular assembly. In an exemplary embodiment, yield point of the inner tubular portion of the tubular body varies as a function of the radial position within the tubular body. In an exemplary embodiment, the yield point of the inner tubular portion of the tubular body varies in an linear fashion as a function of the radial position within the tubular body. In an exemplary embodiment, the yield point of the inner tubular portion of the tubular body varies in an non-linear fashion as a function of the radial position within the tubular body. In an exemplary embodiment, the yield point of the outer tubular portion of the tubular body varies as a function of the radial position within the tubular body. In an exemplary embodiment, the yield point of the outer tubular portion of the tubular body varies in an linear fashion as a function of the radial position within the tubular body. In an exemplary embodiment, the yield point of the outer tubular portion of the tubular body varies in an non-linear fashion as a function of the radial position within the tubular body. In an exemplary embodiment, the yield point of the inner tubular portion of the tubular body varies as a function of the radial position within the tubular body; and wherein the yield point of the outer tubular portion of the tubular body varies as a function of the radial position within the tubular body. In an exemplary embodiment, the yield point of the inner tubular portion of the tubular body varies in a linear fashion as a function of the radial position within the tubular body; and wherein the yield point of the outer tubular portion of the tubular body varies in a linear fashion as a function of the radial position within the tubular body. In an exemplary embodiment, the yield point of the inner tubular portion of the tubular body varies in a linear fashion as a function of the radial position within the tubular body; and wherein the yield point of the outer tubular portion of the tubular body varies in a non-linear fashion as a function of the radial position within the tubular body. In an exemplary embodiment, the yield point of the inner tubular portion of the tubular body varies in a non-linear fashion as a function of the radial position within the tubular body; and wherein the yield point of the outer tubular portion of the tubular body varies in a linear fashion as a function of the radial position within the tubular body. In an exemplary embodiment, the yield point of the inner tubular portion of the tubular body varies in a non-linear fashion as a function of the radial position within the tubular body; and wherein the yield point of the outer tubular portion of the tubular body varies in a non-linear fashion as a function of the radial position within the tubular body. In an exemplary embodiment, the rate of change of the yield point of the inner tubular portion of the tubular body is different than the rate of change of the yield point of the outer tubular portion of the tubular body. In an exemplary embodiment, the rate of change of the yield point of the inner tubular portion of the tubular body is different than the rate of change of the yield point of the outer tubular portion of the tubular body. In an exemplary embodiment, prior to the radial expansion and plastic deformation, at least a portion of the tubular assembly comprises a microstructure comprising a hard phase structure and a soft phase structure. In an exemplary embodiment, prior to the radial expansion and plastic deformation, at least a portion of the tubular assembly comprises a microstructure comprising a transitional phase structure. In an exemplary embodiment, the hard phase structure comprises martensite. In an exemplary embodiment, the soft phase structure comprises ferrite. In an exemplary embodiment, the transitional phase structure comprises retained austenite. In an exemplary embodiment, the hard phase structure comprises martensite; wherein the soft phase structure comprises ferrite; and wherein the transitional phase structure comprises retained austenite. In an exemplary embodiment, the portion of the tubular assembly comprising a microstructure comprising a hard phase structure and a soft phase structure comprises, by weight percentage, about 0.1% C, about 1.2% Mn, and about 0.3% Si.

An expandable tubular member has been described that includes a steel alloy including: 0.065% C, 1.44% Mn, 0.01% P, 0.002% S, 0.24% Si, 0.01% Cu, 0.01% Ni, and 0.02% Cr. In an exemplary embodiment, a yield point of the tubular member is at most about 46.9 ksi prior to a radial expansion and plastic deformation; and a yield point of the tubular member is at least about 65.9 ksi after the radial expansion and plastic deformation. In an exemplary embodiment, the yield point of the tubular member after the radial expansion and plastic deformation is at least about 40% greater than the yield point of the tubular member prior to the radial expansion and plastic deformation. In an exemplary embodiment, the anisotropy of the tubular member, prior to a radial expansion and plastic deformation, is about 1.48. In an exemplary embodiment, the tubular member includes a wellbore casing, a pipeline, or a structural support.

An expandable tubular member has been described that includes a steel alloy including: 0.18% C, 1.28% Mn, 0.017% P, 0.004% S, 0.29% Si, 0.01% Cu, 0.01% Ni, and 0.03% Cr. In an exemplary embodiment, a yield point of the tubular member is at most about 57.8 ksi prior to a radial expansion and plastic deformation; and the yield point of the tubular member is at least about 74.4 ksi after the radial expansion and plastic deformation. In an exemplary embodiment, a yield point of the of the tubular member after a radial expansion and plastic deformation is at least about 28% greater than the yield point of the tubular member prior to the radial expansion and plastic deformation. In an exemplary embodiment, the anisotropy of the tubular member, prior to a radial expansion and plastic deformation, is about 1.04. In an exemplary embodiment, the tubular member includes a wellbore casing, a pipeline, or a structural support.

An expandable tubular member has been described that includes a steel alloy including: 0.08% C, 0.82% Mn, 0.006% P, 0.003% S, 0.30% Si, 0.16% Cu, 0.05% Ni, and 0.05% Cr. In an exemplary embodiment, the anisotropy of the tubular member, prior to a radial expansion and plastic deformation, is about 1.92. In an exemplary embodiment, the tubular member includes a wellbore casing, a pipeline, or a structural support.

An expandable tubular member has been described that includes a steel alloy including: 0.02% C, 1.31% Mn, 0.02% P, 0.001% S, 0.45% Si, 9.1% Ni, and 18.7% Cr. In an exemplary embodiment, the anisotropy of the tubular member, prior to a radial expansion and plastic deformation, is about 1.34. In an exemplary embodiment, the tubular member includes a wellbore casing, a pipeline, or a structural support.

An expandable tubular member has been described, wherein the yield point of the expandable tubular member is at most about 46.9 ksi prior to a radial expansion and plastic deformation; and wherein the yield point of the expandable tubular member is at least about 65.9 ksi after the radial expansion and plastic deformation. In an exemplary embodiment, the tubular member includes a wellbore casing, a pipeline, or a structural support.

An expandable tubular member has been described, wherein a yield point of the expandable tubular member after a radial expansion and plastic deformation is at least about 40% greater than the yield point of the expandable tubular member prior to the radial expansion and plastic deformation. In an exemplary embodiment, the tubular member includes a wellbore casing, a pipeline, or a structural support.

An expandable tubular member has been described, wherein the anisotropy of the expandable tubular member, prior to the radial expansion and plastic deformation, is at least about 1.48. In an exemplary embodiment, the tubular member includes a wellbore casing, a pipeline, or a structural support.

An expandable tubular member has been described, wherein the yield point of the expandable tubular member is at most about 57.8 ksi prior to the radial expansion and plastic deformation; and wherein the yield point of the expandable tubular member is at least about 74.4 ksi after the radial expansion and plastic deformation. In an exemplary embodiment, the tubular member includes a wellbore casing, a pipeline, or a structural support.

An expandable tubular member has been described, wherein the yield point of the expandable tubular member after a radial expansion and plastic deformation is at least about 28% greater than the yield point of the expandable tubular member prior to the radial expansion and plastic deformation. In an exemplary embodiment, the tubular member includes a wellbore casing, a pipeline, or a structural support.

An expandable tubular member has been described, wherein the anisotropy of the expandable tubular member, prior to the radial expansion and plastic deformation, is at least about 1.04. In an exemplary embodiment, the tubular member includes a wellbore casing, a pipeline, or a structural support.

An expandable tubular member has been described, wherein the anisotropy of the expandable tubular member, prior to the radial expansion and plastic deformation, is at least about 1.92. In an exemplary embodiment, the tubular member includes a wellbore casing, a pipeline, or a structural support.

An expandable tubular member has been described, wherein the anisotropy of the expandable tubular member, prior to the radial expansion and plastic deformation, is at least about 1.34. In an exemplary embodiment, the tubular member includes a wellbore casing, a pipeline, or a structural support.

An expandable tubular member has been described, wherein the anisotropy of the expandable tubular member, prior to the radial expansion and plastic deformation, ranges from about 1.04 to about 1.92. In an exemplary embodiment, the tubular member includes a wellbore casing, a pipeline, or a structural support.

An expandable tubular member has been described, wherein the yield point of the expandable tubular member, prior to the radial expansion and plastic deformation, ranges from about 47.6 ksi to about 61.7 ksi. In an exemplary embodiment, the tubular member includes a wellbore casing, a pipeline, or a structural support.

An expandable tubular member has been described, wherein the expandability coefficient of the expandable tubular member, prior to the radial expansion and plastic deformation, is greater than 0.12. In an exemplary embodiment, the tubular member includes a wellbore casing, a pipeline, or a structural support.

An expandable tubular member has been described, wherein the expandability coefficient of the expandable tubular member is greater than the expandability coefficient of another portion of the expandable tubular member. In an exemplary embodiment, the tubular member includes a wellbore casing, a pipeline, or a structural support.

An expandable tubular member has been described, wherein the tubular member has a higher ductility and a lower yield point prior to a radial expansion and plastic deformation than after the radial expansion and plastic deformation. In an exemplary embodiment, the tubular member includes a wellbore casing, a pipeline, or a structural support.

A method of radially expanding and plastically deforming a tubular assembly including a first tubular member coupled to a second tubular member has been described that includes radially expanding and plastically deforming the tubular assembly within a preexisting structure; and using less power to radially expand each unit length of the first tubular member than to radially expand each unit length of the second tubular member. In an exemplary embodiment, the tubular member includes a wellbore casing, a pipeline, or a structural support.

A system for radially expanding and plastically deforming a tubular assembly including a first tubular member coupled to a second tubular member has been described that includes means for radially expanding the tubular assembly within a preexisting structure; and means for using less power to radially expand each unit length of the first tubular member than required to radially expand each unit length of the second tubular member. In an exemplary embodiment, the tubular member includes a wellbore casing, a pipeline, or a structural support.

A method of manufacturing a tubular member has been described that includes processing a tubular member until the tubular member is characterized by one or more intermediate characteristics; positioning the tubular member within a preexisting structure; and processing the tubular member within the preexisting structure until the tubular member is characterized one or more final characteristics. In an exemplary embodiment, the tubular member includes a wellbore casing, a pipeline, or a structural support. In an exemplary embodiment, the preexisting structure includes a wellbore that traverses a subterranean formation. In an exemplary embodiment, the characteristics are selected from a group consisting of yield point and ductility. In an exemplary embodiment, processing the tubular member within the preexisting structure until the tubular member is characterized one or more final characteristics includes: radially expanding and plastically deforming the tubular member within the preexisting structure.

An apparatus has been described that includes an expandable tubular assembly; and an expansion device coupled to the expandable tubular assembly; wherein a predetermined portion of the expandable tubular assembly has a lower yield point than another portion of the expandable tubular assembly. In an exemplary embodiment, the expansion device includes a rotary expansion device, an axially displaceable expansion device, a reciprocating expansion device, a hydroforming expansion device, and/or an impulsive force expansion device. In an exemplary embodiment, the predetermined portion of the tubular assembly has a higher ductility and a lower yield point than another portion of the expandable tubular assembly. In an exemplary embodiment, the predetermined portion of the tubular assembly has a higher ductility than another portion of the expandable tubular assembly. In an exemplary embodiment, the predetermined portion of the tubular assembly has a lower yield point than another portion of the expandable tubular assembly. In an exemplary embodiment, the predetermined portion of the tubular assembly includes an end portion of the tubular assembly. In an exemplary embodiment, the predetermined portion of the tubular assembly includes a plurality of predetermined portions of the tubular assembly. In an exemplary embodiment, the predetermined portion of the tubular assembly includes a plurality of spaced apart predetermined portions of the tubular assembly. In an exemplary embodiment, the other portion of the tubular assembly includes an end portion of the tubular assembly. In an exemplary embodiment, the other portion of the tubular assembly includes a plurality of other portions of the tubular assembly. In an exemplary embodiment, the other portion of the tubular assembly includes a plurality of spaced apart other portions of the tubular assembly. In an exemplary embodiment, the tubular assembly includes a plurality of tubular members coupled to one another by corresponding tubular couplings. In an exemplary embodiment, the tubular couplings comprise the predetermined portions of the tubular assembly; and wherein the tubular members comprise the other portion of the tubular assembly. In an exemplary embodiment, one or more of the tubular couplings comprise the predetermined portions of the tubular assembly. In an exemplary embodiment, one or more of the tubular members comprise the predetermined portions of the tubular assembly. In an exemplary embodiment, the predetermined portion of the tubular assembly defines one or more openings. In an exemplary embodiment, one or more of the openings comprise slots. In an exemplary embodiment, the anisotropy for the predetermined portion of the tubular assembly is greater than 1 In an exemplary embodiment, the anisotropy for the predetermined portion of the tubular assembly is greater than 1. In an exemplary embodiment, the strain hardening exponent for the predetermined portion of the tubular assembly is greater than 0.12. In an exemplary embodiment, the anisotropy for the predetermined portion of the tubular assembly is greater than 1; and wherein the strain hardening exponent for the predetermined portion of the tubular assembly is greater than 0.12. In an exemplary embodiment, the predetermined portion of the tubular assembly includes a first steel alloy including: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the tubular assembly is at most about 46.9 ksi. In an exemplary embodiment, the anisotropy of the predetermined portion of the tubular assembly is about 1.48. In an exemplary embodiment, the predetermined portion of the tubular assembly includes a second steel alloy including: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the tubular assembly is at most about 57.8 ksi. In an exemplary embodiment, the anisotropy of the predetermined portion of the tubular assembly is about 1.04. In an exemplary embodiment, the predetermined portion of the tubular assembly includes a third steel alloy including: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the tubular assembly is about 1.92. In an exemplary embodiment, the predetermined portion of the tubular assembly includes a fourth steel alloy including: 0.02% C, 1.31% Mn, 0.02% P, 0.001% S, 0.45% Si, 9.1% Ni, and 18.7% Cr. In an exemplary embodiment, the anisotropy of the predetermined portion of the tubular assembly is at least about 1.34. In an exemplary embodiment, the yield point of the predetermined portion of the tubular assembly is at most about 46.9 ksi. In an exemplary embodiment, the anisotropy of the predetermined portion of the tubular assembly is at least about 1.48. In an exemplary embodiment, the yield point of the predetermined portion of the tubular assembly is at most about 57.8 ksi. In an exemplary embodiment, the anisotropy of the predetermined portion of the tubular assembly is at least about 1.04. In an exemplary embodiment, the anisotropy of the predetermined portion of the tubular assembly is at least about 1.92. In an exemplary embodiment, the anisotropy of the predetermined portion of the tubular assembly is at least about 1.34. In an exemplary embodiment, the anisotropy of the predetermined portion of the tubular assembly ranges from about 1.04 to about 1.92. In an exemplary embodiment, the yield point of the predetermined portion of the tubular assembly ranges from about 47.6 ksi to about 61.7 ksi. In an exemplary embodiment, the expandability coefficient of the predetermined portion of the tubular assembly is greater than 0.12. In an exemplary embodiment, the expandability coefficient of the predetermined portion of the tubular assembly is greater than the expandability coefficient of the other portion of the tubular assembly. In an exemplary embodiment, the tubular assembly includes a wellbore casing, a pipeline, or a structural support. In an exemplary embodiment, the carbon content of the predetermined portion of the tubular assembly is less than or equal to 0.12 percent; and wherein the carbon equivalent value for the predetermined portion of the tubular assembly is less than 0.21. In an exemplary embodiment, the carbon content of the predetermined portion of the tubular assembly is greater than 0.12 percent; and wherein the carbon equivalent value for the predetermined portion of the tubular assembly is less than 0.36. In an exemplary embodiment, a yield point of an inner tubular portion of at least a portion of the tubular assembly is less than a yield point of an outer tubular portion of the portion of the tubular assembly. In an exemplary embodiment, the yield point of the inner tubular portion of the tubular body varies as a function of the radial position within the tubular body. In an exemplary embodiment, the yield point of the inner tubular portion of the tubular body varies in an linear fashion as a function of the radial position within the tubular body. In an exemplary embodiment, the yield point of the inner tubular portion of the tubular body varies in an non-linear fashion as a function of the radial position within the tubular body. In an exemplary embodiment, the yield point of the outer tubular portion of the tubular body varies as a function of the radial position within the tubular body. In an exemplary embodiment, the yield point of the outer tubular portion of the tubular body varies in an linear fashion as a function of the radial position within the tubular body. In an exemplary embodiment, the yield point of the outer tubular portion of the tubular body varies in an non-linear fashion as a function of the radial position within the tubular body. In an exemplary embodiment, the yield point of the inner tubular portion of the tubular body varies as a function of the radial position within the tubular body; and wherein the yield point of the outer tubular portion of the tubular body varies as a function of the radial position within the tubular body. In an exemplary embodiment, the yield point of the inner tubular portion of the tubular body varies in a linear fashion as a function of the radial position within the tubular body; and wherein the yield point of the outer tubular portion of the tubular body varies in a linear fashion as a function of the radial position within the tubular body. In an exemplary embodiment, the yield point of the inner tubular portion of the tubular body varies in a linear fashion as a function of the radial position within the tubular body; and wherein the yield point of the outer tubular portion of the tubular body varies in a non-linear fashion as a function of the radial position within the tubular body. In an exemplary embodiment, the yield point of the inner tubular portion of the tubular body varies in a non-linear fashion as a function of the radial position within the tubular body; and wherein the yield point of the outer tubular portion of the tubular body varies in a linear fashion as a function of the radial position within the tubular body. In an exemplary embodiment, the yield point of the inner tubular portion of the tubular body varies in a non-linear fashion as a function of the radial position within the tubular body; and wherein the yield point of the outer tubular portion of the tubular body varies in a non-linear fashion as a function of the radial position within the tubular body. In an exemplary embodiment, the rate of change of the yield point of the inner tubular portion of the tubular body is different than the rate of change of the yield point of the outer tubular portion of the tubular body. In an exemplary embodiment, the rate of change of the yield point of the inner tubular portion of the tubular body is different than the rate of change of the yield point of the outer tubular portion of the tubular body. In an exemplary embodiment, at least a portion of the tubular assembly comprises a microstructure comprising a hard phase structure and a soft phase structure. In an exemplary embodiment, prior to the radial expansion and plastic deformation, at least a portion of the tubular assembly comprises a microstructure comprising a transitional phase structure. In an exemplary embodiment, wherein the hard phase structure comprises martensite. In an exemplary embodiment, wherein the soft phase structure comprises ferrite. In an exemplary embodiment, wherein the transitional phase structure comprises retained austenite. In an exemplary embodiment, the hard phase structure comprises martensite; wherein the soft phase structure comprises ferrite; and wherein the transitional phase structure comprises retained austenite. In an exemplary embodiment, the portion of the tubular assembly comprising a microstructure comprising a hard phase structure and a soft phase structure comprises, by weight percentage, about 0.1% C, about 1.2% Mn, and about 0.3% Si. In an exemplary embodiment, at least a portion of the tubular assembly comprises a microstructure comprising a hard phase structure and a soft phase structure. In an exemplary embodiment, the portion of the tubular assembly comprises, by weight percentage, 0.065% C, 1.44% Mn, 0.01% P, 0.002% S, 0.24% Si, 0.01% Cu, 0.01% Ni, 0.02% Cr, 0.05% V, 0.01% Mo, 0.01% Nb, and 0.01% Ti. In an exemplary embodiment, the portion of the tubular assembly comprises, by weight percentage, 0.18% C, 1.28% Mn, 0.017% P, 0.004% S, 0.29% Si, 0.01% Cu, 0.01% Ni, 0.03% Cr, 0.04% V, 0.01% Mo, 0.03% Nb, and 0.01% Ti. In an exemplary embodiment, the portion of the tubular assembly comprises, by weight percentage, 0.08% C, 0.82% Mn, 0.006% P, 0.003% S, 0.30% Si, 0.06% Cu, 0.05% Ni, 0.05% Cr, 0.03% V, 0.03% Mo, 0.01% Nb, and 0.01% Ti. In an exemplary embodiment, the portion of the tubular assembly comprises a microstructure comprising one or more of the following: martensite, pearlite, vanadium carbide, nickel carbide, or titanium carbide. In an exemplary embodiment, the portion of the tubular assembly comprises a microstructure comprising one or more of the following: pearlite or pearlite striation. In an exemplary embodiment, the portion of the tubular assembly comprises a microstructure comprising one or more of the following: grain pearlite, widmanstatten martensite, vanadium carbide, nickel carbide, or titanium carbide. In an exemplary embodiment, the portion of the tubular assembly comprises a microstructure comprising one or more of the following: ferrite, grain pearlite, or martensite. In an exemplary embodiment, the portion of the tubular assembly comprises a microstructure comprising one or more of the following: ferrite, martensite, or bainite. In an exemplary embodiment, the portion of the tubular assembly comprises a microstructure comprising one or more of the following: bainite, pearlite, or ferrite. In an exemplary embodiment, the portion of the tubular assembly comprises a yield strength of about 67 ksi and a tensile strength of about 95 ksi. In an exemplary embodiment, the portion of the tubular assembly comprises a yield strength of about 82 ksi and a tensile strength of about 130 ksi. In an exemplary embodiment, the portion of the tubular assembly comprises a yield strength of about 60 ksi and a tensile strength of about 97 ksi.

An expandable tubular member has been described, wherein a yield point of the expandable tubular member after a radial expansion and plastic deformation is at least about 5.8% greater than the yield point of the expandable tubular member prior to the radial expansion and plastic deformation. In an exemplary embodiment, the tubular member includes a wellbore casing, a pipeline, or a structural support.

A method of determining the expandability of a selected tubular member has been described that includes determining an anisotropy value for the selected tubular member, determining a strain hardening value for the selected tubular member; and multiplying the anisotropy value times the strain hardening value to generate an expandability value for the selected tubular member. In an exemplary embodiment, an anisotropy value greater than 0.12 indicates that the tubular member is suitable for radial expansion and plastic deformation. In an exemplary embodiment, the tubular member includes a wellbore casing, a pipeline, or a structural support.

A method of radially expanding and plastically deforming tubular members has been described that includes selecting a tubular member; determining an anisotropy value for the selected tubular member; determining a strain hardening value for the selected tubular member; multiplying the anisotropy value times the strain hardening value to generate an expandability value for the selected tubular member; and if the anisotropy value is greater than 0.12, then radially expanding and plastically deforming the selected tubular member. In an exemplary embodiment, the tubular member includes a wellbore casing, a pipeline, or a structural support. In an exemplary embodiment, radially expanding and plastically deforming the selected tubular member includes: inserting the selected tubular member into a preexisting structure; and then radially expanding and plastically deforming the selected tubular member. In an exemplary embodiment, the preexisting structure includes a wellbore that traverses a subterranean formation.

A radially expandable multiple tubular member apparatus has been described that includes a first tubular member; a second tubular member engaged with the first tubular member forming a joint; a sleeve overlapping and coupling the first and second tubular members at the joint; the sleeve having opposite tapered ends and a flange engaged in a recess formed in an adjacent tubular member; and one of the tapered ends being a surface formed on the flange. In an exemplary embodiment, the recess includes a tapered wall in mating engagement with the tapered end formed on the flange. In an exemplary embodiment, the sleeve includes a flange at each tapered end and each tapered end is formed on a respective flange. In an exemplary embodiment, each tubular member includes a recess. In an exemplary embodiment, each flange is engaged in a respective one of the recesses. In an exemplary embodiment, each recess includes a tapered wall in mating engagement with the tapered end formed on a respective one of the flanges.

A method of joining radially expandable multiple tubular members has also been described that includes providing a first tubular member; engaging a second tubular member with the first tubular member to form a joint; providing a sleeve having opposite tapered ends and a flange, one of the tapered ends being a surface formed on the flange; and mounting the sleeve for overlapping and coupling the first and second tubular members at the joint, wherein the flange is engaged in a recess formed in an adjacent one of the tubular members. In an exemplary embodiment, the method further includes providing a tapered wall in the recess for mating engagement with the tapered end formed on the flange. In an exemplary embodiment, the method further includes providing a flange at each tapered end wherein each tapered end is formed on a respective flange. In an exemplary embodiment, the method further includes providing a recess in each tubular member. In an exemplary embodiment, the method further includes engaging each flange in a respective one of the recesses. In an exemplary embodiment, the method further includes providing a tapered wall in each recess for mating engagement with the tapered end formed on a respective one of the flanges.

A radially expandable multiple tubular member apparatus has been described that includes a first tubular member; a second tubular member engaged with the first tubular member forming a joint; and a sleeve overlapping and coupling the first and second tubular members at the joint; wherein at least a portion of the sleeve is comprised of a frangible material.

A radially expandable multiple tubular member apparatus has been described that includes a first tubular member; a second tubular member engaged with the first tubular member forming a joint; and a sleeve overlapping and coupling the first and second tubular members at the joint; wherein the wall thickness of the sleeve is variable.

A method of joining radially expandable multiple tubular members has been described that includes providing a first tubular member; engaging a second tubular member with the first tubular member to form a joint; providing a sleeve comprising a frangible material; and mounting the sleeve for overlapping and coupling the first and second tubular members at the joint.

A method of joining radially expandable multiple tubular members has been described that includes providing a first tubular member; engaging a second tubular member with the first tubular member to form a joint; providing a sleeve comprising a variable wall thickness; and mounting the sleeve for overlapping and coupling the first and second tubular members at the joint.

An expandable tubular assembly has been described that includes a first tubular member; a second tubular member coupled to the first tubular member; and means for increasing the axial compression loading capacity of the coupling between the first and second tubular members before and after a radial expansion and plastic deformation of the first and second tubular members.

An expandable tubular assembly has been described that includes a first tubular member; a second tubular member coupled to the first tubular member; and means for increasing the axial tension loading capacity of the coupling between the first and second tubular members before and after a radial expansion and plastic deformation of the first and second tubular members.

An expandable tubular assembly has been described that includes a first tubular member; a second tubular member coupled to the first tubular member; and means for increasing the axial compression and tension loading capacity of the coupling between the first and second tubular members before and after a radial expansion and plastic deformation of the first and second tubular members.

An expandable tubular assembly has been described that includes a first tubular member; a second tubular member coupled to the first tubular member; and means for avoiding stress risers in the coupling between the first and second tubular members before and after a radial expansion and plastic deformation of the first and second tubular members.

An expandable tubular assembly has been described that includes a first tubular member; a second tubular member coupled to the first tubular member; and means for inducing stresses at selected portions of the coupling between the first and second tubular members before and after a radial expansion and plastic deformation of the first and second tubular members.

In several exemplary embodiments of the apparatus described above, the sleeve is circumferentially tensioned; and wherein the first and second tubular members are circumferentially compressed.

In several exemplary embodiments of the method described above, the method further includes maintaining the sleeve in circumferential tension; and maintaining the first and second tubular members in circumferential compression before, during, and/or after the radial expansion and plastic deformation of the first and second tubular members.

An expandable tubular assembly has been described that includes a first tubular member, a second tubular member coupled to the first tubular member, a first threaded connection for coupling a portion of the first and second tubular members, a second threaded connection spaced apart from the first threaded connection for coupling another portion of the first and second tubular members, a tubular sleeve coupled to and receiving end portions of the first and second tubular members, and a sealing element positioned between the first and second spaced apart threaded connections for sealing an interface between the first and second tubular member, wherein the sealing element is positioned within an annulus defined between the first and second tubular members. In an exemplary embodiment, the annulus is at least partially defined by an irregular surface. In an exemplary embodiment, the annulus is at least partially defined by a toothed surface. In an exemplary embodiment, the sealing element comprises an elastomeric material. In an exemplary embodiment, the sealing element comprises a metallic material. In an exemplary embodiment, the sealing element comprises an elastomeric and a metallic material.

A method of joining radially expandable multiple tubular members has been described that includes providing a first tubular member, providing a second tubular member, providing a sleeve, mounting the sleeve for overlapping and coupling the first and second tubular members, threadably coupling the first and second tubular members at a first location, threadably coupling the first and second tubular members at a second location spaced apart from the first location, and sealing an interface between the first and second tubular members between the first and second locations using a compressible sealing element. In an exemplary embodiment, the sealing element includes an irregular surface. In an exemplary embodiment, the sealing element includes a toothed surface. In an exemplary embodiment, the sealing element comprises an elastomeric material. In an exemplary embodiment, the sealing element comprises a metallic material. In an exemplary embodiment, the sealing element comprises an elastomeric and a metallic material.

An expandable tubular assembly has been described that includes a first tubular member, a second tubular member coupled to the first tubular member, a first threaded connection for coupling a portion of the first and second tubular members, a second threaded connection spaced apart from the first threaded connection for coupling another portion of the first and second tubular members, and a plurality of spaced apart tubular sleeves coupled to and receiving end portions of the first and second tubular members. In an exemplary embodiment, at least one of the tubular sleeves is positioned in opposing relation to the first threaded connection; and wherein at least one of the tubular sleeves is positioned in opposing relation to the second threaded connection. In an exemplary embodiment, at least one of the tubular sleeves is not positioned in opposing relation to the first and second threaded connections.

A method of joining radially expandable multiple tubular members has been described that includes providing a first tubular member, providing a second tubular member, threadably coupling the first and second tubular members at a first location, threadably coupling the first and second tubular members at a second location spaced apart from the first location, providing a plurality of sleeves, and mounting the sleeves at spaced apart locations for overlapping and coupling the first and second tubular members. In an exemplary embodiment, at least one of the tubular sleeves is positioned in opposing relation to the first threaded coupling; and wherein at least one of the tubular sleeves is positioned in opposing relation to the second threaded coupling. In an exemplary embodiment, at least one of the tubular sleeves is not positioned in opposing relation to the first and second threaded couplings.

An expandable tubular assembly has been described that includes a first tubular member, a second tubular member coupled to the first tubular member, and a plurality of spaced apart tubular sleeves coupled to and receiving end portions of the first and second tubular members.

A method of joining radially expandable multiple tubular members has been described that includes providing a first tubular member, providing a second tubular member, providing a plurality of sleeves, coupling the first and second tubular members, and mounting the sleeves at spaced apart locations for overlapping and coupling the first and second tubular members.

An expandable tubular assembly has been described that includes a first tubular member, a second tubular member coupled to the first tubular member, a threaded connection for coupling a portion of the first and second tubular members, and a tubular sleeves coupled to and receiving end portions of the first and second tubular members, wherein at least a portion of the threaded connection is upset. In an exemplary embodiment, at least a portion of tubular sleeve penetrates the first tubular member.

A method of joining radially expandable multiple tubular members has been described that includes providing a first tubular member, providing a second tubular member, threadably coupling the first and second tubular members, and upsetting the threaded coupling. In an exemplary embodiment, the first tubular member further comprises an annular extension extending therefrom, and the flange of the sleeve defines an annular recess for receiving and mating with the annular extension of the first tubular member. In an exemplary embodiment, the first tubular member further comprises an annular extension extending therefrom; and the flange of the sleeve defines an annular recess for receiving and mating with the annular extension of the first tubular member.

A radially expandable multiple tubular member apparatus has been described that includes a first tubular member, a second tubular member engaged with the first tubular member forming a joint, a sleeve overlapping and coupling the first and second tubular members at the joint, and one or more stress concentrators for concentrating stresses in the joint. In an exemplary embodiment, one or more of the stress concentrators comprises one or more external grooves defined in the first tubular member. In an exemplary embodiment, one or more of the stress concentrators comprises one or more internal grooves defined in the second tubular member. In an exemplary embodiment, one or more of the stress concentrators comprises one or more openings defined in the sleeve. In an exemplary embodiment, one or more of the stress concentrators comprises one or more external grooves defined in the first tubular member; and one or more of the stress concentrators comprises one or more internal grooves defined in the second tubular member. In an exemplary embodiment, one or more of the stress concentrators comprises one or more external grooves defined in the first tubular member; and one or more of the stress concentrators comprises one or more openings defined in the sleeve. In an exemplary embodiment, one or more of the stress concentrators comprises one or more internal grooves defined in the second tubular member; and one or more of the stress concentrators comprises one or more openings defined in the sleeve. In an exemplary embodiment, one or more of the stress concentrators comprises one or more external grooves defined in the first tubular member; wherein one or more of the stress concentrators comprises one or more internal grooves defined in the second tubular member; and wherein one or more of the stress concentrators comprises one or more openings defined in the sleeve.

A method of joining radially expandable multiple tubular members has been described that includes providing a first tubular member, engaging a second tubular member with the first tubular member to form a joint, providing a sleeve having opposite tapered ends and a flange, one of the tapered ends being a surface formed on the flange, and concentrating stresses within the joint. In an exemplary embodiment, concentrating stresses within the joint comprises using the first tubular member to concentrate stresses within the joint. In an exemplary embodiment, concentrating stresses within the joint comprises using the second tubular member to concentrate stresses within the joint. In an exemplary embodiment, concentrating stresses within the joint comprises using the sleeve to concentrate stresses within the joint. In an exemplary embodiment, concentrating stresses within the joint comprises using the first tubular member and the second tubular member to concentrate stresses within the joint. In an exemplary embodiment, concentrating stresses within the joint comprises using the first tubular member and the sleeve to concentrate stresses within the joint. In an exemplary embodiment, concentrating stresses within the joint comprises using the second tubular member and the sleeve to concentrate stresses within the joint. In an exemplary embodiment, concentrating stresses within the joint comprises using the first tubular member, the second tubular member, and the sleeve to concentrate stresses within the joint.

A system for radially expanding and plastically deforming a first tubular member coupled to a second tubular member by a mechanical connection has been described that includes means for radially expanding the first and second tubular members, and means for maintaining portions of the first and second tubular member in circumferential compression following the radial expansion and plastic deformation of the first and second tubular members.

A system for radially expanding and plastically deforming a first tubular member coupled to a second tubular member by a mechanical connection has been described that includes means for radially expanding the first and second tubular members; and means for concentrating stresses within the mechanical connection during the radial expansion and plastic deformation of the first and second tubular members.

A system for radially expanding and plastically deforming a first tubular member coupled to a second tubular member by a mechanical connection has been described that includes means for radially expanding the first and second tubular members; means for maintaining portions of the first and second tubular member in circumferential compression following the radial expansion and plastic deformation of the first and second tubular members; and means for concentrating stresses within the mechanical connection during the radial expansion and plastic deformation of the first and second tubular members.

A radially expandable tubular member apparatus has been described that includes a first tubular member; a second tubular member engaged with the first tubular member forming a joint; and a sleeve overlapping and coupling the first and second tubular members at the joint; wherein, prior to a radial expansion and plastic deformation of the apparatus, a predetermined portion of the apparatus has a lower yield point than another portion of the apparatus. In an exemplary embodiment, the carbon content of the predetermined portion of the apparatus is less than or equal to 0.12 percent; and wherein the carbon equivalent value for the predetermined portion of the apparatus is less than 0.21. In an exemplary embodiment, the carbon content of the predetermined portion of the apparatus is greater than 0.12 percent; and wherein the carbon equivalent value for the predetermined portion of the apparatus is less than 0.36. In an exemplary embodiment, the apparatus further includes means for maintaining portions of the first and second tubular member in circumferential compression following the radial expansion and plastic deformation of the first and second tubular members. In an exemplary embodiment, the apparatus further includes means for concentrating stresses within the mechanical connection during the radial expansion and plastic deformation of the first and second tubular members. In an exemplary embodiment, the apparatus further includes means for maintaining portions of the first and second tubular member in circumferential compression following the radial expansion and plastic deformation of the first and second tubular members; and means for concentrating stresses within the mechanical connection during the radial expansion and plastic deformation of the first and second tubular members. In an exemplary embodiment, the apparatus further includes one or more stress concentrators for concentrating stresses in the joint. In an exemplary embodiment, one or more of the stress concentrators comprises one or more external grooves defined in the first tubular member. In an exemplary embodiment, one or more of the stress concentrators comprises one or more internal grooves defined in the second tubular member. In an exemplary embodiment, one or more of the stress concentrators comprises one or more openings defined in the sleeve. In an exemplary embodiment, one or more of the stress concentrators comprises one or more external grooves defined in the first tubular member; and wherein one or more of the stress concentrators comprises one or more internal grooves defined in the second tubular member. In an exemplary embodiment, one or more of the stress concentrators comprises one or more external grooves defined in the first tubular member; and wherein one or more of the stress concentrators comprises one or more openings defined in the sleeve. In an exemplary embodiment, one or more of the stress concentrators comprises one or more internal grooves defined in the second tubular member; and wherein one or more of the stress concentrators comprises one or more openings defined in the sleeve. In an exemplary embodiment, one or more of the stress concentrators comprises one or more external grooves defined in the first tubular member; wherein one or more of the stress concentrators comprises one or more internal grooves defined in the second tubular member; and wherein one or more of the stress concentrators comprises one or more openings defined in the sleeve. In an exemplary embodiment, the first tubular member further comprises an annular extension extending therefrom; and wherein the flange of the sleeve defines an annular recess for receiving and mating with the annular extension of the first tubular member. In an exemplary embodiment, the apparatus further includes a threaded connection for coupling a portion of the first and second tubular members; wherein at least a portion of the threaded connection is upset. In an exemplary embodiment, at least a portion of tubular sleeve penetrates the first tubular member. In an exemplary embodiment, the apparatus further includes means for increasing the axial compression loading capacity of the joint between the first and second tubular members before and after a radial expansion and plastic deformation of the first and second tubular members. In an exemplary embodiment, the apparatus further includes means for increasing the axial tension loading capacity of the joint between the first and second tubular members before and after a radial expansion and plastic deformation of the first and second tubular members. In an exemplary embodiment, the apparatus further includes means for increasing the axial compression and tension loading capacity of the joint between the first and second tubular members before and after a radial expansion and plastic deformation of the first and second tubular members. In an exemplary embodiment, the apparatus further includes means for avoiding stress risers in the joint between the first and second tubular members before and after a radial expansion and plastic deformation of the first and second tubular members. In an exemplary embodiment, the apparatus further includes means for inducing stresses at selected portions of the coupling between the first and second tubular members before and after a radial expansion and plastic deformation of the first and second tubular members. In an exemplary embodiment, the sleeve is circumferentially tensioned; and wherein the first and second tubular members are circumferentially compressed. In an exemplary embodiment, the means for increasing the axial compression loading capacity of the coupling between the first and second tubular members before and after a radial expansion and plastic deformation of the first and second tubular members is circumferentially tensioned; and wherein the first and second tubular members are circumferentially compressed. In an exemplary embodiment, the means for increasing the axial tension loading capacity of the coupling between the first and second tubular members before and after a radial expansion and plastic deformation of the first and second tubular members is circumferentially tensioned; and wherein the first and second tubular members are circumferentially compressed. In an exemplary embodiment, the means for increasing the axial compression and tension loading capacity of the coupling between the first and second tubular members before and after a radial expansion and plastic deformation of the first and second tubular members is circumferentially tensioned; and wherein the first and second tubular members are circumferentially compressed. In an exemplary embodiment, the means for avoiding stress risers in the coupling between the first and second tubular members before and after a radial expansion and plastic deformation of the first and second tubular members is circumferentially tensioned; and wherein the first and second tubular members are circumferentially compressed. In an exemplary embodiment, the means for inducing stresses at selected portions of the coupling between the first and second tubular members before and after a radial expansion and plastic deformation of the first and second tubular members is circumferentially tensioned; and wherein the first and second tubular members are circumferentially compressed. In an exemplary embodiment, at least a portion of the sleeve is comprised of a frangible material. In an exemplary embodiment, the wall thickness of the sleeve is variable. In an exemplary embodiment, the predetermined portion of the apparatus has a higher ductility and a lower yield point prior to the radial expansion and plastic deformation than after the radial expansion and plastic deformation. In an exemplary embodiment, the predetermined portion of the apparatus has a higher ductility prior to the radial expansion and plastic deformation than after the radial expansion and plastic deformation. In an exemplary embodiment, the predetermined portion of the apparatus has a lower yield point prior to the radial expansion and plastic deformation than after the radial expansion and plastic deformation. In an exemplary embodiment, the predetermined portion of the apparatus has a larger inside diameter after the radial expansion and plastic deformation than other portions of the tubular assembly. In an exemplary embodiment, the sleeve is circumferentially tensioned; and wherein the first and second tubular members are circumferentially compressed. In an exemplary embodiment, the sleeve is circumferentially tensioned; and wherein the first and second tubular members are circumferentially compressed. In an exemplary embodiment, the apparatus further includes positioning another apparatus within the preexisting structure in overlapping relation to the apparatus; and radially expanding and plastically deforming the other apparatus within the preexisting structure; wherein, prior to the radial expansion and plastic deformation of the apparatus, a predetermined portion of the other apparatus has a lower yield point than another portion of the other apparatus. In an exemplary embodiment, the inside diameter of the radially expanded and plastically deformed other portion of the apparatus is equal to the inside diameter of the radially expanded and plastically deformed other portion of the other apparatus. In an exemplary embodiment, the predetermined portion of the apparatus comprises an end portion of the apparatus. In an exemplary embodiment, the predetermined portion of the apparatus comprises a plurality of predetermined portions of the apparatus. In an exemplary embodiment, the predetermined portion of the apparatus comprises a plurality of spaced apart predetermined portions of the apparatus. In an exemplary embodiment, the other portion of the apparatus comprises an end portion of the apparatus. In an exemplary embodiment, the other portion of the apparatus comprises a plurality of other portions of the apparatus. In an exemplary embodiment, the other portion of the apparatus comprises a plurality of spaced apart other portions of the apparatus. In an exemplary embodiment, the apparatus comprises a plurality of tubular members coupled to one another by corresponding tubular couplings. In an exemplary embodiment, the tubular couplings comprise the predetermined portions of the apparatus; and wherein the tubular members comprise the other portion of the apparatus. In an exemplary embodiment, one or more of the tubular couplings comprise the predetermined portions of the apparatus. In an exemplary embodiment, one or more of the tubular members comprise the predetermined portions of the apparatus. In an exemplary embodiment, the predetermined portion of the apparatus defines one or more openings. In an exemplary embodiment, one or more of the openings comprise slots. In an exemplary embodiment, the anisotropy for the predetermined portion of the apparatus is greater than 1. In an exemplary embodiment, the anisotropy for the predetermined portion of the apparatus is greater than 1. In an exemplary embodiment, the strain hardening exponent for the predetermined portion of the apparatus is greater than 0.12. In an exemplary embodiment, the anisotropy for the predetermined portion of the apparatus is greater than 1; and wherein the strain hardening exponent for the predetermined portion of the apparatus is greater than 0.12. In an exemplary embodiment, the predetermined portion of the apparatus comprises a first steel alloy comprising: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the apparatus is at most about 46.9 ksi prior to the radial expansion and plastic deformation; and wherein the yield point of the predetermined portion of the apparatus is at least about 65.9 ksi after the radial expansion and plastic deformation. In an exemplary embodiment, the yield point of the predetermined portion of the apparatus after the radial expansion and plastic deformation is at least about 40% greater than the yield point of the predetermined portion of the apparatus prior to the radial expansion and plastic deformation. In an exemplary embodiment, the anisotropy of the predetermined portion of the apparatus, prior to the radial expansion and plastic deformation, is about 1.48. In an exemplary embodiment, the predetermined portion of the apparatus comprises a second steel alloy comprising: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the apparatus is at most about 57.8 ksi prior to the radial expansion and plastic deformation; and wherein the yield point of the predetermined portion of the apparatus is at least about 74.4 ksi after the radial expansion and plastic deformation. In an exemplary embodiment, the yield point of the predetermined portion of the apparatus after the radial expansion and plastic deformation is at least about 28% greater than the yield point of the predetermined portion of the apparatus prior to the radial expansion and plastic deformation. In an exemplary embodiment, the anisotropy of the predetermined portion of the apparatus, prior to the radial expansion and plastic deformation, is about 1.04. In an exemplary embodiment, the predetermined portion of the apparatus comprises a third steel alloy comprising: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the apparatus, prior to the radial expansion and plastic deformation, is about 1.92. In an exemplary embodiment, the predetermined portion of the apparatus comprises a fourth steel alloy comprising: 0.02% C, 1.31% Mn, 0.02% P, 0.001% S, 0.45% Si, 9.1% Ni, and 18.7% Cr. In an exemplary embodiment, the anisotropy of the predetermined portion of the apparatus, prior to the radial expansion and plastic deformation, is about 1.34. In an exemplary embodiment, the yield point of the predetermined portion of the apparatus is at most about 46.9 ksi prior to the radial expansion and plastic deformation; and wherein the yield point of the predetermined portion of the apparatus is at least about 65.9 ksi after the radial expansion and plastic deformation. In an exemplary embodiment, the yield point of the predetermined portion of the apparatus after the radial expansion and plastic deformation is at least about 40% greater than the yield point of the predetermined portion of the apparatus prior to the radial expansion and plastic deformation. In an exemplary embodiment, the anisotropy of the predetermined portion of the apparatus, prior to the radial expansion and plastic deformation, is at least about 1.48. In an exemplary embodiment, the yield point of the predetermined portion of the apparatus is at most about 57.8 ksi prior to the radial expansion and plastic deformation; and wherein the yield point of the predetermined portion of the apparatus is at least about 74.4 ksi after the radial expansion and plastic deformation. In an exemplary embodiment, the yield point of the predetermined portion of the apparatus after the radial expansion and plastic deformation is at least about 28% greater than the yield point of the predetermined portion of the apparatus prior to the radial expansion and plastic deformation. In an exemplary embodiment, the anisotropy of the predetermined portion of the apparatus, prior to the radial expansion and plastic deformation, is at least about 1.04. In an exemplary embodiment, the anisotropy of the predetermined portion of the apparatus, prior to the radial expansion and plastic deformation, is at least about 1.92. In an exemplary embodiment, the anisotropy of the predetermined portion of the apparatus, prior to the radial expansion and plastic deformation, is at least about 1.34. In an exemplary embodiment, the anisotropy of the predetermined portion of the apparatus, prior to the radial expansion and plastic deformation, ranges from about 1.04 to about 1.92. In an exemplary embodiment, the yield point of the predetermined portion of the apparatus, prior to the radial expansion and plastic deformation, ranges from about 47.6 ksi to about 61.7 ksi. In an exemplary embodiment, the expandability coefficient of the predetermined portion of the apparatus, prior to the radial expansion and plastic deformation, is greater than 0.12. In an exemplary embodiment, the expandability coefficient of the predetermined portion of the apparatus is greater than the expandability coefficient of the other portion of the apparatus. In an exemplary embodiment, the apparatus comprises a wellbore casing. In an exemplary embodiment, the apparatus comprises a pipeline. In an exemplary embodiment, the apparatus comprises a structural support.

A radially expandable tubular member apparatus has been described that includes a first tubular member; a second tubular member engaged with the first tubular member forming a joint; a sleeve overlapping and coupling the first and second tubular members at the joint; the sleeve having opposite tapered ends and a flange engaged in a recess formed in an adjacent tubular member; and one of the tapered ends being a surface formed on the flange; wherein, prior to a radial expansion and plastic deformation of the apparatus, a predetermined portion of the apparatus has a lower yield point than another portion of the apparatus. In an exemplary embodiment, the recess includes a tapered wall in mating engagement with the tapered end formed on the flange. In an exemplary embodiment, the sleeve includes a flange at each tapered end and each tapered end is formed on a respective flange. In an exemplary embodiment, each tubular member includes a recess. In an exemplary embodiment, each flange is engaged in a respective one of the recesses. In an exemplary embodiment, each recess includes a tapered wall in mating engagement with the tapered end formed on a respective one of the flanges. In an exemplary embodiment, the predetermined portion of the apparatus has a higher ductility and a lower yield point prior to the radial expansion and plastic deformation than after the radial expansion and plastic deformation. In an exemplary embodiment, the predetermined portion of the apparatus has a higher ductility prior to the radial expansion and plastic deformation than after the radial expansion and plastic deformation. In an exemplary embodiment, the predetermined portion of the apparatus has a lower yield point prior to the radial expansion and plastic deformation than after the radial expansion and plastic deformation. In an exemplary embodiment, the predetermined portion of the apparatus has a larger inside diameter after the radial expansion and plastic deformation than other portions of the tubular assembly. In an exemplary embodiment, the apparatus further includes positioning another apparatus within the preexisting structure in overlapping relation to the apparatus; and radially expanding and plastically deforming the other apparatus within the preexisting structure; wherein, prior to the radial expansion and plastic deformation of the apparatus, a predetermined portion of the other apparatus has a lower yield point than another portion of the other apparatus. In an exemplary embodiment, the inside diameter of the radially expanded and plastically deformed other portion of the apparatus is equal to the inside diameter of the radially expanded and plastically deformed other portion of the other apparatus. In an exemplary embodiment, the predetermined portion of the apparatus comprises an end portion of the apparatus. In an exemplary embodiment, the predetermined portion of the apparatus comprises a plurality of predetermined portions of the apparatus. In an exemplary embodiment, the predetermined portion of the apparatus comprises a plurality of spaced apart predetermined portions of the apparatus. In an exemplary embodiment, the other portion of the apparatus comprises an end portion of the apparatus. In an exemplary embodiment, the other portion of the apparatus comprises a plurality of other portions of the apparatus. In an exemplary embodiment, the other portion of the apparatus comprises a plurality of spaced apart other portions of the apparatus. In an exemplary embodiment, the apparatus comprises a plurality of tubular members coupled to one another by corresponding tubular couplings. In an exemplary embodiment, the tubular couplings comprise the predetermined portions of the apparatus; and wherein the tubular members comprise the other portion of the apparatus. In an exemplary embodiment, one or more of the tubular couplings comprise the predetermined portions of the apparatus. In an exemplary embodiment, one or more of the tubular members comprise the predetermined portions of the apparatus. In an exemplary embodiment, the predetermined portion of the apparatus defines one or more openings. In an exemplary embodiment, one or more of the openings comprise slots. In an exemplary embodiment, the anisotropy for the predetermined portion of the apparatus is greater than 1. In an exemplary embodiment, the anisotropy for the predetermined portion of the apparatus is greater than 1. In an exemplary embodiment, the strain hardening exponent for the predetermined portion of the apparatus is greater than 0.12. In an exemplary embodiment, the anisotropy for the predetermined portion of the apparatus is greater than 1; and wherein the strain hardening exponent for the predetermined portion of the apparatus is greater than 0.12. In an exemplary embodiment, the predetermined portion of the apparatus comprises a first steel alloy comprising: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the apparatus is at most about 46.9 ksi prior to the radial expansion and plastic deformation; and wherein the yield point of the predetermined portion of the apparatus is at least about 65.9 ksi after the radial expansion and plastic deformation. In an exemplary embodiment, the yield point of the predetermined portion of the apparatus after the radial expansion and plastic deformation is at least about 40% greater than the yield point of the predetermined portion of the apparatus prior to the radial expansion and plastic deformation. In an exemplary embodiment, the anisotropy of the predetermined portion of the apparatus, prior to the radial expansion and plastic deformation, is about 1.48. In an exemplary embodiment, the predetermined portion of the apparatus comprises a second steel alloy comprising: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the apparatus is at most about 57.8 ksi prior to the radial expansion and plastic deformation; and wherein the yield point of the predetermined portion of the apparatus is at least about 74.4 ksi after the radial expansion and plastic deformation. In an exemplary embodiment, the yield point of the predetermined portion of the apparatus after the radial expansion and plastic deformation is at least about 28% greater than the yield point of the predetermined portion of the apparatus prior to the radial expansion and plastic deformation. In an exemplary embodiment, the anisotropy of the predetermined portion of the apparatus, prior to the radial expansion and plastic deformation, is about 1.04. In an exemplary embodiment, the predetermined portion of the apparatus comprises a third steel alloy comprising: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the apparatus, prior to the radial expansion and plastic deformation, is about 1.92. In an exemplary embodiment, the predetermined portion of the apparatus comprises a fourth steel alloy comprising: 0.02% C, 1.31% Mn, 0.02% P, 0.001% S, 0.45% Si, 9.1% Ni, and 18.7% Cr. In an exemplary embodiment, the anisotropy of the predetermined portion of the apparatus, prior to the radial expansion and plastic deformation, is about 1.34. In an exemplary embodiment, the yield point of the predetermined portion of the apparatus is at most about 46.9 ksi prior to the radial expansion and plastic deformation; and wherein the yield point of the predetermined portion of the apparatus is at least about 65.9 ksi after the radial expansion and plastic deformation. In an exemplary embodiment, the yield point of the predetermined portion of the apparatus after the radial expansion and plastic deformation is at least about 40% greater than the yield point of the predetermined portion of the apparatus prior to the radial expansion and plastic deformation. In an exemplary embodiment, the anisotropy of the predetermined portion of the apparatus, prior to the radial expansion and plastic deformation, is at least about 1.48. In an exemplary embodiment, the yield point of the predetermined portion of the apparatus is at most about 57.8 ksi prior to the radial expansion and plastic deformation; and wherein the yield point of the predetermined portion of the apparatus is at least about 74.4 ksi after the radial expansion and plastic deformation. In an exemplary embodiment, the yield point of the predetermined portion of the apparatus after the radial expansion and plastic deformation is at least about 28% greater than the yield point of the predetermined portion of the apparatus prior to the radial expansion and plastic deformation. In an exemplary embodiment, the anisotropy of the predetermined portion of the apparatus, prior to the radial expansion and plastic deformation, is at least about 1.04. In an exemplary embodiment, the anisotropy of the predetermined portion of the apparatus, prior to the radial expansion and plastic deformation, is at least about 1.92. In an exemplary embodiment, the anisotropy of the predetermined portion of the apparatus, prior to the radial expansion and plastic deformation, is at least about 1.34. In an exemplary embodiment, the anisotropy of the predetermined portion of the apparatus, prior to the radial expansion and plastic deformation, ranges from about 1.04 to about 1.92. In an exemplary embodiment, the yield point of the predetermined portion of the apparatus, prior to the radial expansion and plastic deformation, ranges from about 47.6 ksi to about 61.7 ksi. In an exemplary embodiment, the expandability coefficient of the predetermined portion of the apparatus, prior to the radial expansion and plastic deformation, is greater than 0.12. In an exemplary embodiment, the expandability coefficient of the predetermined portion of the apparatus is greater than the expandability coefficient of the other portion of the apparatus. In an exemplary embodiment, the apparatus comprises a wellbore casing. In an exemplary embodiment, the apparatus comprises a pipeline. In an exemplary embodiment, the apparatus comprises a structural support.

A method of joining radially expandable tubular members has been provided that includes: providing a first tubular member; engaging a second tubular member with the first tubular member to form a joint; providing a sleeve; mounting the sleeve for overlapping and coupling the first and second tubular members at the joint; wherein the first tubular member, the second tubular member, and the sleeve define a tubular assembly; and radially expanding and plastically deforming the tubular assembly; wherein, prior to the radial expansion and plastic deformation, a predetermined portion of the tubular assembly has a lower yield point than another portion of the tubular assembly. In an exemplary embodiment, the carbon content of the predetermined portion of the tubular assembly is less than or equal to 0.12 percent; and wherein the carbon equivalent value for the predetermined portion of the tubular assembly is less than 0.21. In an exemplary embodiment, the carbon content of the predetermined portion of the tubular assembly is greater than 0.12 percent; and wherein the carbon equivalent value for the predetermined portion of the tubular assembly is less than 0.36. In an exemplary embodiment, the method further includes: maintaining portions of the first and second tubular member in circumferential compression following a radial expansion and plastic deformation of the first and second tubular members. In an exemplary embodiment, the method further includes: concentrating stresses within the joint during a radial expansion and plastic deformation of the first and second tubular members. In an exemplary embodiment, the method further includes: maintaining portions of the first and second tubular member in circumferential compression following a radial expansion and plastic deformation of the first and second tubular members; and concentrating stresses within the joint during a radial expansion and plastic deformation of the first and second tubular members. In an exemplary embodiment, the method further includes: concentrating stresses within the joint. In an exemplary embodiment, concentrating stresses within the joint comprises using the first tubular member to concentrate stresses within the joint. In an exemplary embodiment, concentrating stresses within the joint comprises using the second tubular member to concentrate stresses within the joint. In an exemplary embodiment, concentrating stresses within the joint comprises using the sleeve to concentrate stresses within the joint. In an exemplary embodiment, concentrating stresses within the joint comprises using the first tubular member and the second tubular member to concentrate stresses within the joint. In an exemplary embodiment, concentrating stresses within the joint comprises using the first tubular member and the sleeve to concentrate stresses within the joint. In an exemplary embodiment, concentrating stresses within the joint comprises using the second tubular member and the sleeve to concentrate stresses within the joint. In an exemplary embodiment, concentrating stresses within the joint comprises using the first tubular member, the second tubular member, and the sleeve to concentrate stresses within the joint. In an exemplary embodiment, at least a portion of the sleeve is comprised of a frangible material. In an exemplary embodiment, the sleeve comprises a variable wall thickness. In an exemplary embodiment, the method further includes maintaining the sleeve in circumferential tension; and maintaining the first and second tubular members in circumferential compression. In an exemplary embodiment, the method further includes maintaining the sleeve in circumferential tension; and maintaining the first and second tubular members in circumferential compression. In an exemplary embodiment, the method further includes: maintaining the sleeve in circumferential tension; and maintaining the first and second tubular members in circumferential compression. In an exemplary embodiment, the method further includes: threadably coupling the first and second tubular members at a first location; threadably coupling the first and second tubular members at a second location spaced apart from the first location; providing a plurality of sleeves; and mounting the sleeves at spaced apart locations for overlapping and coupling the first and second tubular members. In an exemplary embodiment, at least one of the tubular sleeves is positioned in opposing relation to the first threaded coupling; and wherein at least one of the tubular sleeves is positioned in opposing relation to the second threaded coupling. In an exemplary embodiment, at least one of the tubular sleeves is not positioned in opposing relation to the first and second threaded couplings. In an exemplary embodiment, the method further includes: threadably coupling the first and second tubular members; and upsetting the threaded coupling. In an exemplary embodiment, the first tubular member further comprises an annular extension extending therefrom; and wherein the flange of the sleeve defines an annular recess for receiving and mating with the annular extension of the first tubular member. In an exemplary embodiment, the predetermined portion of the tubular assembly has a higher ductility and a lower yield point prior to the radial expansion and plastic deformation than after the radial expansion and plastic deformation. In an exemplary embodiment, the predetermined portion of the tubular assembly has a higher ductility prior to the radial expansion and plastic deformation than after the radial expansion and plastic deformation. In an exemplary embodiment, the predetermined portion of the tubular assembly has a lower yield point prior to the radial expansion and plastic deformation than after the radial expansion and plastic deformation. In an exemplary embodiment, the predetermined portion of the tubular assembly has a larger inside diameter after the radial expansion and plastic deformation than the other portion of the tubular assembly. In an exemplary embodiment, the method further includes: positioning another tubular assembly within the preexisting structure in overlapping relation to the tubular assembly; and radially expanding and plastically deforming the other tubular assembly within the preexisting structure; wherein, prior to the radial expansion and plastic deformation of the tubular assembly, a predetermined portion of the other tubular assembly has a lower yield point than another portion of the other tubular assembly. In an exemplary embodiment, the inside diameter of the radially expanded and plastically deformed other portion of the tubular assembly is equal to the inside diameter of the radially expanded and plastically deformed other portion of the other tubular assembly. In an exemplary embodiment, the predetermined portion of the tubular assembly comprises an end portion of the tubular assembly. In an exemplary embodiment, the predetermined portion of the tubular assembly comprises a plurality of predetermined portions of the tubular assembly. In an exemplary embodiment, the predetermined portion of the tubular assembly comprises a plurality of spaced apart predetermined portions of the tubular assembly. In an exemplary embodiment, the other portion of the tubular assembly comprises an end portion of the tubular assembly. In an exemplary embodiment, the other portion of the tubular assembly comprises a plurality of other portions of the tubular assembly. In an exemplary embodiment, the other portion of the tubular assembly comprises a plurality of spaced apart other portions of the tubular assembly. In an exemplary embodiment, the tubular assembly comprises a plurality of tubular members coupled to one another by corresponding tubular couplings. In an exemplary embodiment, the tubular couplings comprise the predetermined portions of the tubular assembly; and wherein the tubular members comprise the other portion of the tubular assembly. In an exemplary embodiment, one or more of the tubular couplings comprise the predetermined portions of the tubular assembly. In an exemplary embodiment, one or more of the tubular members comprise the predetermined portions of the tubular assembly. In an exemplary embodiment, the predetermined portion of the tubular assembly defines one or more openings. In an exemplary embodiment, one or more of the openings comprise slots. In an exemplary embodiment, the anisotropy for the predetermined portion of the tubular assembly is greater than 1. In an exemplary embodiment, the anisotropy for the predetermined portion of the tubular assembly is greater than 1. In an exemplary embodiment, the strain hardening exponent for the predetermined portion of the tubular assembly is greater than 0.12. In an exemplary embodiment, the anisotropy for the predetermined portion of the tubular assembly is greater than 1; and wherein the strain hardening exponent for the predetermined portion of the tubular assembly is greater than 0.12. In an exemplary embodiment, the predetermined portion of the tubular assembly comprises a first steel alloy comprising: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the tubular assembly is at most about 46.9 ksi prior to the radial expansion and plastic deformation; and wherein the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.48. In an exemplary embodiment, the predetermined portion of the tubular assembly comprises a second steel alloy comprising: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the tubular assembly is at most about 57.8 ksi prior to the radial expansion and plastic deformation; and wherein the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.04. In an exemplary embodiment, the predetermined portion of the tubular assembly comprises a third steel alloy comprising: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the tubular assembly, prior to the radial expansion and plastic deformation, is about 1.92. In an exemplary embodiment, the predetermined portion of the tubular assembly comprises a fourth steel alloy comprising: 0.02% C, 1.31% Mn, 0.02% P, 0.001% S, 0.45% Si, 9.1% Ni, and 18.7% Cr. In an exemplary embodiment, the anisotropy of the predetermined portion of the tubular assembly, prior to the radial expansion and plastic deformation, is about 1.34. In an exemplary embodiment, the yield point of the predetermined portion of the tubular assembly is at most about 46.9 ksi prior to the radial expansion and plastic deformation; and wherein the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.48. In an exemplary embodiment, the yield point of the predetermined portion of the tubular assembly is at most about 57.8 ksi prior to the radial expansion and plastic deformation; and wherein the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.04. In an exemplary embodiment, the anisotropy of the predetermined portion of the tubular assembly, prior to the radial expansion and plastic deformation, is at least about 1.92. In an exemplary embodiment, the anisotropy of the predetermined portion of the tubular assembly, prior to the radial expansion and plastic deformation, is at least about 1.34. In an exemplary embodiment, the anisotropy of the predetermined portion of the tubular assembly, prior to the radial expansion and plastic deformation, ranges from about 1.04 to about 1.92. In an exemplary embodiment, the yield point of the predetermined portion of the tubular assembly, prior to the radial expansion and plastic deformation, ranges from about 47.6 ksi to about 61.7 ksi. In an exemplary embodiment, the expandability coefficient of the predetermined portion of the tubular assembly, prior to the radial expansion and plastic deformation, is greater than 0.12. In an exemplary embodiment, the expandability coefficient of the predetermined portion of the tubular assembly is greater than the expandability coefficient of the other portion of the tubular assembly. In an exemplary embodiment, the tubular assembly comprises a wellbore casing. In an exemplary embodiment, the tubular assembly comprises a pipeline. In an exemplary embodiment, the tubular assembly comprises a structural support.

A method of joining radially expandable tubular members has been described that includes: providing a first tubular member; engaging a second tubular member with the first tubular member to form a joint; providing a sleeve having opposite tapered ends and a flange, one of the tapered ends being a surface formed on the flange; mounting the sleeve for overlapping and coupling the first and second tubular members at the joint, wherein the flange is engaged in a recess formed in an adjacent one of the tubular members; wherein the first tubular member, the second tubular member, and the sleeve define a tubular assembly; and radially expanding and plastically deforming the tubular assembly; wherein, prior to the radial expansion and plastic deformation, a predetermined portion of the tubular assembly has a lower yield point than another portion of the tubular assembly. In an exemplary embodiment, the method further includes: providing a tapered wall in the recess for mating engagement with the tapered end formed on the flange. In an exemplary embodiment, the method further includes: providing a flange at each tapered end wherein each tapered end is formed on a respective flange. In an exemplary embodiment, the method further includes: providing a recess in each tubular member. In an exemplary embodiment, the method further includes: engaging each flange in a respective one of the recesses. In an exemplary embodiment, the method further includes: providing a tapered wall in each recess for mating engagement with the tapered end formed on a respective one of the flanges. In an exemplary embodiment, the predetermined portion of the tubular assembly has a higher ductility and a lower yield point prior to the radial expansion and plastic deformation than after the radial expansion and plastic deformation. In an exemplary embodiment, the predetermined portion of the tubular assembly has a higher ductility prior to the radial expansion and plastic deformation than after the radial expansion and plastic deformation. In an exemplary embodiment, the predetermined portion of the tubular assembly has a lower yield point prior to the radial expansion and plastic deformation than after the radial expansion and plastic deformation. In an exemplary embodiment, the predetermined portion of the tubular assembly has a larger inside diameter after the radial expansion and plastic deformation than the other portion of the tubular assembly. In an exemplary embodiment, the method further includes: positioning another tubular assembly within the preexisting structure in overlapping relation to the tubular assembly; and radially expanding and plastically deforming the other tubular assembly within the preexisting structure; wherein, prior to the radial expansion and plastic deformation of the tubular assembly, a predetermined portion of the other tubular assembly has a lower yield point than another portion of the other tubular assembly. In an exemplary embodiment, the inside diameter of the radially expanded and plastically deformed other portion of the tubular assembly is equal to the inside diameter of the radially expanded and plastically deformed other portion of the other tubular assembly. In an exemplary embodiment, the predetermined portion of the tubular assembly comprises an end portion of the tubular assembly. In an exemplary embodiment, the predetermined portion of the tubular assembly comprises a plurality of predetermined portions of the tubular assembly. In an exemplary embodiment, the predetermined portion of the tubular assembly comprises a plurality of spaced apart predetermined portions of the tubular assembly. In an exemplary embodiment, the other portion of the tubular assembly comprises an end portion of the tubular assembly. In an exemplary embodiment, the other portion of the tubular assembly comprises a plurality of other portions of the tubular assembly. In an exemplary embodiment, the other portion of the tubular assembly comprises a plurality of spaced apart other portions of the tubular assembly. In an exemplary embodiment, the tubular assembly comprises a plurality of tubular members coupled to one another by corresponding tubular couplings. In an exemplary embodiment, the tubular couplings comprise the predetermined portions of the tubular assembly; and wherein the tubular members comprise the other portion of the tubular assembly. In an exemplary embodiment, one or more of the tubular couplings comprise the predetermined portions of the tubular assembly. In an exemplary embodiment, one or more of the tubular members comprise the predetermined portions of the tubular assembly. In an exemplary embodiment, the predetermined portion of the tubular assembly defines one or more openings. In an exemplary embodiment, one or more of the openings comprise slots. In an exemplary embodiment, the anisotropy for the predetermined portion of the tubular assembly is greater than 1. In an exemplary embodiment, the anisotropy for the predetermined portion of the tubular assembly is greater than 1. In an exemplary embodiment, the strain hardening exponent for the predetermined portion of the tubular assembly is greater than 0.12. In an exemplary embodiment, the anisotropy for the predetermined portion of the tubular assembly is greater than 1; and wherein the strain hardening exponent for the predetermined portion of the tubular assembly is greater than 0.12. In an exemplary embodiment, the predetermined portion of the tubular assembly comprises a first steel alloy comprising: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the tubular assembly is at most about 46.9 ksi prior to the radial expansion and plastic deformation; and wherein the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.48. In an exemplary embodiment, the predetermined portion of the tubular assembly comprises a second steel alloy comprising: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the tubular assembly is at most about 57.8 ksi prior to the radial expansion and plastic deformation; and wherein the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.04. In an exemplary embodiment, the predetermined portion of the tubular assembly comprises a third steel alloy comprising: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the tubular assembly, prior to the radial expansion and plastic deformation, is about 1.92. In an exemplary embodiment, the predetermined portion of the tubular assembly comprises a fourth steel alloy comprising: 0.02% C, 1.31% Mn, 0.02% P, 0.001% S, 0.45% Si, 9.1% Ni, and 18.7% Cr. In an exemplary embodiment, the anisotropy of the predetermined portion of the tubular assembly, prior to the radial expansion and plastic deformation, is about 1.34. In an exemplary embodiment, the yield point of the predetermined portion of the tubular assembly is at most about 46.9 ksi prior to the radial expansion and plastic deformation; and wherein the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.48. In an exemplary embodiment, the yield point of the predetermined portion of the tubular assembly is at most about 57.8 ksi prior to the radial expansion and plastic deformation; and wherein the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.04. In an exemplary embodiment, the anisotropy of the predetermined portion of the tubular assembly, prior to the radial expansion and plastic deformation, is at least about 1.92. In an exemplary embodiment, the anisotropy of the predetermined portion of the tubular assembly, prior to the radial expansion and plastic deformation, is at least about 1.34. In an exemplary embodiment, the anisotropy of the predetermined portion of the tubular assembly, prior to the radial expansion and plastic deformation, ranges from about 1.04 to about 1.92. In an exemplary embodiment, the yield point of the predetermined portion of the tubular assembly, prior to the radial expansion and plastic deformation, ranges from about 47.6 ksi to about 61.7 ksi. In an exemplary embodiment, the expandability coefficient of the predetermined portion of the tubular assembly, prior to the radial expansion and plastic deformation, is greater than 0.12. In an exemplary embodiment, the expandability coefficient of the predetermined portion of the tubular assembly is greater than the expandability coefficient of the other portion of the tubular assembly. In an exemplary embodiment, the tubular assembly comprises a wellbore casing. In an exemplary embodiment, the tubular assembly comprises a pipeline. In an exemplary embodiment, the tubular assembly comprises a structural support.

An expandable tubular assembly has been described that includes a first tubular member; a second tubular member coupled to the first tubular member; a first threaded connection for coupling a portion of the first and second tubular members; a second threaded connection spaced apart from the first threaded connection for coupling another portion of the first and second tubular members; a tubular sleeve coupled to and receiving end portions of the first and second tubular members; and a sealing element positioned between the first and second spaced apart threaded connections for sealing an interface between the first and second tubular member; wherein the sealing element is positioned within an annulus defined between the first and second tubular members; and wherein, prior to a radial expansion and plastic deformation of the assembly, a predetermined portion of the assembly has a lower yield point than another portion of the apparatus. In an exemplary embodiment, the predetermined portion of the assembly has a higher ductility and a lower yield point prior to the radial expansion and plastic deformation than after the radial expansion and plastic deformation. In an exemplary embodiment, the predetermined portion of the assembly has a higher ductility prior to the radial expansion and plastic deformation than after the radial expansion and plastic deformation. In an exemplary embodiment, the predetermined portion of the assembly has a lower yield point prior to the radial expansion and plastic deformation than after the radial expansion and plastic deformation. In an exemplary embodiment, the predetermined portion of the assembly has a larger inside diameter after the radial expansion and plastic deformation than other portions of the tubular assembly. In an exemplary embodiment, the assembly further includes: positioning another assembly within the preexisting structure in overlapping relation to the assembly; and radially expanding and plastically deforming the other assembly within the preexisting structure; wherein, prior to the radial expansion and plastic deformation of the assembly, a predetermined portion of the other assembly has a lower yield point than another portion of the other assembly. In an exemplary embodiment, the inside diameter of the radially expanded and plastically deformed other portion of the assembly is equal to the inside diameter of the radially expanded and plastically deformed other portion of the other assembly. In an exemplary embodiment, the predetermined portion of the assembly comprises an end portion of the assembly. In an exemplary embodiment, the predetermined portion of the assembly comprises a plurality of predetermined portions of the assembly. In an exemplary embodiment, the predetermined portion of the assembly comprises a plurality of spaced apart predetermined portions of the assembly. In an exemplary embodiment, the other portion of the assembly comprises an end portion of the assembly. In an exemplary embodiment, the other portion of the assembly comprises a plurality of other portions of the assembly. In an exemplary embodiment, the other portion of the assembly comprises a plurality of spaced apart other portions of the assembly. In an exemplary embodiment, the assembly comprises a plurality of tubular members coupled to one another by corresponding tubular couplings. In an exemplary embodiment, the tubular couplings comprise the predetermined portions of the assembly; and wherein the tubular members comprise the other portion of the assembly. In an exemplary embodiment, one or more of the tubular couplings comprise the predetermined portions of the assembly. In an exemplary embodiment, one or more of the tubular members comprise the predetermined portions of the assembly. In an exemplary embodiment, the predetermined portion of the assembly defines one or more openings. In an exemplary embodiment, one or more of the openings comprise slots. In an exemplary embodiment, the anisotropy for the predetermined portion of the assembly is greater than 1. In an exemplary embodiment, the anisotropy for the predetermined portion of the assembly is greater than 1. In an exemplary embodiment, the strain hardening exponent for the predetermined portion of the assembly is greater than 0.12. In an exemplary embodiment, the anisotropy for the predetermined portion of the assembly is greater than 1; and wherein the strain hardening exponent for the predetermined portion of the assembly is greater than 0.12. In an exemplary embodiment, the predetermined portion of the assembly comprises a first steel alloy comprising: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the assembly is at most about 46.9 ksi prior to the radial expansion and plastic deformation; and wherein the yield point of the predetermined portion of the assembly is at least about 65.9 ksi after the radial expansion and plastic deformation. In an exemplary embodiment, the yield point of the predetermined portion of the assembly after the radial expansion and plastic deformation is at least about 40% greater than the yield point of the predetermined portion of the assembly prior to the radial expansion and plastic deformation. In an exemplary embodiment, the anisotropy of the predetermined portion of the assembly, prior to the radial expansion and plastic deformation, is about 1.48. In an exemplary embodiment, the predetermined portion of the assembly comprises a second steel alloy comprising: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the assembly is at most about 57.8 ksi prior to the radial expansion and plastic deformation; and wherein the yield point of the predetermined portion of the assembly is at least about 74.4 ksi after the radial expansion and plastic deformation. In an exemplary embodiment, the yield point of the predetermined portion of the assembly after the radial expansion and plastic deformation is at least about 28% greater than the yield point of the predetermined portion of the assembly prior to the radial expansion and plastic deformation. In an exemplary embodiment, the anisotropy of the predetermined portion of the assembly, prior to the radial expansion and plastic deformation, is about 1.04. In an exemplary embodiment, the predetermined portion of the assembly comprises a third steel alloy comprising: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the assembly, prior to the radial expansion and plastic deformation, is about 1.92. In an exemplary embodiment, the predetermined portion of the assembly comprises a fourth steel alloy comprising: 0.02% C, 1.31% Mn, 0.02% P, 0.001% S, 0.45% Si, 9.1% Ni, and 18.7% Cr. In an exemplary embodiment, the anisotropy of the predetermined portion of the assembly, prior to the radial expansion and plastic deformation, is about 1.34. In an exemplary embodiment, the yield point of the predetermined portion of the assembly is at most about 46.9 ksi prior to the radial expansion and plastic deformation; and wherein the yield point of the predetermined portion of the assembly is at least about 65.9 ksi after the radial expansion and plastic deformation. In an exemplary embodiment, the yield point of the predetermined portion of the assembly after the radial expansion and plastic deformation is at least about 40% greater than the yield point of the predetermined portion of the assembly prior to the radial expansion and plastic deformation. In an exemplary embodiment, the anisotropy of the predetermined portion of the assembly, prior to the radial expansion and plastic deformation, is at least about 1.48. In an exemplary embodiment, the yield point of the predetermined portion of the assembly is at most about 57.8 ksi prior to the radial expansion and plastic deformation; and wherein the yield point of the predetermined portion of the assembly is at least about 74.4 ksi after the radial expansion and plastic deformation. In an exemplary embodiment, the yield point of the predetermined portion of the assembly after the radial expansion and plastic deformation is at least about 28% greater than the yield point of the predetermined portion of the assembly prior to the radial expansion and plastic deformation. In an exemplary embodiment, the anisotropy of the predetermined portion of the assembly, prior to the radial expansion and plastic deformation, is at least about 1.04. In an exemplary embodiment, the anisotropy of the predetermined portion of the assembly, prior to the radial expansion and plastic deformation, is at least about 1.92. In an exemplary embodiment, the anisotropy of the predetermined portion of the assembly, prior to the radial expansion and plastic deformation, is at least about 1.34. In an exemplary embodiment, the anisotropy of the predetermined portion of the assembly, prior to the radial expansion and plastic deformation, ranges from about 1.04 to about 1.92. In an exemplary embodiment, the yield point of the predetermined portion of the assembly, prior to the radial expansion and plastic deformation, ranges from about 47.6 ksi to about 61.7 ksi. In an exemplary embodiment, the expandability coefficient of the predetermined portion of the assembly, prior to the radial expansion and plastic deformation, is greater than 0.12. In an exemplary embodiment, the expandability coefficient of the predetermined portion of the assembly is greater than the expandability coefficient of the other portion of the assembly. In an exemplary embodiment, the assembly comprises a wellbore casing. In an exemplary embodiment, the assembly comprises a pipeline. In an exemplary embodiment, the assembly comprises a structural support. In an exemplary embodiment, the annulus is at least partially defined by an irregular surface. In an exemplary embodiment, the annulus is at least partially defined by a toothed surface. In an exemplary embodiment, the sealing element comprises an elastomeric material. In an exemplary embodiment, the sealing element comprises a metallic material. In an exemplary embodiment, the sealing element comprises an elastomeric and a metallic material.

A method of joining radially expandable tubular members is provided that includes providing a first tubular member; providing a second tubular member; providing a sleeve; mounting the sleeve for overlapping and coupling the first and second tubular members; threadably coupling the first and second tubular members at a first location; threadably coupling the first and second tubular members at a second location spaced apart from the first location; sealing an interface between the first and second tubular members between the first and second locations using a compressible sealing element, wherein the first tubular member, second tubular member, sleeve, and the sealing element define a tubular assembly; and radially expanding and plastically deforming the tubular assembly; wherein, prior to the radial expansion and plastic deformation, a predetermined portion of the tubular assembly has a lower yield point than another portion of the tubular assembly. In an exemplary embodiment, the sealing element includes an irregular surface. In an exemplary embodiment, the sealing element includes a toothed surface. In an exemplary embodiment, the sealing element comprises an elastomeric material. In an exemplary embodiment, the sealing element comprises a metallic material. In an exemplary embodiment, the sealing element comprises an elastomeric and a metallic material. In an exemplary embodiment, the predetermined portion of the tubular assembly has a higher ductility and a lower yield point prior to the radial expansion and plastic deformation than after the radial expansion and plastic deformation. In an exemplary embodiment, the predetermined portion of the tubular assembly has a higher ductility prior to the radial expansion and plastic deformation than after the radial expansion and plastic deformation. In an exemplary embodiment, the predetermined portion of the tubular assembly has a lower yield point prior to the radial expansion and plastic deformation than after the radial expansion and plastic deformation. In an exemplary embodiment, the predetermined portion of the tubular assembly has a larger inside diameter after the radial expansion and plastic deformation than the other portion of the tubular assembly. In an exemplary embodiment, the method further includes: positioning another tubular assembly within the preexisting structure in overlapping relation to the tubular assembly; and radially expanding and plastically deforming the other tubular assembly within the preexisting structure; wherein, prior to the radial expansion and plastic deformation of the tubular assembly, a predetermined portion of the other tubular assembly has a lower yield point than another portion of the other tubular assembly. In an exemplary embodiment, the inside diameter of the radially expanded and plastically deformed other portion of the tubular assembly is equal to the inside diameter of the radially expanded and plastically deformed other portion of the other tubular assembly. In an exemplary embodiment, the predetermined portion of the tubular assembly comprises an end portion of the tubular assembly. In an exemplary embodiment, the predetermined portion of the tubular assembly comprises a plurality of predetermined portions of the tubular assembly. In an exemplary embodiment, the predetermined portion of the tubular assembly comprises a plurality of spaced apart predetermined portions of the tubular assembly. In an exemplary embodiment, the other portion of the tubular assembly comprises an end portion of the tubular assembly. In an exemplary embodiment, the other portion of the tubular assembly comprises a plurality of other portions of the tubular assembly. In an exemplary embodiment, the other portion of the tubular assembly comprises a plurality of spaced apart other portions of the tubular assembly. In an exemplary embodiment, the tubular assembly comprises a plurality of tubular members coupled to one another by corresponding tubular couplings. In an exemplary embodiment, the tubular couplings comprise the predetermined portions of the tubular assembly; and wherein the tubular members comprise the other portion of the tubular assembly. In an exemplary embodiment, one or more of the tubular couplings comprise the predetermined portions of the tubular assembly. In an exemplary embodiment, one or more of the tubular members comprise the predetermined portions of the tubular assembly. In an exemplary embodiment, the predetermined portion of the tubular assembly defines one or more openings. In an exemplary embodiment, one or more of the openings comprise slots. In an exemplary embodiment, the anisotropy for the predetermined portion of the tubular assembly is greater than 1. In an exemplary embodiment, the anisotropy for the predetermined portion of the tubular assembly is greater than 1. In an exemplary embodiment, the strain hardening exponent for the predetermined portion of the tubular assembly is greater than 0.12. In an exemplary embodiment, the anisotropy for the predetermined portion of the tubular assembly is greater than 1; and wherein the strain hardening exponent for the predetermined portion of the tubular assembly is greater than 0.12. In an exemplary embodiment, the predetermined portion of the tubular assembly comprises a first steel alloy comprising: 0.065% C, 1.44% Mn, 0.01% P, 0.002% S, 0.24% Si, 0.01% Cu, 0.01% Ni, and 0.02% Cr. In an exemplary embodiment, the yield point of the predetermined portion of the tubular assembly is at most about 46.9 ksi prior to the radial expansion and plastic deformation; and wherein the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.48. In an exemplary embodiment, the predetermined portion of the tubular assembly comprises a second steel alloy comprising: 0.18% C, 1.28% Mn, 0.017% P, 0.004% S, 0.29% Si, 0.01% Cu, 0.01% Ni, and 0.03% Cr. In an exemplary embodiment, the yield point of the predetermined portion of the tubular assembly is at most about 57.8 ksi prior to the radial expansion and plastic deformation; and wherein the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is about 1.04. In an exemplary embodiment, the predetermined portion of the tubular assembly comprises a third steel alloy comprising: 0.08% C, 0.82% Mn, 0.006% P, 0.003% S, 0.30% Si, 0.16% Cu, 0.05% Ni, and 0.05% Cr. In an exemplary embodiment, the anisotropy of the predetermined portion of the tubular assembly, prior to the radial expansion and plastic deformation, is about 1.92. In an exemplary embodiment, the predetermined portion of the tubular assembly comprises a fourth steel alloy comprising: 0.02% C, 1.31% Mn, 0.02% P, 0.001% S, 0.45% Si, 9.1% Ni, and 18.7% Cr. In an exemplary embodiment, the anisotropy of the predetermined portion of the tubular assembly, prior to the radial expansion and plastic deformation, is about 1.34. In an exemplary embodiment, the yield point of the predetermined portion of the tubular assembly is at most about 46.9 ksi prior to the radial expansion and plastic deformation; and wherein the yield point of the predetermined portion of the tubular assembly is at least about 65.9 ksi after the radial expansion and plastic deformation. In an exemplary embodiment, the yield point of the predetermined portion of the tubular assembly after the radial expansion and plastic deformation is at least about 40% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.48. In an exemplary embodiment, the yield point of the predetermined portion of the tubular assembly is at most about 57.8 ksi prior to the radial expansion and plastic deformation; and wherein the yield point of the predetermined portion of the tubular assembly is at least about 74.4 ksi after the radial expansion and plastic deformation. In an exemplary embodiment, the yield point of the predetermined portion of the tubular assembly after the radial expansion and plastic deformation is at least about 28% greater than the yield point of the predetermined portion of the tubular assembly prior to the radial expansion and plastic deformation. In an exemplary embodiment, the anisotropy of the predetermined portion of the tubular assembly, prior to the radial expansion and plastic deformation, is at least about 1.04. In an exemplary embodiment, the anisotropy of the predetermined portion of the tubular assembly, prior to the radial expansion and plastic deformation, is at least about 1.92. In an exemplary embodiment, the anisotropy of the predetermined portion of the tubular assembly, prior to the radial expansion and plastic deformation, is at least about 1.34. In an exemplary embodiment, the anisotropy of the predetermined portion of the tubular assembly, prior to the radial expansion and plastic deformation, ranges from about 1.04 to about 1.92. In an exemplary embodiment, the yield point of the predetermined portion of the tubular assembly, prior to the radial expansion and plastic deformation, ranges from about 47.6 ksi to about 61.7 ksi. In an exemplary embodiment, the expandability coefficient of the predetermined portion of the tubular assembly, prior to the radial expansion and plastic deformation, is greater than 0.12. In an exemplary embodiment, the expandability coefficient of the predetermined portion of the tubular assembly is greater than the expandability coefficient of the other portion of the tubular assembly. In an exemplary embodiment, the tubular assembly comprises a wellbore casing. In an exemplary embodiment, the tubular assembly comprises a pipeline. In an exemplary embodiment, the tubular assembly comprises a structural support. In an exemplary embodiment, the sleeve comprises: a plurality of spaced apart tubular sleeves coupled to and receiving end portions of the first and second tubular members. In an exemplary embodiment, the first tubular member comprises a first threaded connection; wherein the second tubular member comprises a second threaded connection; wherein the first and second threaded connections are coupled to one another; wherein at least one of the tubular sleeves is positioned in opposing relation to the first threaded connection; and wherein at least one of the tubular sleeves is positioned in opposing relation to the second threaded connection. In an exemplary embodiment, the first tubular member comprises a first threaded connection; wherein the second tubular member comprises a second threaded connection; wherein the first and second threaded connections are coupled to one another; and wherein at least one of the tubular sleeves is not positioned in opposing relation to the first and second threaded connections. In an exemplary embodiment, the carbon content of the tubular member is less than or equal to 0.12 percent; and wherein the carbon equivalent value for the tubular member is less than 0.21. In an exemplary embodiment, the tubular member comprises a wellbore casing.

An expandable tubular member has been described, wherein the carbon content of the tubular member is greater than 0.12 percent; and wherein the carbon equivalent value for the tubular member is less than 0.36. In an exemplary embodiment, the tubular member comprises a wellbore casing.

A method of selecting tubular members for radial expansion and plastic deformation has been described that includes: selecting a tubular member from a collection of tubular member; determining a carbon content of the selected tubular member; determining a carbon equivalent value for the selected tubular member; and if the carbon content of the selected tubular member is less than or equal to 0.12 percent and the carbon equivalent value for the selected tubular member is less than 0.21, then determining that the selected tubular member is suitable for radial expansion and plastic deformation.

A method of selecting tubular members for radial expansion and plastic deformation has been described that includes: selecting a tubular member from a collection of tubular member; determining a carbon content of the selected tubular member; determining a carbon equivalent value for the selected tubular member; and if the carbon content of the selected tubular member is greater than 0.12 percent and the carbon equivalent value for the selected tubular member is less than 0.36, then determining that the selected tubular member is suitable for radial expansion and plastic deformation.

An expandable tubular member has been described that includes: a tubular body; wherein a yield point of an inner tubular portion of the tubular body is less than a yield point of an outer tubular portion of the tubular body. In an exemplary embodiment, the yield point of the inner tubular portion of the tubular body varies as a function of the radial position within the tubular body. In an exemplary embodiment, the yield point of the inner tubular portion of the tubular body varies in an linear fashion as a function of the radial position within the tubular body. In an exemplary embodiment, the yield point of the inner tubular portion of the tubular body varies in an non-linear fashion as a function of the radial position within the tubular body. In an exemplary embodiment, the yield point of the outer tubular portion of the tubular body varies as a function of the radial position within the tubular body. In an exemplary embodiment, the yield point of the outer tubular portion of the tubular body varies in an linear fashion as a function of the radial position within the tubular body. In an exemplary embodiment, the yield point of the outer tubular portion of the tubular body varies in an non-linear fashion as a function of the radial position within the tubular body. In an exemplary embodiment, the yield point of the inner tubular portion of the tubular body varies as a function of the radial position within the tubular body; and wherein the yield point of the outer tubular portion of the tubular body varies as a function of the radial position within the tubular body. In an exemplary embodiment, the yield point of the inner tubular portion of the tubular body varies in a linear fashion as a function of the radial position within the tubular body; and wherein the yield point of the outer tubular portion of the tubular body varies in a linear fashion as a function of the radial position within the tubular body. In an exemplary embodiment, the yield point of the inner tubular portion of the tubular body varies in a linear fashion as a function of the radial position within the tubular body; and wherein the yield point of the outer tubular portion of the tubular body varies in a non-linear fashion as a function of the radial position within the tubular body. In an exemplary embodiment, the yield point of the inner tubular portion of the tubular body varies in a non-linear fashion as a function of the radial position within the tubular body; and wherein the yield point of the outer tubular portion of the tubular body varies in a linear fashion as a function of the radial position within the tubular body. In an exemplary embodiment, the yield point of the inner tubular portion of the tubular body varies in a non-linear fashion as a function of the radial position within the tubular body; and wherein the yield point of the outer tubular portion of the tubular body varies in a non-linear fashion as a function of the radial position within the tubular body. In an exemplary embodiment, the rate of change of the yield point of the inner tubular portion of the tubular body is different than the rate of change of the yield point of the outer tubular portion of the tubular body. In an exemplary embodiment, the rate of change of the yield point of the inner tubular portion of the tubular body is different than the rate of change of the yield point of the outer tubular portion of the tubular body.

A method of manufacturing an expandable tubular member has been described that includes: providing a tubular member; heat treating the tubular member; and quenching the tubular member; wherein following the quenching, the tubular member comprises a microstructure comprising a hard phase structure and a soft phase structure. In an exemplary embodiment, the provided tubular member comprises, by weight percentage, 0.065% C, 1.44% Mn, 0.01% P, 0.002% S, 0.24% Si, 0.01% Cu, 0.01% Ni, 0.02% Cr, 0.05% V, 0.01% Mo, 0.01% Nb, and 0.01% Ti. In an exemplary embodiment, the provided tubular member comprises, by weight percentage, 0.18% C, 1.28% Mn, 0.017% P, 0.004% S, 0.29% Si, 0.01% Cu, 0.01% Ni, 0.03% Cr, 0.04% V, 0.01% Mo, 0.03% Nb, and 0.01% Ti. In an exemplary embodiment, the provided tubular member comprises, by weight percentage, 0.08% C, 0.82% Mn, 0.006% P, 0.003% S, 0.30% Si, 0.06% Cu, 0.05% Ni, 0.05% Cr, 0.03% V, 0.03% Mo, 0.01% Nb, and 0.01% Ti. In an exemplary embodiment, the provided tubular member comprises a microstructure comprising one or more of the following: martensite, pearlite, vanadium carbide, nickel carbide, or titanium carbide. In an exemplary embodiment, the provided tubular member comprises a microstructure comprising one or more of the following: pearlite or pearlite striation. In an exemplary embodiment, the provided tubular member comprises a microstructure comprising one or more of the following: grain pearlite, widmanstatten martensite, vanadium carbide, nickel carbide, or titanium carbide. In an exemplary embodiment, the heat treating comprises heating the provided tubular member for about 10 minutes at 790° C. In an exemplary embodiment, the quenching comprises quenching the heat treated tubular member in water. In an exemplary embodiment, following the quenching, the tubular member comprises a microstructure comprising one or more of the following: ferrite, grain pearlite, or martensite. In an exemplary embodiment, following the quenching, the tubular member comprises a microstructure comprising one or more of the following: ferrite, martensite, or bainite. In an exemplary embodiment, following the quenching, the tubular member comprises a microstructure comprising one or more of the following: bainite, pearlite, or ferrite. In an exemplary embodiment, following the quenching, the tubular member comprises a yield strength of about 67 ksi and a tensile strength of about 95 ksi. In an exemplary embodiment, following the quenching, the tubular member comprises a yield strength of about 82 ksi and a tensile strength of about 130 ksi. In an exemplary embodiment, following the quenching, the tubular member comprises a yield strength of about 60 ksi and a tensile strength of about 97 ksi. In an exemplary embodiment, the method further includes: positioning the quenched tubular member within a preexisting structure; and radially expanding and plastically deforming the tubular member within the preexisting structure.

An expandable tubular member has been described that includes: a steel alloy comprising: 0.07% Carbon, 1.64% Manganese, 0.011% Phosphor, 0.001% Sulfur, 0.23% Silicon, 0.5% Nickel, 0.51% Chrome, 0.31% Molybdenum, 0.15% Copper, 0.021% Aluminum, 0.04% Vanadium, 0.03% Niobium, and 0.007% Titanium.

An expandable tubular member has been described that includes: a collapse strength of approximately 70 ksi and comprising: 0.07% Carbon, 1.64% Manganese, 0.011% Phosphor, 0.001% Sulfur, 0.23% Silicon, 0.5% Nickel, 0.51% Chrome, 0.31% Molybdenum, 0.15% Copper, 0.021% Aluminum, 0.04% Vanadium, 0.03% Niobium, and 0.007% Titanium, wherein, upon radial expansion and plastic deformation, the collapse strength increases to approximately 110 ksi.

An expandable tubular member has been described that includes: an outer surface and means for increasing the collapse strength of a tubular assembly when the expandable tubular member is radially expanded and plastically deformed against a preexisting structure, the means coupled to the outer surface. In an exemplary embodiment, the means comprises a coating comprising a soft metal. In an exemplary embodiment, the means comprises a coating comprising aluminum. In an exemplary embodiment, the means comprises a coating comprising aluminum and zinc. In an exemplary embodiment, the means comprises a coating comprising plastic. In an exemplary embodiment, the means comprises a material wrapped around the outer surface of the tubular member. In an exemplary embodiment, the material comprises a soft metal. In an exemplary embodiment, the material comprises aluminum. In an exemplary embodiment, the means comprises a coating of varying thickness. In an exemplary embodiment, the means comprises a non uniform coating. In an exemplary embodiment, the means comprises a coating having multiple layers. In an exemplary embodiment, the multiple layers are selected from the group consisting of a soft metal, a plastic, a composite material, and combinations thereof.

A preexisting structure for accepting an expandable tubular member has been described that includes: a passage defined by the structure, an inner surface on the passage and means for increasing the collapse strength of a tubular assembly when an expandable tubular member is radially expanded and plastically deformed against the preexisting structure, the means coupled to the inner surface. In an exemplary embodiment, the means comprises a coating comprising a soft metal. In an exemplary embodiment, the means comprises a coating comprising aluminum. In an exemplary embodiment, the coating comprises aluminum and zinc. In an exemplary embodiment, the means comprises a coating comprising a plastic. In an exemplary embodiment, the means comprises a coating comprising a material lining the inner surface of the tubular member. In an exemplary embodiment, the material comprises a soft metal. In an exemplary embodiment, the material comprises aluminum. In an exemplary embodiment, the means comprises a coating of varying thickness. In an exemplary embodiment, the means comprises a non uniform coating. In an exemplary embodiment, the means comprises a coating having multiple layers. In an exemplary embodiment, the multiple layers are selected from the group consisting of a soft metal, a plastic, a composite material, and combinations thereof.

An expandable tubular assembly has been described that includes: a structure defining a passage therein, an expandable tubular member positioned in the passage and means for increasing the collapse strength of the assembly when the expandable tubular member is radially expanded and plastically deformed against the structure, the means positioned between the expandable tubular member and the structure. In an exemplary embodiment, the structure comprises a wellbore casing. In an exemplary embodiment, the structure comprises a tubular member. In an exemplary embodiment, the means comprises an interstitial layer comprising a soft metal. In an exemplary embodiment, the means comprises an interstitial layer comprising aluminum. In an exemplary embodiment, the means comprises an interstitial layer comprising aluminum and zinc. In an exemplary embodiment, the means comprises an interstitial layer comprising a plastic. In an exemplary embodiment, the means comprises an interstitial layer comprising a material wrapped around an outer surface of the expandable tubular member. In an exemplary embodiment, the material comprises a soft metal. In an exemplary embodiment, the material comprises aluminum. In an exemplary embodiment, the means comprises an interstitial layer comprising a material lining an inner surface of the structure. In an exemplary embodiment, the material comprises a soft metal. In an exemplary embodiment, the material comprises aluminum. In an exemplary embodiment, the means comprises an interstitial layer of varying thickness. In an exemplary embodiment, the means comprises a non uniform interstitial layer. In an exemplary embodiment, the means comprises an interstitial layer having multiple layers. In an exemplary embodiment, the multiple layers are selected from the group consisting of a soft metal, a plastic, a composite material, and combinations thereof. In an exemplary embodiment, the structure is in circumferential tension.

A tubular assembly has been described that includes: a structure defining a passage therein, an expandable tubular member positioned in the passage and an interstitial layer positioned between the structure and expandable tubular member, wherein the collapse strength of the assembly with the interstitial layer is at least 20% greater than the collapse strength without the interstitial layer. In an exemplary embodiment, the structure comprises a wellbore casing. In an exemplary embodiment, the structure comprises a tubular member. In an exemplary embodiment, the interstitial layer comprises aluminum. In an exemplary embodiment, the interstitial layer comprises aluminum and zinc. In an exemplary embodiment, the interstitial layer comprises plastic. In an exemplary embodiment, the interstitial layer has a varying thickness. In an exemplary embodiment, the interstitial layer is non uniform. In an exemplary embodiment, the interstitial layer comprises multiple layers. In an exemplary embodiment, the multiple layers are selected from the group consisting of a soft metal, a plastic, a composite material, and combinations thereof. In an exemplary embodiment, the structure is in circumferential tension.

A tubular assembly has been described that includes: a structure defining a passage therein, an expandable tubular member positioned in the passage and an interstitial layer positioned between the structure and expandable tubular member, wherein the collapse strength of the assembly with the interstitial layer is at least 30% greater than the collapse strength without the interstitial layer. In an exemplary embodiment, the structure comprises a wellbore casing. In an exemplary embodiment, the structure comprises a tubular member. In an exemplary embodiment, the interstitial layer comprises aluminum. In an exemplary embodiment, the interstitial layer comprises aluminum and zinc. In an exemplary embodiment, the interstitial layer comprises plastic. In an exemplary embodiment, the interstitial layer has a varying thickness. In an exemplary embodiment, the interstitial layer is non uniform. In an exemplary embodiment, the interstitial layer comprises multiple layers. In an exemplary embodiment, the multiple layers are selected from the group consisting of a soft metal, a plastic, a composite material, and combinations thereof. In an exemplary embodiment, the structure is in circumferential tension.

A tubular assembly has been described that includes: a structure defining a passage therein, an expandable tubular member positioned in the passage and an interstitial layer positioned between the structure and expandable tubular member, wherein the collapse strength of the assembly with the interstitial layer is at least 40% greater than the collapse strength without the interstitial layer. In an exemplary embodiment, the structure comprises a wellbore casing. In an exemplary embodiment, the structure comprises a tubular member. In an exemplary embodiment, the interstitial layer comprises aluminum. In an exemplary embodiment, the interstitial layer comprises aluminum and zinc. In an exemplary embodiment, the interstitial layer comprises plastic. In an exemplary embodiment, the interstitial layer has a varying thickness. In an exemplary embodiment, the interstitial layer is non uniform. In an exemplary embodiment, the interstitial layer comprises multiple layers. In an exemplary embodiment, the multiple layers are selected from the group consisting of a soft metal, a plastic, a composite material, and combinations thereof. In an exemplary embodiment, the structure is in circumferential tension.

A tubular assembly has been described that includes: a structure defining a passage therein, an expandable tubular member positioned in the passage and an interstitial layer positioned between the structure and expandable tubular member, wherein the collapse strength of the assembly with the interstitial layer is at least 50% greater than the collapse strength without the interstitial layer. In an exemplary embodiment, the structure comprises a wellbore casing. In an exemplary embodiment, the structure comprises a tubular member. In an exemplary embodiment, the interstitial layer comprises aluminum. In an exemplary embodiment, the interstitial layer comprises aluminum and zinc. In an exemplary embodiment, the interstitial layer comprises plastic. In an exemplary embodiment, the interstitial layer has a varying thickness. In an exemplary embodiment, the interstitial layer is non uniform. In an exemplary embodiment, the interstitial layer comprises multiple layers. In an exemplary embodiment, the multiple layers are selected from the group consisting of a soft metal, a plastic, a composite material, and combinations thereof. In an exemplary embodiment, the structure is in circumferential tension.

An expandable tubular assembly has been described that includes: an outer tubular member comprising a steel alloy and defining a passage, an inner tubular member comprising a steel alloy and positioned in the passage and an interstitial layer between the inner tubular member and the outer tubular member, the interstitial layer comprising an aluminum material lining an inner surface of the outer tubular member, whereby the collapse strength of the assembly with the interstitial layer is greater than the collapse strength of the assembly without the interstitial layer.

A method for increasing the collapse strength of a tubular assembly has been described that includes: providing a preexisting structure defining a passage therein, providing an expandable tubular member, coating the expandable tubular member with an interstitial material, positioning the expandable tubular member in the passage defined by the preexisting structure and expanding the expandable tubular member such that the interstitial material engages the preexisting structure, whereby the collapse strength of the preexisting structure and expandable tubular member with the interstitial material is greater than the collapse strength of the preexisting structure and expandable tubular member without the interstitial material. In an exemplary embodiment, the preexisting structure comprises a wellbore casing. In an exemplary embodiment, the preexisting structure comprises a tubular member. In an exemplary embodiment, the coating comprises applying a soft metal layer on an outer surface of the expandable tubular member. In an exemplary embodiment, the coating comprises applying an aluminum layer on an outer surface of the expandable tubular member. In an exemplary embodiment, the coating comprises applying an aluminum/zinc layer on an outer surface of the expandable tubular member. In an exemplary embodiment, the coating comprises applying a plastic layer on an outer surface of the expandable tubular member. In an exemplary embodiment, the coating comprises wrapping a material around an outer surface of the expandable tubular member. In an exemplary embodiment, the material comprises a soft metal. In an exemplary embodiment, the material comprises aluminum. In an exemplary embodiment, the expanding results in the expansion of the preexisting structure. In an exemplary embodiment, the expansion places the preexisting structure in circumferential tension.

A method for increasing the collapse strength of a tubular assembly has been described that includes: providing a preexisting structure defining a passage therein, providing an expandable tubular member, coating the preexisting structure with an interstitial material, positioning the expandable tubular member in the passage defined by the preexisting structure and expanding the expandable tubular member such that the interstitial material engages the expandable tubular member, whereby the collapse strength of the preexisting structure and expandable tubular member with the interstitial material is greater than the collapse strength of the preexisting structure and expandable tubular member without the interstitial material. In an exemplary embodiment, the preexisting structure is a wellbore casing. In an exemplary embodiment, the preexisting structure is a tubular member. In an exemplary embodiment, the coating comprises applying a soft metal layer on a surface of the passage in the preexisting structure. In an exemplary embodiment, the coating comprises applying an aluminum layer on a surface of the passage in the preexisting structure. In an exemplary embodiment, the coating comprises applying an aluminum/zinc layer on a surface of the passage in the preexisting structure. In an exemplary embodiment, the coating comprises applying a plastic layer on a surface of the passage in the preexisting structure. In an exemplary embodiment, the coating comprises lining a material around a surface of the passage in the preexisting structure. In an exemplary embodiment, the material comprises a soft metal. In an exemplary embodiment, the material comprises aluminum. In an exemplary embodiment, the expanding results in the expansion of the preexisting structure. In an exemplary embodiment, the expanding places the preexisting structure in circumferential tension.

An expandable tubular member has been described that includes: an outer surface and an interstitial layer on the outer surface, wherein the interstitial layer comprises an aluminum material resulting in a required expansion operating pressure of approximately 3900 psi for the tubular member. In an exemplary embodiment, the expandable tubular member comprises an expanded 7⅝ inch diameter tubular member.

An expandable tubular assembly has been described that includes: an outer surface and an interstitial layer on the outer surface, wherein the interstitial layer comprises an aluminum/zinc material resulting in a required expansion operating pressure of approximately 3700 psi for the tubular member. In an exemplary embodiment, the expandable tubular member comprises an expanded 7⅝ inch diameter tubular member.

An expandable tubular assembly has been described that includes: an outer surface and an interstitial layer on the outer surface, wherein the interstitial layer comprises an plastic material resulting in a required expansion operating pressure of approximately 3600 psi for the tubular member. In an exemplary embodiment, the expandable tubular member comprises an expanded 7⅝ inch diameter tubular member.

An expandable tubular assembly has been described that includes: a structure defining a passage therein, an expandable tubular member positioned in the passage and an interstitial layer positioned between the expandable tubular member and the structure, wherein the interstitial layer has a thickness of approximately 0.05 inches to 0.15 inches. In an exemplary embodiment, the interstitial layer comprises aluminum.

An expandable tubular assembly has been described that includes: a structure defining a passage therein, an expandable tubular member positioned in the passage and an interstitial layer positioned between the expandable tubular member and the structure, wherein the interstitial layer has a thickness of approximately 0.07 inches to 0.13 inches. In an exemplary embodiment, the interstitial layer comprises aluminum and zinc.

An expandable tubular assembly has been described that includes: a structure defining a passage therein, an expandable tubular member positioned in the passage and an interstitial layer positioned between the expandable tubular member and the structure, wherein the interstitial layer has a thickness of approximately 0.06 inches to 0.14 inches. In an exemplary embodiment, the interstitial layer comprises plastic.

An expandable tubular assembly has been described that includes: a structure defining a passage therein, an expandable tubular member positioned in the passage and an interstitial layer positioned between the expandable tubular member and the structure, wherein the interstitial layer has a thickness of approximately 1.6 mm to 2.5 mm between the structure and the expandable tubular member. In an exemplary embodiment, the interstitial layer comprises plastic.

An expandable tubular assembly has been described that includes: a structure defining a passage therein, an expandable tubular member positioned in the passage and an interstitial layer positioned between the expandable tubular member and the structure, wherein the interstitial layer has a thickness of approximately 2.6 mm to 3.1 mm between the structure and the expandable tubular member. In an exemplary embodiment, the interstitial layer comprises aluminum.

An expandable tubular assembly has been described that includes: a structure defining a passage therein, an expandable tubular member positioned in the passage and an interstitial layer positioned between the expandable tubular member and the structure, wherein the interstitial layer has a thickness of approximately 1.9 mm to 2.5 mm between the structure and the expandable tubular member. In an exemplary embodiment, the interstitial layer comprises aluminum and zinc.

An expandable tubular assembly has been described that includes: a structure defining a passage therein, an expandable tubular member positioned in the passage, an interstitial layer positioned between the expandable tubular member and the structure and a collapse strength greater than approximately 20000 psi. In an exemplary embodiment, the structure comprises a tubular member comprising a diameter of approximately 9⅝ inches. In an exemplary embodiment, the expandable tubular member comprises diameter of approximately 7⅝ inches. In an exemplary embodiment, the expandable tubular member has been expanded by at least 13%. In an exemplary embodiment, the interstitial layer comprises a soft metal. In an exemplary embodiment, the interstitial layer comprises aluminum. In an exemplary embodiment, the interstitial layer comprises aluminum and zinc.

An expandable tubular assembly has been described that includes: a structure defining a passage therein, an expandable tubular member positioned in the passage, an interstitial layer positioned between the expandable tubular member and the structure and a collapse strength greater than approximately 14000 psi. In an exemplary embodiment, the structure comprises a tubular member comprising a diameter of approximately 9⅝ inches. In an exemplary embodiment, the expandable tubular member comprises diameter of approximately 7⅝ inches. In an exemplary embodiment, the expandable tubular member has been expanded by at least 13%. In an exemplary embodiment, the interstitial layer comprises a plastic.

A method for determining the collapse resistance of a tubular assembly has been described that includes: measuring the collapse resistance of a first tubular member, measuring the collapse resistance of a second tubular member, determining the value of a reinforcement factor for a reinforcement of the first and second tubular members and multiplying the reinforcement factor by the sum of the collapse resistance of the first tubular member and the collapse resistance of the second tubular member.

An expandable tubular assembly has been described that includes: a structure defining a passage therein, an expandable tubular member positioned in the passage and means for modifying the residual stresses in at least one of the structure and the expandable tubular member when the expandable tubular member is radially expanded and plastically deformed against the structure, the means positioned between the expandable tubular member and the structure. In an exemplary embodiment, the structure comprises a wellbore casing. In an exemplary embodiment, the structure comprises a tubular member. In an exemplary embodiment, the means comprises an interstitial layer comprising a soft metal. In an exemplary embodiment, the means comprises an interstitial layer comprising aluminum. In an exemplary embodiment, the means comprises an interstitial layer comprising aluminum and zinc. In an exemplary embodiment, the means comprises an interstitial layer comprising a plastic. In an exemplary embodiment, the means comprises an interstitial layer comprising a material wrapped around an outer surface of the expandable tubular member. In an exemplary embodiment, the material comprises a soft metal. In an exemplary embodiment, the material comprises aluminum. In an exemplary embodiment, the means comprises an interstitial layer comprising a material lining an inner surface of the structure. In an exemplary embodiment, the material comprises a soft metal. In an exemplary embodiment, the material comprises aluminum. In an exemplary embodiment, the means comprises an interstitial layer of varying thickness. In an exemplary embodiment, the means comprises a non uniform interstitial layer. In an exemplary embodiment, the means comprises an interstitial layer having multiple layers. In an exemplary embodiment, the multiple layers are selected from the group consisting of a soft metal, a plastic, a composite material, and combinations thereof. In an exemplary embodiment, the structure is in circumferential tension.

An expandable tubular assembly has been described that includes a structure defining a passage therein, an expandable tubular member positioned in the passage, and means for providing a substantially uniform distance between the expandable tubular member and the structure after radial expansion and plastic deformation of the expandable tubular member in the passage. In an exemplary embodiment, the structure comprises a wellbore casing. In an exemplary embodiment, the structure comprises a tubular member. In an exemplary embodiment, the means comprises an interstitial layer comprising a soft metal having a yield strength which is less than the yield strength of the expandable tubular member. In an exemplary embodiment, the means comprises an interstitial layer comprising aluminum. In an exemplary embodiment, the means comprises an interstitial layer comprising aluminum and zinc. In an exemplary embodiment, the means comprises an interstitial layer comprising a plastic. In an exemplary embodiment, the means comprises an interstitial layer comprising a material wrapped around an outer surface of the expandable tubular member. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer comprising a material lining an inner surface of the structure. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer having multiple layers. In an exemplary embodiment, the multiple layers are selected from the group consisting of a soft metal having a yield strength which is less than the yield strength of the expandable tubular member, a plastic, a composite material, and combinations thereof.

An expandable tubular assembly has been described that includes a structure defining a passage therein, an expandable tubular member positioned in the passage, and means for creating a circumferential tensile force in the structure upon radial expansion and plastic deformation of the expandable tubular member in the passage, whereby the circumferential tensile force increases the collapse strength of the combined structure and expandable tubular member. In an exemplary embodiment, the structure comprises a wellbore casing. In an exemplary embodiment, the structure comprises a tubular member. In an exemplary embodiment, the means comprises an interstitial layer comprising a soft metal having a yield strength which is less than the yield strength of the expandable tubular member. In an exemplary embodiment, the means comprises an interstitial layer comprising aluminum. In an exemplary embodiment, the means comprises an interstitial layer comprising aluminum and zinc. In an exemplary embodiment, the means comprises an interstitial layer comprising a plastic. In an exemplary embodiment, the means comprises an interstitial layer comprising a material wrapped around an outer surface of the expandable tubular member. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer comprising a material lining an inner surface of the structure. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer of varying thickness. In an exemplary embodiment, the means comprises a non uniform interstitial layer. In an exemplary embodiment, the means comprises an interstitial layer having multiple layers. In an exemplary embodiment, the multiple layers are selected from the group consisting of a soft metal having a yield strength which is less than the yield strength of the expandable tubular member, a plastic, a composite material, and combinations thereof.

An expandable tubular assembly has been described that includes a first tubular member comprising a first tubular member wall thickness and defining a passage, a second tubular member comprising a second tubular member wall thickness and positioned in the passage, and means for increasing the collapse strength of the combined first tubular member and the second tubular member upon radial expansion and plastic deformation of the first tubular member in the passage, whereby the increased collapse strength exceeds the theoretically calculated collapse strength of a tubular member having a thickness approximately equal to the sum of the first tubular wall thickness and the second tubular wall thickness. In an exemplary embodiment, the first tubular member comprises a wellbore casing. In an exemplary embodiment, the means comprises an interstitial layer comprising a soft metal having a yield strength which is less than the yield strength of the expandable tubular member. In an exemplary embodiment, the means comprises an interstitial layer comprising aluminum. In an exemplary embodiment, the means comprises an interstitial layer comprising aluminum and zinc. In an exemplary embodiment, the means comprises an interstitial layer comprising a material wrapped around an outer surface of the expandable tubular member. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer comprising a material lining an inner surface of the structure. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer of varying thickness. In an exemplary embodiment, the means comprises a non uniform interstitial layer. In an exemplary embodiment, the means comprises an interstitial layer having multiple layers. In an exemplary embodiment, the multiple layers are selected from the group consisting of a soft metal having a yield strength which is less than the yield strength of the expandable tubular member, a plastic, a composite material, and combinations thereof. In an exemplary embodiment, the theoretically calculated collapse strength of a tubular member having a thickness approximately equal to the sum of the first tubular wall thickness and the second tubular wall thickness is calculated using API collapse modeling.

An expandable tubular assembly has been described that includes a structure defining a passage therein, an expandable tubular member positioned in the passage, and means for increasing the collapse strength of the expandable tubular member upon radial expansion and plastic deformation of the expandable tubular member in the passage, the means positioned between the expandable tubular member and the structure. In an exemplary embodiment, the structure comprises a wellbore casing. In an exemplary embodiment, the structure comprises a tubular member. In an exemplary embodiment, the means comprises an interstitial layer comprising a soft metal having a yield strength which is less than the yield strength of the expandable tubular member. In an exemplary embodiment, the means comprises an interstitial layer comprising aluminum. In an exemplary embodiment, the means comprises an interstitial layer comprising aluminum and zinc. In an exemplary embodiment, the means comprises an interstitial layer comprising a plastic. In an exemplary embodiment, the means comprises an interstitial layer comprising a material wrapped around an outer surface of the expandable tubular member. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer comprising a material lining an inner surface of the structure. In an exemplary embodiment, the material comprises a soft metal having a yield strength which is less than the yield strength of the expandable tubular member. In an exemplary embodiment, the material comprises aluminum. In an exemplary embodiment, the means comprises an interstitial layer of varying thickness. In an exemplary embodiment, the means comprises a non uniform interstitial layer. In an exemplary embodiment, the means comprises an interstitial layer having multiple layers. In an exemplary embodiment, the multiple layers are selected from the group consisting of a soft metal having a yield strength which is less than the yield strength of the expandable tubular member, a plastic, a composite material, and combinations thereof. In an exemplary embodiment, the structure is in circumferential tension.

A method for increasing the collapse strength of a tubular assembly has been described that includes providing an expandable tubular member, selecting a soft metal having a yield strength which is less than the yield strength of the expandable tubular member, applying the soft metal to an outer surface of the expandable tubular member, positioning the expandable tubular member in a preexisting structure, and radially expanding and plastically deforming the expandable tubular member such that the soft metal forms an interstitial layer between the preexisting structure and the expandable tubular member, whereby the selecting comprises selecting a soft metal such that, upon radial expansion and plastic deformation, the interstitial layer results in an increased collapse strength of the combined expandable tubular member and the preexisting structure.

A method for increasing the collapse strength of a tubular assembly has been described that includes providing an expandable tubular member, selecting a soft metal having a yield strength which is less than the yield strength of the expandable tubular member, applying the soft metal to an outer surface of the expandable tubular member, positioning the expandable tubular member in a preexisting structure, radially expanding and plastically deforming the expandable tubular member such that the soft metal forms an interstitial layer between the preexisting structure and the expandable tubular member, and creating a circumferential tensile force in the preexisting structure resulting in an increased collapse strength of the combined expandable tubular member and the preexisting structure.

A method for increasing the collapse strength of a tubular assembly has been described that includes providing an expandable tubular member, applying a layer of material to the outer surface of the expandable tubular member, positioning the expandable tubular member in a preexisting structure, radially expanding and plastically deforming the expandable tubular member, and providing a substantially uniform distance between the expandable tubular member and the preexisting structure with the interstitial layer after radial expansion and plastic deformation.

A method for increasing the collapse strength of a tubular assembly has been described that includes providing an expandable tubular member, applying a soft metal having a yield strength which is less than the yield strength of the expandable tubular member to the outer surface of the expandable tubular member, positioning the expandable tubular member in a preexisting structure, and creating a circumferential tensile force in the preexisting structure by radially expanding and plastically deforming the expandable tubular member such that the soft metal engages the preexisting structure.

A method for increasing the collapse strength of a tubular assembly has been described that includes providing an expandable tubular member, applying a soft metal having a yield strength which is less than the yield strength of the expandable tubular member to the outer surface of the expandable tubular member, positioning the expandable tubular member in a preexisting structure; and creating a tubular assembly by expanding the expandable tubular member such that the soft metal engages the preexisting structure, whereby the tubular assembly has a collapse strength which exceeds a theoretical collapse strength of a tubular member having a thickness equal to the sum of a thickness of the expandable tubular member and a thickness of the preexisting structure. A tubular member expansion apparatus has been described that includes an expansion member, and an expansion monitoring device coupled to the expansion member and operable to monitor the radial expansion and plastic deformation of an expandable tubular member by the expansion member. In an exemplary embodiment, the expansion member comprises an expansion cone. In an exemplary embodiment, the expansion member comprises a rotary expansion device. In an exemplary embodiment, the expansion monitoring device comprises an acoustical monitoring device. In an exemplary embodiment, the expansion monitoring device comprises a vibration monitoring device. In an exemplary embodiment, the expansion monitoring device is operable to allow a user to monitor the radial expansion and plastic deformation of an expandable tubular member during the radial expansion and plastic deformation. In an exemplary embodiment, the expansion monitoring device is operable to allow a user to detect normal expansion characteristics. In an exemplary embodiment, the expansion monitoring device is operable to allow a user to detect slip-stick expansion characteristics. In an exemplary embodiment, the expansion monitoring device is operable to allow a user to detect jetting expansion characteristics. In an exemplary embodiment, an elongated member extends from the expansion member, wherein the expansion monitoring device is located along the length of the elongated member. In an exemplary embodiment, a centralizing member is located along the length of the elongated member. In an exemplary embodiment, a plurality of expansion monitoring devices are located along the length of the elongated member. In an exemplary embodiment, a drill string is coupled to the expansion member, whereby the expansion monitoring device is coupled to the expansion member by the drill string. In an exemplary embodiment, the expansion monitoring device comprises a spring-mass assembly. In an exemplary embodiment, the expansion monitoring device comprises a spring-mass-damping system. In an exemplary embodiment, the expansion device is positioned in an expandable tubular member. In an exemplary embodiment, a controller is coupled to the expansion monitoring device, whereby the controller is operable to adjust the operation of the expansion member in response to signals received from the expansion monitoring device. In an exemplary embodiment, the controller is operable to adjust one of a spring rate and a damping ratio for the expansion member.

A tubular member expansion apparatus has been described that includes means for radially expanding and plastically deforming an expandable tubular member, and means for monitoring the radial expansion and plastic deformation of an expandable tubular member coupled to the means for radially expanding and plastically deforming an expandable tubular member. In an exemplary embodiment, the means for monitoring the radial expansion and plastic deformation of an expandable tubular member comprises means for monitoring acoustical signals produced during the radial expansion and plastic deformation of an expandable tubular member by the means for radially expanding and plastically deforming an expandable tubular member. In an exemplary embodiment, the means for monitoring the radial expansion and plastic deformation of an expandable tubular member comprises means for monitoring vibration signals produced during the radial expansion and plastic deformation of an expandable tubular member by the means for radially expanding and plastically deforming an expandable tubular member. In an exemplary embodiment, the apparatus further includes means for receiving signals from the means for monitoring the radial expansion and plastic deformation of an expandable tubular member and adjusting the operation of the means for radially expanding and plastically deforming an expandable tubular member in response to the signals received.

A tubular member expansion apparatus has been described that includes a first anchor, an elongated threaded member rotatably coupled to the first anchor, and an expansion device mounted to the elongated threaded member and operable to translate along the length of the elongated threaded member when the expansion device is positioned in an expandable tubular member and the elongated threaded member is rotated. In an exemplary embodiment, the first anchor comprises an engagement member operable to engage an inner surface of a preexisting structure. In an exemplary embodiment, the first anchor comprises mounting device operable to mount the first anchor to an expandable tubular member. In an exemplary embodiment, the first anchor comprises a bearing for rotatably coupling the elongated threaded member to the first anchor. In an exemplary embodiment, a driveshaft is coupled to the elongated threaded member through the bearing and operable to rotate the elongated threaded member relative to the first anchor. In an exemplary embodiment, the expansion device comprises an expansion cone. In an exemplary embodiment, a driveshaft is coupled to the elongated threaded member through a bearing on the first anchor and operable to rotate the elongated threaded member relative to the first anchor. In an exemplary embodiment, a second anchor is coupled to the drive shaft, whereby the first anchor comprises a first anchor engagement member operable to engage an inner surface of an expandable tubular member, and the second anchor comprises a second anchor engagement member operable to engage an inner surface of a preexisting structure. In an exemplary embodiment, the second anchor comprises mounting device operable to mount the second anchor to an expandable tubular member.

A tubular member expansion apparatus ahs been described that includes means for anchoring to an inner surface of a preexisting structure, an elongated threaded member rotatably coupled to the means for anchoring to an inner surface of a preexisting structure, and means for radially expanding and plastically deforming an expandable tubular member coupled to the elongated threaded member and operable to translate along the length of the elongated threaded member when the elongated threaded member is rotated. In an exemplary embodiment, the means for anchoring to an inner surface of a preexisting structure comprises means for engaging an inner surface of a preexisting structure. In an exemplary embodiment, the means for anchoring to an inner surface of a preexisting structure comprises means for mounting the means for anchoring to an inner surface of a preexisting structure to an expandable tubular member. In an exemplary embodiment, the means for anchoring to an inner surface of a preexisting structure comprises means for rotatably coupling the elongated threaded member to the means for anchoring to an inner surface of a preexisting structure. In an exemplary embodiment, means for rotating the elongated threaded member is coupled to the elongated threaded member through the means for rotatably coupling the elongated threaded member to the means for anchoring to an inner surface of a preexisting structure. In an exemplary embodiment, the apparatus includes means for rotating the elongated threaded member relative to the means for anchoring to an inner surface of a preexisting structure. In an exemplary embodiment, the apparatus includes means for anchoring to an inner surface of a preexisting structure coupled to the means for rotating the elongated threaded member, whereby the means for anchoring to an inner surface of a preexisting structure comprises a means for engaging an inner surface of an expandable tubular member, and the means for anchoring to an inner surface of a preexisting structure comprises a means for engaging an inner surface of a preexisting structure. In an exemplary embodiment, the means for anchoring to an inner surface of a preexisting structure comprises means for mounting the means for anchoring to an inner surface of a preexisting structure to a distal end of an expandable tubular member.

An expandable tubular member has been described that includes a formation defining a passageway having a formation wall, and an expandable tubular member comprising an elastomer coating on an outer surface of the expandable tubular member, whereby the expandable tubular member is positioned in the passageway and radially expanded and plastically deformed such that the elastomer coating directly engages the formation wall. In an exemplary embodiment, the formation comprises unconsolidated sand. In an exemplary embodiment, the formation comprises carbonates. In an exemplary embodiment, the formation comprises shale. In an exemplary embodiment, the formation comprises hard rock.

A method for radially expanding and plastically deforming an expandable tubular member has been described that includes providing an expandable tubular member, positioning an expansion device comprising an expansion monitoring device in the expandable tubular member, radially expanding and plastically deforming the expandable tubular member with the expansion device, and monitoring the radial expansion and plastic deformation of the expandable tubular member with the expansion monitoring device. In an exemplary embodiment, the monitoring comprises monitoring the acoustical signals produced during the radial expansion and plastic deformation of the expandable tubular member. In an exemplary embodiment, the monitoring comprises monitoring the vibration signals produced during the radial expansion and plastic deformation of the expandable tubular member. In an exemplary embodiment, the monitoring comprises determining the radial expansion and plastic deformation is normal. In an exemplary embodiment, the monitoring comprises determining the radial expansion and plastic deformation is exhibiting stick-slip characteristics. In an exemplary embodiment, the monitoring comprises determining the radial expansion and plastic deformation is exhibiting jetting characteristics. In an exemplary embodiment, the method further includes adjusting the radial expansion and plastic deformation in response to the monitoring.

A method for radially expanding and plastically deforming an expandable tubular member has been described that includes providing an expandable tubular member positioned in a preexisting structure, positioning an elongated threaded member in the expandable tubular member, the elongated threaded member comprising an expansion device, and radially expanding and plastically deforming the expandable tubular member by rotating the elongated threaded member such that the expansion device translates along the length of the elongated threaded member. In an exemplary embodiment, the positioning comprises anchoring an anchor to an inner wall of a preexisting structure, whereby the elongated threaded member is rotatably coupled to the anchor. In an exemplary embodiment, the positioning comprises mounting the anchor to the expandable tubular member. In an exemplary embodiment, the positioning comprises anchoring an anchor to an inner wall of the expandable tubular member, whereby the elongated threaded member is rotatably coupled to the anchor.

A method for radially expanding and plastically deforming an expandable tubular member has been described that includes providing an expandable tubular member, coating the expandable tubular member with an elastomer, positioning the expandable tubular member in a passageway defined by a formation and including an inner wall, and radially expanding and plastically deforming the expandable tubular member into engagement with the inner wall. In an exemplary embodiment, the method further includes determining a formation rebound, whereby the radially expanding and plastically deforming comprises radially expanding and plastically deforming the expandable tubular member to a preliminary inside diameter such that, upon the formation rebound, the expandable tubular member comprises a desired inside diameter. In an exemplary embodiment, the determining a formation rebound comprises calculating a rebound diameter of the expandable tubular member using the following equation:

$$(OD_{rebound}/HD)-1=[(2t/D)((1+v_f)/(E_f))+(1/E_t)]\sigma_y$$

A tubular member expansion apparatus has been described that includes an expansion cone, an elongated member extending from the expansion cone, a centralizing member located along the length of the elongated member; and an expansion monitoring device coupled to the elongated member and operable to allow a user to monitor the acoustical signals during the radial expansion and plastic deformation of an expandable tubular member by the expansion cone.

A tubular member expansion apparatus has been described that includes an expansion cone, a drill string coupled to the expansion cone, and an expansion monitoring device comprising a spring-mass assembly coupled to the expansion cone by the drill string and operable to allow a user to monitor the vibration signals during the radial expansion and plastic deformation of an expandable tubular member by the expansion cone.

A tubular member expansion apparatus has been described that includes an expansion cone, an elongated member extending from the expansion cone, a centralizing member located along the length of the elongated member, an expansion monitoring device coupled to the elongated member and operable to allow a user to monitor the acoustical signals during the radial expansion and plastic deformation of an expandable tubular member by the expansion cone, and a controller coupled to the expansion monitoring device and operable to adjust the operation of the expansion cone in response to the acoustical signals received from the expansion monitoring device.

A tubular member expansion apparatus has been described that includes an expansion cone, a drill string coupled to the expansion cone, an expansion monitoring device comprising a spring-mass assembly coupled to the expansion cone by the drill string and operable to allow a user to monitor the vibration signals during the radial expansion and plastic deformation of an expandable tubular member by the expansion cone, and a controller coupled to the expansion monitoring device and operable to adjust the operation of the expansion cone in response to the vibration signals received from the expansion monitoring device.

A tubular member expansion apparatus has been described that includes a first anchor comprising an engagement member operable to engage an inner surface of a preexisting structure and a mounting device operable to mount the first anchor to an expandable tubular member, a bearing mounted to the first anchor, an elongated threaded member rotatably coupled to the bearing, a driveshaft coupled to the elongated threaded member through the bearing and operable to rotate the elongated threaded member relative to the first anchor, and an expansion cone mounted to the elongated threaded member and operable to translate along the length of the elongated threaded member when the expansion cone is positioned in an expandable tubular member and the elongated threaded member is rotated.

A tubular member expansion apparatus has been described that includes a first anchor comprising an engagement member operable to engage an inner surface of an expandable tubular member, a bearing mounted to the first anchor, an elongated threaded member rotatably coupled to the bearing, a driveshaft coupled to the elongated threaded member through the bearing and operable to rotate the elongated threaded member relative to the first anchor, a second anchor coupled to the drive shaft, whereby the second anchor comprises a second anchor engagement member operable to engage an inner surface of a preexisting structure and a mounting device operable to mount the second anchor to an expandable tubular member, and an expansion cone mounted to the elongated threaded member and operable to translate along the length of the elongated threaded member when the expansion cone is positioned in an expandable tubular member and the elongated threaded member is rotated.

A method for radially expanding and plastically deforming an expandable tubular member has been described that includes providing an expandable tubular member, positioning an expansion device comprising an expansion monitoring device in the expandable tubular member, radially expanding and plastically deforming the expandable tubular member with the expansion device, and monitoring the acoustical signals produced during radial expansion and plastic deformation of the expandable tubular member with the expansion monitoring device.

A method for radially expanding and plastically deforming an expandable tubular member has been described that includes providing an expandable tubular member, positioning an expansion device comprising an expansion monitoring device in the expandable tubular member, radially expanding and plastically deforming the expandable tubular member with the expansion device, and monitoring the vibration signals produced during radial expansion and plastic deformation of the expandable tubular member with the expansion monitoring device.

A method for radially expanding and plastically deforming an expandable tubular member has been described that includes providing an expandable tubular member positioned in a preexisting structure, positioning an elongated threaded member in the expandable tubular member, the elongated threaded member comprising an expansion device, anchoring an anchor to an inner wall of a preexisting structure, whereby the elongated threaded member is rotatably coupled to the anchor, mounting the anchor to the expandable tubular member, and radially expanding and plastically deforming the expandable tubular member by rotating the elongated threaded member such that the expansion device translates along the length of the elongated threaded member.

A method for radially expanding and plastically deforming an expandable tubular member has been described that includes providing an expandable tubular member positioned in a preexisting structure, positioning an elongated threaded member in the expandable tubular member, the elongated threaded member comprising an expansion device, anchoring a first anchor to an inner wall of a preexisting structure, whereby the elongated threaded member is rotatably coupled to the anchor, mounting the first anchor to the expandable tubular member, anchoring a second anchor to an inner wall of the expandable tubular member, whereby the elongated threaded member is rotatably coupled to the second anchor, and radially expanding and plastically deforming the expandable tubular member by rotating the elongated threaded member such that the expansion device translates along the length of the elongated threaded member.

A method for radially expanding and plastically deforming an expandable tubular member has been described that includes providing an expandable tubular member, coating the expandable tubular member with an elastomer, positioning the expandable tubular member in a passageway defined by a formation and including an inner wall, determining a formation rebound, and radially expanding and plastically deforming the expandable tubular member into engagement with the inner wall, such that the expandable tubular member comprises a preliminary inside diameter and, upon the formation rebound, the expandable tubular member comprises a desired inside diameter.

A method for manufacturing an expandable member used to complete a structure by radially expanding and plastically deforming the expandable member has been described that includes forming the expandable member from a steel alloy comprising a charpy energy of at least about 90 ft-lbs.

An expandable member for use in completing a structure by radially expanding and plastically deforming the expandable member has been described that includes a steel alloy comprising a charpy energy of at least about 90 ft-lbs.

A structural completion positioned within a structure has been described that includes one or more radially expanded and plastically deformed expandable members positioned within the structure; wherein one or more of the radially expanded and plastically deformed expandable members are fabricated from a steel alloy comprising a charpy energy of at least about 90 ft-lbs.

A method for manufacturing an expandable member used to complete a structure by radially expanding and plastically deforming the expandable member has been described that includes forming the expandable member from a steel alloy comprising a weight percentage of carbon of less than about 0.08%.

An expandable member for use in completing a wellbore by radially expanding and plastically deforming the expandable member at a downhole location in the wellbore has been described that includes a steel alloy comprising a weight percentage of carbon of less than about 0.08%.

A structural completion has been described that includes one or more radially expanded and plastically deformed expandable members positioned within the wellbore; wherein one or more of the radially expanded and plastically deformed expandable members are fabricated from a steel alloy comprising a weight percentage of carbon of less than about 0.08%.

A method for manufacturing an expandable member used to complete a structure by radially expanding and plastically deforming the expandable member has been described that includes forming the expandable member from a steel alloy comprising a weight percentage of carbon of less than about 0.20% and a charpy V-notch impact toughness of at least about 6 joules.

An expandable member for use in completing a structure by radially expanding and plastically deforming the expandable member has been described that includes a steel alloy comprising a weight percentage of carbon of less than about 0.20% and a charpy V-notch impact toughness of at least about 6 joules.

A structural completion has been described that includes one or more radially expanded and plastically deformed expandable members; wherein one or more of the radially expanded and plastically deformed expandable members are fabricated from a steel alloy comprising a weight percentage of carbon of less than about 0.20% and a charpy V-notch impact toughness of at least about 6 joules.

A method for manufacturing an expandable member used to complete a structure by radially expanding and plastically deforming the expandable member has been described that includes forming the expandable member from a steel alloy comprising the following ranges of weight percentages: C, from about 0.002 to about 0.08; Si, from about 0.009 to about 0.30; Mn, from about 0.10 to about 1.92; P, from about 0.004 to about 0.07; S, from about 0.0008 to about 0.006; Al, up to about 0.04; N, up to about 0.01; Cu, up to about 0.3; Cr, up to about 0.5; Ni, up to about 18; Nb, up to about 0.12; Ti, up to about 0.6; Co, up to about 9; and Mo, up to about 5.

An expandable member for use in completing a structure by radially expanding and plastically deforming the expandable member has been described that includes a steel alloy comprising the following ranges of weight percentages: C, from about 0.002 to about 0.08; Si, from about 0.009 to about 0.30; Mn, from about 0.10 to about 1.92; P, from about 0.004 to about 0.07; S, from about 0.0008 to about 0.006; Al, up to about 0.04; N, up to about 0.01; Cu, up to about 0.3; Cr, up to about 0.5; Ni, up to about 18; Nb, up to about 0.12; Ti, up to about 0.6; Co, up to about 9; and Mo, up to about 5.

A structural completion has been described that includes one or more radially expanded and plastically deformed expandable members; wherein one or more of the radially expanded and plastically deformed expandable members are fabricated from a steel alloy comprising the following ranges of weight percentages: C, from about 0.002 to about 0.08; Si, from about 0.009 to about 0.30; Mn, from about 0.10 to about 1.92; P, from about 0.004 to about 0.07; S, from about 0.0008 to about 0.006; Al, up to about 0.04; N, up to about 0.01; Cu, up to about 0.3; Cr, up to about 0.5; Ni, up to about 18; Nb, up to about 0.12; Ti, up to about 0.6; Co, up to about 9; and Mo, up to about 5.

A method for manufacturing an expandable tubular member used to complete a structure by radially expanding and plastically deforming the expandable member has been described that includes forming the expandable tubular member with a ratio of the of an outside diameter of the expandable tubular member to a wall thickness of the expandable tubular member ranging from about 12 to 22.

An expandable member for use in completing a structure by radially expanding and plastically deforming the expandable member has been described that includes an expandable tubular member with a ratio of the of an outside diameter of the expandable tubular member to a wall thickness of the expandable tubular member ranging from about 12 to 22.

A structural completion has been described that includes one or more radially expanded and plastically deformed expandable members positioned within the structure; wherein one or more of the radially expanded and plastically deformed expandable members are fabricated from an expandable tubular member with a ratio of the of an outside diameter of the expandable tubular member to a wall thickness of the expandable tubular member ranging from about 12 to 22.

A method of constructing a structure has been described that includes radially expanding and plastically deforming an expandable member; wherein an outer portion of the wall thickness of the radially expanded and plastically deformed expandable member comprises tensile residual stresses.

A structural completion has been described that includes one or more radially expanded and plastically deformed expandable members; wherein an outer portion of the wall thickness of one or more of the radially expanded and plastically deformed expandable members comprises tensile residual stresses.

A method of constructing a structure using an expandable tubular member has been described that includes strain aging the expandable member; and then radially expanding and plastically deforming the expandable member.

A method for manufacturing a tubular member used to complete a wellbore by radially expanding the tubular member at a downhole location in the wellbore has been described that includes forming a steel alloy comprising a concentration of carbon between approximately 0.002% and 0.08% by weight of the steel alloy.

It is understood that variations may be made in the foregoing without departing from the scope of the disclosure. For example, the teachings of the present illustrative embodiments may be used to provide a wellbore casing, a pipeline, or a structural support. Furthermore, the elements and teachings of the various illustrative embodiments may be combined in whole or in part in some or all of the illustrative embodiments. In addition, one or more of the elements and teachings of the various illustrative embodiments may be omitted, at least in part, and/or combined, at least in part, with one or more of the other elements and teachings of the various illustrative embodiments.

Although illustrative embodiments of the disclosure have been shown and described, a wide range of modification, changes and substitution is contemplated in the foregoing disclosure. In some instances, some features of the present disclosure may be employed without a corresponding use of the other features. Accordingly, it is appropriate that the appended claims be construed broadly and in a manner consistent with the scope of the disclosure.

What is claimed is:

1. A tubular member expansion apparatus, comprising:
an expansion member;
an expansion monitoring device coupled to the expansion member and operable to monitor operational signals produced during the radial expansion and plastic deformation of an expandable tubular member by the expansion member; and
a drill string coupled to the expansion member, whereby the expansion monitoring device is coupled to the expansion member by the drill string,
wherein the expansion monitoring device comprises one or more of the following:
a spring-mass assembly; and
a spring-mass-damping system.

2. The apparatus of claim 1, wherein the expansion member comprises one or more of the following:
an expansion cone; and
a rotary expansion device.

3. The apparatus of claim 1, wherein the expansion monitoring device is operable to allow a user to do one or more of the following:
detect normal expansion characteristics;
detect slip-stick expansion characteristics; and
detect jetting expansion characteristics.

4. The apparatus of claim 1, wherein the expansion device is positioned in an expandable tubular member.

5. A tubular member expansion apparatus, comprising:
an expansion member;
an expansion monitoring device coupled to the expansion member and operable to monitor operational signals produced during the radial expansion and plastic deformation of an expandable tubular member by the expansion member; and
a controller coupled to the expansion monitoring device, whereby the controller is operable to adjust the operation of the expansion member in response to signals received from the expansion monitoring device; wherein the controller is operable to adjust one of a spring rate and a damping ratio for the expansion member.

6. A tubular member expansion apparatus, comprising:
an expansion member including an expansion cone;
an expansion monitoring device coupled to the expansion member and operable to monitor operational signals produced during the radial expansion and plastic deformation of an expandable tubular member by the expansion member; and
a drill string coupled to the expansion cone; and
wherein the expansion monitoring device comprises a spring-mass assembly coupled to the expansion cone by the drill string and operable to allow a user to monitor the vibration signals produced during the radial expansion and plastic deformation of the expandable tubular member by the expansion cone.

7. A tubular member expansion apparatus, comprising:
an expansion member including an expansion cone;
an expansion monitoring device coupled to the expansion member and operable to monitor operational signals produced during the radial expansion and plastic deformation of an expandable tubular member by the expansion member; and
a drill string coupled to the expansion cone;
wherein the expansion monitoring device comprises a spring-mass assembly coupled to the expansion cone by the drill string and operable to allow a user to monitor the vibration signals produced during the radial expansion and plastic deformation of the expandable tubular member by the expansion cone; and
wherein the apparatus further comprises a controller coupled to the expansion monitoring device and operable to adjust the operation of the expansion cone in response to the vibration signals received from the expansion monitoring device.

* * * * *